(12) United States Patent
Kriesel et al.

(10) Patent No.: US 7,399,220 B2
(45) Date of Patent: *Jul. 15, 2008

(54) APPARATUS AND METHODS FOR THE VOLUMETRIC AND DIMENSIONAL MEASUREMENT OF LIVESTOCK

(76) Inventors: Marshall S. Kriesel, 80 N. Mississippi River Rd., Saint Paul, MN (US) 55104; Gary L. McQuilkin, 14860 46th Ave. North, Plymouth, MN (US) 55446

( * ) Notice: Subject to any disclaimer, the term of this patent is extended or adjusted under 35 U.S.C. 154(b) by 432 days.

This patent is subject to a terminal disclaimer.

(21) Appl. No.: 11/134,827

(22) Filed: May 19, 2005

(65) Prior Publication Data

US 2005/0257748 A1   Nov. 24, 2005

Related U.S. Application Data

(63) Continuation-in-part of application No. 10/211,792, filed on Aug. 2, 2002, now Pat. No. 6,974,373.

(51) Int. Cl.
A22C 21/00 (2006.01)

(52) U.S. Cl. .................................... 452/157

(58) Field of Classification Search ............... 382/100, 382/110, 312, 318; 119/174, 840–843; 452/155–158, 452/198, 149, 150
See application file for complete search history.

(56) References Cited

U.S. PATENT DOCUMENTS

| 6,330,523 | B1 * | 12/2001 | Kacyra et al. | 702/159 |
|---|---|---|---|---|
| 7,039,220 | B2 * | 5/2006 | Kriesel | 382/110 |
| 7,190,826 | B2 * | 3/2007 | Russell et al. | 382/154 |
| 7,214,128 | B2 * | 5/2007 | Kriesel | 452/157 |

* cited by examiner

Primary Examiner—Thomas Price

(57) ABSTRACT

A method and apparatus for measuring the physical characteristics of livestock animals such as cattle and hogs. The apparatus of the invention includes a plurality of strategically positioned cameras that are used to obtain data concerning volumetric, curvilinear (surface) and linear measurements of livestock animals such as cattle and hogs and the full carcasses thereof. In accordance with the method of the invention, the data is analyzed to provide information that substantially assists the commercial producer of livestock animals in producing a high-quality end-product for the consumer while adding profitability to the enterprise.

48 Claims, 171 Drawing Sheets

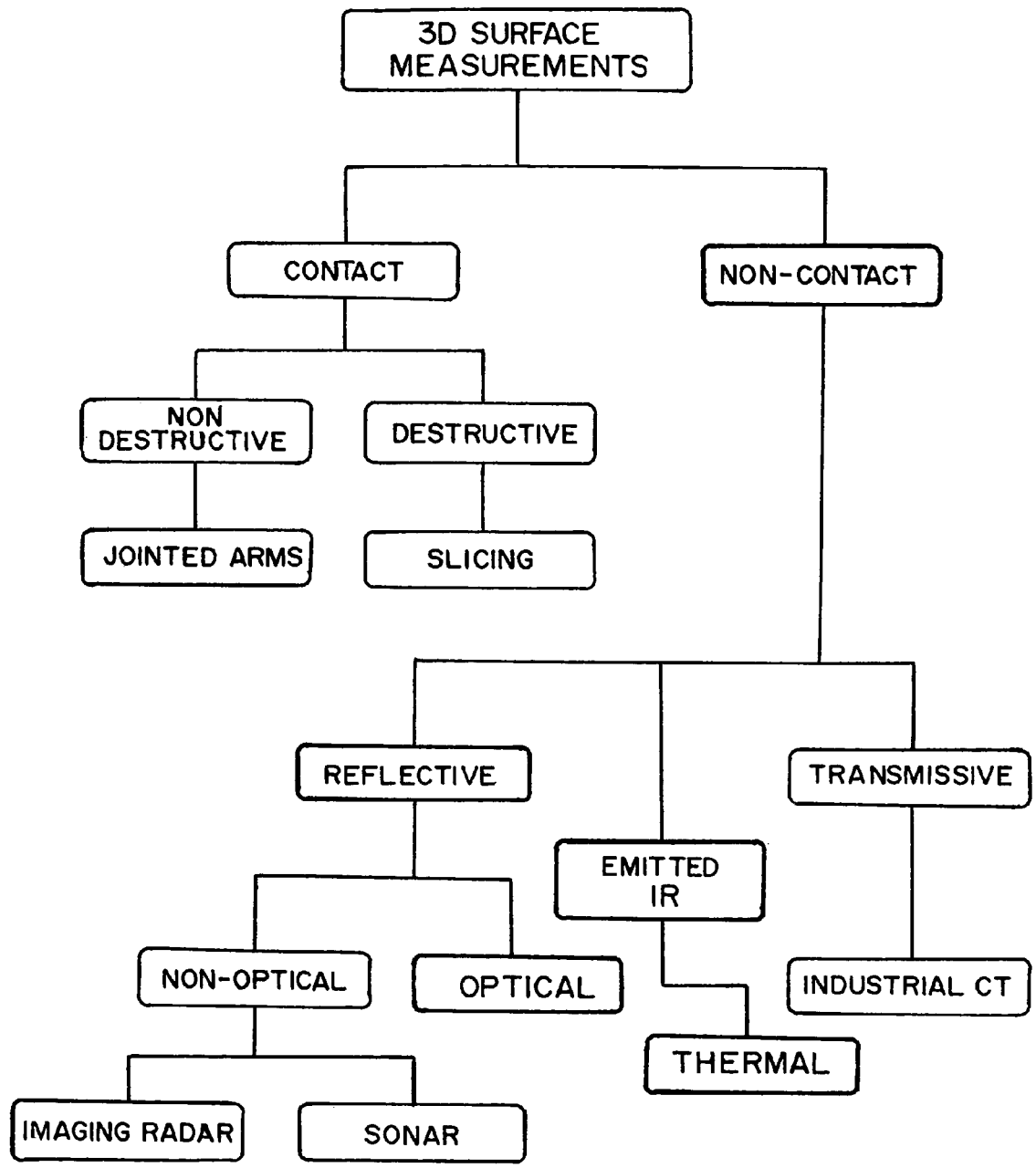
FIG. I-I a  2D VIEW b  3D VIEW c  3D VIEW

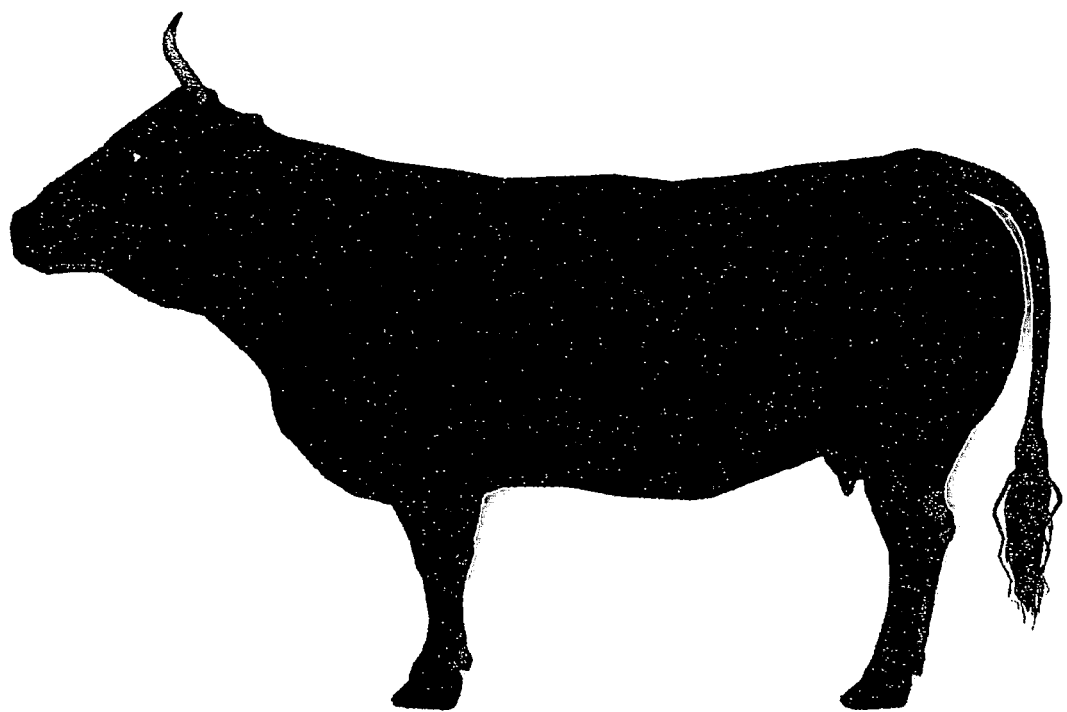
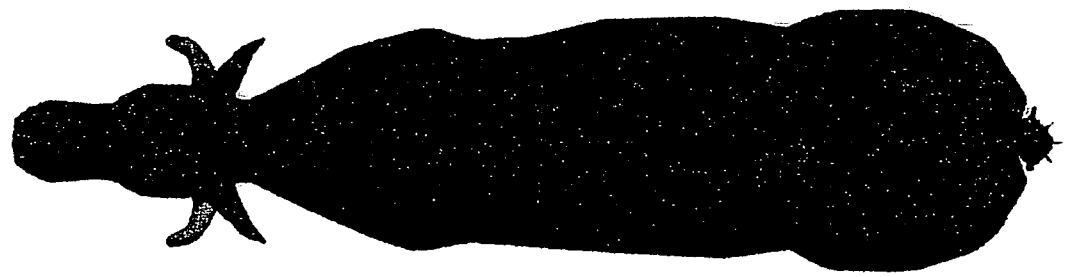
FIG. 2-6B

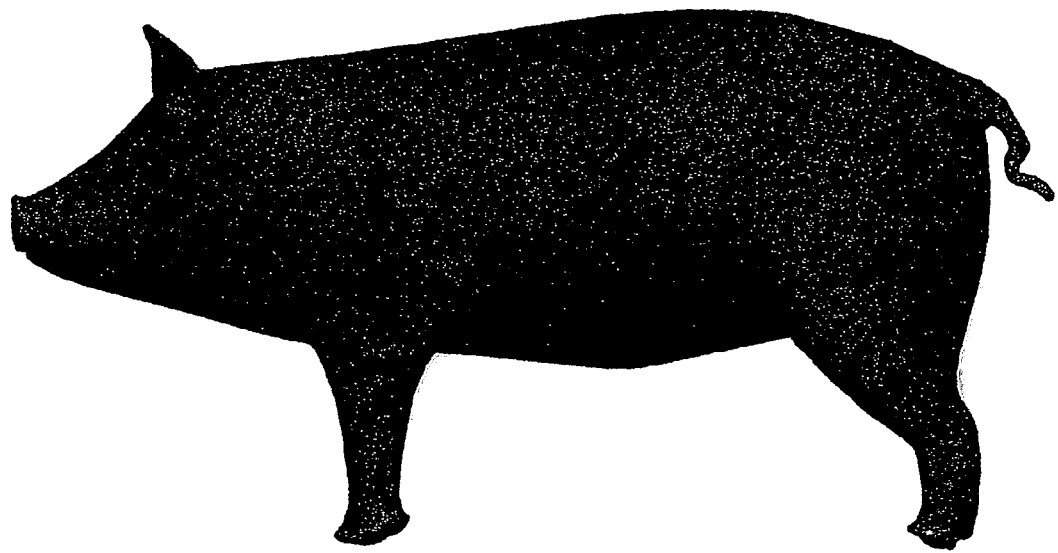
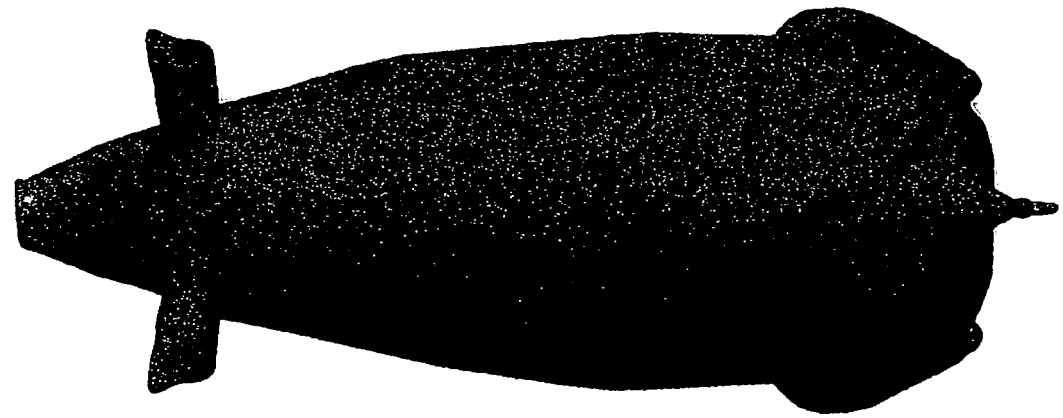
FIG. 2-6C

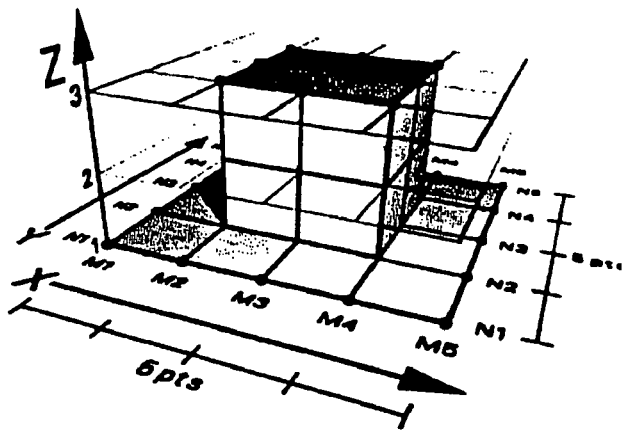
a) Simple target block within an X, Y, Z coordinate system.
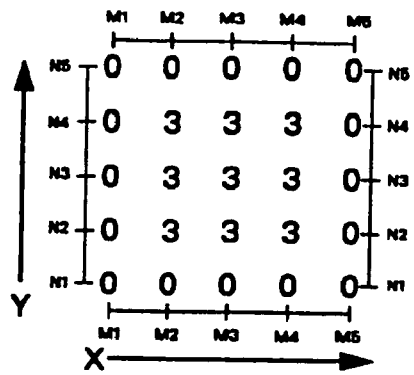
b) Range image matrix where N rows represent y positions and M columns represent X positions and values represent Z.
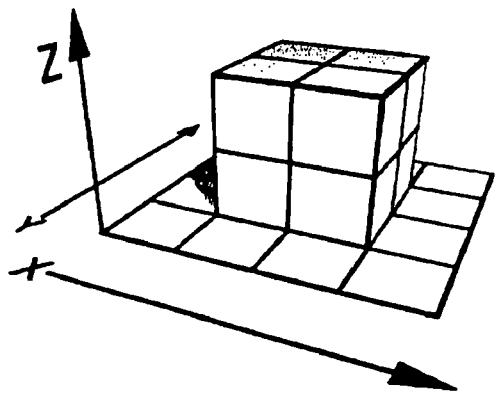
c) Mesh surface representing 3D data surface.
FIG. 2-8

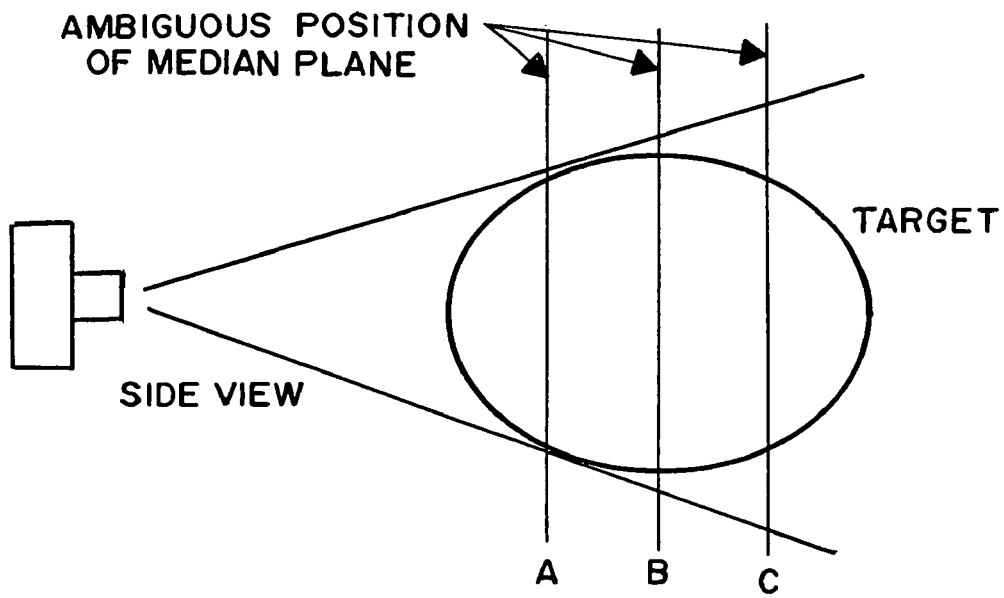
a) The lateral position of the median plane, used as the plane of symmetry, cannot be accurately established from only a side view camera. The target surface at the plane position is either out of view or it is nearly parallel to the camera axis.
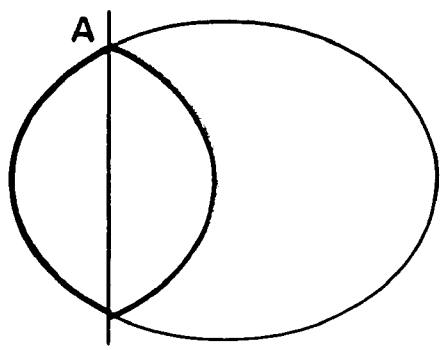
b) Cross section of volume generated with the assumption of the median plane at position A
FIG. 2-11A

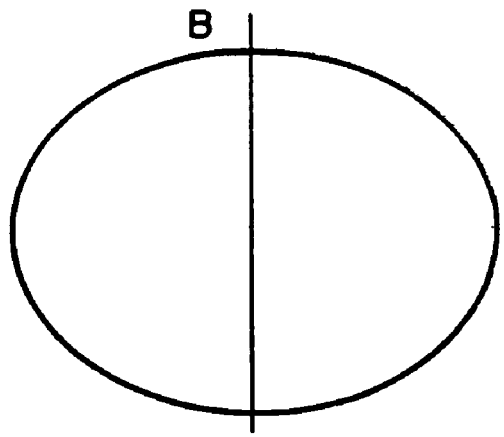
c) Cross section of volume generated with the assumption of the median plane at position B
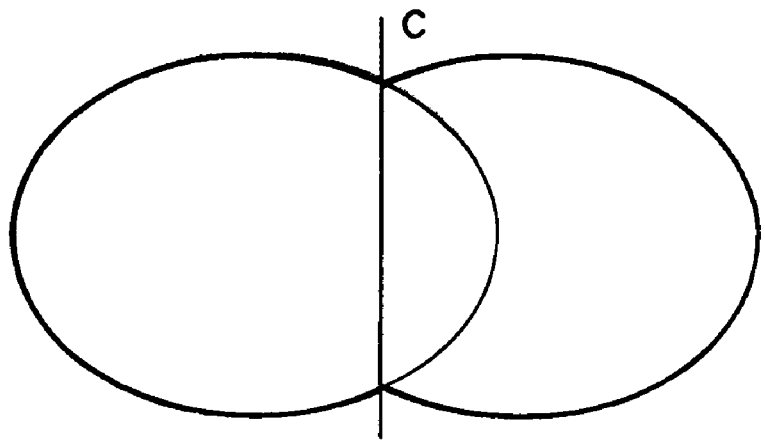
d) Cross section of volume generated with the assumption of the median plane at position C
FIG. 2-11B

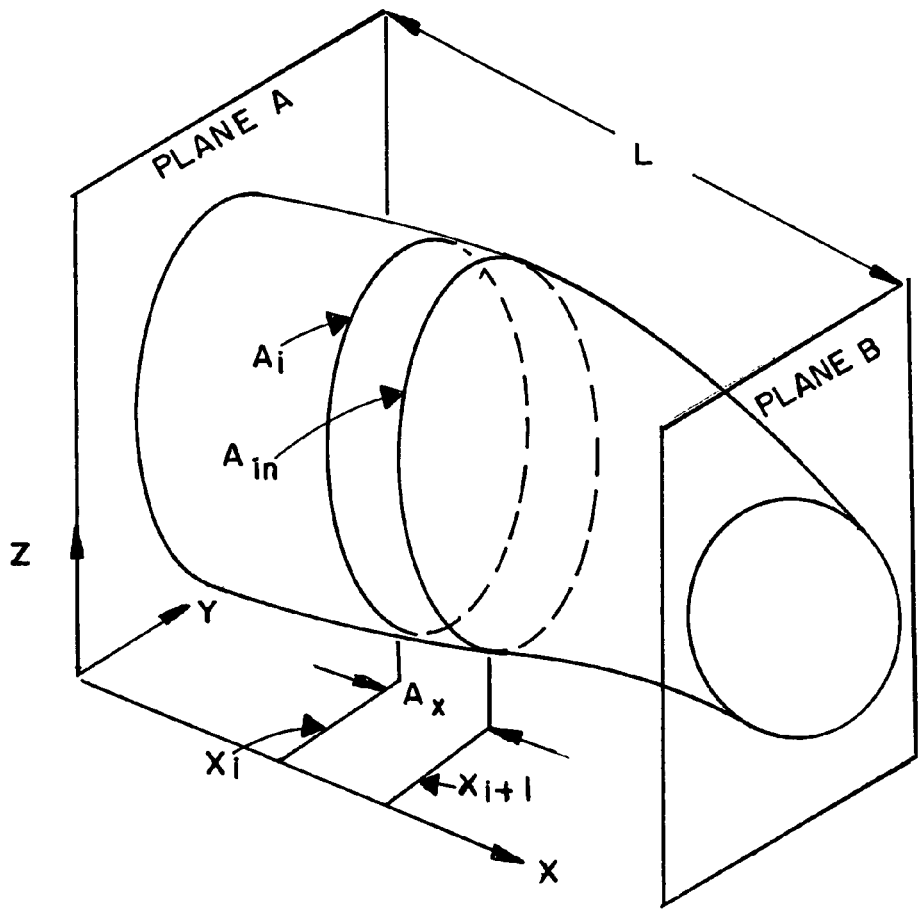
a) COORDINATES FOR VOLUMETRIC CALCULATIONS
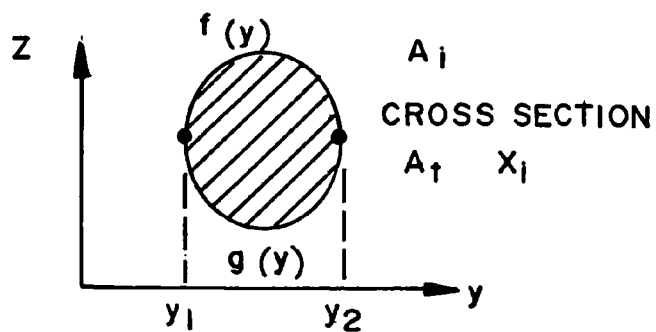
b) COORDINATES FOR CROSS SECTIONAL AREA CALCULATIONS
FIG. 2-26

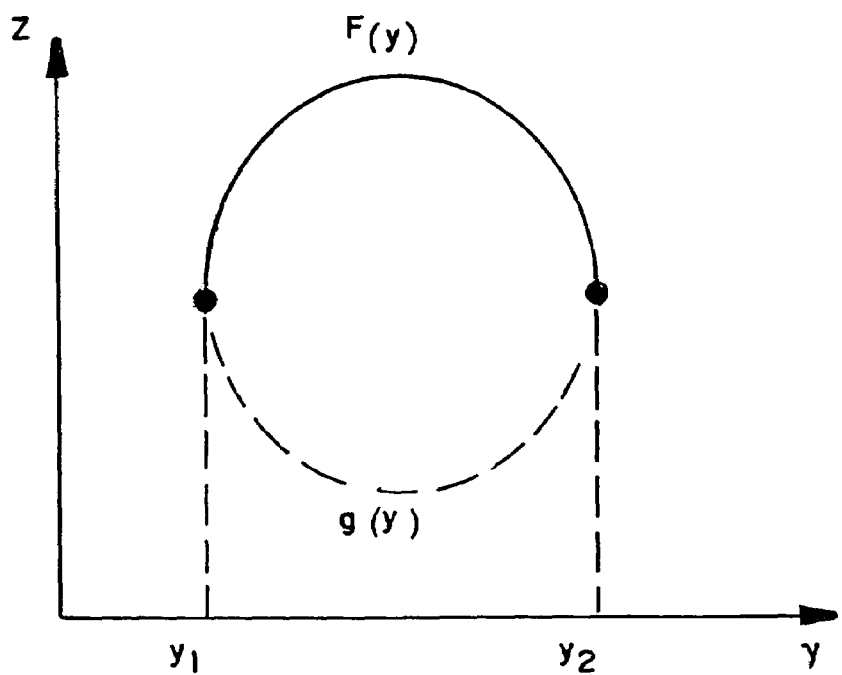
c) CROSS SECTION OF ANIMAL TORSO
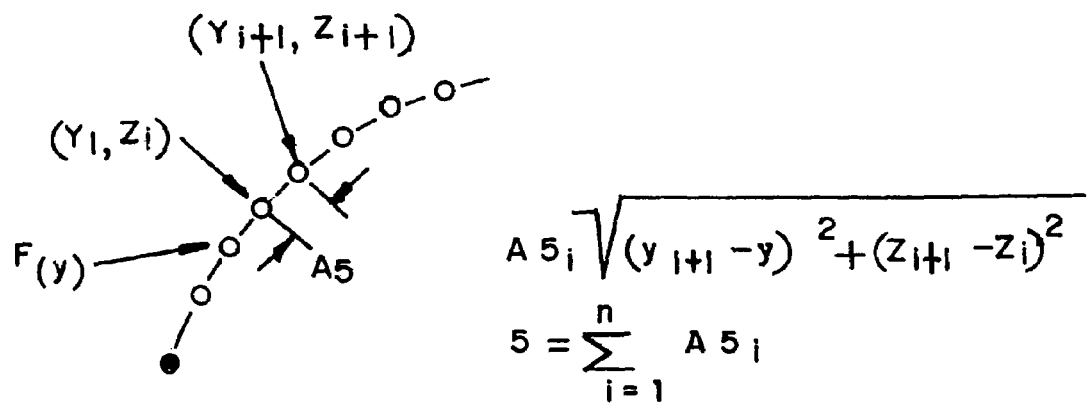
FIG. 2-27

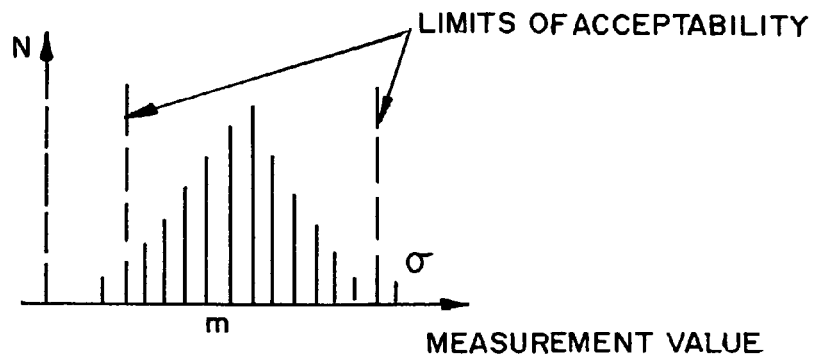
a) BASIC HISTOGRAM
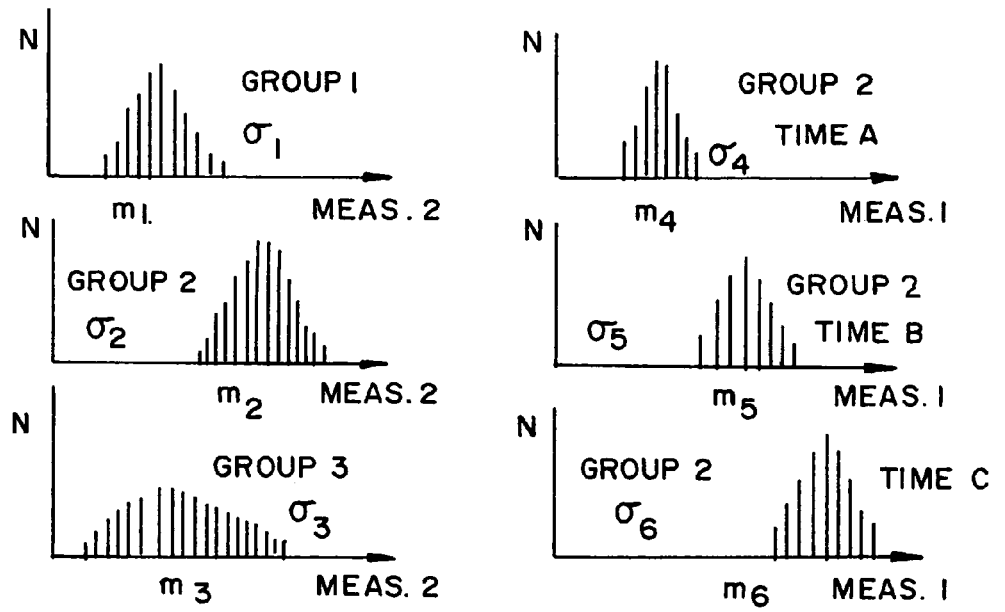
b) A SERIES OF HISTOGRAMS COMPARING DIFFERENT GROUPS.
c) A SERIES OF HISTOGRAMS OF THE SAME ANIMAL GROUP OBTAINED AT DIFFERENT TIMES
FIG. 2-29

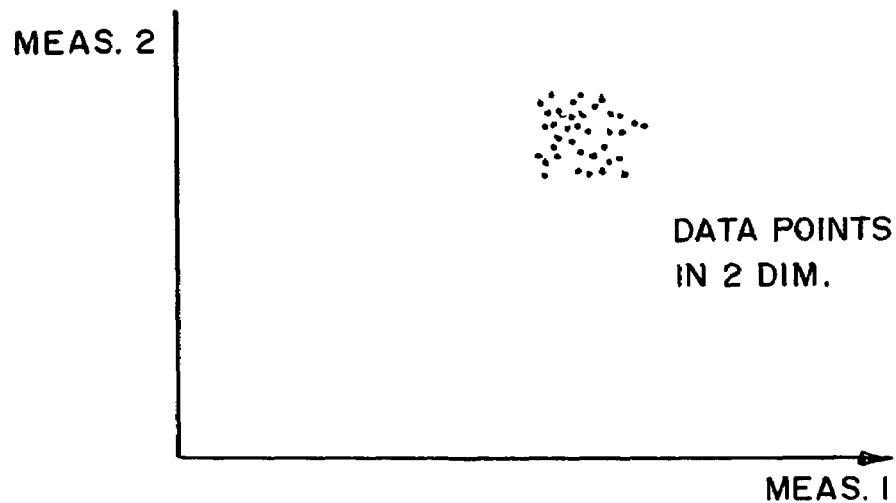
a) CLUSTER GRAPH FOR THREE MEASUREMENT TYPES. (N=2)
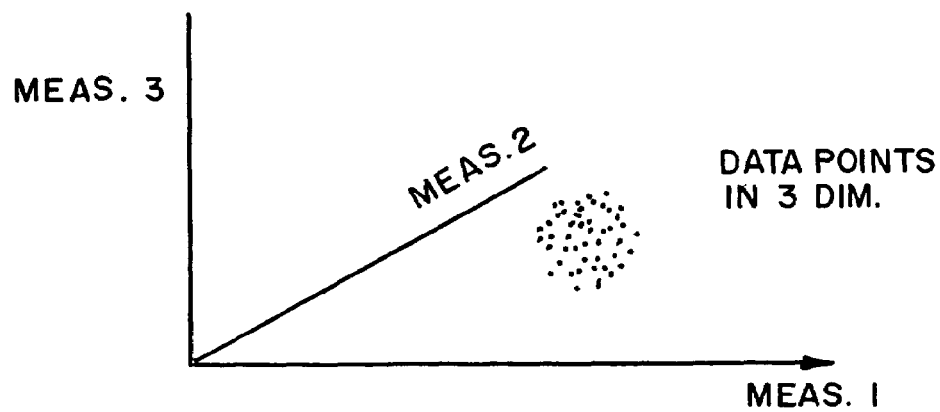
b) CLUSTER GRAPHS FOR THREE MEASUREMENT TYPES (N=3)
FIG. 2-30

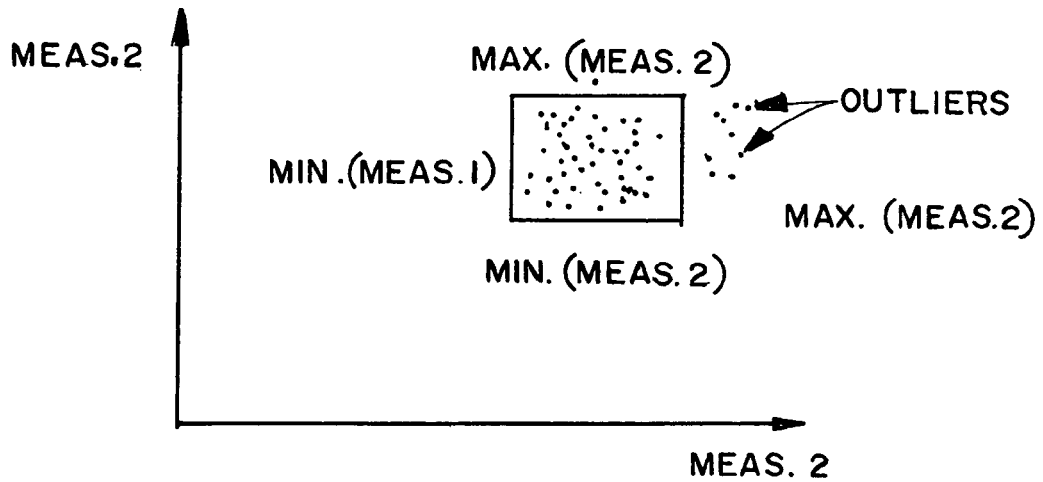
a) TWO MEASUREMENT CLUSTER DIAGRAM WITH BOUNDRRY LIMITS TO IDENTIFY OUTLIERS.
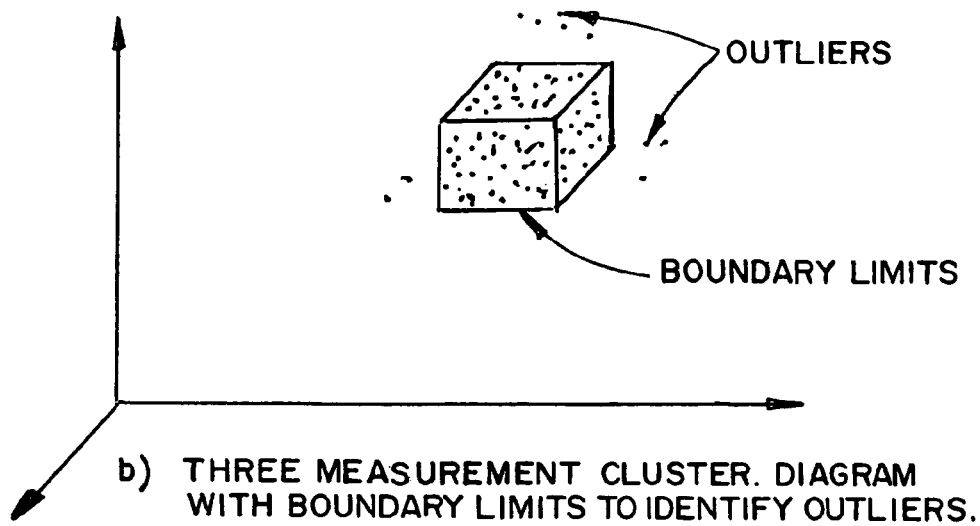
b) THREE MEASUREMENT CLUSTER. DIAGRAM WITH BOUNDARY LIMITS TO IDENTIFY OUTLIERS.
FIG. 2-31

Histograms representing livestock measurements. Limits are shown excluding extreme values.

Cluster plots representing livestock measurements Limits are shown which may identify animals with extreme measurements for special treatment.

CLUSTER ANALYSIS PLOT SHOWING FEEDLOT STRATEGY OF HOLDING BACK THOSE ANIMALS WITH SUBTHRESHOLD MEASUREMENTS AND ADVANCING THOSE ANIMALS WITH SUPERTHRESHOLD MEASUREMENTS.

Cluster plots of group data at several times during the stay at a feedlot.

Cluster plots of group data at several times during the stay at a feedlot.

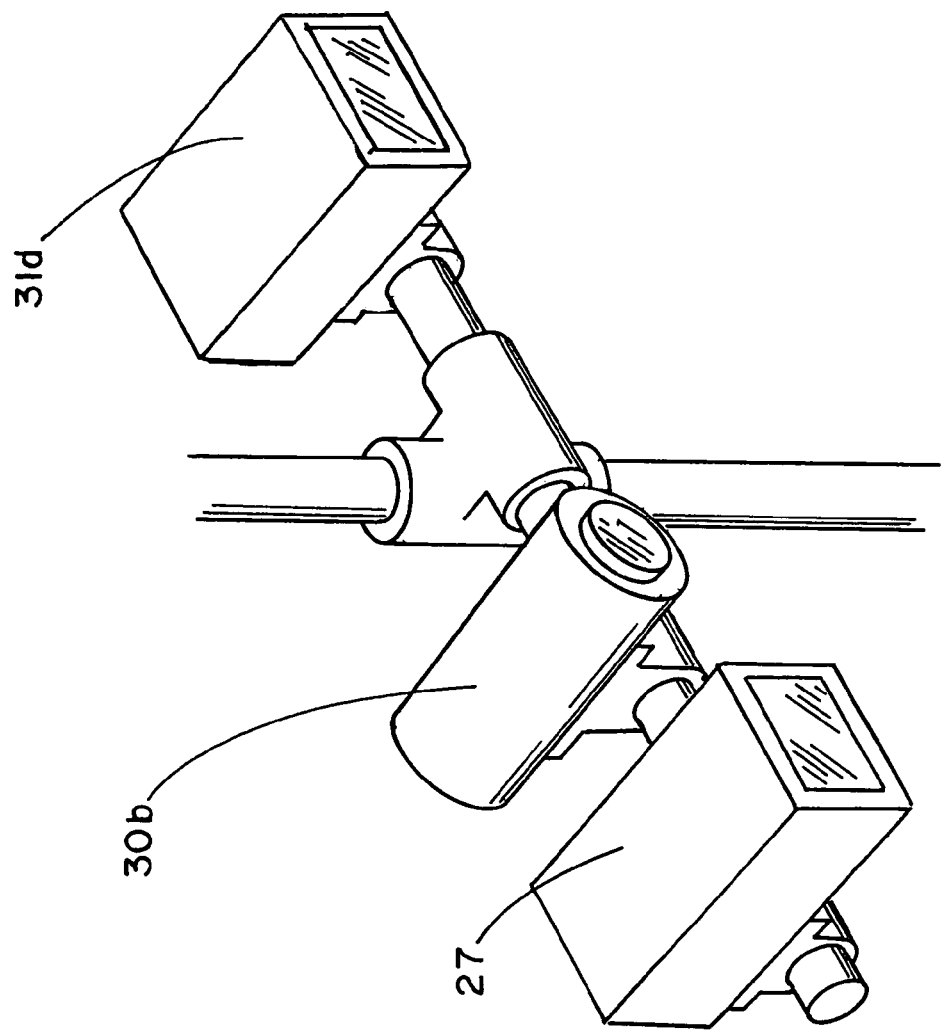
FIG. 3-IC

Projection of the planer thermal image onto a 3D target surface.

CLUSTER ANALYSIS PLOT SHOWING FEEDLOT STRATEGY OF HOLDING BACK THOSE ANIMALS WITH SUBTHRESHOLD MEASUREMENTS & ADVANCING THOSE WITH SUPERTHRESHOLD MEASUREMENTS.

Cluster plots of group data at several times during the stay at a feedlot.

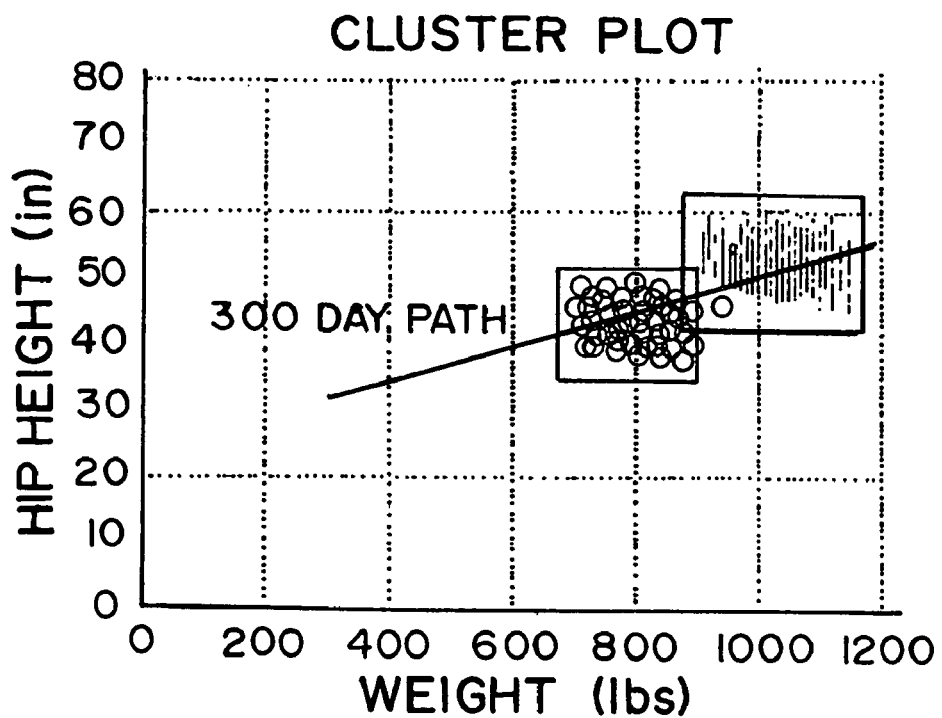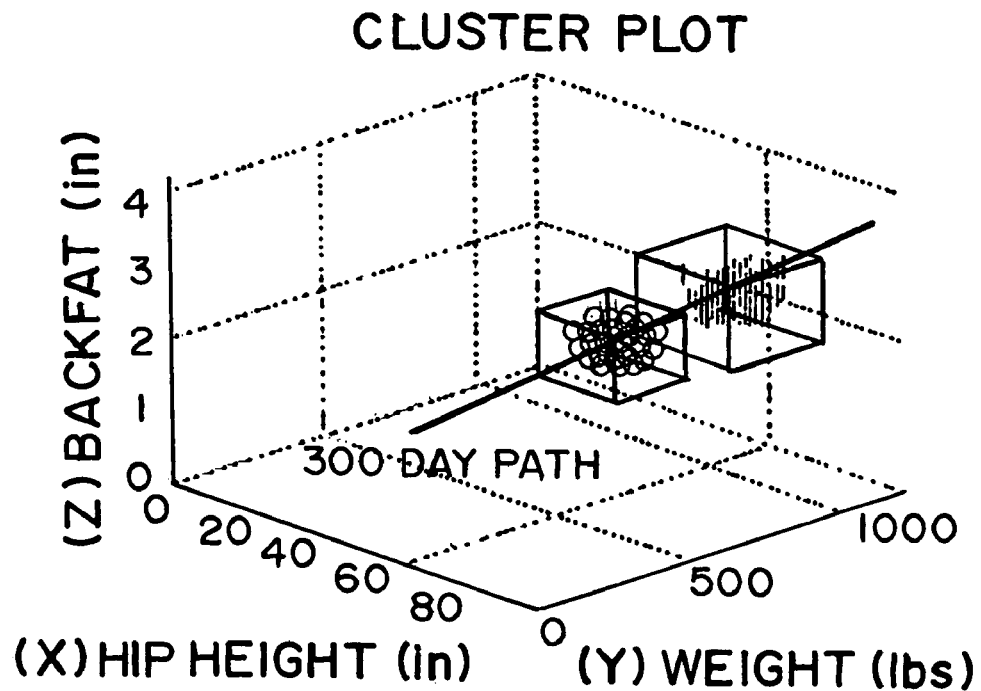
Cluster plots of group data at several times during the stay at a feedlot.
FIG. 3-15B

SLAUGHTER STEERS
U.S. QUALITY GRADES
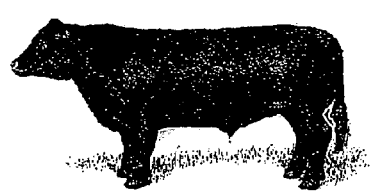 
PRIME
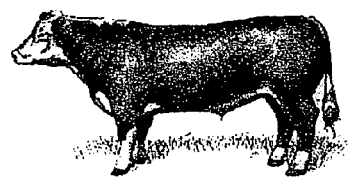 
CHOICE
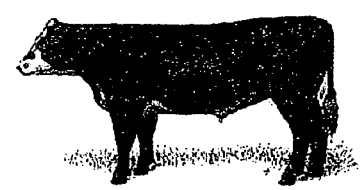 
SELECT
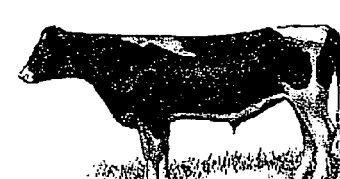 
STANDARD
 
UTILITY
FIG. 3-16

SLAUGHTER STEERS
U.S. YIELD GRADES
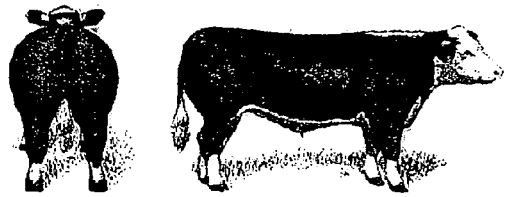
YIELD GRADE 1
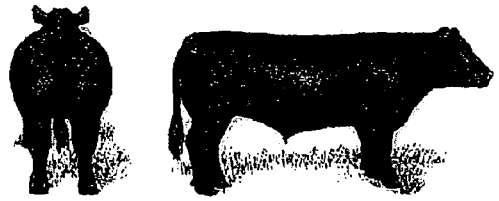
YIELD GRADE 2
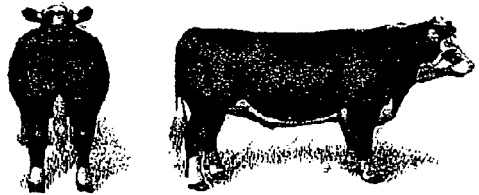
YIELD GRADE 3
YIELD GRADE 4
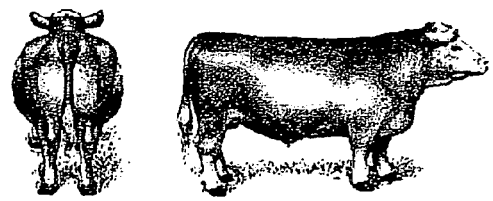
YIELD GRADE 5
FIG. 3-18

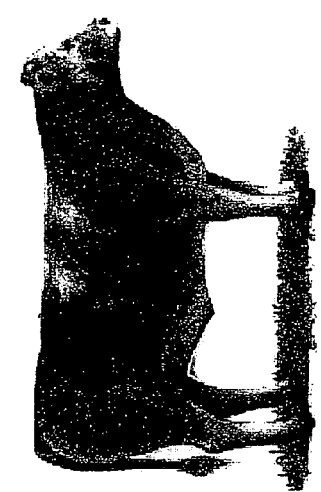
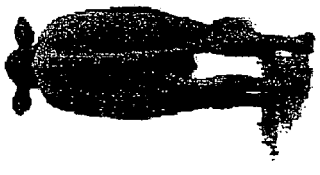
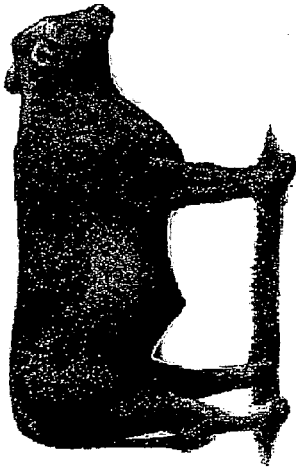
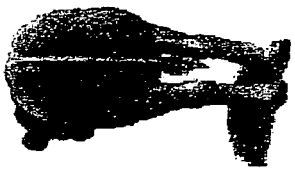
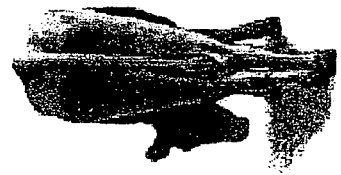
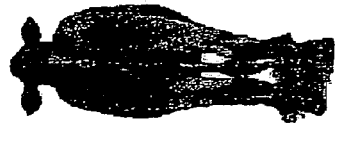
FIG. 3-19

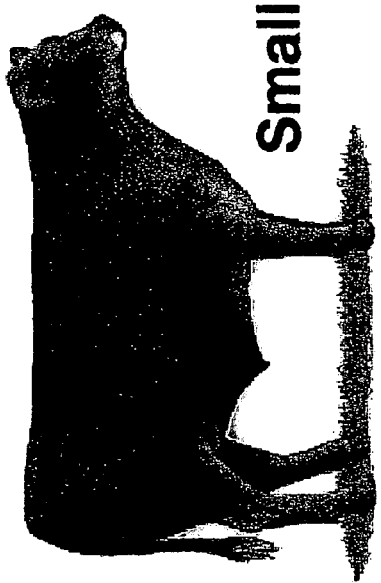
FIG. 3-20

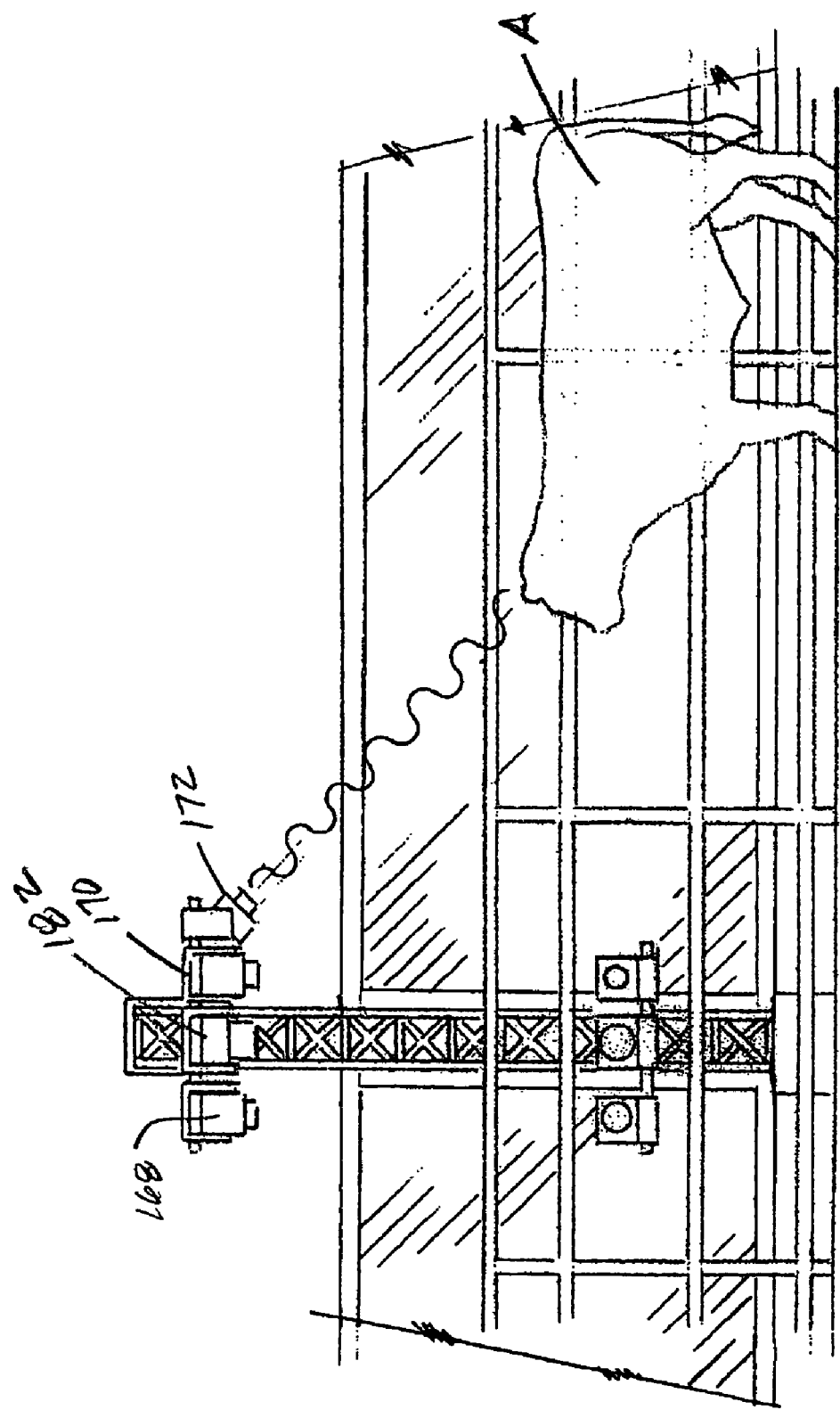
FIG. 4.6

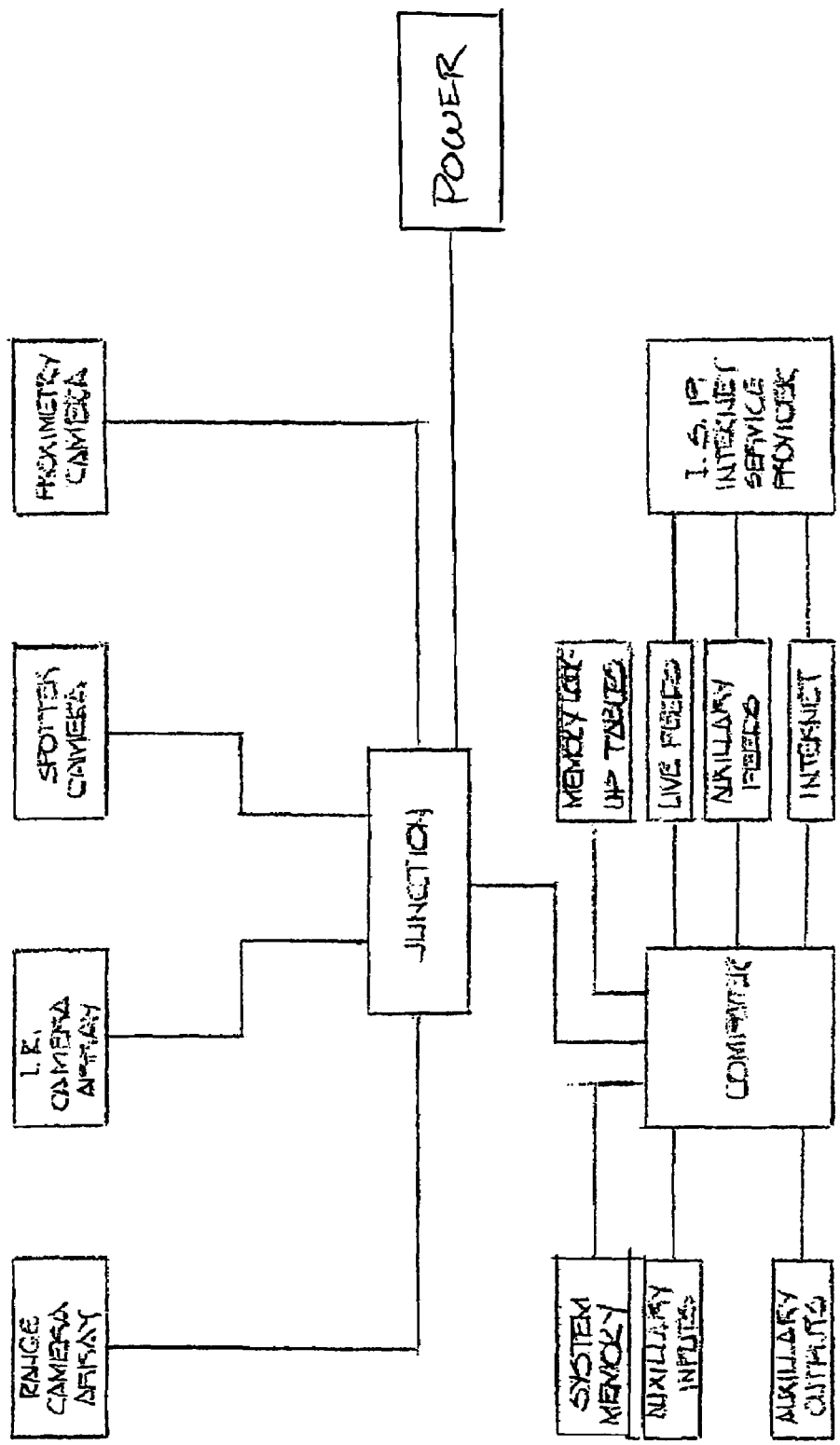

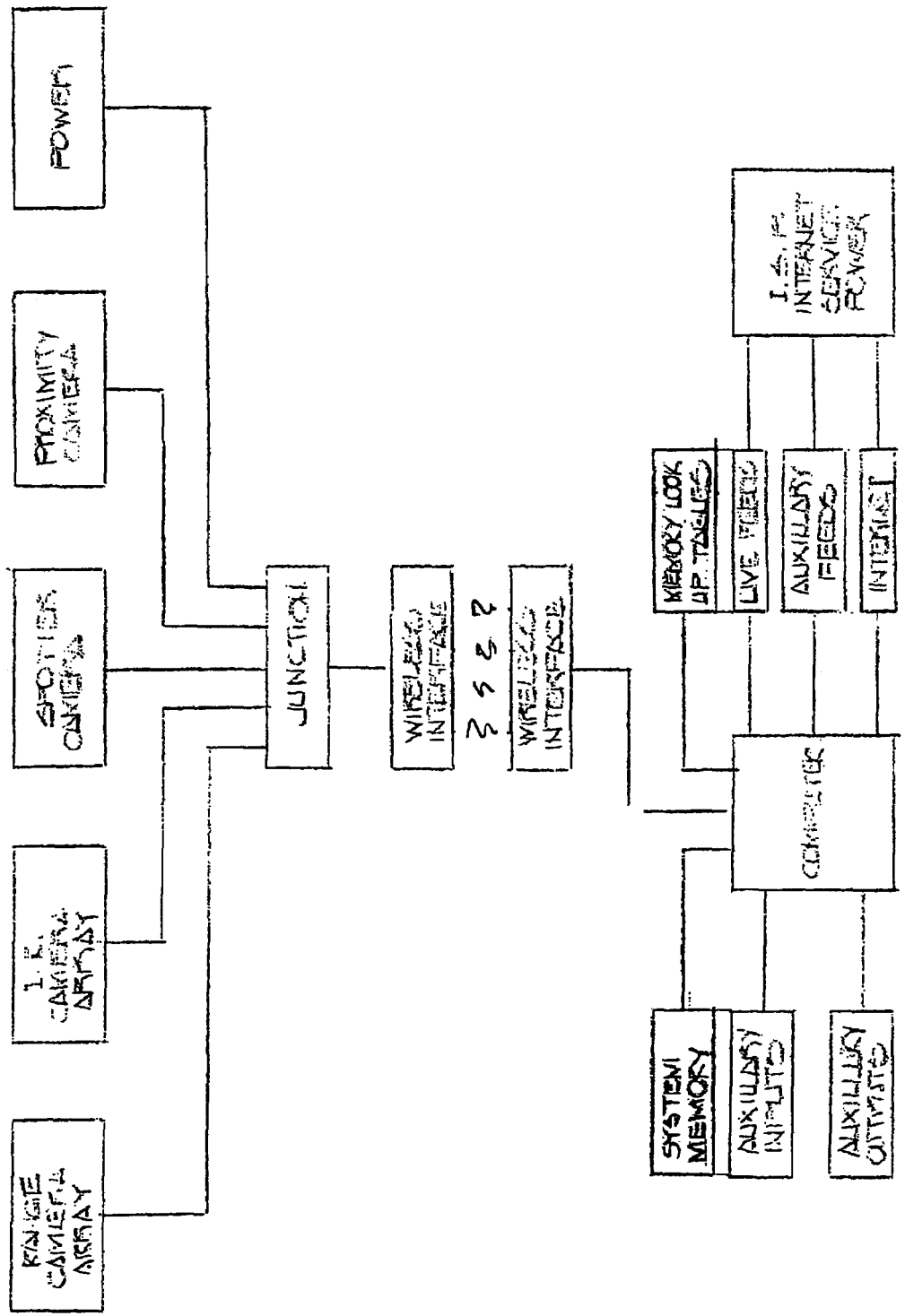

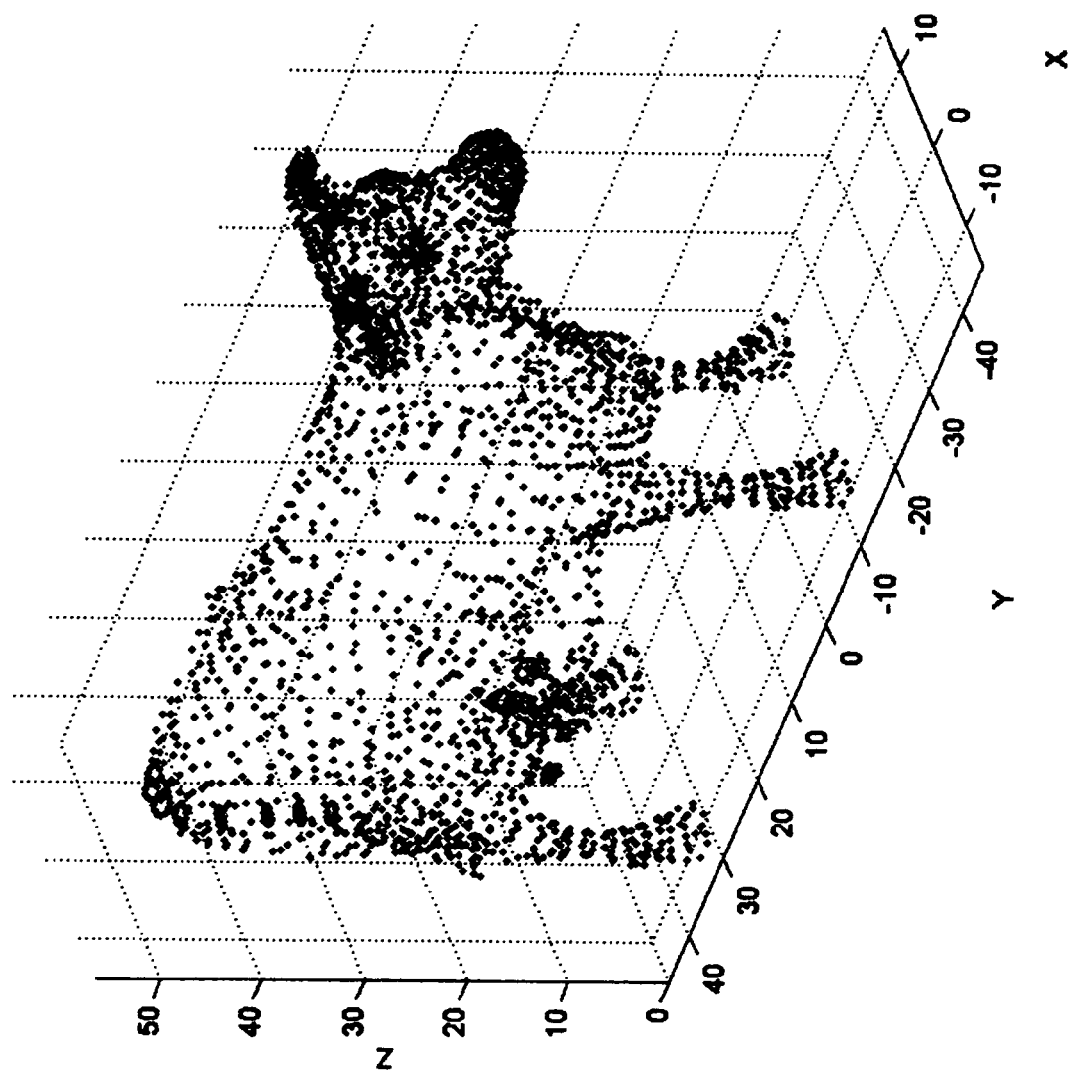
FIG. 4.8

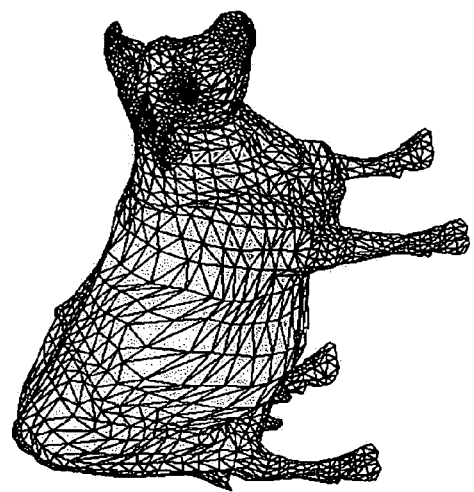
FIG. 4-9B
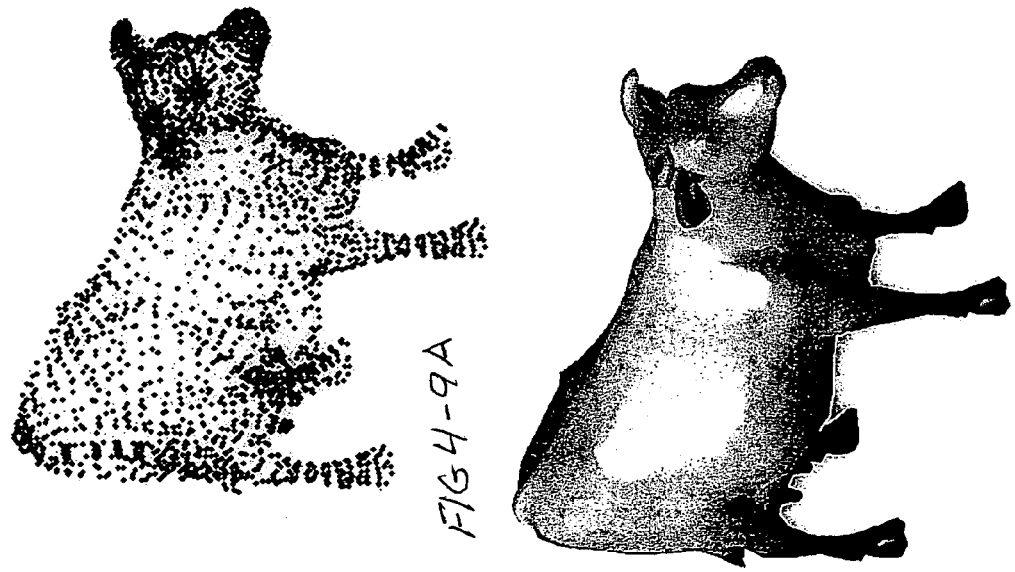
FIG. 4-9A
FIG. 4-9C

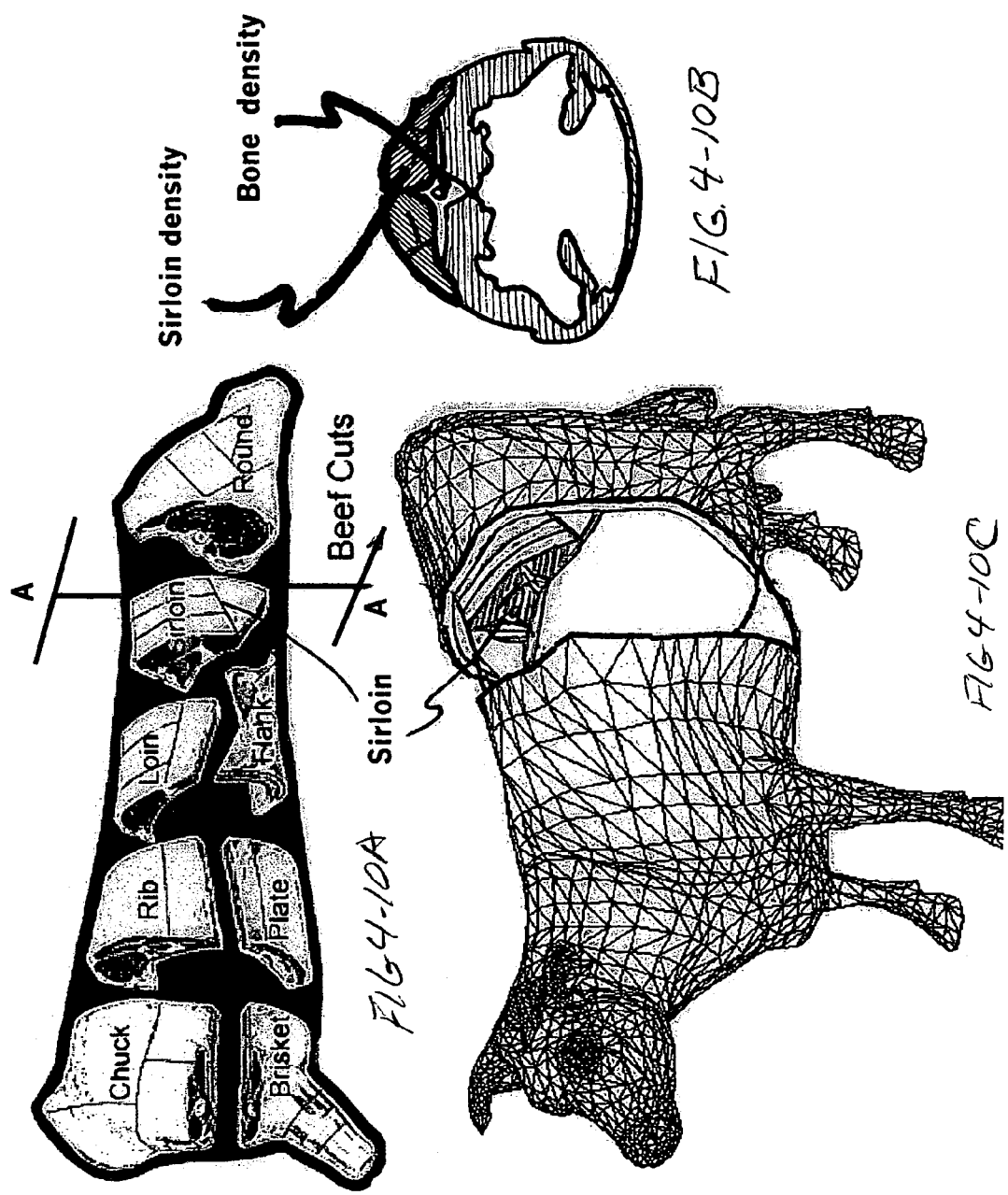

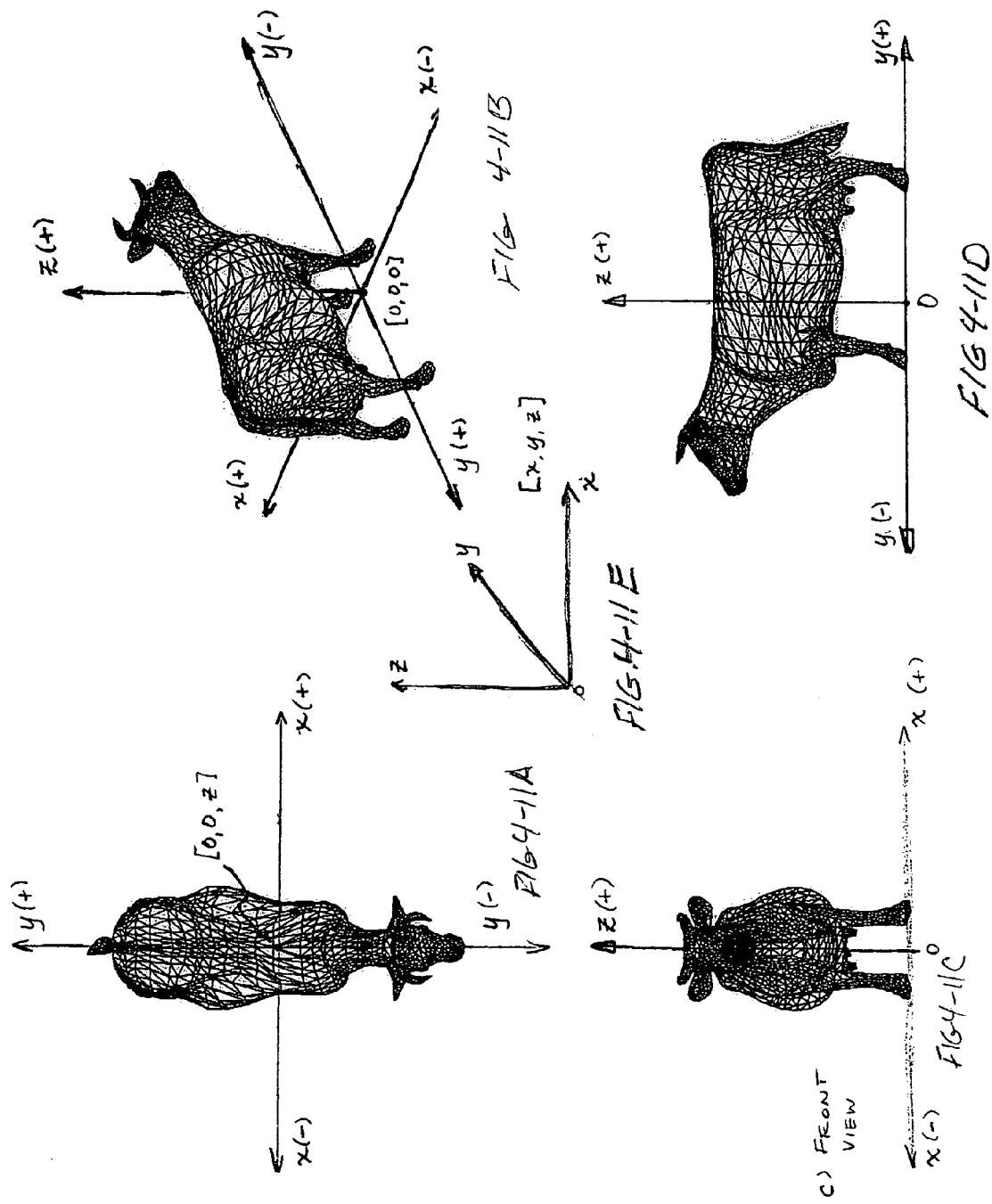

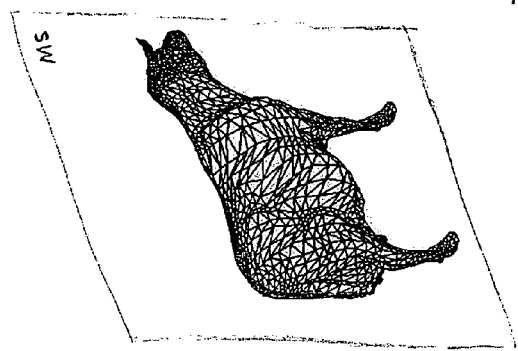
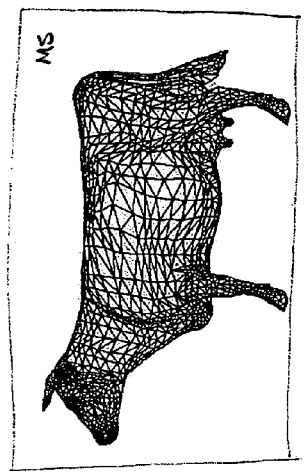
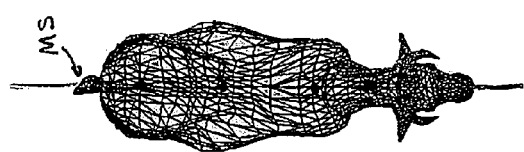
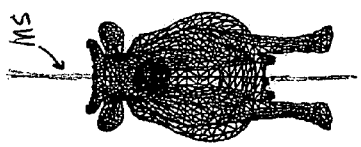
FIG. 4-12A
FIG. 4-12B
FIG. 4-12C
FIG. 4-12D

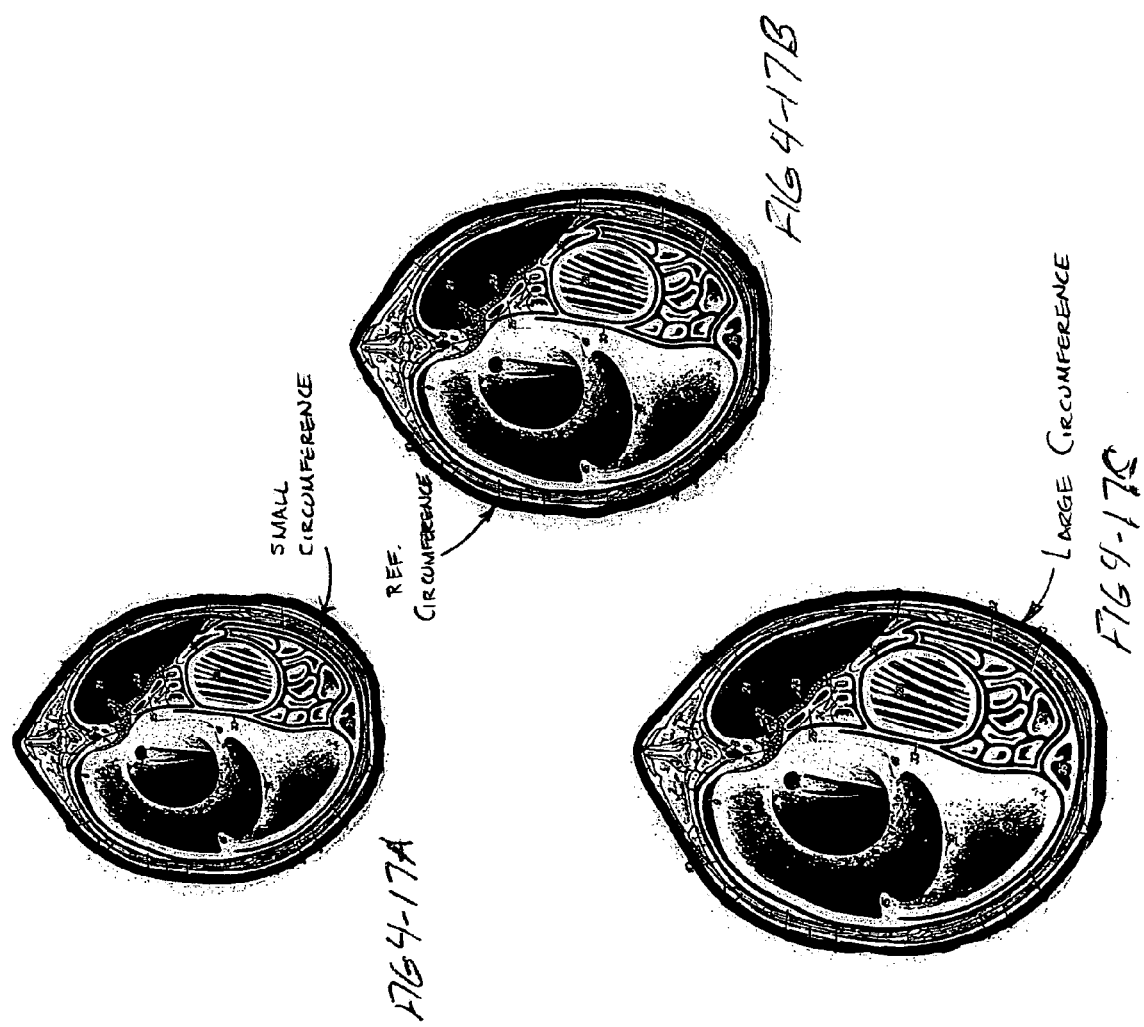

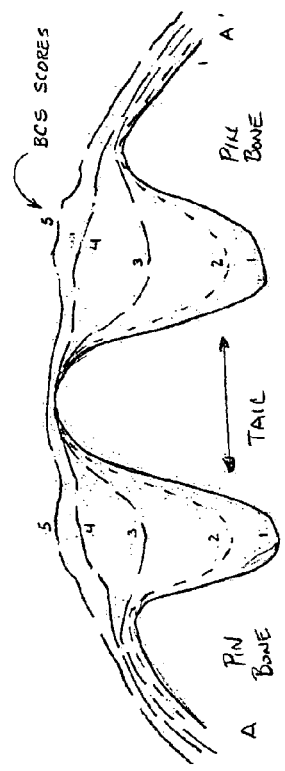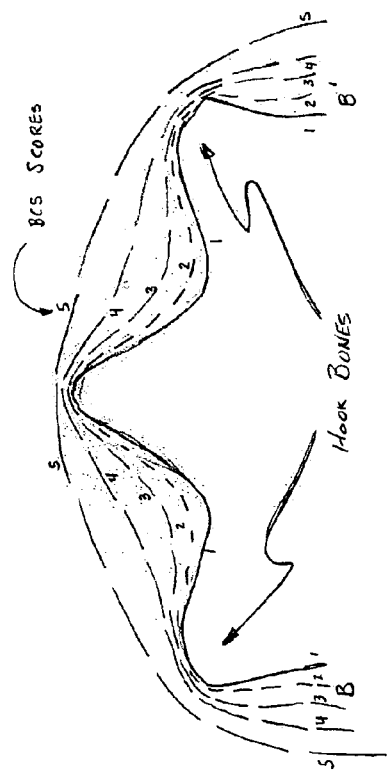

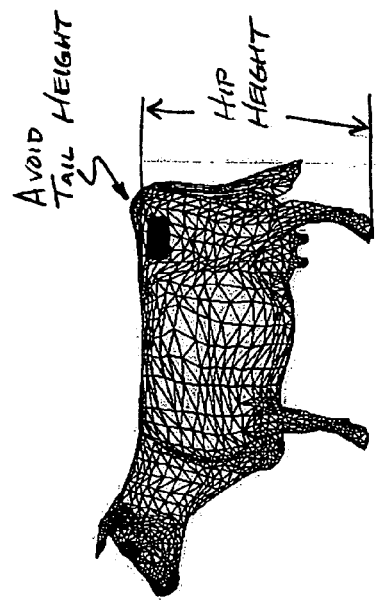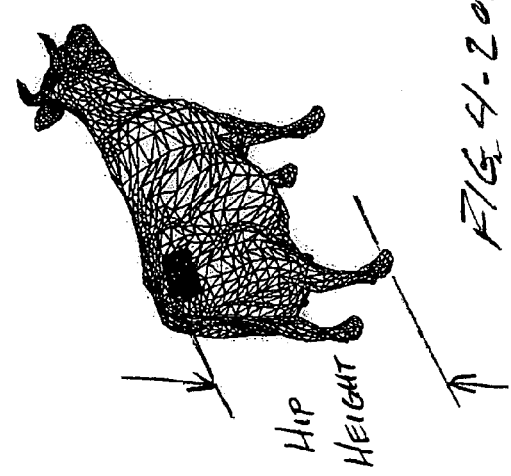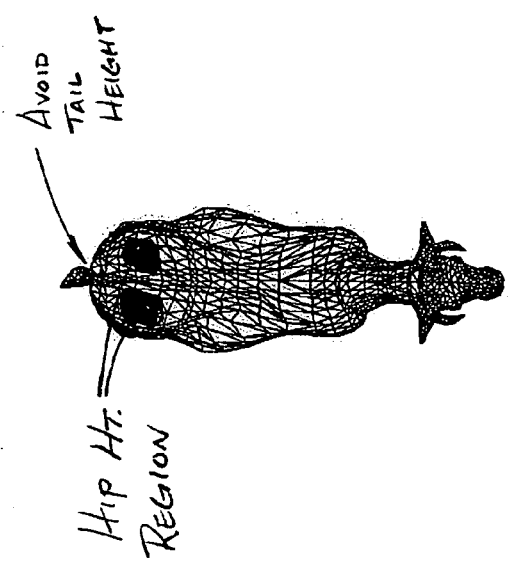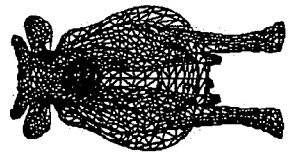
FIG. 4-20A
FIG. 4-20B
FIG. 4-20C
FIG. 4-20D

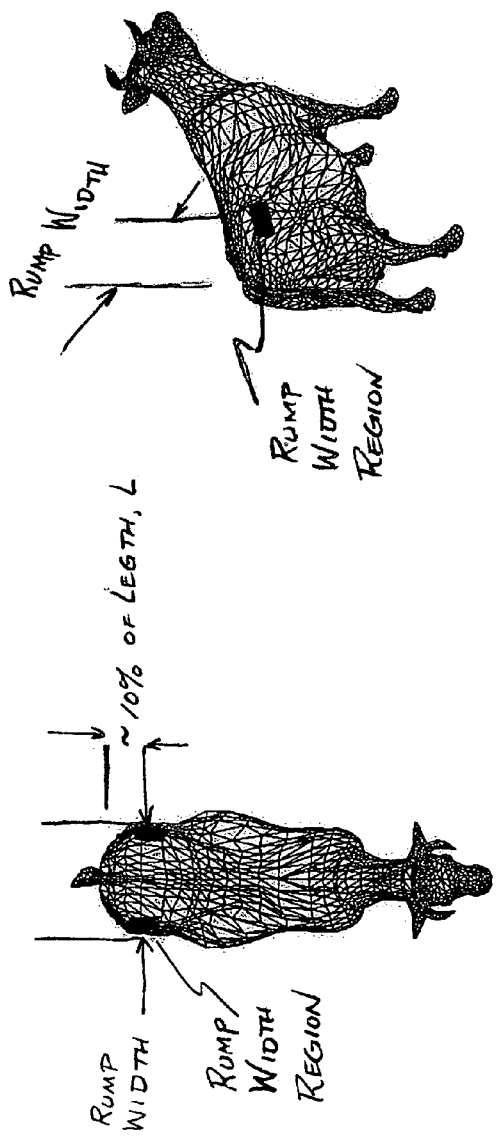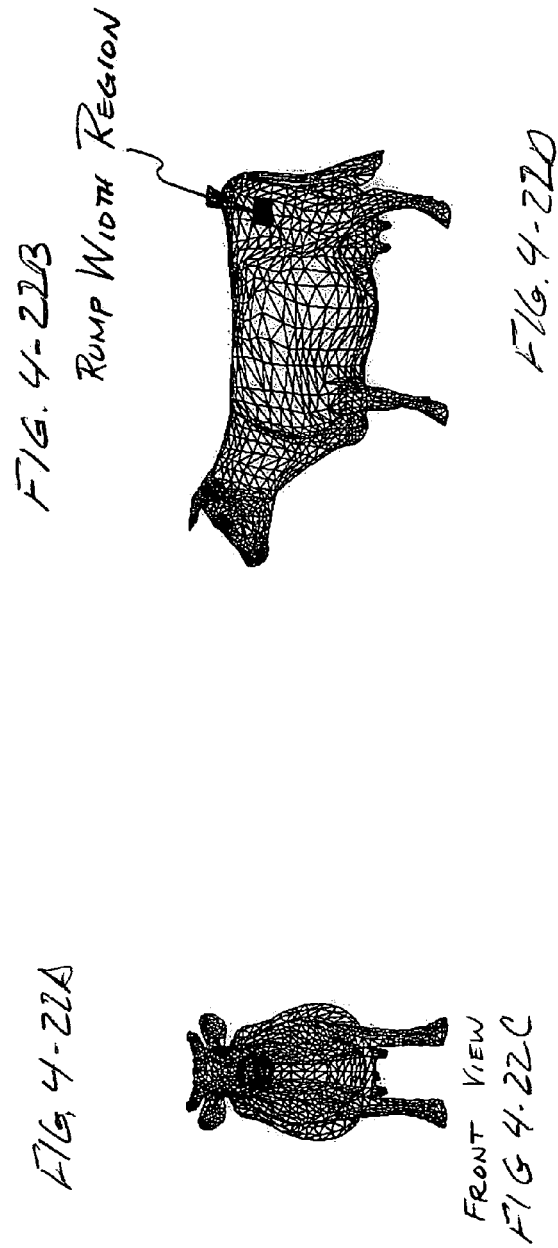

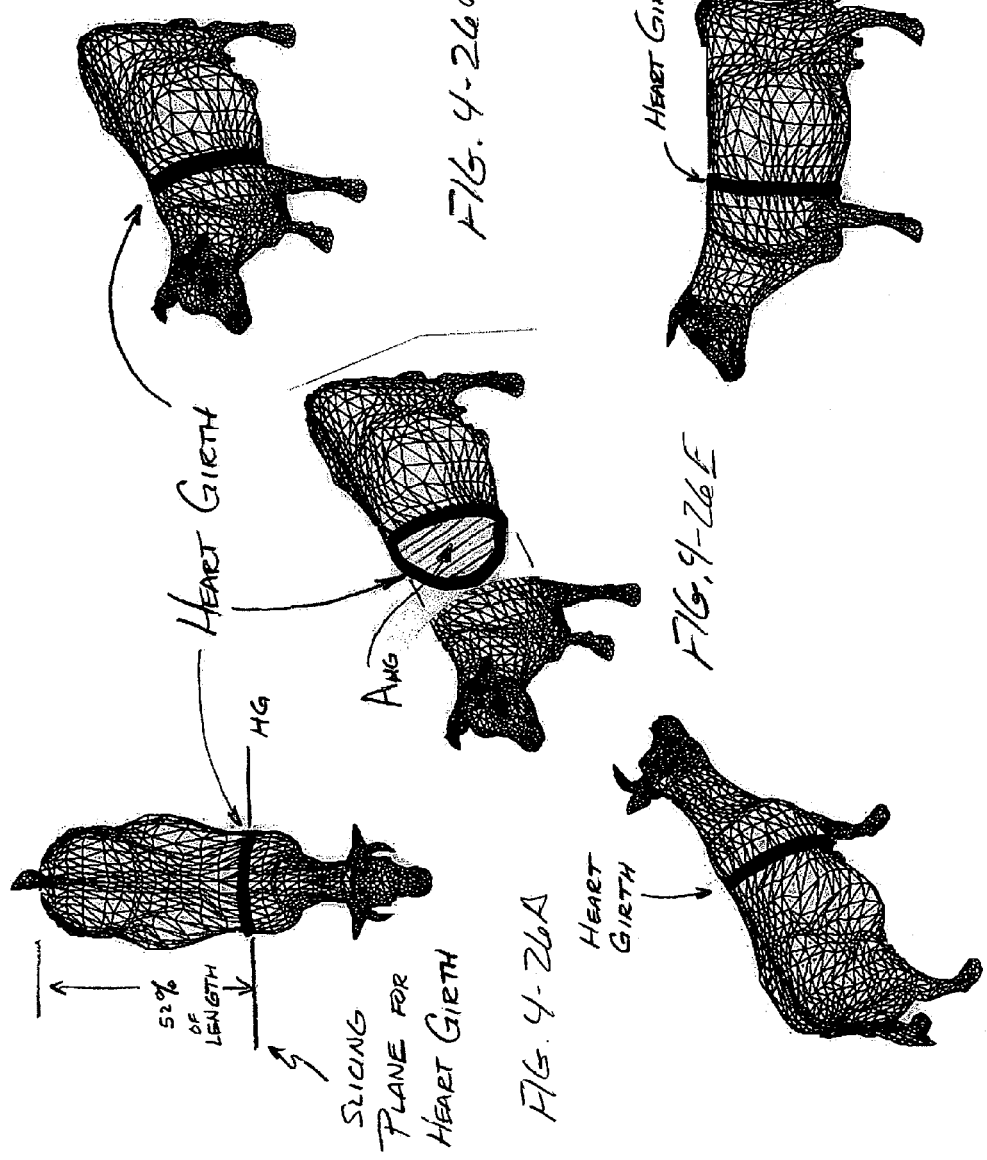

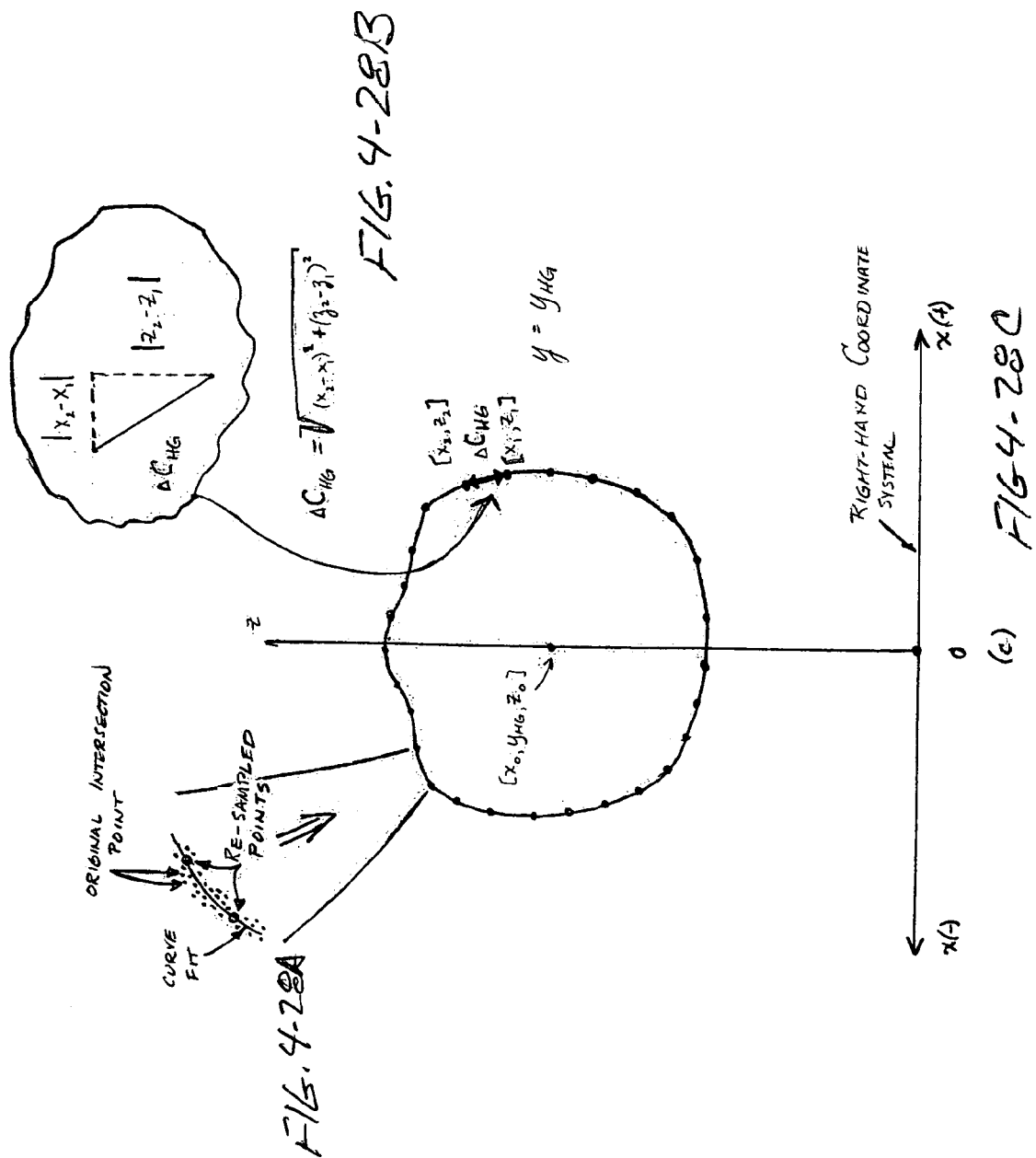

$A_{RIBEYE} = k_{BCS} \cdot A_{REF}$
$k_{BCS} > 1.0$ $A_{RIBEYE} = k_{BCS} \cdot A_{REF}$
$k_{BCS} = 1.0$ $A_{RIBEYE} = k_{BCS} \cdot A_{REF}$
$k_{BCS} < 1.0$

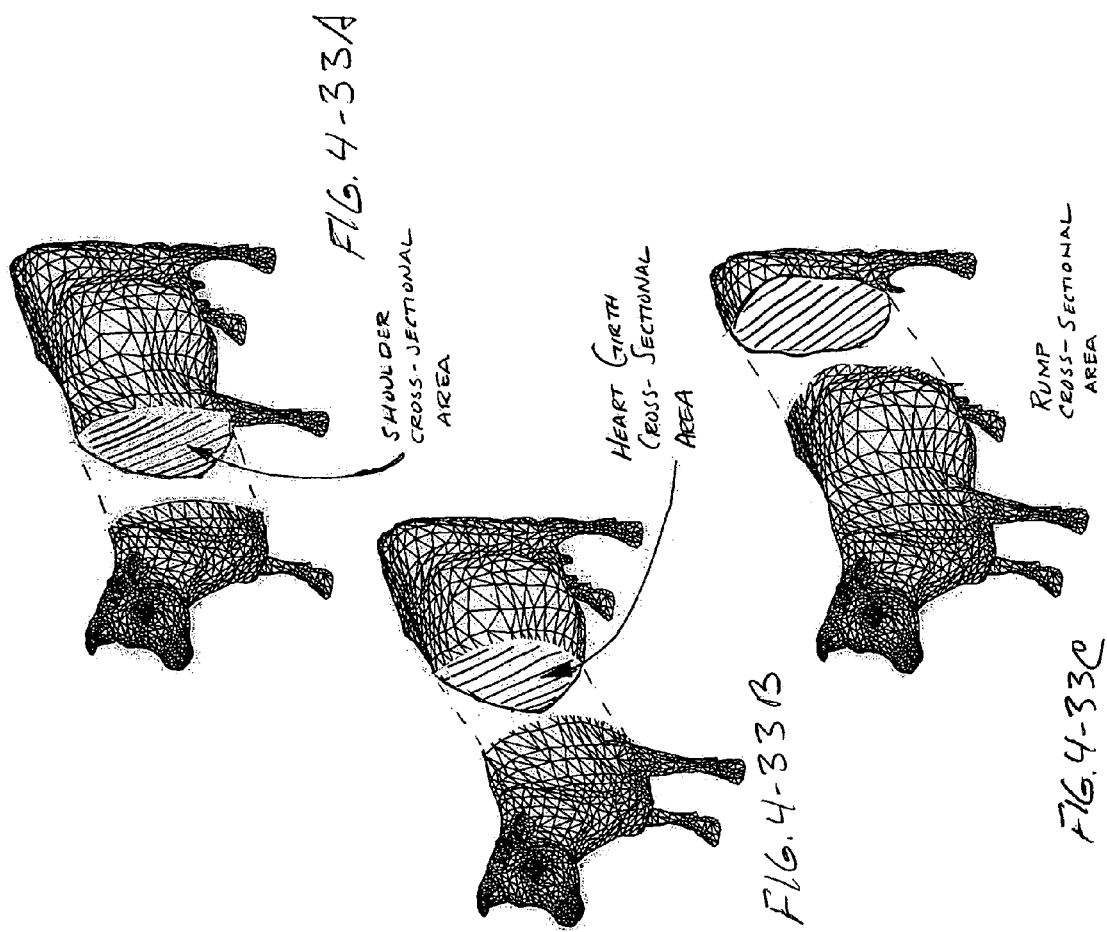

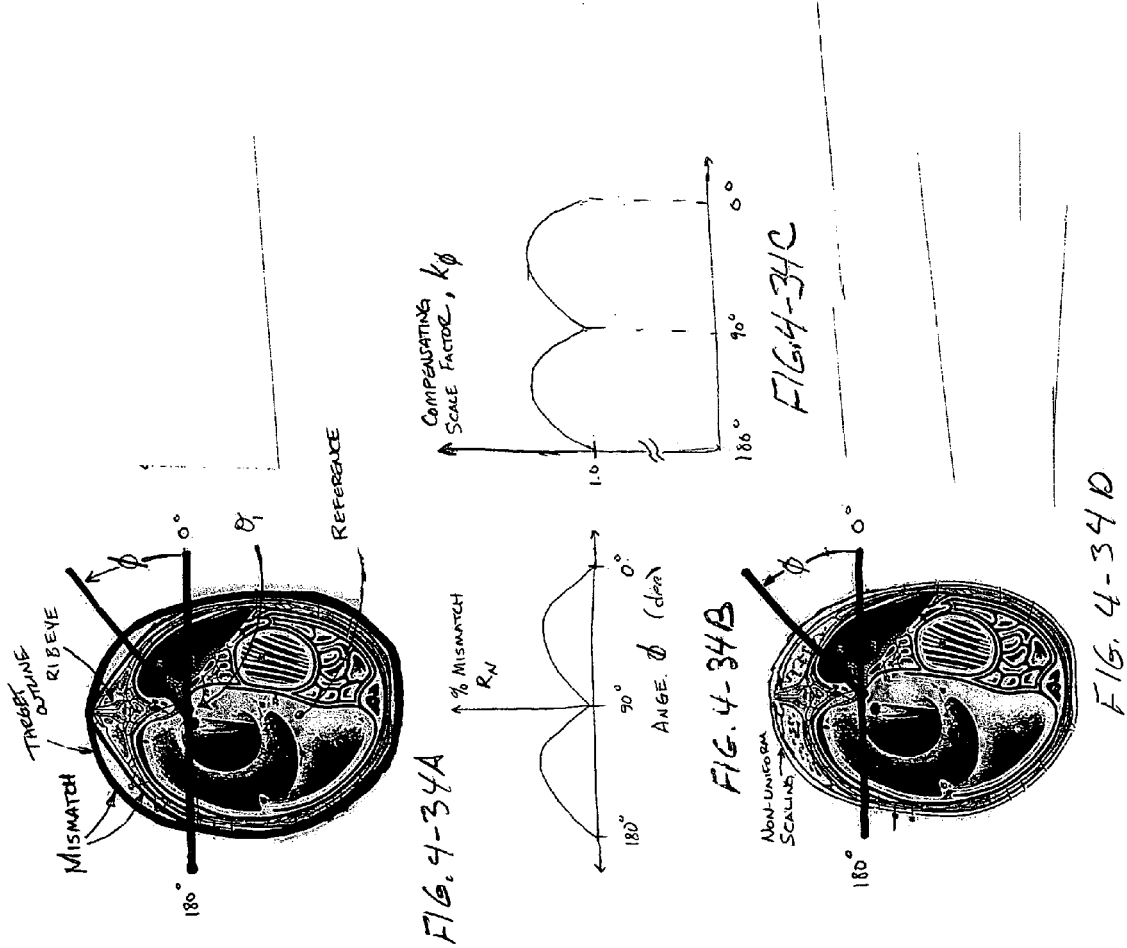

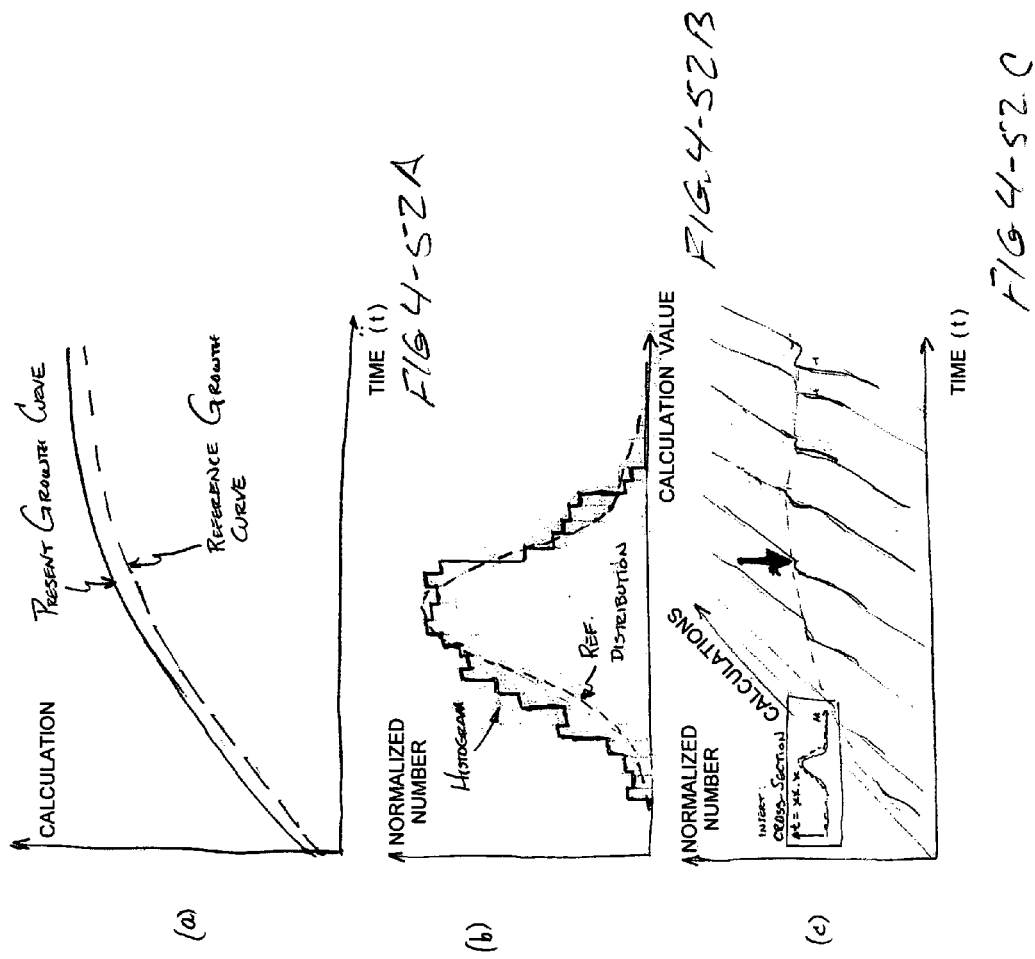

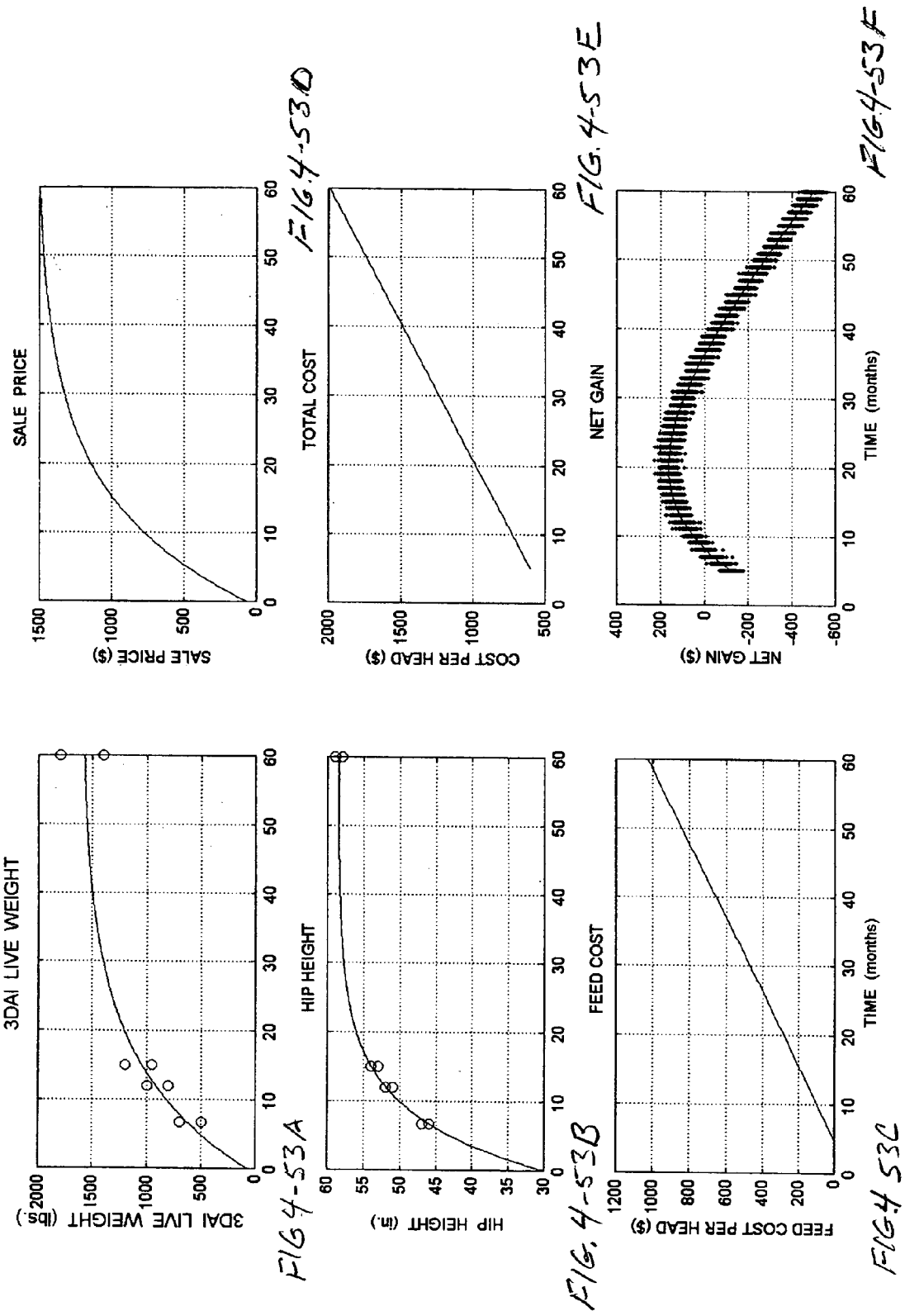

FIG. 4-57A

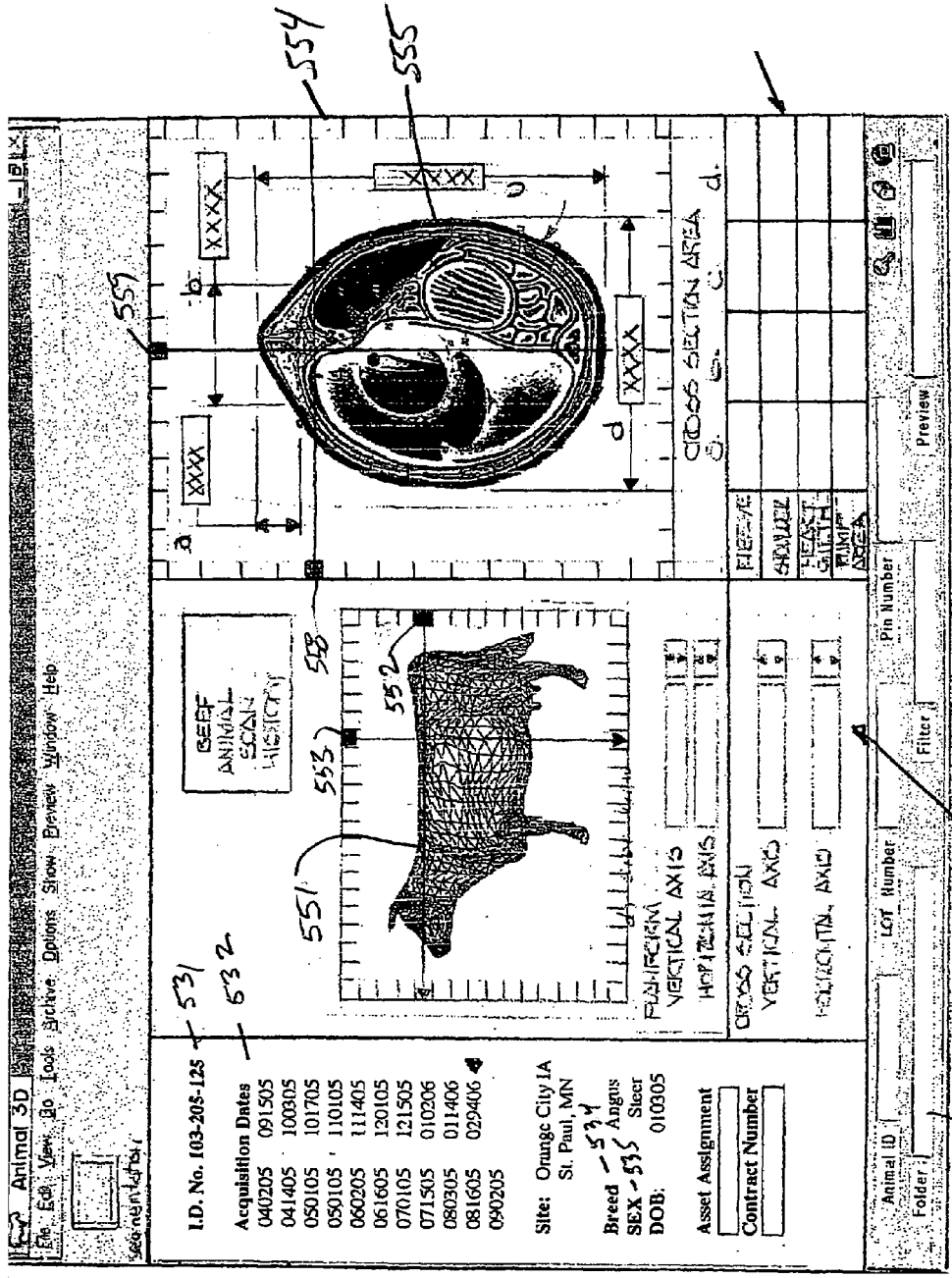

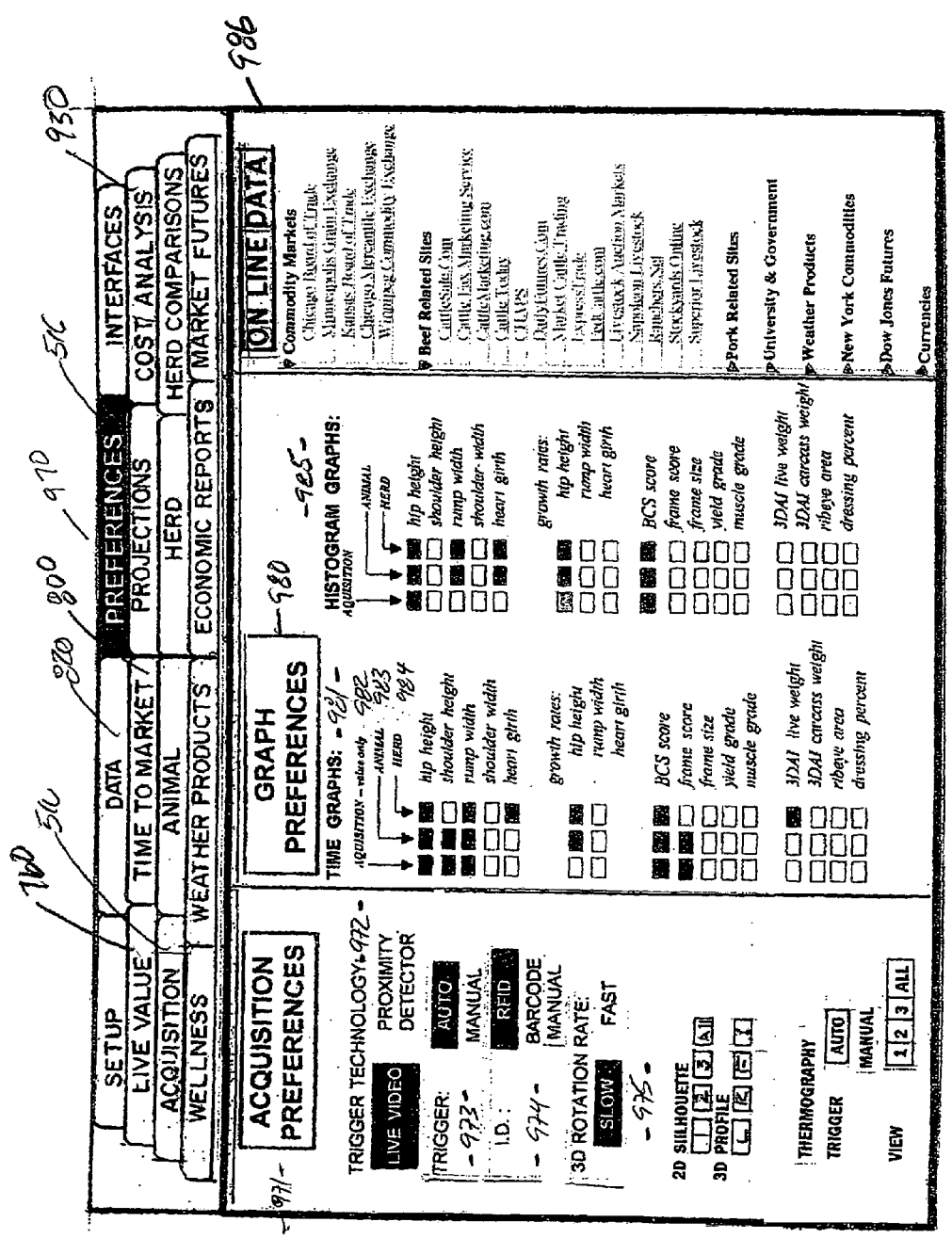
FIG. 4.65

APPARATUS AND METHODS FOR THE VOLUMETRIC AND DIMENSIONAL MEASUREMENT OF LIVESTOCK

This is a Continuation-In Part of U.S. Ser. No. 10/211,792 filed Aug. 2, 2002 now U.S. Pat. No. 6,974,373.

BACKGROUND OF THE INVENTION

1. Field of the Invention

The present invention applies selected features of advanced machine vision technology to the noninvasive and remote evaluation and quantification of livestock volumes and dimensions. These data are shown to be of value during breeding selections, feedlot evaluations, meat packing transactions and carcass evaluations.

2. Discussion of the Prior Art

Throughout history there has been the desire to measure domestic livestock. Whether such measurements included height, weight, width, length or strength, the measurement need was present. In the recent past weight alone was often used as an indicator of size and value. As consumer demand for leaner meats with lower fat content increases, the need grows to refine animal measurement techniques as well. The current industry trend is toward the consolidation of small operations into larger, more efficient operations. This trend requires not only accurate measurements, but automation and rapid data acquisition as well. The background of the present invention includes developments in both the fields of animal measurements and volumetric imaging.

1.1. Livestock Measurements

According to USDA statistics, U.S. commercial cattle slaughter totaled 35.4 million head in 2001 with commercial hog slaughter at 98.0 million head for the same year. At each stage of meat production there is a need to measure the volume and dimensions of the animals.

Breeding Evaluations.

In general, breeders of both cattle and hog populations are attempting to efficiently produce animals with a higher percentage of lean meat and a lower percentage of fat. However, in order to evaluate breeding efficacy, it is essential for feedlots and packing facilities to accurately measure and track live physical characteristics, growth and performance data and match these with end-product carcass information. Without accurate and automated measurements and data collection for the individual animal, such tracking is not possible.

Feedlot Evaluations.

Ideally, the physical and growth characteristics of each animal should be known at each stage of its stay in the feedlot to achieve optimum management. However, in order for this optimum management to be implemented, the volume and physical dimensions of each animal must be accurately measured regularly during the animal's stay at the feedlot. Since North American feedlots may house ten thousand to one hundred thousand animals, it is essential that the aforementioned, repeated measurements be acquired accurately and rapidly as part of an automated tracking system.

Live-Animal, Slaughter Plant Evaluations.

According to USDA statistics for 2001, the top 15 cattle slaughter plants account for 57 percent of the total production. Similarly, those statistics for the top 12 hogs slaughter facilities account for 53 percent of the total. For each of the leading plants an average of these numbers yields an average weekly slaughter of 25,961 and 83,237 head for cattle and hogs, respectively. With production at these levels the measurement of live animals upon delivery requires not only accuracy, but also automation and rapid data acquisition.

Carcass Evaluations.

The same efficiency needs that pressure slaughter plants continue into the meat packaging stages. The accurate measurement and evaluation of carcasses is critical as feedback to breeders and feedlot operators to evaluate changes.

1.2. Livestock Technology

For the above reasons, non-contact imaging techniques are advantageous to measure animals and carcasses in order to achieve both measurement accuracy and improved acquisition speed. Much of the existing state-of-the-art for measuring animals or carcasses relies upon the acquisition of images showing silhouettes or profiles of an animal (or carcass). In any one view, this technique provides only a record of the target animal's shadow with a loss of any three-dimensional shape within the silhouette outline. In order to attempt volumetric measurements many viewing angles must be used. Even with multiple views from many angles, the resulting volume estimation is inaccurate when any type of surface concavity is present.

Other techniques include the use of visible-spectrum, video images to evaluate lean and fat content of the carcass. Since this video image is only two-dimensional (2D), any proportional analysis of fat verses lean meat can only be a calculation of the area in a 2D view of the carcass. Such analyses of three-dimensional volumes in only two dimensions are fraught with error.

Numerous inventors have contributed to the current state-of-the-art for the measurement of animals. Early patents in this field involved automated gates and weighing systems. One such patent was U.S. Pat. No. 4,280,488 (Ostermann) which describes a gate and chute system for sorting and segregating animals by weight using scales as the measurement method. U.S. Pat. No. 4,288,856 (Linseth) shows a method for separating and grouping animals from a feedlot herd according to weight gain characteristics also using scale measurements. U.S. Pat. No. 4,617,876 (Hayes) describes an animal identification and control system which employs an identification tag which can be read from a distance, an automated weighing system and automated gates to control the movement of the animal.

Hayes, U.S. Pat. No. 4,745,472, proposes ways to obtain side and top profiles of animals via wall grids and visible-spectrum, video images. Chute mechanisms are used to position the animal in an upright, standing position. This patent also proposes ways of making area and linear measurements from these profiles which relate to physical characteristics of the animal.

Chevelier, et al., U.S. Pat. No. 5,194,036, present a method and apparatus for grading animal carcasses involving the use of video images of the carcasses. This patent requires somewhat complicated methods to rotate each carcass such that images can be obtained at multiple angles with multiple cameras. The two-dimensional, recorded images are then compared to a library of images in an attempt to achieve automated grading of the meat.

Petersen, et al., U.S. Pat. No. 4,939,574, presents a method and apparatus for obtaining a dark silhouette or contour of an animal carcass, particularly that of cattle. Details are provided for a light-screening chamber into which the carcass is placed, consisting of one wall with a lighted surface opposite a wall of frosted glass onto which the carcass shadow falls. The shadow or dark silhouette is recorded and digitized via a visible-spectrum, video camera placed at a distance behind the frosted glass wall. The video image is digitized and analyzed via a computer system. Front lit images of the carcass are also recorded and superimposed over the silhouette outline in an attempt to identify the lean (red) and fat (white)

portions of the carcass image. Additional provisions are made for the use of manual probes to measure fat thickness at various locations in an attempt to improve the estimate of the fat and lean content.

O'Brien, et al., U.S. Pat. No. 5,205,799, describes a three-dimensional, stereoscopic, imaging system used in conjunction with an X-ray system to view the exterior and interior of an animal carcass.

Bamjii, U.S. Pat. No. 6,323,942, describes a 3D image sensor employing a two-dimensional array of pixel light sensing detectors and dedicated electronics fabricated on a single CMOS integrated circuit. This invention emits a pulse of light and times the response time for each pixel in an N.times.M optical detection array. Measuring the time-of-flight (TOF) for the emitted light to travel to a target and return to given pixel permits a distance to be computed for each part of the reflected image. The proposed TOF measurements are presented as either individual high-speed counters for each pixel or individual gated charge accumulator for each pixel.

Faulkner, U.S. Pat. No. 5,335,288, uses biometric measurements of hand silhouette and finger height to identify a person. The finger height is measured via a structured light technique.

In U.S. Pat. No. 5,412,420, inventor James S. Ellis presents a three-dimensional (3D) measurement system for animals. The patent discloses the use of LASAR cameras in a system which appears to employ an amplitude-modulated, phase-detection, time-of-flight laser technique similar to the Lidar scanning system described in U.S. Pat. No. 5,006,721.

Ellis U.S. Pat. No. 6,777,353 describes a measurement system which purportedly measures the three-dimensional linear, angular and volumetric characteristics of an animal or carcass, such as beef cattle. The capacity to obtain these useful livestock measurements relies largely upon the system's ability to accurately determine the three-dimensional surface of the target animal. This patent teaches that the three-dimensional surface is determined by first projecting light spots onto the surface of the target animal as shown in FIG. 1 of the patent. These light spots are then observed by the receiving camera located immediately adjacent to the projector as shown in FIG. 6 of the patent. According to this patent, the image obtained by the receiving camera may be analyzed to determine the dimensions of the light spots on the surface of the target animal. As described in column 3, lines 56-65, the measured diameter of a given light spot, as measured in the camera image, is proportional to the distance between the target surface and the receiving camera. A spot diameter of 1.5 inches corresponds to a distance of 6 feet, while a spot diameter of 1.75 inches corresponds to a distance of 7 feet. Variations of structured light which may include squares, vertical bars or horizontal bars behave in a manner similar to the light spots.

Jones, et al., U.S. Pat. No. 5,458,418, describes a method for detecting poor meat quality from thermal images of cattle and swine. If the thermal images reveal skin temperatures outside of the predetermined, absolute temperature ranges, 28-32+/−2 degrees C. for cattle and 24-26+/−2 degrees C. for swine, the animal is likely to provide poor meat quality.

Hurnick, et al., U.S. Pat. No. 5,474,085, have proposed a thermographic imaging system for remote sensing of various characteristics of livestock, such as weight, carcass pH, temperature and location.

Scofield, U.S. Pat. No. 5,483,441, has proposed a method for evaluating changeable configuration bodies which move through first and second scenes, corresponding to differing first and second fields of view. The Scofield patent describes methods of obtaining top views, side views, profiles and outline measurements using common, visible-spectrum, video cameras similar to a number of other inventors. This conclusion is especially evident in the embodiment section, column 12, line 59 through column 13, line 10, where a silhouette is created with the animal black and the background white.

Scofield et al., U.S. Pat. No. 5,576,949, is similar to U.S. Pat. No. 5,483,441 with the addition of black and white bars on the walls of the chute to provide a repetitive pattern which is detected via spectral analysis in order to help identify that part of the image that is background and not animal. Apparently this approach provides a more reliable silhouette.

Tong, et al., U.S. Pat. No. 5,595,444, improves upon the invention of U.S. Pat. No. 5,58,418 (Jones, Schaefer, Tong, Scott, Gariepy, and Graham) for identifying cattle and swine that are likely to provide poor meat quality. This invention acquires thermal images of the animals and identifies those that statistically fall outside of a range of normal for a given herd or group as those likely to provide poor meat quality. This is likely to be more accurate and also allows for extreme ambient temperatures since the group statistics would shift with the ambient temperatures.

Scofield, et al., U.S. Pat. No. 5,644,643, is a continuation of U.S. Pat. Nos. 5,483,441 and 5,576,949. This continuation contains additional claims regarding the chute construction and appearance to provide better contrast with regards to the animal.

In U.S. Pat. Nos. 5,673,647, 6,000,361, 6,135,055, and 6,318,289 B1, William C. Pratt describe cattle management systems in great detail. These systems include individual animal identification by electronic methods, animal measurement, automated data inputs, cattle handling and sorting components, computer systems to calculate the optimum slaughter weight and marketing date for shipment of the animal to a meat processing plant. These patents also include a description of computer calculations for correlating live animal characteristics to the measured carcass characteristics.

Godik, U.S. Pat. No. 5,699,797, deals with the properties of human skin obtainable via IR imaging. It employs an active IR illumination source and IR detectors. While applicable to thermal imaging of skin, it discusses skin penetration of 1 cm or less.

Tong, et al., U.S. Pat. No. 5,944,598, uses infrared thermography to detect poor meat quality in live animals. With their technique thermal images are acquired of a group of animals. A mean temperature is computed for the group and every animal in the group. Animals are rejected as having a high probability of producing poor meat quality if their individual thermal characteristics differ significantly from that of the group.

Anderson, et al., U.S. Pat. No. 6,032,084, proposes a fully-automated, animal feedlot management system where each feed delivery vehicle uses real-time virtual reality modeling and satellite-based, global positioning system (GPS) technology to direct various types of feedlot operations. Though the proposed automation is abundant, there is no feedback measuring the growth and performance of the animals. The present invention fills that void by accurately automating the animal measurements.

Schaefer et al., U.S. Pat. No. 6,123,451, presents a process for determining a tissue composition characteristic of an animal via infrared thermographic imaging. This invention involves the acquisition of a thermal image of the animal and/or carcass, calculating statistical information from the thermal image, inputting the statistical information into a predictive model, and solving the predictive model for tissue composition characteristics such as lean body mass, carcass fat composition, and lean yield. Correlation data presented in the patent provided correlation coefficients between thermal properties and stated variables that ranged from r=00.94 (r.sup.2=0.89) to r=0.72 (r.sup.2=0.52). The IR images for these data were obtained via a 2D thermal imaging camera.

Belk, et al., U.S. Pat. No. 6,198,834 B1, proposes an image analysis system for scoring characteristics that predict the palatability and yield of a meat carcass or cut. Specifically, the illustrative embodiments included color and color variability of fat and lean tissue, extent of marbling, average number and variance of marbling flecks per unit area, average size of marbling, the variance of marbling size, average texture of marbling and lean tissue, firmness of lean tissue, density of lean tissue, and density of connective tissue.

Cureton, U.S. Pat. No. 6,216,053 Bi, discloses a fully automated feedlot management system similar to that described in U.S. Pat. No. 6,032,084.

1.3. Volumetric Measurements

Numerous methods are available for the general computation of volume and the dimensional measurement of an object. In general, the process of generating 3D, volumetric data contains the following steps:

1. Determine the necessary number and direction of views based upon the complexity of the shape;
2. Acquire a three-dimensional surface image from each view;
3. Generate a 3D surface via mesh or other techniques;
4. Register the multiple surfaces.
5. Fuse the surfaces into one geometry;
6. Display the data; and
7. Compute measurements based upon the 3D model.

The complexity of the target volume determines the number and direction of views required. Simple convex volumes may require as few as two views to image the entire shape. Complex volumes with deep indentations may require multiple views of a single region. The non-contact acquisition of 3D surfaces may be accomplished with a number of technologies. Regardless of method, each surface provides a three-dimensional representation of the volume's shell as viewed from the direction of the given camera. After the acquisition of multiple surfaces, it is necessary to register the surfaces in a common coordinate system. This is most easily accomplished if the geometric relationship between cameras is fixed and known. After registration, the multiple surfaces may be fused into a common volume or geometry. This step must take into account the direction of each view and any loss of accuracy near the edges of the 3D surfaces. Once geometric fusion has been accomplished, a 3D triangulated mesh may be generated for the volume surface. This mesh mathematically represents the surface of the volume and enables the numerical calculation of volume that is desired. Once the volume has been calculated, it may be displayed graphically or numerically. It may also be used as input or feedback for a manufacturing process.

1.4. Three-Dimensional Surface Measurements Technologies

Common to many of these methods is the computation of 3D surfaces. FIGS. 1-1 and 1-2 depicts the many technologies which may be employed to obtain three-dimensional surface measurements. Each has advantages and disadvantages for a given application. The conditions associated with the measurement of live or carcass cattle and hogs makes many of these general techniques impractical.

The large number of animals necessitates an automated measurement system which acquires, processes and records the measurement data rapidly. In a slaughter plant situation, an animal may be slaughtered every 3 to 10 seconds. A lengthy measurement process is not acceptable. Additionally, live animals are often moving. Even carcasses are in constant motion on an overhead conveyor belt. To achieve an accurate measurement an apparatus must be capable of freezing such movement. The technologies represented in FIGS. 1-1 and 1-2 need to be examined in light of light of the specific requirements for measuring live and carcass cattle and hogs.

Contact vs. Non-Contact.

Contact technologies are not well-suited for livestock measurements. Contact methods typically employ a precision, mechanical arm with a sensitive tip. This assembly is carefully scanned over the object acquiring data points one at a time. They can take up to several hours for scanning and digitizing one object. While they can be very accurate, they are best-suited for digitizing small solid objects. Additionally, the precision arm and sensitive tip are not well-suited for a livestock environment.

Conversely, non-contact methods are much more likely to be a match for this application since data acquisition may occur rapidly from a distance. The sensitive equipment can be located in a safe location somewhat removed from the livestock environment.

Reflective Optical vs. Non-Optical.

Reflective methods which employ optical technology can be used successfully for acquiring 3D livestock data. Reflected light methods include those that employ structured illumination patterns to achieve specific signal processing advantages. Non-optical, reflective methods, such as sonar or imaging radar are not as good a match for this application. Sonar or other ultrasonic methods typically use a liquid coupling medium, which is not practical for this project. While ultrasonic air operation is possible, the efficiency and lateral resolution present significant technical challenges. Imaging radar is typically used to map the earth's surface. While well-suited for large targets such as a mountain range, imaging radar is not likely to provide sufficient resolution for this project.

Emitted vs. Transmissive.

Non-contact, emitted technologies include primarily infrared (IR) methods. While IR in the 8-12:µ wavelength is useful for imaging thermal data, the use of structured light techniques in this band is difficult. Thermal patterns are much more difficult to generate and project than optical patterns. Additionally, the resolution of thermal patterns is substantially less than their optical counterparts. Presently, IR imaging systems are slower, more expensive, and of lower resolution than optical systems. Transmissive optical methods are not applicable since cattle and hogs are not transparent to light. Transmissive X-ray systems are not being considered since they render muscle and soft tissue nearly invisible and cost and safety are significant factors.

Optical Methods—Active vs. Passive.

Non-contact, reflective, optical methods for obtaining 3D data may be further divided into active and passive systems. Passive systems rely on the ambient light and surface texture of the target to provide sufficient information to compute dimensional data. Passive methods include passive stereo, shape from shading, shape from silhouette, passive depth from focus, and passive depth from defocus. Since passive system depend on ambient conditions, their reliability is often uncertain. Active optical methods typically employ a controlled light source of some kind which greatly increases system reliability over the similar passive system without the active source.

Active Optical Methods.

Active optical systems include pulsed or modulated light, interferometry, active depth-from-focus, active depth-from-defocus, active silhouette, active triangulation, and active stereoscopic.

Pulsed light methods utilize a pulse of light which bounces off of the target surface and returns to the source. The round trip time is measured and the distance computed from knowledge of the speed of light. A variation on this principle employs a continuously modulated light beam which is bounced off of the target and returned to the source. The phase of the received signal is demodulated to determine the time delay associated with the round trip to the target and back. Both of these variations require expensive test equipment to measure the small time delays inherent in light propagation. A spot or stripe scanning process is also required.

Interferometry methods include moire patterns and holography. Such methods are not applicable to this application since they work best when the surface depths are microscopic.

Active depth-from-defocus (DFD) technology take advantage of the commonly observed fact that objects in focus appear crisp and detailed, while objects out of focus appear blurred. Under controlled, structured light conditions it is possible to measure the degree of blurring and thus compute the associated distance between a given image spot and the reference distance where the image is in complete focus.

Active depth-from-focus (DFF) utilizes similar principles to DFD. However, DFF requires a focal scan through the range of the target. A multitude of images are acquired and processed to identify the precise distance at which each surface point is in the best focus. Since magnification changes with focal distance in most optical systems, registration and alignment of the multiple images can be a problem. During the multiple image acquisitions, animal movement can also be a problem for this application.

Active triangulation typically uses laser spot scanning or scanning stripes. In this method the laser beam and the visible-spectrum camera are at different angels such that the illuminated profile of the surface is recorded in the camera. Such scanning system require multiple images and frequently long scanning times. Computer memory requirements and image processing times can be significant. Consider a CCD camera acquiring images at a video rate of 30 images per second. With a 640.times.480 pixel image (307,200 pixels per image) and only an 8-bit pixel depth, data is acquired at a 73.7 Mb per second rate. Additionally, holes in the computed surface result when a surface feature obstructs either the laser beam or the camera view.

Active stereoscopic vision systems may also be used to obtain 3D surface measurements. This method uses two cameras separated by a distance sufficient to triangulate on a given point on the target surface. A minimum of two images are required to compute the target surface. Holes in the computed surface result when a surface feature obstructs one of the camera views.

Active silhouette (or profile) is sometimes considered an active optical system. Since it only acquires the outline or shadow of the target, it is not a 3D measurement.

Patent Review for Active Depth-from-Defocus and Depth-from-Focus Technologies

Since the volumetric measurement of live and carcass cattle and hogs imposes numerous constraints on 3D surface measurement technologies, a review of applicable patents will focus on those technologies which most closely meet the requirements of this application, namely active depth-from-defocus (DFD) and active depth-from-focus (DFF) methods.

TABLE 3

Patent Review - Volumetric Measurements via Focus/Defocus Techniques

| U.S. Pat. No. | Title | Inventor | Assignee | Comments |
|---|---|---|---|---|
| 6,269,197 | Determining a depth | Aaron S. Wallack | Cognex Corp. | depth using defocus & contrast measurements from 3 images with structured illumination |
| 6,219,461 | Determining a depth | Aaron S. Wallack | Cognex Corp. | depth using defocus & different structured illumination patterns for each of multiple 2D images |
| 6,148,120 | Warping of focal images to correct correspondence error | Michael Sussman | Cognex Corp. | corrects correspondence errors among multiple images when focal distances (& magnification) are changed with non-telecentric optical systems - useful in focus & defocus systems |
| 6,025,905 | System for obtaining a uniform illumination reflectance image during | Michael Sussman | Cognex Corp. | method for obtaining a uniform illumination image from multiple structured illumination images |

TABLE 3-continued

Patent Review - Volumetric Measurements via Focus/Defocus Techniques

| U.S. Pat. No. | Title | Inventor | Assignee | Comments |
|---|---|---|---|---|
| | periodic structured illumination | | | (good background discussion) |
| 5,912,768 | Depth-from-defocus optical apparatus with invariance to surface reflectance properties | Bradley Sissom, Michael Sussman | Cognex Corp. | a depth-from-defocus optical apparatus for 3D imaging; includes illumination source, projection lens, viewing lens, and beam splitter (good background discussion) |
| 5,878,152 | Depth from focal gradient analysis using object texture removal by albedo normalization | Michael Sussman | Cognex Corp. | depth of focus techniques employing albedo normalization - removal of the reflectance effects of the object's natural surface texture such that only the structured light illumination is observed (good background discussion) |
| 5,953,126 | Optical profilometry | James M. Zavislan | Lucid Inc. | a spot scanning system which uses a measurement of spot defocus to obtain a depth calculation instead of refocusing the lens assembly at each new spot position to obtain the depth |
| 5,360,970 | Apparatus and method for a single return path signal sensor system | David B. Kay | Eastman Kodak Co. | use of a diffraction grating to aid focusing of a laser on a data track |
| 5,900,975 | Ghost image extinction in an active range sensor | Michael Sussman | Cognex Corp. | a plate beamsplitter with polarizing filter(s) which eliminates ghost images used in focus/defocus imaging systems with telecentric optics |
| 5,300,786 | Optical focus phase shift test pattern, monitoring system and process | Timothy A. Brunner, Michael S. Hibbs, Barbara B. Peck, Christopher A. Spence | IBM | an optical system projecting phase-shifted, projection patterns onto a surface to quantify the degree of focus - used with photolithographic techniques associated with semiconductor masks |
| 5,231,443 | Automatic ranging and automatic focusing | Muralidhara Subbarao | Research Foundation of State University of New York | A method based on image defocus information for determining the distance of objects |

TABLE 3-continued

Patent Review - Volumetric Measurements via Focus/Defocus Techniques

| U.S. Pat. No. | Title | Inventor | Assignee | Comments |
| --- | --- | --- | --- | --- |
| 4,841,325 | Automatic focusing device for camera | Kunihish Hoshino Yoshinari Hamanishi Ken Utagawa | Nikon Corporation | An automatic focusing device for detecting the amount defocus |
| 4,088,408 | Device for measuring the contour of a surface | Ernest E. Nurcher, Stephen J. Katzberg, William I. Kelly, IV | USA, NASA | A device for measuring the contour of a surface |

Discussion of Critical Patents:

U.S. Pat. No. 6,269,197—Determining a Depth

Abstract:

A three-dimensional image is derived from two-dimensional images. At least one of the two-dimensional images has a predetermined number of pixels. Depth measurements are derived from the two-dimensional images. The number of derived depth measurements is substantially equal to the predetermined number of pixels. The three-dimensional image is derived from the two-dimensional digital images and the depth measurements.

Inventors: Wallack; Aaron S. (Natick, Mass.) Assignee: Cognex Corporation (Natick, Mass.) Issue date: Jul. 31, 2001 Discussion:

This patent is a division of the patent application associated with U.S. Pat. No. 6,219,461.

This invention relates to determining a depth or range sensing via defocus methods. It is intended for industrial applications such as solder paste volumes, 3D clay models, and inspection of semiconductor packages. It attempts to address the perceived state-of-the-art which allows 3D images to be derived from 2D images by exploiting optical principles related to the distance between an out-of-focus point and an in-focus point.

The essence of this invention is a method of analyzing pixel information in 2D images of a 3D object to obtain 3D surface information about the object. It uses at least three different images of the object at different optical path lengths, each with a different structured illumination projected onto the object surface. From this procedure contrast measurements in the 2D image are converted into depth calculations for the image. The structured illumination may be moved for each of the images.

U.S. Pat. No. 6,219,461—Determining a Depth

Abstract:

A three-dimensional image is derived from two-dimensional images. At least one of the two-dimensional images has a predetermined number of pixels. Depth measurements are derived from the two-dimensional images. The number of derived depth measurements is substantially equal to the predetermined number of pixels. The three-dimensional image is derived from the two-dimensional digital images and the depth measurements.

Inventors: Wallack; Aaron S. (Natick, Mass.) Assignee: Cognex Corporation (Natick, Mass.) Issue date: Apr. 17, 2001 Discussion:

This invention relates to determining a depth or range sensing via defocus methods and is a division of the patent application associated with U.S. Pat. No. 6,269,197.

The essence of this invention is a method of analyzing pixel information in 2D images of a 3D object to obtain 3D surface information about the object. For each of the 2D images a different structured illumination pattern is employed. The positions of a periodic structured pattern, with respect to the subject, are shifted by a portion of the repetition period. Focus-based depth measurements are derived for each pixel of at least one of the 2D images.

U.S. Pat. No. 6,148,120—Warping of Focal Images to Correct Correspondence Error

Abstract:

The invention corrects correspondence error among multiple images taken at different focal distances with non-telecentric optical systems, and is particularly useful in focal gradient analysis range imaging systems.

Inventors: Sussman; Michael (Winchester, Mass.) Assignee: Cognex Corporation (Natick, Mass.) Issue date: Nov. 14, 2000 Discussion:

This invention relates to 3D machine vision which employs depth-from-focus and depth-from-defocus techniques.

U.S. Pat. No. 6,025,905—System for Obtaining a Uniform Illumination Reflectance Image During Periodic Structured Illumination Abstract:

The invention provides an apparatus and method for obtaining a uniform illumination reflectance image of an object, even though the object is illuminated only using periodic structured illumination. The uniform illumination reflectance image so-produced has precise geometric and photometric correspondence with images produced using the periodic structured illumination. To obtain the uniform illumination reflectance image, a sum of a spanning set of periodic structured illumination images is computed. The resulting summation image bears substantially no trace of periodic structured illumination. Various embodiments of the apparatus of the invention are disclosed employing illuminator motion, object motion, and ray deflection to obtain a plurality of periodic structured illumination images of different phase. The invention is useful with triangulation ranging systems using a striped periodic illumination mask, with depth-from-focus ranging systems, and with depth-from-defocus ranging systems.

Inventors: Sussman; Michael (Winchester, Mass.) Assignee: Cognex Corporation (Natick, Mass.) Issue date: Feb. 15, 2000 Discussion:

This invention relates to machine vision systems that employ periodic structured illumination. In applications which use structured illumination it is advantageous to use a uniform illumination image to normalize reflections from the target surface or distortions due to lens. This invention combines periodic structured illumination patterns in a manner that cancels out the periodic structures resulting in a uniform illumination. The cancellation typically consists of spatially shifting the illumination pattern by a specific phase of the illumination period.

U.S. Pat. No. 5,912,768—Depth-from-Defocus Optical Apparatus with Invariance to Surface Reflectance Properties Abstract:

A depth-from-defocus optical apparatus is provided for use with a depth-from-defocus three-dimensional imaging system for obtaining a depth image of an object. The invention facilitates the formation of depth images of objects exhibiting specular reflection, either alone or in combination with diffuse reflection, thereby allowing the application of depth-from-defocus three-dimensional imaging to objects such as microelectronic packages. The optical apparatus of the invention generally includes an illumination source, a projection lens assembly for converging rays of incident light towards an object, and a viewing lens assembly for converging rays of reflected light towards an image plane. Importantly, the viewing lens assembly is of the same working f-number as the projection lens assembly. In preferred embodiments, both the projection lens assembly and the viewing lens assembly exhibit object-side telecentricity so as to substantially eliminate vignetting of off-axis specular object features, and consequently, substantially eliminate specular false depth. The invention can also include an uncrossed polarizer/analyzer pair to balance the dynamic range of specular reflections with the dynamic range of diffuse reflections so as to effectively utilize the limited dynamic range of a single image detector. Inventors: Sissom; Bradley (Norwood, Mass.); Sussman; Michael (Winchester, Wash.) Assignee: Cognex Corporation (Natick, Mass. Issue date: Jun. 15, 1999 Discussion:

This invention relates to 3D machine vision which employs depth-from-focus and depth-from-defocus techniques. The components of this invention include an illumination source, a projection lens assembly, a viewing lens assembly, and a beamsplitter device. These components together make up a telecentric optical system for focal gradient range systems.

U.S. Pat. No. 5,878,152—Depth from Focal Gradient Analysis Using Object Texture Removal by Albedo Normalization Abstract:

The invention provides a method and apparatus for obtaining a range image of an object. The method includes the act of "albedo normalization", i.e., removing the effects of object reflectance using a structured illumination image of the object and a uniform illumination image of the object to provide an albedo-normalized image. This image is then processed using a focus measure to provide a focal image, which image is then used to provide a range image. The invention substantially removes the effects of object reflectance from an image acquired using structured illumination, so that only the structured illumination pattern and its degree of focus/defocus remains. Albedo normalization is achieved by dividing an image of an object taken under structured illumination by a corresponding image of the object taken under uniform illumination. The albedo normalization act removes the primary source of noise in range images obtained using a depth from defocus or depth from focus of structured illumination technique, by removing spurious image frequencies from the image before processing by a focus measure. The albedo normalization act permits the depth from defocus and depth from focus techniques to be used for one or more focal positions, and over a broad range of materials of interest in machine vision.

Inventors: Sussman; Michael (Winchester, Mass.) Assignee: Cognex Corporation (Natick, Mass.) Issue date: Mar. 2, 1999 Discussion:

This invention relates to machine vision systems which have the ability to provide range images of 3D objects via defocus methods using structured lighting.

This invention removes the effects of surface reflections from the object targeted with the structured illumination pattern. The natural object reflectance texture, also called 'albedo', may be eliminated by dividing the structured-illumination image by an image obtained under uniform illumination." This process is referred to as albedo normalization. The result is an image of the object which is dependent entirely on the structured illumination. This process is advantageous in applications such as depth from focus/defocus, laser triangulation, stereo vision, and other structured lighting methods.

U.S. Pat. No. 5,953,126—Optical Profilometry

Abstract:

A scanning reflection profilometry system utilizes an objective lens which focuses a beam at the surface under test and measures the profile of the surface (its height variations) in accordance with the amount of defocus of the reflected beam. Surface profile distortion which is focus dependent is reduced through the use of a transparent mask over the aperture of the lens in the path of the beam which is incident on and reflected from the surface under test and which covers a portion but not all of the aperture. A photodetector upon which the reflected beam is incident provides output signals representing the change in profile. The system has height sensitivity characteristic of a small spot size on the surface without signal distortion attributable to the diffraction anomalies associated with small spot sizes. A microprofilometer head having the objective lens and other optics is mounted on flexures and driven to execute reciprocal movement so as to scan the surface under test.

Inventors: Zavislan; James M. (Pittsford, N.Y.) Assignee: Lucid Inc (Henrietta, N.Y.) Issue date: Sep. 14, 1999 Discussion:

This invention uses defocus information to obtain a range image. However, it employs a single spot from a laser beam rather than a structured illumination pattern.

U.S. Pat. No. 5,360,970—Apparatus and Method for a Single Return Path Signal Sensor System Abstract:

The radiation resulting from interaction with a data track or groove on a storage surface of an optical information storage and retrieval system is separated into three components and detected to provide tracking, focusing, and data signals. The separation is performed using a dual diffraction grating in a single optical path. The division between grating elements in the dual diffraction grating is oriented perpendicular to the data track or groove projected on the grating element. Diffraction radiation components generated by the dual diffraction grating are applied to a first and a second dual sensor elements. The first and second dual sensor elements provide a focusing signal. The undiffracted radiation component transmitted by the dual grating is applied to a third dual sensor. The division between sensors of the third dual senor is perpendicular to the division of the dual grating. Signals from the third dual sensor elements provide the tracking signal and the data signal. Several embodiments of the basic configuration are disclosed including a variety of configurations for defocusing the undiffracted transmitted radiation on the third dual sensor. In addition, a cylindrical lens can be used to defocus the radiation components from the diffraction grating in a single dimension.

Inventors: Kay; David B. (Rochester, N.Y.) Assignee: Eastman Kodak Company (Rochester, N.Y.) Issue date: Nov. 1, 1994 Discussion:

U.S. Pat. No. 5,900,975—Ghost Image Extinction in an Active Range Sensor

Abstract:

An apparatus is provided that includes a plate beamsplitter having a first surface coated with a partially reflective coating, and a second surface coated with an anti-reflective coating, and a polarizing filter, oriented with respect to the plate beamsplitter so as to substantially block light of substantially incompatible polarization that has traversed the plate beamsplitter, has been reflected by the object to be range imaged, and has been reflected by the plate beamsplitter towards the polarizing filter, thereby substantially preventing the formation of a ghost image of the object to be range imaged. Thus, the invention does not suffer from optical ghost images which commonly occur due to imperfect anti-reflection coatings used to make plate beam splitters. Also, the invention makes practical the use of plate beam splitters in depth from defocus and depth from focus range imaging systems employing coaxial active illumination and viewing.

Inventors: Sussman; Michael (Winchester, Mass.) Assignee: Cognex Corporation (Natick, Mass.) Issue date: May 4, 1999 Discussion:

U.S. Pat. No. 5,300,786—Optical Focus Phase Shift Test Pattern, Monitoring System and Process Abstract:

A photolithography mask structure having a novel optical focus test pattern is described. The mask structure has a non-phase-shifted, transparent substrate and includes a phase shifter of other than 180E disposed between spaced, parallel opposing lines such that an alternating pattern of non-phase-shifted material and phase-shifted material is defined transverse said parallel lines. When projected onto the surface of an object measurable shifts of the test pattern corresponds in direction and magnitude with the extent of system defocus. Various alternating test pattern embodiments are presented, all of which include at least one phase shift window of other than 180E in relation to the mask substrate. Further, a monitoring system and a monitoring process are discussed employing the presented mask structures.

Inventors: Brunner; Timothy A. (Ridgefield, Conn.); Hibbs; Michael S. (Westford, Vt.); Peck; Barbara B. (Westford, Vt.); Spence; Chrisopher A. (Westford, Vt.) Assignee: International Business Machines Corporation (Armonk, N.Y.) Issue date: Apr. 5, 1994 Discussion:

U.S. Pat. No. 5,231,443—Automatic Ranging and Automatic Focusing

Abstract:

A method based on image defocus information is disclosed for determining distance (or ranging) of objects from a camera system and autofocusing of camera systems. The method uses signal processing techniques. The present invention includes a camera characterized by a set of four camera parameters: position of the image detector inside the camera, focal length of the optical system in the camera, the size of the aperture of the camera, and the characteristics of the light filter in the camera. In the method of the present invention, at least two images of the object are recorded with different values for the set of camera parameters. The two images are converted to one-dimensional signals by summing them along a particular direction whereby the effect of noise is reduced and the amount of computations are significantly reduced. Fourier coefficients of the one-dimensional signals and a log-by-rho-squared transform are used to obtain a calculated table. A stored table is calculated using the log-by-rho-squared transform and the Modulation Transfer Function of the camera system. Based on the calculated table and the stored table, the distance of the desired object is determined. In autofocusing, the calculated table and the stored table are used to calculate a set of focus camera parameters. The camera system is then set to the focus camera parameters to accomplish autofocusing.

Inventors: Subbarao; Muralidhara (Port Jefferson Station, N.Y.) Assignee: The Research Foundation of State University of New York (Albany, N.Y.) Issue date: Jul. 27, 1993 Discussion:

U.S. Pat. No. 4,841,325—Automatic Focusing Device for Camera

Abstract:

An automatic focusing device for use in camera lens systems comprises lens means such as a zoom lens for forming the image of an object, detecting means for detecting the amount of defocus of the image of the object formed by the lens means from a predetermined plane such as a film surface, memory means for storing at least one value of conversion coefficient and at least one value of correction coefficient which is used in a calculation for correcting the conversion coefficient, calculating means for correcting the conversion coefficient in accordance with the amount of defocus and the correction coefficient and for calculating the driving amount of at least a portion of the lens means on the basis of the corrected conversion coefficient and the amount of defocus, and lens driving means for driving at least a portion of the lens means, e.g., the front lens group of a zoom lens, in accordance with the driving amount calculated by the calculating means. Disclosed also a lens system, as well as a camera, incorporating this automatic focusing device.

Inventors: Hoshino, deceased; Kunihisa (late of Tokyo, JP); Hamanishi; Yoshinari (Tokyo, JP); Utagawa; Ken (Kawasaki, JP) Assignee: Nikon Corporation (Tokyo, JP) Issue date: Jun. 20, 1989 Discussion:

U.S. Pat. No. 4,088,408—Device for Measuring the Contour of a Surface

Abstract:

The invention is a device for measuring the contour of a surface. Light from a source is imaged by a lens onto the surface which concentrates the energy from the source into a spot. A scanning means is used to scan the spot across the surface. As the surface is being scanned the surface moves relative to the point of perfect focus. When the surface moves away from perfect focus the spot increases in size, while the total energy in the spot remains virtually constant. The lens then re-images the light reflected by the surface onto two detectors through two different sized apertures. The light energy going to the two detectors is separated by a beam splitter. This second path of the light energy through the lens further defocuses the spot, but as a result of the different sizes of the apertures in each light detector path, the amount of defocus for each is different. The ratio of the outputs of the two detectors which is indicative of the contour of the surface is obtained by a divider.

Inventors: Burcher; Ernest E. (Newport News, Va.); Katzberg; Stephen J. (Yorktown, Va.); Kelly, IV; William L. (Hampton, Va.) Assignee: The United States of America as represented by the Administrator of the (Washington, D.C.) Issue date: May 9, 1978

1.5. Surface and Volumetric Renderings

There are many methods for visualization of volume data. A complete description of this large and rapidly changing field is beyond the scope of this discussion. However, two popular approaches are surface rendering and volume rendering. Surface rendering is a technique which treats the volume as having only a combination of surfaces or shells. Volume rendering on the other hand, maintains and manipulates many cubic building block known as 'voxels' to represent the volume. Volume rendering may be especially useful when the entire volume of the object contains information (density, elasticity, acoustic impedance) such as with magnetic resonance or ultrasound images. Both methods may begin with a 3D point cloud of data points as might be obtained from one or more range images.

Surface Rendering

In surface rendering the volumetric data must first be converted into geometric primitives, by techniques such as isosurface extraction or isocontour extraction. These primitives, such as polygon meshes or contours, are then rendered for display using conventional display techniques.

Advantages of Surface Rendering Include:

a) fast display and manipulation of the 3D reconstructions since only the surface vertices need to be manipulated and stored.

Disadvantages of Surface Rendering Include:

a) a required intermediate conversion to a surface representation which can sometimes be quite complex;

b) the lack of internal details of the volumes, since only the surfaces or shell is maintained; and c) susceptibility to discontinuities in the 3D scanning.

One common method to determine a surface from a set of discrete data points is known as the Marching Cube Algorithm. This algorithm is a table-based, surface-fitting algorithm for rendering surfaces in volume space. The basic idea is to march a cube through the volume containing the surface to determine if the cube, in a given position, is totally inside the surface, totally outside the surface, or intersecting the surface. For those cube positions intersecting the surface, an index is maintained which records which of the 8 cube vertices (corners) are inside the surface and which vertices are outside the surface. Theoretically, $2^8=256$ combinations are possible. However, eliminating symmetrical and inverse duplications, 14 unique configurations exist. Each configuration of vertices which are within the surface and vertices which are outside the surface results in a specific shape or surface patch bounded by the shape of the marching cube. Surface planes intersecting near a cube corner result in a triangular surface intersection, while surface planes which intersect four sides of the cube results in a surface patch having a rectangular shape. When the cube has completed its march through the volume, the resulting index of intersecting cube positions and the record of which vertices where inside and outside the surface can be used to create a patchwork quilt which is an accurate representation of the surface. Even greater surface resolution is possible if interpolation is used to determine where the surface intersects each cube edge as the cube progresses through the volume. The end result is a table of surface patches which can be passed to a rendering program that maps them into image space.

Another common method to obtain a surface from a set of discrete 3D surface points is known as Delaunay Triangulation. In this technique a set of lines is generated connecting each point in 3D space to its natural neighbors. The result is a triangular mesh, with non-uniform vertex locations, which represents the surface. If desired, this surface can then be converted to a rectangular mesh grid via resampling and interpolation. Such a rectangular mesh grid is easily displayed using common graphics programs.

Contour algorithms may also be used to convert non-uniformly sampled, discrete 3D surface data into a surface portrayed on a rectangular grid. In this type of algorithm lines are drawn through or between existing 3D data points of equal elevation. This series of lines may resemble the rings on a topographical map of a mountain. These equi-planar lines may in turn be converted to a rectangular mesh grid via resampling and interpolation.

Volume Rendering

In volume rendering the volumetric data is sampled into many cubic building blocks called 'voxels' (volume element), the volumetric equivalent to the 2D 'pixel' (picture element). Each voxel carries one or more values for characteristics of the volume such as color, density, or elasticity. In volume rendering, the voxels are displayed and manipulated directly with computers having substantial amounts of memory and processing power.

Advantages of Volume Rendering Include:

a) the ability to display the 3D volumes with no knowledge of the volume data set and hence no need to transform the data to an intermediate surface representation;

b) the ability to display any part, including internal structures, since the entire volume has been preserved; and c) less susceptibility to discontinuities in the 3D scanning since the underlying volume is maintained.

Disadvantages of Volume Rendering Include:

a) the need for computers with a large memory and a great deal of processing power since the entire volume is displayed and manipulated; and b) much slower rotations and manipulations are likely even with a large memory and substantial processing power.

One method which somewhat reduces the vast amount of data storage and processing connected with volume rendering and processing is known as octrees. An octree representation of a volumetric image is based on an hierarchial volume subdivision where each volumetric cube is broken into eight equal, sub-cubes. Each of these sub-cubes in turn can be broken into eight sub-cubes of its own. Described in parent-child nomenclature, if all children of an octree branch are included in the graphical image of the volume, then only the parent data need be recorded or manipulated, representing an 8:1 reduction in data and computation time. If two generations of octree levels are included by reference to a grandparent then a 64:1 reduction in data and computation time occurs. This approach maintains the fine resolution for an edge at the child level but enables efficient manipulation when grandparent or great-grandparent cubes of data are in common. This hierarchial level treatment may be extended to any number of generations. With specially derived computation methods volume unions, intersections, and manipulations are much more efficient than brute force treatment of all individual voxels. In the case of MRI or ultrasound data, each child, parent or grandparent cube element may be assigned characteristics such as density in addition to position.

1.6. Thermal Imaging

Thermal Imaging Technology

Historically, thermal imaging equipment was large, inconvenient and expensive. It yielded analog display information with the use of detection elements which required cooling via a supply of liquid nitrogen. Large battery packs were required for any attempt at portable operation. Costs for such a camera system were $50,000-60,000.

Recent solid state developments have resulted in thermal imaging cameras that are only slightly larger that a 35 mm photographic camera. They do not require cooling and easily operate at room temperature. One such thermal imaging camera is the IR SnapShot® manufactured by Infrared Solutions, Inc. This camera is based on Honeywell infrared (IR) thermoelectric thermal array detector technology. It is an imaging radiometer, an infrared camera that acquires a thermal image of a scene and can determine the temperature of any pixel within that scene. Pressing a push button on the camera causes a 120-element linear thermoelectric detector array to scan across the focal plane of a germanium IR lens in approximately 1.5 seconds. Software within the camera permits the 120.times.120 pixel thermal images to be stored in flash memory cards or downloaded directly to a laptop or desktop computer for processing. The calibrated thermal images may be displayed with numerous colormaps on either the color LCD display of the camera or on the computer displays.

Radiometric IR cameras that operate at a video rate are nearing the end of development. Such cameras promise the thermal accuracy of the still IR cameras with image acquisition at the faster video rate.

Thermal images from radiometric cameras such as those described above provide a wealth of thermal information which can be analyzed and processed. The data is basically a matrix of temperatures in which each element corresponds to a pixel in the thermal image. It is common for IR camera manufacturers to provide software which computes thermal histograms of the scene and user selectable area or line indicators which then provide thermal properties of the selected area or line region of the image.

Thermal Imaging as an Indicator of Backfat

Driven by consumer desire for leaner meat products, there is application in the livestock industries for accurate and convenient methods to evaluate fat content or lean:fat ratios. While the total dissection of muscle mass is still the most accurate method, livestock producers and processors have long measured backfat thickness via ultrasound or directly as an indication of lean:fat ratios. A number of inventors have attempted to employ noninvasive thermal imaging to obtain an indication of lean:fat ratios and other meat quality measurements.

1.7. Calculation of Volumetric Measurements

Silhouette (Profile) vs. 3D Calculations of Volume

In order to evaluate the need for three-dimensional data techniques, it is of value to consider the calculation of volume for a standard geometric shape such as a cylinder.

First consider computing the volume of a cylinder from one or several side views. The diameter and length of the cylinder are D and L, respectively. From any side view, a silhouette or profile approach sees a rectangle that has width, D, and length, L. Any attempt at estimating volume from silhouette data would yield a cylinder volume of:

$$V_{silhouette} = D^2 L \quad (1\text{-}1)$$

where $V_{silhouette}$ is the volume of the cylinder using silhouette data; D is the cylinder diameter; and L is the cylinder width.

Considering the same cylinder from side views with 3D data yields the true cylinder volume:

$$V_{3D} = \pi D^2 L/4 \quad (1\text{-}2)$$

$$\text{ERROR} = V_{silhouette}/V_{3D} - 1 = D^2 L/\pi D^2 L/4 - 1 = 4/\pi - 1 = 27.3\%; \quad (1\text{-}3)$$

Considering the same cylinder from side views with 3D data yields the true cylinder volume:

$$V_{3D} = \frac{\pi D^2 L}{4}; \quad (1\text{-}2)$$

with variables as defined previously.

To evaluate the error of the volume calculation using silhouette or profile in formation:

$$\text{ERROR} = \frac{V_{silhouette}}{V_{3D}} - 1 = \frac{D^2 L}{\frac{\pi D^2 L}{4}} - 1 = \frac{4}{\pi} - 1 = 27.3\%; \quad (1\text{-}3)$$

A natural defense for the above error estimation is that a silhouette view from the end of the cylinder would acquire the necessary circular data. However, in the evaluation of livestock, most silhouette methods use only side and top. Logistically, an end view requires that a camera be placed directly in the path of the animal and an opposing wall be placed at the opposite end. A second practical consideration is that such an end view, in profile, would not be accurate if the animal axis was slightly skewed in one direction or the other. The profile would also be compromised if the head of the animal was turned to one side.

From the above considerations it is evident that a true three-dimensional imaging system will more accurately represent the volume of an animal than silhouette or profile systems.

SUMMARY OF THE INVENTION

The present invention has been conceived to obtain volumetric, curvilinear and linear measurements of livestock animals and full carcasses, specifically cattle, and hogs. Important goals of the invention are to provide significantly improved accuracy over existing technology and also to increase the speed of acquiring these measurements.

This invention may be used to acquire physical dimensions of cattle or hogs as they pass through a common chute as shown in FIG. 2-1. In this example, range cameras with illuminators are located on three sides of the target animal. An infrared camera is also positioned over the animal to obtain thermal images of the back region. Proximity sensors are aligned to trigger image acquisitions as the animal moves through the target region. The dimensional data is processed and displayed. FIGS. 2-2A and 2-2B show examples of the 3D data available from this invention for a cow and a pig, respectively. A horizontal plane, a vertical plane, and three camera positions are also shown.

2.1. True 3D Surface and Volumetric Measurements

This invention provides a true three-dimensional (3D) data set. From such a 3D data set the accurate computation of volumes, curvilinear surface measurements, and linear measurements are possible. This level of accuracy for a 3D data set is far superior to a simple silhouette or profile data set. The level of accuracy possible with a true 3D data set is also superior to a 2D video data set with (or without) a superimposed grid. FIGS. 2-3A, 2-3B, 2-3C, and 2-3D show a comparison of these three types of data sets with the silhouette shown in the top positions, the 2D video image in the center positions, and the true 3D data set of this invention in the bottom positions.

The silhouette or profile data only provides measurement potential around the outline of the silhouette since no landmarks exist within the darkened shape. Two orthogonal silhouette views, combined to calculate a pseudo-volume, lack the ability to recognize shape concavities and provide only a gross estimation of volume.

The 2D video image has the volumetric limitations of the silhouette data with no ability to account for surface concavities. Though the 2D video data does provide the ability to locate landmarks within the 2D silhouette outline, all surface features and measurements are obtained as their corresponding projections onto a flat, 2D surface. The limitations of the 2D view may be illustrated by observing lines A-B and C-D shown on the skin of the animals in the 2D and 3D views. The 2D side views show no evidence of the surface curvature. The 3D data, also taken from the side, may be rotated to show the true surface curves. FIG. 2-4 shows these surface lines. FIG. 2-4a shows the 2D lines, while FIGS. 2-4b and c show two examples of the 3D lines.

Additional 3D data sets are displayed in FIGS. 2-5A and 2-5B. FIG. 2-5A shows a cow in rear-side, side, and front-side views. FIG. 2-5B shows a pig in front-side, side, and rear-side views. The aforementioned data sets should be compared with the limited silhouette data of FIGS. 2-6A, 2-6B, and 2-6C. When observing FIG. 2-6B it is useful to note that any hip width measurements, obtained from a silhouette, develop gross errors if the animal turns slightly to one side or the other.

2.2. Range Images A range image is an image whose values represent distances from the imaging device. A range image taken from an airplane flying over a mountain range becomes a topographical map when the plane-to-ground distances are referenced to sea level. This invention makes use of range images and range cameras. For the purposes of this patent application a range camera is a device which acquires single or multiple images of a scene and converts those images into a range image output.

A range image may be further described as a grayscale image in which each grayscale pixel value represents a surface elevation instead of the common brightness level. The surface elevation values are referenced to a designated reference plane perpendicular to the axis of the camera lens. FIG. 2-7 illustrates a range camera or 3D camera having a square block and a cone within its field of view. The output range image is shown as a mesh diagram to indicate the pixel elevations which naturally resemble the height of the original targets.

FIG. 2-8a shows a very simple example of a three-dimensional block within an x-y-z coordinate system. If a range camera were placed above the block with the lens axis aligned parallel to the z-axis, a range image matrix similar to that of FIG. 2-8b might result. This is an N×M matrix in which each element value represents a measure of the surface elevation above a reference plane perpendicular to the camera axis. The zero values within the matrix represent those regions of the image where the x-y plane is visible from above. The '3' values within the matrix represent the top surface of the block. The N rows represent incremental steps along the y-axis while the M columns represent incremental steps along the x-axis. FIG. 2-8c shows the range image data represented as a mesh surface which naturally resembles the original target block.

2.3. Range Camera Technology.

Definitions.

For the purposes of this patent, a range camera is any device which provides as its output a three-dimensional data set related to the physical surface or volume of a target located within its field of view. The wide assortment of technologies which may be employed to acquire these 3D data have been discussed in Section 1.4. Any present or new range camera technology which is not described herein, but provides such 3D data, is anticipated under this description and is apparent to anyone skilled in the art.

A large subset of range cameras, which are especially applicable to this invention, includes a visible-spectrum camera capable of obtaining a 2D image, a means of digitizing the 2D image, and sufficient signal processing to convert the digitized 2D image into a 3D surface or volume according to the specific range camera principles. The visible-spectrum camera of this subset may acquire image frames at various speed. An analog video camera may be used to acquire images at a video rate of 30 frames per second with a frame grabber employed to digitize the images. A digital video camera might acquire digital images at a rate of 30 frames per second and download the digital images to a processing unit in real time. A still digital camera may be used to acquire images individually or at a modest frame rate. In the extreme, a still 35 mm camera might even be employed to conceptually demonstrate a capability by acquiring images on film, developing the film, digitizing the images, and processing the images in a non-real-time manner.

In general, within this document, range camera refers to the entire acquisition and processing system which results in a 3D data set; visible-spectrum camera refers to an optical system for acquiring 2D images indicating intensities of reflected light within the visible bands of the electromagnetic spectrum; Infrared or thermal camera refers to an infrared optical system and image acquisition system which results in a 2D thermal image. The meaning of the term, camera, used alone, is most often evident from the paragraph content (i.e., camera positions refers to the positions of visible-spectrum, range, and infrared cameras). The description of a range camera position is often identical to a visible-spectrum camera position for those range camera technologies that employ a visible-spectrum camera to acquire the initial 2D image. The processing component of such a range camera has no fixed physical position since the processing is often done remotely via software or dedicated hardware. While these general terminology guidelines are meant to be helpful, the obvious specifics of local context shall take precedence.

Key Characteristics.

In order to fulfill the primary goals of this invention, the selected range camera or range camera technology should exhibit the following characteristics:

1) a resistance to motion artifacts; and
2) a high animal throughput rate.

A secondary goal is to accomplish the complete output at a video rate (30 frames per second).

For a range camera, motion artifact resistance has two components. The first component is the accurate acquisition of each individual image acquired by a camera. A fast shutter speed or short image acquisition time, used in conjunction with a narrow flash pulse, is able to 'freeze' motion to avoid a blur in that individual image. The second component concerns those range cameras that require multiple images to compute the 3D range image. If the target has moved between these multiple images, the potential for image-to-image misalignment is present. The individual image blurring can be improved with image processing techniques applied to each individual image. The image-to-image misalignment due to motion can be improved by image correlation or realignment techniques applied among multiple images. The simplest and fastest method to address these issues is to use a camera system with a fast shutter speed to minimize blurring of an individual image and to choose a range camera technology which requires as few images as possible to minimize image-to-image motion misalignment.

The desire to provide range images at or near video rates has additional considerations. For range camera technologies which require more than a single image to compute the range image, the input images must be acquired at a rate substantially faster than 30 frames per second. For example, a range camera technology that requires 3 images to compute a range image must acquire those images at better than 90 frames per second in order to output range images at the video rate. In addition to acquiring the images, each image must be downloaded and processed by the processor within the designated time for one video frame ({fraction (1/30)} second). A scanning system that requires 100 images to map out the range image cannot easily acquire, download, and process that quantity of images fast enough to achieve the 30 frames per second output.

A high animal throughput results from efficient processing algorithms in computing the range image, merging multiple surfaces, and computing the desired volume measurements. These goals benefit from a minimal number of images to compute the range image and a high-speed DSP (digital signal processor). Minimizing the number of cameras also improves processing speed.

Table 2-1 compares the range camera technologies best suited for the present invention. These are active depth from defocus, active stereo, active laser stripe triangulation, and active depth from focus. Pulsed or modulated light (or IR) was not included in this table since such time-of-flight systems are slower point or line scan system which may lack axial resolution due to the high frequency processing required to measure variations in light propagation times.

TABLE 2-1

COMPARISON OF ACTIVE OPTICAL, RANGE CAMERA TECHNOLOGIES

|  | DEPTH FROM DEFOCUS | DEPTH FROM FOCUS | LASER STRIPE TRIANGULATION | STEREO |
|---|---|---|---|---|
| cameras per view | 1 | 1 | 1 | 2 |
| laser safety concern | no | no | yes | no |
| data acquisition speed | fast, 2-3 sequential images | medium, requires automated lens focusing through range and the acquisition of multiple images | medium-slow, requires laser scanning in multiple positions and the acquisition of multiple images | fast, 2 simultaneous images |
| single image computation | no, 2-3 typical | no, multiple images required while focusing lens | no, multiple images corresponding to each stripe position | no, requires 2 images, one from each of 2 cameras |
| algorithm stability with surface obstructions present | very stable | very stable | may become unstable | may become unstable |
| surface resolution | depends on illumination and optics | depends on optics and focal steps | high | high |
| registration | relatively easy, single camera with 2 or 3 images | moderately easy, 1 camera with multiple images, must watch for change in magnification with focus change | moderately difficult due to multiple images and stripes | moderately difficult due to registration of 2 cameras |

From this comparison the characteristics of active depth from defocus technology appears as to be a good match with the requirements of this invention. With a low number of images to compute the range image, this technology can achieve a reasonably fast image acquisition rate. The low number of images also minimizes processing time to permit faster animal throughput. Added bonuses include non-laser structured light sources for eye-safe operation and single camera (per view) operation to reduce equipment costs.

Correction for Lens Distortion.

Any range camera technology employing visible-spectrum cameras relies heavily upon the integrity of the 2D image in order to extract 3D information by the selected range camera principles. The 3D features present in the 2D image may be significantly altered by lens distortion within the 2D camera system. For this reason is necessary to correct the 2D image for lens distortion.

2D images used to extract 3D information must be corrected for lens distortion. This correction occurs after the 2D image has been digitized and before attempting to extract 3D information from the image. Since the target animal is large and the desired lens-to-target, working distance is reasonably under 12 feet, a wide angle lens is a logical selection. Images taken with such a wide-angle lens system will result in a barrel distortion effect. Conversely, if a longer, telephoto lens is used, (requiring a much longer working distance) a pincushion distortion results. FIG. 2-8B shows examples of these types of distortion. FIG. 2-8Ba illustrates a rectangular grid similar in concept to one that might be used to calibrate the present invention (many more lines would be on the actual grid used for calibration). FIG. 2-8Bb shows a barrel distortion similar to what might be seen with a wide angle lens. The region of the image near the center is enlarged and the region around the edges is smaller. FIG. 2-8Bc shows a pincushion distortion similar to what might be seen with a telephoto lens. The portion of the image near the center is smaller and the region around the edges is larger. Most lenses and lens systems have a variation on these types of distortion.

Correction of these distortions, as well as other that may occur, may be accomplished via commercially available software packages if the processing interface is acceptable. Commercially available software packages are available to correct the image for such distortion. Such a package as LensDOc™ from Andromeda Software (699 Hampshire Rd., Ste. 109, Thousand Oaks, Calif., 91361) provides such processing for photo software packages such as Adobe Photoshop and Paint Shop Pro.

Custom correction of just the resulting measurements may also be accomplished by knowledge of the distortion magnitude as shown in FIG. 2-8C. If the size of each square in the barrel distortion of FIG. 2-8Bb is measured and the values (cross-sectional distance or square root of each area) are plotted across the image on the center of each square, a surface will be formed across the image that has greater magnitude in the image center and lesser magnitude at the edges of the image. A contour plot of the resulting surface is shown in FIG. 2-8Ca. FIG. 2-8Cb shows the same surface in a mesh surface plot format. In FIG. 2-8Da the surface values from point A to point B are shown with the associated values being less than the nominal value in the middle of the image, $h_1$ as shown on the graphs. By computing the average surface value over the distance A-B, a compensation factor for the distance may be computed. Since A-B of the image is shorter than the true A-B due to the shrinking of peripheral regions in a wide-angle lens, multiplication of the measured A-B distance by $h_1/h_{avg}$ will result in the proper enlargement of the measured A-B distance to take into account the lens distortion. The distance correction for the lens distortion is:

$$k=h_1/h_{avg}; \text{ and} \qquad (2\text{-}3)$$

$$d_{corrected}=k*d_{measured}. \qquad (2\text{-}4)$$

This calibration factor, k, may be passed to the calibration block within the processing channel.

The basic process for correcting the barrel distortion described above may be applied for the pincushion distortion illustrated in FIG. 2-8Bc or to other distortions which may be encountered. While optics with no or minimal distortion are always preferred, some level of distortion may be removed in the above manner.

2.4. Camera Positions

In general, the selection of the number and location of range cameras required to accurately reproduce a target is largely dependent upon the complexity of the target surface. In the case of live or carcass animals, such as cattle and hogs, a three camera configuration such as that shown in FIG. 2-9 is acceptable. Each range camera obtains a range image of the animal surface within its field of view. As shown in FIG. 2-9, orthogonal camera orientations may be chosen with camera axes aligned from the right and left sides and the top. Such orthogonal orientations result in the surface seams as shown. Seams 1-2 and 3-2 are in regions where there is an overlap of range image surfaces. This provides sufficient surface accuracy to achieve the desired volume calculations. However, with the camera alignments shown, the 1-3 seam has no surface overlap. This potential shortcoming may be remedied by aligning side cameras 1 and 3 in the lower positions labeled, 'alternate camera 1 axis' and 'alternate camera 3 axis', respectively. In these alternate alignments, there is more surface overlap along the ventral surface of the animals while maintaining sufficient overlap in the two upper seams. Since the entire surface of the animal is recorded, this range camera configuration permits very accurate volumetric measurements as well as curvilinear and linear measurements.

If it is desired to reduce the count of range cameras for cost of other reasons, it is possible to rely upon the lateral symmetry of the animal and still obtain a reasonably accurate measurement of volumes. FIG. 2-10a shows a 2-camera configuration in which the single side camera obtains a range image that is mathematically duplicated and reversed to represent the range image of the opposite side. The top camera is essential to accurately measure the position of the median or mid-sagittal plane about which the two side images are aligned. This concept is reasonably sound when the target animal is symmetrical. Measurement errors may appear if lateral symmetry is not precise for some reason. Any diagonal movement of the animal in the chute will be observed from the top camera. For completeness, the top camera may theoretically be replaced by a mechanical method which locates the median plane. FIG. 2-10b shows such a mechanical method. A saddle-like device with a dorsal plane may be lowered onto the back of the animal. The saddle shape will align the dorsal plane with the median plane of the animal. The side range camera can measure the orientation of the dorsal plane and in turn compute the axis of symmetry corresponding to the median plane. Any attempt to use lateral symmetry to compute volumes without locating the median plane can easily result in significant errors.

FIG. 2-11 shows how errors result in calculating cross-sectional area or volume from the use of symmetry with an erroneous positioning of the median plane. FIG. 2-11a shows the attempted use of a single camera which has no means of accurately determining the median plane position from a side view. The correct position of the median plane is position B. Positions A and C are erroneous on either side of position A. FIGS. 2-11b, c, and d show cross sections of the resulting volumes obtained by using an assumption of symmetry and the median plane positions of FIG. 2-11a. FIG. 2-11b uses median plane position A which results in an serious underestimation of volume. FIG. 2-11c uses median plane position B which results in an accurate calculation of volume. FIG. 2-11d uses median plane position C which results in an serious overestimation of volume.

2.5. Fast, Motion-Resistant Image Acquisition

The targets for this invention are live animals or full carcasses, specifically those of cattle and hogs. As discussed previously, since live animals are seldom still, it is evident that a fast shutter speed or a rapid image acquisition is advantageous to avoid blurring of all acquired images used as the basis to compute physical measurements. FIGS. 2-12A and 2-12B simulate the effects caused by motion. Excluding the application of extraordinary resolution enhancement techniques, the resolution of the range image is limited by the resolution of the initial camera image. The resolution of the initial camera image is greatly reduced by motion artifacts and blurring. The required shutter speed is related to the desired resolution and the motion speed in the following manner:

$$R=VS; \quad (1\text{-}1)$$

where R is the desired resolution on the surface of the target in inches; V is the velocity of the target in inches per second; and S is the shutter speed or image acquisition time in seconds. Equation (1-1) can be rewritten to solve for the required shutter speed given a desired resolution:

$$S=R/V;$$

where the variables are as previously defined. The following table provides some sample shutter speeds for given velocities and resolutions (units have been converted as needed).

| RESOLUTION, R | VELOCITY, V | SHUTTER SPEED, S |
|---|---|---|
| 1 inch | 1 inch/sec | 1 sec |
| 0.5 inch | 5 inches/sec | 100 ms (1/10 sec) |
| 0.1 inch | 20 inches/sec | 5 ms (5/1000 sec) |
| 0.1 inch | 5 mph | ~1/1000 sec |
| 1 mm | 5 mph | 447: µs |
| 1 mm | 1 mph | 2.24 ms |

(The above calculations assume that the optics and image pixel density is sufficient to achieve the stated resolutions.)

2.6. Advantageous Camera Characteristics

Since the core of many range camera technologies is a visible spectrum camera, it is advantageous for the visible spectrum cameras used as part of this invention to have a number of specific characteristics. These characteristics include fast image acquisition or shutter speeds, multi-camera synchronization, structured light systems which project pre-selected patterns onto the targets, both slow and fast frame rates, color image capability, and standby image feed to assist with animal alignment.

The need for fast acquisition or shutter speeds has already been presented. Target motion is the driving requirement for this characteristic. The acquisition speeds need to be coordinated with the animal or carcass velocity and the desired resolution. From a system perspective it may be possible to reduce the speed requirements and cost of the camera systems by simply designing a different chute system which slows the animals down as they pass through the camera area. Conversely, if animal throughput is the priority, acquiring a higher-priced, faster camera system may be the most efficient approach.

Since multiple cameras are proposed for this invention, a synchronization method is advantageous. If digital still cameras are employed, an electronic trigger may be used to initiate all cameras in the system. The same trigger signal may be used, perhaps with a pre-selected delay, to trigger a flash system projecting the structured light patterns onto the target during the acquisition time of a given camera. To avoid crosstalk from one flash pattern to an adjacent camera, it may be useful to stagger the triggers to each camera slightly or vary the acquisition (shutter) delays for each camera.

FIG. 2-13 shows several timing options for such systems. FIG. 2-13a shows a basic camera timing diagram. A trigger pulse (top trace) is provided to a given camera. After a brief shutter delay, the shutter is opened for a period in which the image is acquired (center trace). At an appropriate moment during the acquisition time the flash is fired projecting the structured light pattern on the surface of the target (bottom trace of FIG. 2-13a). FIG. 2-13b shows a timing diagram with simultaneous shutter opening and staggered flashes. This particular approach may be useful during system setup to identify regions of the target surface where the range images overlap, but it would not solve concerns about one cameras flash being picked up by an adjacent camera because all the acquisition times of all cameras occur simultaneously. FIG. 2-13c provides a timing solution to the crosstalk concerns. In this timing diagram both the shutter and flash periods are staggered such that the acquisition time for a given camera can only be illuminated by its own flash unit.

If video cameras are employed with the system, the crosstalk issue is somewhat more complex. Ideally, the flash unit and camera units would be aimed such that cameras are not influenced by adjacent flash units. This would avoid the need for more complex timing solutions. If crosstalk is unavoidable, the video cameras may be synchronized and sequential frames used for each camera with a given camera's flash illuminating the target only during the designated frame. At a 30 Hz frame rate, three sequential frames would take 100 ms or 0.1 seconds. Spreading the image acquisition out over this amount of time may make the system vulnerable to motion artifacts and blurring. If such is the case, using video cameras with faster shutter speeds is an option. The faster shutter speeds enable all cameras and flashes to be triggered during a single video frame. If the video cameras have the capability to vary the shutter timing within a video frame, that method could be used. Otherwise the synchronization of the video signals can be used to stagger the acquisition times sufficiently. The latter approach is also valuable if the range camera technology requires multiple images to obtain a range image.

The image acquisition rate is largely a function of camera selection. Still digital cameras may be used for obtaining range images several seconds apart. Video cameras may be used to acquire images at a video rate. High-speed, video cameras with accelerated frame rates are also available if faster acquisition rates are necessary.

While monochrome images are sufficient for most range camera purposes, the relatively inexpensive use of color cameras has at least one significant application. That application is the identification of animal breed or perhaps even the individual animal by use of the color and pattern markings of the animal's coat. Cattle breeds in particular may easily be identified by color or markings. Individual animals often exhibit unique spot patterns.

A video feed from the either a digital camera or a video camera to a monitor located near the control unit may be an advantage. Such a monitor can be used by the operating personnel to confirm the position of the animal during the measurement process.

2.7. Structured Light Systems

Numerous structured light configurations are possible for the range cameras discussed within this application. Perhaps the simplest is a lens projection system which projects the desired pattern onto the target. Modulated laser systems which rapidly scan the target are also possible, though complex scanning alignments and intensity modulation can result in a relatively, high priced system. The projected pattern may be a grid, a series of dots, bars, or other custom shapes. The particular pattern is selected to match the range camera technology.

2.8. Data Acquisition

The data of this invention is acquired with an equipment layout similar to that shown in FIG. 2-14. In this layout, the target animal enters the chute area from the right and proceeds into the central region where the cameras are positioned. Proximity switches on either side of the proper zone indicate electronically when the animal is in position. Range cameras with the appropriate flash illumination patterns are positioned on each side of the target animal and above the animal to obtain two side and one top view of the subject. An infrared (IR) camera is positioned above the hindquarters of the animal to obtain a thermal image of the animal's back in order to provide an indication of backfat. FIG. 2-15 shows a typical range camera layout. The range image data, shown only for Range Camera 2, is referenced to a horizontal plane through the center of the target animal. The IR camera is positioned in line with the top range camera, #2.

Upon acquiring the appropriate images, these digitized images are downloaded to the Processing Unit shown near the chute area in FIG. 2-14. The Processing Unit in turn passes the data to the personal computer for display and storage of the data. While the Control and Processing Unit and the personal computer are shown alongside the chute, these components may be located a significant distance from the chute area provided that transmission speed and accuracy are not compromised.

2.9 Data Processing

The data obtained from the visible spectrum cameras of FIGS. 2-9, 2-14, and 2-15 must be processed to obtain the range images and then undergo further processing to form the complete 3D model. Once in the form of a 3D model the data may be interrogated to obtain many useful measurements. Conceptually, FIG. 2-16 shows the processing progression. Range cameras acquire 3D data from the target animal and convert them into point cloud format. The control and processing unit, containing sufficient processing power and memory, convert the data into a more useful format. These data can now be display and interrogated via a laptop or desktop computer which in turn may communicate with selected peripheral devices.

Processing Channel

The processing channel from visible spectrum cameras to measurement tables and display is shown in greater detail in FIG. 2-17. In this Figure, the target animal is illuminated with structured illumination and images are obtained from three strategic camera positions (additional or fewer positions may be required for a shaper of different complexity). Each of the digital images are processed by the range image algorithm to obtain a three-dimensional point cloud set. These points may be oriented somewhat arbitrarily with respect to a given coordinate system. The mesh algorithm is applied to each view data set to convert the arbitrarily-spaced point cloud data into a mesh surface with a grid coordinate system. The mesh algorithm is described hereinafter and is illustrated in FIG. 2-19, and in FIGS. 2-20A through 2-20H. Upon application of the mesh algorithm to each of the three different view data sets, the data takes the form shown in FIG. 2-21. In FIG. 2-21 the three, 3D views of the target animal exist separately but with the same coordinate system. The 3D merger algorithm is then used to align, register and combine the independent view data sets into one unified data set. Once the three separate sets are combined, both default and custom measurements can be made. The output of these measurements can be provided in quantitative tables, graphic displays, or in any other format commonly used for viewing or analyzing data.

FIG. 2-18 shows the same processing channel as FIG. 2-17 only with the addition of a thermal imaging camera for obtaining thermal images as an indication of backfat thickness.

Mesh Processing

The mesh processing algorithm shown in FIGS. 2-17 and 2-18 is presented in greater detail in FIG. 2-19 and FIGS. 2-20A through 2-20H. The point cloud data set from one range camera view is the input to the mesh algorithm. FIG. 2-19 shows the next processing step to be Delaunay triangulation. This step produces a set of lines connecting each point in the 3D set to its natural neighbors. The result of Delaunay triangulation is a triangular mesh surface with non-uniform sampling in any specific coordinate system. A rectangular grid is next generated with dimensions similar to those of the triangular mesh. Using the triangular mesh data an interpolation techniques is used to match the triangular data set to the rectangular grid samples. The output of this process is a 3D surface with points located on a rectangular grid ready for merging operations based on a standard rectangular coordinate system.

Merging Different Views

The data from three different views, shown graphically in FIG. 2-21, must be merged into one cohesive, 3D model. An understanding of the data strengths and weaknesses is valuable before attempting this step. FIG. 2-22 shows the relationship between the accuracy of the surface data and its position within the range camera's field of view. Surface data obtained from the center of the camera's field of view where the surface tangent is normal to the camera axis, is likely to be highly accurate. However, surface data obtained from the outer regions of the camera's field of view, where the surface tangent is nearly parallel to the camera axis, is likely to suffer greater error. The graph of the surface error as a function of the angle between the camera axis (or view axis) and the surface tangent is shown in the lower portion of FIG. 2-22.

FIG. 2-23 shows this concept in a slightly different manner. As two adjacent surface are to be merged, the most accurate resulting surface can be obtained by considering the surface error graphed in FIG. 2-22 and shown as a surface confidence interval along portions of the surface position. In FIG. 2-23, the surface position is most accurate directly in front of a given camera view and less accurate away from the cameras where the surface seams must be aligned in order to merge the surfaces.

With the above information, the different surfaces can be merged via a process which aligns the data according to a common grid coordinate system (obtain within the mesh algorithm). At and near the seams, the merging algorithm can apply a weighted average of the two overlapping surfaces. The weighted average surface position at the seams should then emphasize surface data that is closer to a given cameras FOV center. Where both surfaces are away from the FOV center, equal averaging and surface continuity must be employed.

Volumetric Processing

The description provided thus far regarding treatment of the 3D data sets has focused on treatment of the data as a surface function using meshes and grids. These data may also be treated as true volume. Merging and mathematically operating on volume sets is intuitively simpler since it resembles combining 3D blocks in one form or another. However, computer memory required to manipulate 3D volumes in a brute forms implementation is somewhat staggering. A 3D data set oriented in a volume that is 256×256×256 voxels results in 16.8 Mb that must be manipulated with each operation. A surface approximation is substantially less.

To address the memory issue of true volume mathematics, a representation referred to as octrees are sometimes used. This construct applies a tree structure to represent small and large blocks within a volume. A fair treatment of these concepts is beyond the scope of this application. However, the use of volumetric processing techniques as an alternative to the mesh methods described herein is an anticipated extension of the technology of the present invention.

Hardware Components

FIG. 2-24 shows one basic hardware configuration for the present invention. In this Figure three visible-spectrum cameras and one IR camera are aimed at the target animal. If the cameras are video cameras, the images may be acquired via frame grabbers. If the cameras are digital still cameras, the interface is more likely to be USB, parallel, or serial. After acquisition the images are stored in system memory. The images in memory are passed back and forth to the digital signal processing (DSP) block for rapid processing as described previously by the aforementioned algorithms. Also from the DSP block will come control signals for such uses as flash and camera synchronization, animal gates, alarms, etc. The DSP block interfaces with the personal computer (PC) to provide the PC with the processed data. In this configuration most of the computing will be allocated to the DSP because of its computational speed. However, it may be advantageous to permit some calculations to be conducted on the PC side since there resides significant computing capability at this site as well. The PC is the interface for many peripheral devices. Those shown include, but are not limited to, a printer, a local or remote network, the internet, external memory storage, PDAs, a wireless link, and an infrared link.

2.10. Thermal Imaging as a Measure of Backfat

IR Camera Technology

The same speed concerns expressed for the visible spectrum camera hold for the infrared or thermal camera. The state-of-the-art infrared imaging in the 8-12 μm spectral band, is now in an advanced development stage. Present IR cameras currently are substantially slower and possess lower resolutions (see embodiment section). Video-rate thermal imaging is currently under development and will soon provide a better technological match for this application.

Mapping the IR Image to the Volumetric Surface

FIG. 2-25 illustrates the concept of projecting or warping the planar thermal image onto the 3D surface of the target surface. FIG. 2-25a shows the planar thermal image suspended over the 3D target surface. FIG. 2-25b shows the same thermal data projected onto the 3D surface. Both thermal images are shown in isothermal contours. Other display modalities include color mapping of thermal images, raised contours, raised mesh or combinations of the above.

Mathematically, this is accomplished quite easily. The thermal image, $I_{thermal}$, is an M×N matrix of temperature values. The M and N indices also have x and y coordinates associated with them such that kM×kN are the dimensions of the x-y surface contained in the thermal image. The 3D surface matrix, $I_{surface}$, has x, y, and z coordinates associated with it. If $I_{surface}$ is an M×N matrix containing z elevations or surface positions, then it is straightforward to generate a new matrix that is N×M×2 in which the x and y positions correspond to the N and M dimensions of the new matrix and each matrix position has both a z dimension and a temperature associated with it. In the more likely situation where $I_{thermal}$ and $I_{surface}$ are not ideally aligned matrices, those skilled in the art can interpolate matching x and y positions within each matrix and generate a new matrix which aligns the x-y positions and assigns z elevations and temperature values to each element in the new matrix.

Application to Backfat Measurements

The ability to project 2D thermal images onto a 3D surface provides additional precision for established thermal techniques to indicate backfat. While the 2D thermal image necessarily records thermal data that is not normal to the skin surface, a 3D thermal projection can easily be rotated and analyzed at a viewing angle normal to the skin surface. Such capability enables calculations of thermal properties per true surface area instead of the distorted surface area measurement previously available from 2D thermal images.

Schaefer et al., U.S. Pat. No. 6,123,451, presents a process for determining a tissue composition characteristic of an animal via 2D infrared thermographic imaging. U.S. Pat. No. 6,123,451 involves the acquisition of a 2D thermal image of the animal and/or carcass, calculating statistical information from the thermal image, inputting the statistical information into a predictive model, and solving the predictive model for tissue composition characteristics such as lean body mass, carcass fat composition, and lean yield. Correlation data presented in the patent provided correlation coefficients between 2D thermal properties and stated variables that ranged from r=00.94 ($r^2$=0.89) to r=0.72 ($r^2$=0.52). This was accomplished using 2D IR images. With the present 3D invention, as described above, the skin surface can be thermally analyzed from a normal viewing perspective. With interpolative techniques, each representative area of the skin surface will contribute uniformly to the thermal statistics used to evaluate the animal.

Additionally, statistical calculations may be established using the 3D thermal image. Such statistical measurements as mean, median, and standard deviation of thermal properties may be used to identify those animals which fall outside of a predetermined or learned range of temperatures. For example, a sampled selection of animals from a herd may be found to exhibit acceptable backfat measurements using ultrasonic techniques. These same animals may be used to establish a normal range of thermal properties including a mean, median and/or standard deviation. With the use of the present invention, a much larger number of animals may be quickly measured and the data accurately recorded. Any significant deviation from the measurements of the standard group may be identified as lower quality meat. The present invention includes not only the tools for identifying the outliers, but also the methods for establishing the standards group and formulas for inclusion and exclusion.

Tong, et al., U.S. Pat. No. 5,595,444, improves upon the invention of U.S. Pat. No. 5,58,418 (Jones, Schaefer, Tong, Scott, Gariepy, and Graham) for identifying cattle and swine that are likely to provide poor meat quality. This invention acquires 2D thermal images of the animals and identifies those that statistically fall outside of a range of normal for a given herd or group as those likely to provide poor meat quality. This work was done using only 2D thermal images.

2.11 Measurement Techniques

Volumetric and Dimensional Measurements Calculated Directly from 3D Data

Once the surface of the target animal has been established, a volume can be calculated between any two planes. FIG. 2-26 illustrates this principle. FIG. 2-26a represents the animal torso (which could also be a whole carcass) with its longitudinal axis aligned with the x-axis of a reference coordinate system. FIG. 2-26b shows a slice of the torso in cross section parallel to plane A. The following equation represents the cross section of slice i:

$$A_i = \int_{y_1}^{y_2} f(y)dy - \int_{y_1}^{y_2} g(y)dy \quad (2\text{-}1)$$

where $A_i$ is the cross-sectional area at point, $x_i$, located at or between planes A and B of FIG. 2-26a. Referring to FIG. 2-26b, $y_1$ is the minimum y-value of the irregular, circular cross section with $y_2$ being the maximum y-value of the same irregular circle. The upper portion of the cross-sectional circle is the function, f(y) while the lower portion of the same cross-sectional irregular circle is the function, g(y). The cross-sectional area of the volumetric slice is the shaded area enclosed by f(y) on the top and g(y) on the bottom.

The truncated volume bounded by planes, A and B, may be found from equation (2-2) below:

$$V_{AB} = \sum_{i=1}^{n} \Delta x A_i; \quad (2\text{-}2)$$

where $V_{AB}$ is the volume between planes A and B; i is the number of the individual planes within the summation; $\Delta x$ is the incremental x-axis separation between planes used to compute the volume; and $A_i$ is the area of each separate cross section; n is the number of cross sections used to compute the volume and may be computed from equation 2-3 below.

$$n = L/\Delta x; \quad (2\text{-}3)$$

where L is the separation between planes A and B; and $\Delta x$ is the incremental x-axis steps between plane samples used in the volume calculation.

The above calculation permits a range of useful calculations since the positions of planes A and B may be anywhere within the volume of the animal or carcass. Those positions may be established by pre-determined default values or by user selection.

Numerous dimensional measurements are possible from the 3D data set. Some of these measurements include hip height, hip width, cross-sectional area at the hip, and cross-sectional area at the shoulder.

To measure hip height, it is first necessary to identify a search range along the x-axis, $x_C$ to $x_D$, as oriented in FIG. 2-26a. Hip height is the global maximum (referenced to the floor plane) of all the local maximum values for each $f_i(y)$ as defined in equation (2-1). Hip height may be found from equation (2-4) below:

$$H_{hip} = \max[\max(f_i(y))]; \quad (2\text{-}4)$$

where $f_i(y)$ is the topmost edge of cross-sectional area, $A_i$, as shown in FIG. 2-26b.

To measure hip width, an array of $y_1$ and $y_2$ values (FIG. 2-26b), can be processed as shown in equation (2-5).

$$W_{hip} = \max[y_{2i} - y_{1i}]; \; i = C \text{ to } D \quad (2\text{-}5)$$

where $y_{2i}$ and $y_{1i}$ are the $y_1$ and $y_2$ bounds of the $i^{th}$ cross-sectional area shown in FIG. 2-26b; and C and D are x-axis bounds surrounding the hip region.

To measure shoulder width, an array of $y_1$ and $y_2$ values (FIG. 2-26b), can be processed as shown in equation (2-6).

$$W_{shoulder} = \max[y_{2i} - y_{1i}]; \; i = E \text{ to } F \quad (2\text{-}6)$$

where $y_{2i}$ and $y_{1i}$ are the $y_1$ and $y_2$ bounds of the $i^{th}$ cross-sectional area shown in FIG. 2-26b; and E and F of equation (2-6) are x-axis bounds surrounding the shoulder region.

Cross-sectional areas at any x-axis location are possible by selecting the x-axis index and computing the corresponding y-z plane area as described by equation (2-1).

Circumferential measurements may be made by reference to FIG. 2-27a and b. Using calculus methods the distance along top half of the cross section, f(y), in FIG. 2-27a may be computed by formulating an equation for f(y) and parametrizing it for arc length, s over the y-axis interval from $y_1$ to $y_2$. A numeric approach for this operation is shown in FIG. 2-27b. In this a magnified portion of f(y) is shown such that the individual points along the line, f(y), are visible. Equation (2-7) describes the incremental arc length, $\Delta s_i$, along line, f(y), from points $f(y_i)$ to $f(y_{i+1})$.

$$\Delta s_i = \sqrt{(y_{i+1} - y_i)^2 + (z_{i+1} - z_i)^2} \quad (2\text{-}7)$$

The arc length of the line segment, f(y), from $y_1$ to $y_2$ is then given by equation (2-8).

$$s_{f(y)} = \sum_{i=1}^{n-1} \Delta s_i; \quad (2\text{-}8)$$

where $S_{f(y)}$ is the arc length along the line, f(y); $\Delta s_i$, is the incremental arc length between points; i is the elemental index; and n is the number of points along f(y) from $y_1$ to $y_2$ in FIG. 2-27a.

The arc length of the line segment, g(y), from $y_1$ to $y_2$ may be similarly expressed as:

$$s_{g(y)} = \sum_{i=1}^{m-1} \Delta s_i; \quad (2\text{-}9)$$

where $s_{g(y)}$ is the arc length along the line, g(y); $\Delta s_i$, is the incremental arc length between points; i is the elemental index; and m is the number of points along g(y) from $y_1$ to $y_2$ in FIG. 2-27a.

The total circumference, $C_A$, at any point, A, along the x-axis may then be computed as the sum of the line segment lengths for f(y) and g(y), namely:

$$C_A = s_{g(y)} + s_{g(y)} \quad (2\text{-}10)$$

where $s_{f(y)}$ and $s_{g(y)}$ are defined in equations (2-8) and (2-9), respectively.

Building on equation (2-10), the hide surface area, $SA_{AB}$, may be computed between points A and B on the longitudinal x-axis as shown in FIG. 2-28 and equation 2-11 below.

$$SA_{AB} = \sum_{j=1}^{p-1} \Delta x C_j; \quad (2\text{-}11)$$

where $SA_{AB}$ is the hide surface area; $\Delta x$ is the incremental x-axis, separation between circumferential slices, and $C_j$ is the circumference of each individual slice.

To measure the overall length of the animal it simply necessary to obtain the coordinates for the nose, [$x_{head}$, $y_{head}$, $z_{head}$], and those for the most distant part of the hindquarters, [$x_{tail}$, $y_{tail}$, $z_{tail}$]. The overall length is the linear distance between those two points, namely:

$$L_{overall} = \sqrt{(x_{head} - x_{tail})^2 + (y_{head} - y_{tail})^2 + (z_{head} - z_{tail})^2} ; \quad (2\text{-}12)$$

where $L_{overall}$ is the head-to-tail length as measured from the tip of the nose to the beginning of the tail; and x, y, and z coordinates are as subscripted.

While some sample measurements have been presented herein, it is obvious to those skilled in the art that many more measurements are available from the three-dimensional data set acquired by the apparatus and methods described herein. It is the intent of this application to include those physical dimensions which can be computed in a manner similar to the measurements shown above.

Measurements Calculated from Scaled Model Characteristics

The present invention includes the ability to utilize data from external databases via scaling factors. If external databases contain measurement data common to those measurements available from this invention, and other data not in common with resident measurements, then a scaling factor may be computed to provide scaled external data as an estimate for the present animal.

An example of such scaling follows. From techniques described herein, the following linear measurements are obtained from a cow: $M_1$, $M_2$, $M_3$, $M_4$, $M_5$ and $M_6$. An external database contains linear cattle measurements, $M_{x3}$, $M_{x4}$, $M_{x7}$, $M_{x8}$, $M_{x9}$, $M_{x10}$. Since both sources contain linear measurements 3 and 4 a scale factor, k, may be computed to scale the external data such that it may be used as an estimate for the present cow as shown in equations (2-13) and (2-14), $$k = M_3/M_{x3} = M_4/M_{x4}, \quad (2\text{-}13)$$

therefore, $$M_3 = k \cdot M_{x3} \text{ and } M_4 = k \cdot M_{x4}. \quad (2\text{-}14)$$

The present cow now has the following measurements and estimated measurements:

direct measurements: $M_1$, $M_2$, $M_3$, $M_4$, $M_5$ and $M_6$
estimated measurement from external data:
k $M_{x3}$, k $M_{x4}$, k $M_{x7}$, k $M_{x8}$, k $M_{x9}$, k $M_{x10}$.

It should be noted that the scalar, k, from the above example was for linear measurements such as hip height or hip width. If the scale factor is computed from linear measurements and applied to area or volume measurements, it must be squared or cubed, respectively, as shown in equation (2-15) and (2-16).

$$M_3 = k \cdot M_{x3}; \quad (2\text{-}15)$$

However, $$A_3 = k^2 \cdot A_{x3} \text{ and } V_3 = k^3 \times V_{x3}; \quad (2\text{-}16)$$

where $M_3$ and $M_{x3}$ are linear measurements, $A_3$ and $A_{x3}$ are area measurements and $V_3$ and $V_{x3}$ are volume measurements. Since measurements such as weight are proportional to volume, weights are scaled by the factor, $k^3$.

Measurements as Functions of Other Measurements

Measurements may also be functions of other measurements. These other measurement may be resident to the system of this invention or external to the system. These functions may be of one variable or multivariate. Examples of functional relationships of variables are shown below in equation (2-17).

ratio: $M_2 = kM_1$;

linear: $M_2 = kM_1 + C$;

nth order polynomial: $M_2 = k_1 M_1 + k_2 M_1^2 + \ldots k_n M_1^n + C$; and multivariate: $M_5 = k_1 M_1 + k_2 M_2 + k_3 M_3 + k_4 M_4 + C \quad (2\text{-}17)$ 2.12. Analysis of Measurement Data With the complete 3D data set available from this invention and the numerous volumetric and dimensional measurements which can be computed from that data set, a number of statistical analyses are possible and advantageous. Some of those are listed below.

Histograms, Averages and Distributions

The automated measurements obtained from an individual animal or carcass at any given time can be combined in any number of ways with measurements obtained at different times or from different animals or carcasses. One of the more useful analyses and displays for this type of data is a histogram as shown in FIG. 2-29. From such an analysis can be learned the distribution type (i.e., normal or bimodal), the mean, median, and standard deviation (normal distribution). Comparing a measurement histogram from one group to that of another group enables an evaluation of the measurement value (mean) as well as the consistency of that value (standard deviation). By tracking the same group over time, the mean value indicates the progress toward a measured goal while the standard deviation is a measure of consistency. FIG. 2-29a shows the measurement data as a basic histogram. The mean value, m, is indicated near the center of the histogram. The standard deviation is an indication of the histogram spread. FIG. 2-29b shows a comparison of three different groups for the same measurement. These three groups have different means and the third group (bottom graph) shows a larger standard deviation. FIG. 2-29c show how one measurement changes with time for the same group. In this example, the mean value increases with time and the standard deviation remains nearly constant.

Cluster Analysis

A cluster analysis is a useful statistical tool for data such as these. A cluster analysis is a scatter diagram where the data are plotted as a function of two or more measurements. FIG. 2-30 shows cluster graphs of two and three measurements. FIG. 2-30a shows a cluster graph for two different measurements. FIG. 2-30b shows a cluster graph for three measurement types. For the data of this invention, it may be useful to indicate boundary limits for measured values as shown in FIG. 2-31. The scatter diagram with the square or cube boundaries graphically indicates where measurements fall outside of the predetermined limits.

Other Statistical Analyses

The statistical analyses which may be conducted with the data from this invention are by no means limited to only those presented within this application. Those skilled in the art can easily apply other commonly known methods in a manner similar to those described herein.

2.13. Application of Volumetric and Dimensional Data to Livestock Evaluations

Histograms and Cluster Analyses

FIG. 2-32 shows the application of histogram data to livestock measurement data. Simulated samples show data from two different groups of animals. Boundary limits are also shown which can be used to identify livestock which may require some manner of special treatment.

FIG. 2-33 shows the application of cluster plots to livestock measurement data. Simulated samples show data from two different groups of animals. Boundary limits are also shown (cube outline) which can be used to identify livestock which may require some type of special treatment.

Favored Path Concept

This invention provides an automated, convenient approach for obtaining large quantities of accurate measurement data from livestock and carcasses. Since these data can be acquired frequently from large groups of animals, it becomes practical to use these data to manage livestock breeding, feedlot operations, and slaughterhouse operations more efficiently. One such management strategy will be referred to within this application as the favored path concept or simply the favored path.

FIG. 2-34 illustrate this concept in its simplest sense. The favored size path, P(t), is shown as a dotted line. The actual mean size (by whatever measurement) nearly follows the favored path during time, $t_1$ to $t_2$. After $t_2$ the actual growth drops off significantly. The level of success assigned to the actual size in FIG. 2-34 is based upon the ability to meet or exceed that exhibited by the favored path.

FIG. 2-35a illustrates the favored path concept using histograms as functions of time. Similar to FIG. 2-34, the mean curve closely follows the favored path from 0 through $t_4$, departing from the template at times greater than $t_4$. This FIG. introduces the notion that Measurement 1 is a distributed variable. The limits bounding the mean curve (+/−2σ in this example) provide a selection criteria which can be used to screen animals exhibiting characteristics outside the boundaries. FIG. 2-35b extends the favored path concept to more variables. In this case the path, is a function of Measurement 1 and Measurement 2. The limits or bounds also take on additional dimensions. This concept can be expanded to include any number of variables (though graphical presentations are limited to three-dimensions).

Automated Grading

The automated grading techniques, which will be described hereinafter in Section 3.8, are made possible by the volumetric imaging described herein. Competitive systems which rely only on 2D images, are not likely to possess the measurement accuracy necessary to automatically grade the cattle or hogs.

Predictive Grading via Multivariate Growth Charts

The predictive grading, described hereinafter takes the grading information available from the meat processor and makes it available earlier, to the advantage of the breeder, feedlot operator, and meat processor. The multiple measurements available from the present invention make the use of multivariate growth charts feasible.

Automated Production Segmentation

The breakdown of a carcass into its numerous meat cuts or segments typically occurs during processing. The measurements of the present invention permit reliable estimates of this production to be made prior to slaughter as will also be described hereinafter. Further, the automated grading and predictive grading, described previously, enable reasonable projections of that information to be made available while the animal is still in the feedlot.

Breeding Evaluations

The statistical analyses of the data which becomes available as a result of this invention should be quite valuable to livestock breeder. By providing periodic feedlot growth data, final slaughterhouse dimensions, and meatpacking quality, the breeder will be equipped to confirm both major and minor changes in the breeding lines. This degree of data tracking is essential if the hog and cattle industries are to meet their goals for leaner and more efficient production.

For example, if a particular breeding program yields hip height measurements with higher mean values and smaller standard deviations, it may be concluded that said breeding program is successful in creating larger animals of a consistent size. In comparison, if a second breeding program yields hip height measurements with the same high mean value but with a substantially larger standard deviation, the second breeding program has the potential for yielding large animals, but the large standard deviation indicates that the yield reliability is uncertain.

Feedlot Evaluations

Feedlot evaluations offer rewarding benefits with this invention. The two-axis cluster diagram of FIG. 2-36 illustrates the management powers provided by this technology. In FIG. 2-36 five different groups of livestock are shown progressing through a feedlot. The horizontal axis is time while the vertical axis is any single measurement of choice which indicates some degree of growth or other parameter of value. In this example, measurements are taken with the present invention at times, $t_1$, $t_2$, $t_3$, $t_4$, and $t_5$. Immediately after the $t_5$ measurements, qualifying livestock are shipped to market. The analysis is not unlike classes entering and graduating from a school. Upon entering the feedlot, Group 1 is measured. Those animals within the expected measurement limits progress through the feedlot planned feedlot program scheduled between times 1 and 2. Those animals measuring above the upper threshold limit are advanced one group into Group 2 just as smart students might be advanced a grade. Upon arriving at time 2, each group is measured. Those animals measuring above the upper threshold are advanced to the next group. Those animals measuring within the expected range proceed through the planned feeding program. Those animals measuring below the lower threshold are held back one group to repeat the 'curriculum' just administered. While FIG. 2-36 shows a simplified implementation of the concept, in reality the system can be implemented with N measurements used as the parameters for advancement, retention and graduation. Those animals which are repeatedly retained merit special consideration, perhaps disposal or direct shipment to the slaughterhouse.

The simulated cluster plots of FIG. 2-37 illustrate a three-variable evaluation of animals moving through the feedlot. The 3D cube edges of FIG. 2-37d indicate the evaluation boundaries. These same boundaries are shown, two variable at a time, in parts a), b) and c). The favored path line indicates a 300 day path through the feedlot. The multi-variable slope of this line indicates the growth relationship of the various measurement parameters to each other. The pass, retention and graduation operations described in FIG. 2-36 also apply in the multi-variable case of FIG. 2-37 (only the graphics get much more complicated).

The multi-measurement, favored path concept discussed previously can also be applied within the feedlot management. Empirically, a favored path, exhibiting specific growth rates, measurement ratios and time progression characteristics can be identified. Initially, it may be simply the measurement progress of a top-quality group of animals. Each time a better group passes, the better path becomes the favored path. After sufficient experience, a deviation from the favored path can be detected at the next measurement session and corrective actions taken. This adaptive process may be used to optimize feeding program, breeding stock and many other parameters.

Harvesting (Slaughterhouse) Evaluations

Measurements taken upon arrival to the slaughterhouse can be used to confirm end feedlot conditions, transportation losses, and final live breeding data. The continued data stream of measurements augments the feedlot information. Payment to livestock owners may be based on more accurate information. Additionally, the detailed dimensions may be of value in automating meatpacking strategy and planning.

Carcass Evaluations

In a manner well understood by those skilled in the art, whole or carcass measurements can be used to correlate with live animal measurement and develop a tighter tracking throughout the livestock chain.

2.14. User Interface.

A key component to this invention is a convenient, useful, user interface. FIG. 2-38 shows a component of that user interface. Vertical lines A-A and B-B may be moved along the appropriate livestock image. If processing times are short enough, or if they have been computed in advance, the measurements may be updated as the cursors scroll along the length of the animal. If longer processing times are necessary, the measurements may be updated upon a mouse click or keystroke. The positions of A-A- and B-B may be user selected, user default values, or manufacturer, default values. Further details of one embodiment of a user interface are provided in Sections 3.12.

With this in mind, it is an object of present invention to provide a method and apparatus for measuring the physical characteristics of livestock animals such as cattle and hogs. More particularly, it is an object of the invention to provide a method and apparatus of the aforementioned character for obtaining data concerning volumetric, curvilinear (surface) and linear measurements of livestock animals such as cattle and hogs and the full carcasses thereof that can be analyzed to provide information that will substantially assist the commercial producer of livestock animals in producing a high-quality end-product for the consumer while adding profitability to the enterprise.

Another object of the invention is to provide a method and apparatus as described in the preceding paragraph which will efficiently produce data useful to the livestock producer for breeding evaluations.

Another object of the invention is to provide a method and apparatus of the character described that will efficiently produce data useful to the feedlot manager in economically managing the health and growth of the cattle delivered to the feedlot.

Another object of the invention is to provide a method and apparatus of the character described which, through the use of a plurality of strategically positioned cameras and appropriate data processing means associated therewith that will produce accurate three-dimensional data sets representing the surface of the livestock animal.

Another object of the invention is to provide a method and apparatus of the character described in the preceding paragraph in which the three-dimensional data sets representing the surface of the livestock animal are used to determine the volume of the animal.

Another object of the invention is to provide a method and apparatus of the character described in the preceding paragraph in which the three-dimensional data sets representing the surface of the livestock animal are used to determine the hip height of the animal.

Another object of the invention is to provide a method and apparatus of the character described in the preceding paragraph in which the three-dimensional data sets representing the surface of the livestock animal are used to determine the hip width of the animal.

Another object of the invention is to provide a method and apparatus of the character described in the preceding paragraph in which the three-dimensional data sets representing the surface of the livestock animal are used to determine the cross-sectional area at the hip of the livestock animal.

Another object of the invention is to provide a method and apparatus of the character described in the preceding paragraph in which the three-dimensional data sets representing the surface of the livestock animal are used to determine the cross-sectional area at the shoulder of the livestock animal.

Another object of the invention is to provide a method and apparatus of the character described in the preceding paragraph in which the three-dimensional data sets representing the surface of the livestock animal are used to determine the overall length of the animal.

By way of summary, one form of the method for measuring the physical characteristics of a livestock animal comprises the steps of positioning the livestock animal within a defined target zone; using the first camera, obtaining a range image of the first side of the livestock animal; using the second camera, obtaining a range image of the second side of the livestock animal; and using the third camera, obtaining a range image of the back portion livestock animal. The first second and third range images thus obtained are entered into the data processing means of the invention where the images are processed in a manner to form a three-dimensional data set representing the surface of the livestock animal.

In another form of the method of the invention the downloaded first, second and third range images are processed by a range image algorithm to obtain used to form a three-dimensional point cloud set from which a data set representing the surface of the livestock animal is then produced.

After the three-dimensional data set has been obtained, the data processing means can be used to analyze the data set in a manner to determine the volume, hip height, hip width, cross-sectional area at the hip of the animals, cross-sectional area at the shoulder of the animal and the length of the livestock animal.

BRIEF DESCRIPTION OF THE DRAWINGS

FIG. 1-1 illustrates various options for accomplishing three-dimensional surface measurements.

FIG. 1-2 illustrates various optical options for accomplishing three-dimensional surface measurements.

FIG. 2-1 is a generally perspective view of one form of the apparatus of the invention for measuring the physical characteristics of a livestock animal.

FIG. 2-2A is a generally perspective, diagrammatic view illustrating the positioning of the cameras used to obtain the range images from which the three-dimensional image of the surface characteristics of the cow shown in the drawing is determined.

FIG. 2-2B is a generally perspective, diagrammatic view illustrating the positioning of the cameras used to obtain the range images from which the three-dimensional image of the surface characteristics of the pig shown in the drawing is determined.

FIG. 2-3A is a generally diagrammatic view comprising silhouette, two-dimensional and three-dimensional front side views of a cow.

FIG. 2-3B is a generally diagrammatic view comprising silhouette, two-dimensional and three-dimensional rear side views of a cow.

FIG. 2-3C is a generally diagrammatic view comprising silhouette, two-dimensional and three-dimensional front side views of a pig.

FIG. 2-3D is a generally diagrammatic view comprising silhouette, two-dimensional and three-dimensional rear side views of a pig.

FIG. 2-4 is a generally diagrammatic view comprising two-dimensional and three-dimensional line segments.

FIG. 2-5A is a series of generally perspective views of three-dimensional data of a cow.

FIG. 2-5B is a series of generally perspective view of three-dimensional data of a pig.

FIG. 2-6A is a series of views of silhouette data of a cow taken from the side, rear and top of the cow.

FIG. 2-6B is a pair of views of silhouette data of a cow taken from two off-axis angles.

FIG. 2-6C is a pair of views of silhouette data of a pig taken from the top and side of the pig.

FIG. 2-7 is a generally perspective view illustrating the basic function of the cameras that form a part of the apparatus of the invention.

FIG. 2-8 shows at the upper portion a generally diagrammatic perspective view of a simple target block within an X, Y, Z coordinate system; at the central portion is a generally diagrammatic plan view of a range image matrix of the assembly shown in the upper portion; and at the lower portion is a generally perspective view of a mesh surface representing a three-dimensional data surface.

FIG. 2-9 is a generally diagrammatic view showing the orientation of the cameras used to obtain the rate images from the target animal.

FIG. 2-10A is a generally diagrammatic view illustrating the placement of cameras in an alternate form of the apparatus of the invention.

FIG. 2-10B is a generally diagrammatic view illustrating a mechanical means for identifying the median plane of the target animal.

FIG. 2-11 is a generally diagrammatic view illustrating the necessity of establishing the median plane position.

FIG. 2-12A is a generally illustrative view showing motion artifacts caused by slow camera operations in obtaining the image of a cow.

FIG. 2-12B is a generally illustrative view showing motion artifacts caused by slow camera operations in obtaining the image of a pig.

FIG. 2-13 is a generally diagrammatic view showing a timing diagram with simultaneous shutters and staggered flash to identifying regions of the target surface where range images overlap.

FIG. 2-14 is a generally diagrammatic plan view of an alternate form of the apparatus of the present invention that makes use of three video cameras.

FIG. 2-15 is a generally perspective view of still another alternate form of the apparatus of the invention that makes use of three video cameras.

FIG. 2-16 is a generally perspective, diagrammatic view illustrating the general signal processing stages of one form of the method of the invention.

FIG. 2-17 is a generally diagrammatic view illustrating the manner of processing the range data obtained by a three-camera system.

FIG. 2-18 is a generally diagrammatic view illustrating the manner of processing the range data obtained by a three-camera system along with thermal imaging.

FIG. 2-19 is a generally diagrammatic view of one form of video camera layout for obtaining range images of the target animal and illustrating the processing steps of one form of invention for converting a point cloud into a mesh system.

FIG. 2-20A is a generally diagrammatic view illustrating the processing steps required to convert a three-dimensional point cloud of data into rectangular grid mesh.

FIG. 2-20B is a generally diagrammatic view further illustrating the processing steps required to convert a three-dimensional point cloud of data into a rectangular grid mesh.

FIG. 2-20C is a generally diagrammatic view further illustrating the processing steps required to convert a three-dimensional point cloud of data into a rectangular grid mesh.

FIG. 2-20D is a generally diagrammatic view further illustrating the processing steps required to convert a three-dimensional point cloud of data into a rectangular grid mesh.

FIG. 2-20E is a generally diagrammatic view further illustrating the processing steps required to convert a three-dimensional point cloud of data into a rectangular grid mesh.

FIG. 2-20F is a generally diagrammatic view further illustrating the processing steps required to convert a three-dimensional point cloud of data into a rectangular grid mesh.

FIG. 2-20G is a generally diagrammatic view further illustrating the processing steps required to convert a three-dimensional point cloud of data into a rectangular grid mesh.

FIG. 2-21 is a series of generally perspective views showing the merging of the view surfaces of a pig.

FIG. 2-22 is a generally perspective, diagrammatic view illustrating the merging of the various view surfaces captured by the range cameras of the apparatus of the invention.

FIG. 2-23 is a generally diagrammatic view depicting the confidence intervals for the surface positioning in each of the side and top views of the target animal.

FIG. 2-24 is a generally diagrammatic view illustrating the data processing of the images received from the video cameras of the apparatus shown in FIG. 2-14.

FIG. 2-25 is a generally diagrammatic, exploded view illustrating the projection of the planer thermal image obtained by the thermal camera of the apparatus of the invention into a three-dimensional target surface.

FIG. 2-26 is a generally diagrammatic view illustrating the calculation of volumes from a sum of cross-sectional areas.

FIG. 2-27 is a generally diagrammatic view illustrating circumferential measurements of the animal torso in accordance with one form of the method of the invention.

FIG. 2-28 is a generally diagrammatic view illustrating the calculation of hide or surface area of the target animal.

FIG. 2-29 is a generally diagrammatic view illustrating useful statistical measurements available from the data produced in the practice of the method of the present invention.

FIG. 2-30 is a generally diagrammatic view illustrating cluster graphs for two measurements types and three-measurement types.

FIG. 2-31 is a generally diagrammatic view illustrating cluster graphs useful and indicating boundary limits and animal measurements that have fallen outside predetermined limits.

FIG. 2-32 is a generally diagrammatic view of various histograms representing livestock measurements obtained in the practice of the method of the present invention.

FIG. 2-33 is a generally perspective diagrammatic view of cluster plots representing livestock measurements.

FIG. 2-34 is a generally diagrammatic view of the simplest form of the favored path concept of one form of the method of the present invention.

FIG. 2-35 is a generally diagrammatic view further illustrating the favored path concept of one form of the method of the present invention using histograms and a measurement cluster graphs.

FIG. 2-36 is a generally diagrammatic view of a cluster analysis plot of a feedlot strategy using data developed in the practice of the method of the present invention.

FIG. 2-37 is a generally diagrammatic view showing cluster plots of group data taken at several times during this day of the animal at a feedlot.

FIG. 2-38 is a generally diagrammatic view illustrating one form of user interface for obtaining custom measurements.

FIG. 3-1A is a generally perspective, fragmentary view of an alternate form of a camera arrangement of the apparatus of the invention.

FIG. 3-1B is a generally perspective, fragmentary view of still another form of camera and illuminator arrangement of the apparatus of the invention.

FIG. 3-1C is a generally perspective, fragmentary view of yet another form of camera and illuminator arrangement of the apparatus of the invention.

FIG. 3-2 is a generally perspective view of another form of the apparatus of the invention which includes a differently configured chute construction.

FIG. 3-3 is a generally perspective view of yet another form of the apparatus of the invention.

FIG. 3-4 comprises a top and side view of a form of the apparatus embodying a chute of different construction.

FIG. 3-5 is a generally perspective view of still another form of the apparatus of the invention that embodies a two camera system.

FIG. 3-6 is a generally perspective, fragmentary view illustrating one type of proximity sensor construction.

FIG. 3-7 is a generally diagrammatic view comprising a schematic representation of the various components of one form of the apparatus of the invention.

FIG. 3-8 is a generally diagrammatic view illustrating one form of user interface for obtaining custom measurements.

FIG. 3-9 comprises a side and front view of an animal carcass of the character that can be analyzed in accordance with one form of the method of the invention.

FIG. 3-10 is a side view of a plurality of animal carcasses being carried on a conventional conveyor system.

FIG. 3-11 is a generally diagrammatic view illustrating the application of the methods of the invention to the measurement of animal carcasses.

FIG. 3-12 is a generally diagrammatic block diagram representation of MATLABS processing for transforming 30 data sets into rectangular surface mesh coordinates.

FIG. 3-13 comprises generally perspective views of the projection of a planar thermal image onto a 3D target surface.

FIG. 3-14 is a chester analysis plot illustrating one type of feedlot strategy.

FIG. 3-15 comprises a series of cluster plots of group data.

FIG. 3-16 is a generally illustrative view showing the various U.S. Quality Grades for beef cattle.

FIG. 3-17 is a generally diagrammatic view illustrating one form of automated grading method.

FIG. 3-18 is a generally illustrative view showing the various U.S. yield grades for beef cattle.

FIG. 3-19 is a generally illustrative view showing the various U.S. feeder cattle grades in terms of the thickness.

FIG. 3-20 is a generally illustrative view showing the various U.S. feeder cattle grades in terms of frame size.

FIG. 3-21 is a generally illustrative view showing an angus beef guide.

FIG. 3-22 is a generally illustrative view showing various cuts of beef.

FIG. 3-23 is a generally illustrative view showing various cuts of pork.

FIG. 3-24 is a generally diagrammatic view illustrating beef cattle yields.

FIG. 3-25 is a generally diagrammatic view illustrating various pork cuts.

FIG. 4-1 is a generally perspective view of an alternate form of the apparatus of the invention for measuring the physical characteristics of a livestock animal.

FIG. 4-2 is a top view of the apparatus shown in FIG. 4-1.

FIG. 4-3 is an end view of the structure which positions the animal and which supports the various cameras of this latest form of the apparatus of the invention.

FIG. 4-4 is a bottom view of the structure, which positions the various cameras of this latest form of the apparatus of the invention.

FIG. 4-5 is a cross-sectional view taken along lines 4-5-4-5 of FIG. 4-3.

FIG. 4-6 is a cross-sectional view taken through the center of one of the chute entrances shown in FIG. 4-1.

FIG. 4-7 is a generally diagrammatic view of the system components of one form of the apparatus of the invention.

FIG. 4-7A is a block diagram illustrating the general system hardwired layout of one form of the apparatus of the invention.

FIG. 4-7B is a block diagram illustrating an alternate general system layout in a wireless configuration.

FIG. 4-8 is a 3D data set representing the anatomical, outer surface of the target animal.

FIG. 4-9A is a point cloud graphical representation of the anatomical outer surface of the target animal shown FIG. 4-9C.

FIG. 4-9B is a mesh triangle representation of the anatomical outer surface of the target animal derived from the point cloud representation shown in FIG. 4-9A.

FIG. 4-9C is a representation of the anatomical outer surface of the target animal.

FIG. 4-10A is a conceptual illustration of the of various beef cuts of a cow carcass.

FIG. 4-10B is a cross-sectional taken along lines A-A of FIG. 4-10A.

FIG. 4-10C is a mesh triangle representation of the anatomical outer surface of the target animal showing the cutaway section depicted in FIG. 4-10B.

FIG. 4-11A is a top plan view of a mesh triangle representation of the anatomical outer surface of the target animal showing the various scanner axes of one form of the method of the invention for acquiring the representations of the anatomical outer surface of the target animal.

FIG. 4-11B is a generally perspective view of a mesh triangle representation of the anatomical outer surface of the target animal further illustrating the various scanner axes of one form of the method of the invention.

FIG. 4-11C is a front view of a mesh triangle representation of the anatomical outer surface of the target animal further illustrating the various scanner axes of one form of the method of the invention.

FIG. 4-11D is a side view of a mesh triangle representation of the anatomical outer surface of the target animal further illustrating the various scanner axes of one form of the method of the invention.

FIG. 4-11E is a generally diagrammatic representation of the right-hand coordinate system used in obtaining the representations of the anatomical outer surface of the target animal in accordance with one form of the method of the invention.

FIG. 4-12A is a top plan view of a mesh triangle representation of the anatomical outer surface of the target animal showing the mid-sagittal plane of the target animal aligned with the scanner axis.

FIG. 4-12B is a generally perspective view of a mesh triangle representation of the anatomical outer surface of the target animal further illustrating the mid-sagittal plane of the target animal aligned with the scanner axis.

FIG. 4-12C is a front view of a mesh triangle representation of the anatomical outer surface of the target animal further illustrating the mid-sagittal plane of the target animal aligned with the scanner axis.

FIG. 4-12D is a side view of a mesh triangle representation of the anatomical outer surface of the target animal further illustrating the mid-sagittal plane of the target animal aligned with the scanner axis.

FIG. 4-13 is a top plan view of a mesh triangle representation of the anatomical outer surface of the target animal showing the mid-sagittal plane of the target animal not aligned with the scanner axis.

FIG. 4-14 is a top plan view of a mesh triangle representation of the anatomical outer surface of the target animal showing the mid-sagittal plane of the target animal established by midpoints.

FIG. 4-15 is a top plan view of a mesh triangle representation of the anatomical outer surface of the target animal showing the mid-sagittal plane of the target animal established by the axis of geometric shape being aligned with the outline of the animal.

FIG. 4-16 is a generally perspective view of a mesh triangle representation of the anatomical outer surface of the target animal illustrating a 3D template scaled to a target animal region to locate a calculation zone on the target animal.

FIG. 4-17A is a generally cross-sectional view of a target animal taken at a first small circumference longitudinal position.

FIG. 4-17B is a cross-sectional view of a target animal taken at a reference circumference longitudinal position.

FIG. 4-17C is a cross-sectional view similar to that shown in FIG. 4-17A, but scaled to an even larger circumference.

FIG. 4-18 is a generally diagrammatic view showing analysis lines for the body condition scoring of a cow in accordance with one form of the method of this latest form of the invention.

FIG. 4-19A is a tail head cross-sectional view of a target animal showing body conditioning scoring curves at various locations.

FIG. 4-19B is a hook bone cross-sectional view of the target animal showing body conditioning scoring curves at various locations.

FIG. 4-19C is a short ribs and loin depression cross-sectional view of the target animal showing body conditioning scoring curves at various locations.

FIG. 4-19D is an individual short ribs cross-sectional view of the target animal showing body conditioning scoring curves at various locations.

FIG. 4-19E is an individual vertebrae cross-sectional view of the target animal showing body conditioning scoring curves at various locations.

FIG. 4-19F is a backbone ridge cross-sectional view of the target animal showing body conditioning scoring curves at various locations.

FIG. 4-20A is a top plan view of a mesh triangle representation of the anatomical outer surface of the target animal showing the hip height measurement.

FIG. 4-20B is a generally perspective view of a mesh triangle representation of the anatomical outer surface of the target animal further illustrating the hip height measurement.

FIG. 4-20C is a front view of a mesh triangle representation of the anatomical outer surface of the target animal further illustrating the hip height measurement.

FIG. 4-20D is a side view of a mesh triangle representation of the anatomical outer surface of the target animal further illustrating the hip height measurement.

Figures 1, 2:
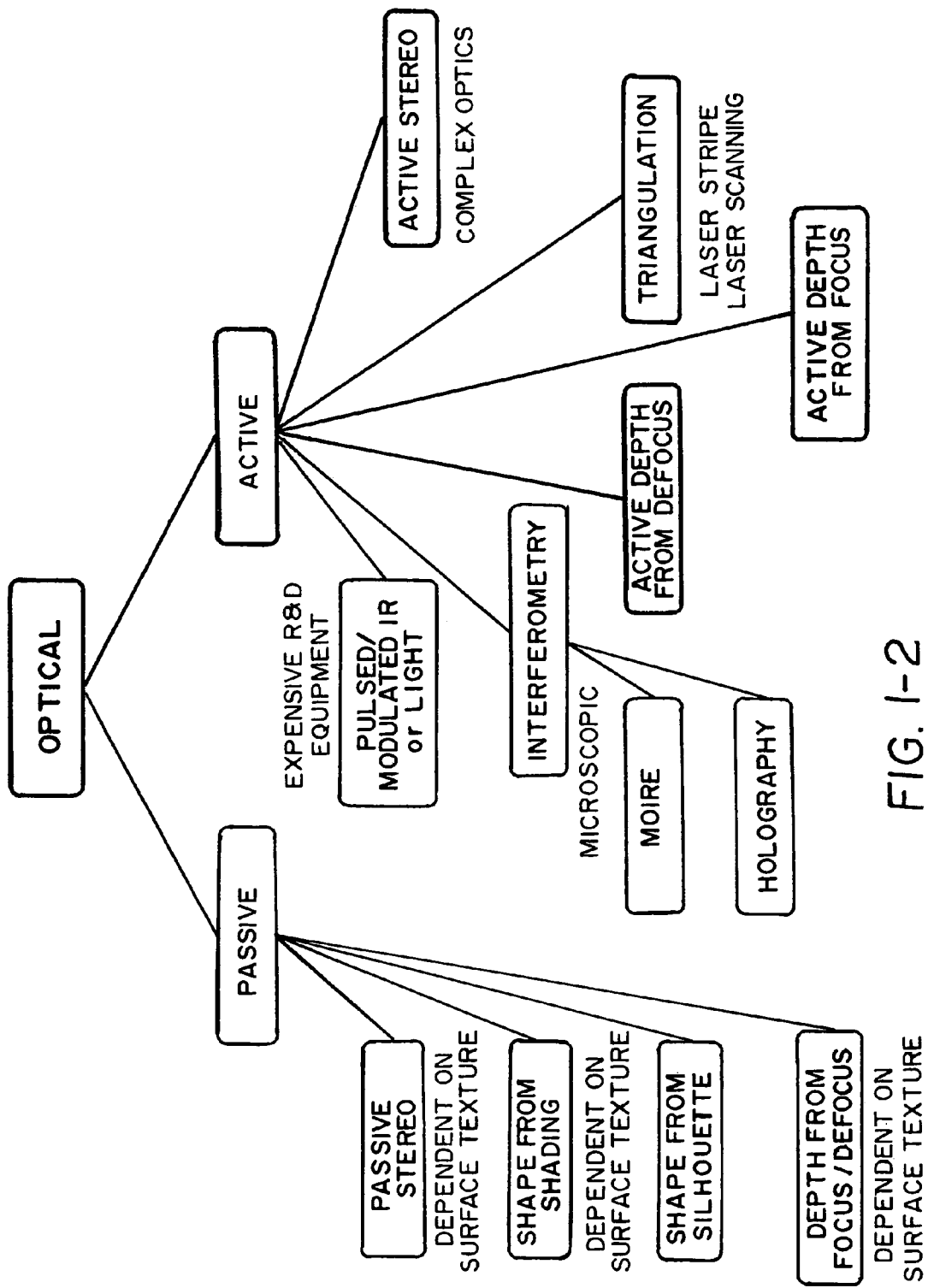

FIGS. 4-21A and 4-21B, when considered together, illustrate the elevation contours that may be used to display hip and shoulder height of the target animal.

FIG. 4-22A is a top plan view of a mesh triangle representation of the anatomical outer surface of the target animal illustrating the rump width measurement.

FIG. 4-22B is a generally perspective view of a mesh triangle representation of the anatomical outer surface of the target animal further illustrating the rump width measurement.

FIG. 4-22C is a front view of a mesh triangle representation of the anatomical outer surface of the target animal further illustrating the rump width measurement.

FIG. 4-22D is a side view of a mesh triangle representation of the anatomical outer surface of the target animal further illustrating the rump width measurement.

FIG. 4-23A is a top plan view of a mesh triangle representation of the anatomical outer surface of the target animal showing the shoulder height measurement.

FIG. 4-23B is a generally perspective view of a mesh triangle representation of the anatomical outer surface of the target animal further illustrating the shoulder height measurement.

FIG. 4-23C is a front view of a mesh triangle representation of the anatomical outer surface of the target animal further illustrating the shoulder height measurement.

FIG. 4-23D is a side view of a mesh triangle representation of the anatomical outer surface of the target animal further illustrating the shoulder height measurement.

FIG. 4-24A is a top plan view of a mesh triangle representation of the anatomical outer surface of the target animal showing the shoulder width measurement FIG. 4-24B is a generally perspective view of a mesh triangle representation of the anatomical outer surface of the target animal further illustrating the shoulder width measurement.

FIG. 4-24C is a front view of a mesh triangle representation of the anatomical outer surface of the target animal further illustrating the shoulder width measurement.

FIG. 4-24D is a side view of a mesh triangle representation of the anatomical outer surface of the target animal further illustrating the shoulder width measurement.

FIG. 4-25A is a top plan view of a mesh triangle representation of the anatomical outer surface of the target animal showing the animal length measurement.

FIG. 4-25B is a generally perspective view of a mesh triangle representation of the anatomical outer surface of the target animal further illustrating the animal length measurement.

FIG. 4-25C is a front view of a mesh triangle representation of the anatomical outer surface of the target animal further illustrating the animal length measurement.

FIG. 4-25D is a side view of a mesh triangle representation of the anatomical outer surface of the target animal further illustrating the animal length measurement.

FIG. 4-26A is a top plan view of a mesh triangle representation of the anatomical outer surface of the target animal illustrating the animal heart girth measurement.

FIG. 4-26B is a generally perspective front view of a mesh triangle representation of the anatomical outer surface of the target animal further illustrating the animal heart girth measurement.

FIG. 4-26C is a generally perspective rear view of a mesh triangle representation of the anatomical outer surface of the target animal further illustrating the animal heart girth measurement.

FIG. 4-26D is a side view of a mesh triangle representation of the anatomical outer surface of the target animal further illustrating the animal heart girth measurement.

FIG. 4-26E is a generally perspective view of a mesh triangle representative of the anatomical outer surface of the target animal further illustrating the animal heart heart girth measurement.

FIG. 4-27 is a generally diagrammatic, tabular view illustrating one form of the process of the invention for computing animal heart girth.

FIGS. 4-28A, 4-28B and 4-28C, when considered together, further illustrate one form of the method of the invention for computing animal heart girth.

FIG. 4-29A is a rib eye cross-sectional view of a target animal illustrating rib eye area scoring value calculations in accordance with one form of the method of the invention.

FIG. 4-29B is a cross-sectional view of a rib eye reference area of a target animal further illustrating rib eye area scoring value calculations in accordance with one form of the method of the invention.

FIG. 4-29C is a cross-sectional view of a smaller rib eye area of a target animal further illustrating rib eye area scoring value calculations in accordance with one form of the method of the invention.

FIG. 4-30A is an increased rib eye area cross-sectional view of a target animal illustrating high body condition scoring in accordance with one form of the method of the invention.

FIG. 4-30B is a reference rib eye area cross-sectional view of a target animal illustrating mid-range body condition scoring in accordance with one form of the method of the invention.

FIG. 4-30C is a reduced rib eye area cross-sectional view of a target animal illustrating low body condition scoring in accordance with one form of the method of the invention.

FIG. 4-31 is a generally diagrammatic, tabular view showing calculation of rib eye areas in a target animal by template matching for size and BCS score.

FIG. 4-32 is a generally perspective, exploded view illustrating hide area calculations made by summing the products of incremental length and incremental circumference.

FIG. 4-33A is a generally perspective, exploded view illustrating a shoulder cross-sectional area of a cow.

FIG. 4-33B is a generally perspective, exploded view illustrating a heart girth cross-sectional area of a cow.

FIG. 4-33C is a generally perspective, exploded view illustrating a rump cross-sectional area of a cow.

FIG. 4-34A is a cross-sectional area illustrating a mismatch shaped in the rib eye region of a cow after best-fit uniform scaling.

FIG. 4-34B is a generally diagrammatic, graphical representation illustrating percent mismatch in skin shapes.

FIG. 4-34C is a generally diagrammatic, graphical representation illustrating nonuniform scale factor.

FIG. 4-34D is a cross-sectional area illustrating non-uniform scaling to achieve an improved fit.

FIG. 4-35 is a generally perspective, exploded view illustrating calculation of live volume by summing the products of incremental length and incremental cross-sectional areas.

FIG. 4-36 is a generally graphical representation showing density adjusted for BCS score.

FIG. 4-37 is a generally diagrammatic view illustrating muscle thickness grade templates from normalized lateral cross section through rump of the Cow.

FIG. 4-38A is a generally perspective mesh triangle view illustrating the location of the cross section of the animal used to evaluate weight muscle thickness grade.

FIG. 4-38B is a generally diagrammatic view illustrating muscle thickness grade determination by means of an oblique cross section taken through the rump region of the animal.

FIG. 4-39 is a generally graphical representation showing a family of frame score curves illustrating the expected growth for bulls.

FIG. 4-40 is a generally diagrammatic view illustrating the patent body conditions scores.

FIG. 4-41 is a generally diagrammatic view illustrating hog BCS scores using template matching and 3-D data.

FIG. 4-42A is a generally graphical representation illustrating calculations of 3DAI hip height computed from 3-D data plotted as a function of time.

FIG. 4-42B is a generally graphical representation illustrating calculations of live weight computed from 3-D data plotted as a function of time.

FIG. 4-43 is a generally diagrammatic view illustrating one embodiment of the method of the invention for determining 3DAI live-weight gain, finished a 3-DAI live-weight and growth curve projection.

FIG. 4-44 is a generally graphical representation illustrating 3DAI live-weight projection based upon early calculations acquired from 0 through 5 months of the age of the animal.

FIGS. 4-45A, 4-45B, 4-45C and a 4-45D when considered together illustrate random distribution search patterns showing pattern convergence with increasing number of iterations.

FIG. 4-46 is a generally diagrammatic view illustrating a random distribution search algorithm used to determine growth curves in accordance with one form of the method of the invention.

FIG. 4-47A and a 4-47B when considered together illustrate a convergence of search parameters toward final values in accordance with one form of the method of the invention.

FIGS. 4-48A, 4-48B, 4-48C and 4-48D when considered together comprise example projections of growth curves from data at ages up to 5 months, 10 months, 15 months and 20 months respectively.

FIGS. 4-49A, 4-49B and 4-49C when considered together comprise histogram representations of her calculations at a given time.

FIG. 4-50 is a generally 3-D graphical representation of herd statistics showing the growth and distribution of the herd overtime for a selected calculation.

FIG. 4-51A and 4-51B when considered together illustrate processing options derived in accordance with one form of the method of the invention to obtain calculation statistics as a function of time and herd composition.

FIG. 4-52A is a generally graphical representation of data derived in accordance with one form of the method of the invention illustrating a present growth curve as a function of a reference growth curve.

FIG. 4-52B is a generally graphical representation of data derived in accordance with one form of the method of the invention showing an animal growth curve histogram.

FIG. 4-52C is a generally graphical representation of derived data herd calculation distributions as a function of time.

FIG. 4-53A is a graphical representation of derived data illustrating live animal weight as a function of animal hip height.

FIG. 4-53B is a graphical representation of derived data illustrating animal hip height as a function of animal feed costs.

FIG. 4-53C is a graphical representation of derived data illustrating feed costs per head of cattle as a function of time.

FIG. 4-53D is a graphical representation of derived data illustrating sales price as a function of total cost.

FIG. 4-53E is a graphical representation of derived data illustrating cost per head as a function of net gain.

FIG. 4-53F is a graphical representation of derived data illustrating a net gain in dollars as a function of time.

FIG. 4-54 is a generally diagrammatic representation of certain animal acquisition data derived in accordance with one form of the method of the invention.

Figure 4:
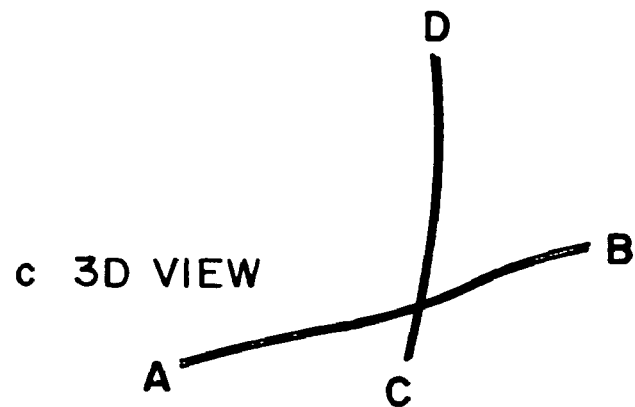
Figures 1, 4:
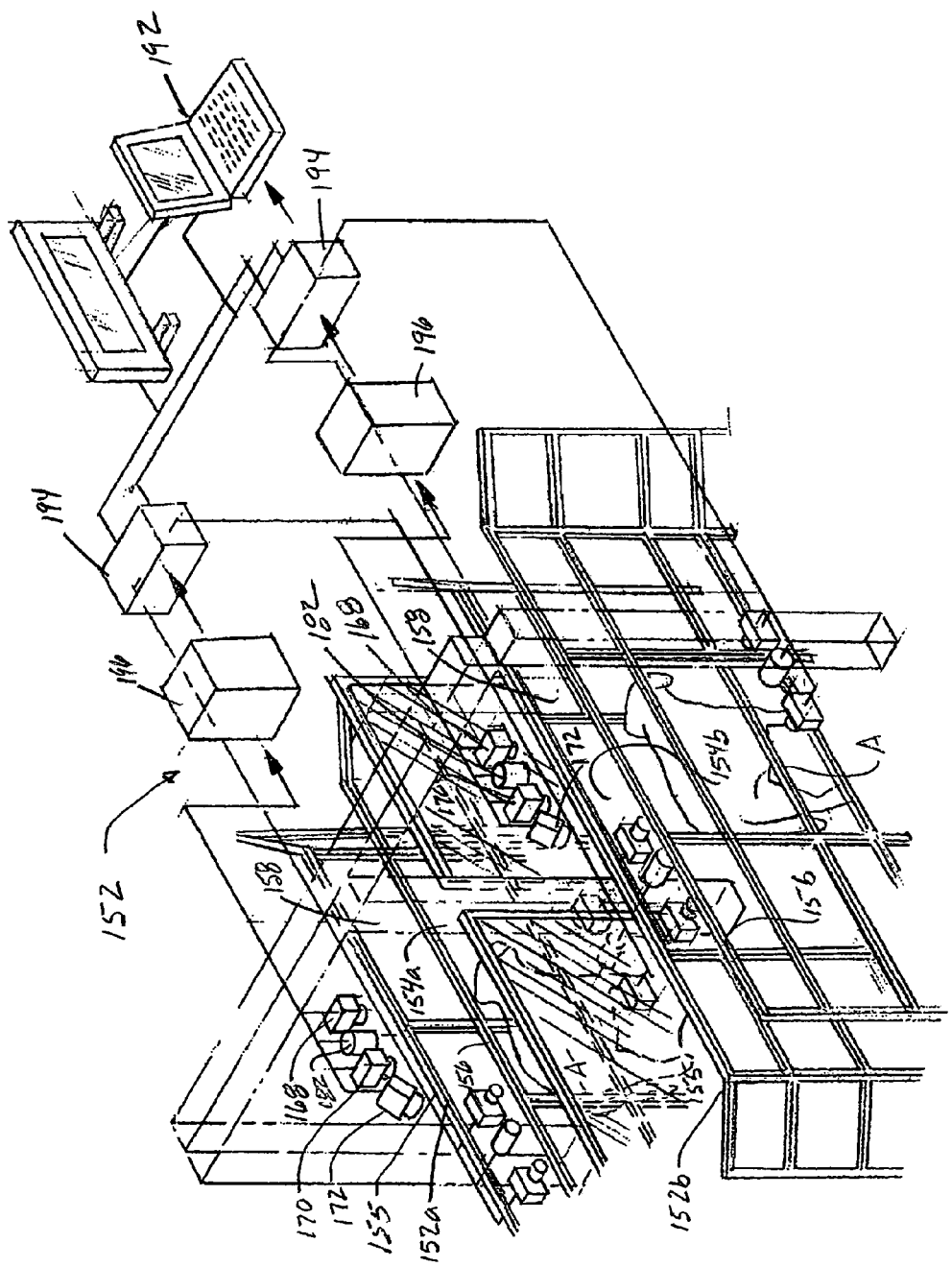
Figures 2, 4:
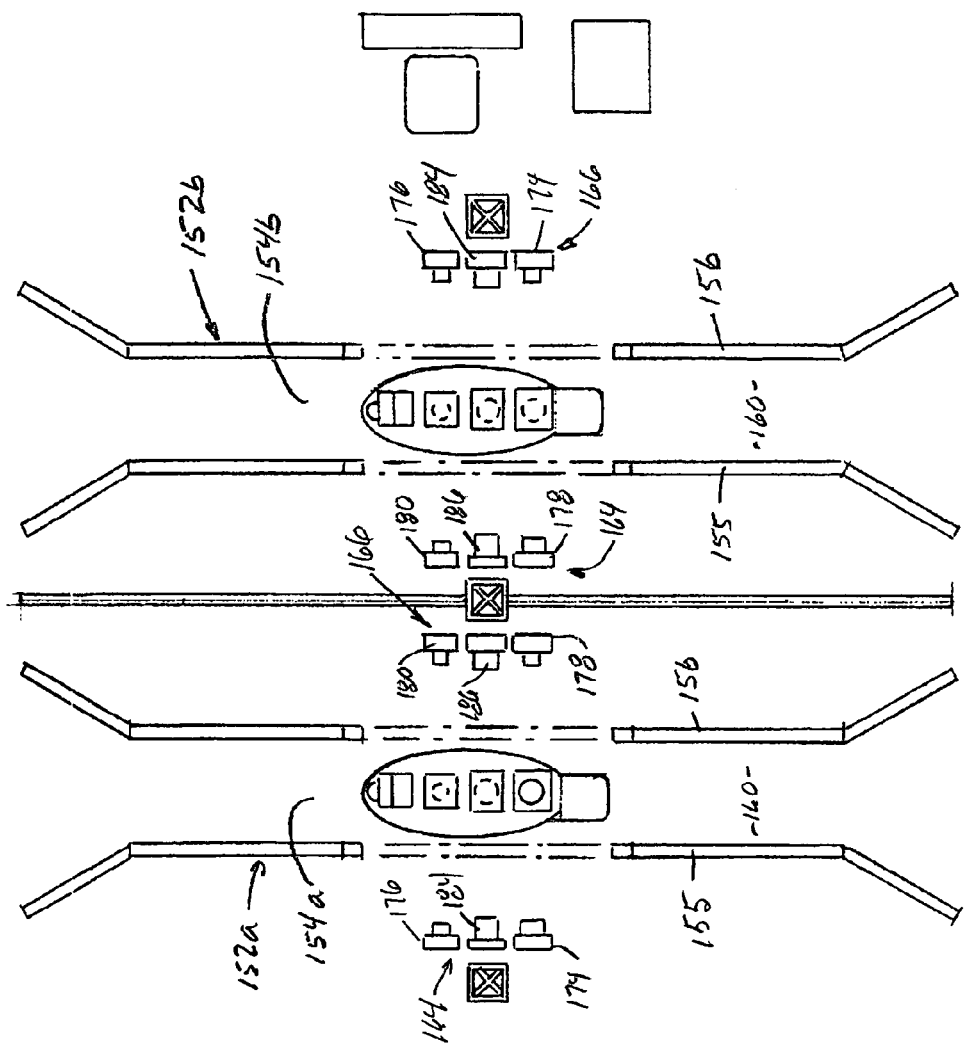
Figures 3, 4:
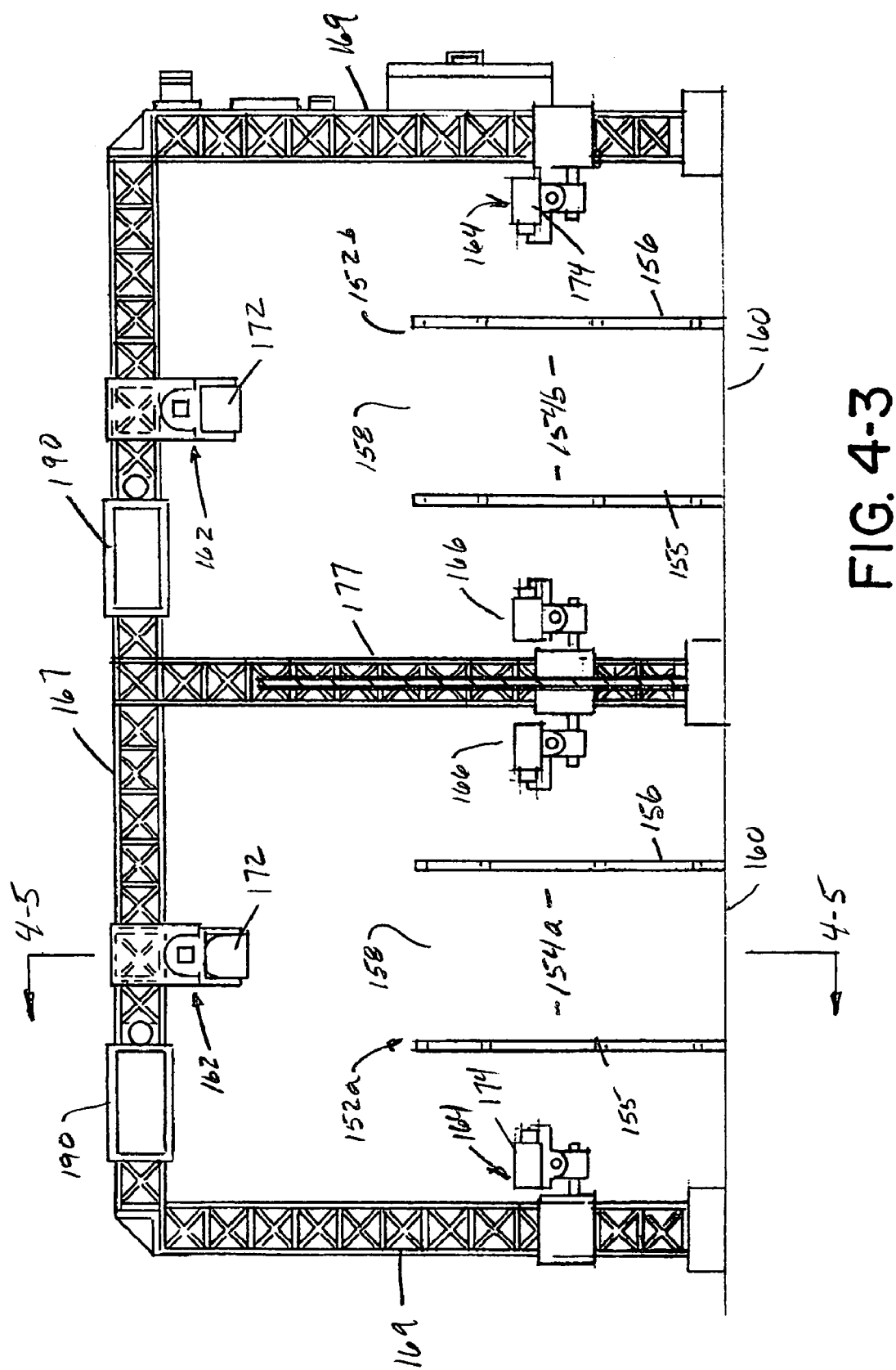
Figure 4:
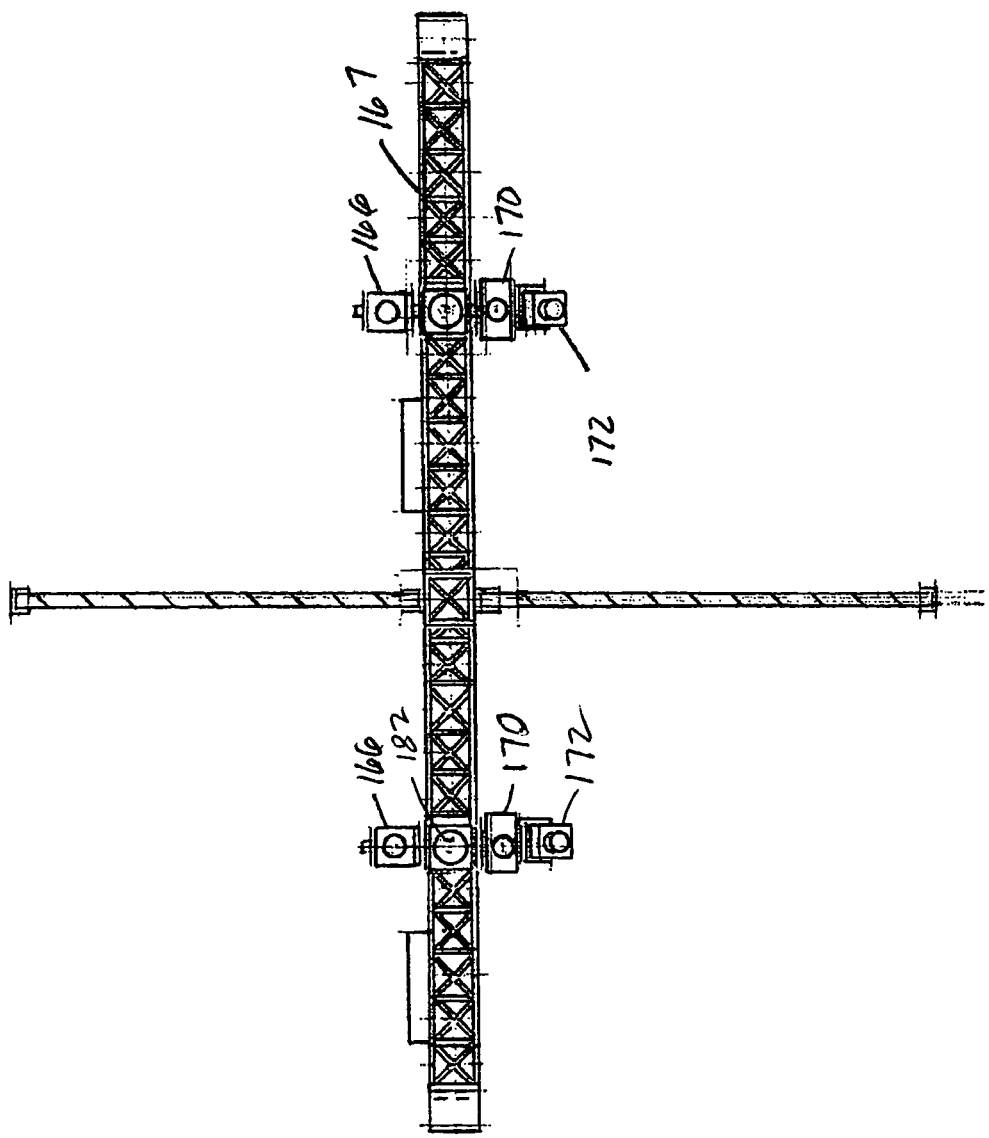
Figures 4, 5:
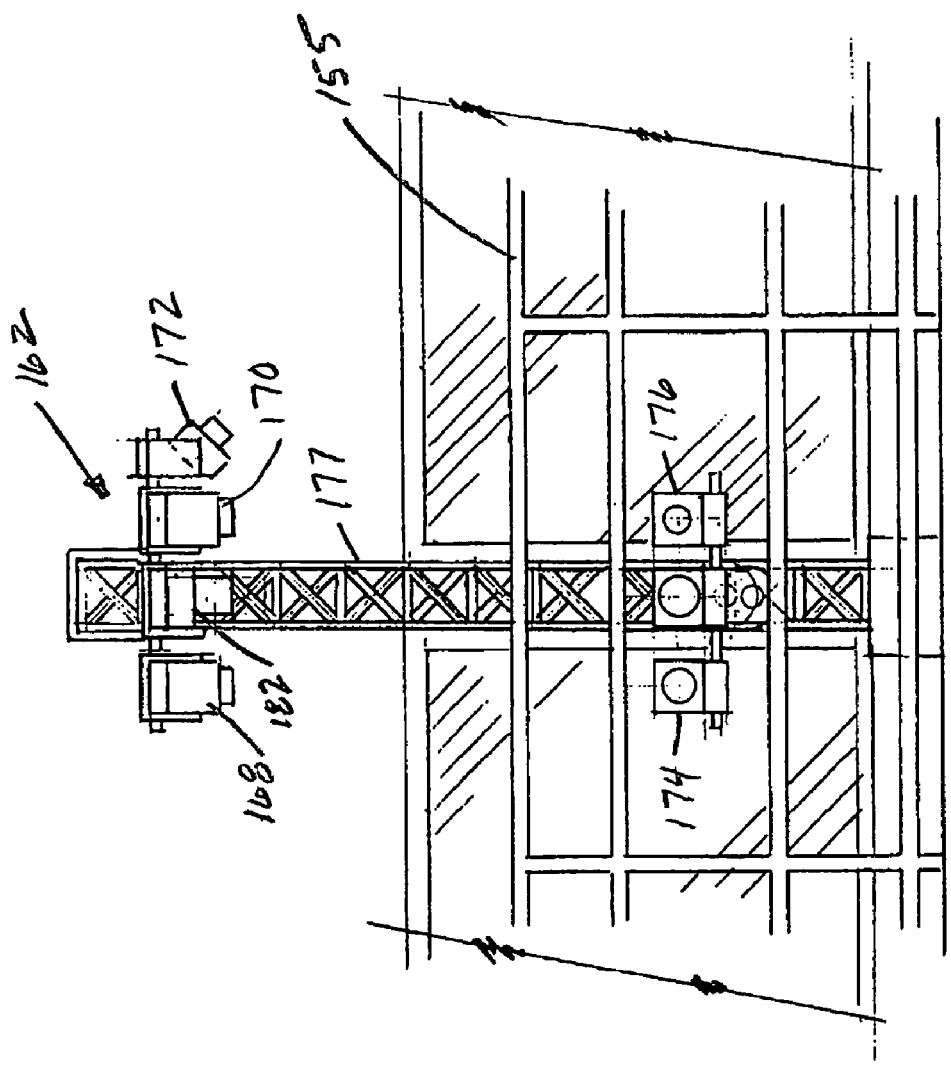
Figures 4, 5, 6, 7:
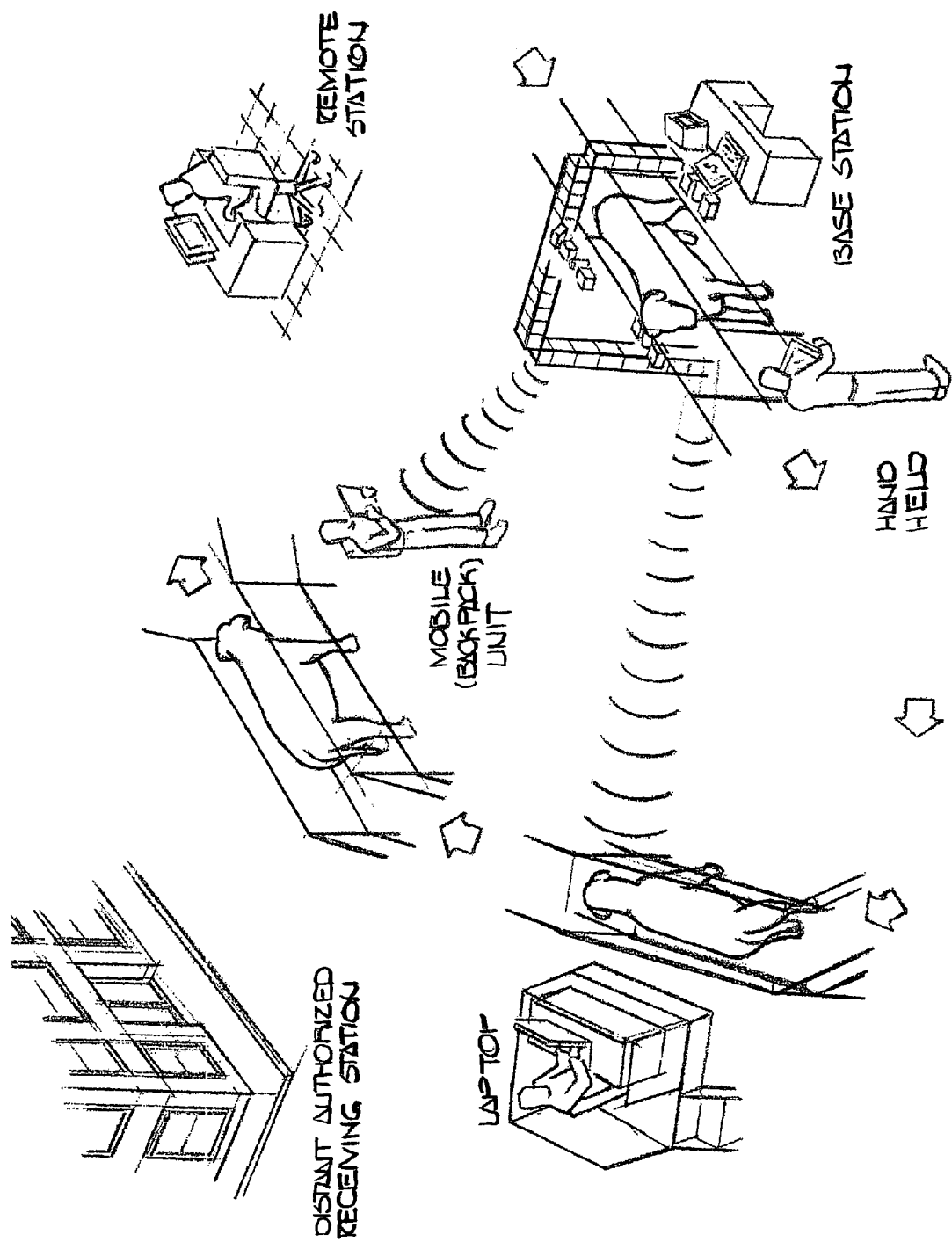
Figures 4, 5, 6, 7, 8, 9, 10, 11, 12, 13:
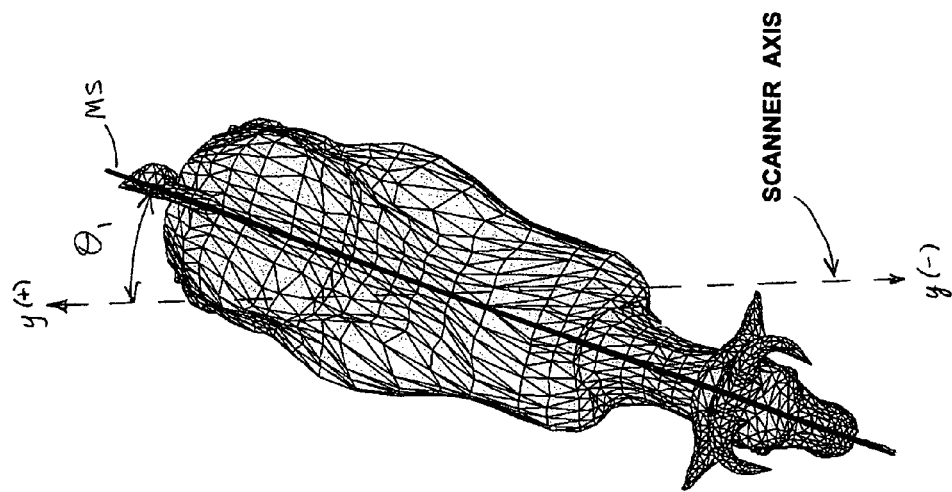
Figures 4, 5, 6, 7, 8, 9, 10, 11, 12, 13, 14:
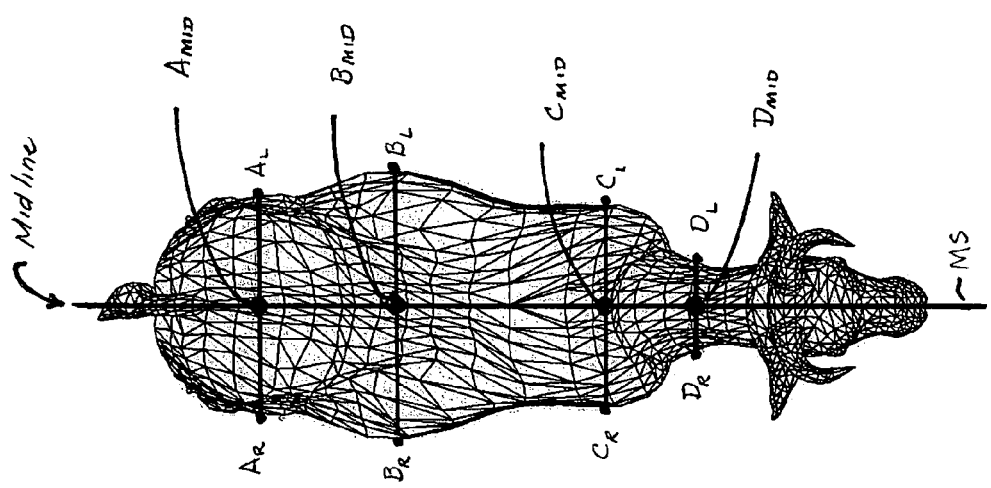
Figures 4, 5, 6, 7, 8, 9, 10, 11, 12, 13, 14, 15:
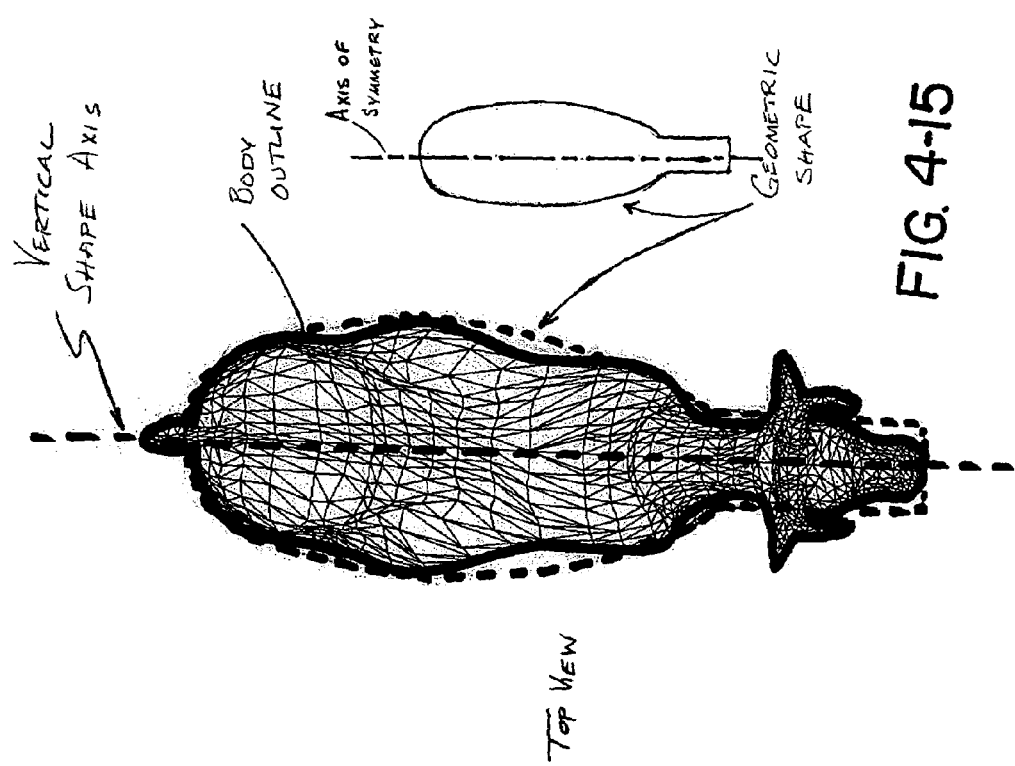
Figures 4, 5, 6, 7, 8, 9, 10, 11, 12, 13, 14, 15, 16:
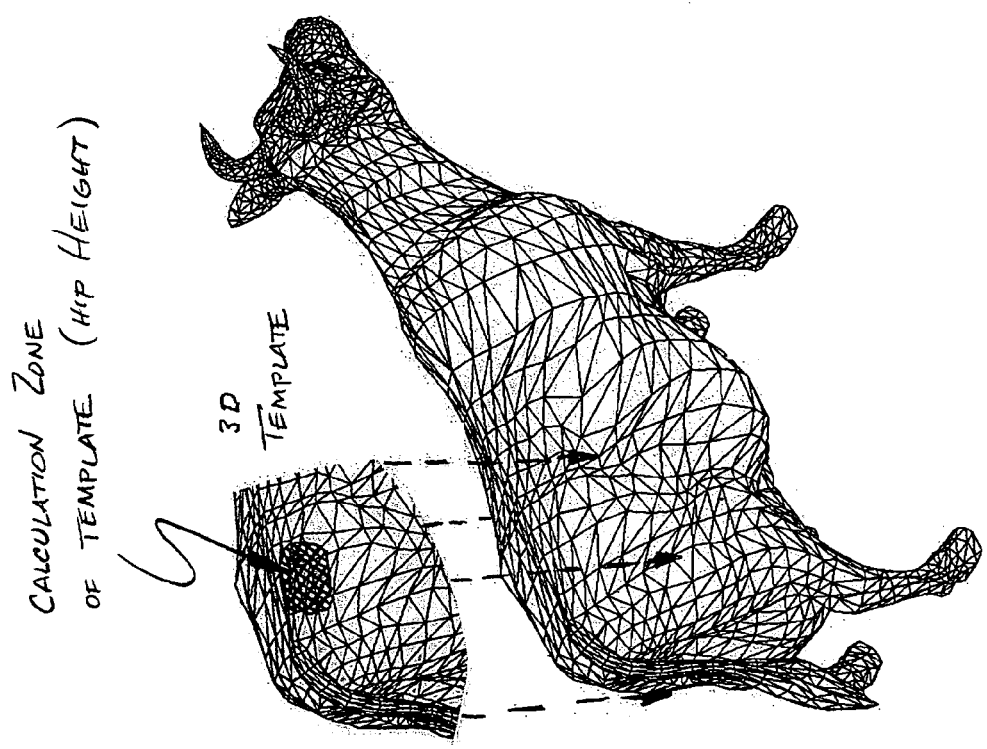
Figures 4, 5, 6, 7, 8, 9, 10, 11, 12, 13, 14, 15, 16, 17, 18:
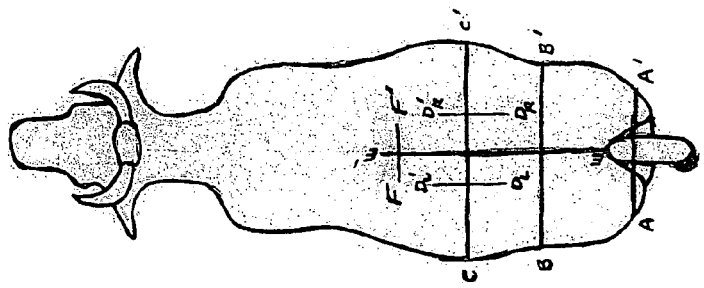
Figures 4, 5, 6, 7, 8, 9, 10, 11, 12, 13, 14, 15, 16, 17, 18, 19, 19C:
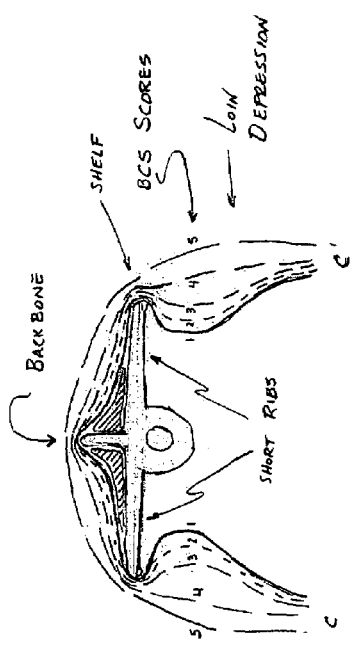
Figures 4, 5, 6, 7, 8, 9, 10, 11, 12, 13, 14, 15, 16, 17, 18, 19, 19D:
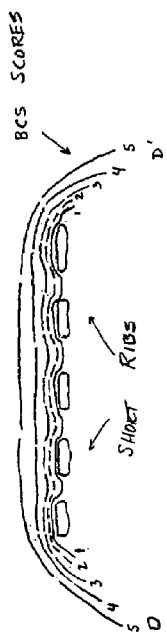
Figures 4, 5, 6, 7, 8, 9, 10, 11, 12, 13, 14, 15, 16, 17, 18, 19, 19E:
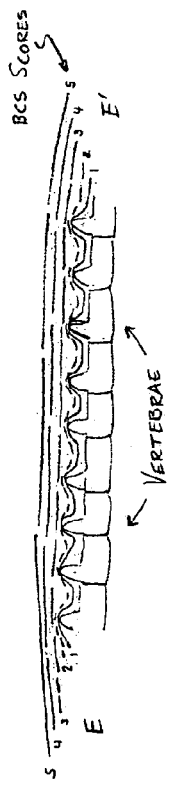
Figures 4, 5, 6, 7, 8, 9, 10, 11, 12, 13, 14, 15, 16, 17, 18, 19, 19F:
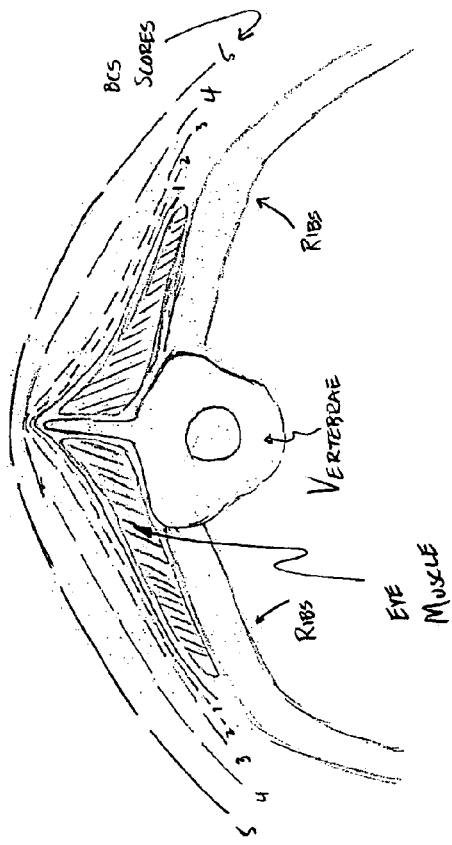
Figures 4, 5, 6, 7, 8, 9, 10, 11, 12, 13, 14, 15, 16, 17, 18, 19, 20, 21, 21B:
Figures 4, 5, 6, 7, 8, 9, 10, 11, 12, 13, 14, 15, 16, 17, 18, 19, 20, 21, 21A:
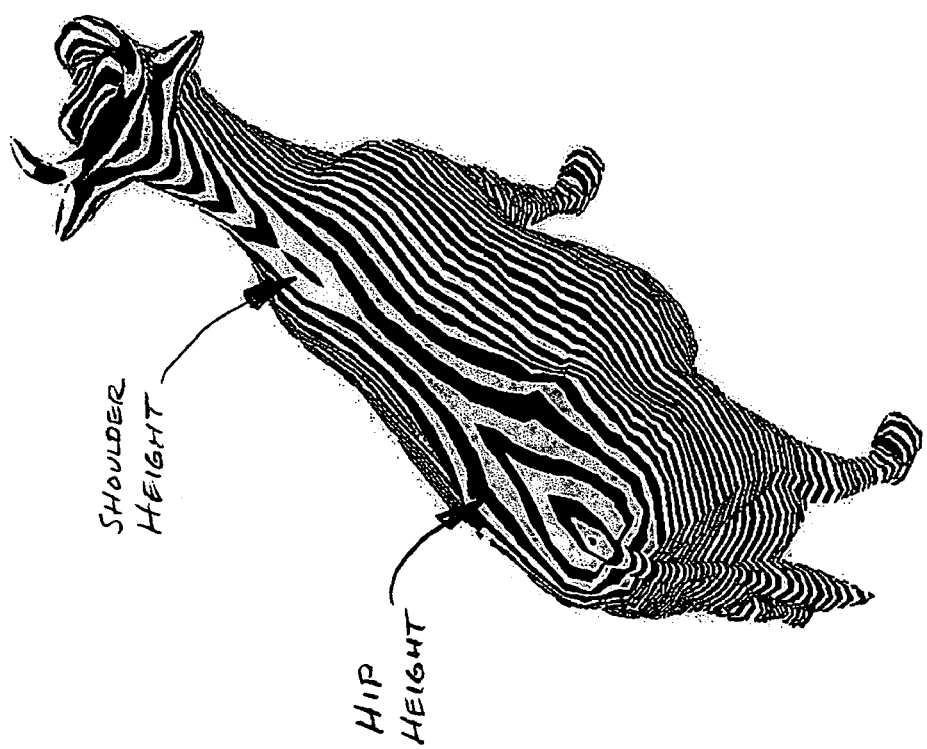
Figures 4, 5, 6, 7, 8, 9, 10, 11, 12, 13, 14, 15, 16, 17, 18, 19, 20, 21, 22, 23, 23B:
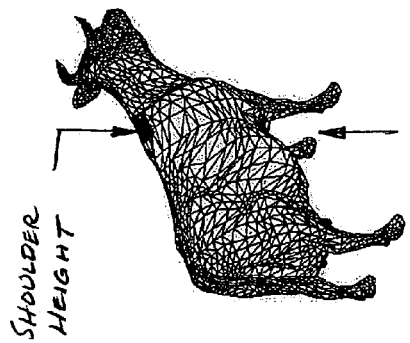
Figures 4, 5, 6, 7, 8, 9, 10, 11, 12, 13, 14, 15, 16, 17, 18, 19, 20, 21, 22, 23, 23D:
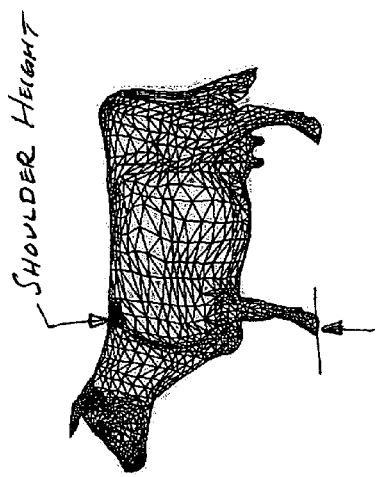
Figures 4, 5, 6, 7, 8, 9, 10, 11, 12, 13, 14, 15, 16, 17, 18, 19, 20, 21, 22, 23, 23A:
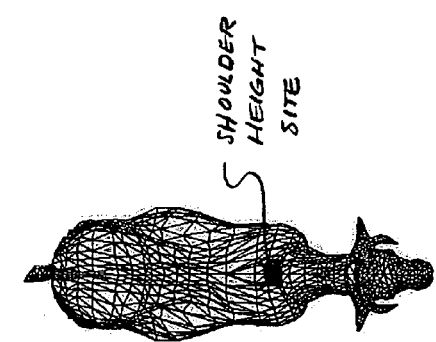
Figures 4, 5, 6, 7, 8, 9, 10, 11, 12, 13, 14, 15, 16, 17, 18, 19, 20, 21, 22, 23, 23C:
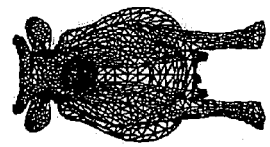
Figures 4, 5, 6, 7, 8, 9, 10, 11, 12, 13, 14, 15, 16, 17, 18, 19, 20, 21, 22, 23, 24, 24B:
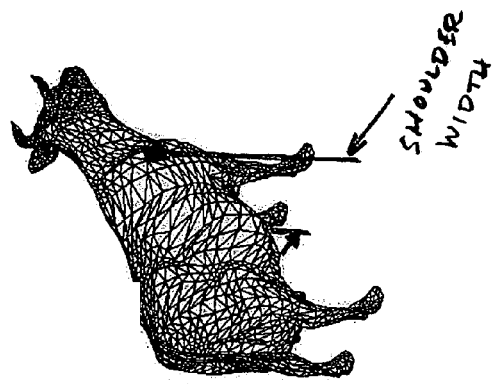
Figures 4, 5, 6, 7, 8, 9, 10, 11, 12, 13, 14, 15, 16, 17, 18, 19, 20, 21, 22, 23, 24, 24D:
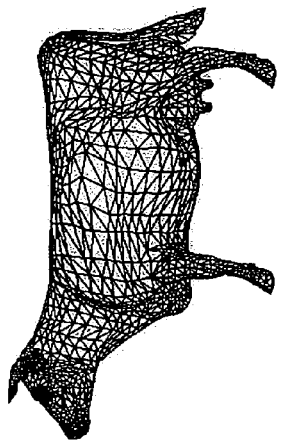
Figures 4, 5, 6, 7, 8, 9, 10, 11, 12, 13, 14, 15, 16, 17, 18, 19, 20, 21, 22, 23, 24, 24A:
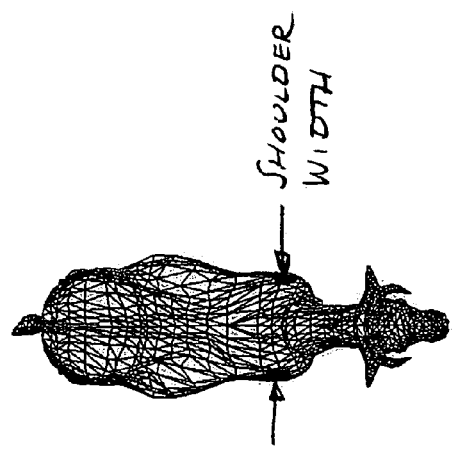
Figures 4, 5, 6, 7, 8, 9, 10, 11, 12, 13, 14, 15, 16, 17, 18, 19, 20, 21, 22, 23, 24, 24C:
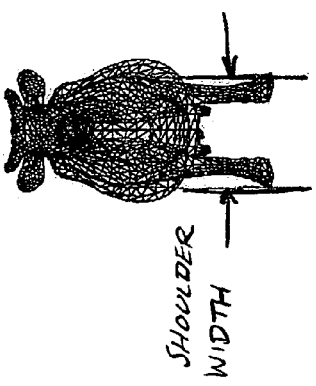
Figures 4, 5, 6, 7, 8, 9, 10, 11, 12, 13, 14, 15, 16, 17, 18, 19, 20, 21, 22, 23, 24, 25, 25B:
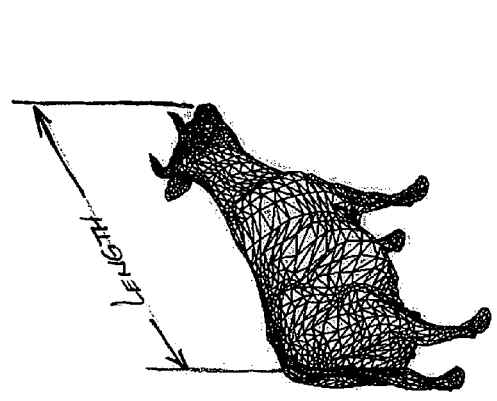
Figures 4, 5, 6, 7, 8, 9, 10, 11, 12, 13, 14, 15, 16, 17, 18, 19, 20, 21, 22, 23, 24, 25, 25D:
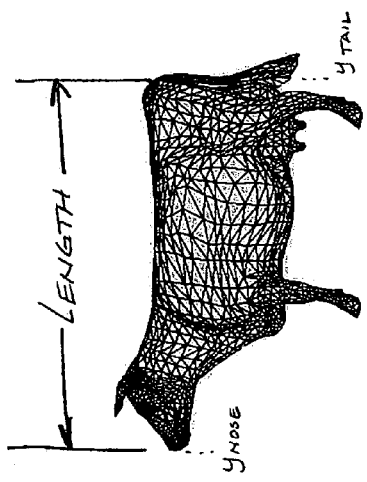
Figures 4, 5, 6, 7, 8, 9, 10, 11, 12, 13, 14, 15, 16, 17, 18, 19, 20, 21, 22, 23, 24, 25, 25A:
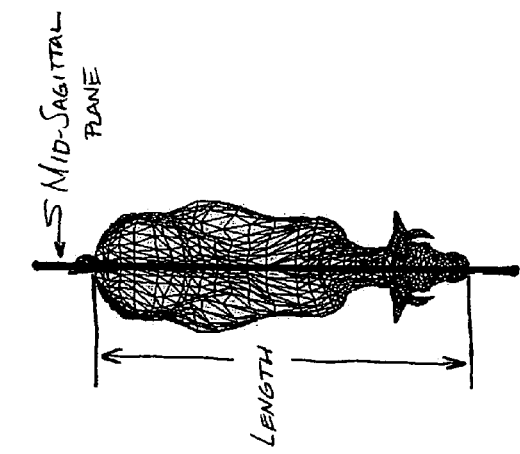
Figures 4, 5, 6, 7, 8, 9, 10, 11, 12, 13, 14, 15, 16, 17, 18, 19, 20, 21, 22, 23, 24, 25, 25C:
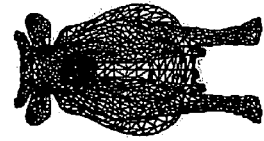
Figures 4, 5, 6, 7, 8, 9, 10, 11, 12, 13, 14, 15, 16, 17, 18, 19, 20, 21, 22, 23, 24, 25, 26, 27:
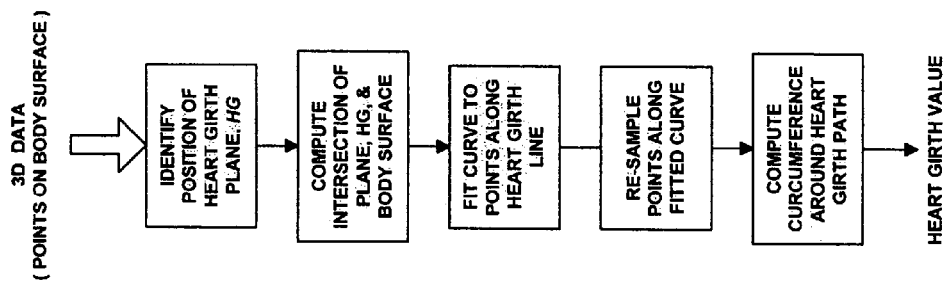
Figures 4, 5, 6, 7, 8, 9, 10, 11, 12, 13, 14, 15, 16, 17, 18, 19, 20, 21, 22, 23, 24, 25, 26, 27, 28, 29, 30, 30A:
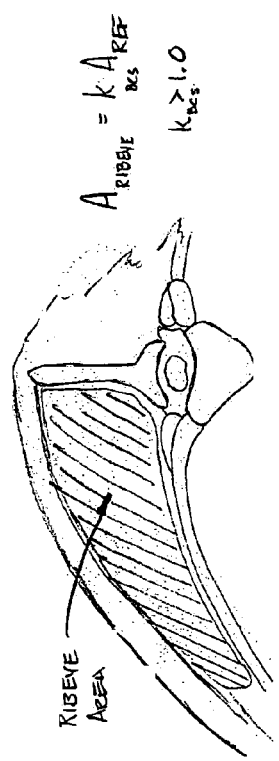
Figures 4, 5, 6, 7, 8, 9, 10, 11, 12, 13, 14, 15, 16, 17, 18, 19, 20, 21, 22, 23, 24, 25, 26, 27, 28, 29, 30, 30B:
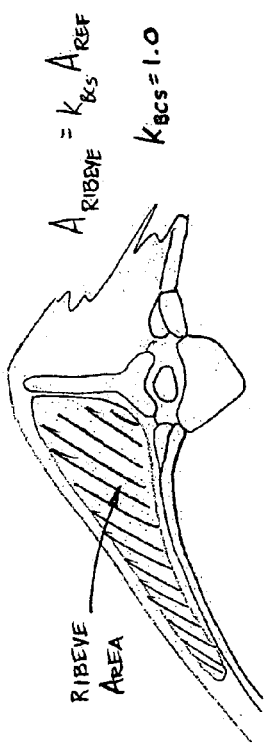
Figures 4, 5, 6, 7, 8, 9, 10, 11, 12, 13, 14, 15, 16, 17, 18, 19, 20, 21, 22, 23, 24, 25, 26, 27, 28, 29, 30, 30C:
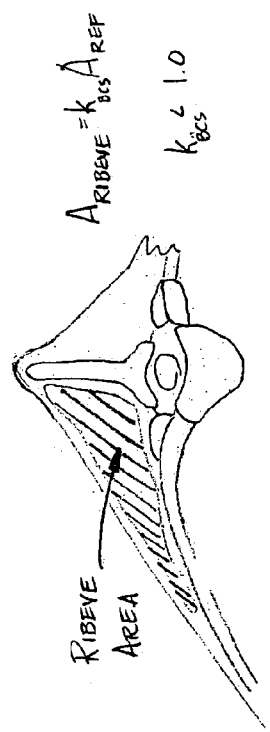
Figures 4, 5, 6, 7, 8, 9, 10, 11, 12, 13, 14, 15, 16, 17, 18, 19, 20, 21, 22, 23, 24, 25, 26, 27, 28, 29, 30, 31:
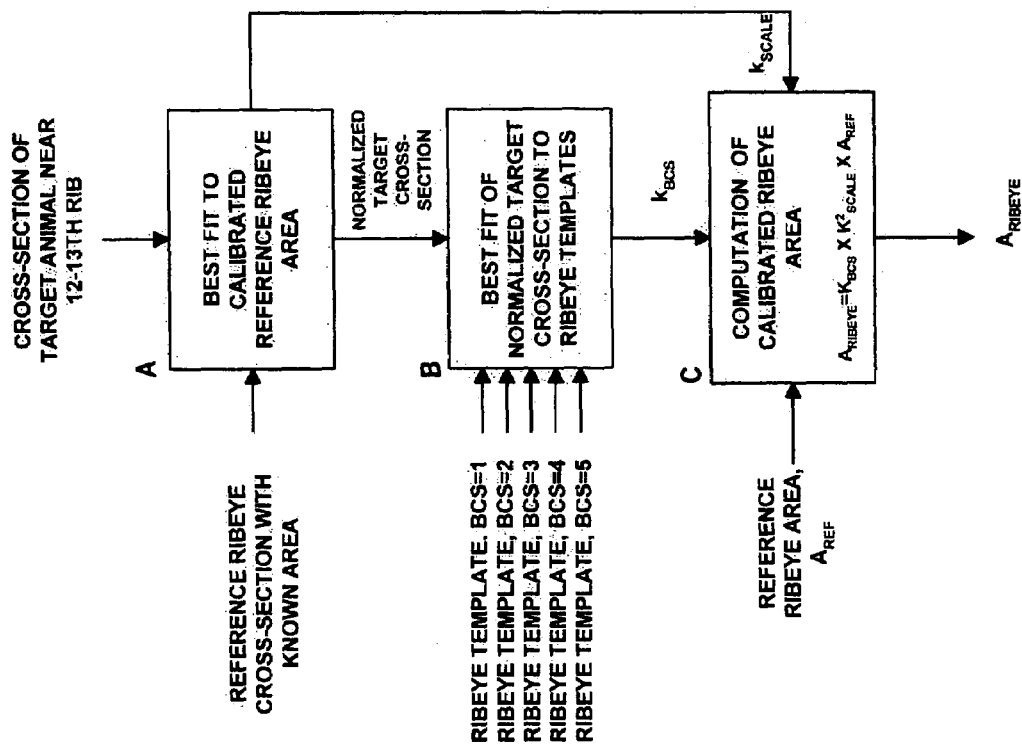
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32:
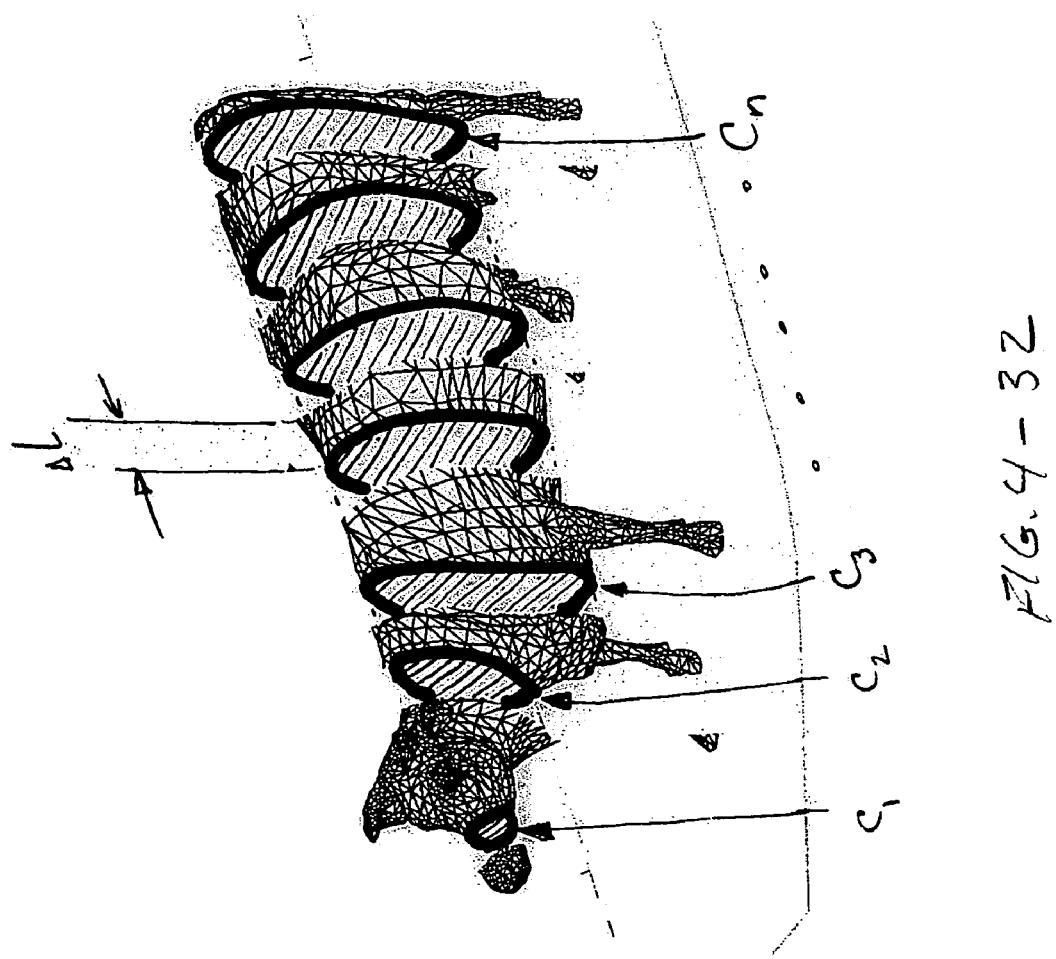
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
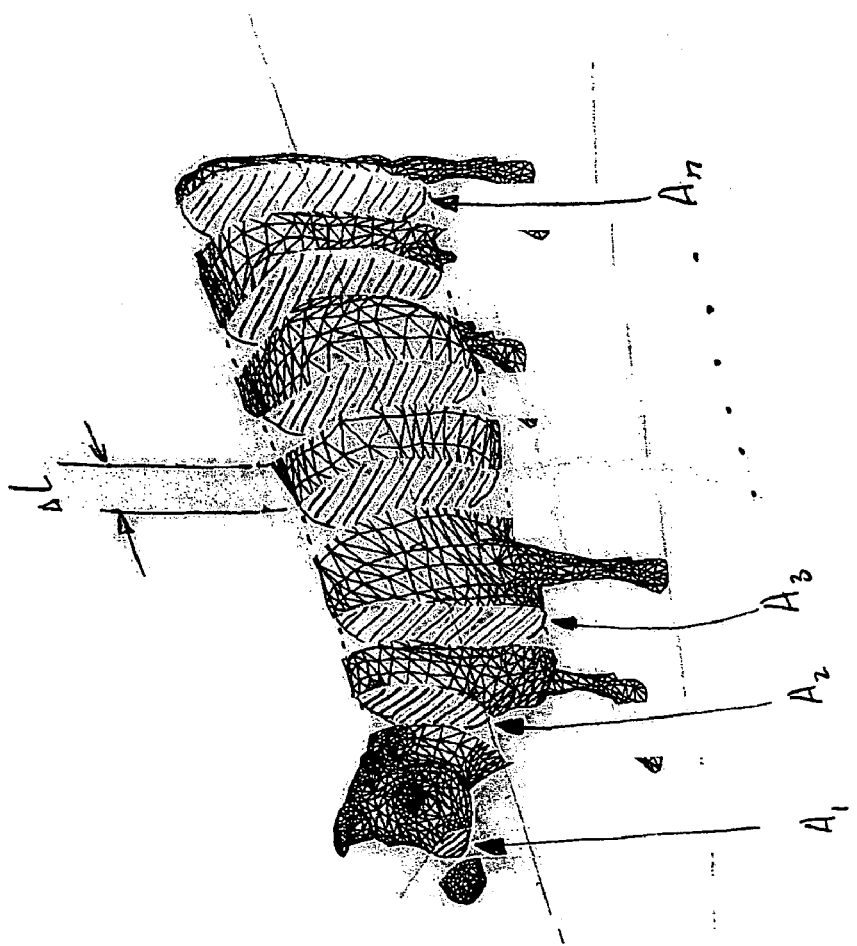
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
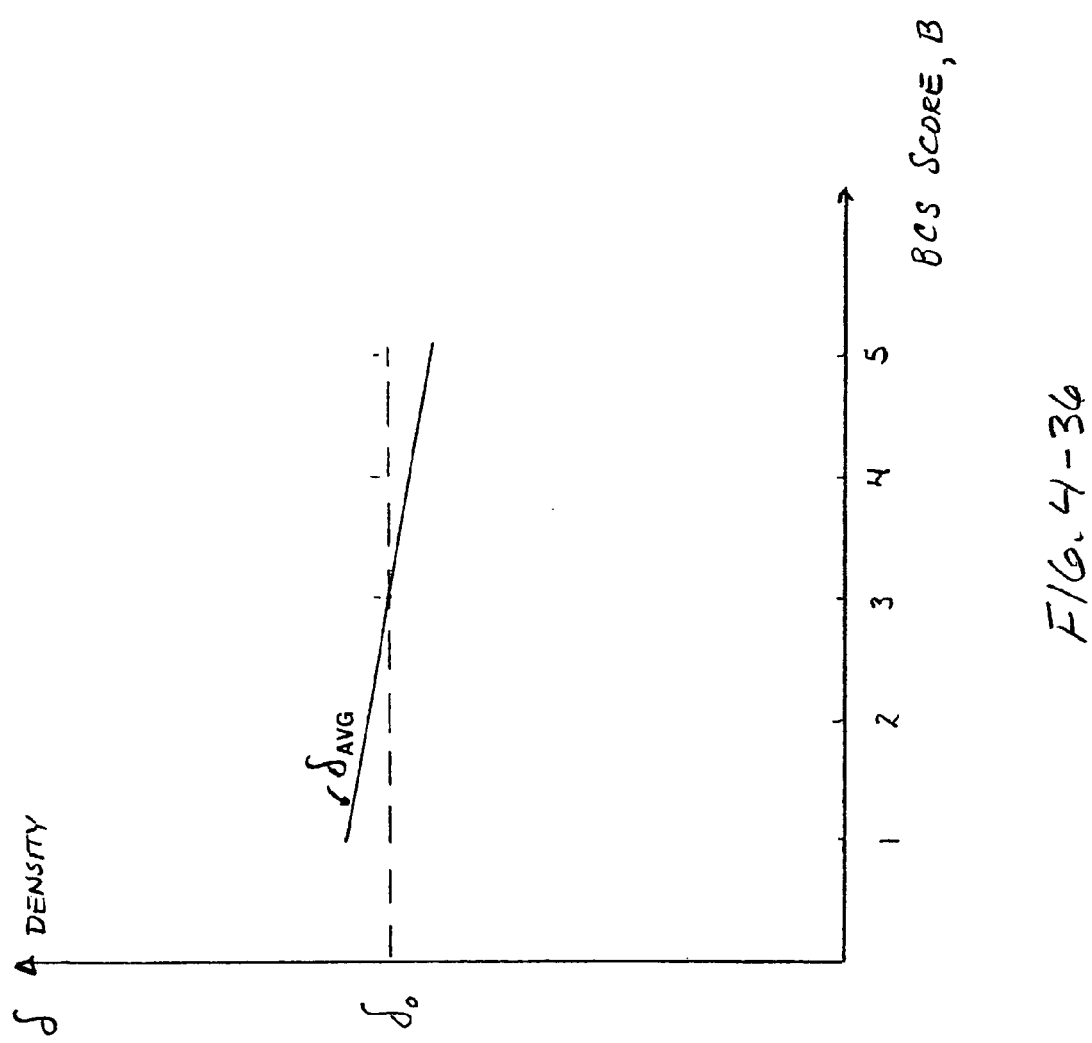
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
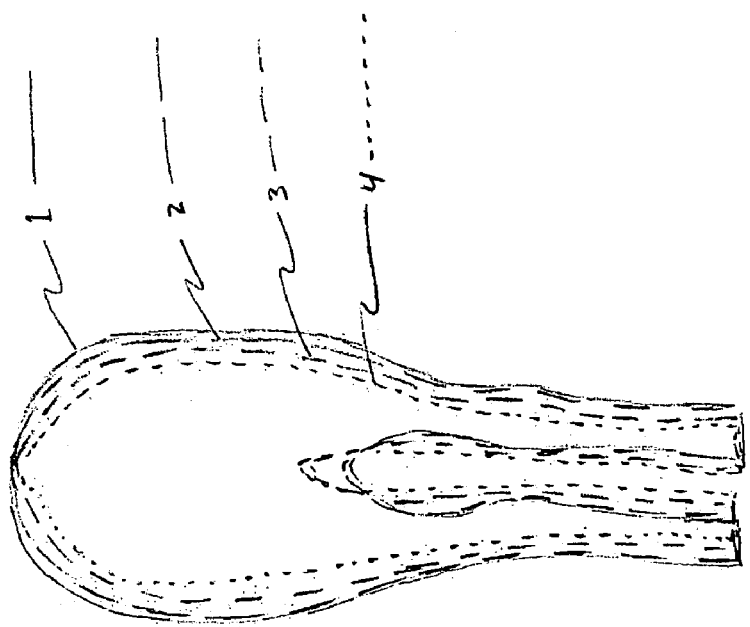
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 39A:
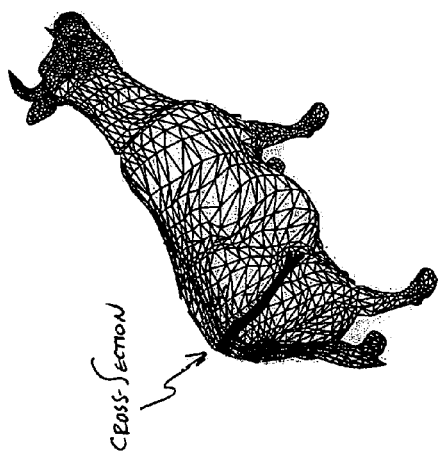
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 39B:
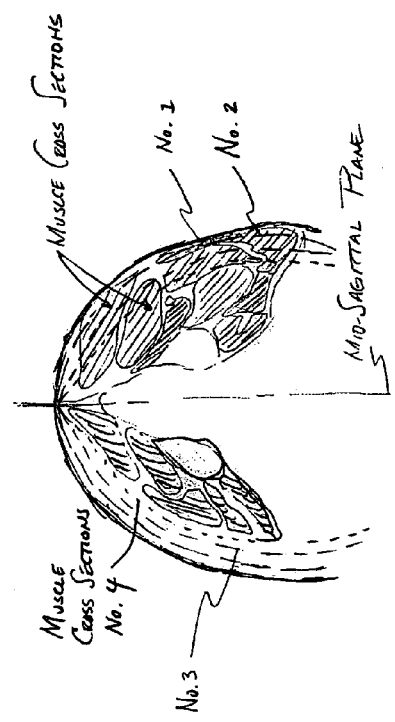
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
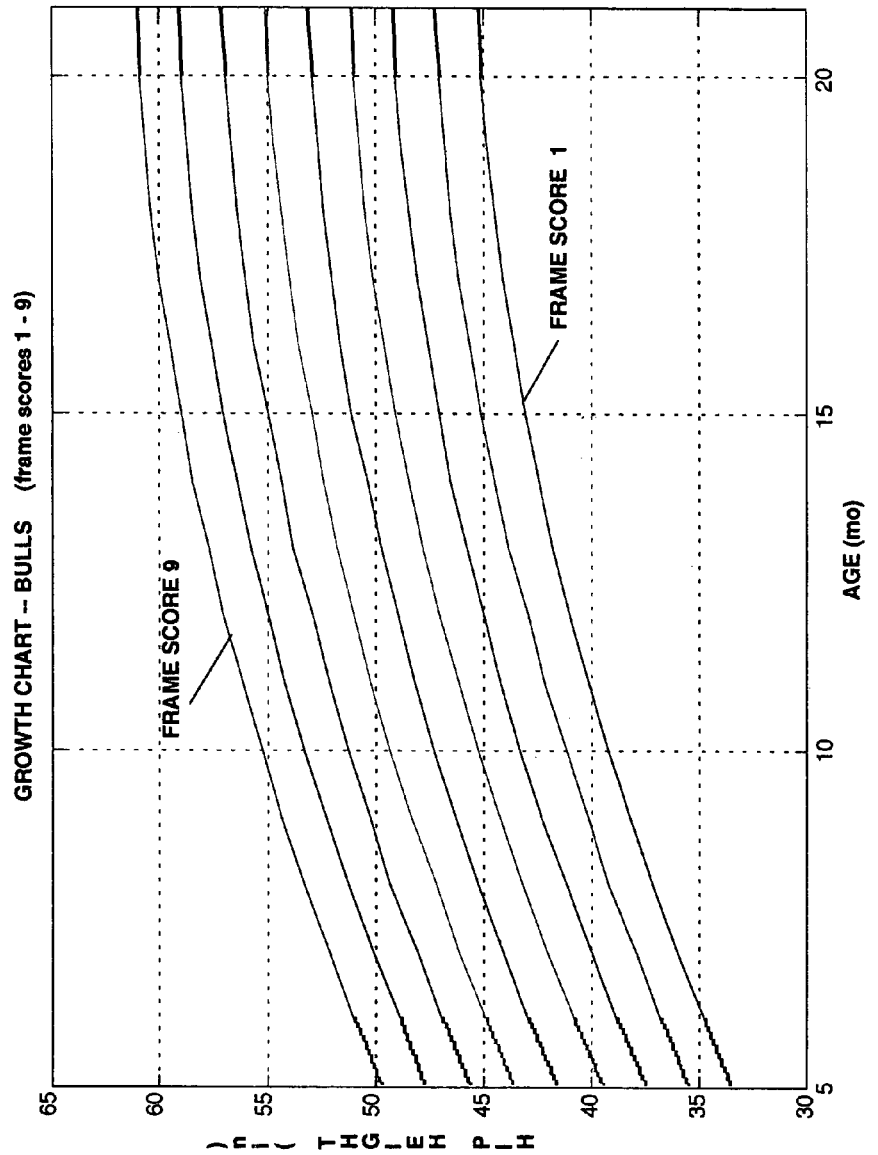
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
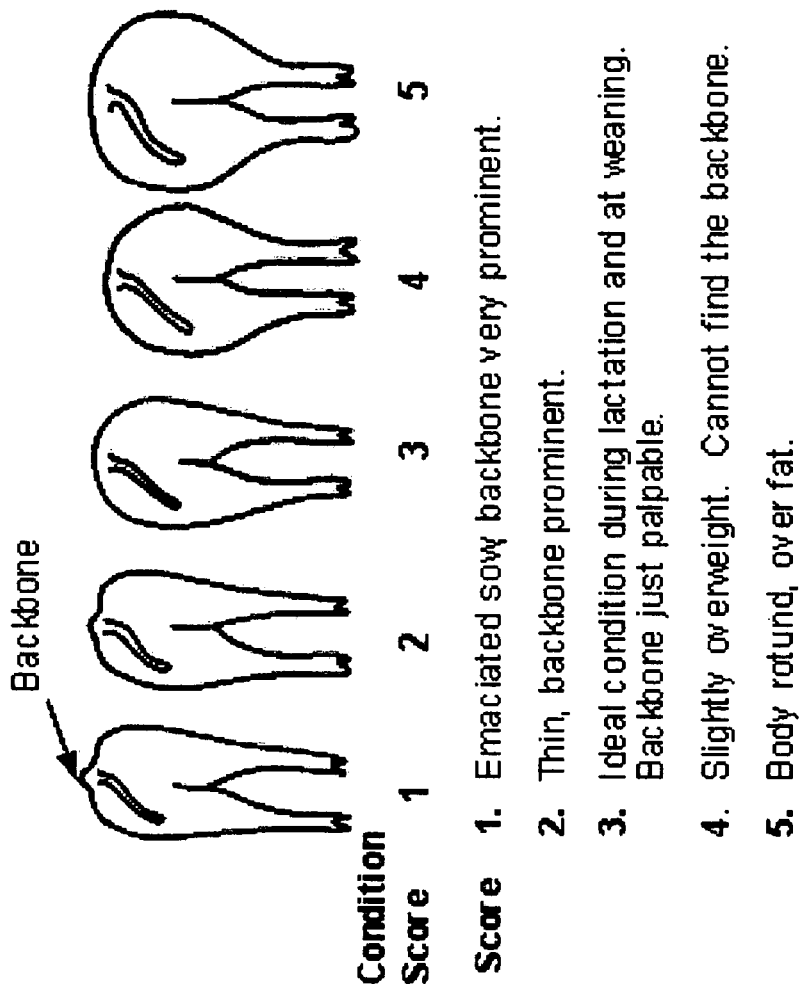
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
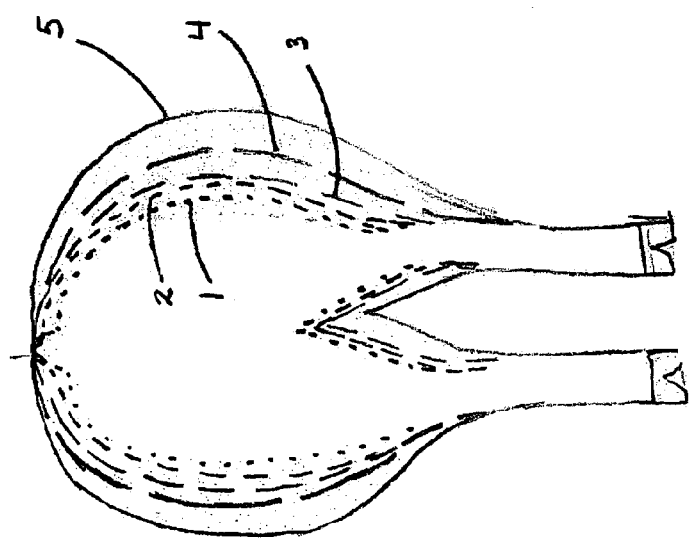
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 42A, 42B:
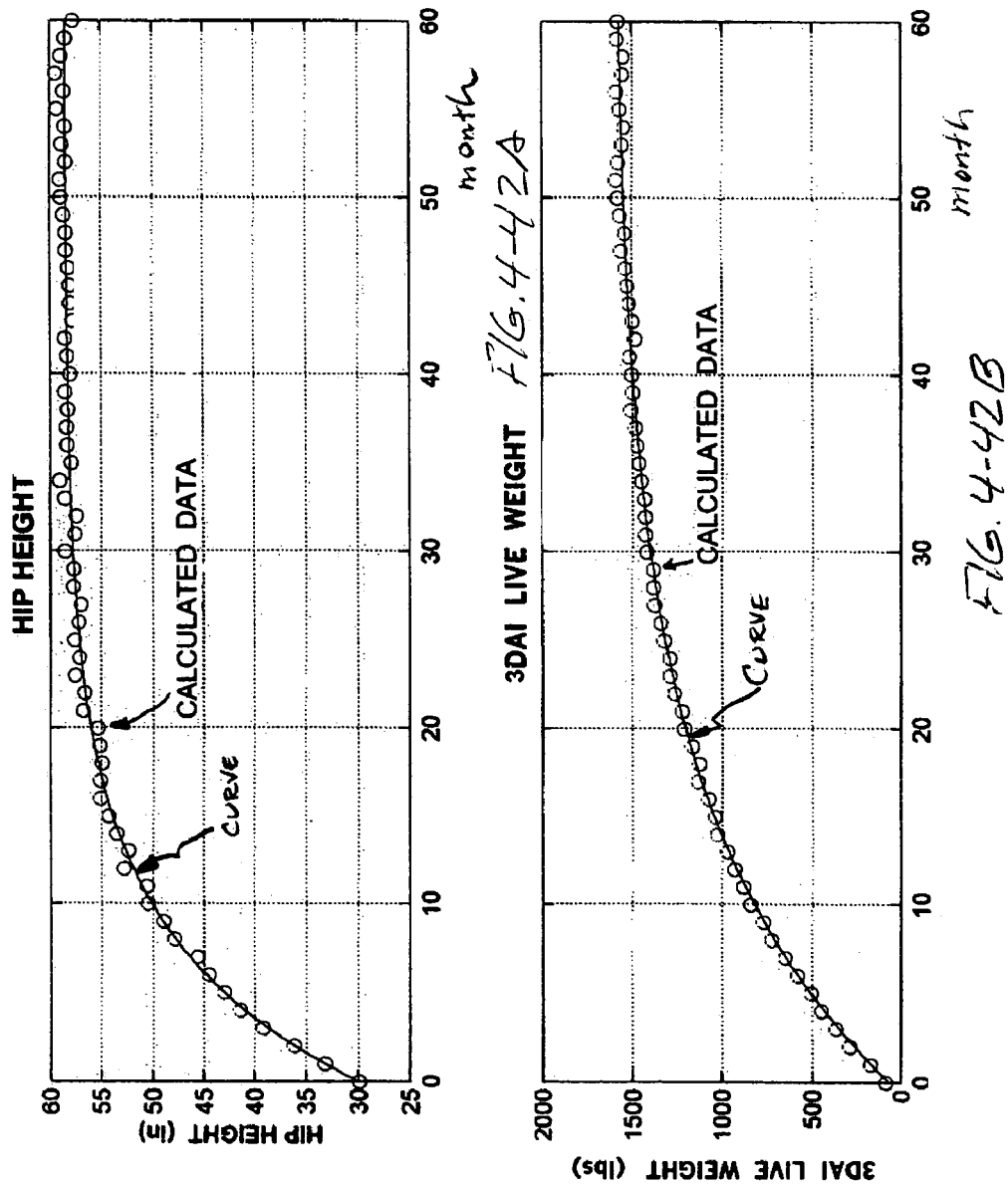
Figures 4, 93:
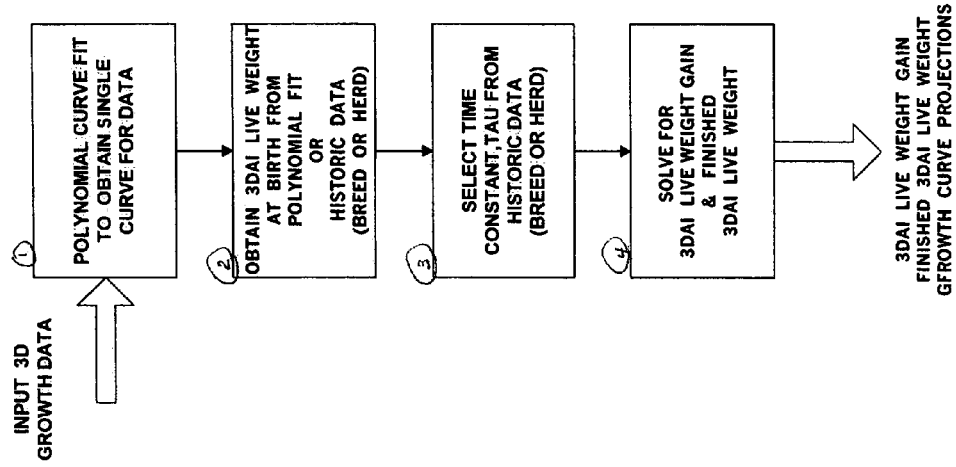
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
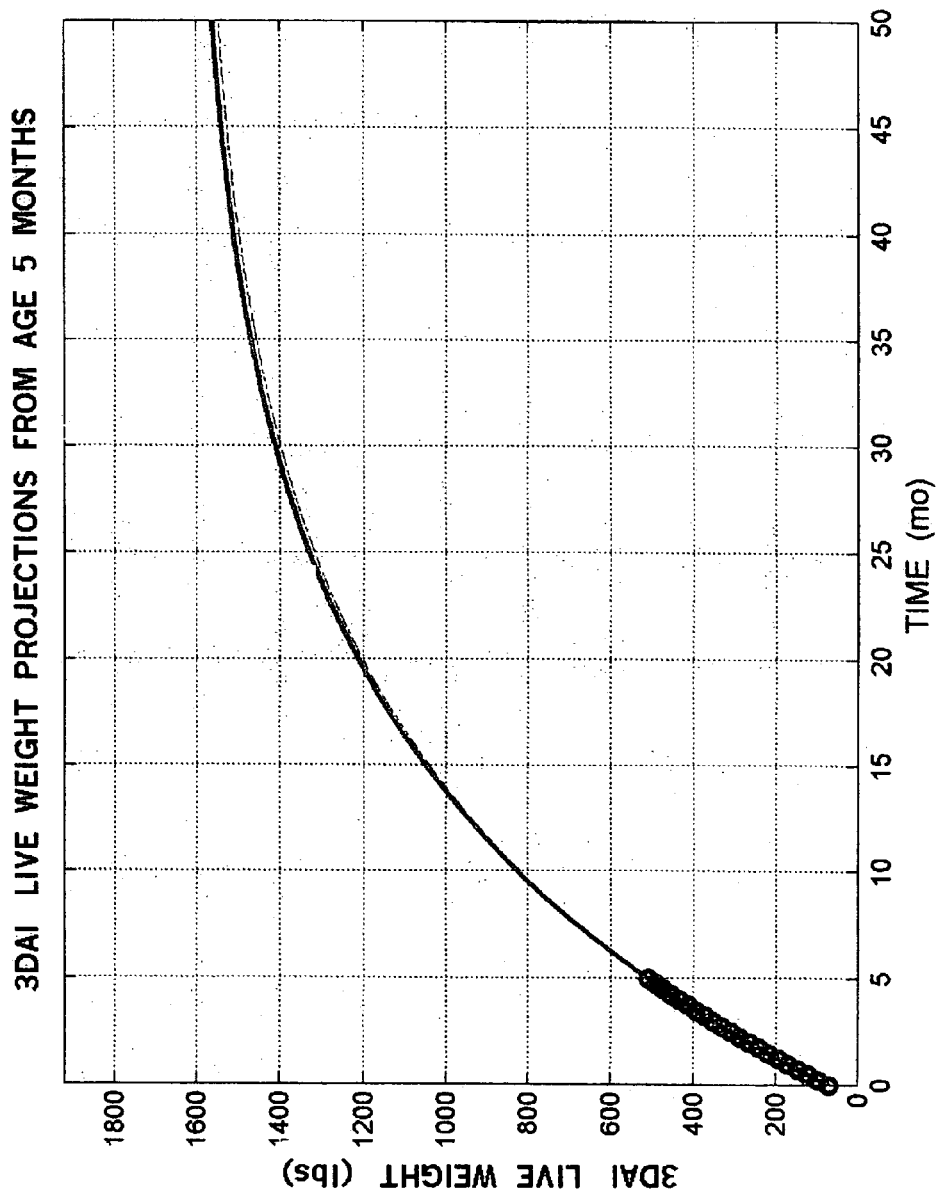
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 45A, 45B, 45C, 45D:
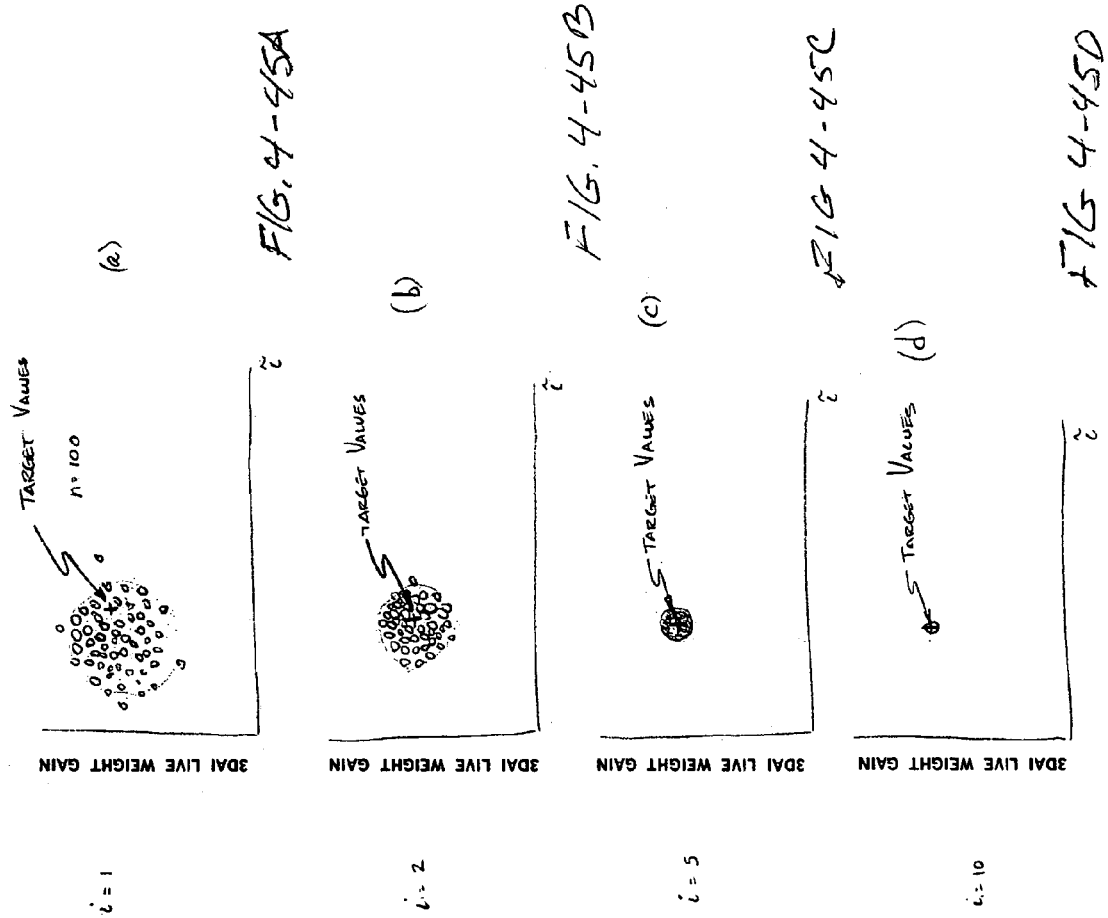
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
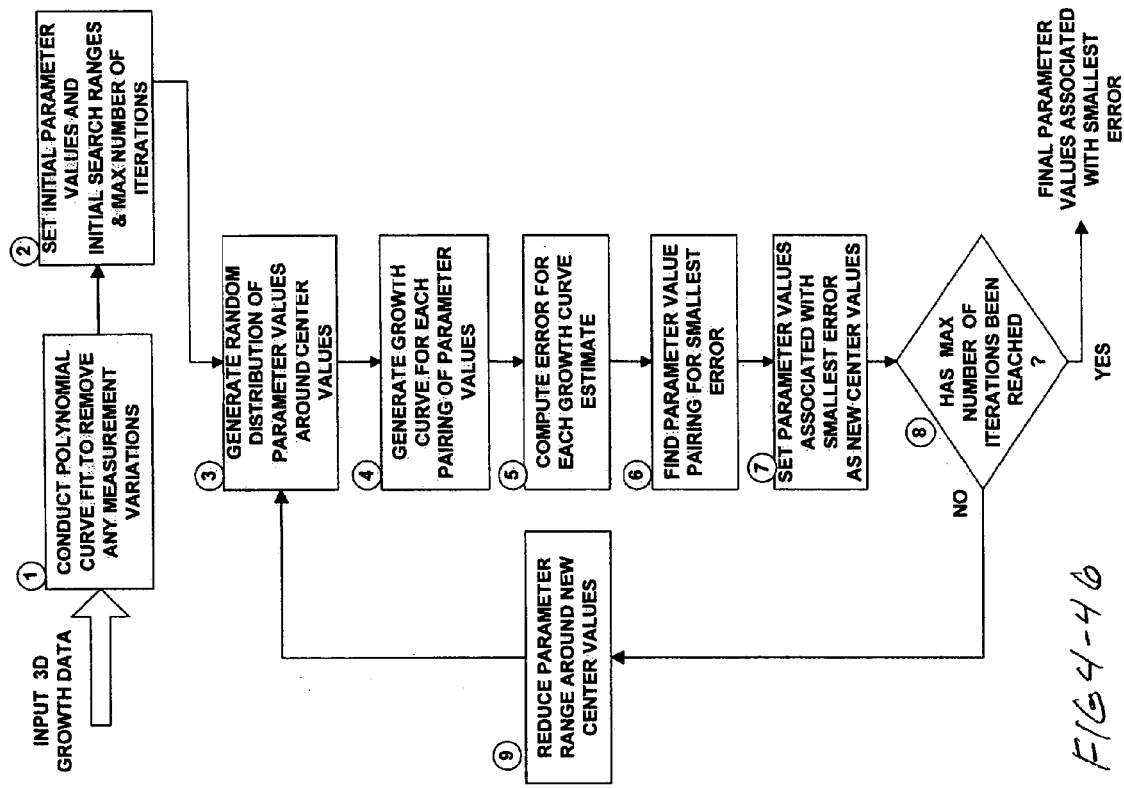
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 47A, 47B:
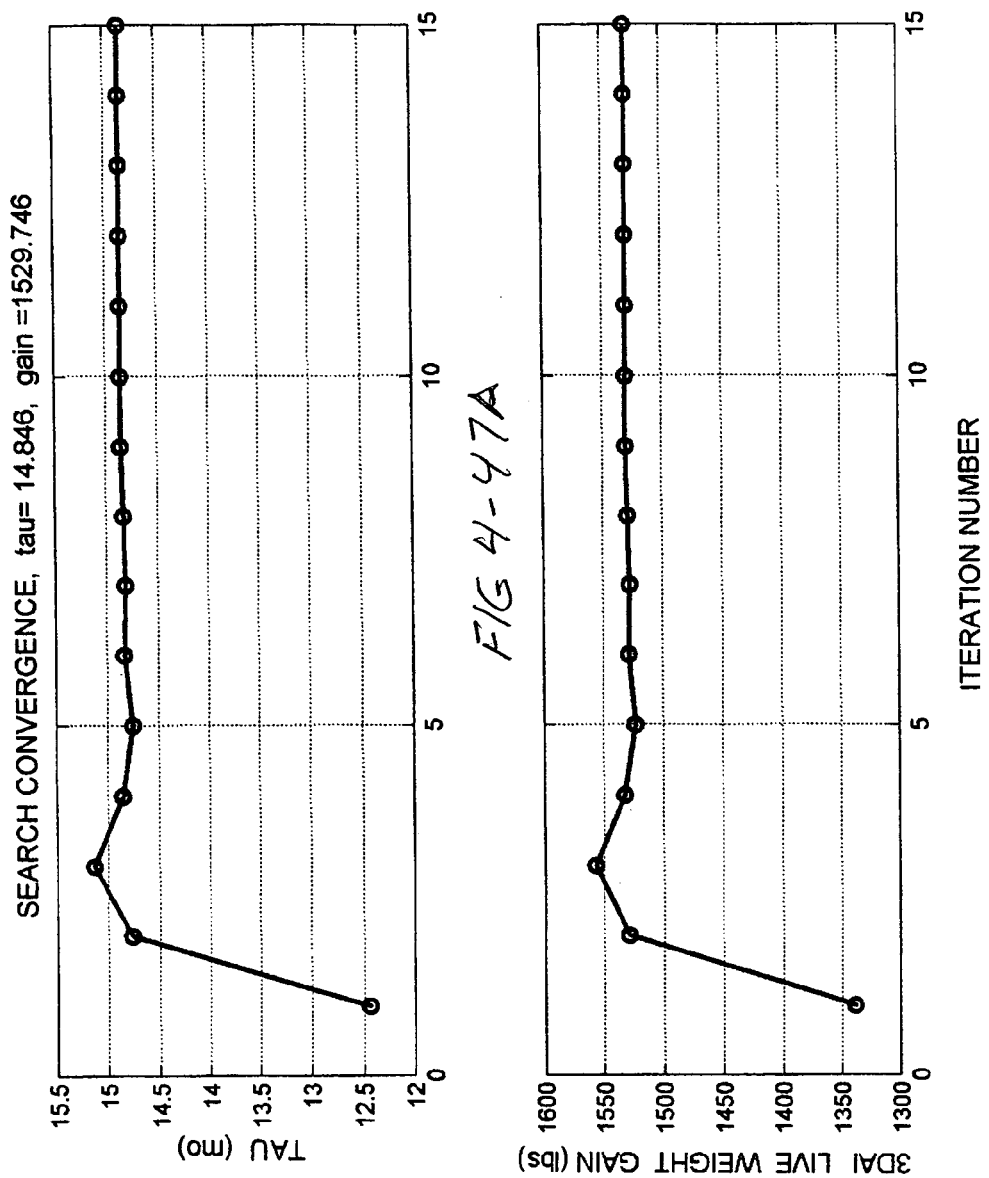
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48A:
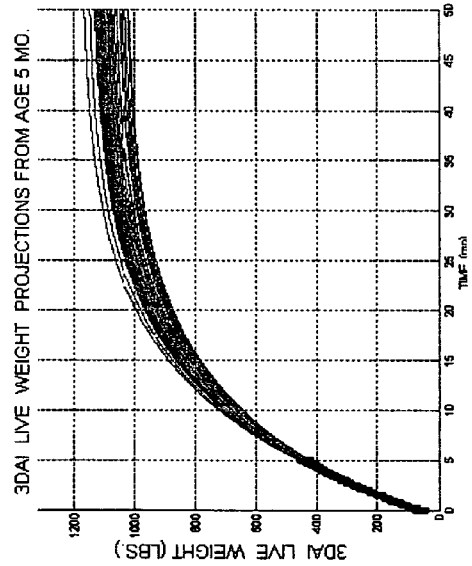
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48B:
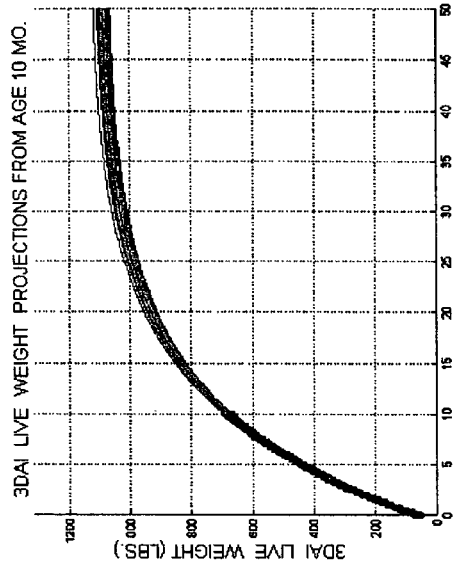
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48C:
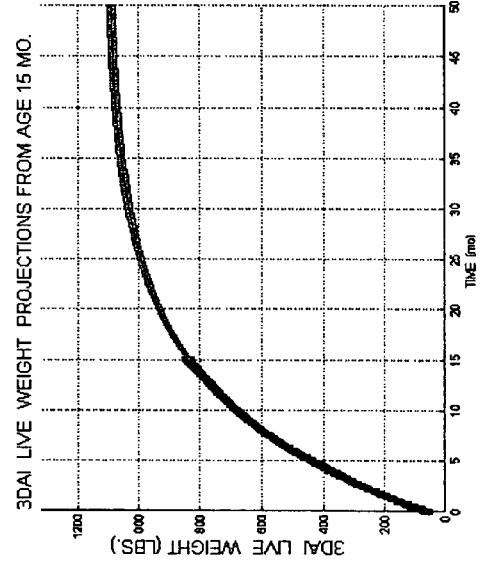
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48D:
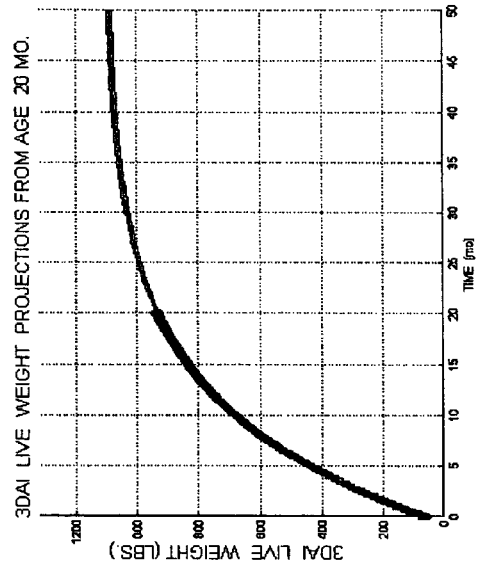
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 49A, 49B, 49C:
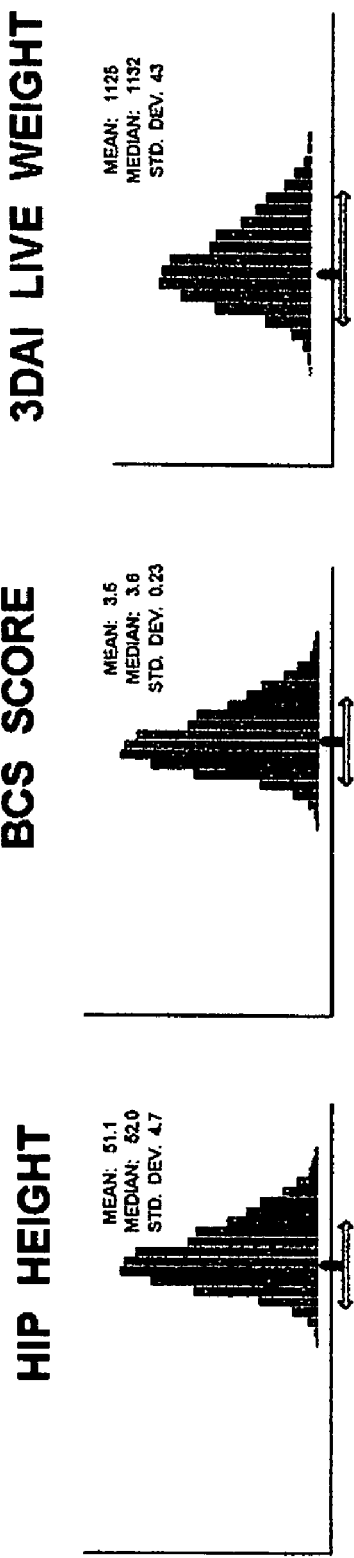
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
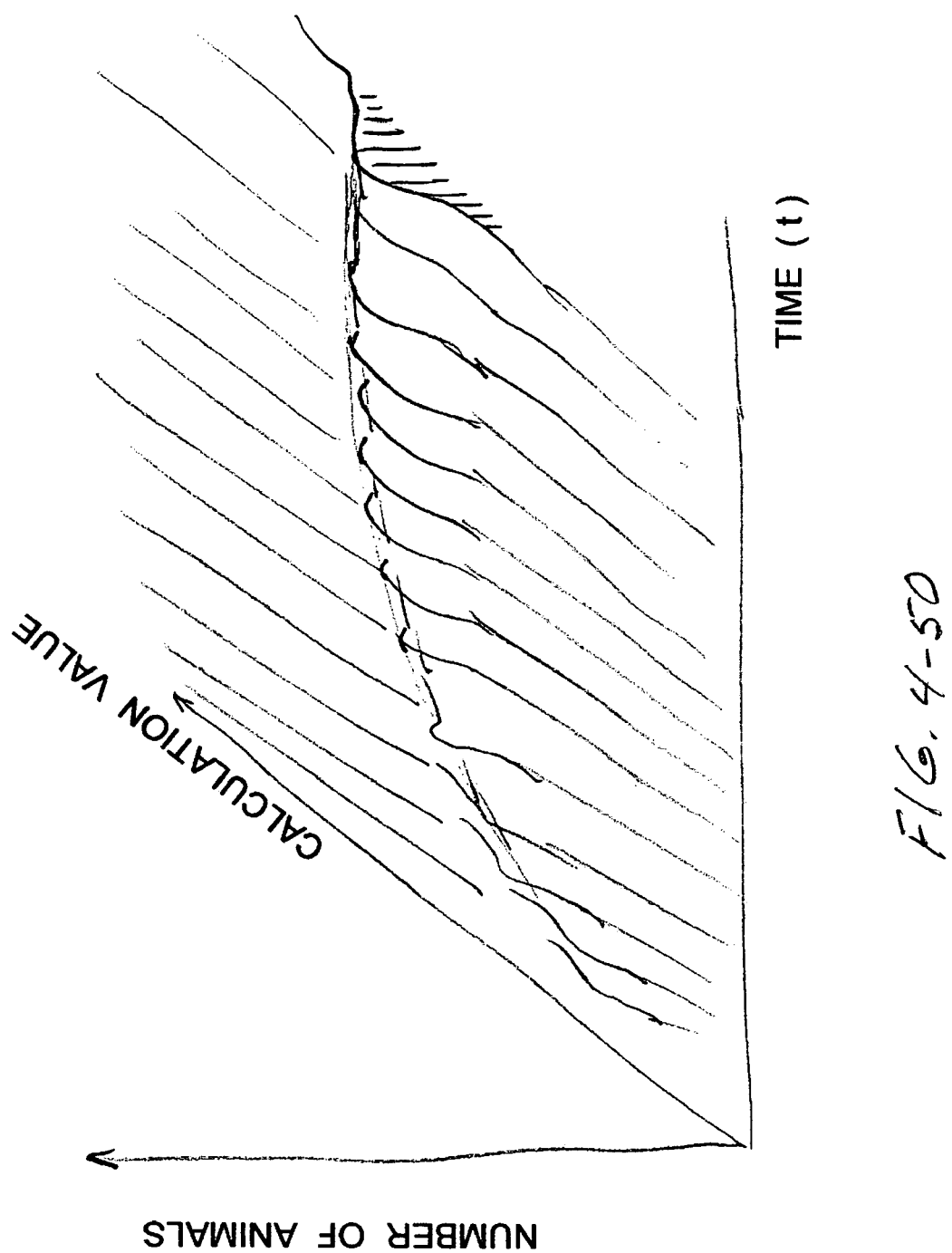
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 51A:
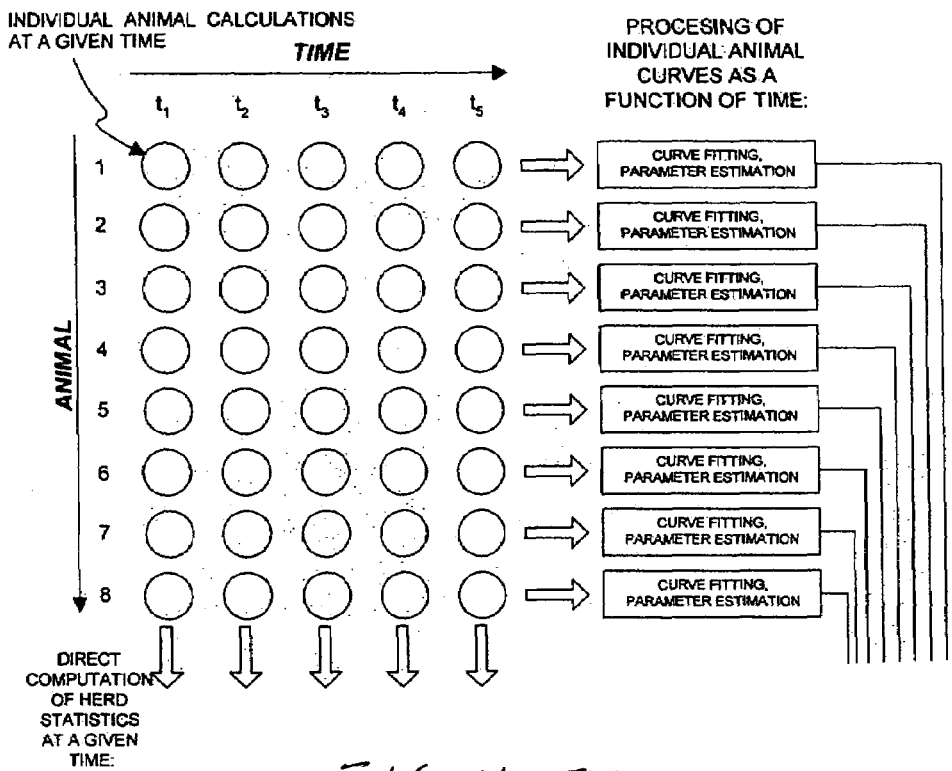
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 51B:
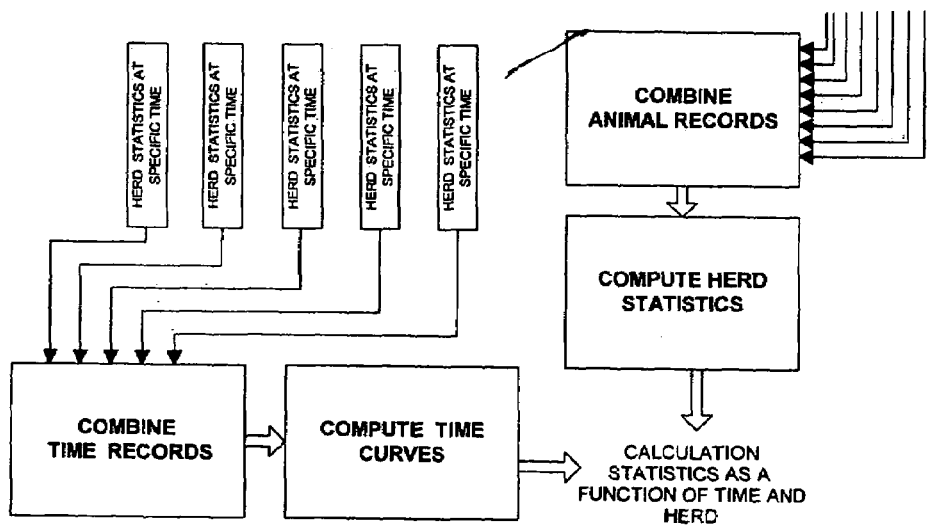
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54:
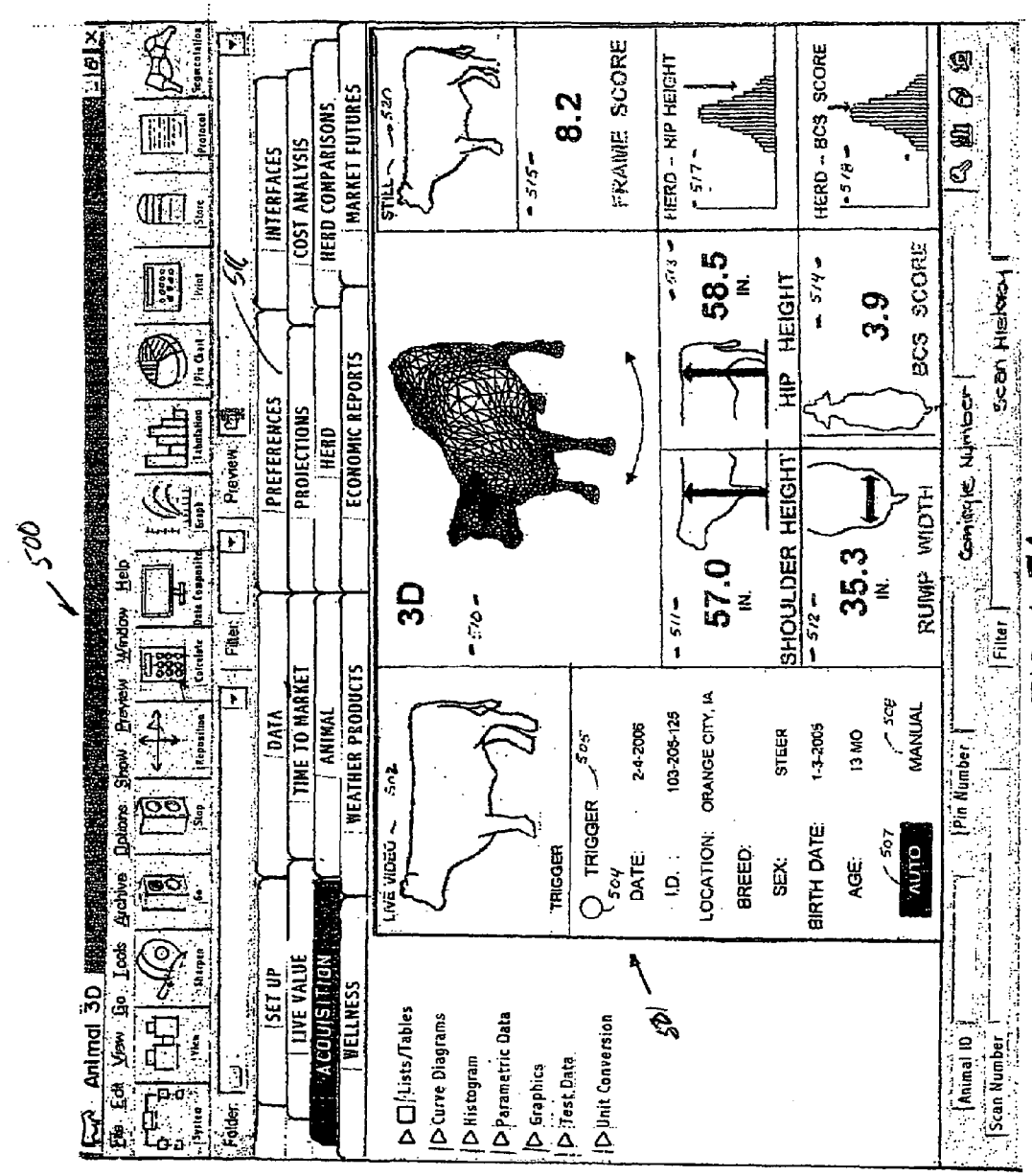
Figures 4, 55:
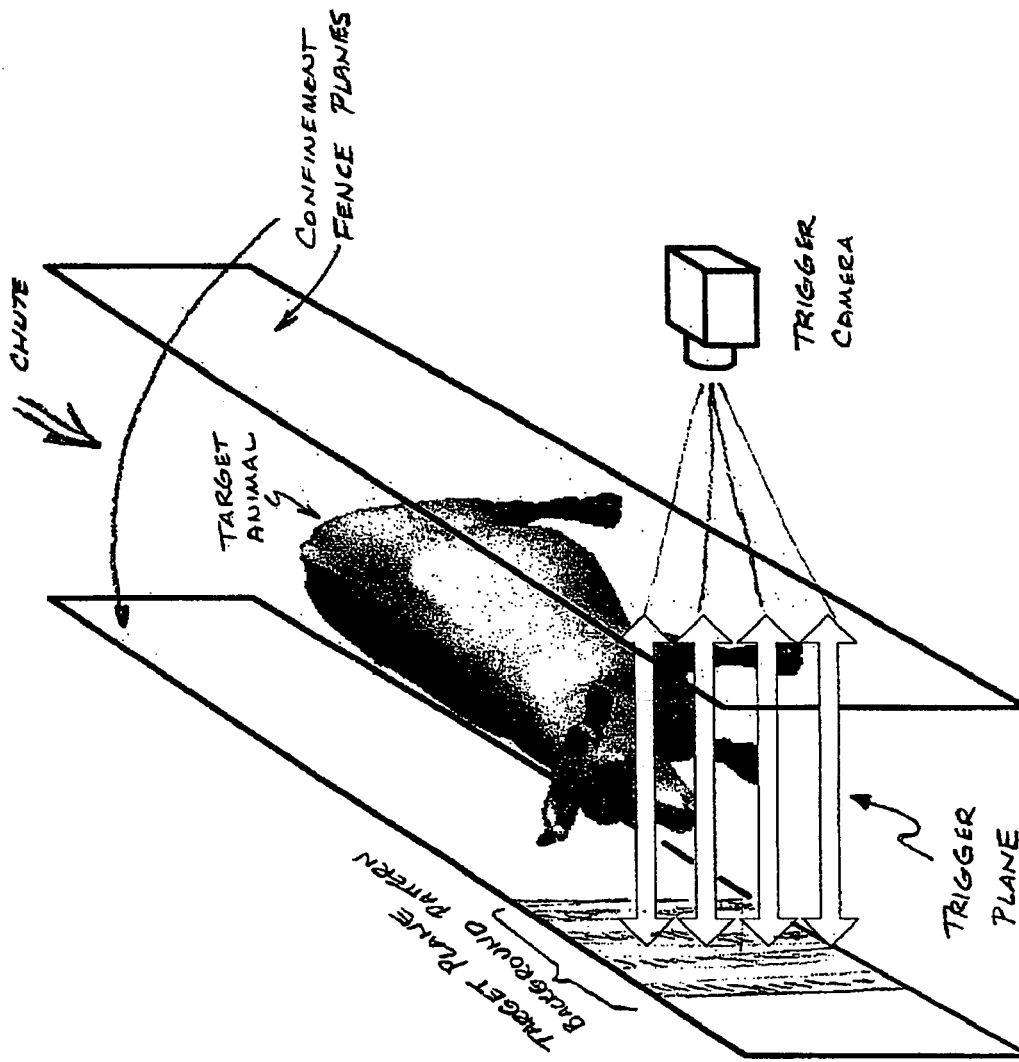

FIG. 4-55 is a generally perspective view illustrating the positioning of a target animal between a target plane and a fence plane with the animal being viewed by a trigger camera.

Figures 4, 56:

FIG. 4-56 is a generally perspective view illustrating an alternative three-dimensional shaded interpolated surface data display format.

FIG. 4-57A is a generally diagrammatic view displaying various animal characteristics obtained over time in accordance with one form of the method of the present invention.

FIG. 4-57B is a generally diagrammatic view displaying various measurements over time of animal cross-sectional areas obtained in accordance with one form of the invention.

Figures 4, 58:
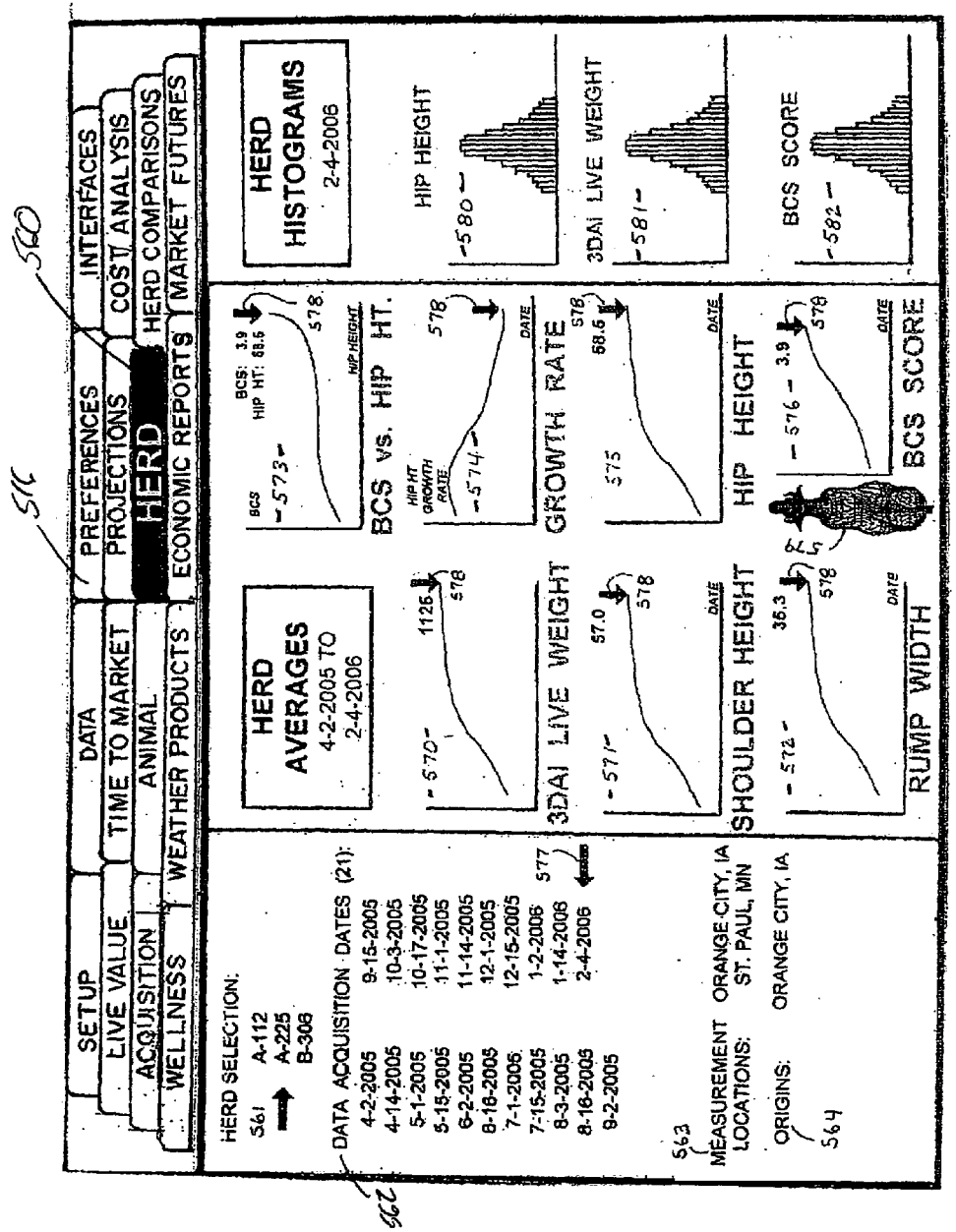

FIG. 4-58 is a generally diagrammatic view illustrating various herd data acquired over time in accordance with one form of the method of the present invention.

Figures 4, 59:
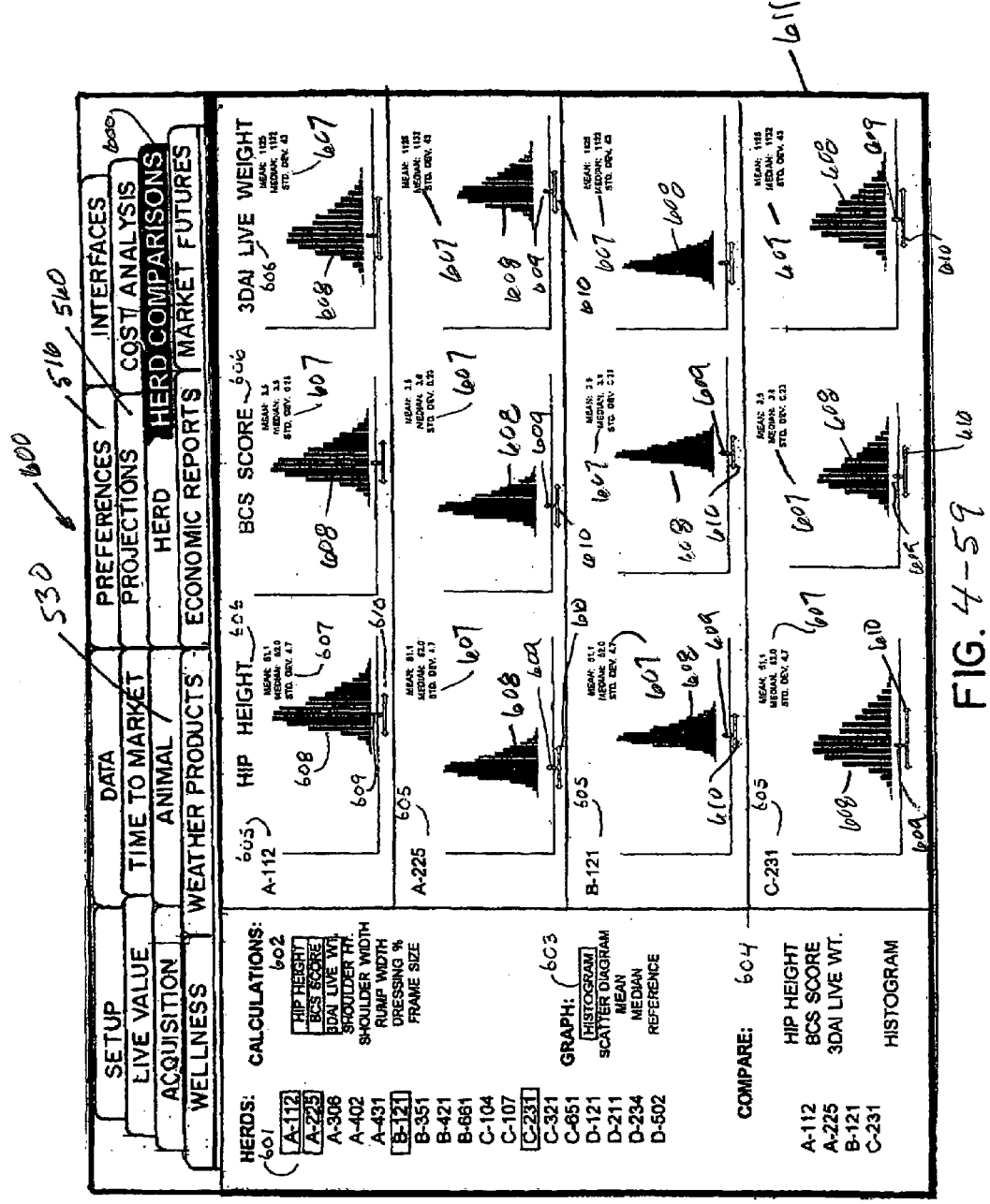

FIG. 4-59 is a generally diagrammatic view illustrating various herd comparison data acquired over time in accordance with one form of the method of the present invention.

Figures 4, 60:
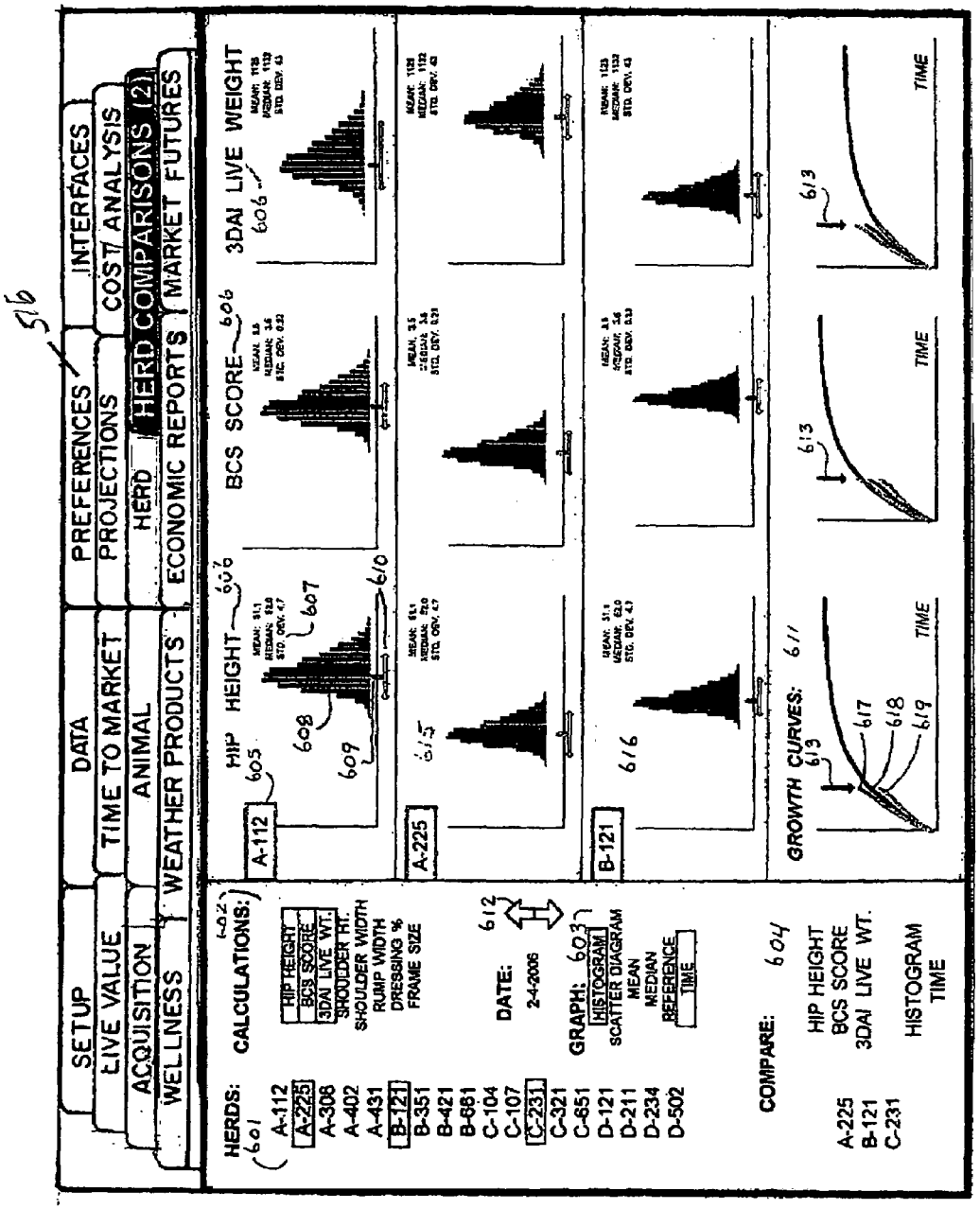

FIG. 4-60 is a generally diagrammatic representation of further herd comparison data acquired over time in accordance with one form of the method of the invention.

Figures 4, 61:
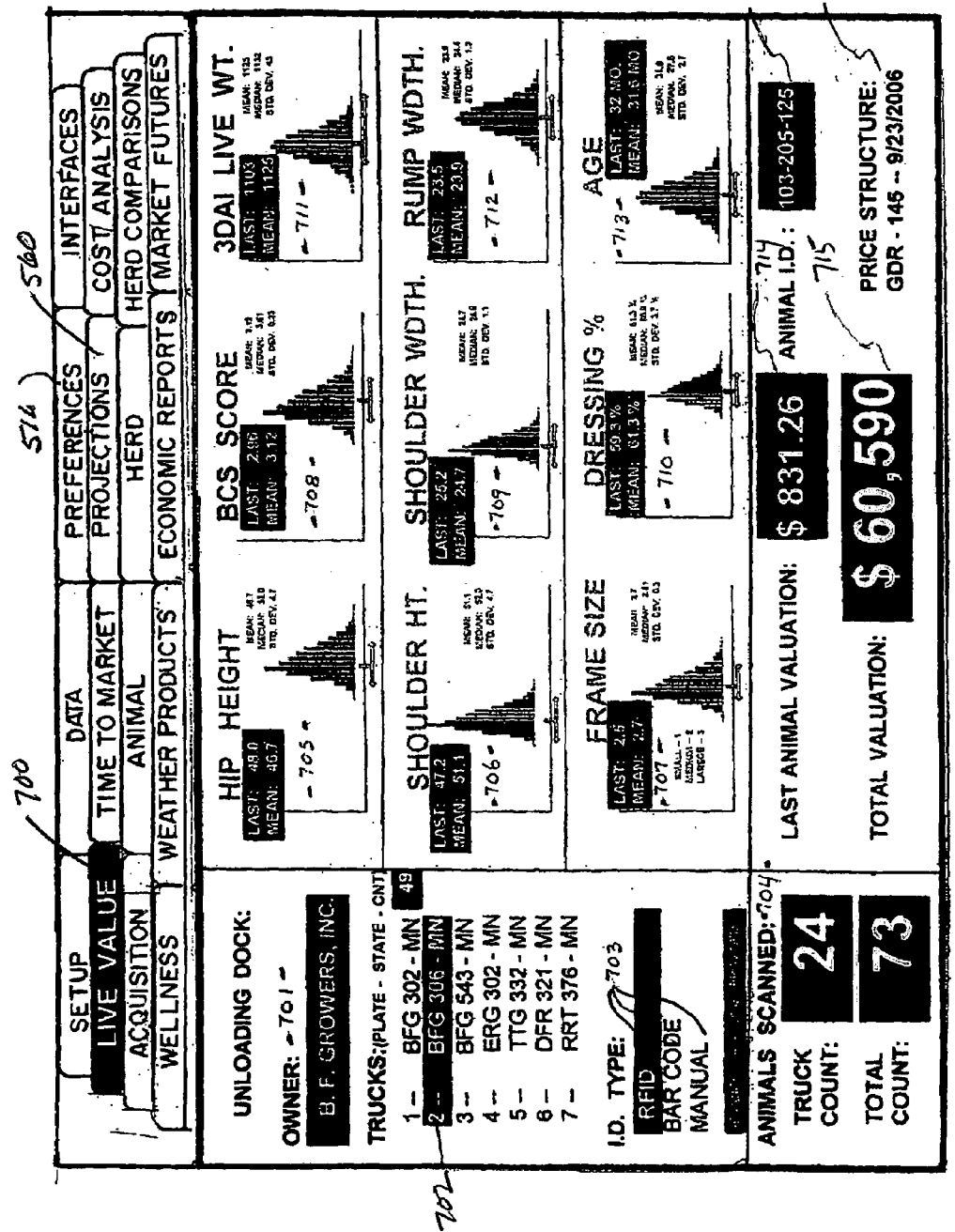

FIG. 4-61 is a generally diagrammatic view depicting various projected animal live value data obtained in accordance with one form of the method of the invention.

FIG. 4-62 is a generally diagrammatic view illustrating time to market data as obtained in accordance with one form of the method of the invention.

Figures 4, 63:
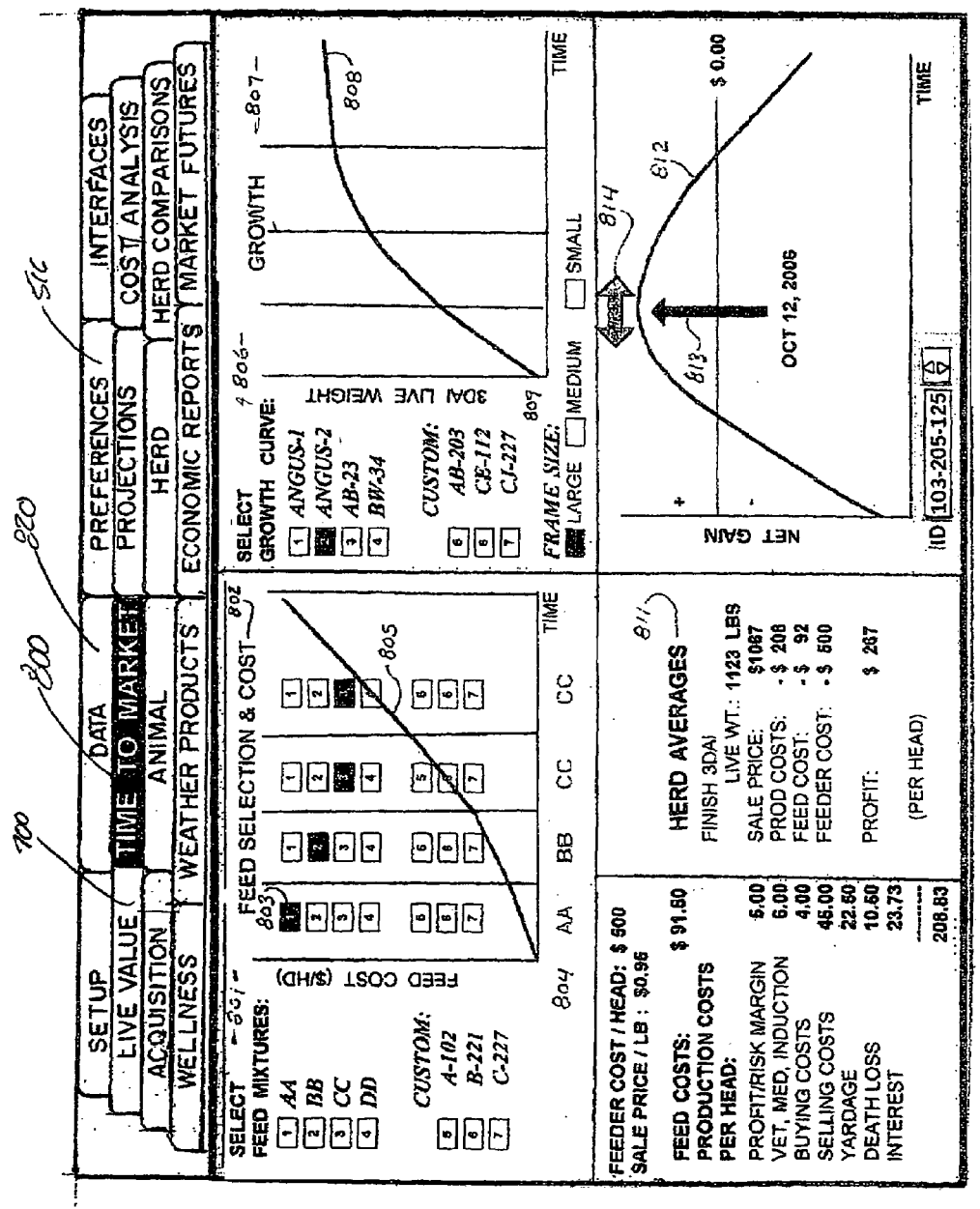
Figures 4, 63:
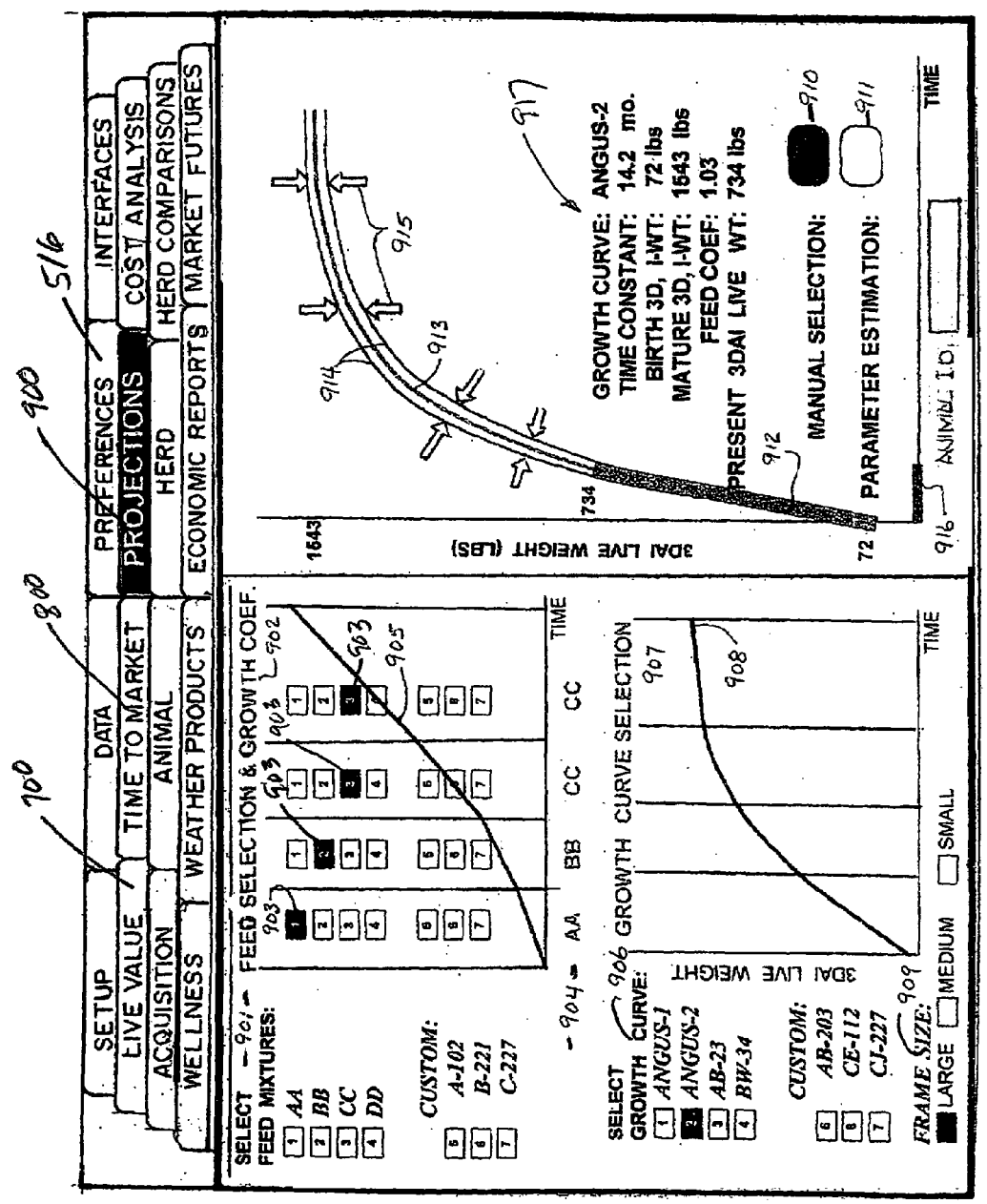

FIG. 4-63 is a generally diagrammatic view illustrating projection data derived in accordance with one form of the method of the present invention.

Figures 4, 64:
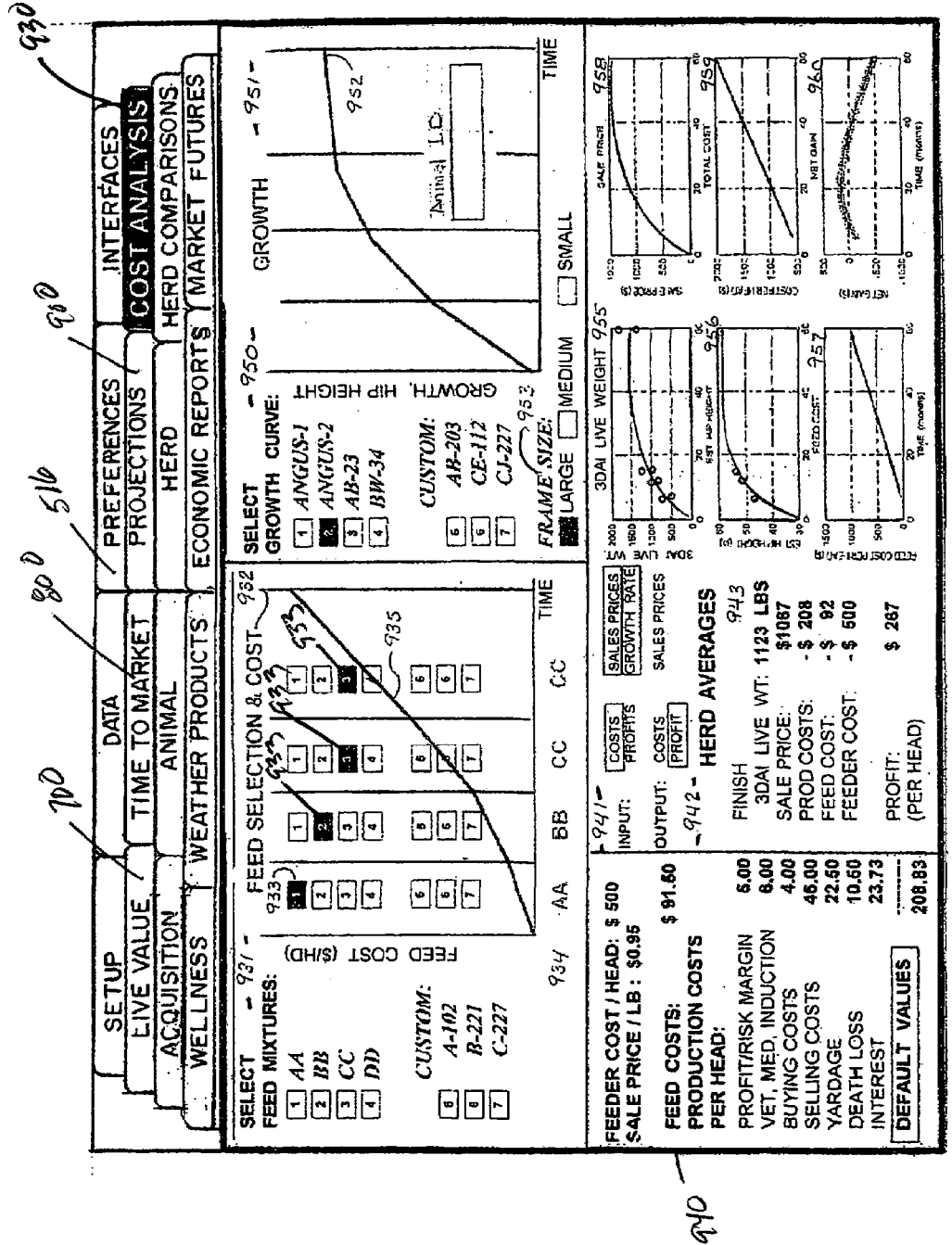

FIG. 4-64 is a generally diagrammatic view illustrating various cost analysis derived in accordance with one form of the method of the present invention.

FIG. 4-65 is a generally diagrammatic representation of various preferences programmable in accordance with one form of the method of the present invention.

FIG. 4-66 is a generally diagrammatic view illustrating certain parameter and systems format used in carrying out one form of the method of the present invention.

FIG. 4-67 is a generally diagrammatic view illustrating various types of input/output data and authorized reporting available for selection in accordance with one form of the method of the present invention.

Figures 4, 68:
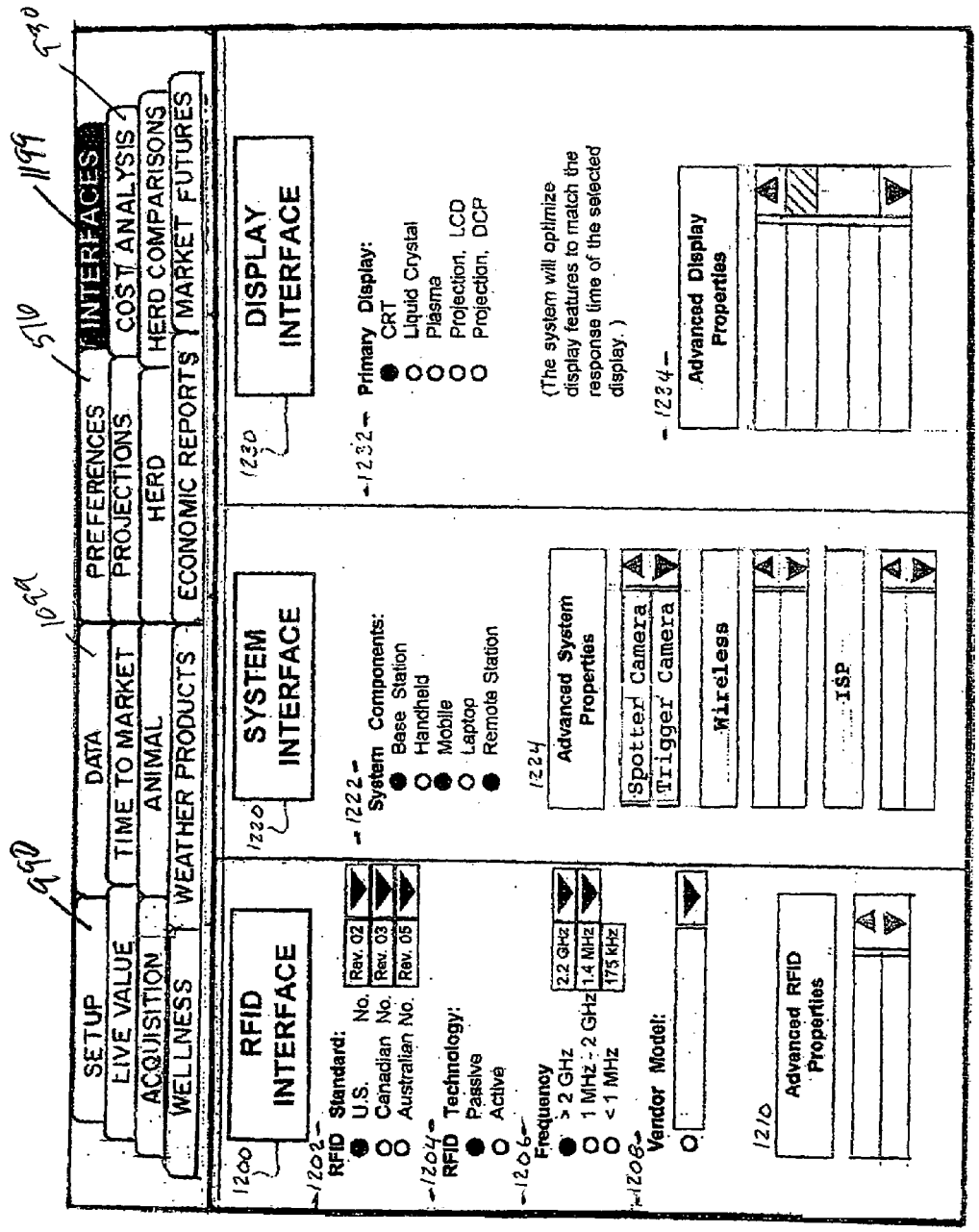

FIG. 4-68 is a generally diagrammatic view illustrating the Radio Frequency Identification Device, System and Display interfaces in accordance with one form of the invention.

FIG. 4-69 is a generally schematic diagram illustrating animal general wellness and thermography data acquired in accordance with one form of the invention.

Figures 4, 70:
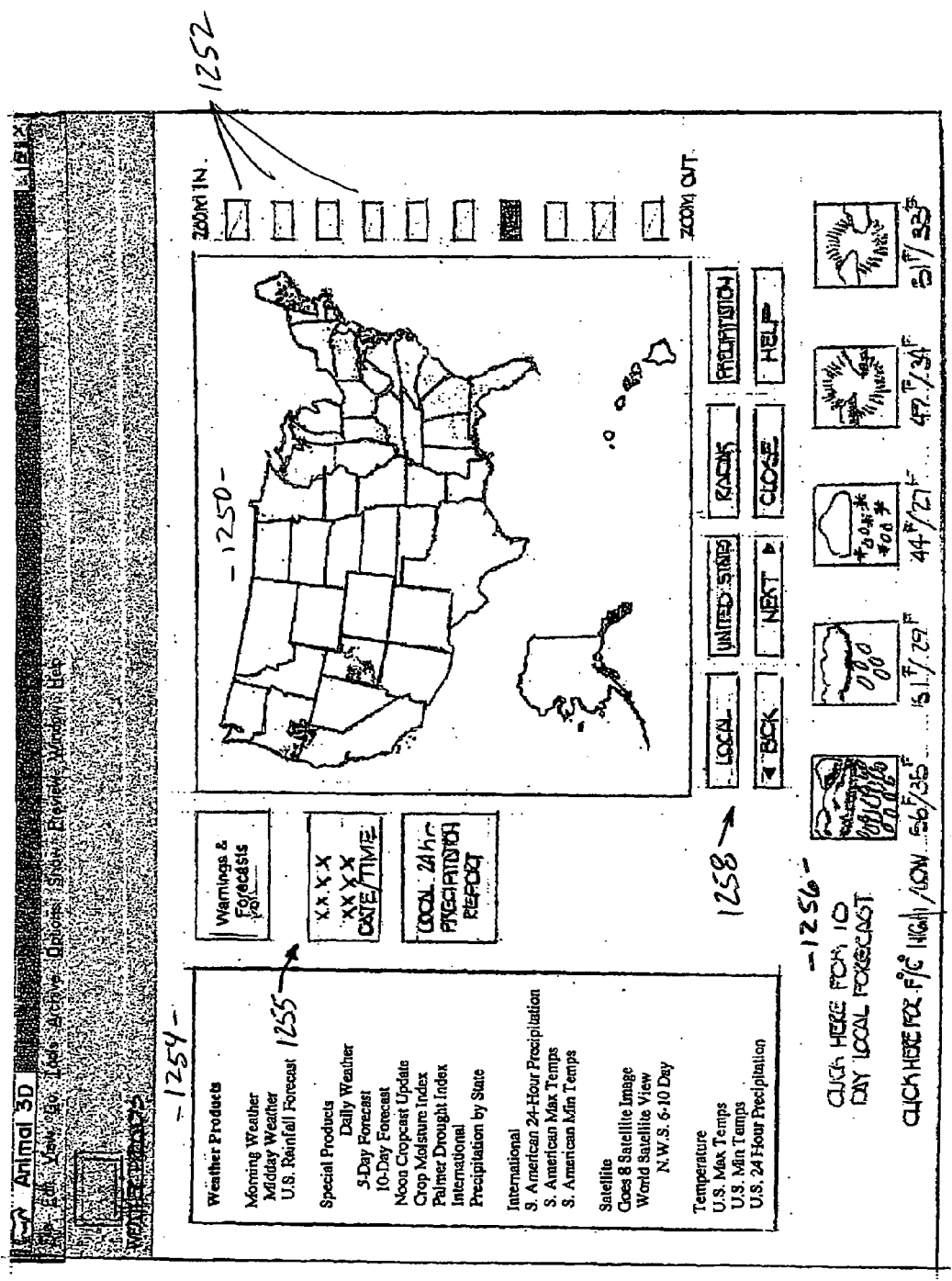

FIG. 4-70 is a generally diagrammatic view illustrating various weather products of the invention.

Figures 4, 71:
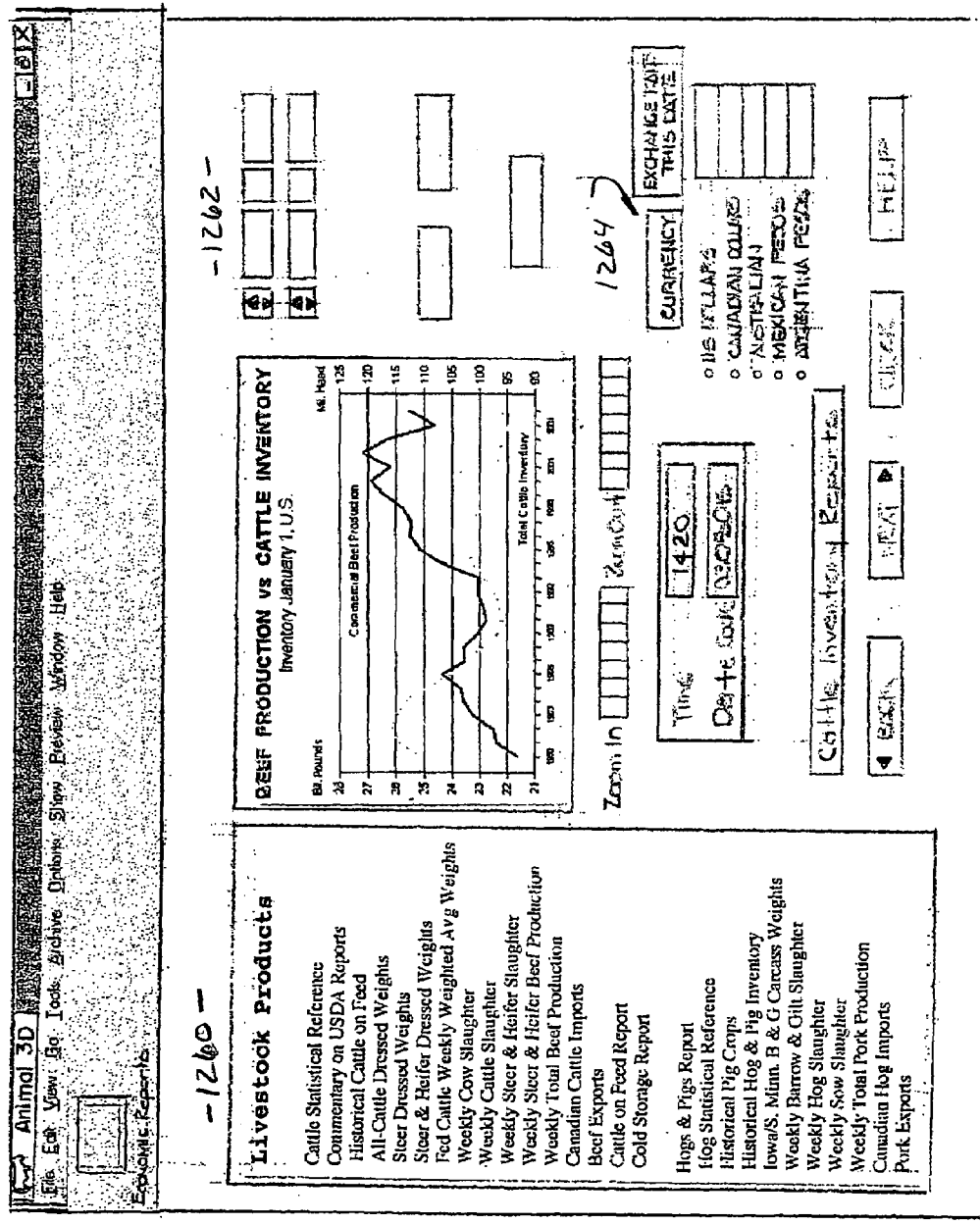

FIG. 4-71 is a diagrammatic view illustrating various economic data available in accordance with one form of the invention.

FIG. 4-72A is a generally diagrammatic view illustrating e-commerce market futures transaction capability available in accordance with one form of the method of the invention.

Figures 4, 72B:
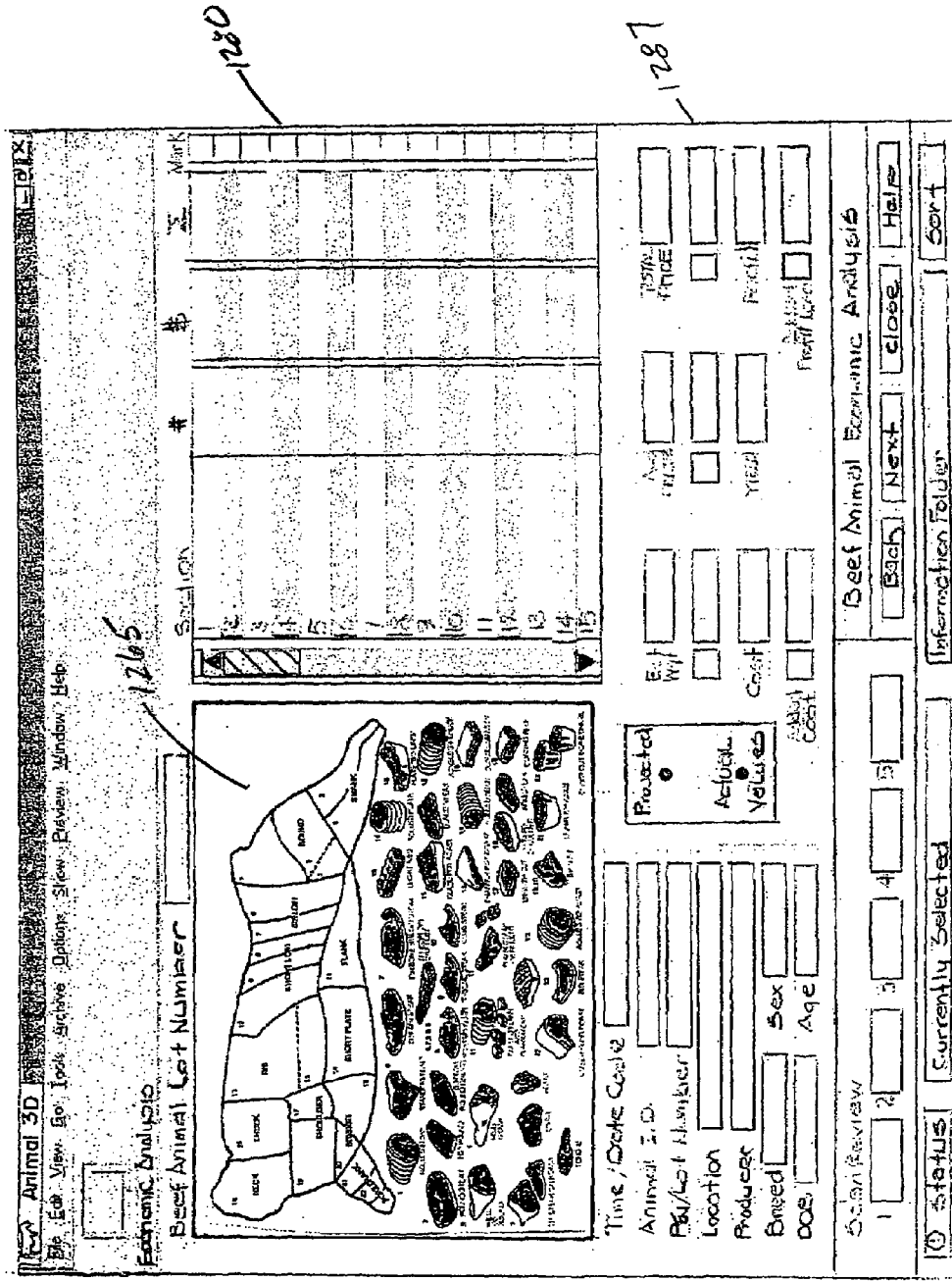

FIG. 4-72B is a generally diagrammatic view illustrating derived data concerning various beef animal meat cuts and the specific related economic value obtained in accordance with one form of the method of the invention.

Figures 4, 72C:
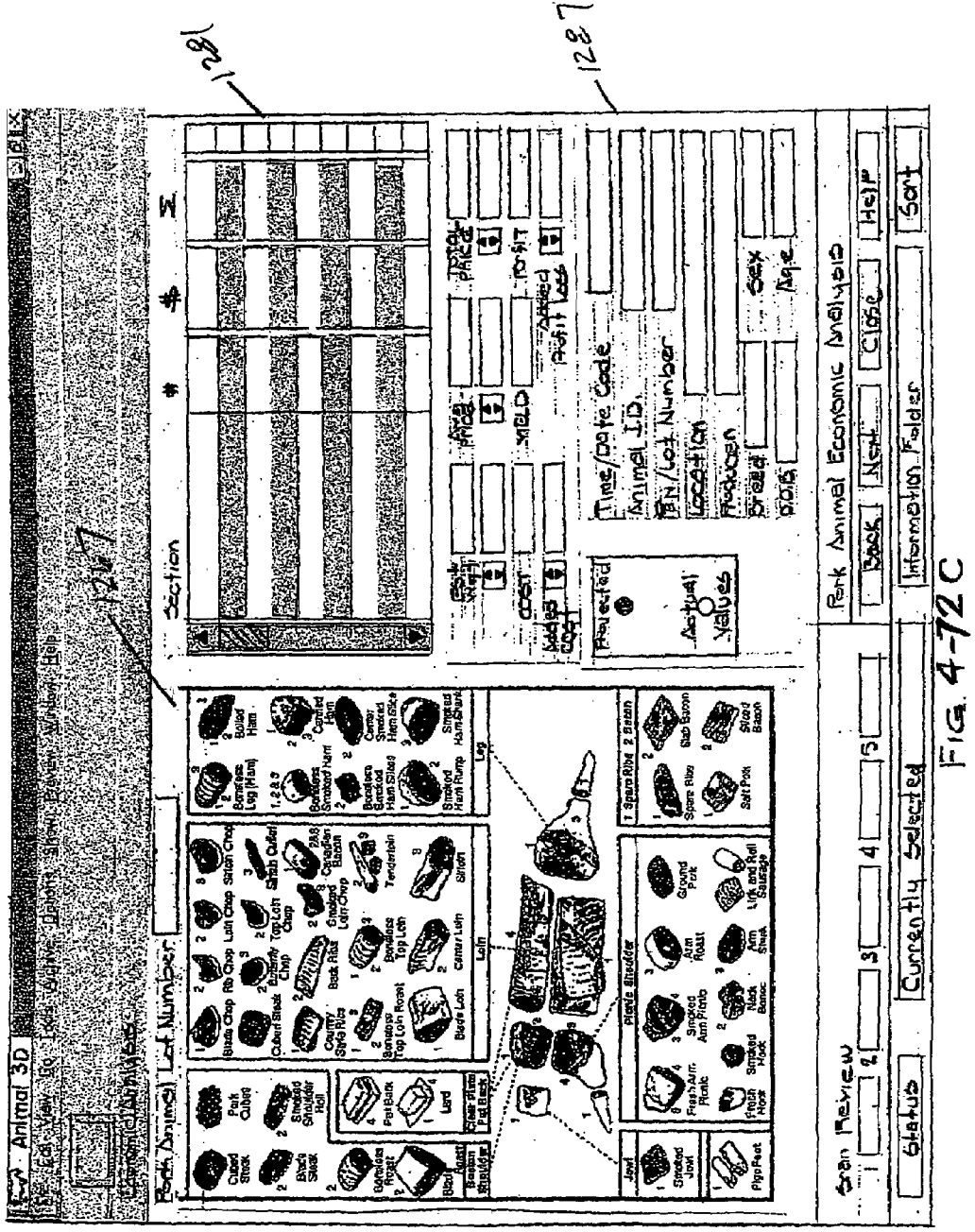

FIG. 4-72C is a generally diagrammatic view illustrating derived data concerning various pork animal meat cuts obtained in accordance with one form of the method of the invention.

Figures 4, 73:
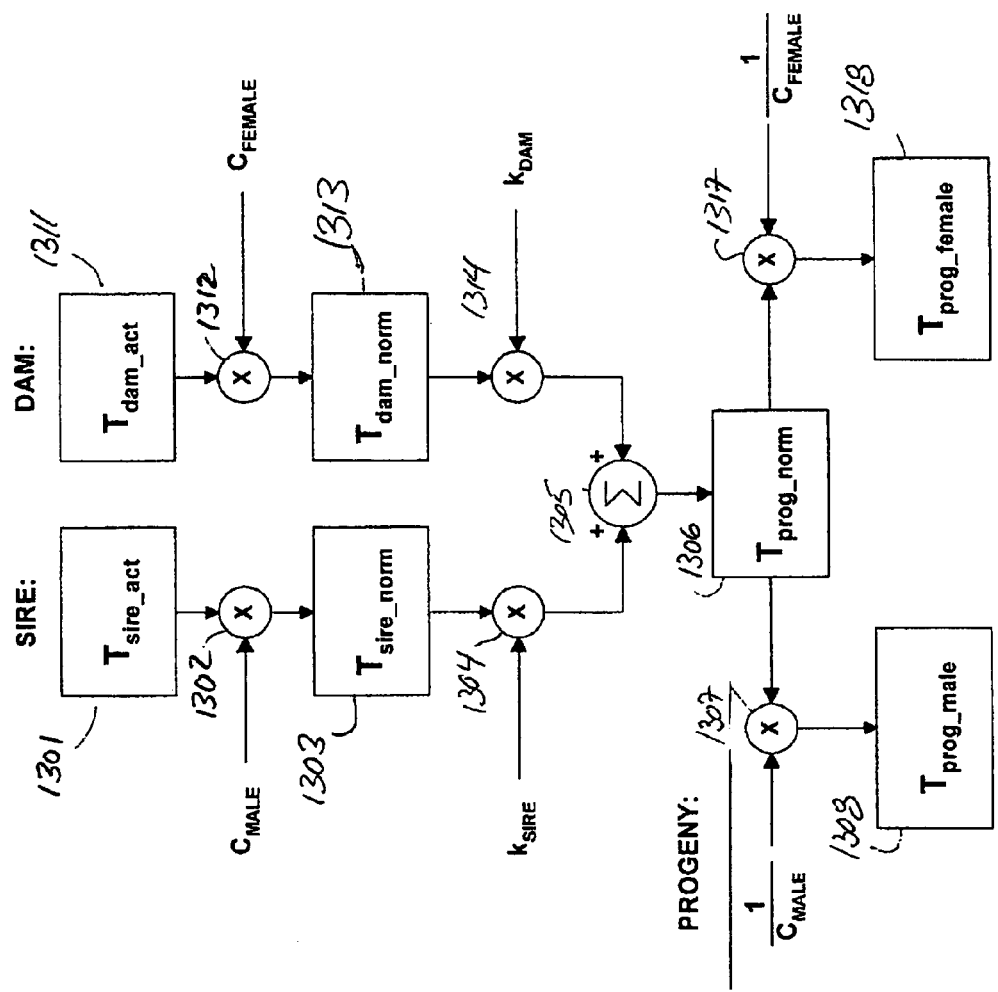

FIG. 4-73 is a generally schematic diagram illustrating trait transmission from sire and dam to progeny.

Figures 4, 74:
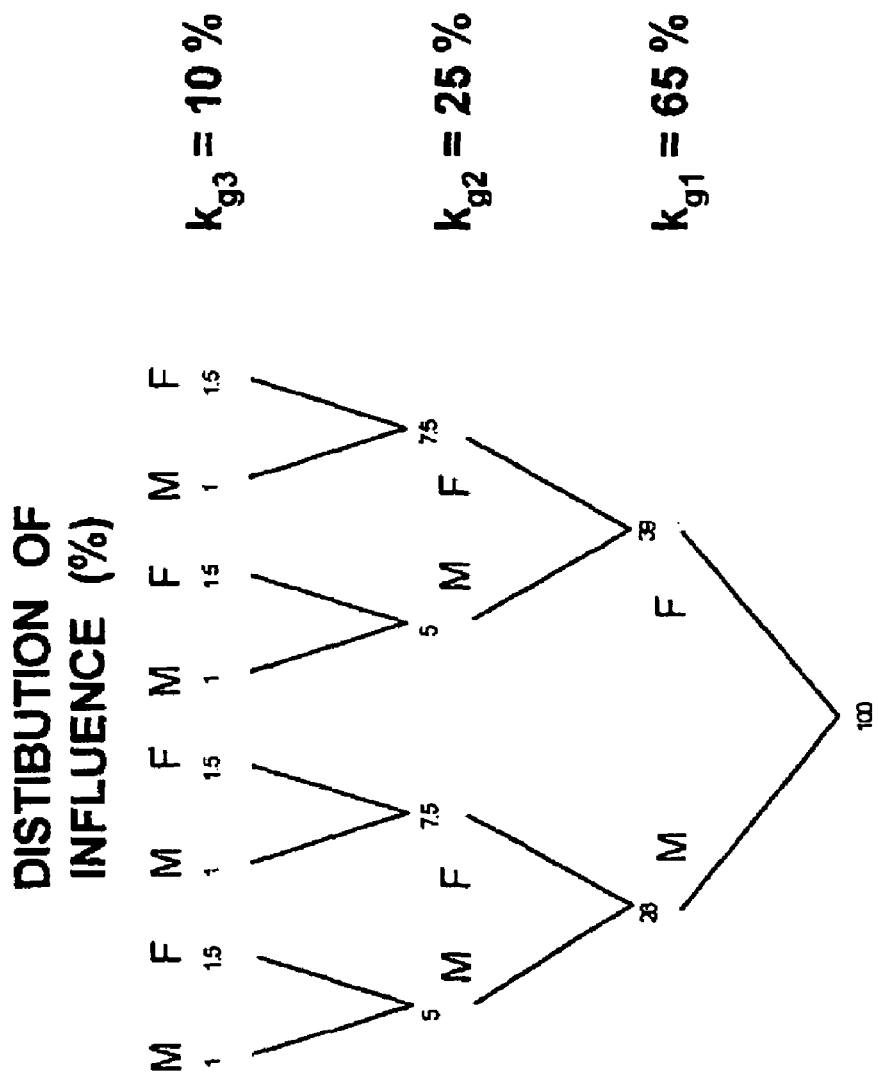

FIG. 4-74 is a generally schematic diagram illustrating a sample breeding tree showing distribution of influence among male/female sire and dam animals.

Figures 4, 75B:
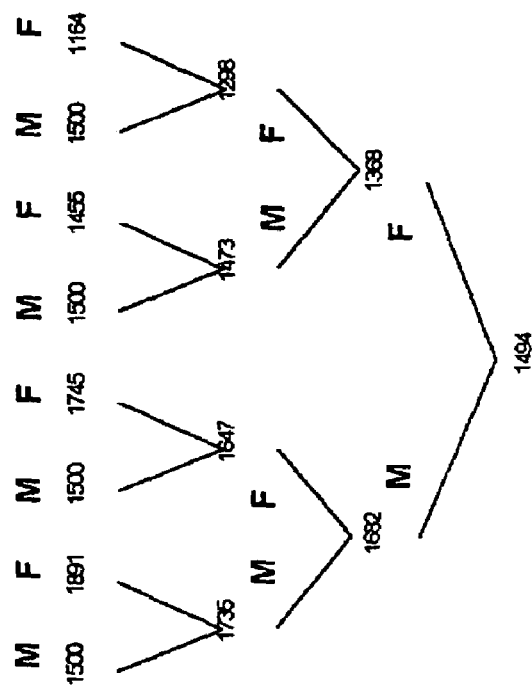
Figures 4, 75A:
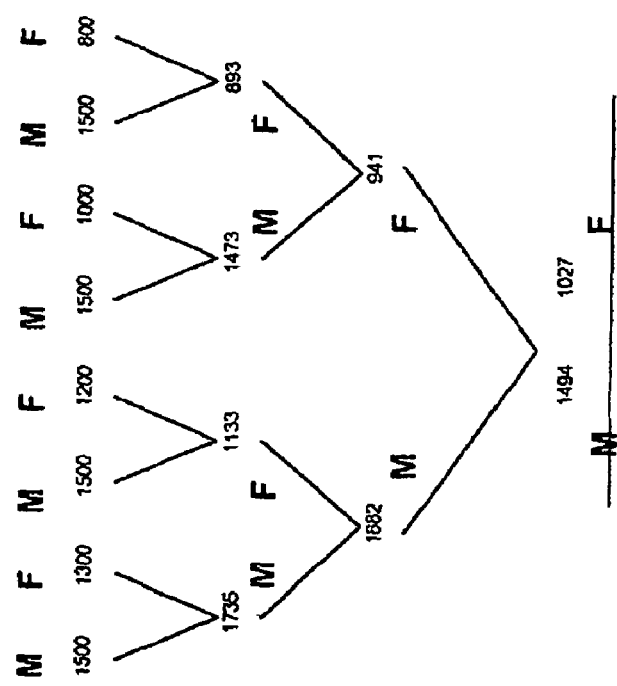

FIG. 4-75A is a diagrammatical representation illustrating male/female inferred live animal weights acquired with one form of the method of the invention.

FIG. 4-75B is a diagrammatic representation illustrating normalized inferred animal live-weights acquired with one form of the method of the invention.

DESCRIPTION OF THE INVENTION

The present invention concerns novel methods and apparatus for obtaining volumetric, curvilinear (surface) and linear measurements of livestock animals and full carcasses, specifically cattle and hogs. As used herein, the term "animal" means both live animals as well as carcasses. Important goals of the invention are to provide significantly improved accuracy over existing technology and also to increase the speed of acquiring these measurements.

Figures 1, 2:
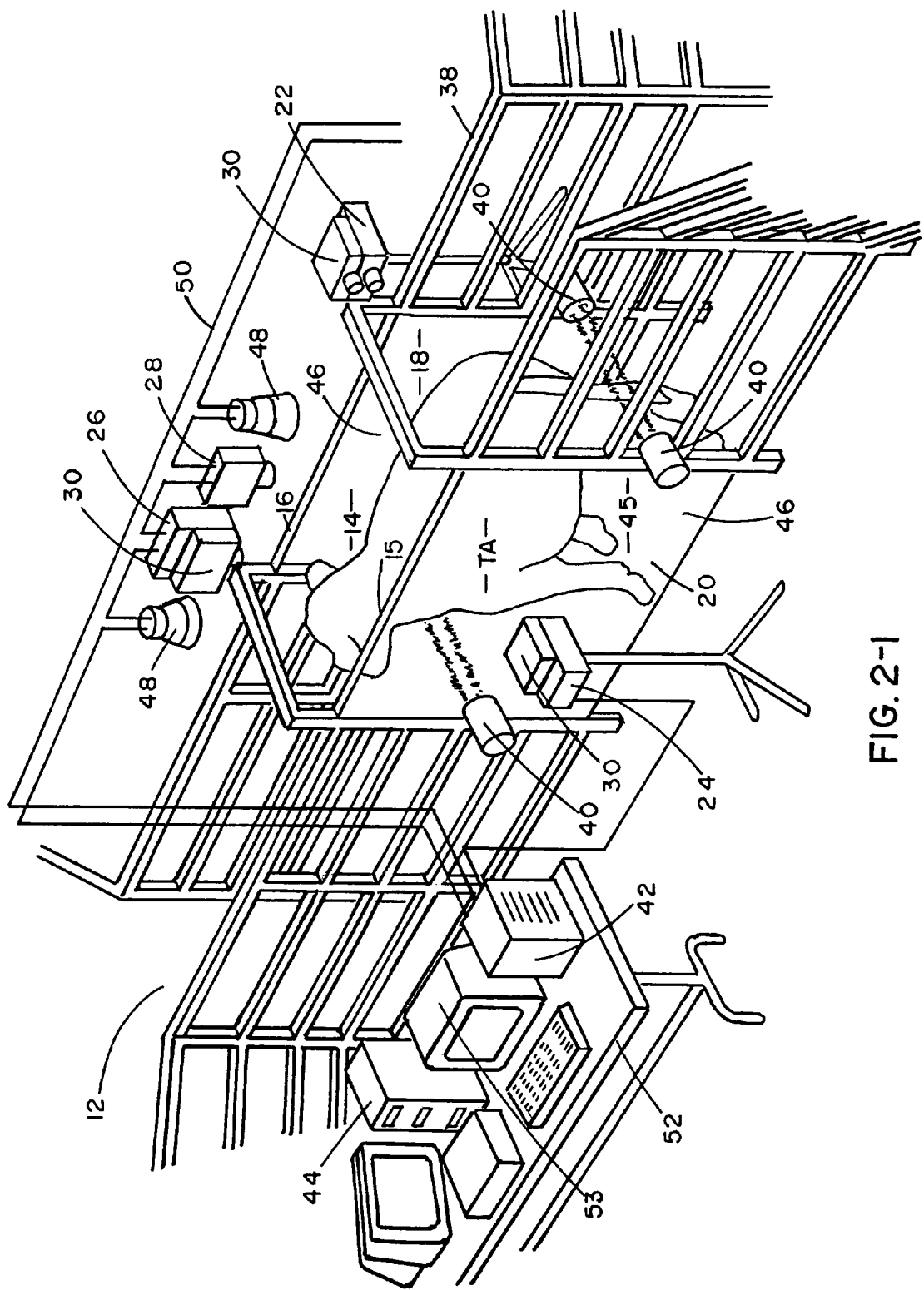
Figures 2, 2A:
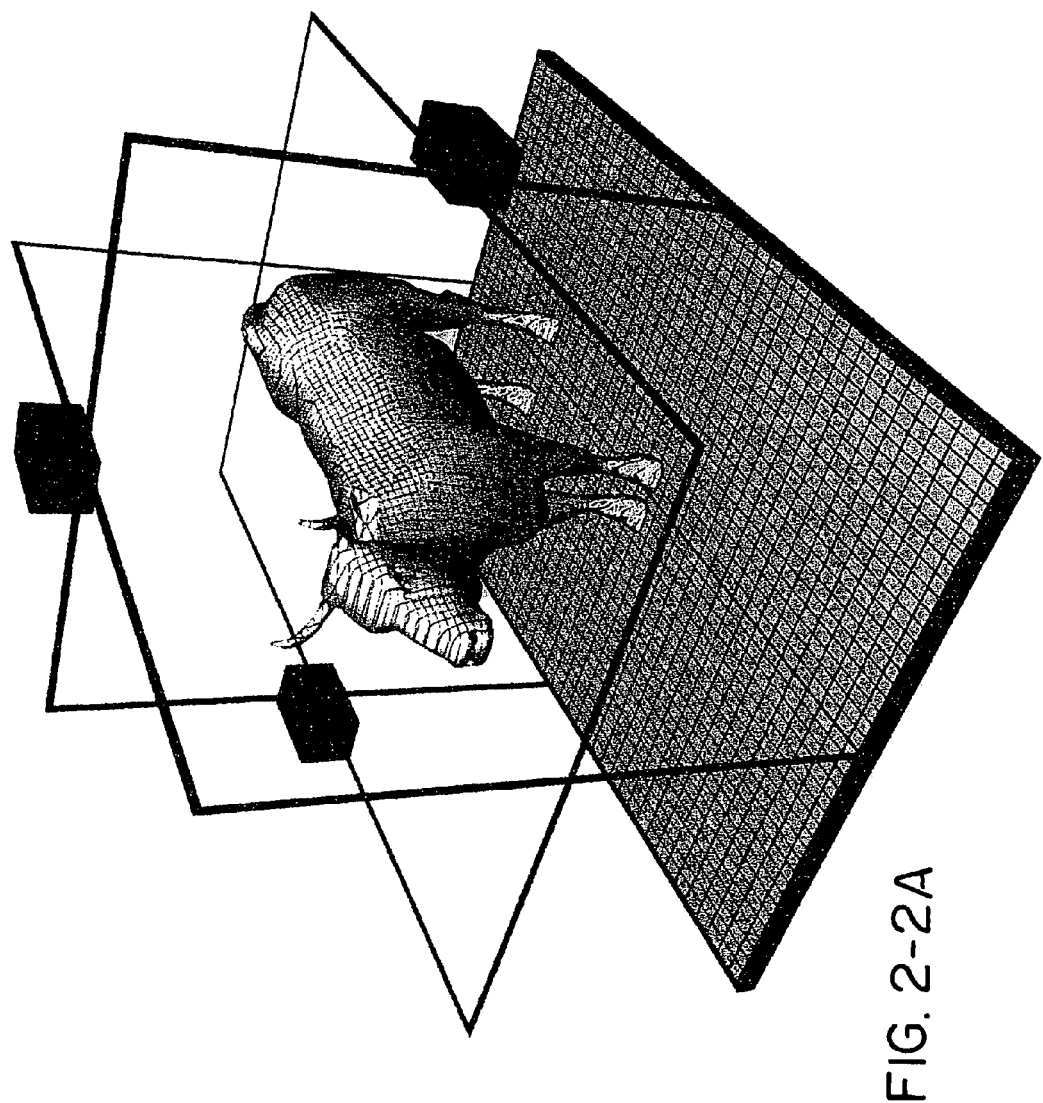
Figures 2, 2B:
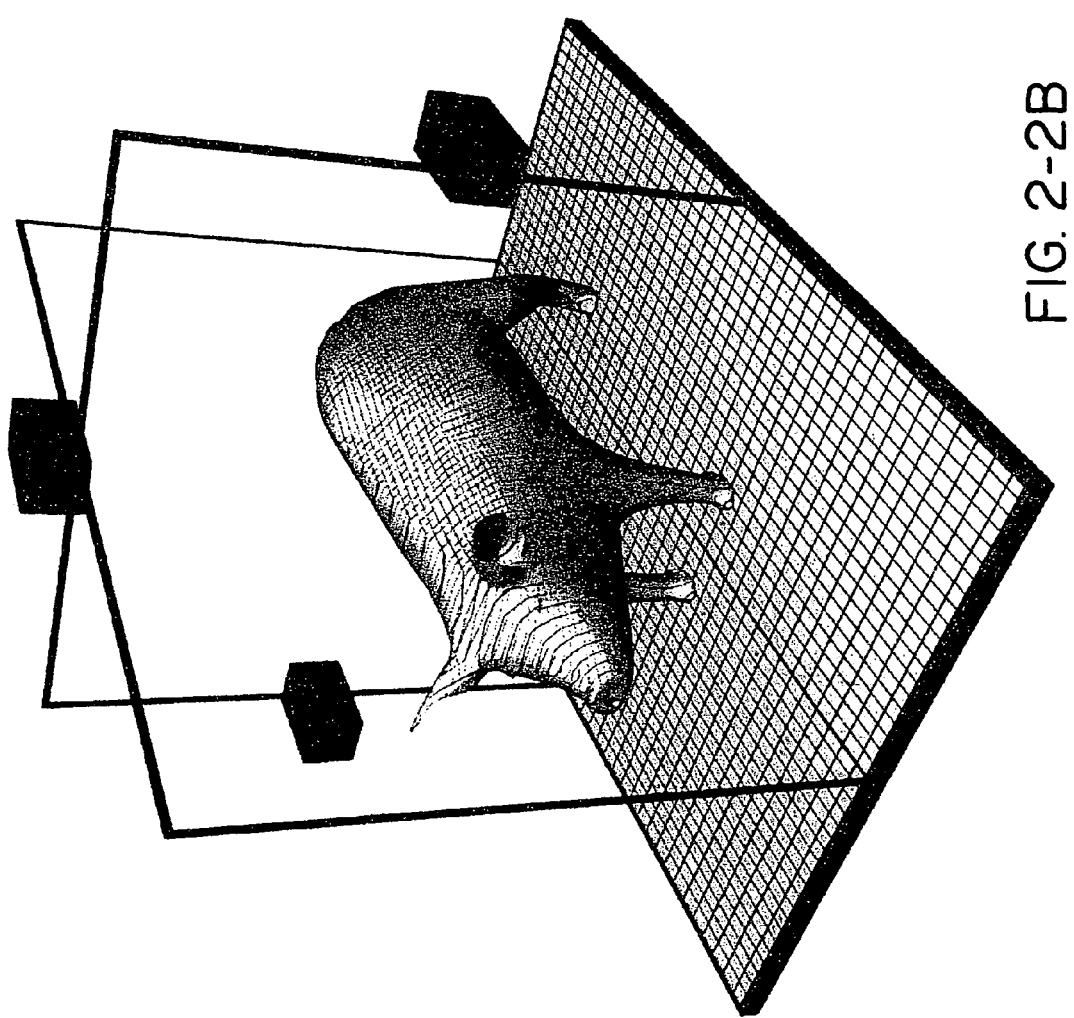

The apparatus of the invention comprises three cameras and data processing techniques to achieve 3D data sets that are a dramatic improvement over silhouette, profile or even two-dimensional (2D) video images that may possess grayscale or color information. FIGS. 2-2A and 2-2B graphically illustrate the power of the three-dimensional data set for cattle and hogs, respectively. These Figures show animal data sets which are oriented in a three-axis, coordinate system (though other coordinate systems such as cylindrical or spherical are also possible). The black boxes indicate likely camera positions used to acquire 3D surfaces which are combined to yield the full surface data sets. While the present embodiments use camera technologies which yield surface information about the target animals, the substitution of other camera methods such as magnetic resonance, ultrasound, or X-ray can yield full volume data which includes the location and geometries of internal organs such as heart, lungs, muscles, and bone. FIGS. 2-2A and 2-2B indicate the position of median and lateral planes intersecting near the animals' center of gravity. Any number of parallel or non-parallel planes may be used to intersect the animal data set for visualization and measurement purposes. FIG. 2-2A also shows a horizontal plane intersecting the cow data set at the level of the side view cameras.

The power of the 3D data set is further illustrated in FIGS. 2-5A and 2-5B which show various views of cattle and hogs, respectively. In both Figures the top image shows the rear perspective view; the center image shows the full side view; full left view; and the bottom image shows the perspective front view.

While FIGS. 2-5A and 2-5B show certain angular views of the target animals, it is evident to those skilled in the art that a view from any angle is possible. The animal data set may be rotated, revolved or scaled in order to be viewed from any direction, or in any regional detail, which may be found beneficial.

Similarly, while FIGS. 2-5A and 2-5B show live target animals, the system target can just as easily be used to analyze full or partial carcasses. The dimensional and viewing capabilities for such an application are identical to those described for live animals.

3.1 Range Camera Technology

Range Camera Characteristics

The advantageous characteristics of a range camera technology have been previously discussed herein. In brief, an applicable range camera technology should exhibit characteristics which include fast image acquisition or shutter speeds, multi-camera synchronization, structured light systems which project pre-selected patterns on the targets, both slow and fast frame rates, color image capability, and standby image feed to assist with animal alignment.

The need for a range camera technology that overcomes likely target motion dominates the selection criteria. Depth-from-defocus (DFD) technology leads the present range camera technology when viewed from the perspective of target motion. DFD offers a number of advantages over competing approaches.

Description of Depth-from-Defocus Technology

Depth-from-defocus (DFD) technology takes advantage of the commonly observed fact that objects in focus appear crisp and detailed, while objects out of focus appear blurred. Technically, a focused image occurs when the light reflected from a target, located at a distance, $d_T$, from the lens, is precisely focused onto an image plane behind the lens. Under highly focused conditions, detailed surface texture from the target is reproduced on the image plane with high contrast. When a charge-coupled device (CCD) is placed at the image plane to convert the image into an electrical signal, high contrast translates to a large-amplitude, peak-to-peak voltage. As the target distance changes from the distance, $d_T$, the image becomes more blurred, correlating to a reduction in contrast and translating to a reduction in the peak-to-peak amplitude of the electrical voltage.

The degree of contrast reduction, as indicated by the voltage amplitude, can be calibrated to the change in distance from $d_T$. Most applications of depth-from-defocus employ two or more images acquired with different focus settings enabling improved precision in calibrating the distance change. To enhance the surface texture of the target, a structured illumination pattern may be employed.

A depth-from-defocus system employs a single visible-spectrum camera. Present technology uses at least three images to establish a range map of the surface. Two images are acquired at different focal distances with structured illumination while a third image is acquired with uniform illumination in order to provide cancellation of any surface reflections present in the images (albedo normalization). Innovation may eventually be able to reduce the number of images required, thus improving the throughput for real-time processing. Changes in the focal distances of the images may require compensation for the associated changes in magnification. Correction for lens aberration or distortion are also advisable.

Since a single camera is used, multiple image registration and alignment is simplified. The single camera also minimizes discontinuities in the range image. Holes in the surface due to surface obstructions will not cause algorithm instabilities as is the case for triangulation and stereoscopic systems. A flash projection system which illuminates the target with a predetermined structured light pattern provides both the desired pattern and additional motion resistance via the flash duration (a high flash intensity over a short duration effectively stops the motion within the image field).

Depth-from-Defocus Advantages over Competing Technologies

Depth-from-defocus (DFD) methods offers a number of advantages for a volumetric measurement system. FIGS. 1-1 and 1-2 show the various technologies which might be used to acquire range image (3D) data for this invention.

DFD is a non-contact technology. It uses faster and less expensive visible spectrum optics. It uses reflected light. Using optical methods, it avoids many of the pitfalls associated with non-optical methods. It even has advantages over a number of other active optical technology.

Depth-from-defocus is a non-contact method. Such noninvasive measurement methods provide remote acquisition of data and avoid the mechanically intensive probe arrays necessary with most contact techniques.

Depth-from-defocus methods may employ either visible or infrared energy. At the present time and in the foreseeable future, visible systems will provide the best performance for the 3D, surface-measurement geometry. For non-thermal data, visible equipment is faster, exhibits higher resolution, and is less expensive. A comparison of specification are shown in the table below:

TABLE 3-1

Comparison of Visible and Infrared Cameras for 3D Surface Mapping

| FEATURE | VISIBLE | INFRARED |
|---|---|---|
| resolution | still digital cameras:<br>2048 × 1536 = 3.1 megapixels<br>2272 × 1704 = 3.9 megapixels<br>2560 × 1920 = 4.9 megapixels<br>2832 × 2128 = 6.0 megapixels | 120 × 120 = 14,400 pixels<br>360 × 240 = 86,400 pixels |
| cost | $500-5000 | $13,500-30,000 |
| speed | 1/30 to 1/2000 sec | 1.5 seconds |
| A/D resolution | | 12 bits (4096 levels) |
| thermal information | NO | YES |

Depth-from-defocus methods typically use reflected light. This characteristic enables structured illumination patterns to be used to achieve specific signal processing advantages. As stated earlier, infrared energy, primarily an emissive energy method, might be employed if an advantage presents itself. Transmission methods which transmit energy through the target, such as magnetic resonance, ultrasound or X-ray, were not judged practical or economical for this application.

Depth-from-defocus techniques are optical methods. Non-optical technologies which include sonar and imaging radar have significant disadvantages for this application. Sonar or other ultrasonic methods typically use a liquid coupling medium, which is not practical for this project. While ultrasonic air operation is possible, the efficiency and lateral resolution present significant technical challenges. Imaging radar is typically used to map the earth's surface. While well-suited for large targets such as a mountain range, imaging radar is not likely to provide sufficient resolution for this project.

DFD is also an active optical method since it uses structure illumination to enhance the surface texture. Other active optical methods include pulsed or modulated light, interferometry, active depth-from-focus, active triangulation, and active stereoscopic.

Pulsed light methods utilize a pulse of light which bounces off of the target and returns to the source. The round trip time is measured and the distance computed from knowledge of the speed of light. A variation on this principle employs a continuously modulated light beam which is bounced off of the target and returned to the source. The phase of the received signal is demodulated to determine the time delay associated with the round trip to the target and back. Both of these variations require expensive test equipment to measure the small time delays inherent in light propagation. A spot or stripe scanning process is also required.

Interferometry methods include moire patterns and holography. Such methods are not applicable to this project since they work best when the surface depths are microscopic.

Active depth-from-focus (DFF) utilizes similar principles to DFD. However, DFF requires a focal scan through the range of the target. A multitude of images are acquired and processed to identify the precise distance at which each surface point is in the best focus. Since magnification changes with focal distance in most optical systems, registration and alignment of the multiple images can be a problem.

Active triangulation typically uses laser spot scanning or stripe scanning. In this method the laser beam and the camera are at different angels such that the illuminated profile of the surface is recorded in the camera. Such scanning systems require multiple images and possible considerable scanning time. Holes in the computed surface result when a surface feature obstructs either the laser beam or the camera view. Since this is a mature technology, achieving a proprietary patent position may be difficult.

Active stereoscopic vision systems may also be used to obtain 3D surface measurements. This method uses two cameras separated by a distance sufficient to triangulate on a given point on the target surface. A minimum of two images are required to compute the target surface. Holes in the computed surface result when a surface feature obstructs one of the camera views. This also is a mature technology and may be difficult to achieve a proprietary patent position.

A comparison of active optical surface detection technologies is presented in Table 2-1.

3.2 Equipment Layout

The equipment of this embodiment consists of range cameras, infrared camera(s), animal positioning devices, a control unit, a processing unit, a personal computer and peripheral devices. Each range camera consists of a visible spectrum camera, at least one illuminator, and the necessary data processing capability to convert the still or video images into range images. The positioning of the range cameras is important to assure complete and accurate coverage of the target animal.

Range Camera Positions

In one embodiment of the apparatus of the invention, three visible-spectrum range cameras are selected to accurately reproduce livestock targets as shown in FIG. 2-9. (As previously discussed, two cameras could also be used with an assumption of lateral symmetry.) The cameras are positioned to provide two opposing side views and a top view. The side view cameras are positioned at the longitudinal center of the animal with the vertical elevation being slightly below the expected center of the animal to provide additional ventral surface coverage. Each range camera obtains a range image of the animal surface within its field of view. The surface seams are shown in FIG. 2-9. Seams 1-2 and 3-2 are in regions where there is an overlap of range image surfaces. This provides sufficient surface accuracy to achieve the desired volume calculations. The 1-3 seam is given a bit of overlap by the reduced vertical camera positions.

Since this embodiment employs visible spectrum cameras instead of more expensive laser ranging cameras, the need to assume lateral symmetry is not as great. Therefore, no special effort is required to establish the median plane to compute lateral symmetry. The opposing range images of the side cameras will simply indicate the dimensional position of the surface segments. This approach is also less sensitive to animals that may not be aligned precisely with the coordinate system of the cameras. Any misalignment will still result in a 3D data set which can be rotated mathematically if necessary.

Visible Spectrum Cameras

The ideal visible spectrum camera for this embodiment would acquire three images (or however many images were required for range camera processing) simultaneously, with very fast shutter or acquisition speeds. The fast shutter speed would assure that there was no motion blurring within a given image. The simultaneous acquisition of three images would assure that there was no misalignment from image to image due to movement of the target animal. This ideal camera would also have the ability to be electronically triggered in order to synchronize the image acquisitions with the structured-light, flash illumination.

The Nikon, D1X, and the Canon EOS-1D cameras are viable candidates for the visible spectrum camera. These cameras are single lens reflex (SLR), digital cameras. Both are capable of stopping any motion on an individual image with shutter speeds of up to ($\frac{1}{16000}$) of a second. The resolution of the DX1 and the EOS-1D are 5.74 megapixels and 4.48 megapixels, respectively. Both may be controlled by computer via a IEEE 1394 interface (very fast USB-2). Both accept a wide assortment of interchangeable lenses. The DX1 and EOS-D1 can store 9 frames and 21 frames, respectively, to resident memory before needing to download to a computer or record to memory disk.

With respect to shoot speed, the Nikon, D1X is only capable of continuous shooting at a rate of 3 frames per second or at a frame interval of 333 ms. The Canon, EOS-1D is somewhat faster at 8 frames per second or a frame interval of 125 ms. Both are significantly slower than the video rate of 30 frames per second (33.3 ms frame interval). To completely avoid motion registration problems between images, a frame interval of 1 ms or less would be preferred. However, since the shutter speeds are so fast, there is unlikely to be any blurring on an individual image. Therefore, software processing may be used to realign any movement shifts present between images.

Illuminators

This embodiment utilizes illuminators which project structured light patterns on the target animal. These illuminators consist of a flash source, a pattern mask, and a lens system capable of projecting the pattern onto the target animal. The flash source is electronically synchronized with the acquisition trigger for its respective camera. The pattern mask contains a structured light pattern which projects a textured surface onto the surface of the target animal. This pattern is processed via the digital signal processing unit as part of the range image algorithm.

Infrared Camera(s)

A radiometric infrared camera is advantageous for an embodiment of this invention since it is capable of providing a pixel-by-pixel measurement of surface temperature. This thermal image may be processed, and warped onto the 3D surface constructed from the combination of range images.

One IR camera which provides a quality thermal image is the IR Snapshot® camera developed and manufactured by Infrared Solutions, Inc. using Honeywell thermoelectric sensor technology. This camera employs a low-cost, uncooled, scanned linear array of thermoelectric thermal sensors. It provides a thermal image which is 120×120 pixels based on radiated IR in the 8 to 12 μm spectral band. Each pixel has 12 bits of useable resolution. The accuracy is specified at $\forall$2E C or 2% of the reading. The camera may be controlled via an RS-232 serial port and images stored on a resident flash card or downloaded via the serial link to a laptop or personal computer. The unit may be either line or battery powered.

Animal Positioning Equipment

As part of the present invention it is necessary to position the target animal (or whole carcass) in a proper position with respect to the range and thermal cameras. This is accomplished via a series of chutes which in a single file manner, direct the target animals into the proper position. Proximity sensors automatically alert the system when the animal is within the designated target zone. These proximity sensors may take a number of different forms. They may include a light transmitter and receiver which indicates proximity by breaking a visible or infrared beam. They may also include ultrasonic or infrared motion detection in a very limited region in front of each proximity detector. Numerous other means of detecting the proximity of the animal to a specific location are known to those skilled in the art. Additionally, a video camera (or video output on the range camera) may be used to confirm the proximity of the target animal to the target zone.

Control Unit

A control unit takes as input, the signals from the proximity sensors that identify when the target animal is within the target zone. This control unit, in turn, outputs trigger signals to initiate image capture procedures by the range and thermal imaging cameras. This control unit may consist of discrete digital circuitry, digital and analog circuitry, microprocessor-based circuitry. The control function may also be combined with the image processing function within the processing unit.

Processing Unit

The processing unit implements the algorithms, image processing, surface processing, volume processing, and measurements described within the Summary section of this application. Digital signal processing (DSP) components from such companies and Texas Instruments and Analog Devices Inc. are prime candidates for inclusion in this unit. Additionally, array processing subsystems and boards may be used to increase the processing speed if desired.

Personal Computer

A personal computer (PC) is a key component for this system. Candidates for this component include units from Dell Computer, Hewlett-Packard, and IBM. One such Dell computer is the Dimension 8200 Series with the following features:

Pentium 4 Processor at 2.4 GHz with 512 k L2;
256 Mb PC800 RDRAM;
19 inch color monitor;
GeForce4 Ti 4600 Graphics card with DVI and TV out;
120 GB, 7200 RPM hard drive;
Windows XP operating system;
16x variable DVD ROM drive;
CD-RW drive;
10/100 PCI Fast Ethernet card;
56K telephony modem;
Soundblaster Pro/16 sound card; and
appropriate software.

Such interface features as USB ports, USB-2 ports, 10/100 Ethernet interface, RS232 serial, parallel, and 56K modem permit the PC to efficiently interface with other system components as well as peripheral devices. The processor, memory and graphics card are selected to permit display and interface with the graphical output of the DSP unit. The CD-RW drive permits economical backup and storage of the resulting data. The large fast hard drive enables efficient manipulation of large data sets.

Peripheral Devices

An almost unlimited assortment of peripheral devices are possible with the above described system. Some of these peripheral devices include:

printers (laser, color inkjet, color laser, or other);
local network;
internet;
wireless links;
infrared links; and
PDAs.

Weight Measurement

While weight is not a scanned measurement consistent with the present invention, it is a commonly used metric associated with livestock. Therefore, it is reasonable to include scales as part of any measurement station. Applicable microprocessor-based, livestock scales are available from Weightronix of Fairmont, Minn.

System Layout

Referring particularly to FIG. 2-1 of the drawings, one form of the apparatus of the invention is there shown. The apparatus here comprises an animal positioning device, generally designated by the numeral 12. Device 12 defines an animal target zone 14 that has first and second sides 15 and 16, an open top 18 and a floor 20. Positioned in close proximity of positioning device 12 are first and second range cameras 22 and 24 and a top range camera 26. An infrared camera 28, of the character previously described is also positioned proximate the open top 18 of the positioning device. Each range camera consists of a visible spectrum camera, at least one illuminator 30, and the necessary data processing capability to convert the camera images into range images.

In the embodiment of the invention shown in FIG. 2-1, the cameras are positioned to provide two opposing side views and a top view. As indicated in FIGS. 2-2A and 2-2B, the first- and second-side view cameras are positioned at the longitudinal center of the animal with the vertical elevation being slightly below the expected center of the animal to provide additional ventral surface coverage. Each range camera obtains a range image of the animal surface within its field of view. The surface seams are shown in FIG. 2-9. Seams 32 and 34 are in regions where there is an overlap of range image surfaces. This provides sufficient surface accuracy to achieve the desired volume calculations. Surface seam 36 is given a bit of overlap by the reduced vertical camera positions.

As previously mentioned, while various commercially available cameras can be used in accomplishing the method of the present invention, the previously identified camera manufactured by the Nikon, Inc. with the model designation "D1X" and the previously identified camera manufactured by Canon, Inc. having the model designation "EOS-1D" are suitable for use in the practice of the invention. These cameras are single lens reflex (SLR), digital cameras and both are capable of stopping any motion on an individual image with shutter speeds of up to $\frac{1}{16000}$ of a second. The resolution of the "D1X" and the "EOS-1D" are 5.74 megapixels and 4.48 megapixels, respectively. Both may be controlled by computer via an Institute of Electrical and Electronics Engineers (IEEE) 1394 interface and both accept a wide assortment of interchangeable lenses. The "D1X" and "EOS-D1" can store 9 frames and 21 frames, respectively, to resident memory before needing to download to a computer or record to memory disk. Because of the very fast shutter speeds of these cameras there is unlikely to be any blurring on an individual image. Therefore, software processing may be used to realign any movement shifts that may exist between images.

The illuminators 30, which, as previously described, comprise the illumination means of the invention for illuminating the target area, are readily commercially available and project structured light patterns on the target animal. In the present form of the invention, the illuminators 30 comprise a flash source, a pattern mask, and a lens system capable of projecting the pattern onto the target animal. The flash source is electronically synchronized with the acquisition trigger for its respective camera. The pattern mask contains a structured light pattern which projects a textured surface onto the surface of the target animal. This pattern is processed via the digital signal processing unit as part of the range image algorithm.

The radiometric infrared camera 28 of the apparatus of the invention, which, as previously described, is also commercially available from various sources, including Infrared Solutions, Inc. of Plymouth, Minn., is capable of providing a pixel-by-pixel measurement of surface temperature. As will later be discussed, this thermal image may be processed, and warped onto the 3D surface constructed from the combination of range images. An infrared camera manufactured by Infrared Solutions, Inc. and sold under the name and style "IR SNAPSHOT" has proven suitable for use in the accomplishment of the methods of the present invention. This camera employs a low-cost, uncooled, scanned linear array of thermoelectric thermal sensors. It provides a thermal image which is 120×120 pixels based on radiated IR in the 8 to 12 μm spectral band. Each pixel has 12 bits of useable resolution. The accuracy is specified at 2 degrees C. or 2% of the reading. The camera may be controlled via an RS-232 serial port and images stored on a resident flash card or downloaded via the serial link to a laptop or personal computer.

In accomplishing the method of the present invention it is necessary to position the target animal (or whole carcass) in a proper position within a target zone 14 that is defined by the positioning device 12. This is accomplished by means of a series of chutes, such as chute 38 (FIG. 2-1) that comprise a part of the positioning device 12. The chutes, in a single file manner, direct the target animals into the proper position within the target zone 14. Proximity sensors 40 automatically alert the system when the animal is within the designated target zone 14. These proximity sensors are readily commercially available and may take a number of different forms. For example, they may include a light transmitter and receiver which indicates proximity by breaking a visible or infrared beam. They may also include ultrasonic or infrared motion detection in a very limited region in front of each proximity detector. Numerous other means of detecting the proximity of the animal to a specific location are known to those skilled in the art. Additionally, a video camera (or video output on the range camera) may be used to confirm the proximity of the target animal to the target zone.

The data processing means of the invention, which includes the previously discussed control and processing unit 42, takes as input the signals from the proximity sensors that identify when the target animal is within the target zone. The control unit, in turn, outputs trigger signals to initiate image capture procedures by the previously identified range and thermal imaging cameras. Control unit 42 may comprise of discrete digital circuitry, digital and analog circuitry, and microprocessor-based circuitry. The control function may also be combined with the image processing function within the processing unit.

The previously described processing unit of the data processing means, which is also of conventional design, implements the algorithms, image processing, surface processing, volume processing, and measurements the character of which will presently be described. Digital signal processing (DSP) components from such companies and Texas Instruments, Inc. of Dallas, Tex. and Analog Devices Inc. of Norwood, Mass. are prime candidates for inclusion in this unit. Additionally, array processing subsystems and boards may be used to increase the processing speed if desired.

A personal computer (PC), generally designated in FIG. 2-1 by the numeral 44, also forms apart of the data processing means of the present invention. While various commercially available personal computers can be used in accomplishing the methods of the present invention, a computer manufactured and sold by Dell Computer Corporation of Austin, Tex. under the name and style "Dimension 8200 Series" has the desired capabilities. The particular features of this computer have been previously discussed herein. As also previously discussed, various peripheral devices of a character well-known to those skilled in the art can be used with the above described system.

Figures 2, 3, 3A:
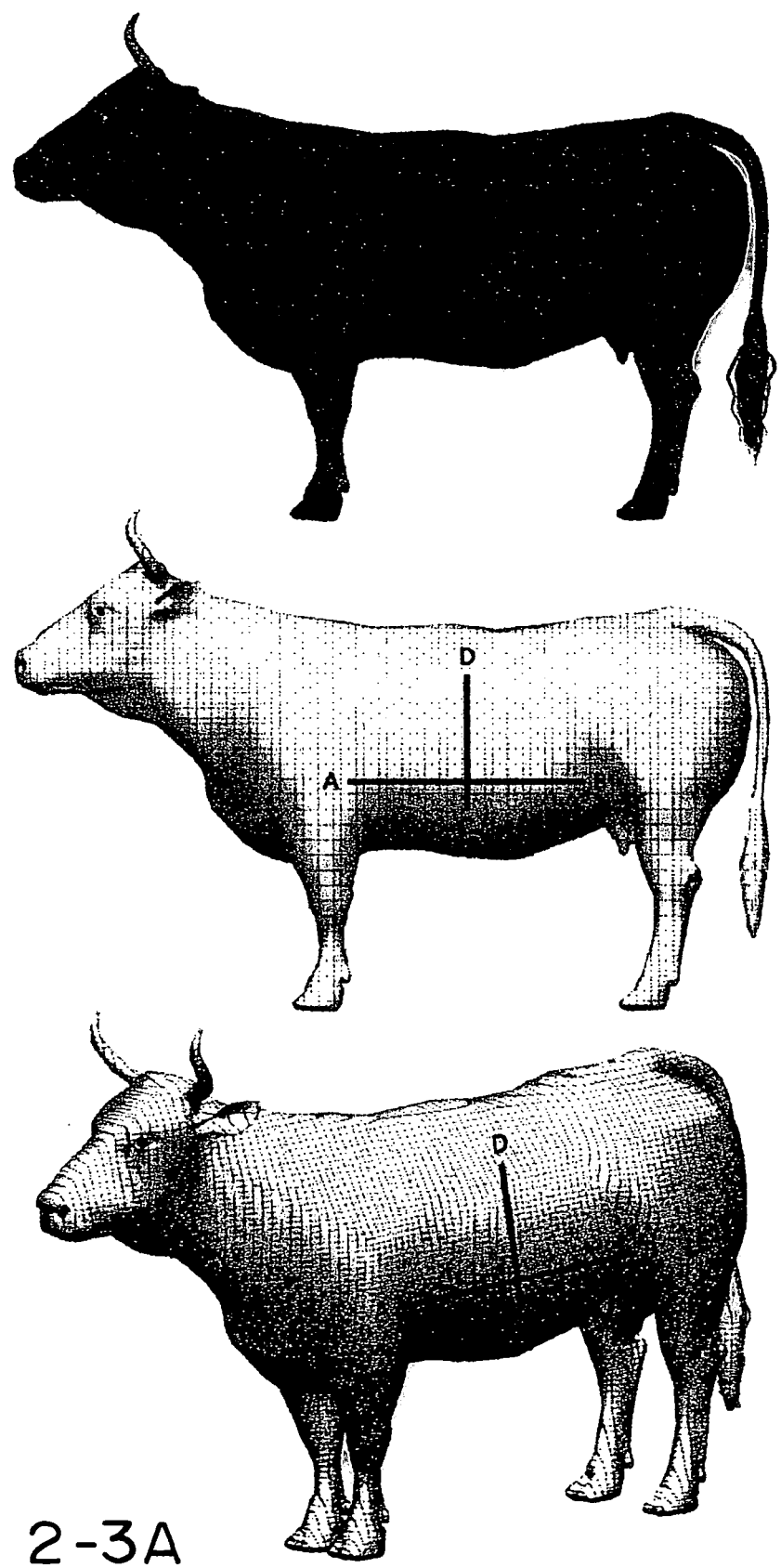
Figures 2, 3, 3B:
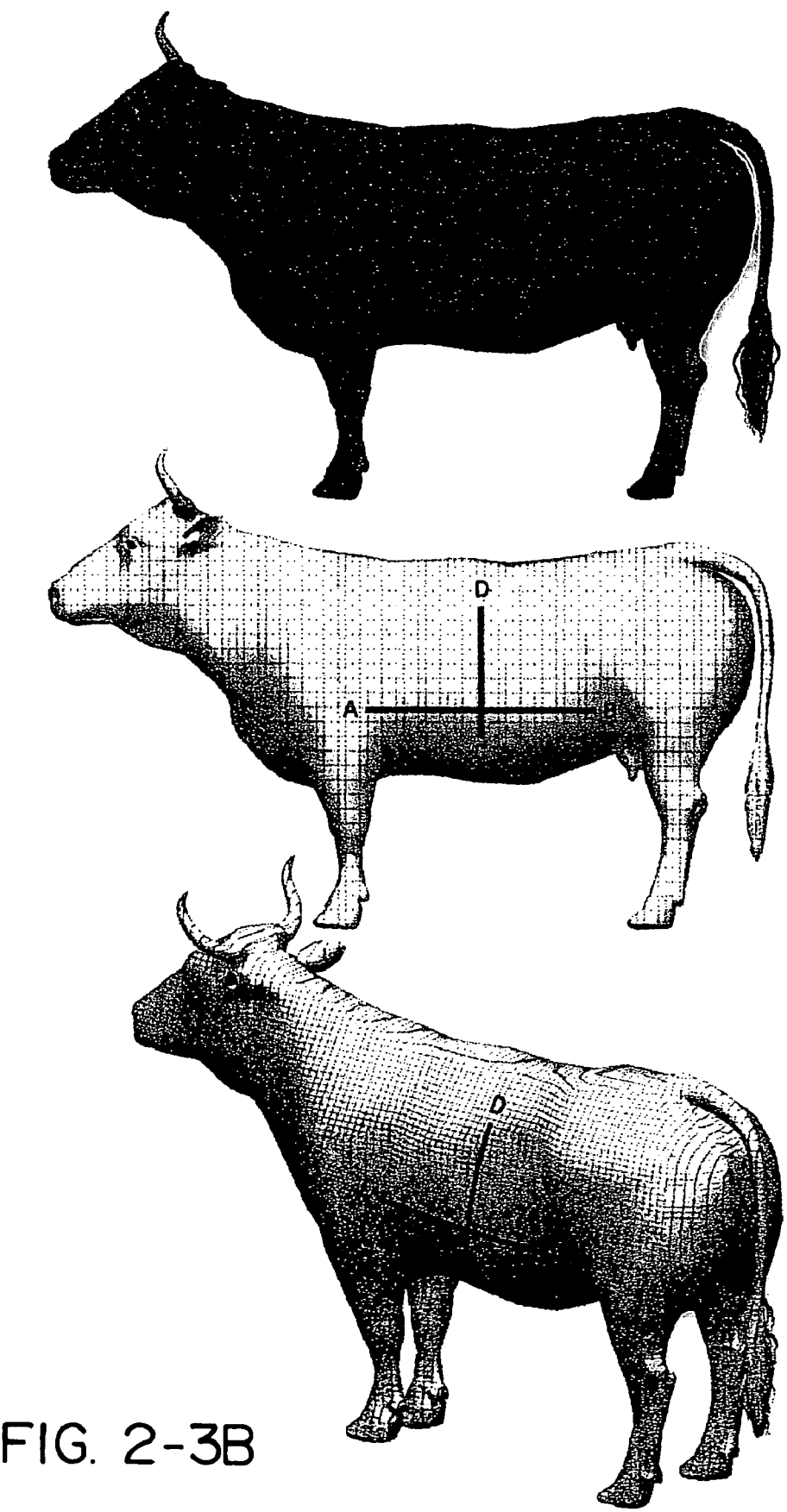
Figures 2, 3, 3C:
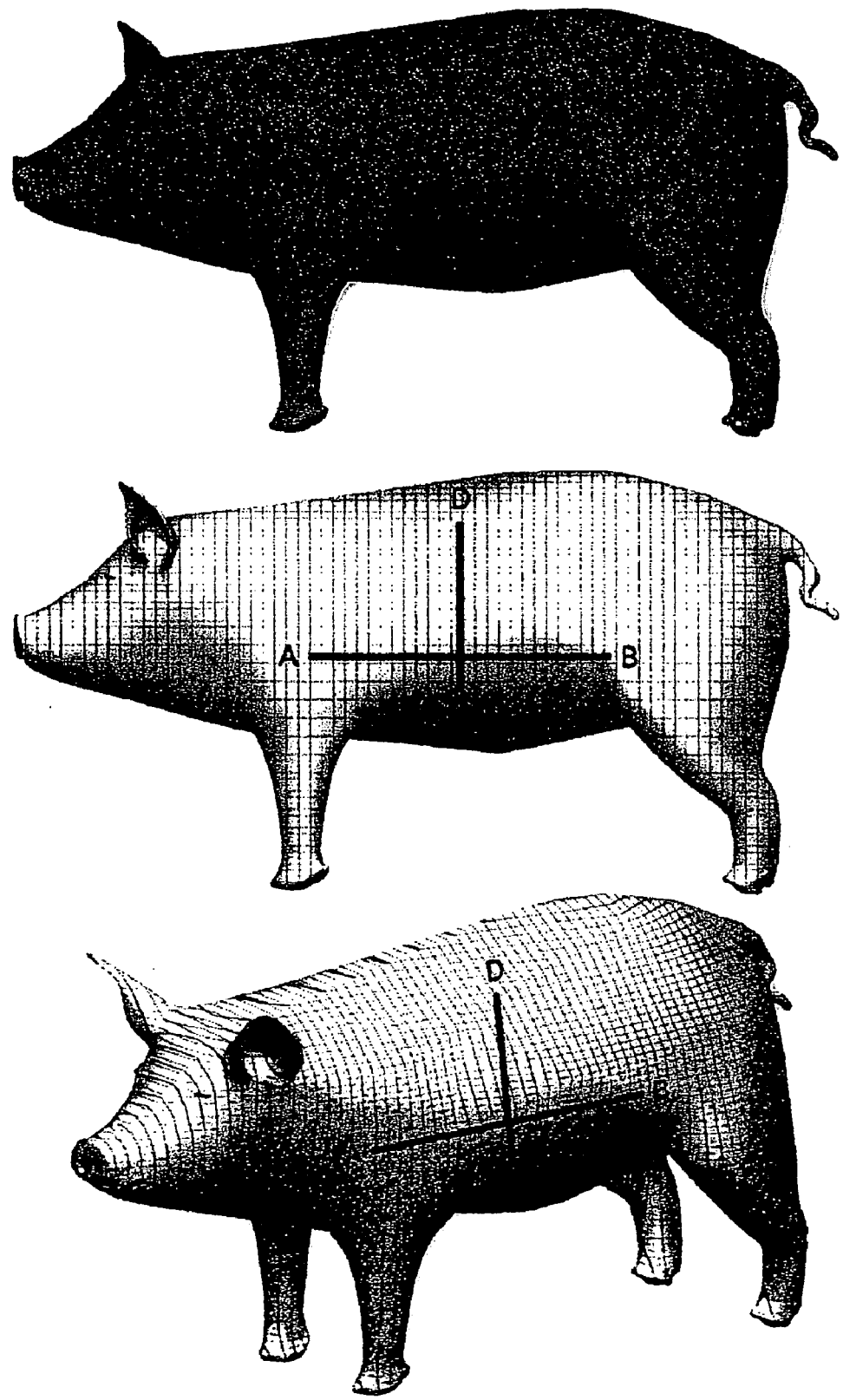
Figure 2:
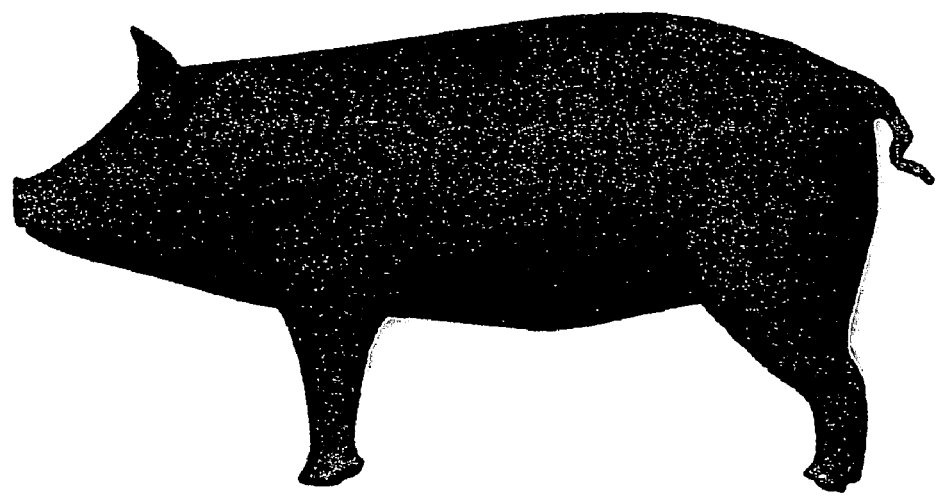
Figure 3:
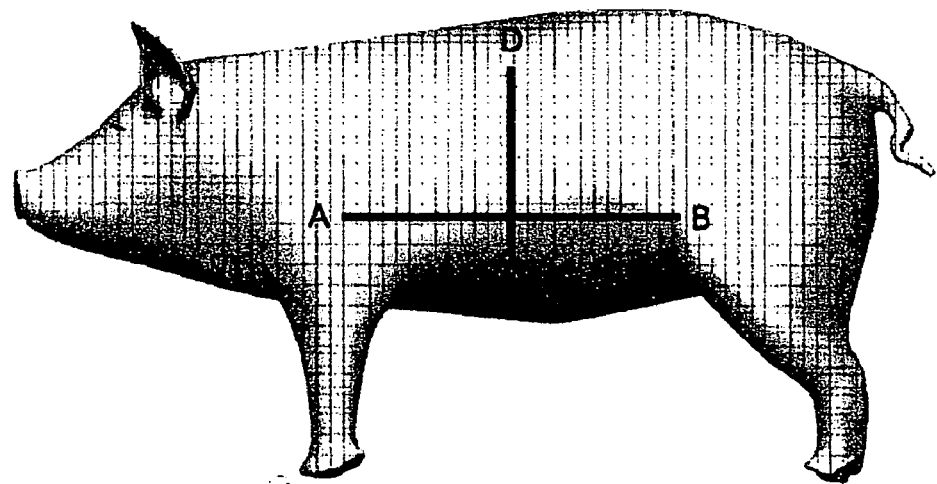
Figure 3D:
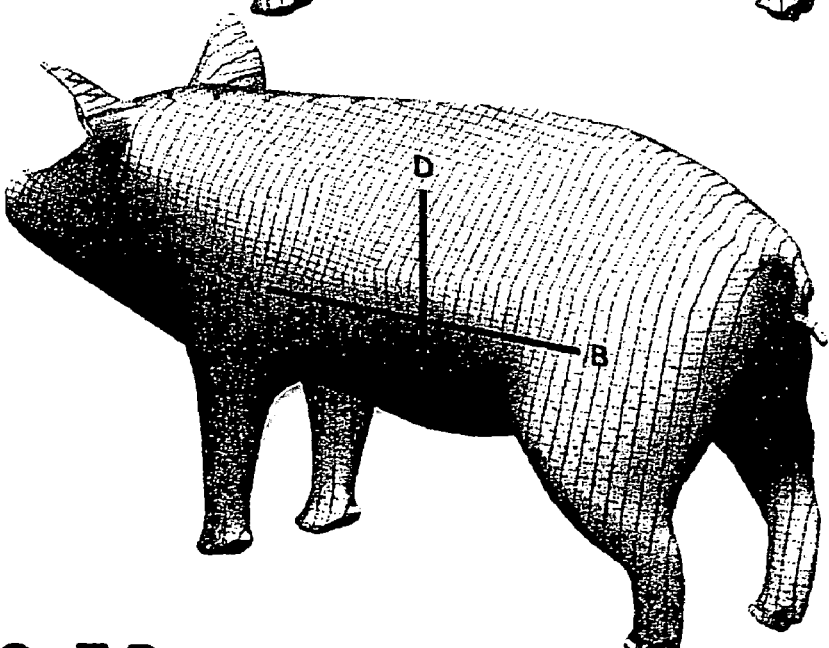
Figure 2:
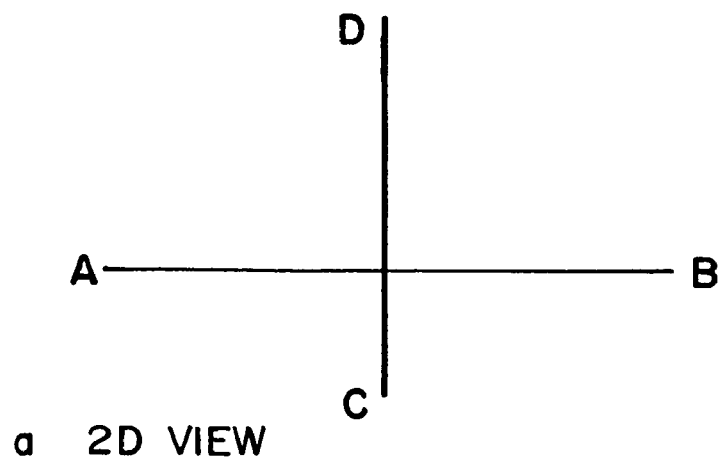
Figure 3:
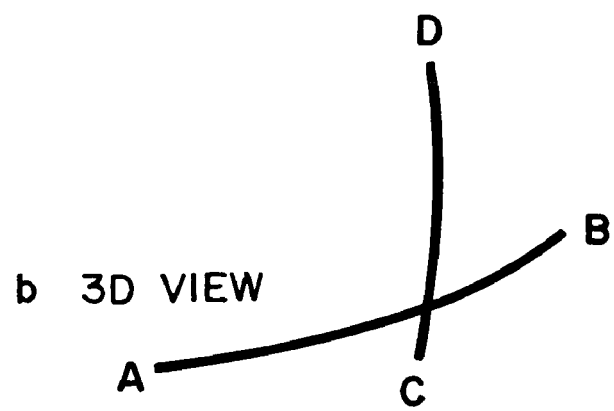
Figures 1A, 3:
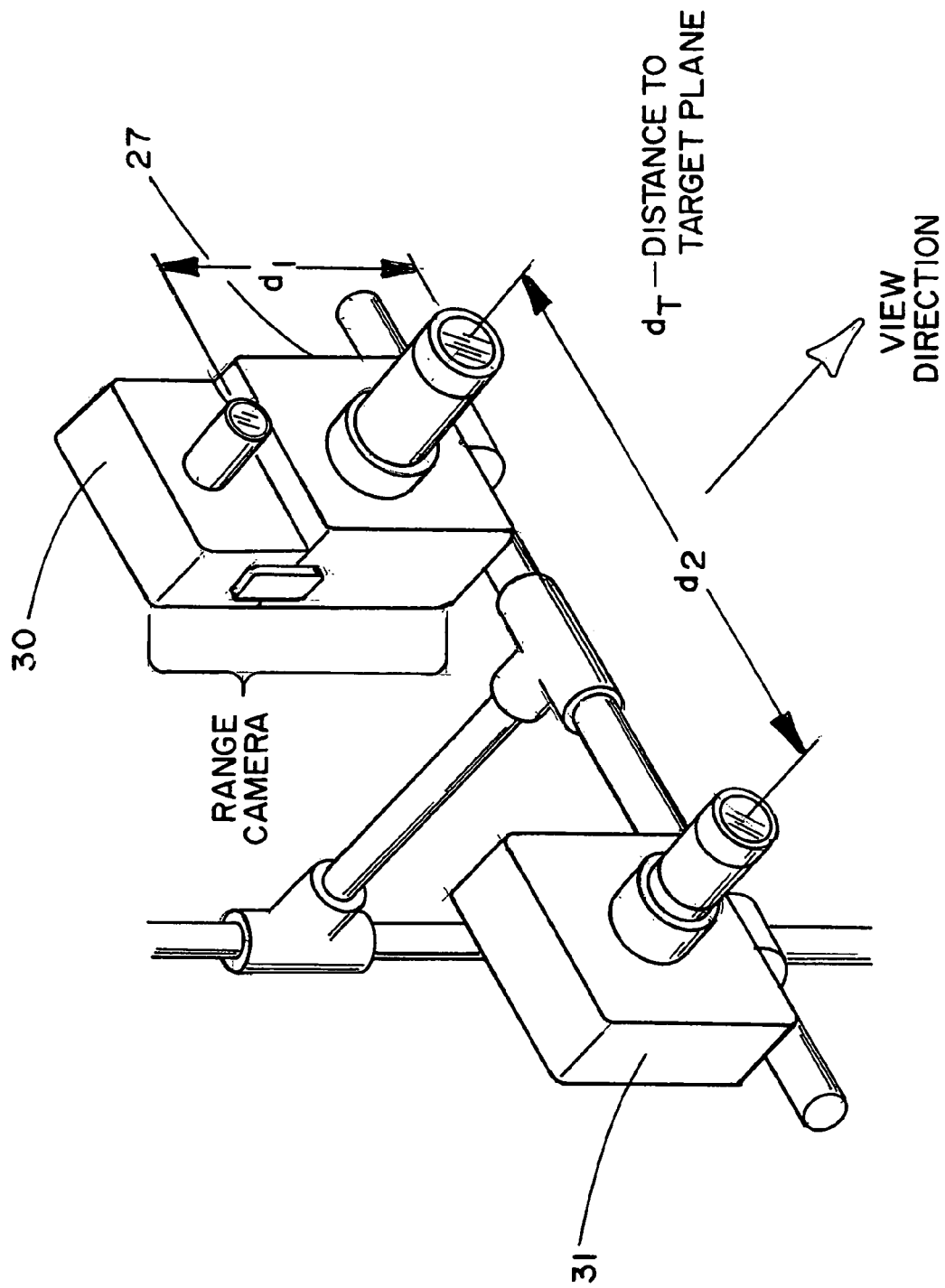

Also forming apart of the apparatus of the invention are weighing means for determining the weight of the target animal. A microprocessor-based, livestock scale 45, that is mounted in the floor 20 of the positioning means, is suitable for present purposes. Scale 45 is available from various sources including Weightronix of Fairmont, Minn. Referring to FIGS. 3-1A, 3-1B, and 3-1C, alternate forms of range camera arrangements are there shown. Referring particularly to FIG. 3-1A, a visible spectrum camera 27 is shown on the right side of the Figure with the structured light illuminator 30 positioned on top of the visible spectrum camera. The separation distance, $d_1$, between the lens axes of the illuminator and the visible spectrum camera should be as small as possible to avoid parallax errors and possible gaps in the resulting 3D surface. In the extreme, telecentric optics permit the illuminator and the visible spectrum camera to share the same objective lens thus eliminating any parallax errors. The distance, $d_2$, should also be minimized to reduce errors between the range image and the thermal image. The distance, $d_T$, is the distance from the range camera to the target plane.

Figures 1B, 3:
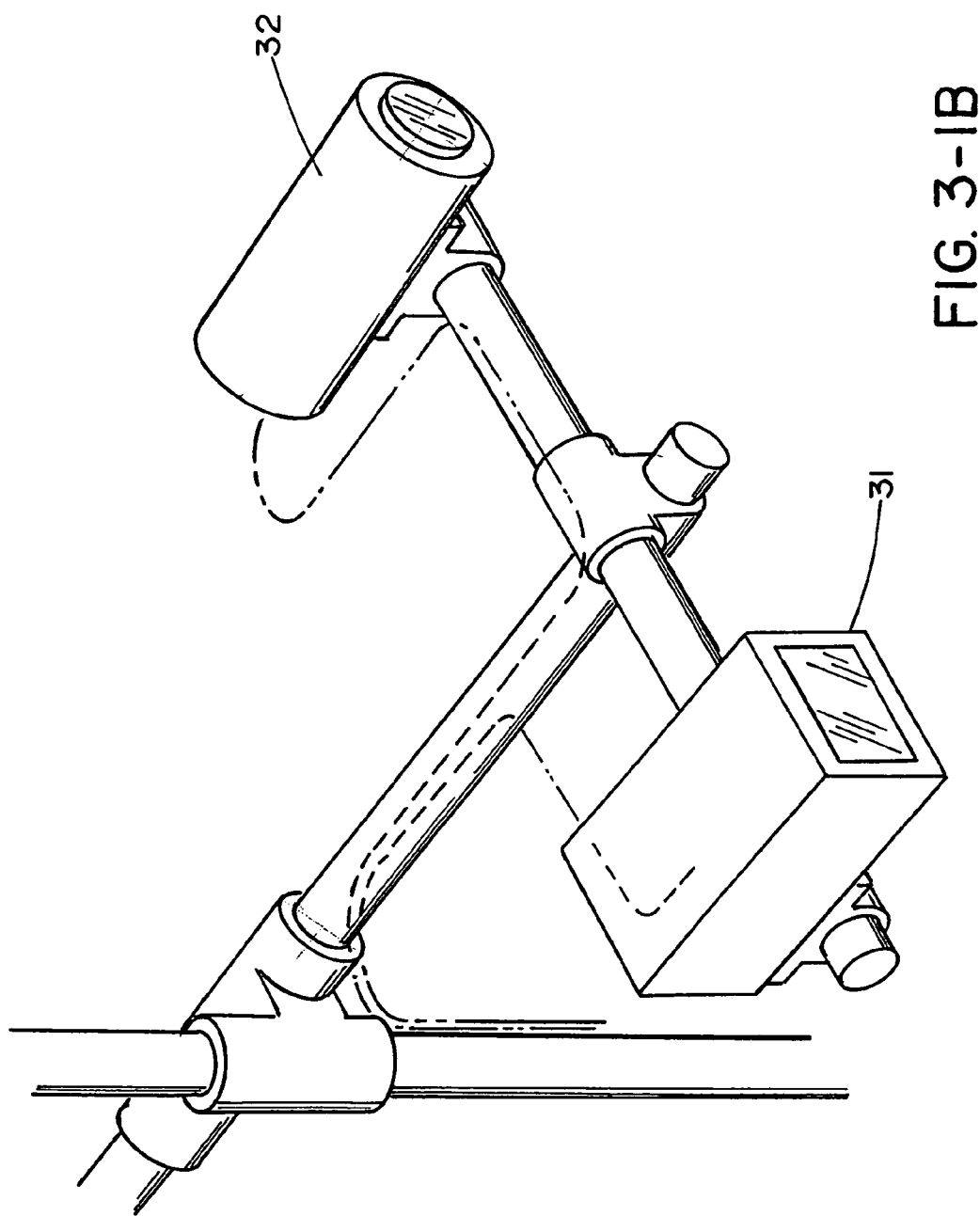
Figures 2, 3:
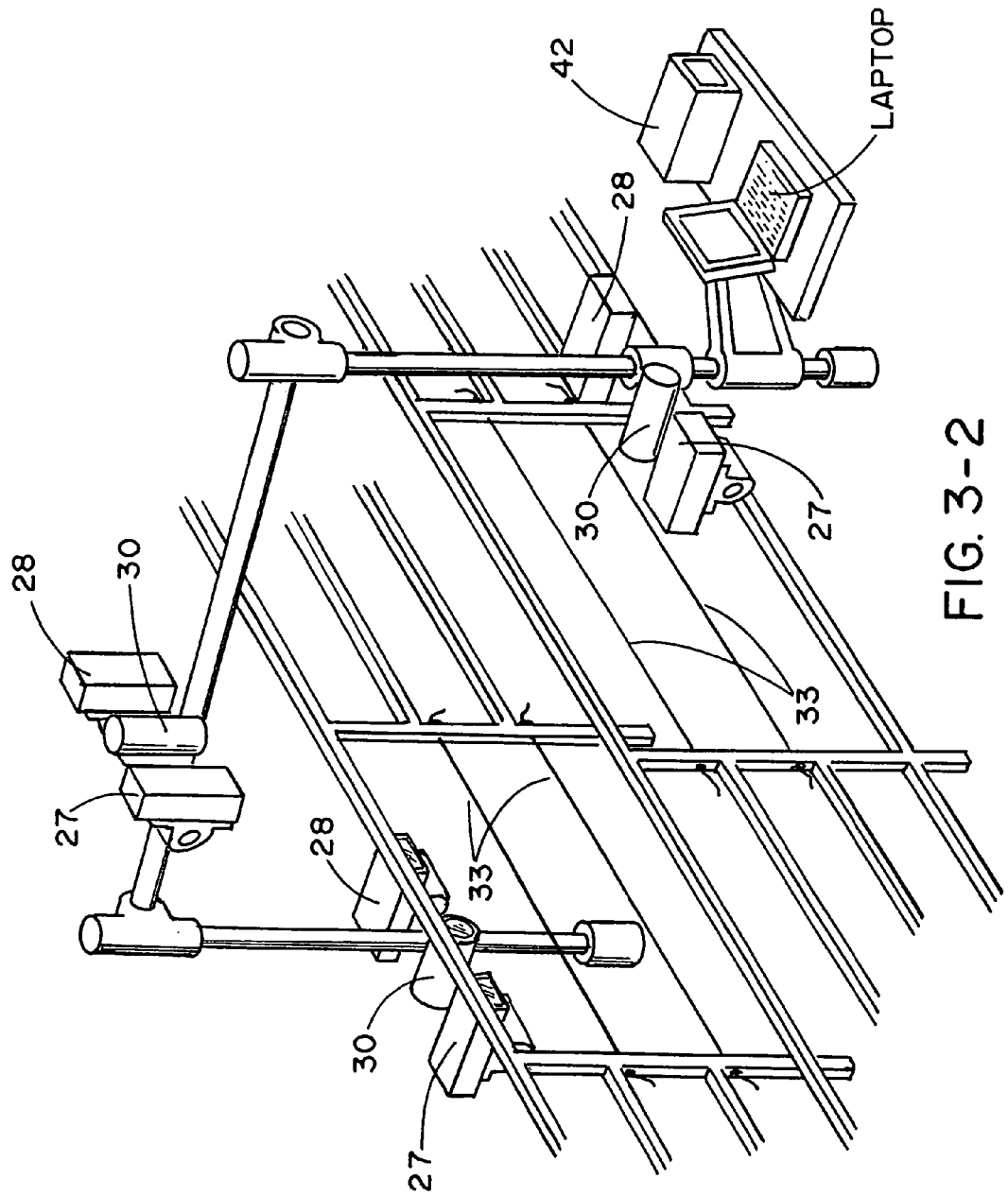
Figure 3:
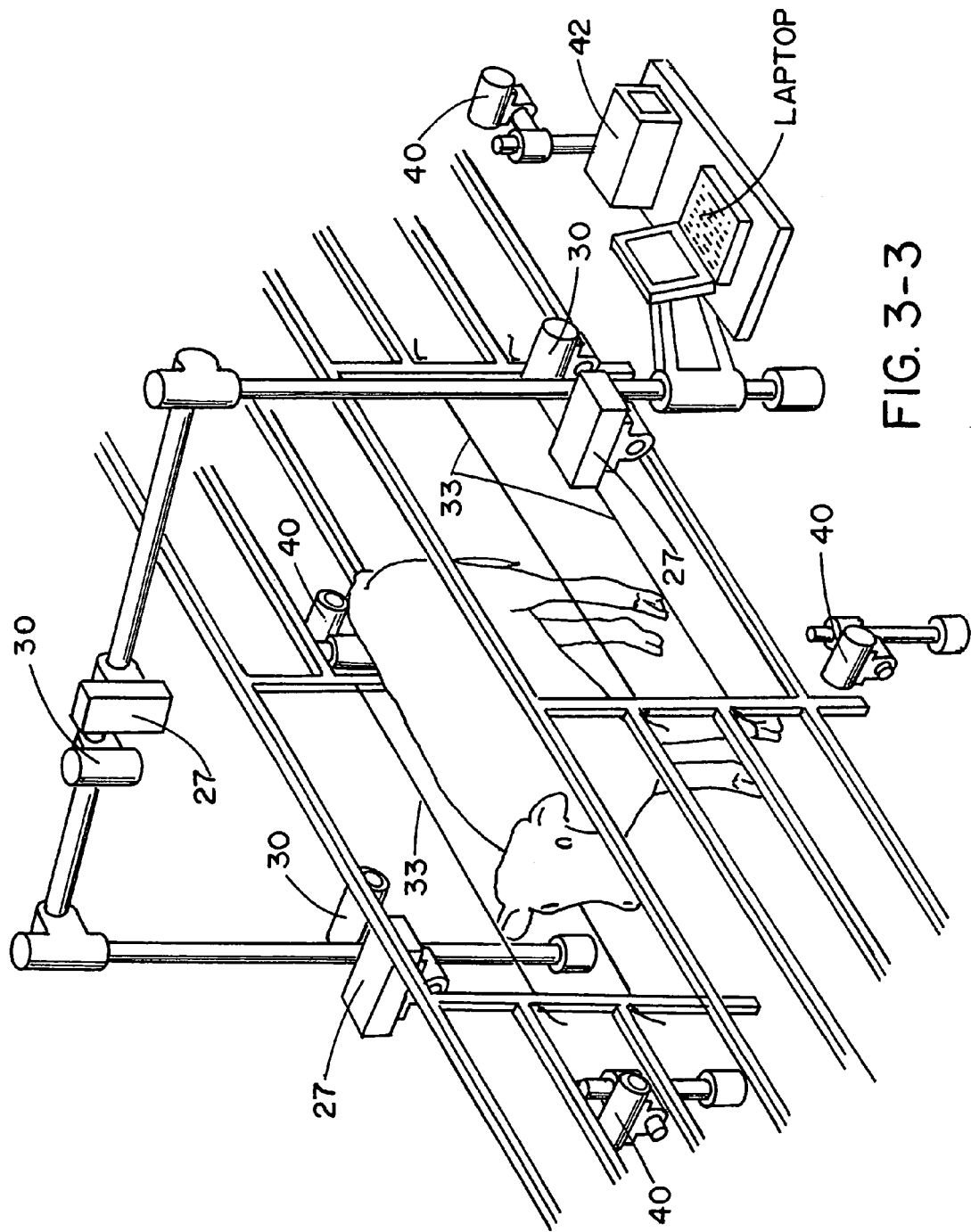
Figures 3, 4:
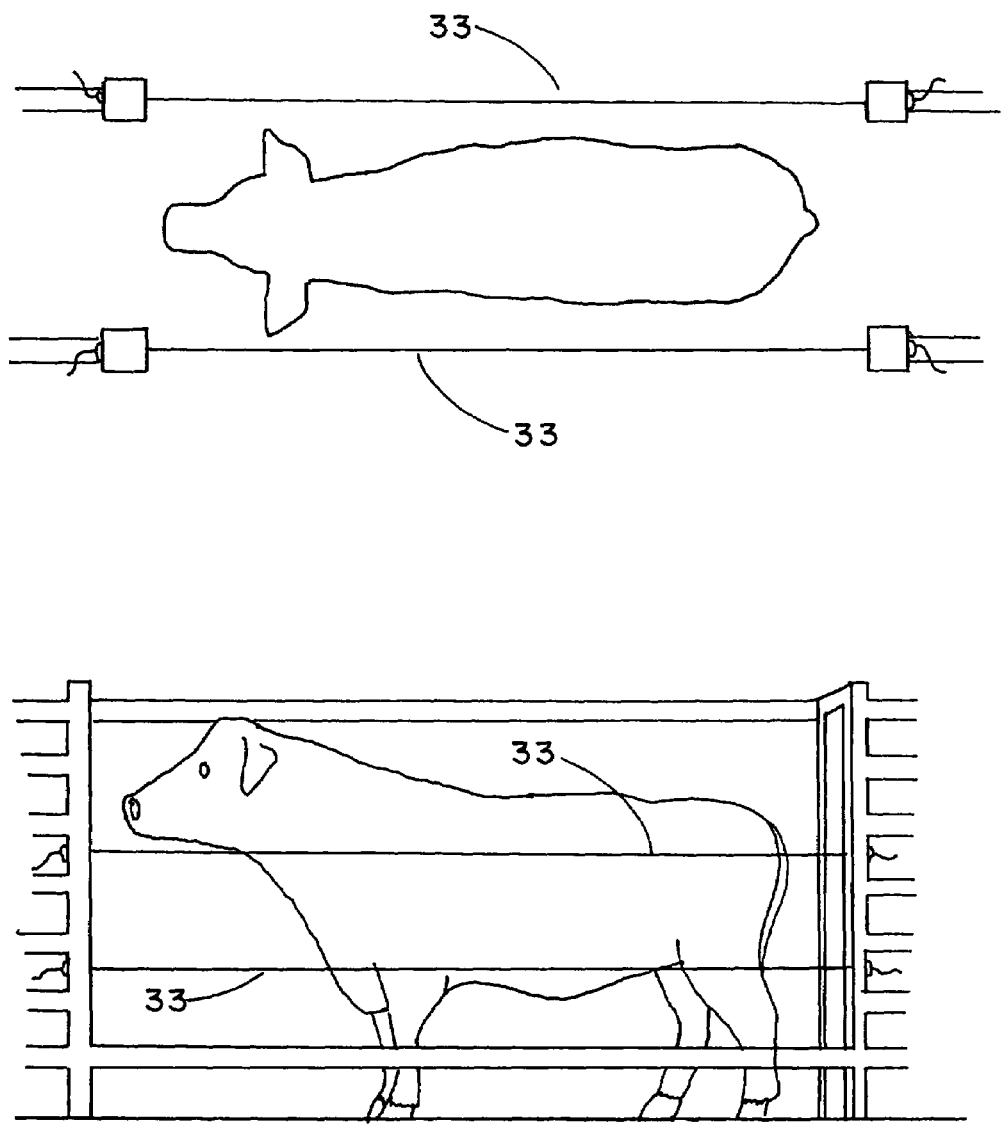
Figures 3, 4, 5:
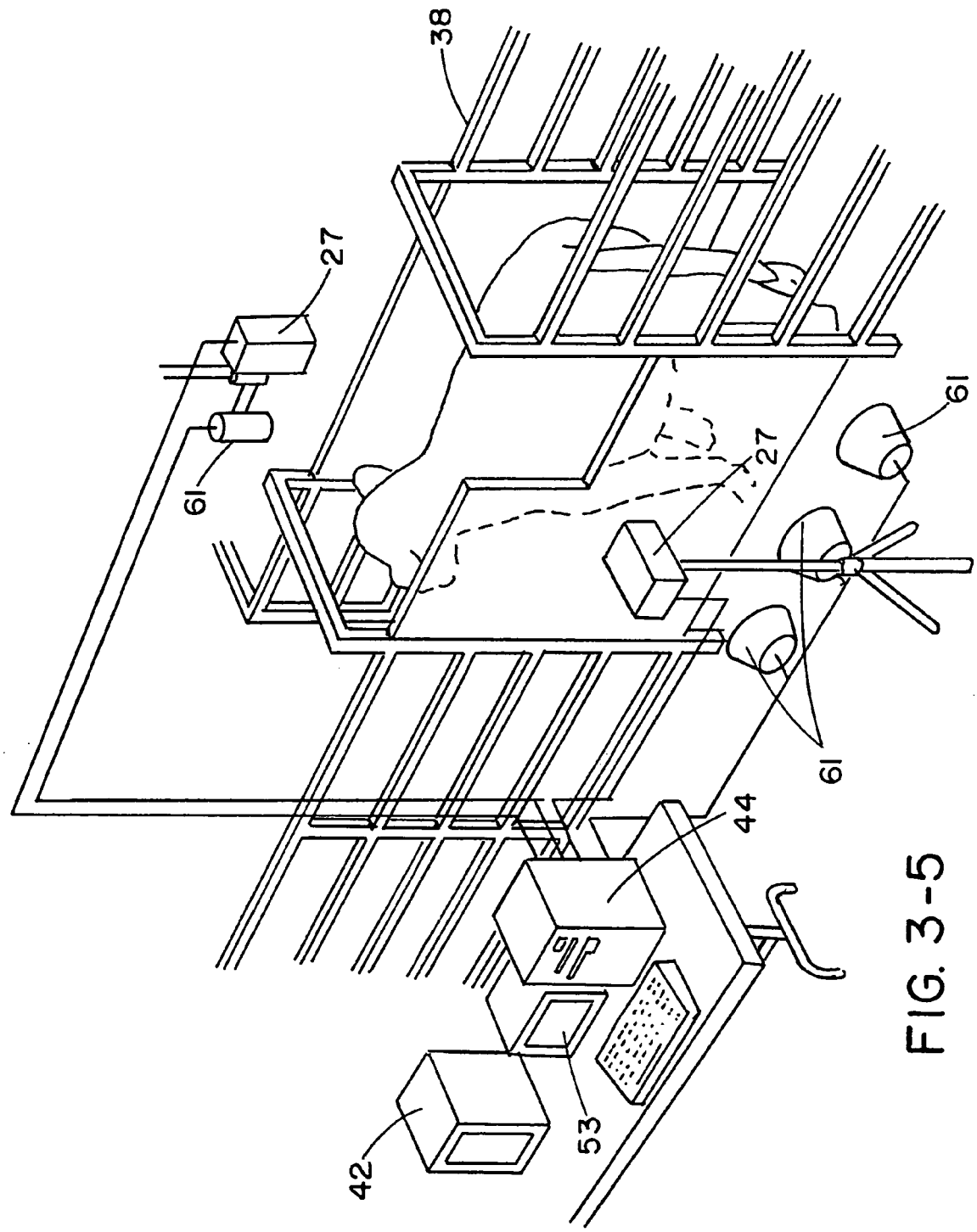
Figures 3, 4, 5, 6:
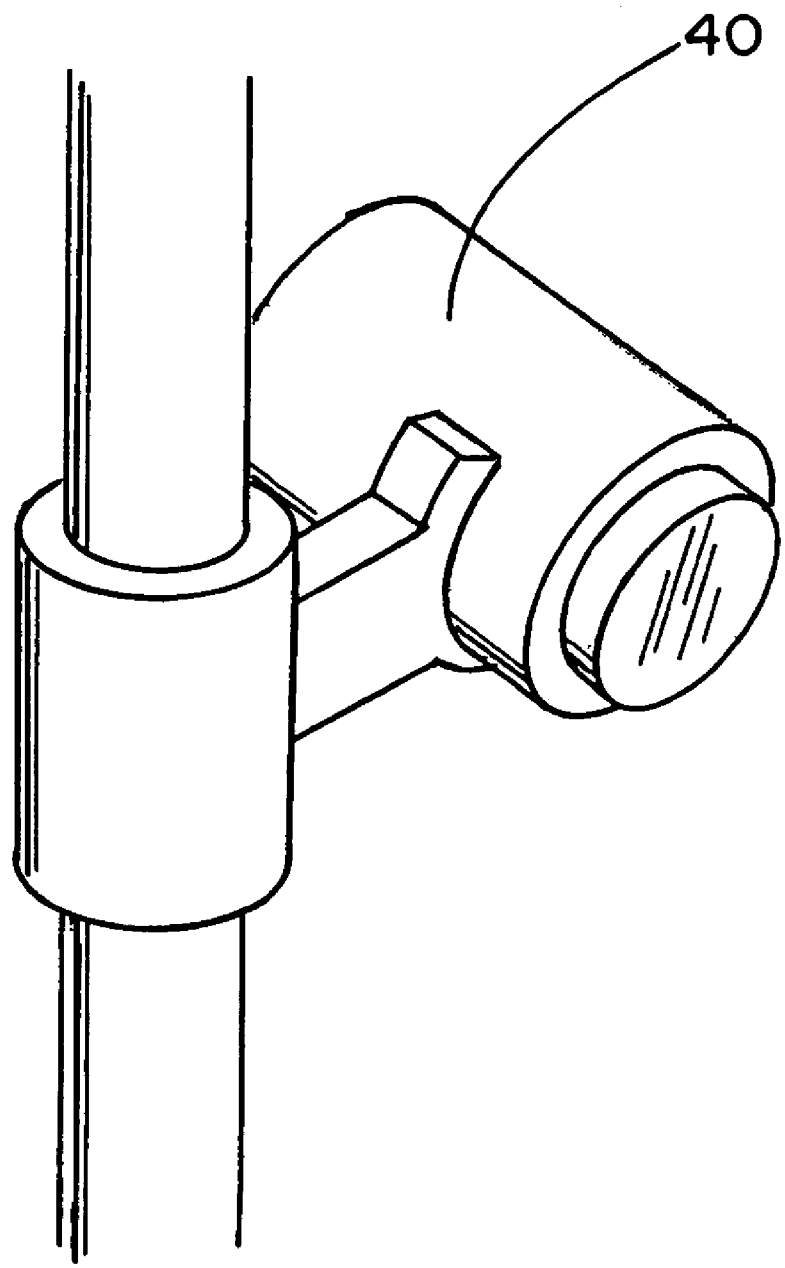
Figures 3, 4, 5, 6, 7:
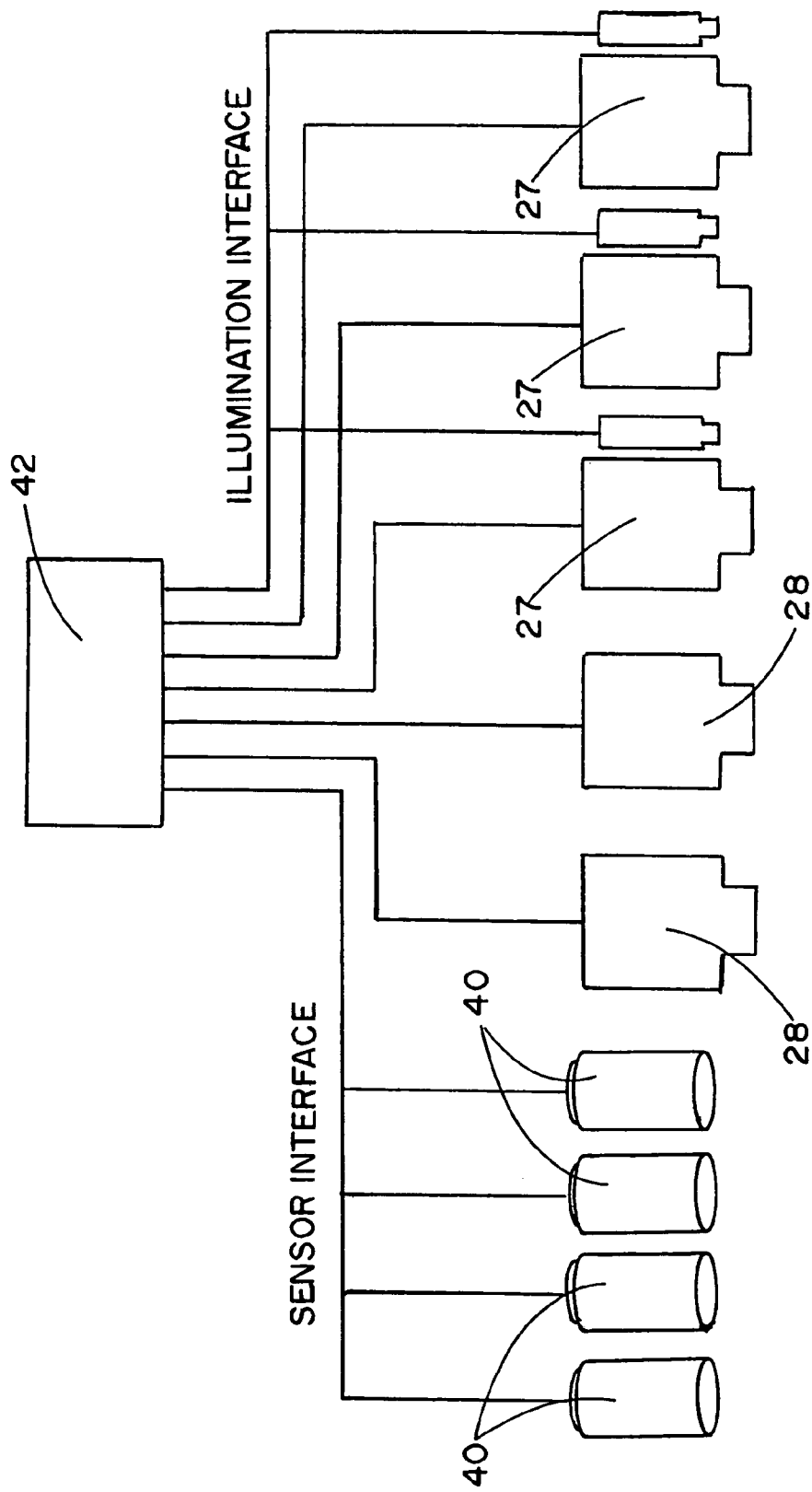
Figures 3, 4, 5, 6, 7, 8:
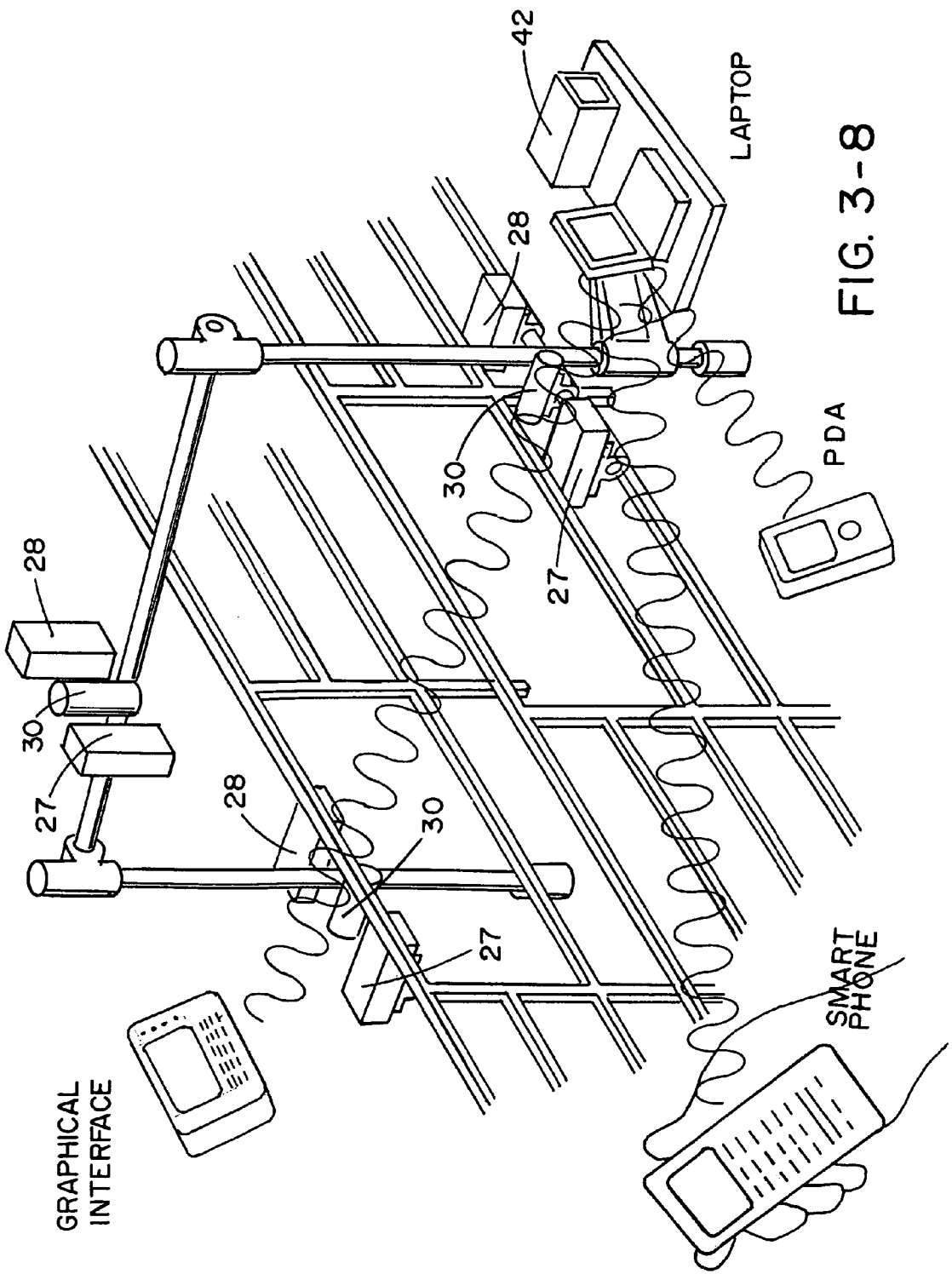
Figures 3, 4, 5, 6, 7, 8, 9:
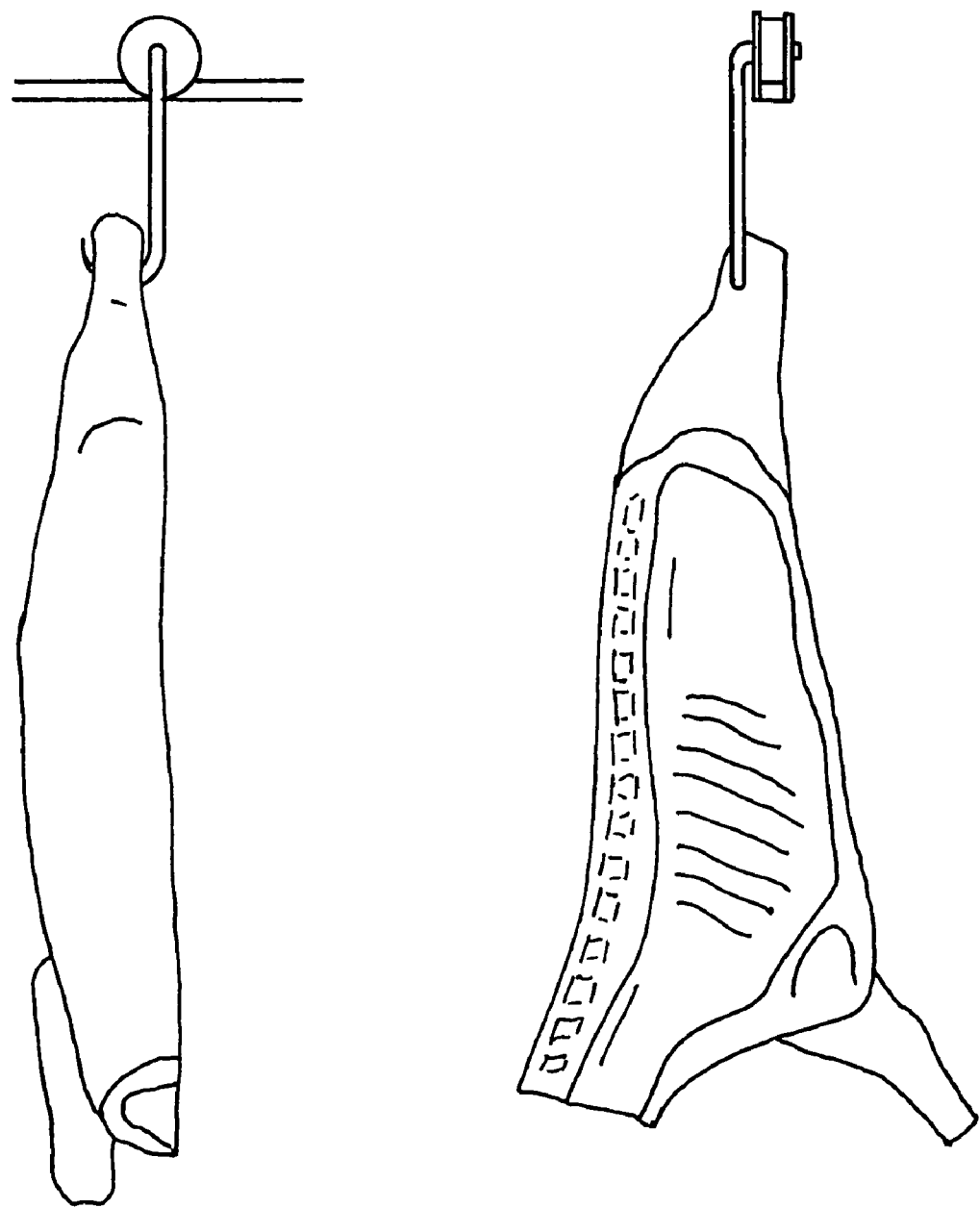
Figures 3, 4, 5, 6, 7, 8, 9, 10:
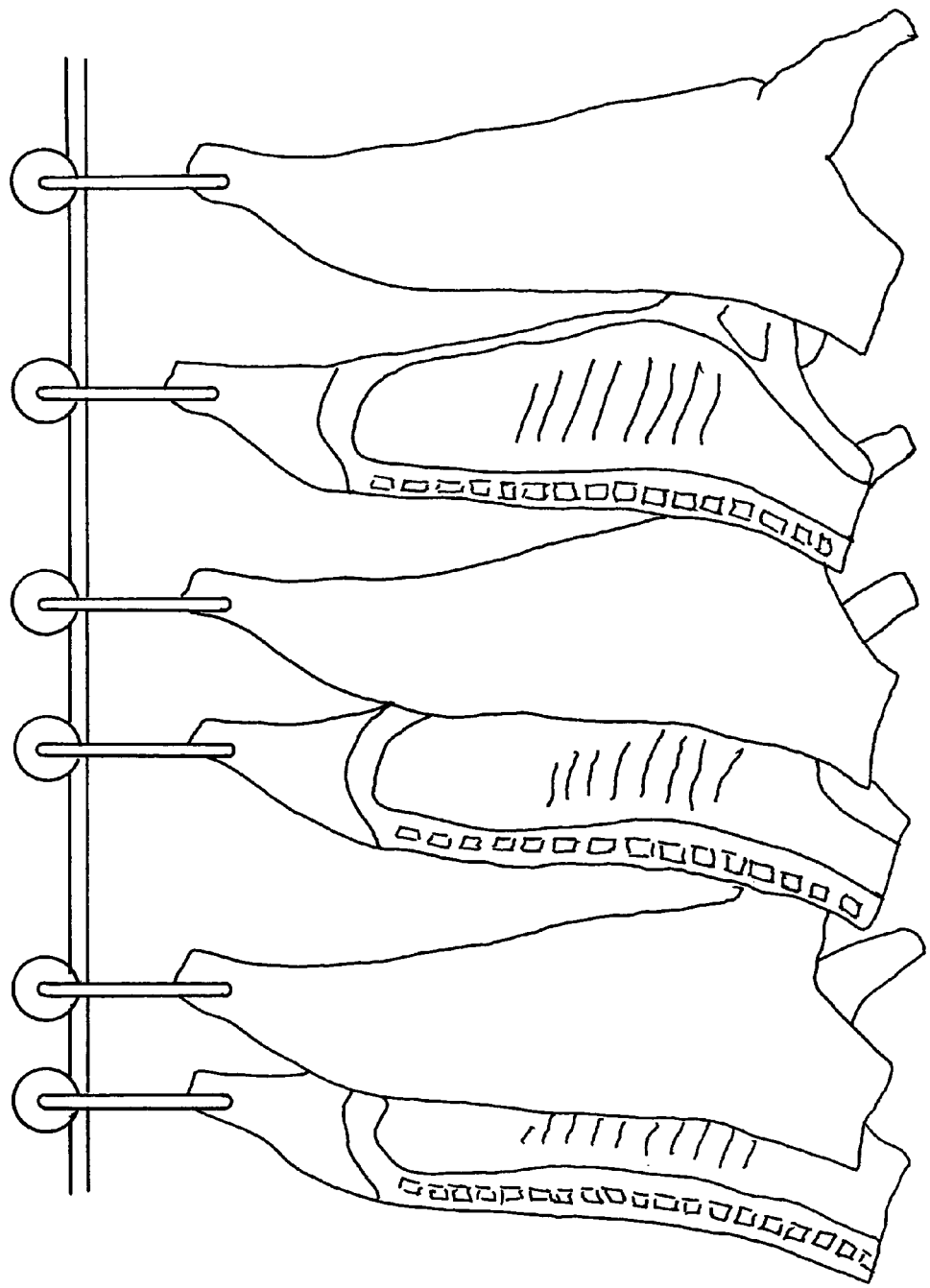
Figures 3, 4, 5, 6, 7, 8, 9, 10, 11:
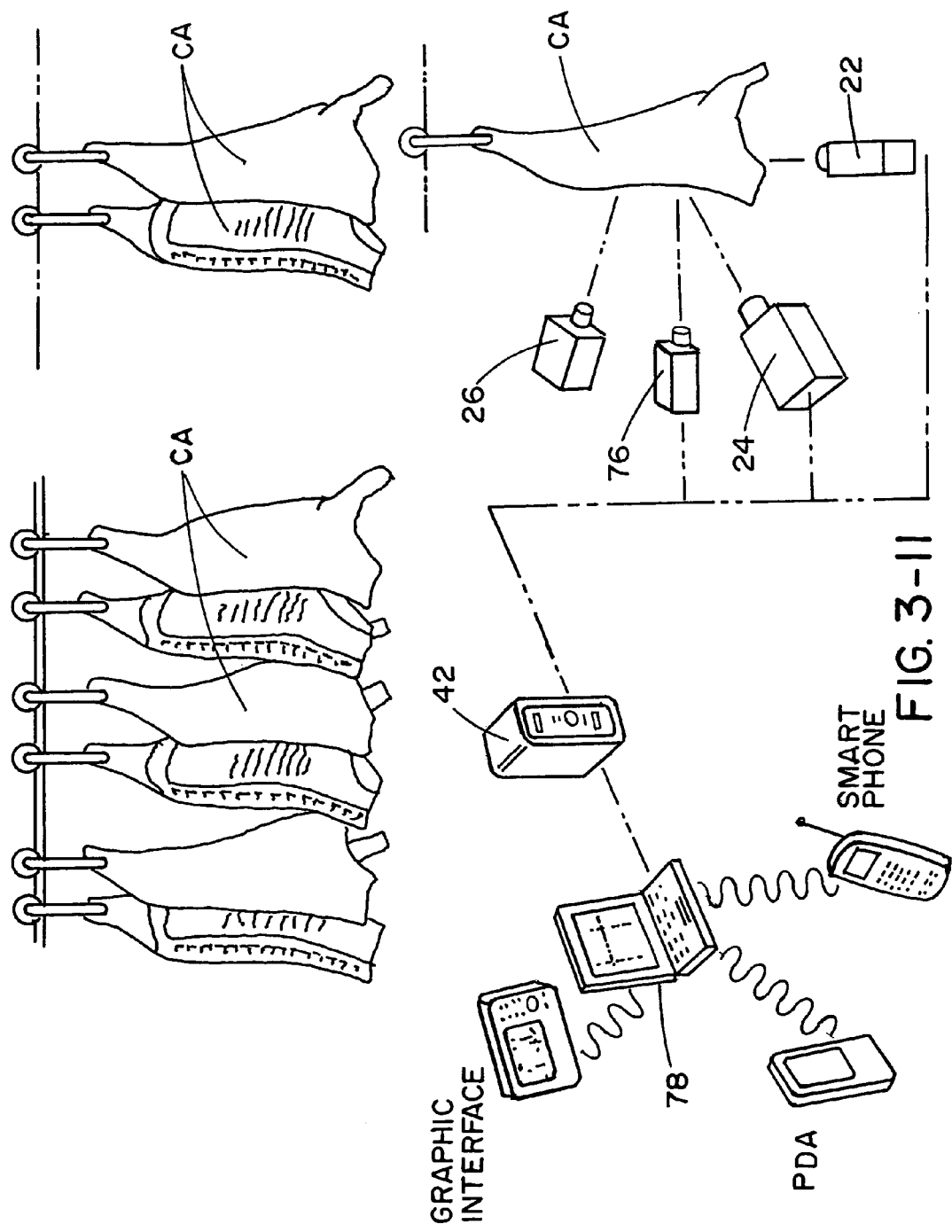
Figures 3, 4, 5, 6, 7, 8, 9, 10, 11, 12:
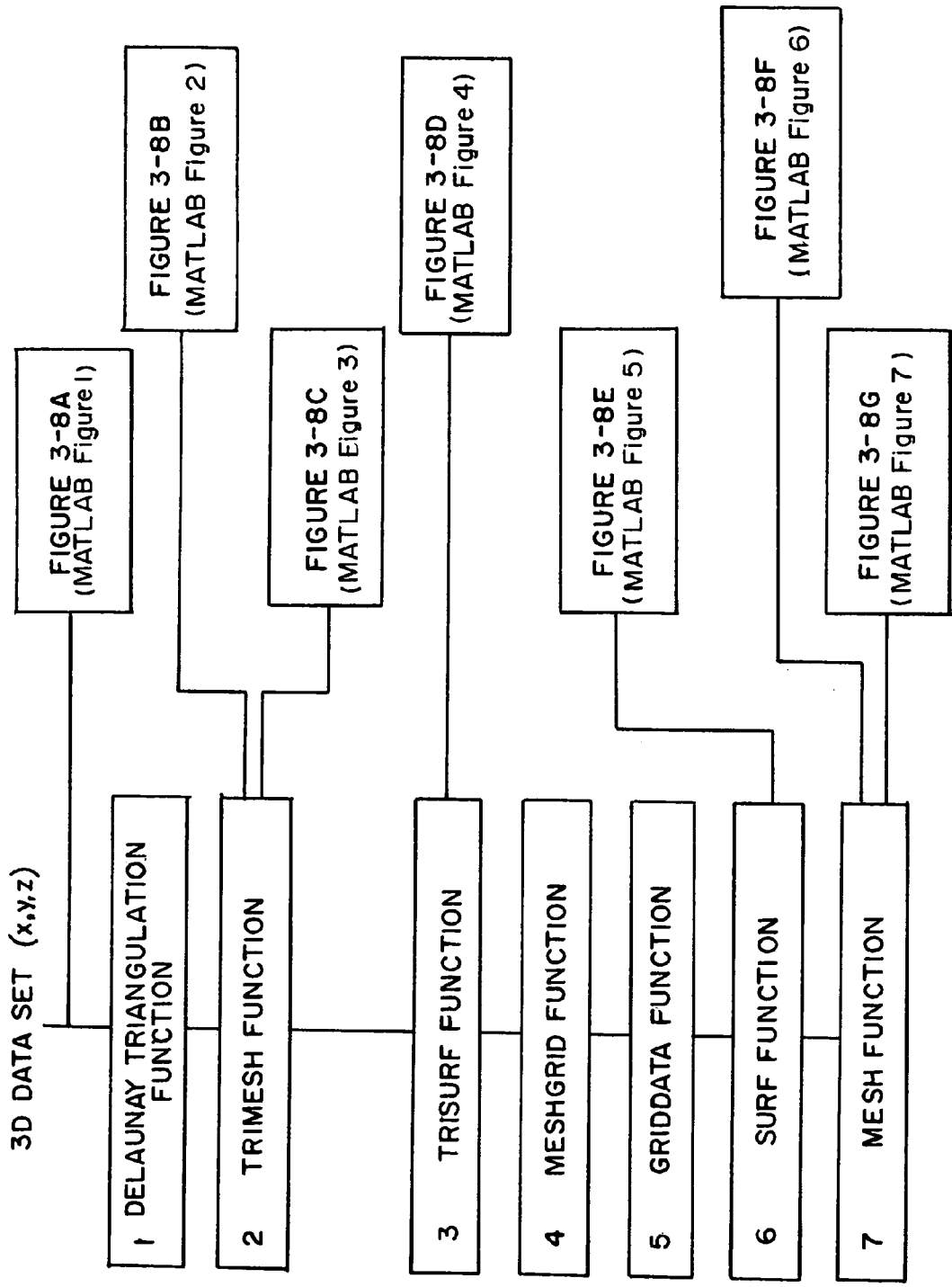
Figures 3, 4, 5, 6, 7, 8, 9, 10, 11, 12, 13:
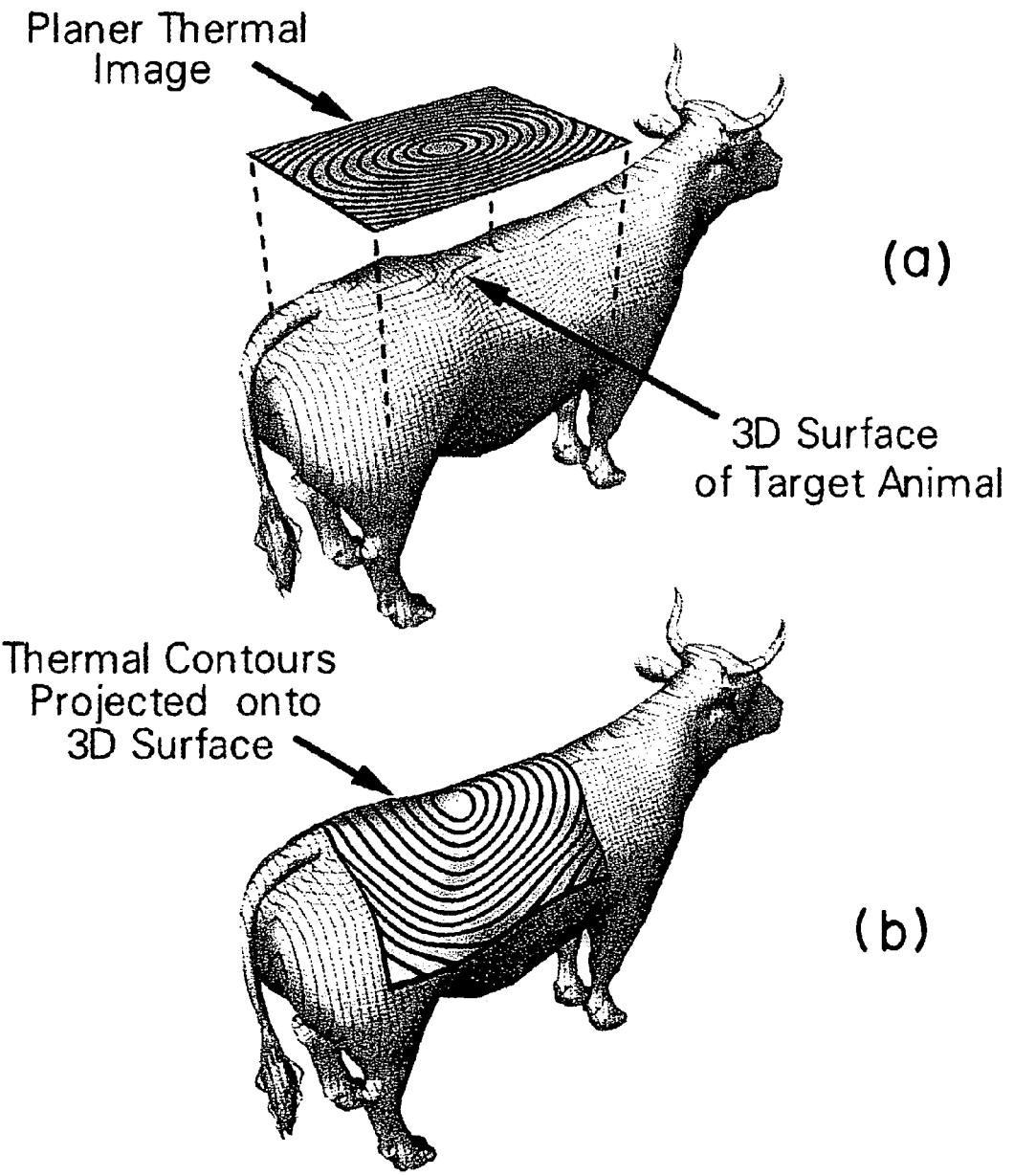
Figures 3, 4, 5, 6, 7, 8, 9, 10, 11, 12, 13, 14:
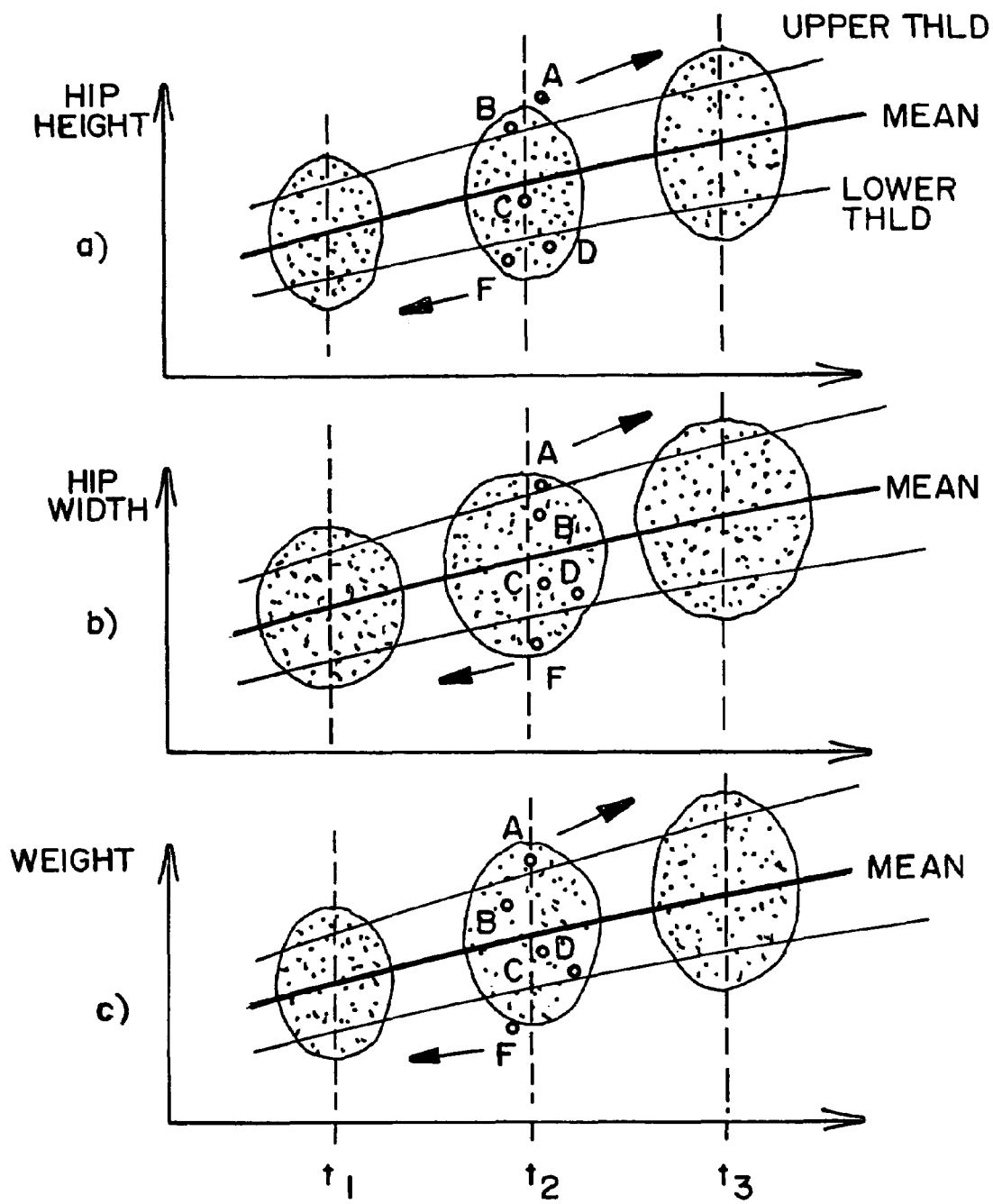
Figures 3, 4, 5, 6, 7, 8, 9, 10, 11, 12, 13, 14, 15, 15A:
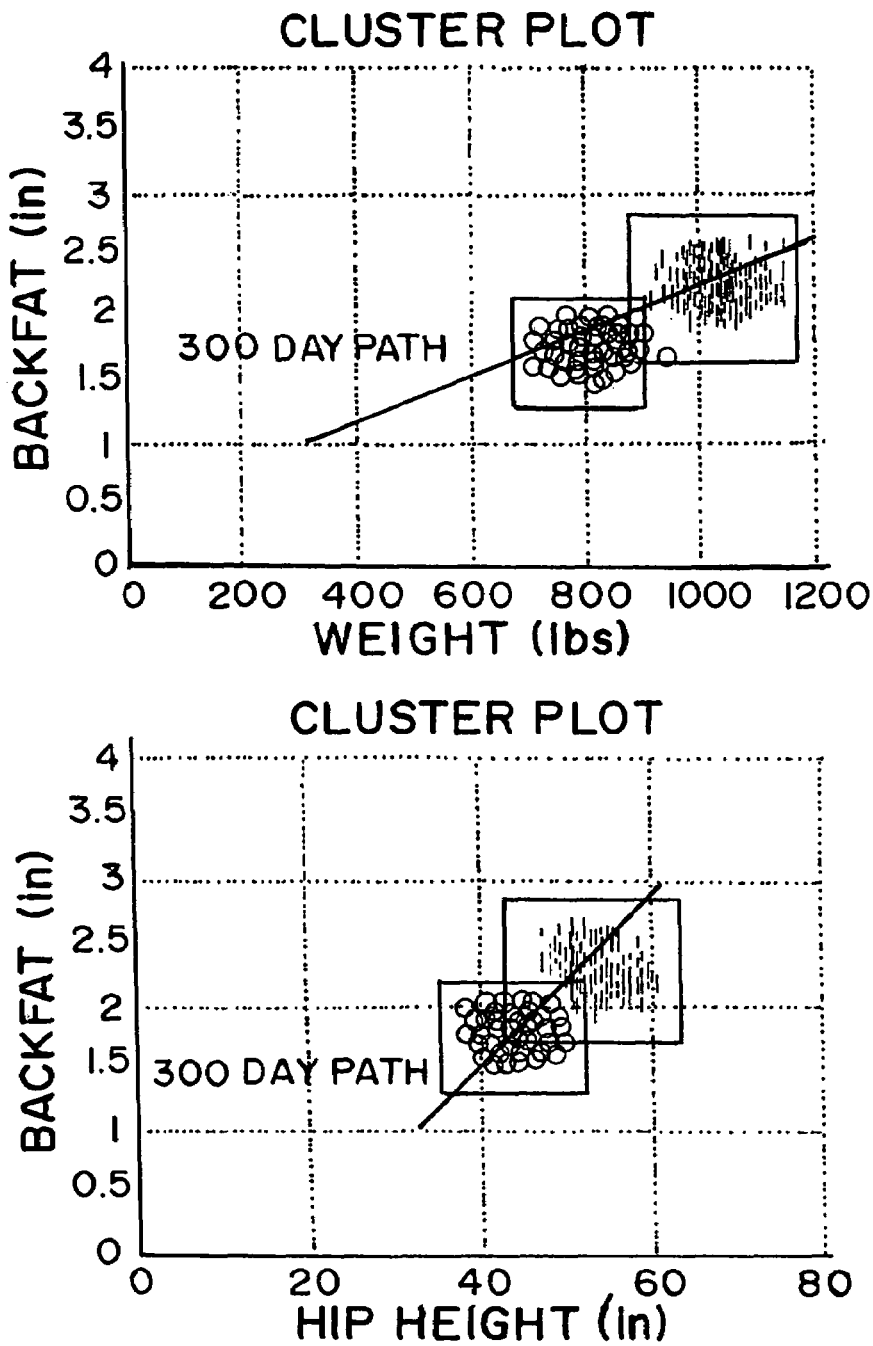
Figures 3, 4, 5, 6, 7, 8, 9, 10, 11, 12, 13, 14, 15, 16, 17:
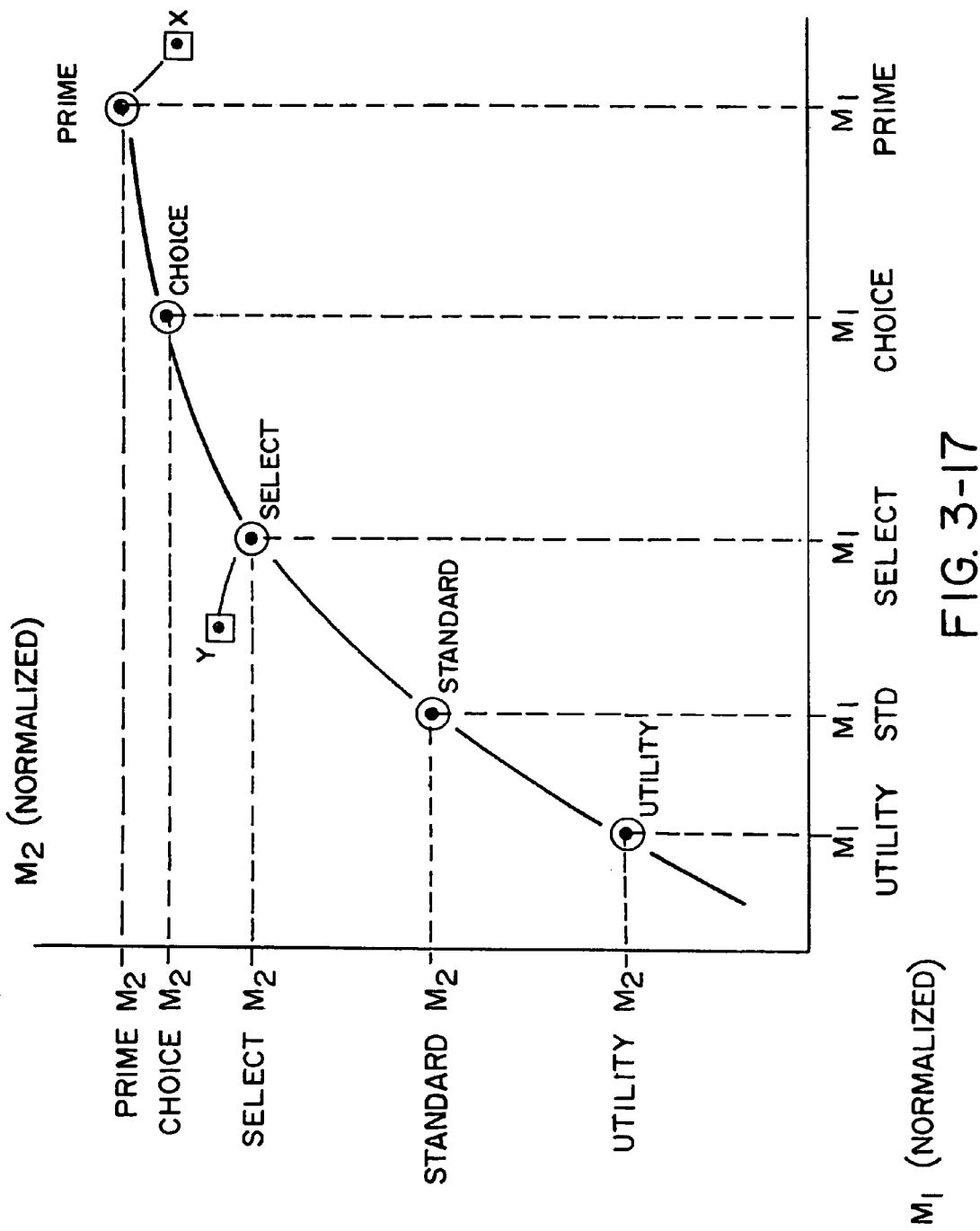
Figures 3, 4, 5, 6, 7, 8, 9, 10, 11, 12, 13, 14, 15, 16, 17, 18, 19, 20, 21:
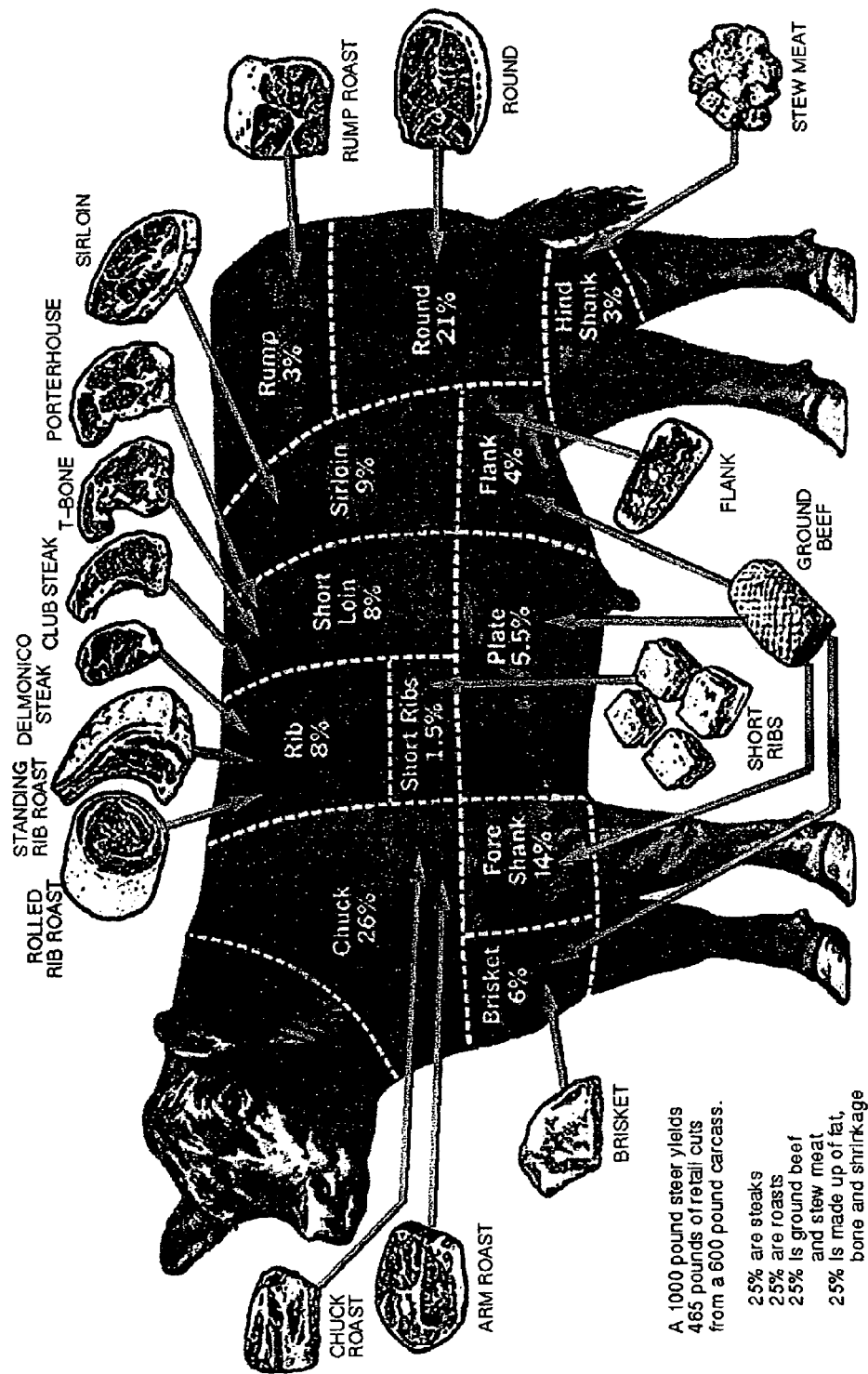
Figures 3, 4, 5, 6, 7, 8, 9, 10, 11, 12, 13, 14, 15, 16, 17, 18, 19, 20, 21, 22, 22A:
Figures 3, 4, 5, 6, 7, 8, 9, 10, 11, 12, 13, 14, 15, 16, 17, 18, 19, 20, 21, 22, 22B:
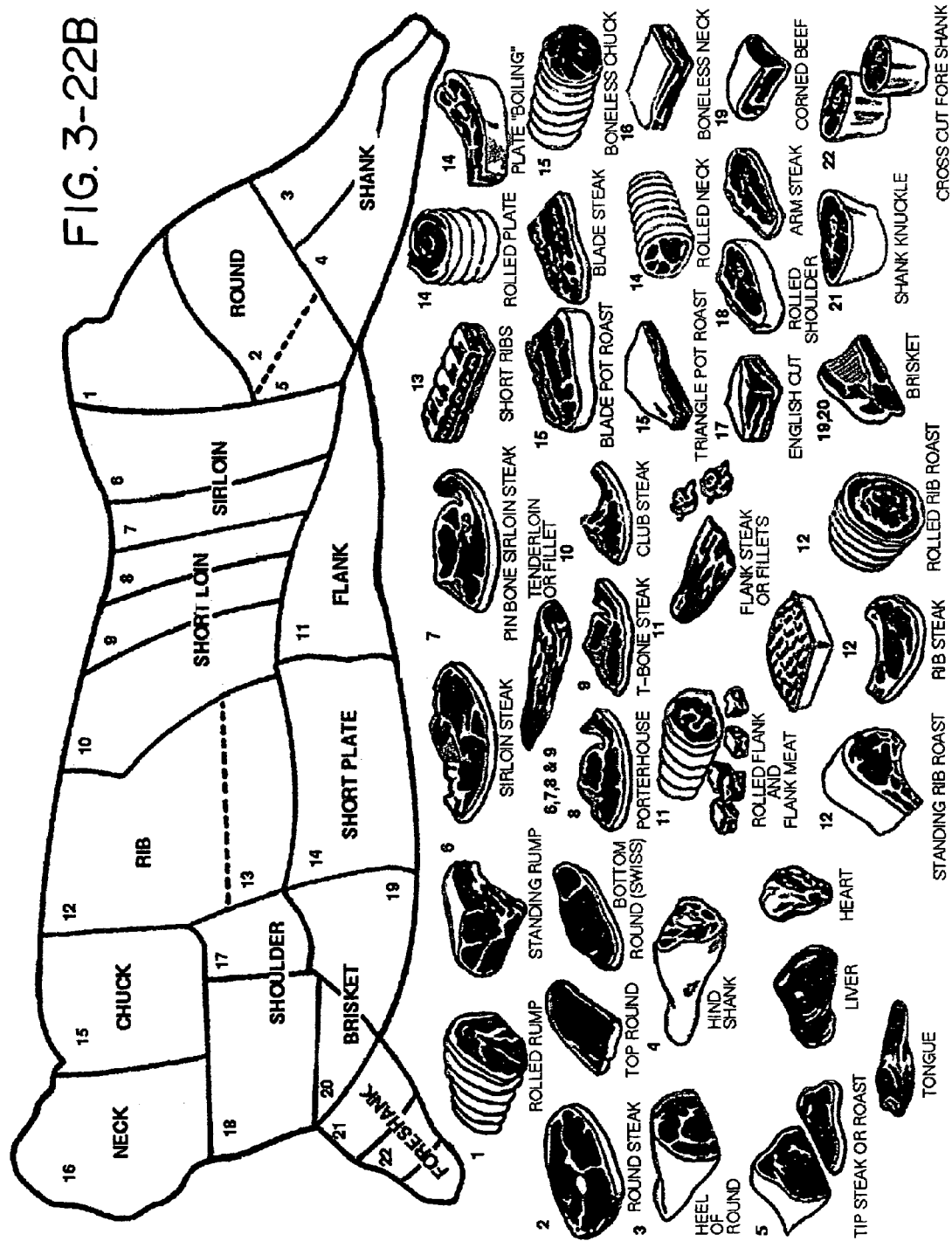
Figures 3, 4, 5, 6, 7, 8, 9, 10, 11, 12, 13, 14, 15, 16, 17, 18, 19, 20, 21, 22, 23:
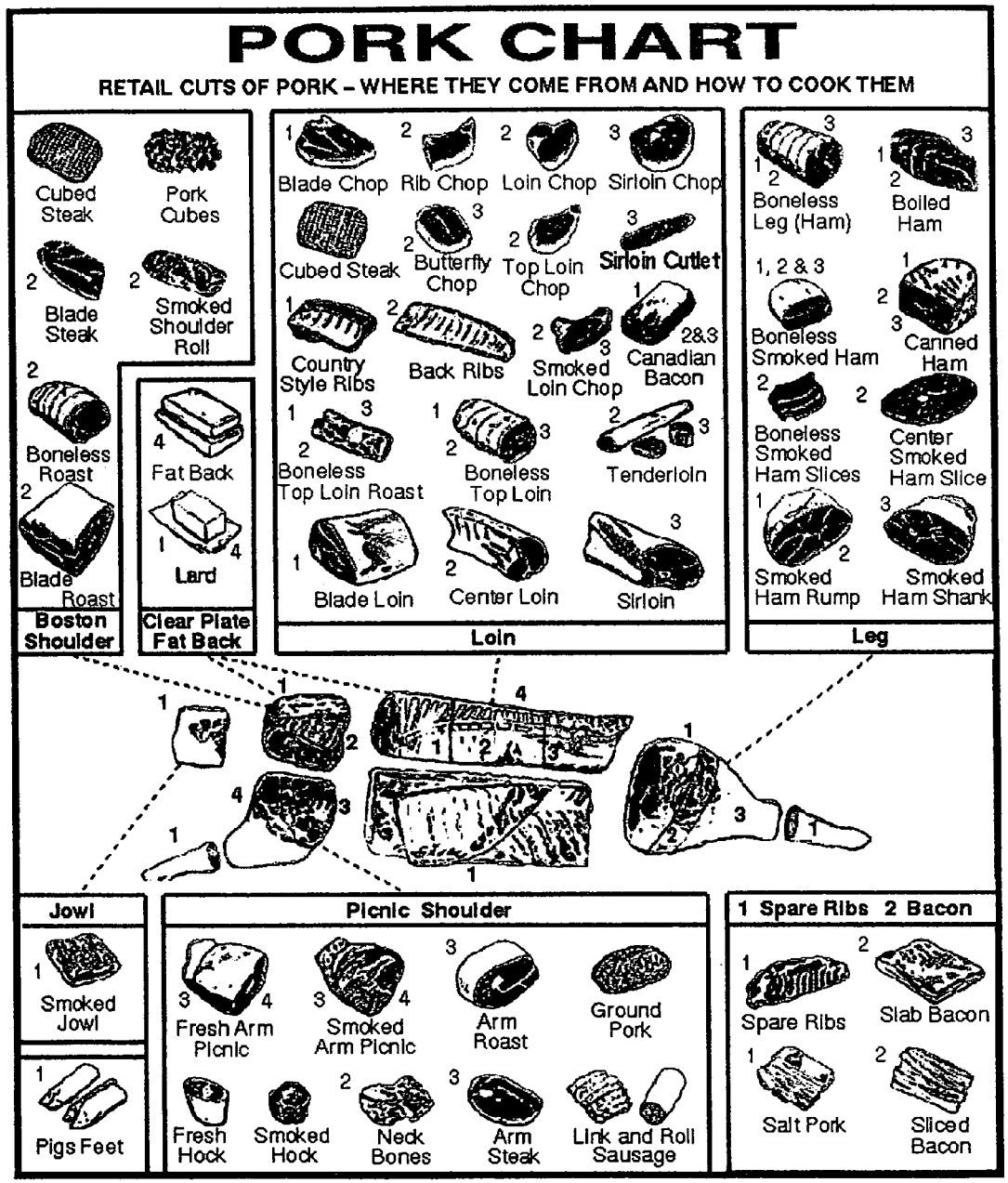
Figures 3, 4, 5, 6, 7, 8, 9, 10, 11, 12, 13, 14, 15, 16, 17, 18, 19, 20, 21, 22, 23, 24:
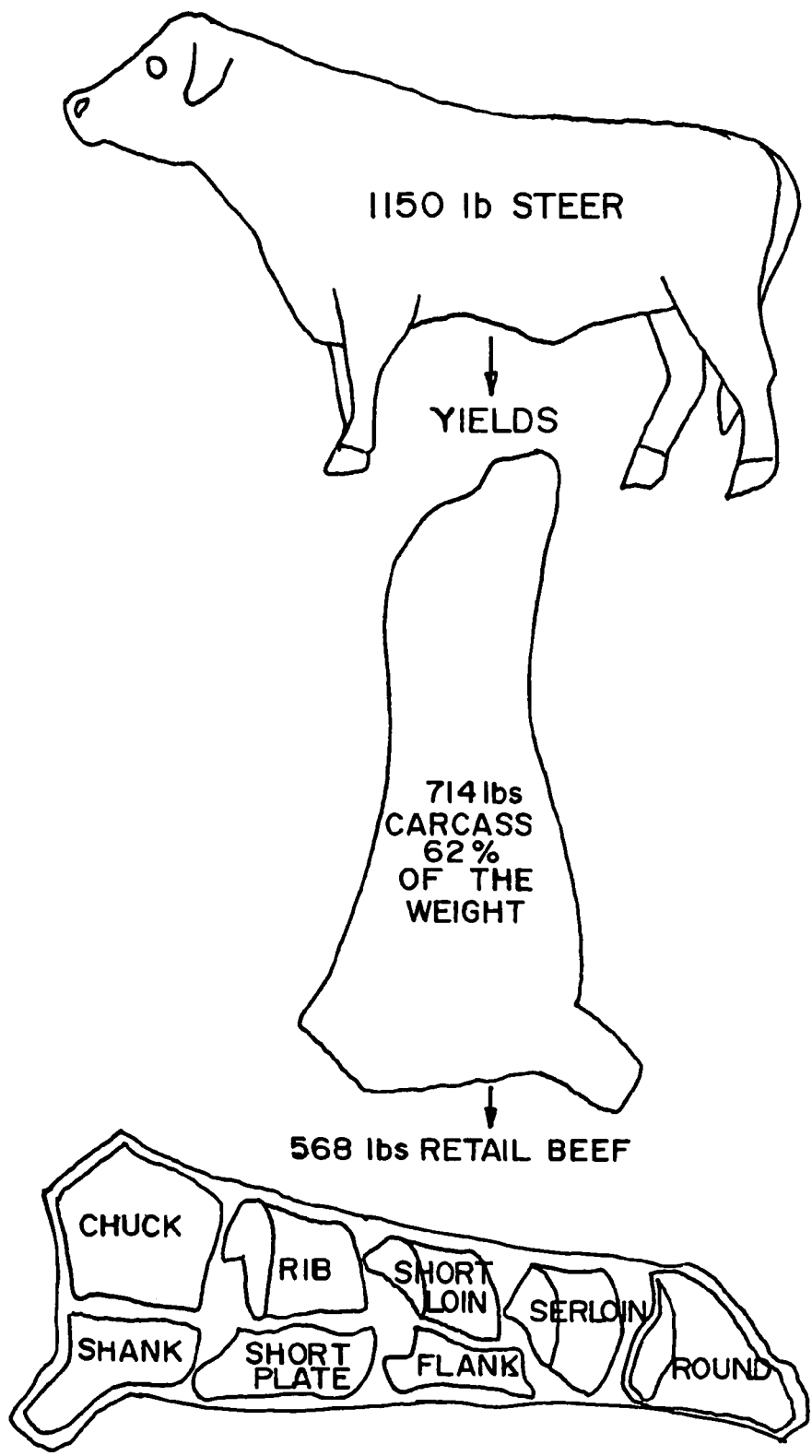
Figures 3, 4, 5, 6, 7, 8, 9, 10, 11, 12, 13, 14, 15, 16, 17, 18, 19, 20, 21, 22, 23, 24, 25:
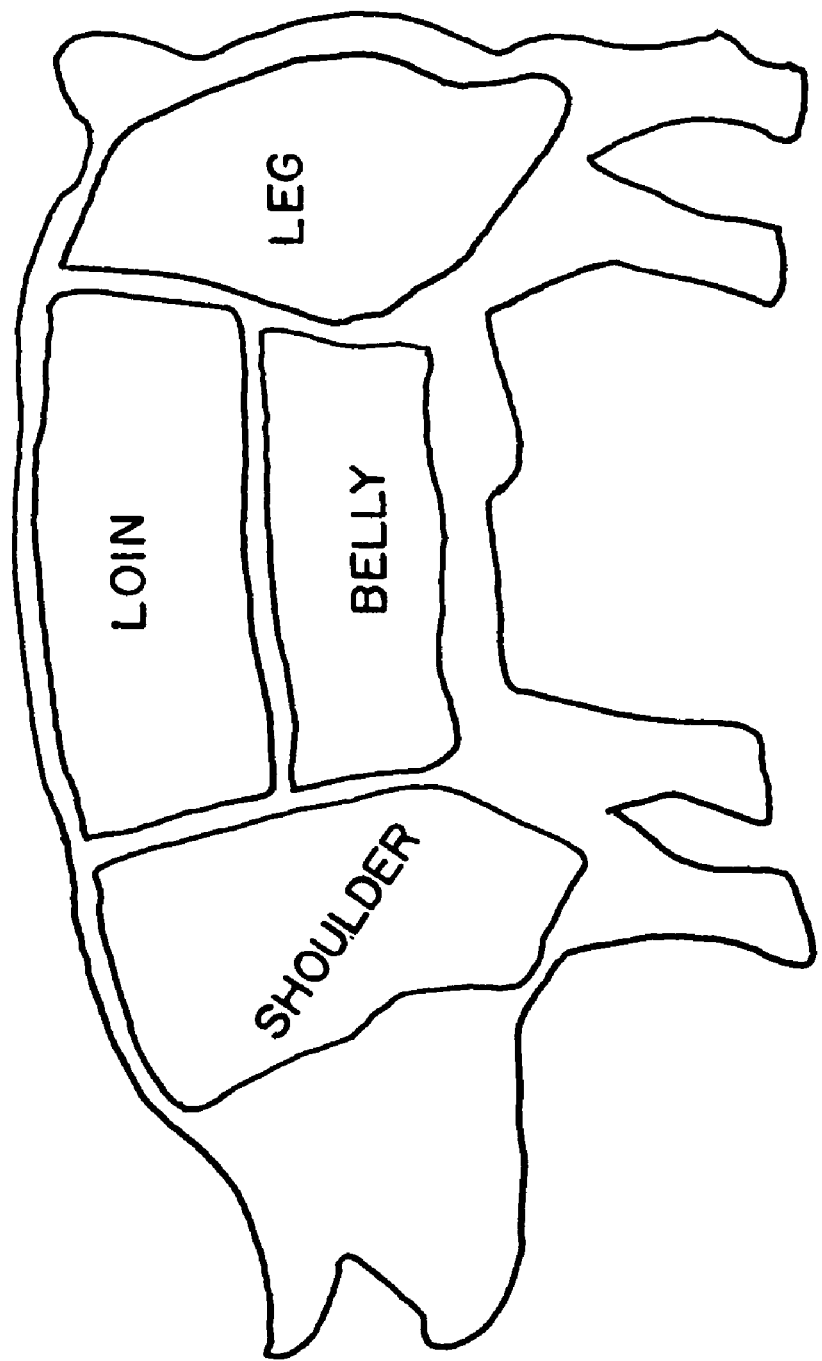
Figure 429A:
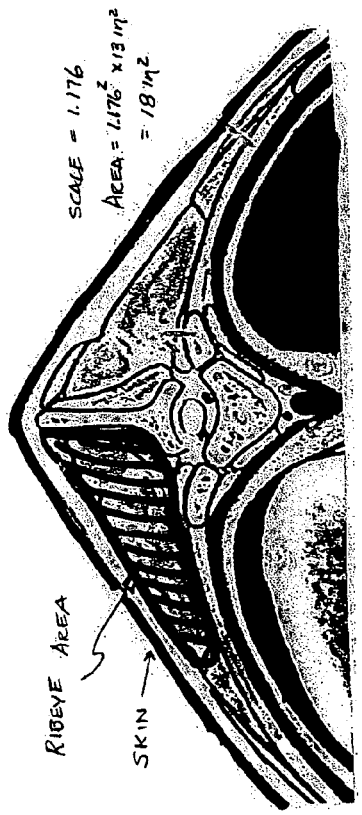
Figure 429B:
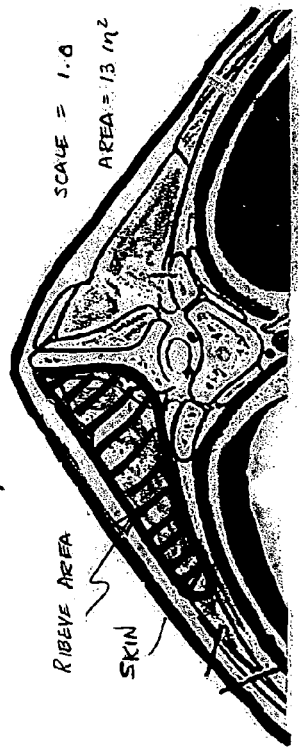
Figure 429C:

FIG. 3-1B shows an IR camera with coaxial illuminator 30a. FIG. 3-1C shows a discrete illuminator 30b and a camera set with an infrared camera 31a and a visible spectrum camera 27.

Referring once again to FIG. 2-1, it is to be noted that the chute structure 38 directs the target animal "TA" into the correct imaging position within the target zone. The proximity sensors 40 located at the front and rear of the target of zone 14 transmit approximate signals when the animal is in the correct position. As shown in FIG. 2-1, the target zone 14 is formed by a pair of substantially transparent side walls 46 that permit interrogation of the target animal by the range camera system. Ambient light sources 48 mounted on an overhead bar 50 provide ambient illumination to the target zone. If desired, a flash pattern illumination source can also be located close to the visible spectrum camera to avoid parallax errors.

As indicated in FIG. 2-1, the data processing means of the invention for processing image data from the cameras 22, 24, 26, and 28 with which it is operably associated, here comprises a control and processing unit 42. Unit 42 is supported on a table 52 that is preferably located adjacent the animal positioning device 12. Personal computer 44 and an associated monitor 53 are also preferably located on table 52.

FIG. 3-2 shows an alternate form of the equipment layout. This latest embodiment is similar in many respects to that shown in FIG. 2-1 and like numerals are used to designate like components. Here the apparatus includes three range cameras 27 and three IR cameras 28. Target visibility is enhanced from the side views by replacing the normal chute bars with blackened, steel cables 33 in the regions viewed by the cameras.

The blackened cables are nearly invisible to the mesh processing algorithm and thermal cameras.

FIG. 3-3 shows another somewhat similar embodiment of the apparatus of the invention wherein like numerals are used to designate like components. This embodiment includes three range cameras and no IR cameras. Once again, target visibility is enhanced from the side views with the blackened, steel cables in the regions viewed by the cameras.

FIG. 3-4 shows two views of a cow within the camera region of the chute. Both top and side views show the use of blackened steel cables 33 to maintain fence integrity with only minimal camera interference.

Figures 2, 3, 4, 5, 5A:
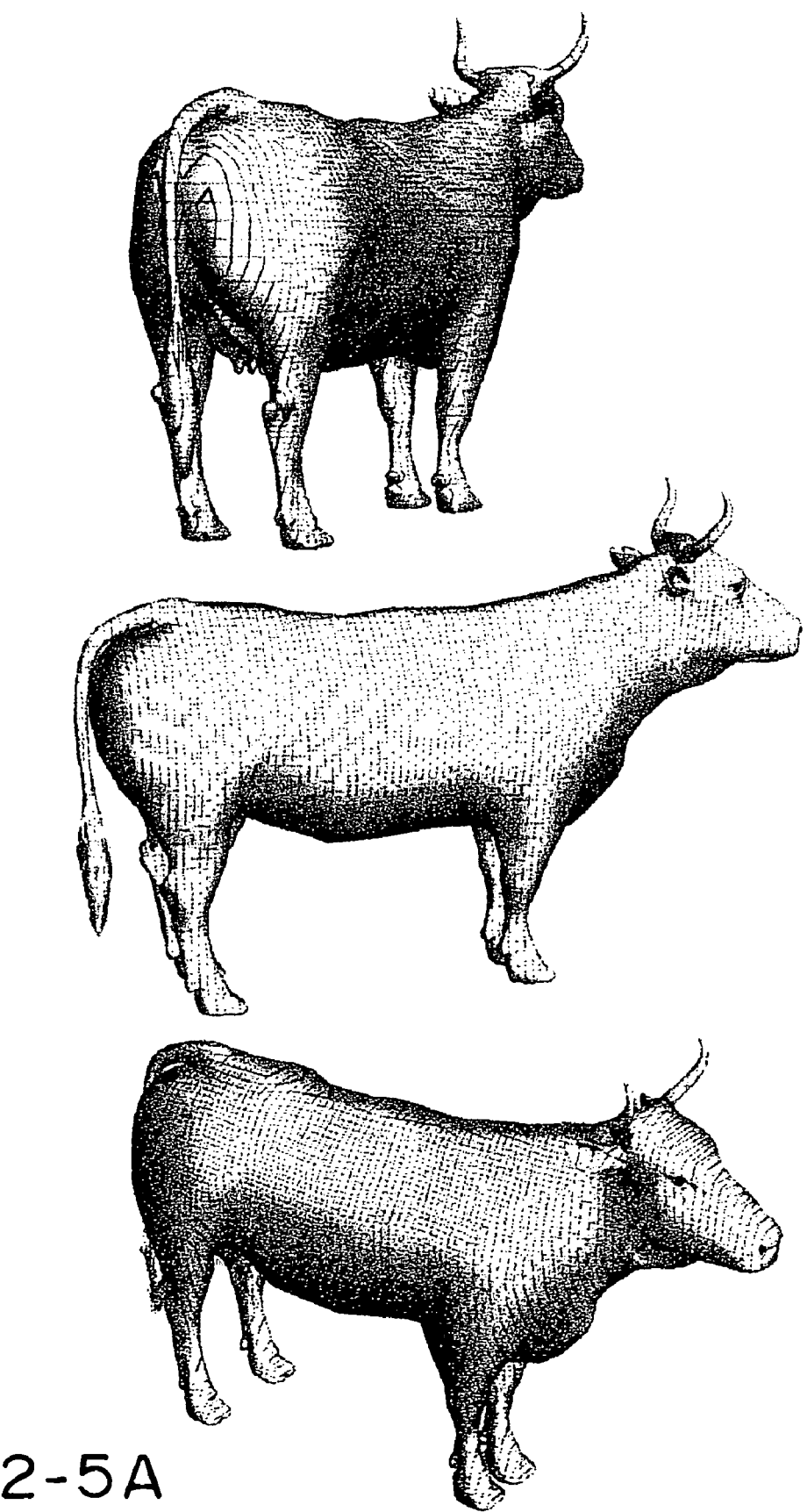
Figures 2, 3, 4, 5, 5B:
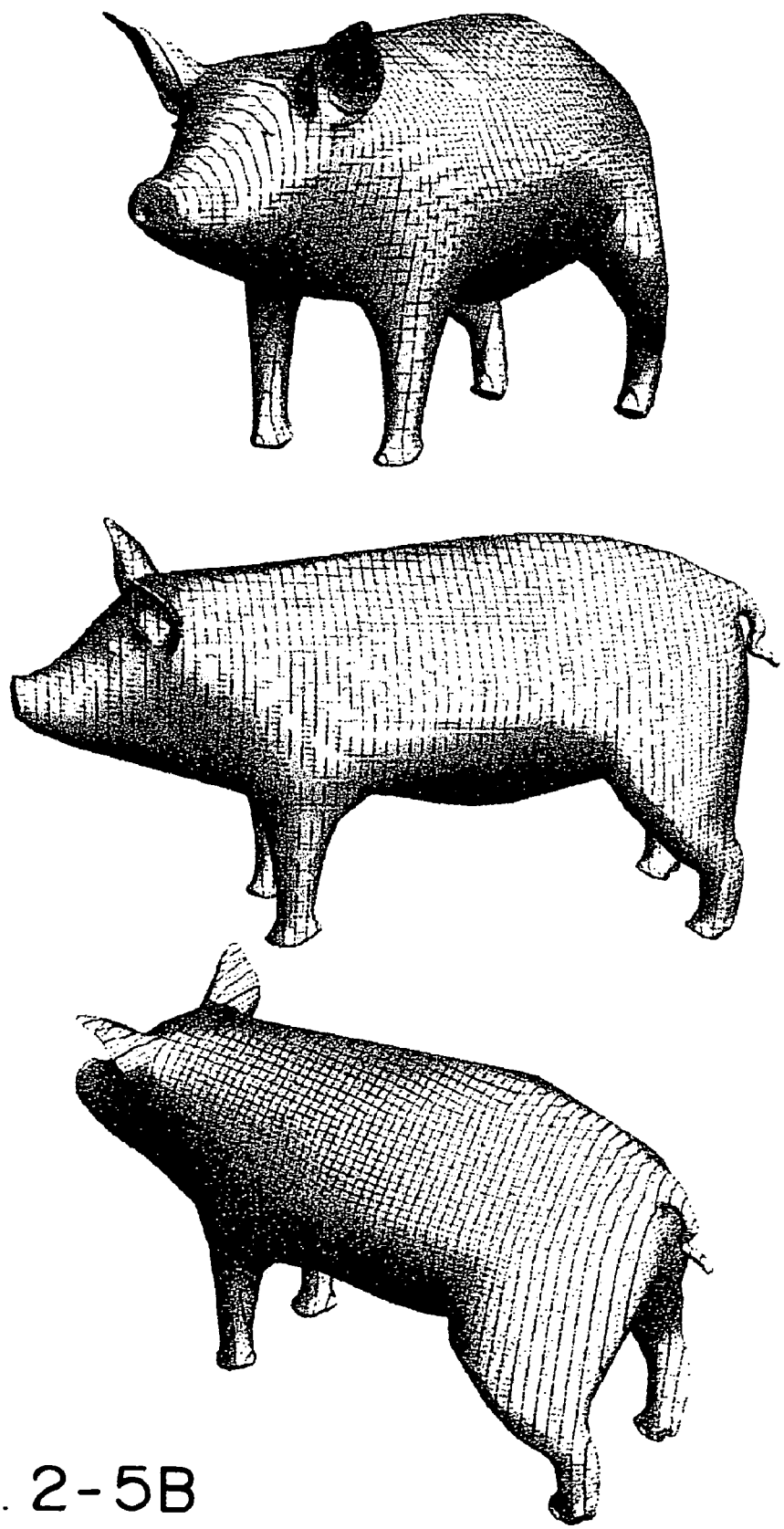
Figures 2, 3, 4, 5, 6, 6A:

FIG. 3-5 shows still another form of the apparatus of the invention wherein two range cameras 27 are positioned with one on one side and one at the top. Such a configuration assumes lateral symmetry as previously discussed herein. A transparent side window is shown in FIG. 3-5 in place of the blackened steel cable.

FIG. 3-6 shows a typical mounting method for the proximity sensors 40. These senor may emit and detect light, infrared energy, or ultrasound. The path from one emitter to a receiver may be placed across the chute in such a manner that the target animal will break the beam when it is in the desired imaging position. The broken proximity beam then triggers the imaging system. Other types of proximity sensors and orientations are well known to those skilled in the art.

FIG. 3-7 schematically represents one embodiment of the interconnections between system components. This embodiment contains three visible spectrum cameras 27 as part of the range camera system, two thermal cameras 28, 4 proximity sensor components 40, a DSP and control unit 42, and an interface for interacting with a central computer, printer, monitor, bluetooth wireless system, internet or other desired peripheral device.

FIG. 3-8 illustrates the interaction of system and peripheral components. Shown here are the graphical interface of the system in addition to a smart phone and PDA. All of these units may communicate with the laptop or descktop computer connected to the present invention. Wired, wireless radio frequency, infrared, or ultrasonic links are all anticipated by this invention.

While the Figures of this description have shown primarily animals as the target of the present invention, as previously discussed, carcasses may also be measured with the methods defined herein. For example, FIGS. 3-9 and 3-10 show carcasses hanging on an overhead conveyor line as is typical in meat processing facilities. FIG. 3-11 shows similar carcasses in the environment of the apparatus of the present invention. As illustrated in FIG. 3-11, an individual carcass must be isolated to a degree which permits the accurate imaging of its dimensions. Range cameras and thermal cameras may be used. The same processing, user interface, and peripheral devices will function with the carcass data as with the live animal data.

In accordance with one form of the method of the present invention, the apparatus as shown in FIG. 2-1 and as described in the preceding paragraphs can be used to obtain volumetric, curvilinear and linear measurements of livestock animals, such as cattle and hogs, as well as full carcasses of the animals. As previously discussed, important goals of the invention are to provide significantly improved accuracy over existing animal imaging technology and also to increase the speed of acquiring useful data. By way of example the apparatus of the present invention can be used to provide a true three-dimensional (3D) model or data set of the target animal such as depicted in FIGS. 2-5A and 2-5B. From such 3D models or data sets, highly accurate computation of volumes, curvilinear surface measurements, and linear measurements is possible. As previously discussed, the level of accuracy achieved by the apparatus of the invention is far superior to a simple silhouette or profile data derived in accordance with prior art methods which only provide measurement potential around the outline of the silhouette since no landmarks exist within the, darkened shape. In this regard, when two orthogonal silhouette views are combined to calculate a pseudo-volume, shape concavities cannot be recognized and only gross estimates of volume can be achieved. As will be made clear from the discussion which follows, the level of accuracy possible with a true 3D data set such as achieved by the methods of the present invention is superior to a 2D video data set of a character derived in accordance with prior art methods which share the volumetric limitations of the silhouette data with no ability to account for surface concavities or protuberances. Though the 2D video data derived by the prior art systems does provide the ability to locate landmarks within the 2D silhouette outline, all surface features and measurements are obtained as their corresponding projections onto a flat, 2D surface.

With regard to the determination of the number and location of range cameras required to accurately reproduce the target, various factors must be considered. One of these factors is the complexity of the target surface. In the case of live or carcass animals, such as cattle and hogs, a three camera configuration such as that shown in FIG. 2-9 is acceptable. With this configuration, each range camera obtains a range image of the animal surface within its field of view. As shown in FIGS. 2-1 and 2-9, orthogonal camera orientations may be chosen with camera axes aligned from the right and left sides and the top. Such orthogonal orientations result in the surface seams shown in FIG. 2-9 and previously discussed herein. The orientations shown in FIGS. 2-1 and 2-9 provide sufficient surface accuracy to achieve the desired volume calculations. However, with the camera alignments shown, it is to be noted that seam 36 has no surface overlap. This potential shortcoming may be remedied by aligning side cameras 24 and 26 in the lower positions labeled in FIG. 2-9 as, "alternate camera 1 axis" and "alternate camera 3 axis", respectively. With these alternate alignments, it can be seen that there is more surface overlap along the ventral surface of the animals while maintaining sufficient overlap in the two upper seams. Since, in accordance with the method of the invention, the entire surface of the animal is recorded, this range camera configuration permits very accurate volumetric measurements as well as curvilinear and linear measurements.

In accordance with an alternate form of the method of the apparatus, it is possible to rely upon the lateral symmetry of the animal and still obtain a reasonably accurate measurement of volumes. For example, FIG. 2-10a) shows a 2-camera configuration in which a single side camera 52 obtains a range image that is mathematically duplicated and reversed to represent the range image of the opposite side. The top camera 54, of this alternate apparatus, is essential to accurately measure the position of the median or mid-sagittal plane about which the two side images are aligned. This concept is reasonably sound when the target animal is substantially symmetrical and properly physically positioned in the center of the chute region.

As depicted in FIG. 2-10a), the top camera 54 may theoretically be replaced by a mechanical method which locates the median plane. By way of example, this mechanical method may comprise a saddle-like device 56 having a dorsal plane that can be lowered into engagement with the back of the animal. With such a construction, the saddle shape will align the dorsal plane with the median plane of the animal.

The side range camera can measure the orientation of the dorsal plane and in turn compute the axis of symmetry corresponding to the median plane.

In accordance with one form of the method of the invention, various timing options for the range cameras can be employed. By way of example, a basic camera timing diagram, such as that shown in FIG. 2-13 can be used. As indicated in FIG. 2-13, a trigger pulse (top trace) is provided to a given camera. After a brief shutter delay, the shutter is opened for a period of time during which the image is acquired (center trace). At an appropriate moment during the acquisition time the flash is fired projecting the structured light pattern on the surface of the target (bottom trace of FIG. 2-13). FIG. 2-13 shows a timing diagram with simultaneous shutter opening and staggered flashes. This particular approach is useful during system setup to identify regions of the target surface where the range images overlap. The lower right-hand portion of FIG. 2-13 illustrates a timing solution to the crosstalk concerns. In this timing diagram both the shutter and flash periods are staggered such that the acquisition time for a given camera can only be illuminated by its own flash unit. The lower right-hand portion of FIG. 2-13 illustrates timing diagrams with staggered shutters and staggered flash.

It is to be understood that numerous structured light configurations are possible for the range cameras used in the accomplishment of the method of the invention. Perhaps the simplest is a lens projection system which projects the desired pattern onto the target.

Modulated laser systems which rapidly scan the target are also possible, though complex scanning alignments and intensity modulation can result in a relatively, high priced system. The projected pattern may be a grid, a series of dots, bars, or other custom shapes. In practice, the particular pattern is selected to match the range camera technology.

Referring once again to FIG. 2-14, an alternate form of the apparatus of the invention is their illustrated. This alternate form of the apparatus is similar to that shown in FIG. 2-1, but video cameras, rather than the digital cameras, previously described, are used as the range camera inputs. In accomplishing the method of the invention using this alternate form of apparatus, the target animal enters the chute area from the right and proceeds into the central region where video cameras 58, 60 and 62 are positioned. Proximity switches 64 positioned on either side of the target zone indicate electronically when the animal is in the correct position. Video cameras 58 and 60, each having appropriate illumination means such as illuminators 61, obtain side views of the target animal. Similarly, top camera 62 obtains a top view of the target animal. An infrared (IR) camera 66 is positioned above the hindquarters of the animal to obtain a thermal image of the animal's back in order to provide an indication of backfat. FIG. 2-15 shows a typical camera layout for a three video camera apparatus of the character shown in FIG. 2-14. The range image data is referenced to a horizontal plane through the center of the target animal and the IR camera 66 is positioned in line with the top camera 62.

Upon acquiring the appropriate images, these images are downloaded to the processing unit 70 that is located near the chute area 72. The processing unit in turn passes the data to a personal computer 74 for display and storage of the data. While the control and processing unit and the personal computer are here shown alongside the chute, it is to be understood that these components may be located a significant distance from the chute area provided that transmission speed and accuracy are not compromised.

In the manner described in greater detail hereinafter, the data obtained from the video cameras 58, 60 and 62 must be appropriately processed to obtain the range images and then undergo further processing to form the complete 3D model. Once in the form of a 3D model the data may be interrogated to obtain many useful measurements.

The processing channel from the video cameras 58, 60 and 62 to measurement tables and display is depicted in FIG. 2-19. In this Figure, the target animal is illuminated with structured illumination and images are obtained from three strategic camera positions. Each of the Figure images are processed by the range image algorithm to obtain a three-dimensional point cloud set. It is to be understood that the digital images obtained from the previously identified range cameras 26, 28, and 30 can similarly be processed by the range image algorithm to obtain a three-dimensional point cloud set.

Referring once again to FIG. 3-5, still another form of the apparatus of the invention is there illustrated. This alternate form of the apparatus is similar to the earlier described embodiments and like numerals are used in FIG. 3-5 to identify like components. In the embodiment of FIG. 3-5 the invention, only two cameras, rather than the three cameras, previously described are used. In accomplishing the method of the invention using this latest form of apparatus, the target animal once again enters the chute area from the right and proceeds into the central region where cameras 27 are positioned. Cameras 27, each having appropriate illumination means, shown here as illuminators 61 to illuminate the target area, obtain top and side views of the target animal.

Upon acquiring the appropriate images, these images are downloaded to the processing unit 42 that is located near the chute area. The processing unit in turn passes the data to a personal computer 44 for processing of the data in a manner presently to be described.

3.3 3D Data Acquisition and Processing

Data Acquisition

The image data obtained from the various range cameras must be converted to range image data. One embodiment of this invention uses the visible spectrum cameras in a manner consistent with the previously discussed depth-from-defocus (DFD) technologies.

Depth-from-defocus (DFD) methods provide key characteristics which make DFD a good fit for the present invention. DFD requires only a single camera per view and also requires a low quantity of images to obtain depth information. Additionally, DFD provides a reasonably stable surface in the event of localized surface obstructions. The low number of required images and the single camera features enable near simultaneous data acquisition to minimize the effect of target motion on measurement accuracy. In general, the fewer the number of images, the shorter the acquisition and processing times.

The 3D data obtained via DFD methods must be processed to obtain the range images. These data then undergo further processing to form the complete 3D model. Once in the form of a 3D model the data may be interrogated to obtain the desired measurements.

Mesh Processing

FIGS. 2-19 and 3-12 show flow charts of a custom processing algorithm which converts the 3D data from the range camera into mesh data aligned on a rectangular grid. The 3D data from the range camera may be non-uniformly spaced and not necessarily on a rectangular grid or axis. Data in such a format is difficult to process, merge with other surfaces, or analyze for measurement purposes. The processing algorithm of FIGS. 2-19 and 3-12 interpolates the incoherent 3D data from the range camera into uniformly sampled data on a common rectangular grid. The later data may be easily processed to merge surfaces or obtain physical measurements.

The 3D data set shown in FIG. 2-20A resulted from a manually produced contour diagram of the surface (skin) of a pig. Points on each contour curve were interactively selected via computer mouse and assigned appropriate contour elevations. Nearly 600 data points were defined in this manner.

Block 1 of FIG. 3-12 implements the Delaunay triangulation function of the MATLAB script program (version 5.3), which program is readily obtainable from The Math Works, Inc. company. This function projects the 3D data set onto the X-Y plane and generates triangles in such a way that no data point is contained within any triangle's circumcircle. The circumcircle of a triangle is that unique circle which passes through all three vertices. The formulation of Delaunay triangles is a key step in the transformation of a surface sampled at non-uniform intervals and non-rectangular coordinates to an accurately interpolated surface which is uniformly sampled on a rectangular grid.

This Delaunay function requires x and y coordinate inputs for each data point having coordinates, $(x_1,y_1,z_1)$. It returns an M-by-3 matrix, TRI, which contains one Delaunay triangle per row, with the vertices designated by indices into vectors $x_1$ and $y_1$ where M is the length of arrays $x_1$ and $y_1$. DELAUNAY begins by removing any duplicate points. Next, it adds random perturbations, 'fuzz', to the mantissa (x value) in order to enhance the Delaunay algorithm performance and avoid degeneracy for collinear data. The magnitude of the random perturbations is negligible for most data spacing. The data is then offset such that it is centered around zero. At this point a core Delaunay algorithm, written by Steve J. Fortune, AT&T Bell Laboratories, (reference: Steve J. Fortune, "A Sweepline Algorithm for Voronoi Diagrams," Algorithmica 2, 153-174, 1987) is applied. The resulting matrix, TRI, contains the Delaunay triangles as previously described. One final check is made to remove any triangles with zero area from the list.

Block 2 applies the TRIMESH function to the data resulting from Delaunay triangulation. The result is a graphical display of the Delaunay triangles in three-dimensions. The color of the triangle edges is mapped according to the magnitude of the $z_1$ value. TRIMESH requires inputs of TRI, $x_1$, $y_1$, and $z_1$. TRI contains the triangles as indices into $x_1$, $y_1$, and $z_1$. The output is the graph of Delaunay triangles contained in matrix, TRI, as described. Previously identified FIG. 2-20B (MATLAB FIG. 2) shows a top view of these triangles. Previously identified FIG. 2-20C (MATLAB FIG. 3) shows a 3D view of the same triangles.

Block 3 is the application of the TRISURF function which displays the Delaunay triangles of TRI as surfaces. TRISURF requires inputs of TRI, $x_1$, $y_1$, and $z_1$. The output of TRISURF is a graph in which each triangle of TRI is displayed in three-dimensions with its color assigned according to its average $z_1$ value and the colormap associated with $z_1$. Previously identified FIG. 2-20D (MATLAB FIG. 4) shows the output of TRISURF with the Delaunay triangles as surfaces.

Block 4 applies the MESHGRID function to the data $x_1$ and $y_1$. This function transforms the domains specified by vectors $x_1$ and $y_1$ into arrays $x_1$ and $y_1$. The latter arrays, uniformly spaced and sampled, will be used for the interpolation of z-values via GRIDDATA.

Block 5 represents the application of the GRIDDATA function with $x_1$, $y_1$ and $z_1$ as non-uniformly spaced inputs and $x_i$, $y_i$ as uniformly spaced inputs. GRIDDATA generates the uniformly spaced output, $z_i$. This function fits a surface of the form, $z_i=f(x_i, y_i)$. GRIDDATA interpolated the surface to go exactly through the surface at points $x_i$, $y_i$, and $z_i$, where $x_i$ and $y_i$ are uniformly spaced as generated by MESHGRID.

Block 6 plots the colored parametric surface defined by the three input variables, $x_i$, $y_i$ and $z_i$. The colormap, when used in this manner, is identically the $z_i$ variable. The color is proportional to the height of $z_i$. Previously identified FIG. 2-20E (MATLAB FIG. 5) shows the surface plot with flat shading.

Block 7 plots the colored parametric mesh defined by the three input variables, xi, yi and zi. The colormap, when used in this manner, is identically the zi variable. The color is proportional to the height of zi. Previously identified FIG. 2-20F (MATLAB FIG. 6) shows the surface plot with flat shading and rectangular mesh.

Figures 2, 3, 4, 5, 6, 7:
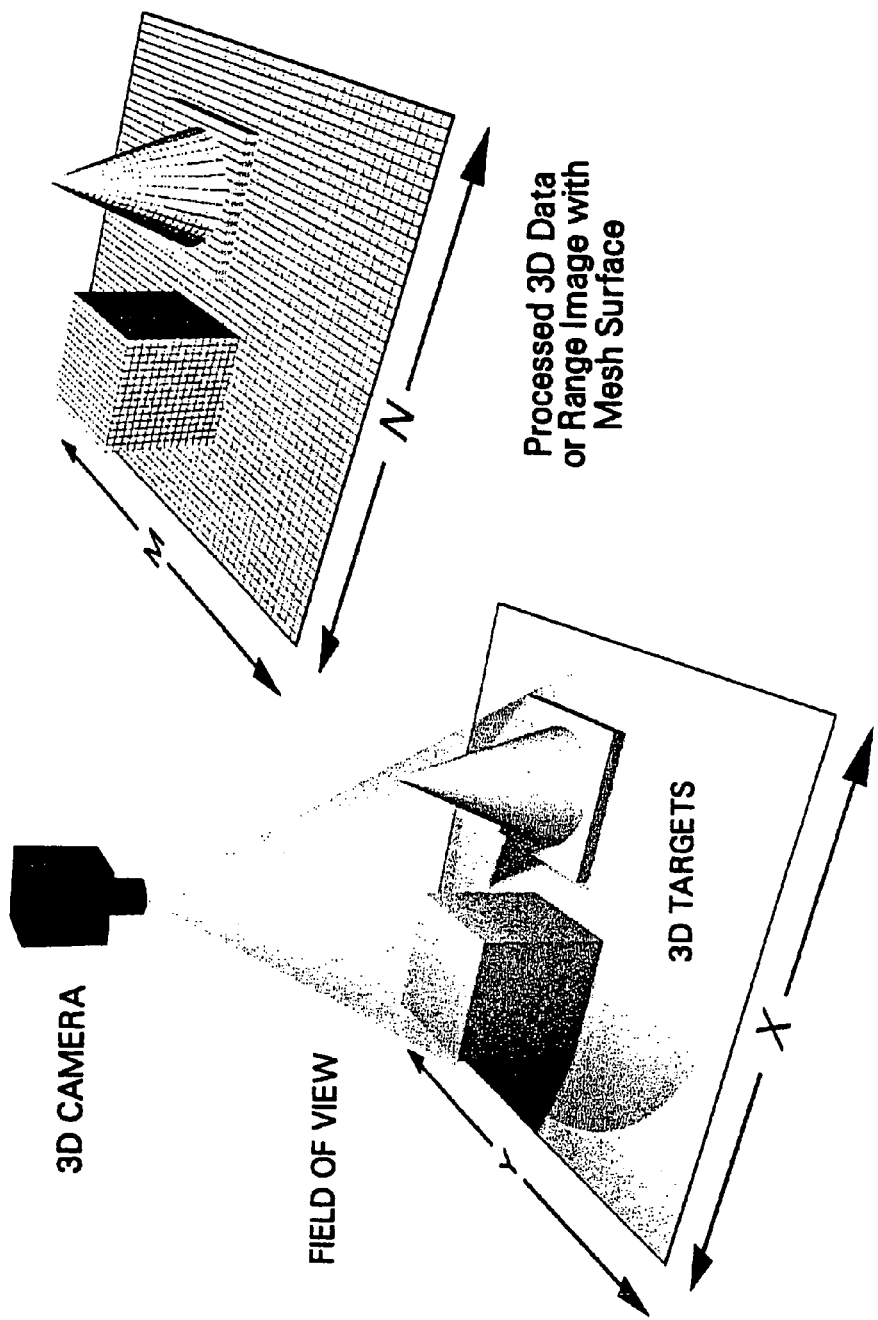
Figures 2, 3, 4, 5, 6, 7, 8, 9:
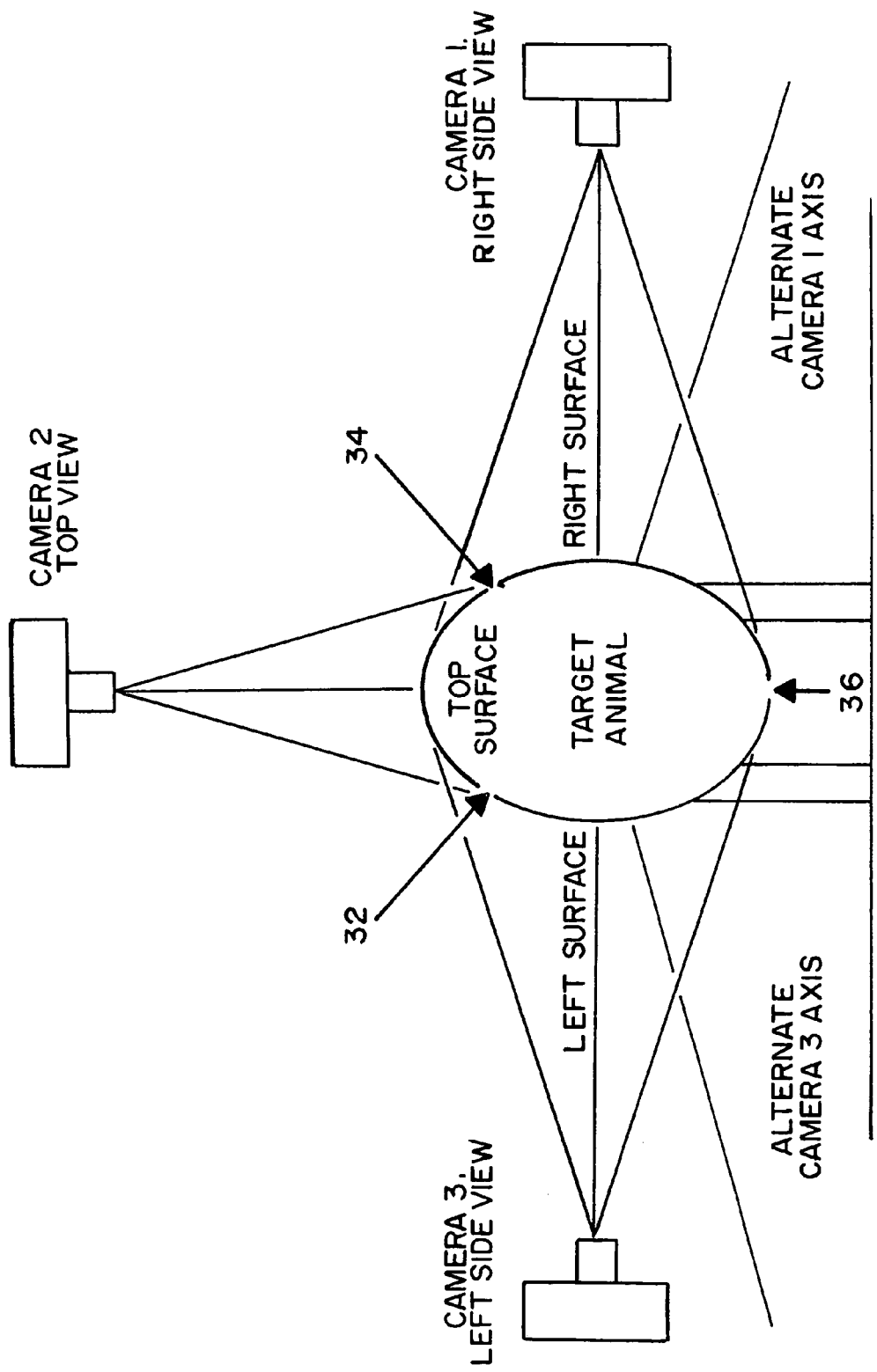
Figures 2, 3, 4, 5, 6, 7, 8, 9, 10, 10A:
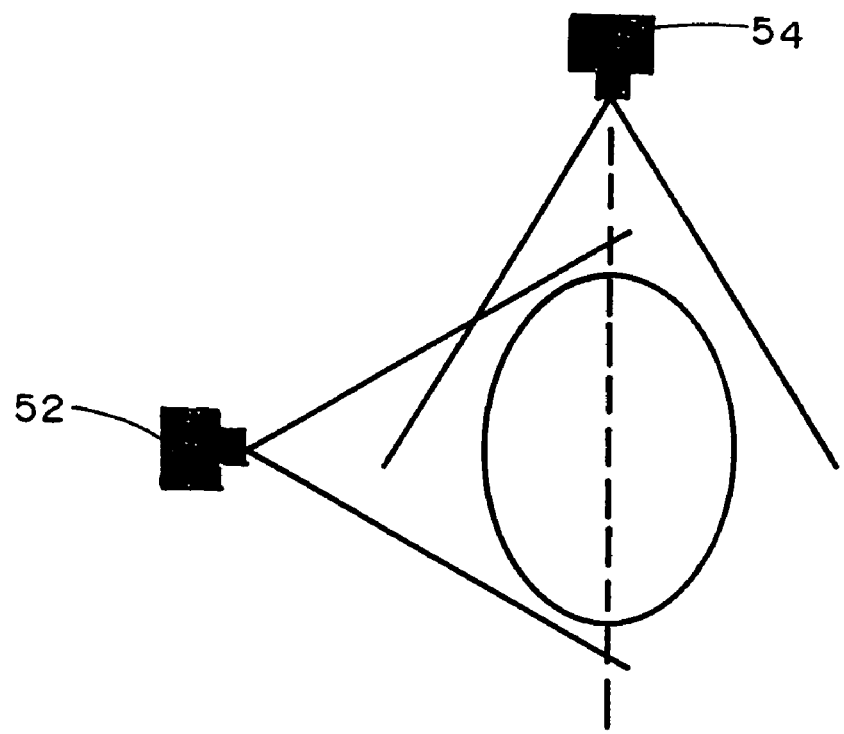
Figures 2, 3, 4, 5, 6, 7, 8, 9, 10, 10B:
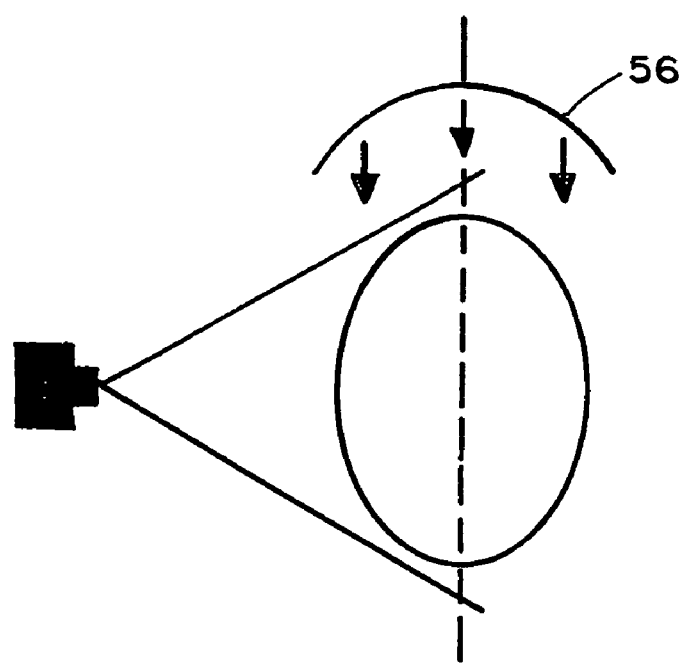
Figures 2, 3, 4, 5, 6, 7, 8, 9, 10, 11, 12, 12A:
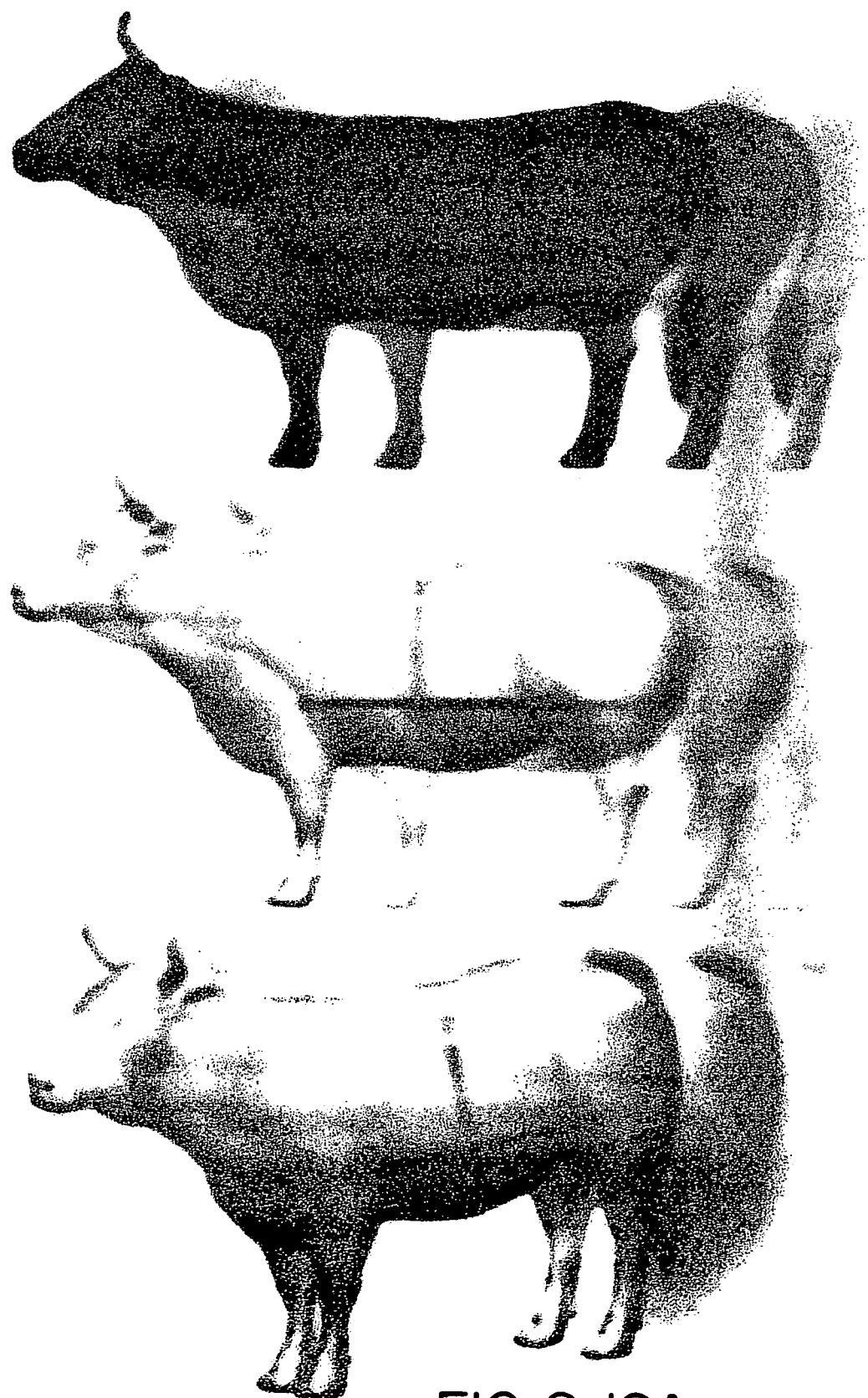
Figures 2, 3, 4, 5, 6, 7, 8, 9, 10, 11, 12, 12B:
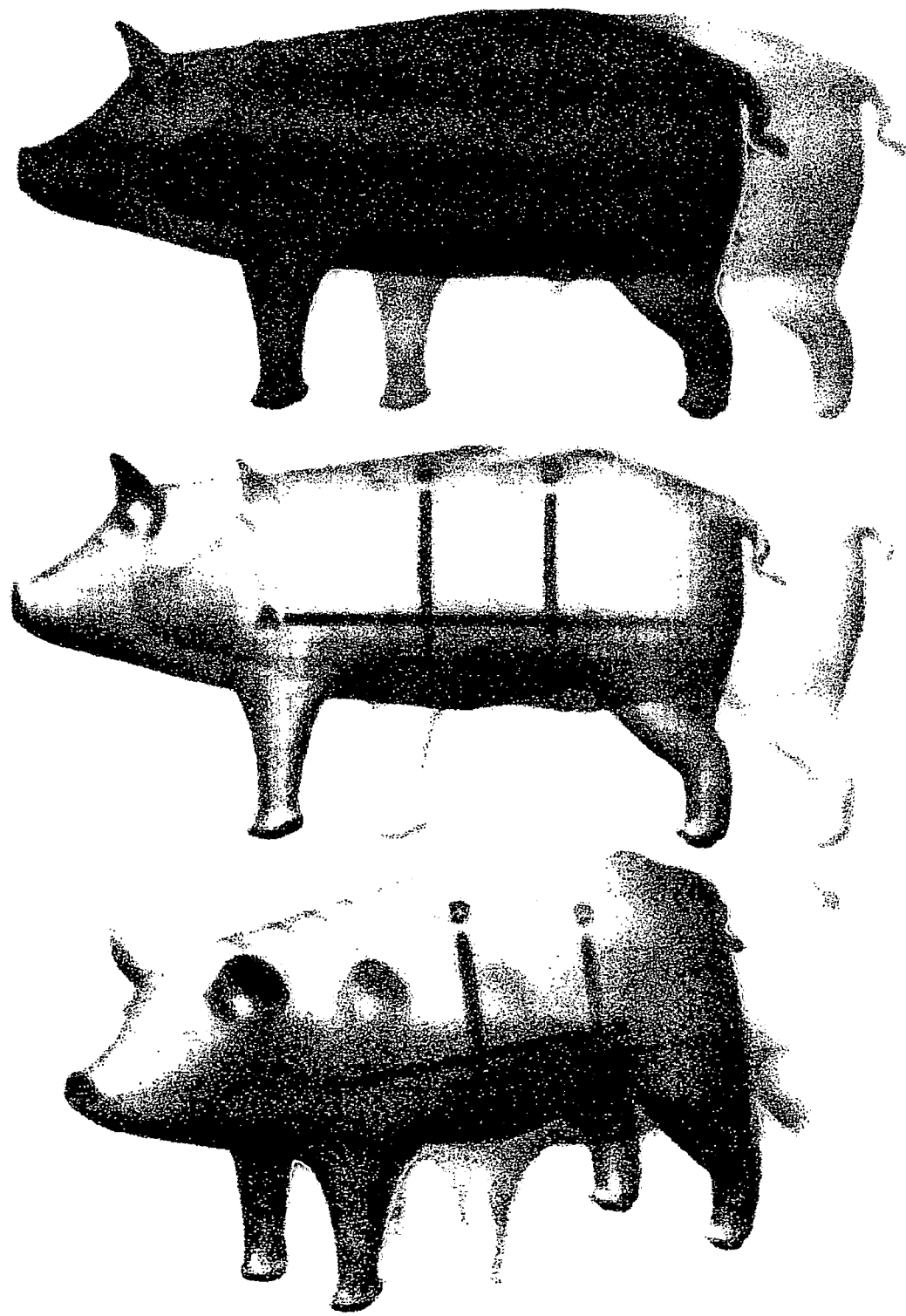
Figures 2, 3, 4, 5, 6, 7, 8, 9, 10, 11, 12, 13:
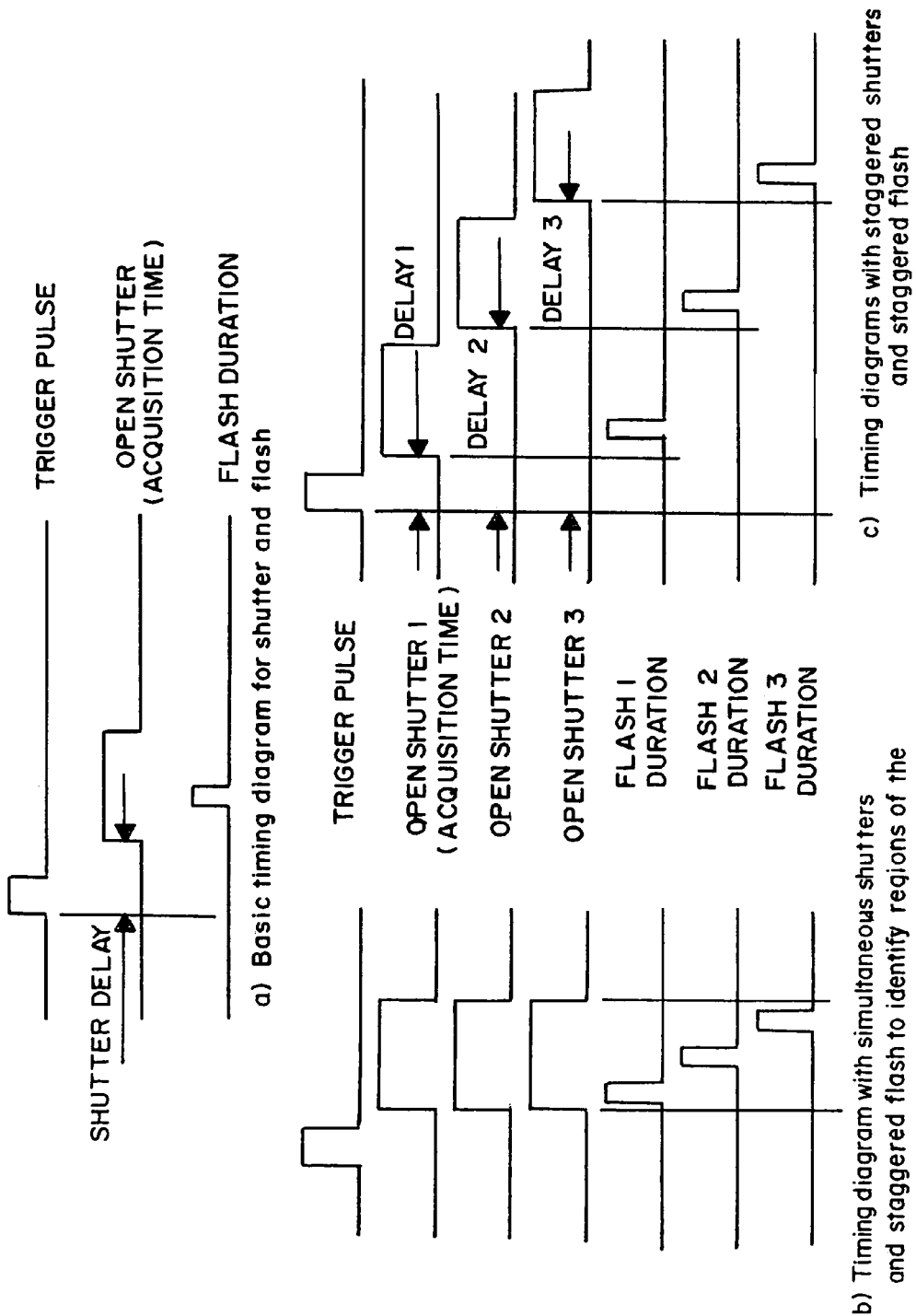
Figures 2, 3, 4, 5, 6, 7, 8, 9, 10, 11, 12, 13, 14:
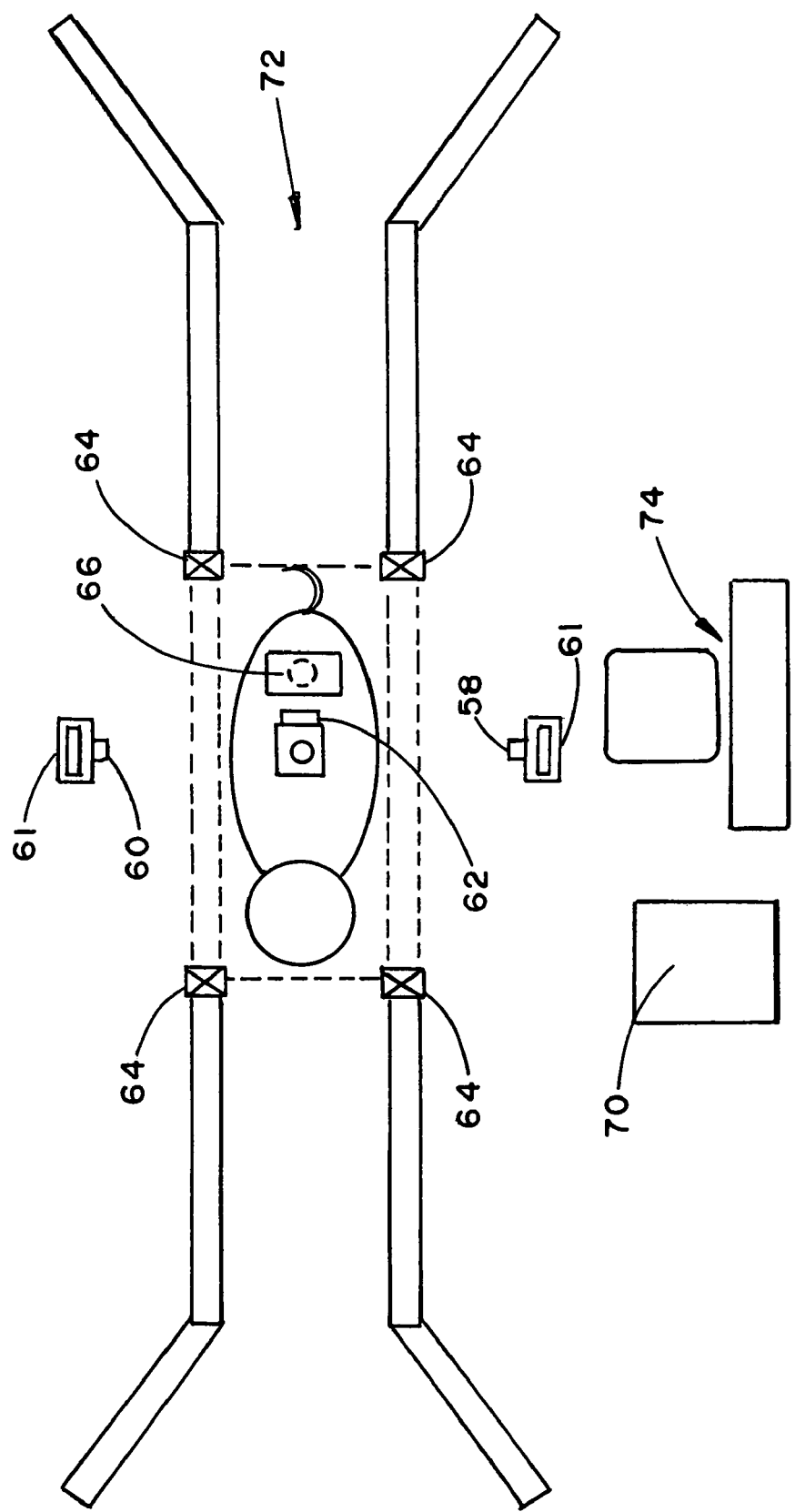
Figures 2, 3, 4, 5, 6, 7, 8, 9, 10, 11, 12, 13, 14, 15:
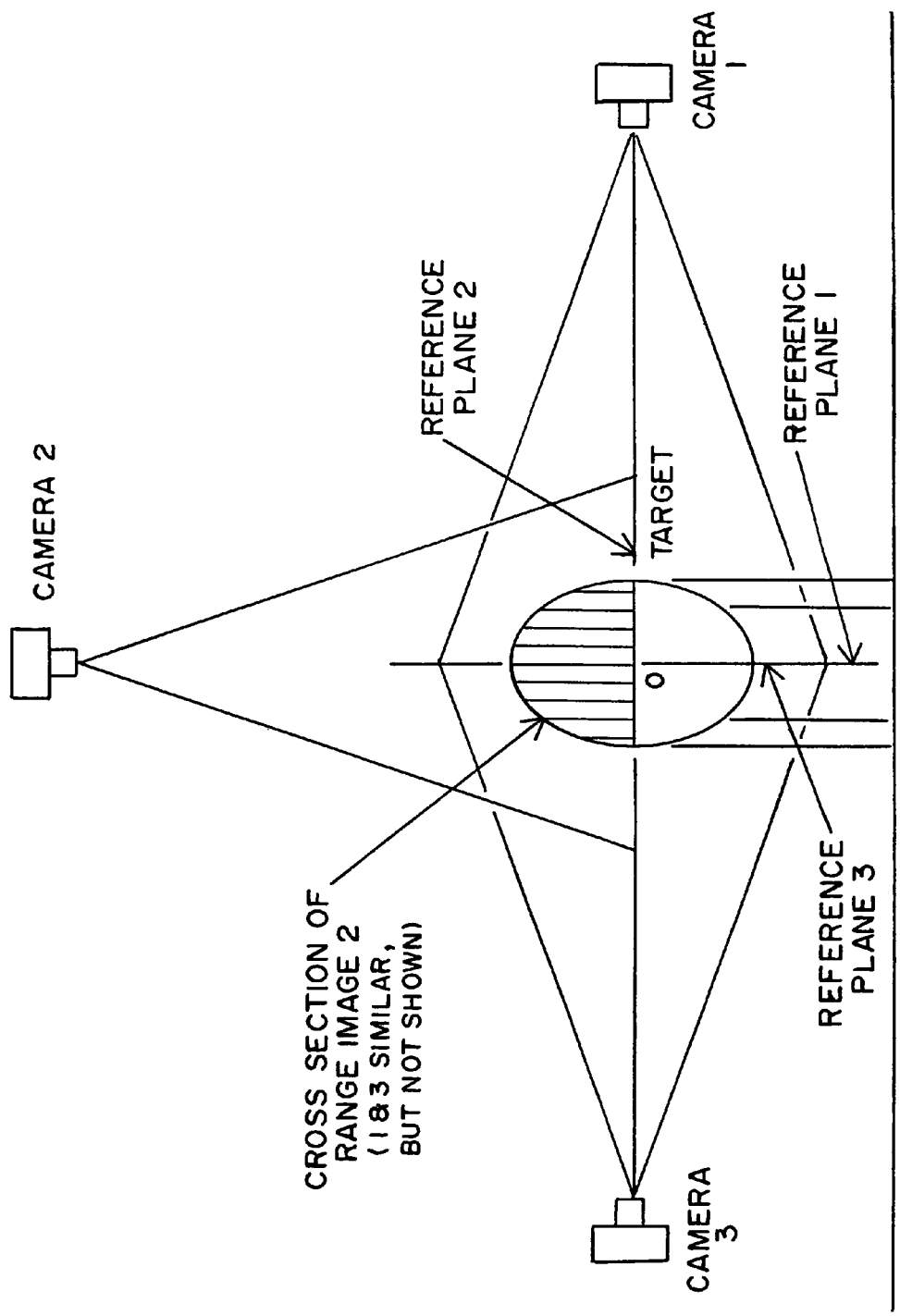
Figures 2, 3, 4, 5, 6, 7, 8, 9, 10, 11, 12, 13, 14, 15, 16:
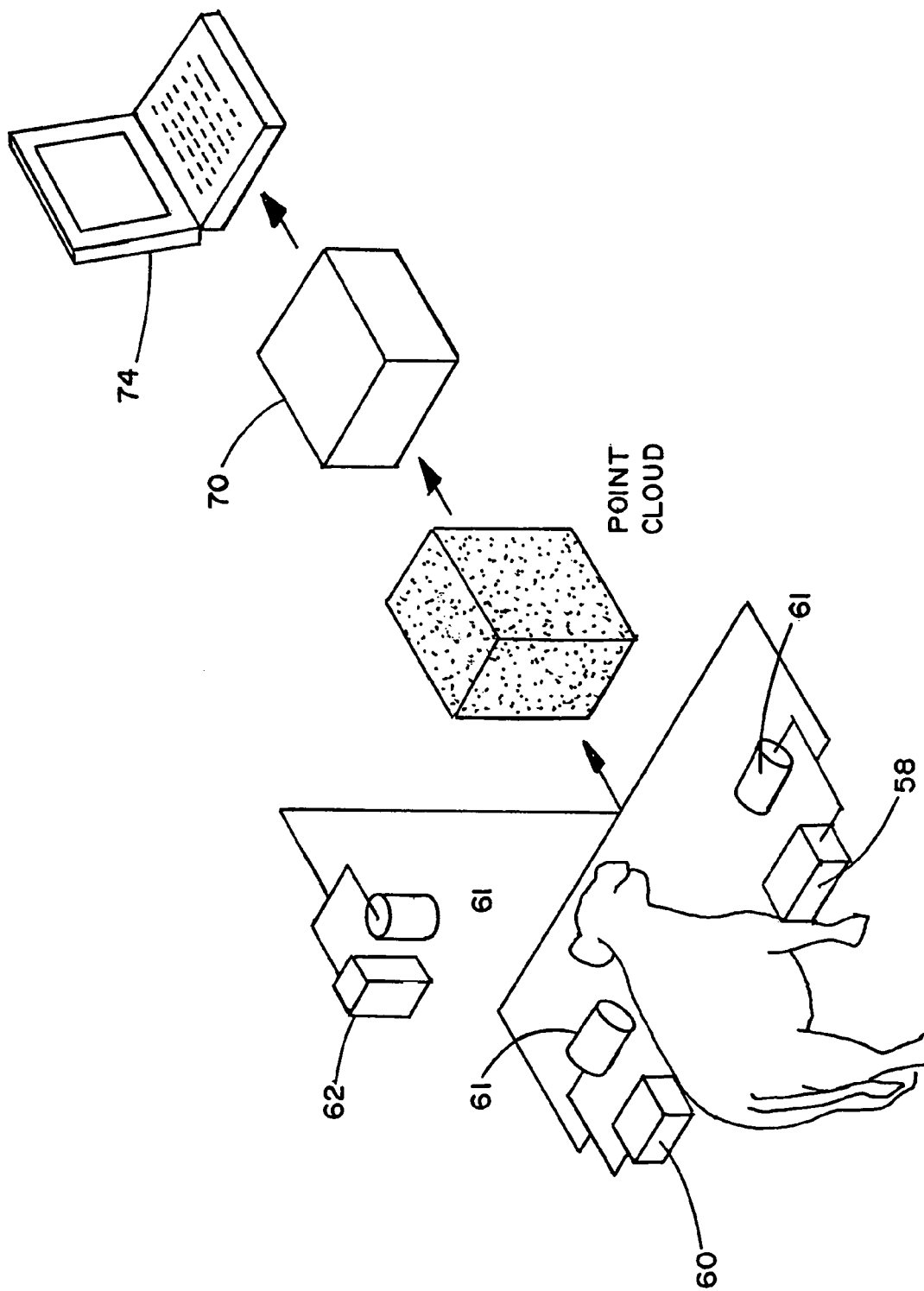
Figures 2, 3, 4, 5, 6, 7, 8, 9, 10, 11, 12, 13, 14, 15, 16, 17, 17A:
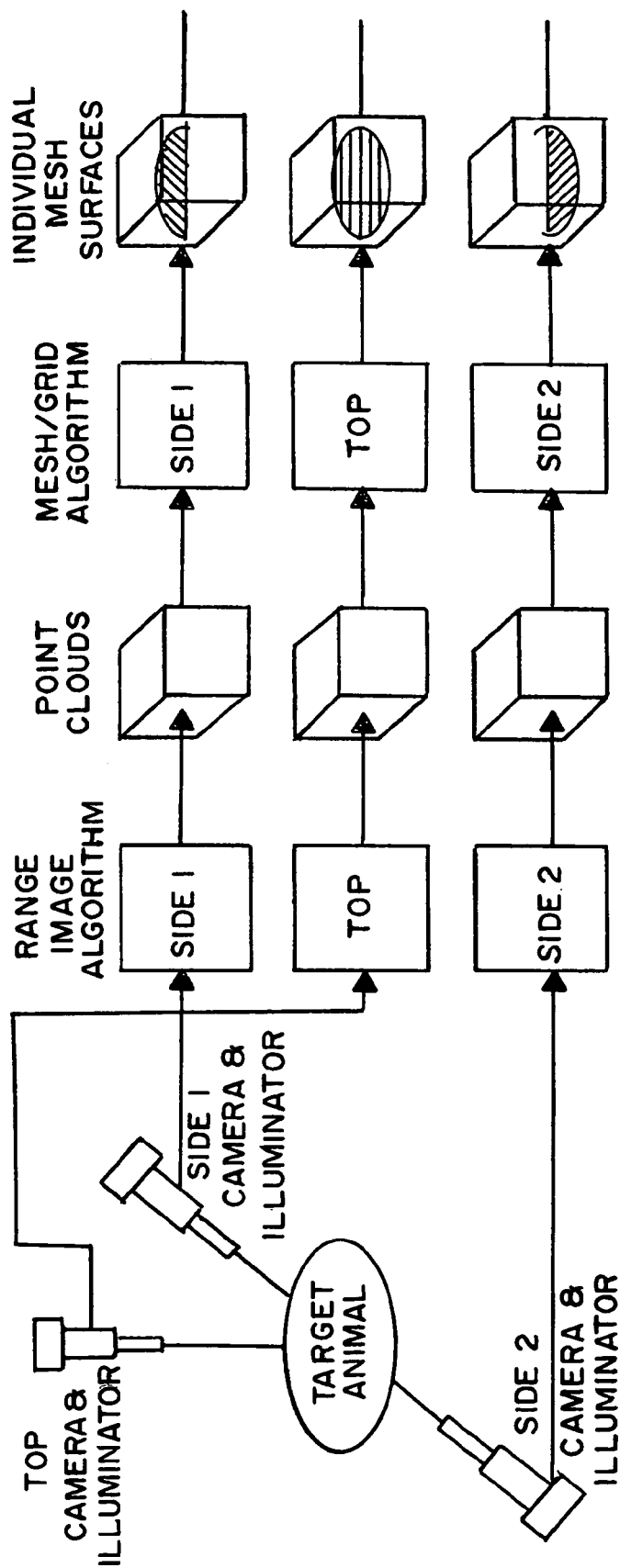
Figures 2, 3, 4, 5, 6, 7, 8, 9, 10, 11, 12, 13, 14, 15, 16, 17, 17B:
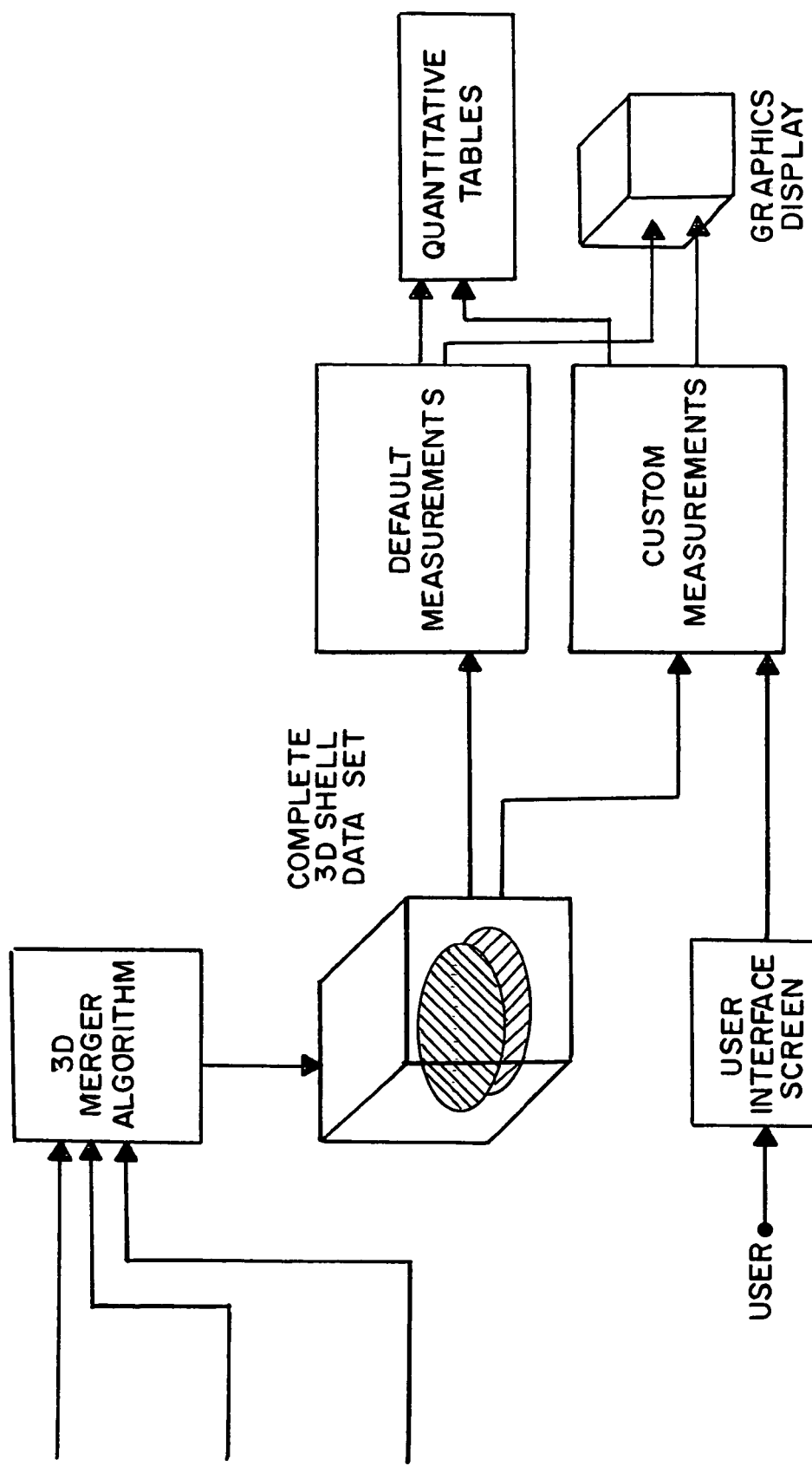
Figures 2, 3, 4, 5, 6, 7, 8, 9, 10, 11, 12, 13, 14, 15, 16, 17, 18, 18A:
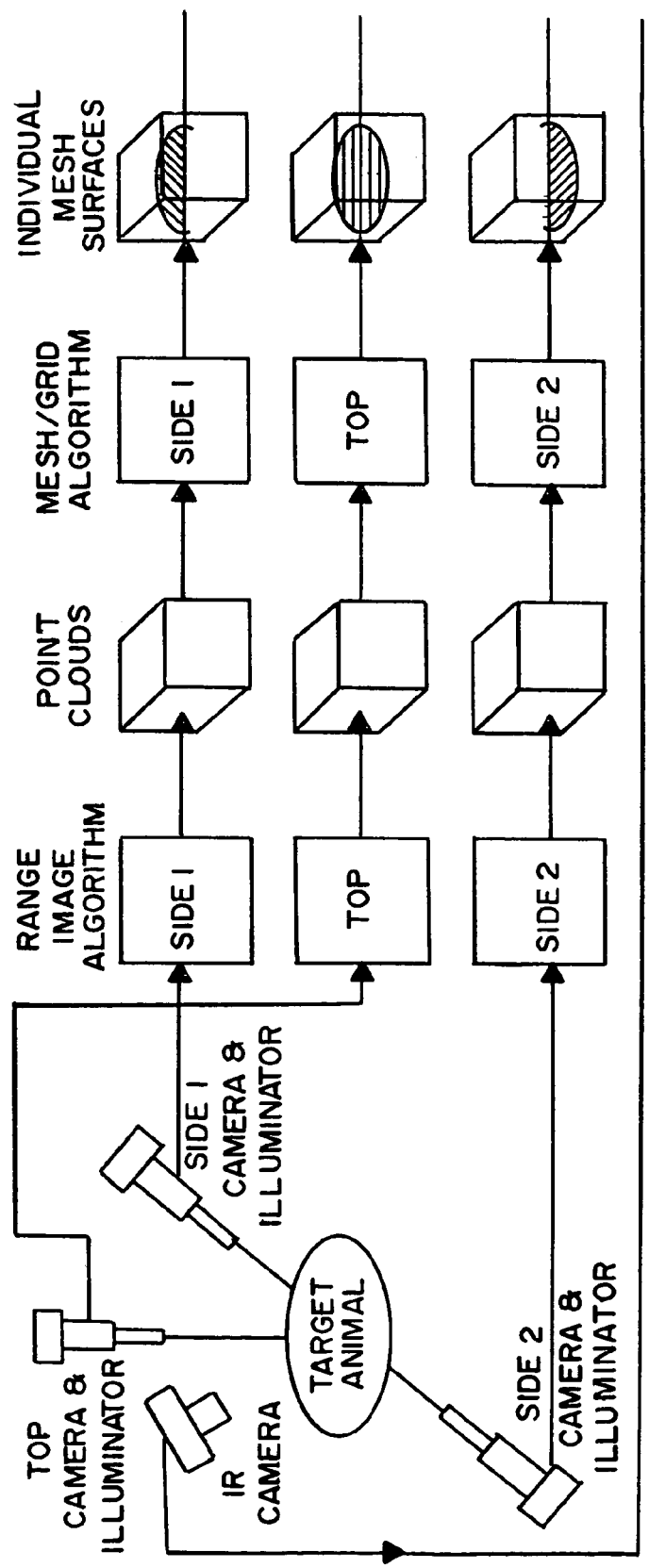
Figures 2, 3, 4, 5, 6, 7, 8, 9, 10, 11, 12, 13, 14, 15, 16, 17, 18, 18B:
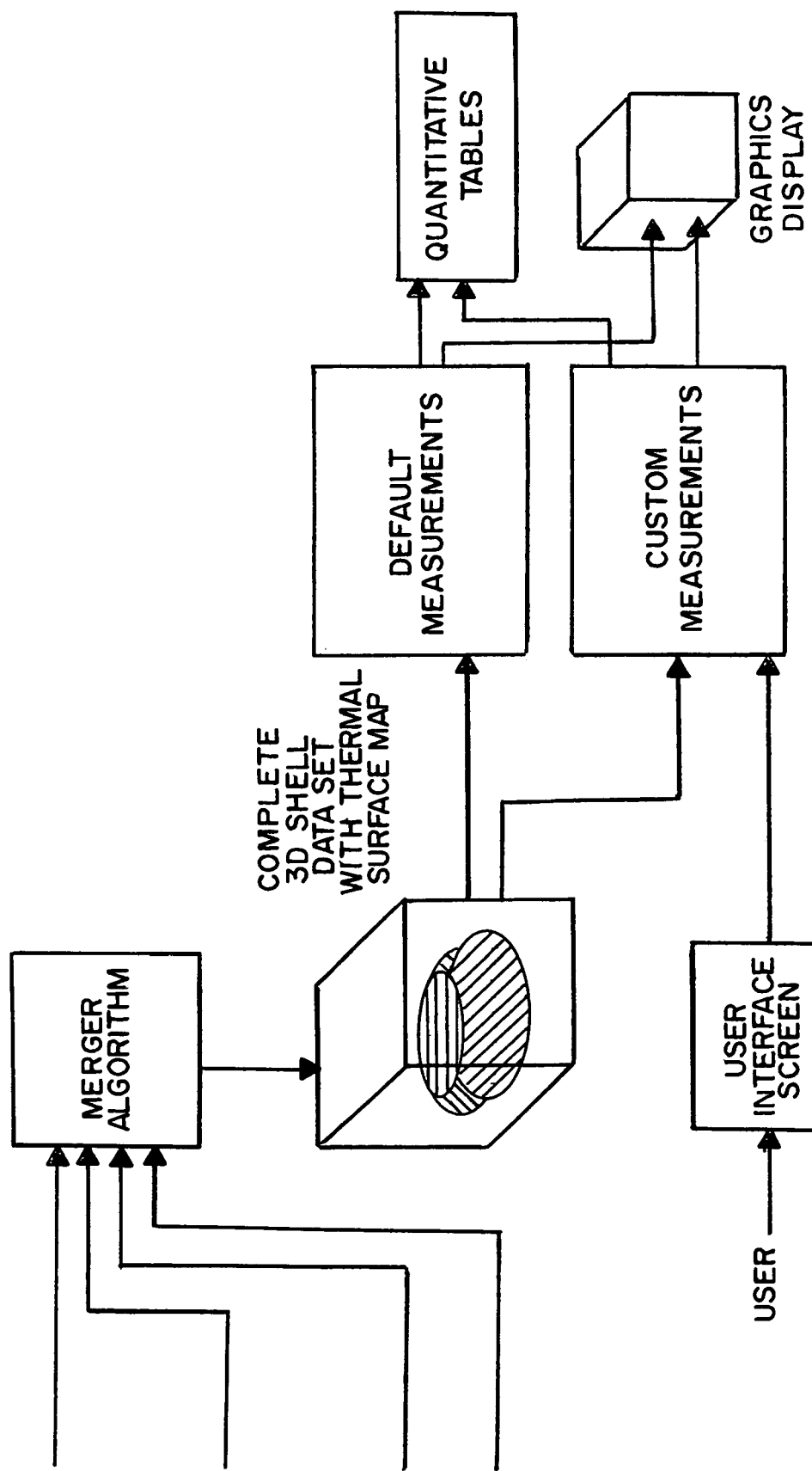
Figures 2, 3, 4, 5, 6, 7, 8, 9, 10, 11, 12, 13, 14, 15, 16, 17, 18, 19:
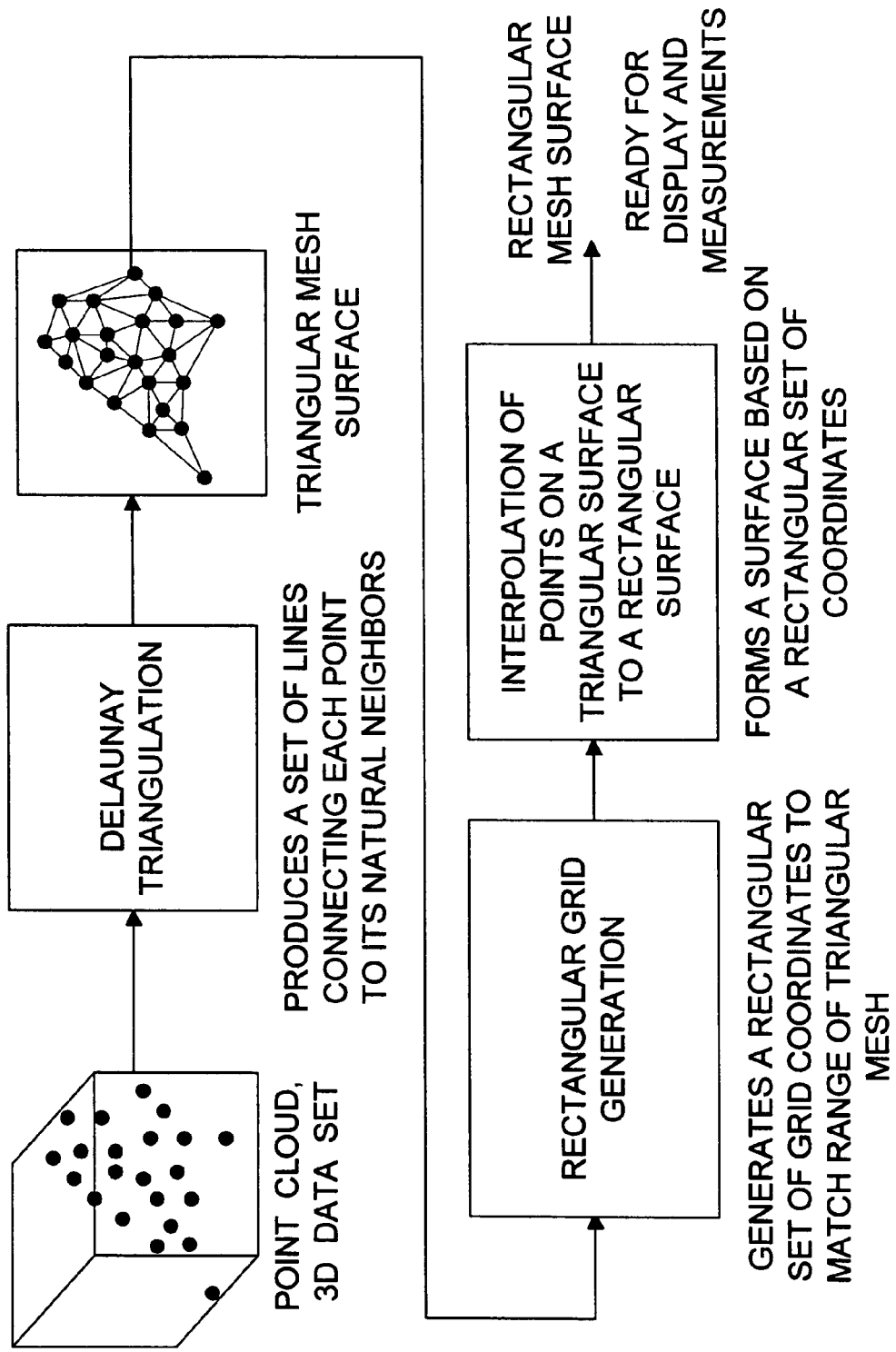
Figures 2, 3, 4, 5, 6, 7, 8, 9, 10, 11, 12, 13, 14, 15, 16, 17, 18, 19, 20, 20A:
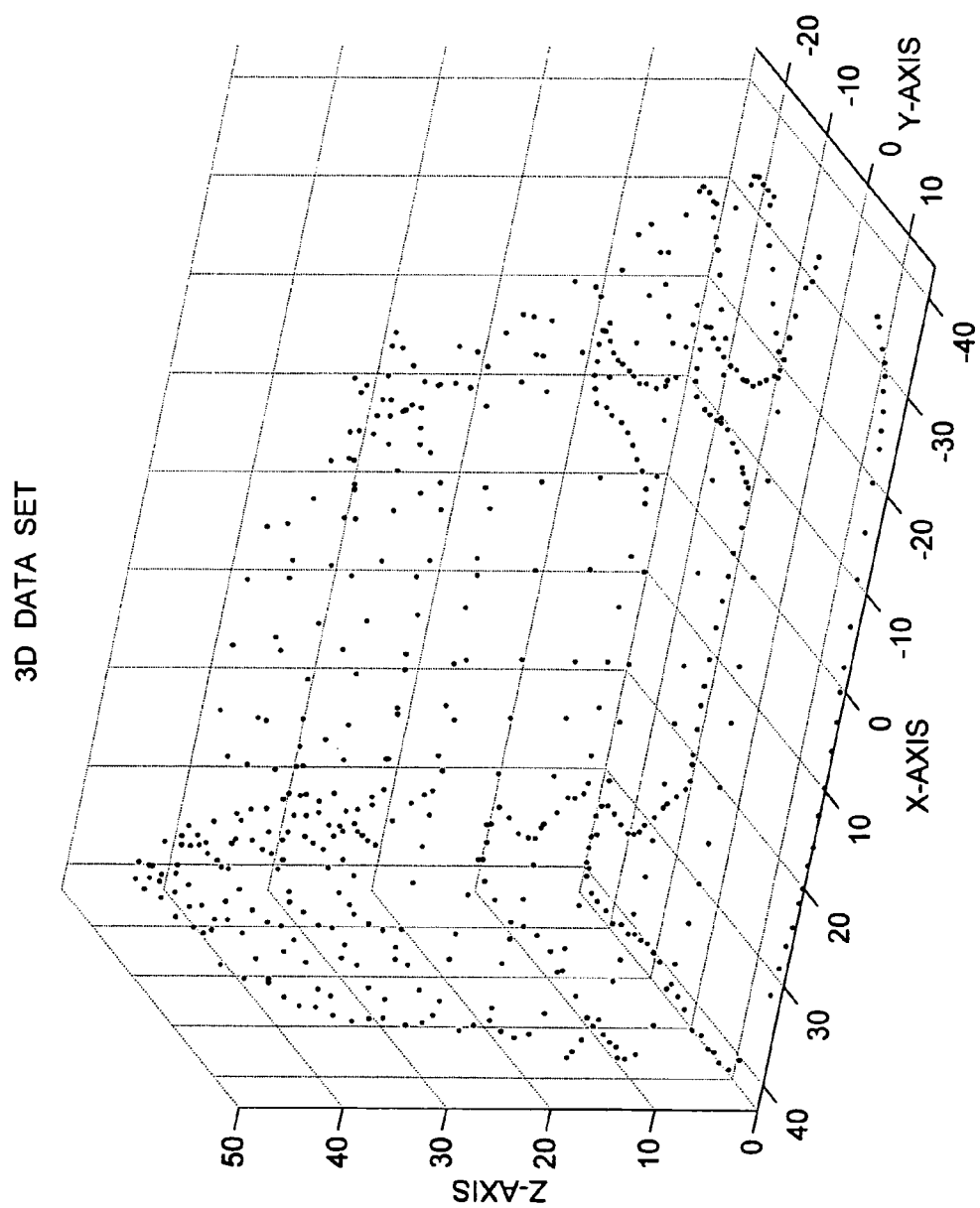
Figures 2, 3, 4, 5, 6, 7, 8, 9, 10, 11, 12, 13, 14, 15, 16, 17, 18, 19, 20, 20B:
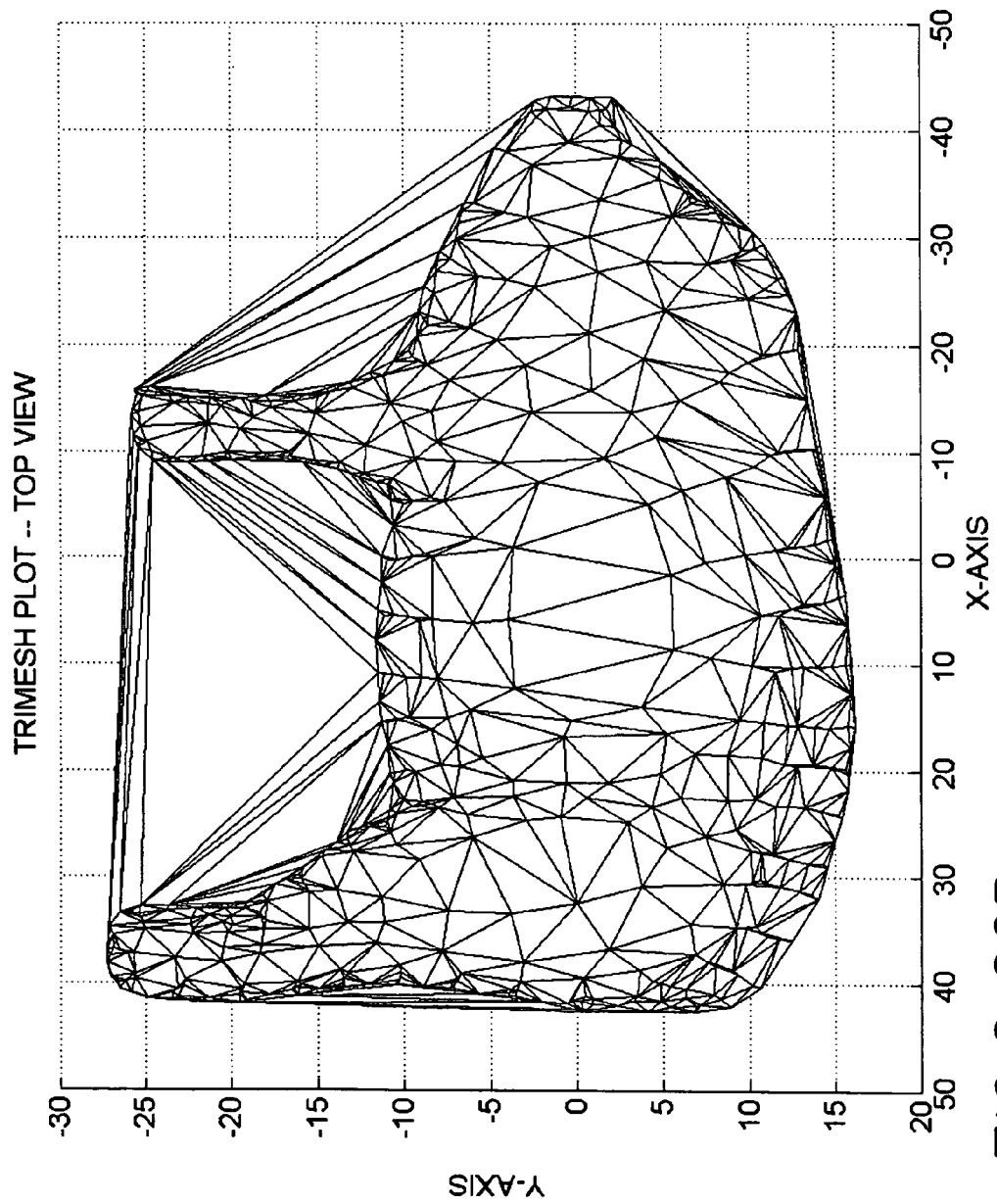
Figures 2, 3, 4, 5, 6, 7, 8, 9, 10, 11, 12, 13, 14, 15, 16, 17, 18, 19, 20, 20C:
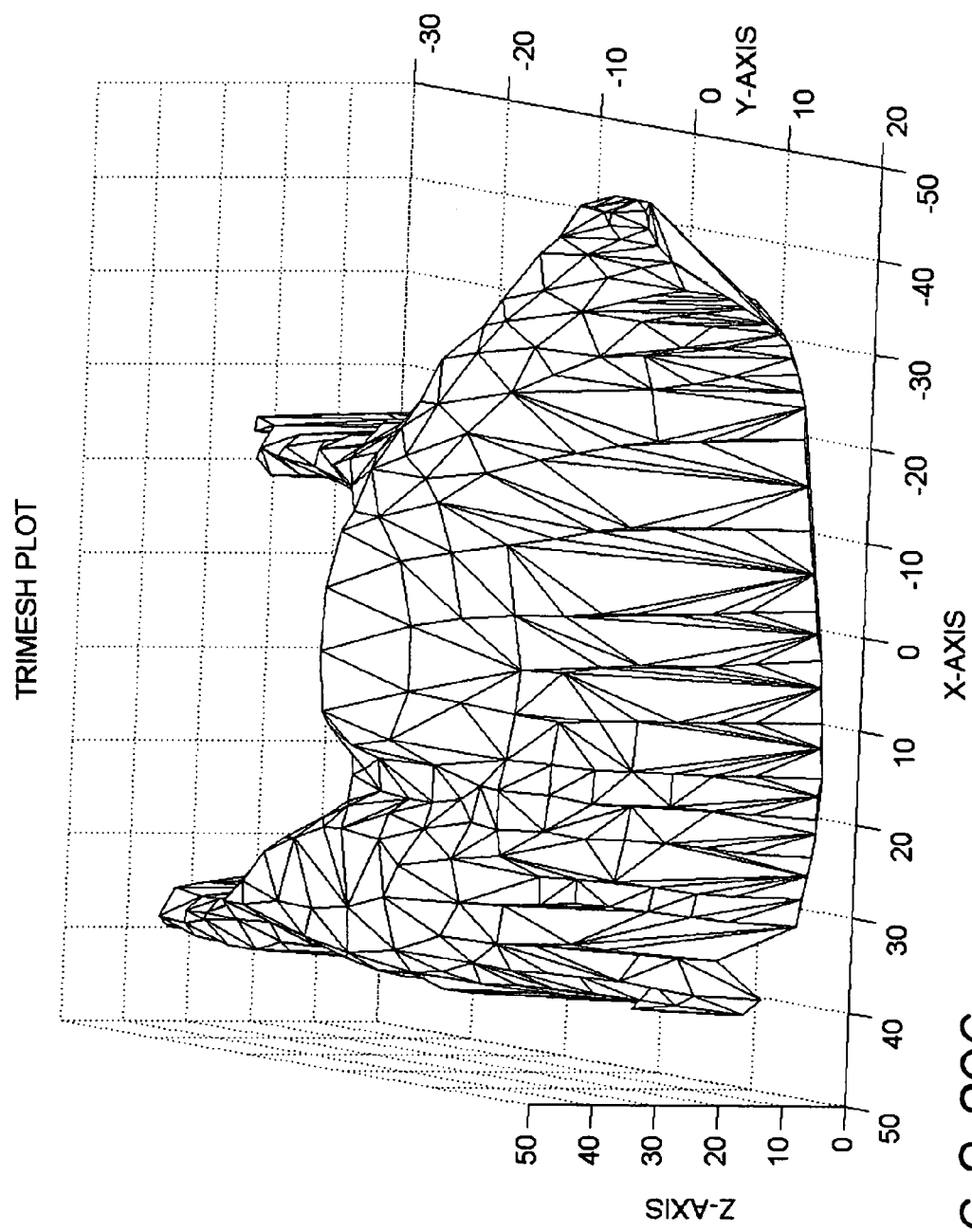
Figures 2, 3, 4, 5, 6, 7, 8, 9, 10, 11, 12, 13, 14, 15, 16, 17, 18, 19, 20, 20D:
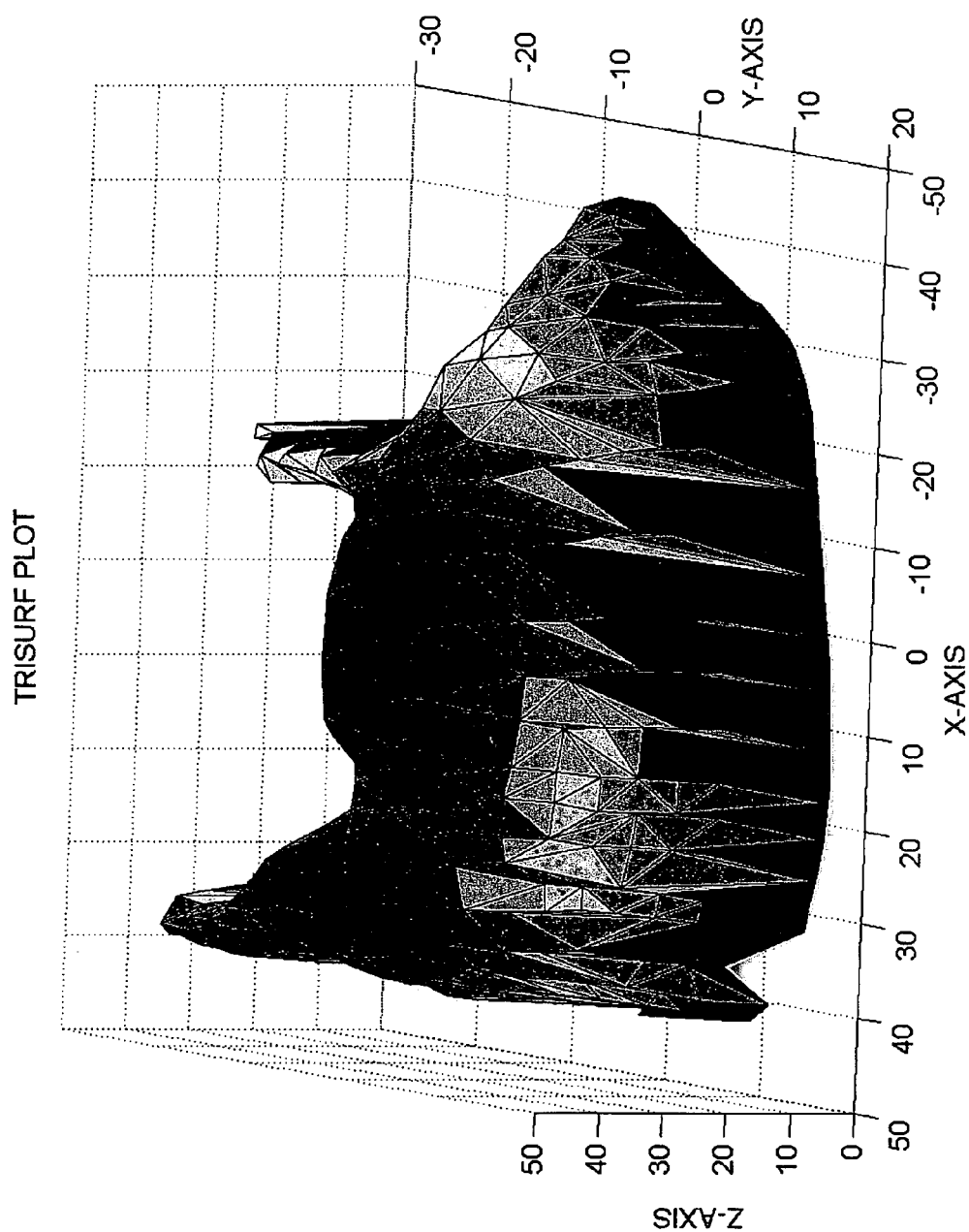
Figures 2, 3, 4, 5, 6, 7, 8, 9, 10, 11, 12, 13, 14, 15, 16, 17, 18, 19, 20, 20E:
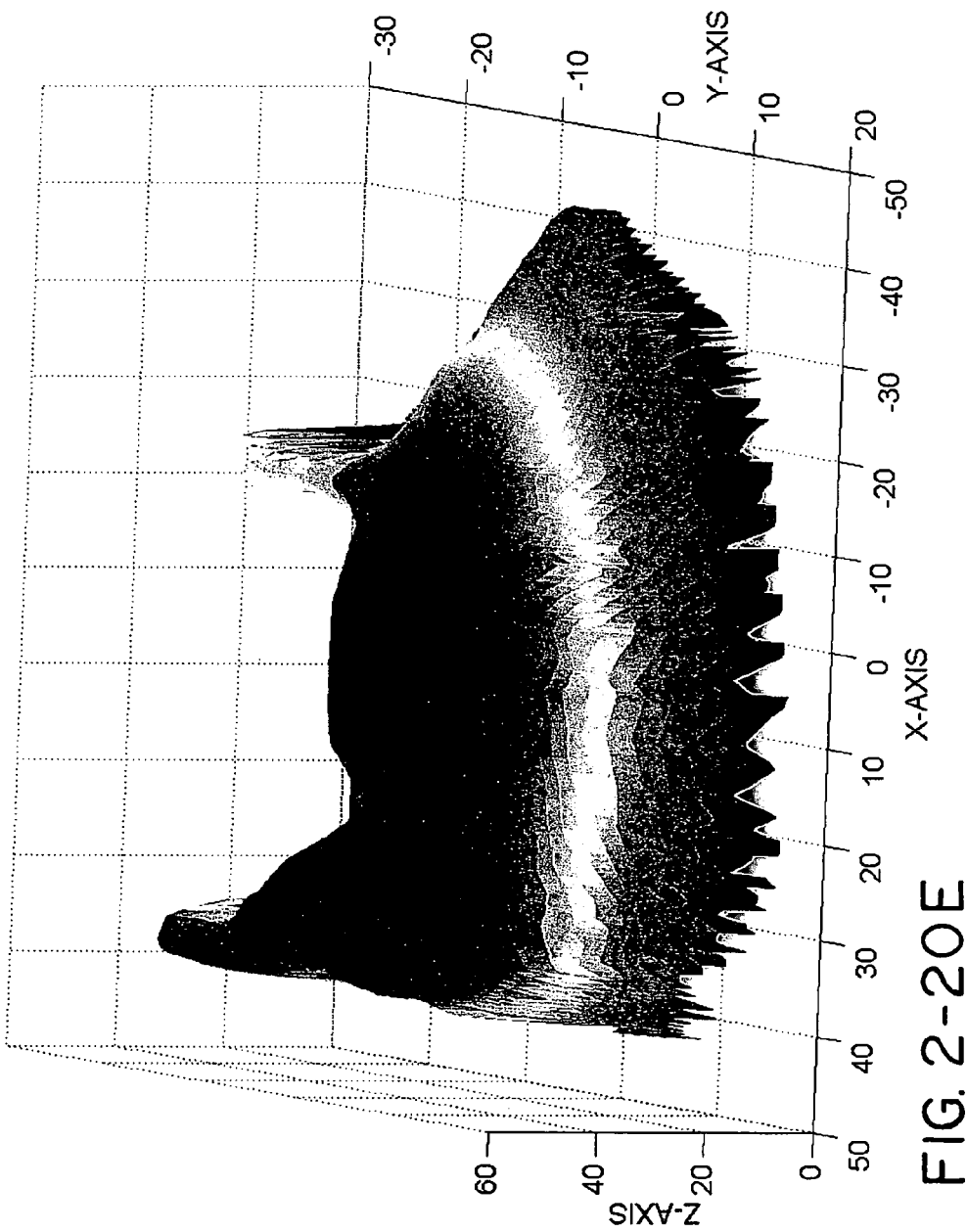
Figures 2, 3, 4, 5, 6, 7, 8, 9, 10, 11, 12, 13, 14, 15, 16, 17, 18, 19, 20, 20F:
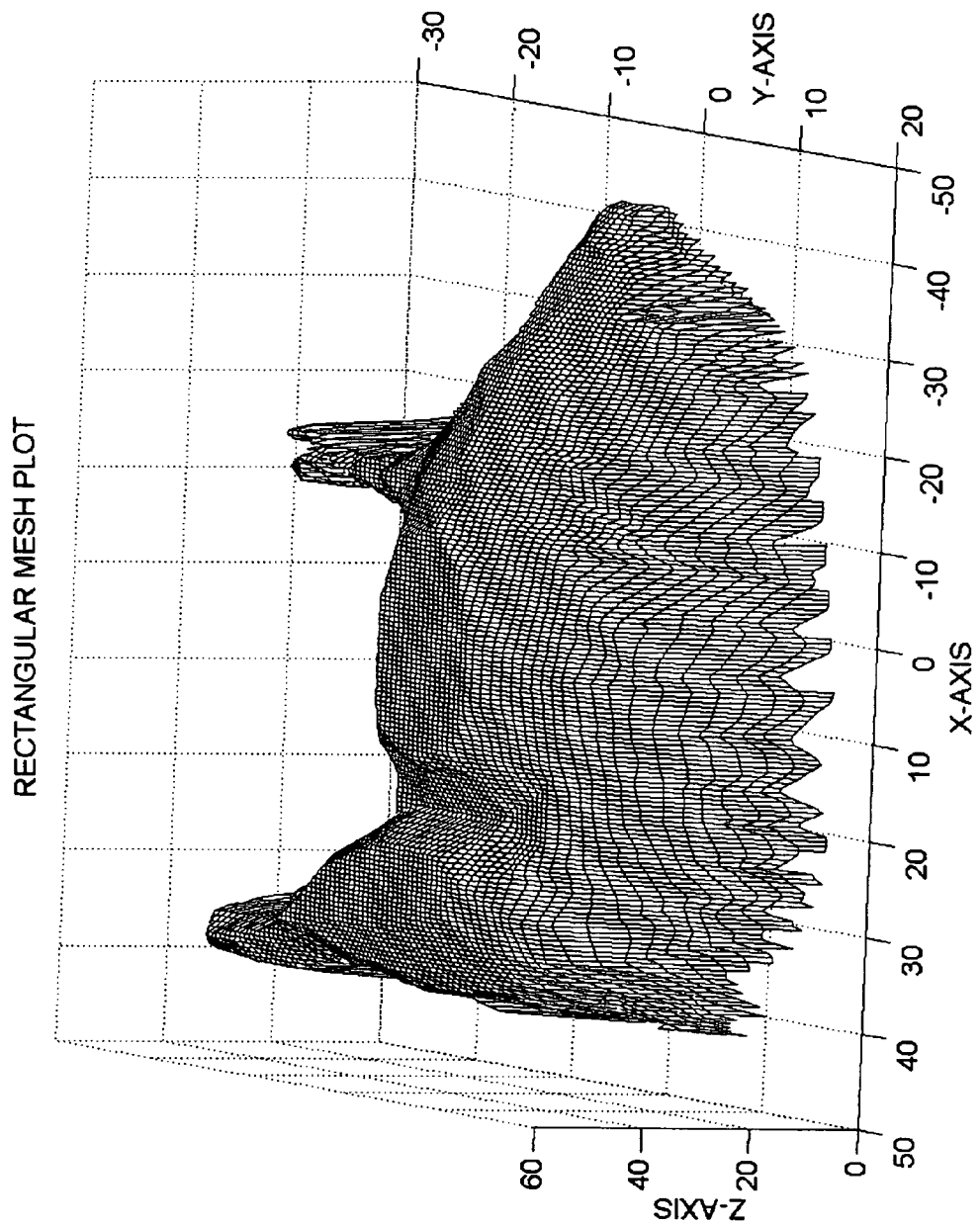
Figures 2, 3, 4, 5, 6, 7, 8, 9, 10, 11, 12, 13, 14, 15, 16, 17, 18, 19, 20, 20G:
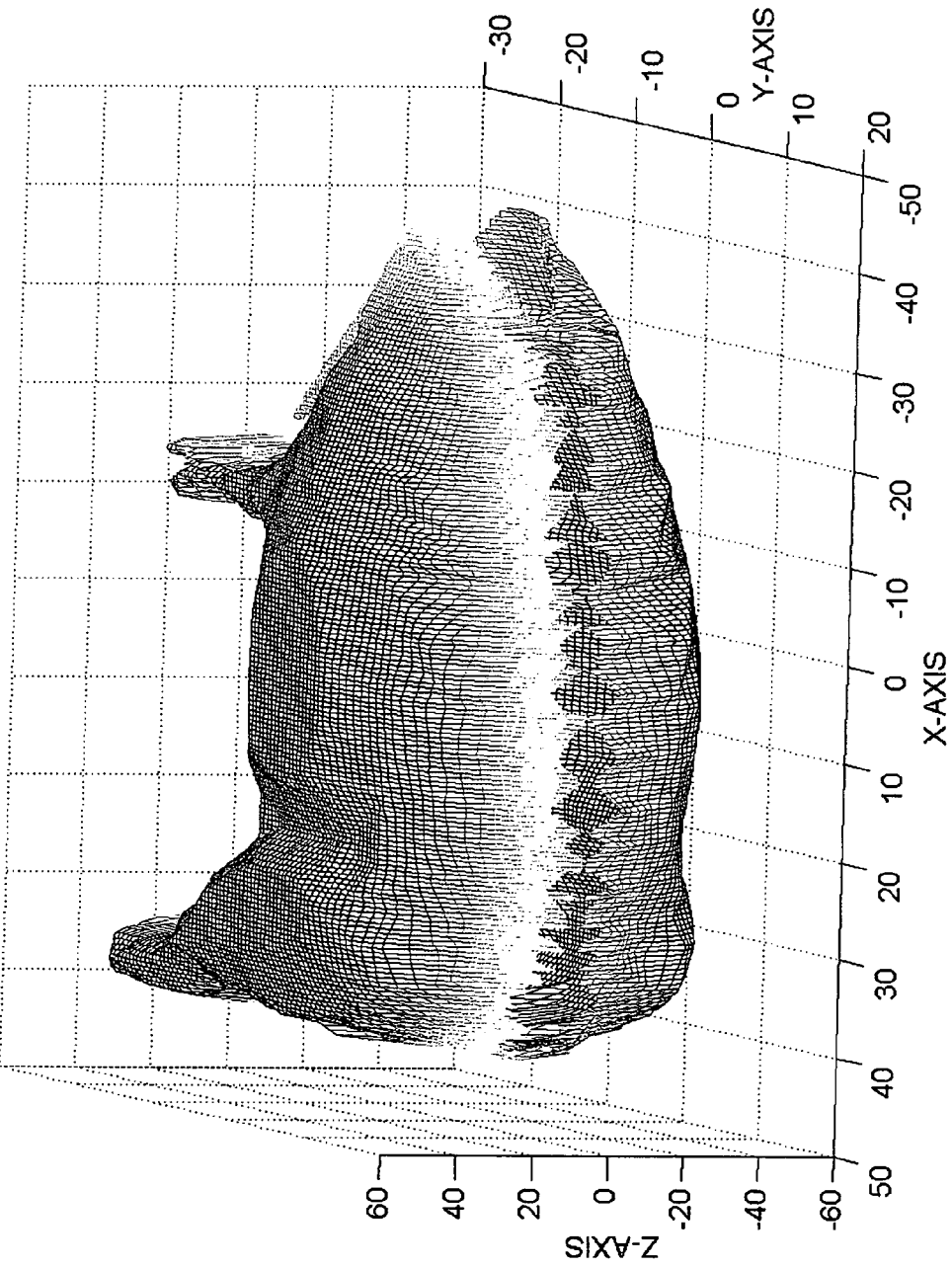
Figures 2, 3, 4, 5, 6, 7, 8, 9, 10, 11, 12, 13, 14, 15, 16, 17, 18, 19, 20, 21:
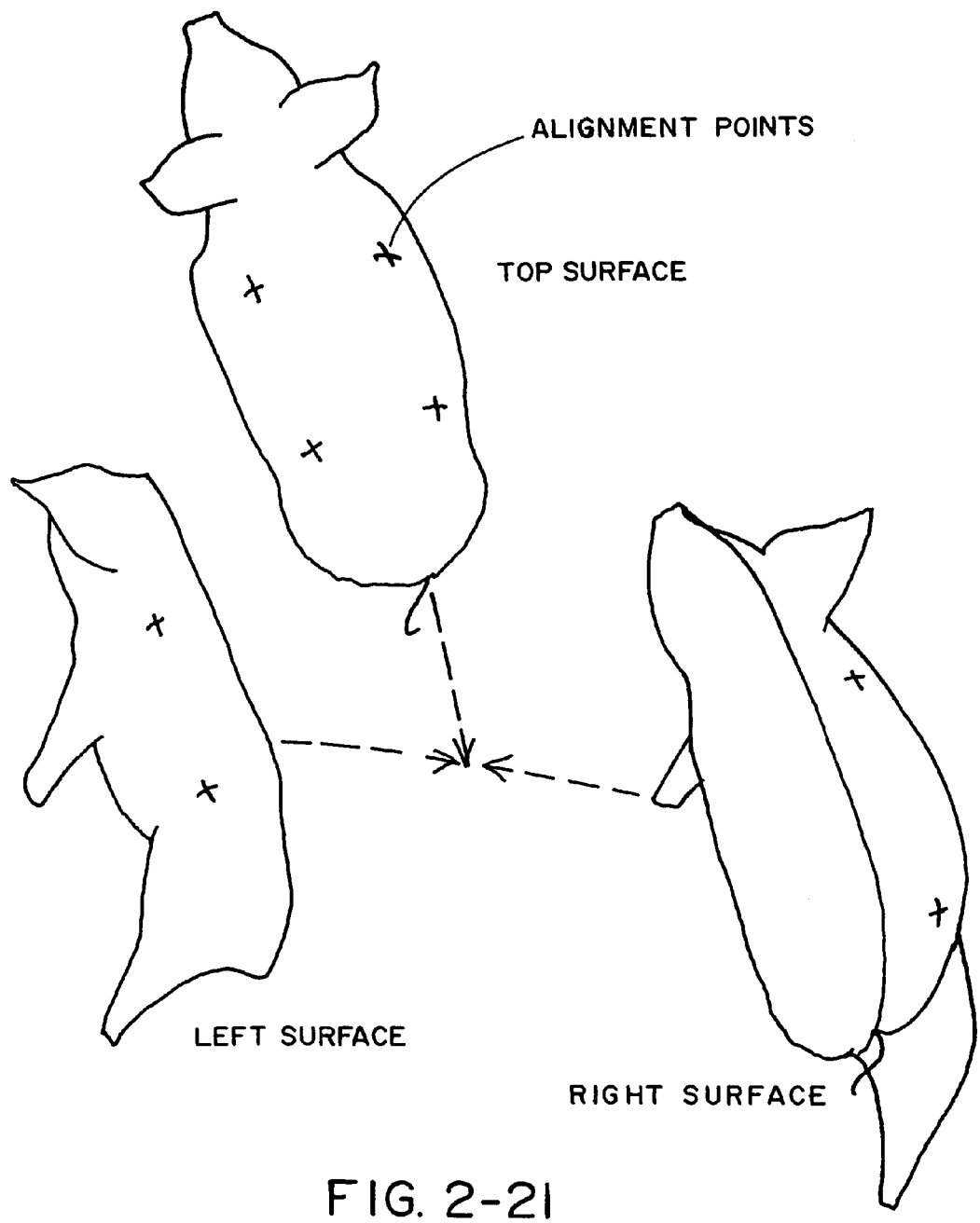
Figures 2, 3, 4, 5, 6, 7, 8, 9, 10, 11, 12, 13, 14, 15, 16, 17, 18, 19, 20, 21, 22:
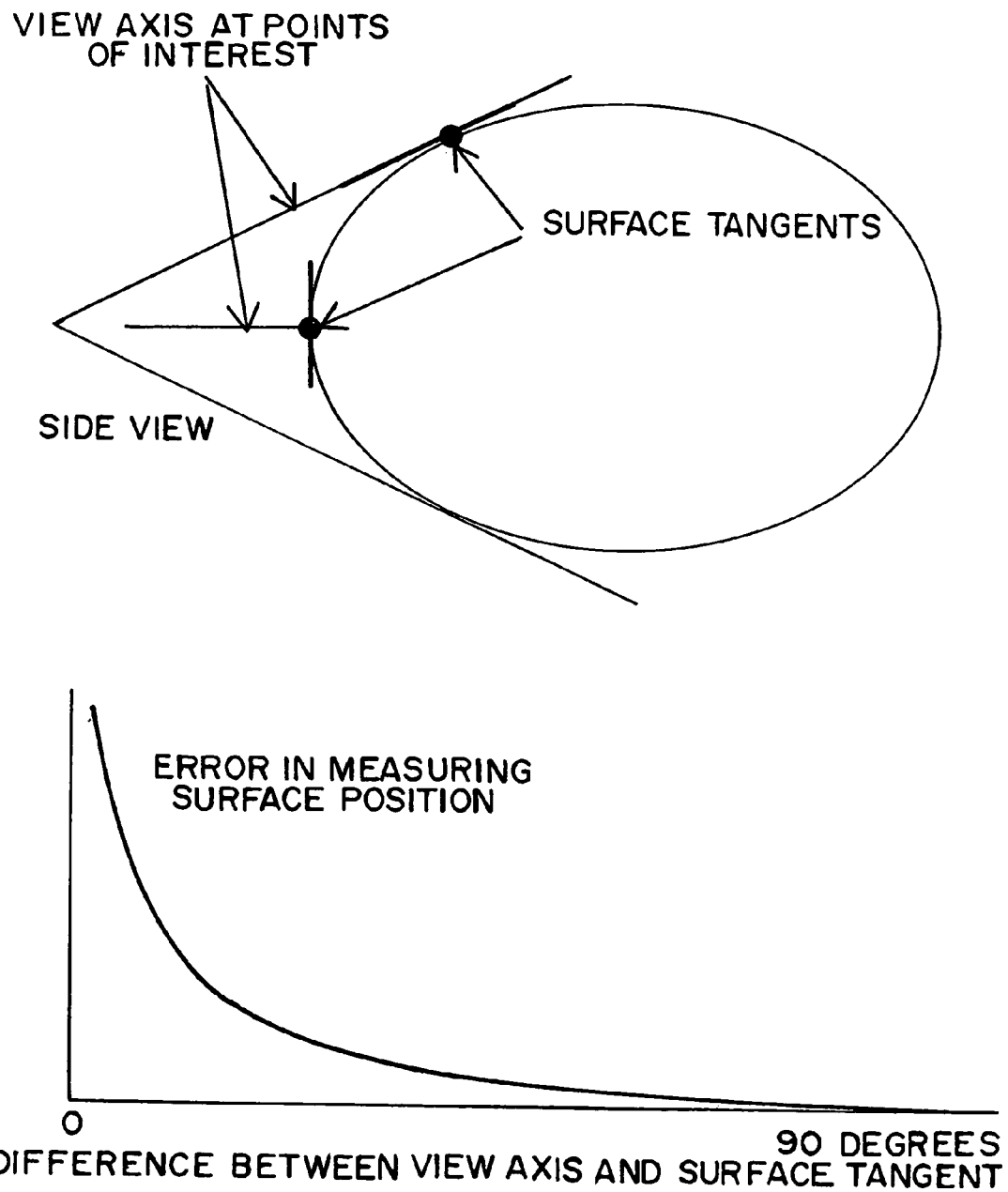
Figures 2, 3, 4, 5, 6, 7, 8, 9, 10, 11, 12, 13, 14, 15, 16, 17, 18, 19, 20, 21, 22, 23:
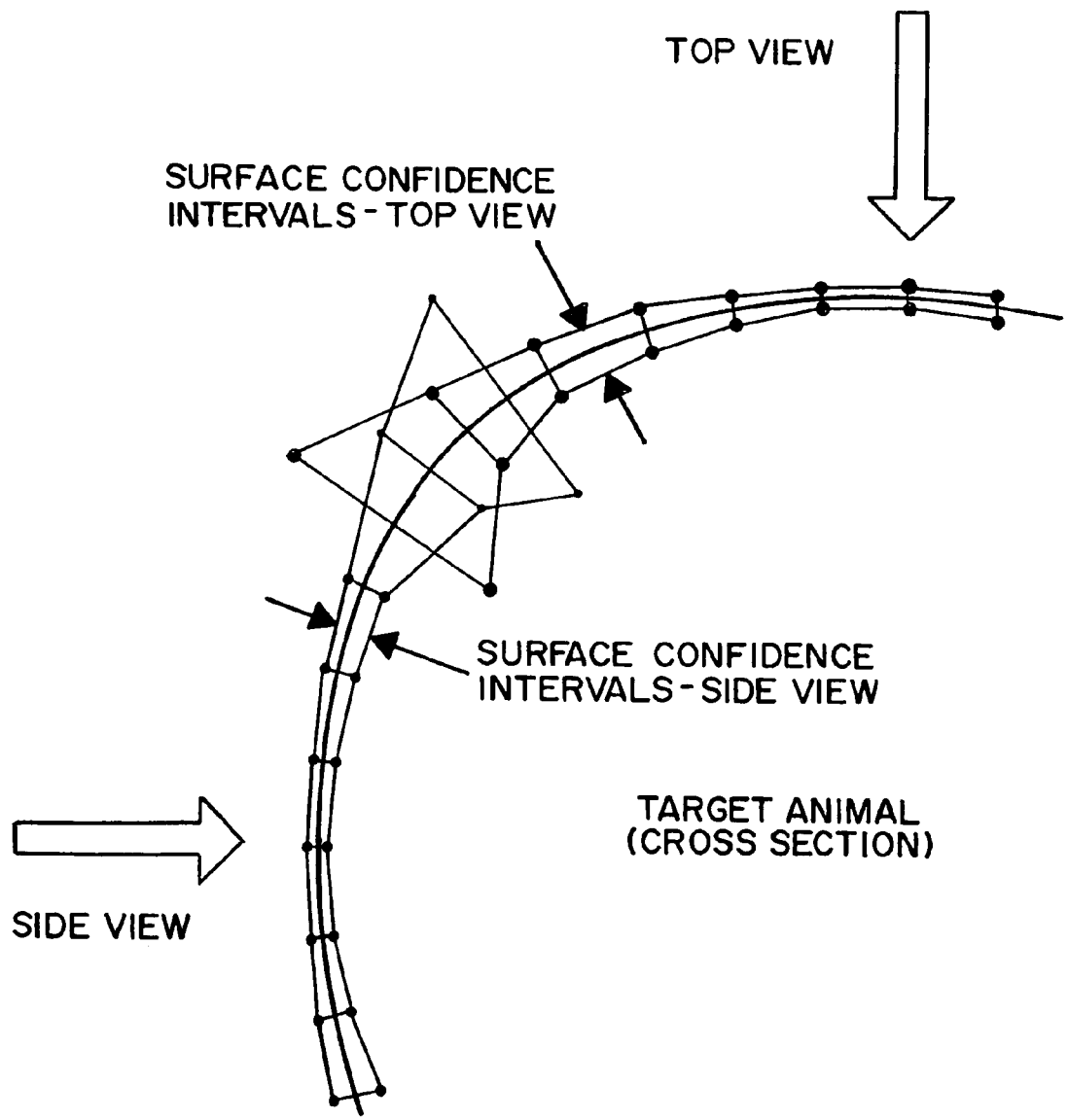
Figures 2, 3, 4, 5, 6, 7, 8, 9, 10, 11, 12, 13, 14, 15, 16, 17, 18, 19, 20, 21, 22, 23, 24, 24A:
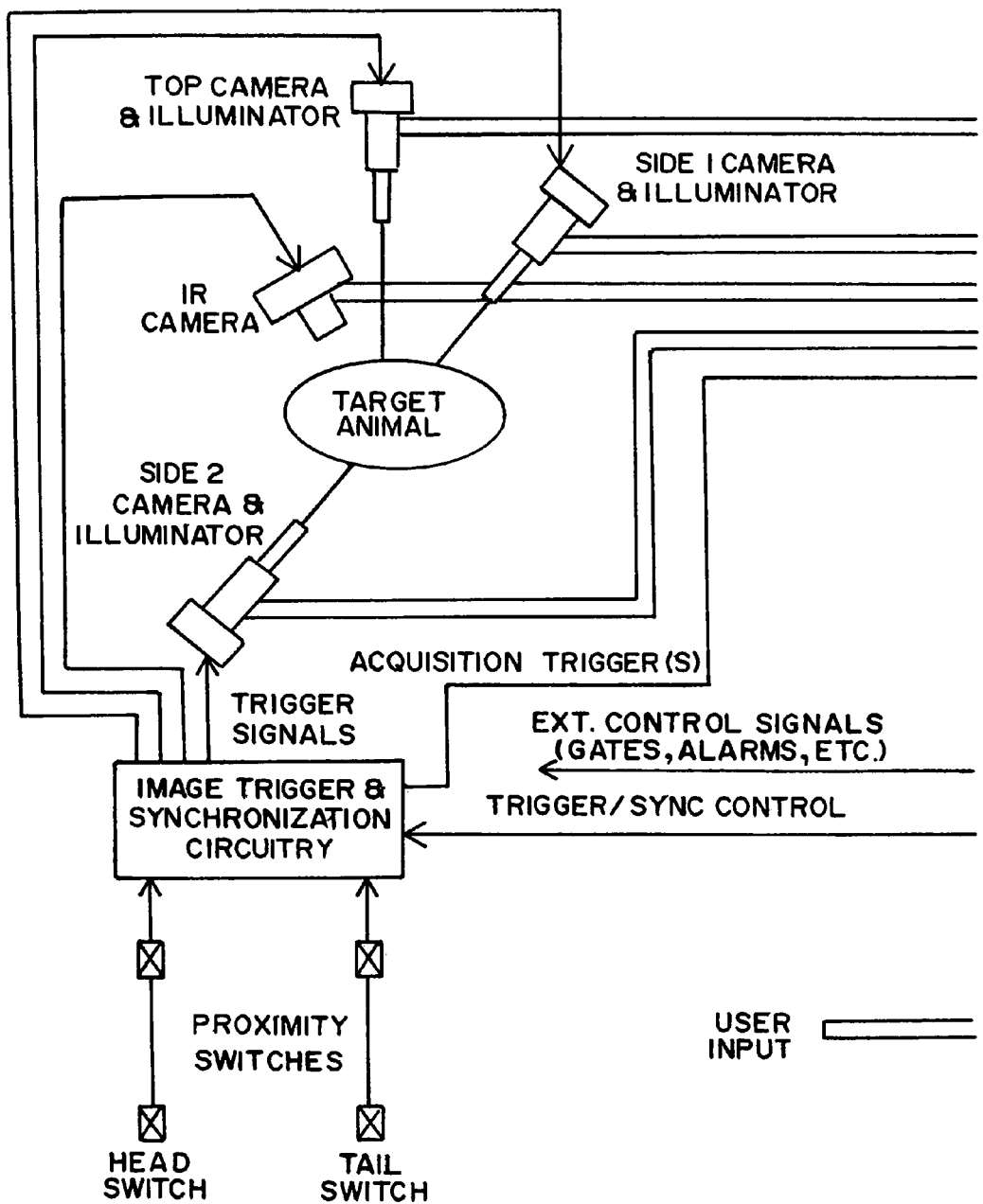
Figures 2, 3, 4, 5, 6, 7, 8, 9, 10, 11, 12, 13, 14, 15, 16, 17, 18, 19, 20, 21, 22, 23, 24, 24B:
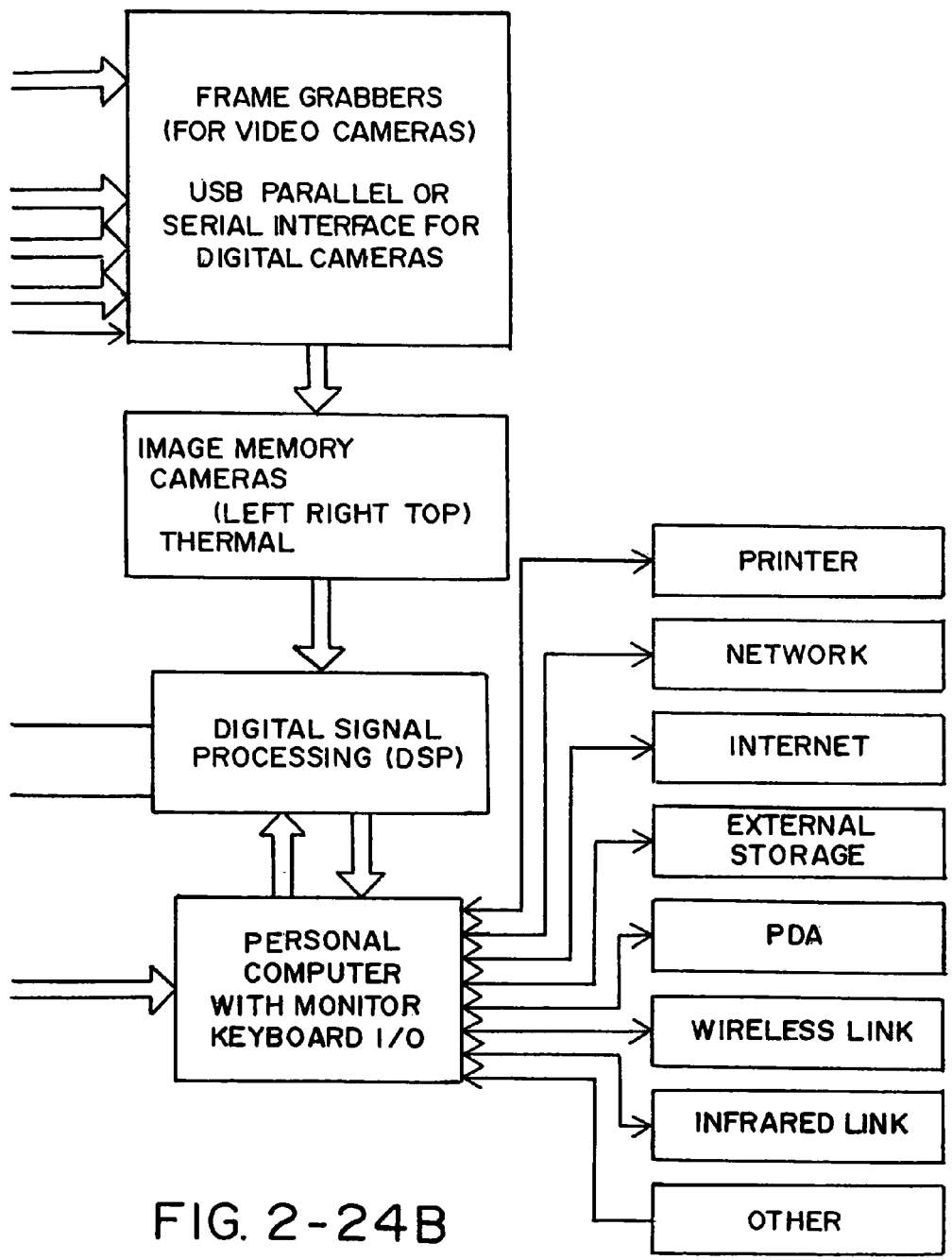
Figures 2, 3, 4, 5, 6, 7, 8, 9, 10, 11, 12, 13, 14, 15, 16, 17, 18, 19, 20, 21, 22, 23, 24, 25:
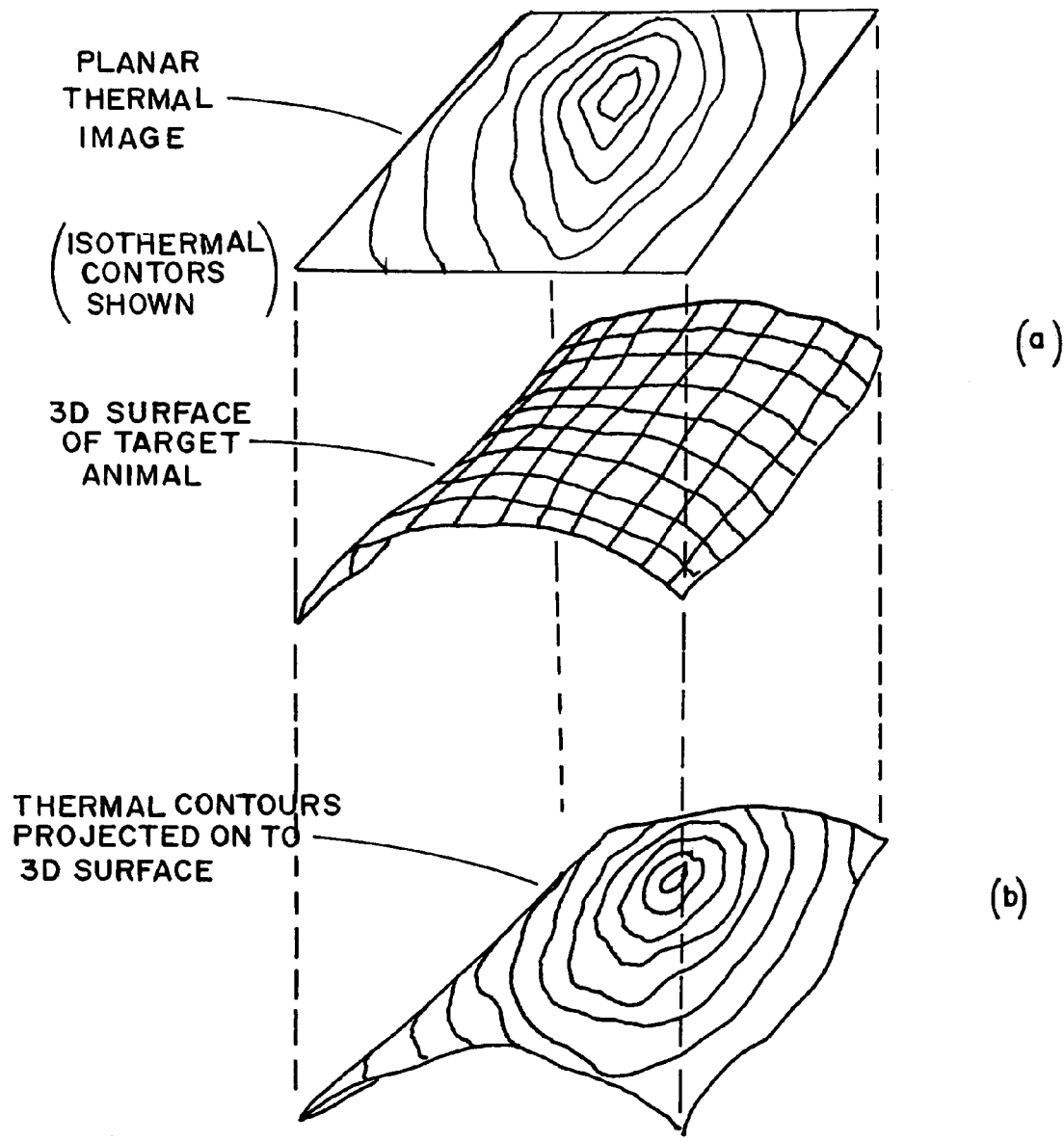

The merging of two mesh surfaces is simulated in previously identified FIG. 2-20G (MATLAB FIG. 7). In the region of the surface interface, resembling a zipper, an average or weighted average of the two surfaces should be used. While only two surfaces are shown to make up the entire pig in FIG. 2-20G, the camera configurations shown herein result in three surfaces, two sides and a top, to maximize surface accuracy and avoid the surface uncertainty evident near the zipper regions shown in previously identified FIG. 2-20G.

The merging strategies as previously discussed, and as shown in FIGS. 2-21, 2-22 and 2-23, apply to the present embodiment.

Processing this data, including graphing the seven Figures, takes approximately 3.5 seconds with a 500 MHz, Pentium III personal computer. Using later model computers that are presently available, (i.e. 2.4 GHz, Pentium IV) this processing and display time is likely to drop under 400 ms. A product implementation of this algorithm (including edge merging and measurement data) would be implemented via digital signal processing components that may operate at speeds of 600-1350 Mflops. Since the faster PC discussed above is probably operating in the range of 2-10 Mflops, a DSP implementation would result in a very substantial increase in processing speed. Such an implementation would fall within the realm of video rates (assuming the number of images required by the range camera is not prohibitive).

Volumetric processing was not selected for this embodiment due to the increase in data volume and the limited memory and processing power presently available.

3.4 Thermal Imaging Techniques

IR Camera Technology

As previously described herein, a radiometric infrared camera is advantageous for an embodiment of this invention since it is capable of providing a pixel-by-pixel measurement of surface temperature. One IR camera which provides a quality thermal image is the IR Snapshot® camera developed and manufactured by Infrared Solutions, Inc. using Honeywell thermoelectric sensor technology. This camera employs a low-cost, uncooled, scanned linear array of thermoelectric thermal sensors. It provides a thermal image which is 120× 120 pixels based on radiated IR in the 8 to 12 μm spectral band. Each pixel has 12 bits of useable resolution. The accuracy is specified at ∀2E C or 2% of the reading. While providing a reasonable-quality image, the old acquisition speed of 1.5 seconds is much slower than desired. Shortly to become available, the next generation of IR cameras, operating at a video rate, will be much preferred.

Mapping the Thermal Image to the Volumetric Surface

FIG. 3-13 shows the concept of projecting or warping the 2D thermal image onto the 3D surface of the target animal. FIG. 3-13a shows the planar thermal image suspended over the 3D target surface. FIG. 3-13b shows the same thermal data projected onto the 3D surface. Both thermal images are shown in isothermal contours.

3.5 Measurements

Volumetric and Dimensional Measurements Calculated Directly from 3D Data

Numerous measurements may be made from the three-dimensional data set generated by this invention. Table 3-4 shows the appropriate formulas used to compute some sample measurements. The actual calculations may be made on either the digital signal processing unit or the personal computer. Either device has the computing power for these tasks.

TABLE 3-4

Measurement Calculations from 3D Data

| MEASUREMENT | EQUATION or PROCESS | EQUATION NUMBER |
|---|---|---|
| hip height | $H_{hip} = \max[\max(f_i(y))]$ i at position of hip | (2-4) |
| hip width | $W_{hip} = \max[y_{2i} - y_{1i}]$ i = C to D | (2-5) |
| shoulder height | $H_{hip} = \max[\max(f_i(y))]$ i at position of shoulder | (2-4) |
| shoulder width | $W_{shoulder} = \max[y_{2i} - y_{1i}]$ i = E to F | (2-6) |
| weight | measure target animal on scales | |
| cross-sectional area (any slice) | $A_i = \int_{y_1}^{y_2} f(y)\,dy - \int_{y_1}^{y_2} g(y)\,dy$ | (2-1) |
| circumference at a plane | $C_A = s_{g(y)} + s_{g(y)}$ | (2-10) |
| hide surface area | $SA_{AB} = \sum_{j=1}^{p-1} \Delta x\ C_j$ | (2-11) |
| volume (A to B) | $V_{AB} = \sum_{i=1}^{n} \Delta x\ A_i$ | (2-2) |
| overall length | $L_{overall} = \sqrt{(x_{head} - x_{tail})^2 + (y_{head} - y_{tail})^2 + (z_{head} - z_{tail})^2}$ | (2-12) |
| profile or silhouette | project the 3D data set onto a plane oriented at any desired angle and throw out all but the outline data; a black silhouette may be obtained by determining if points are within or without the outline and assigning a uniform black color accordingly | |

Measurements Calculated from Scaled Model Characteristics

As previously discussed in Section 2.11, data from external databases may be scaled and applied to data from this invention. The large number of measurements conveniently available with this invention enables the user to easily tie into additional databases and scale that data to the livestock at hand.

One scaling application makes use of existing volumetric data such as a magnetic resonance image (MRI) of a cow or hog. Such an MRI image contains the position and size of all internal organs, muscles and bones. Though the present animal may differ from the reference MRI animal. Both have very accurate external dimensions. The computation of a scaling factor based on external dimensions enables the entire MRI dataset to be scaled to match the present animal. Veterinarians, breeders and researchers then have an accurate 3D model of the present animal. This same scaling may be used by slaughterhouses to accurately estimate production yields based on MRI models or proportions obtained from full dissections of previous carcasses. If minor external variations exist between the model and the present animal, software may be used to slightly warp or distort the localized region of the model to fit the present animal, thus providing additional insight into variations in muscle mass or skeletal structures.

Numeric databases may also be mined for valuable data which is not readily apparent from an external inspection of an animal. Data obtained from expensive research studies having both external measurements and dissected results may be valuable in the determination of such parameters as lean/fat ratio, cardiac output, or stroke volume.

Measurements as Functions of other Measurements

As researchers or others use the present invention it is likely that numerous correlations will become evident between external dimensions and other factors of interest. When any measurement is found to be highly correlated or in any way a function of an external measurement which can be acquired by the present invention, then that measurement may be tracked by the present invention via the functional definition and the external measurements. As earlier discussed, the functional relationship between measurements may be linear, quadratic, cubic, multivariate, or any of a number of different mathematical forms.

In functional relationships between measurements it is worthy to remember the power relationship between linear dimensions, areas and volumes. Equation 3-1 illustrates this observation:

$$L_1 \propto k_{1_1} M_1; A_1 \propto k_{1_1}^2 M_1; V_1 \propto k_1^3 M_1; \quad (3-1)$$

where $M_1$ is a linear measurement; $L_1$ is a length; $k_1$ is the linear scalar between $M_1$ and $L_1$; $A_1$ is an area; and $V_1$ is a volume.

3.6 Analysis of Measurement Data

Histograms, Averages and Distributions

Previously identified FIG. 2-32 illustrates the power of a statistical analysis of the data gathered via the present invention. In this Figure, statistics of two groups of 300 animals each are simulated for hip height, weight and backfat thickness. The mean values of these parameters are lower for Group 1 in all categories. From an inspection of the histograms, the scatter or standard deviation (Gaussian distribution) is wider for Group 2. Limits may be set near the extremes of each measurement to identify outliers that may require special attention.

Cluster Analyses

Cluster analyses are another way to statistically evaluate groups of livestock data obtained with the present invention. FIG. 2-33 illustrates a cluster plot of the same data from FIG. 2-32. In FIG. 2-33 the data are presented as a point cloud in a three-measurement space. The 3D boxes indicate the acceptable limits for each measurement. The '300 day path' indicates that the data are for two different groups at different stages of their stay in a feedlot.

Other Statistical Analyses

The above statistical analyses are not, by any means, meant to be a complete treatment of the statistical analyses possible for the many measurements available from the present invention. A somewhat expanded list might also include the following: arithmetic mean, median, mode, frequency distributions, weighted arithmetic means, class limits and boundaries, measurements of skewness, geometric and harmonic means, average and quartile deviations, confidence interval analyses, trend analyses, probability analyses, proportional analyses, decision model analyses, Chi-squared tests, variance analyses, time-series trend analyses, least-squares analyses, curve fitting, seasonal variation analyses, periodic fluctuations, time series analyses and modeling, regression and correlation analyses, and multi-regression analyses. Even this larger list cannot be all inclusive for those skilled in the art.

Favored Path Concept

Previously identified FIG. 2-34 shows the favored path concept using hip height as the indicator of size. Such a graph might be the result of an animal's growth during its stay at a feedlot. The favored path line (dotted), perhaps established by a record animal in the past, serves as the template for efficient growth. Feed, medication, and breeding are all parameters that may be evaluated with this approach. When the favored path record is regularly exceeded, a new guideline may be chosen.

Previously identified FIG. 2-35a shows another implementation of the favored path concept in which weight is the indicator. In this graph, an entire group of animals is tracked with a histogram at each measuring time which indicates not only the mean weight of the group but also the spread or standard deviation. In this manner, an entire group may be evaluated against a growth template or favored path.

FIG. 2-35b shows a three-dimensional graph with three different measurements along the axes, namely, hip height, weight and volume. At several times during the feedlot stay the groups are measured and their progress plotted as shown in a three-dimensional measurement space. The line shown is the favored path established from past history; measurement limits are shown to evaluate the performance spread. This particular graph with weight, hip height and volume is likely to be sensitive to variations in lean/fat ratio as animals progress through the feedlot. An increase in animal fat would increase the volume and weight without proportionate changes in hip height (or other structural measurement), resulting in a deviation of the trajectory away from the favored path.

3.7 Application of Measurements to Livestock Evaluations

Breeding Evaluations

The statistical evaluations discussed herein are all useful for breeding evaluations. If a particular breeding combination excels at the feedlot or the slaughterhouse then it is viewed as successful and should be continued. If it is not successful in those two arenas then that particular combination is viewed with less pleasure and is less likely to be continued. While the previous, rather simplistic explanation is true in general, the specifics become very complex. The data collected by this invention are likely to become very valuable as genetic tracking becomes commonplace. The same computer algorithms that will track livestock genes will require physical measurements like those provided by this invention.

Feedlot Evaluations

The feedlot management as earlier described in Section 2.13, namely the advancement or retention of animals from specific feedlot groups is illustrated in greater detail in FIGS. 3-14a, b, and c. In each of these Figure parts three groups of animals are represented at various stages of the feedlot growth schedule. Table 3-5 compiles the specific progress of animals A, B, C, D, and F.

TABLE 3-5

Compilation of Feedlot Animal Progress depicted in FIG. 3-15.

| | | Animal: | | | | |
|---|---|---|---|---|---|---|
| | | A | B | C | D | F |
| Hip Height | Above Upper Threshold | + | + | | | |
| | Within Range | | | 0 | | |
| | Below Lower Threshold | | | | — | — |
| Hip Width | Above Upper Threshold | + | | | | |
| | Within Range | | | 0 | 0 | |
| | Below Lower Threshold | | | | 0 | — |
| Weight | Above Upper Threshold | + | | | | |
| | Within Range | | | 0 | 0 | 0 |
| | Below Lower Threshold | | | | | — |
| Recommendation: | | + | 0 | 0 | 0 | — |

In Table 3-5, the '+' indicates that the animal scored high enough to be advanced to the next higher group, the '0' indicates that the animal scored within the expected range and should be kept within its current group, and the '−' indicates that the animal scored below the expected range and should repeat the present level with the next lower group. As a result of the three measurements considered, A should be advanced, B, C, and D should be kept in their present group, and F should repeat the present level with the next lower group. While this example is illustrated with only three measurements, many more may be used in the true feedlot application. Additionally, while in this example each animal is given a '+', '0', or '−' grade, in the actual application the numerical value above or below the range would likely be included in the analysis and tabular output.

FIG. 3-15 shows the data of FIGS. 3-32 and 3-33 in a slightly expanded format with the three-dimensional data presentation broken down further into three, two-variable graphs. The 300-day path through the feedlot is shown as well.

Harvesting (Slaughterhouse) Evaluations

The accurate measurements provided by the present invention is advantageous to meat processors as well. A precise measurement of product dimensions enables fair and efficient trade between processors and suppliers. Additionally, precise measurements permit efficient processing and improved production planning.

3.8 Automated Grading

The measurements of this invention may be used to automate the grading of cattle and hogs. FIG. 3-16 is a chart showing U.S. Quality Grades of prime, choice, select, standard, and utility. From a simple visual comparison of prime and utility grades it is evident that measurements such as hip width, hip height, and volume can easily discriminate between the extremes of prime and utility grades. The measurements of this present invention make the discrimination between the other grades equally clear by comparing a set of measurements to an empirically determined set of standard grading measurements which are characteristic of each of the U.S. quality grades. One method for automating the grading of cattle and hogs uses n normalized measurements in a measurement space. The normalization of each measurement might be to its prime grade value. In this method, n measurements are used to classify each animal. Each grade has a nominal normalized measurement value for each of the n measurements. This results in a point for each grade in n-measurement space. The set of measurements for an unknown animal give it a point in the same measurement space. Using this method, the automated grading amounts to simply finding the grade point which lies closest to the unknown animal point.

In a one measurement analogy, grades of A, B, C, D and F might be assigned to a student's test scores with nominal values of A=95, B=85, C=75, D=65, and F=55. A test score of 83 falls closest to the B value of 85, therefore a B is assigned. Likewise, a test score of 91 falls closest to the A value of 95 resulting in an A assignment. Rounding rules may be established for any score falling exactly on a midpoint between two grades.

FIG. 3-17 illustrates this method using two measurements, $M_1$ and $M_2$. Animal, X, has measurements between choice and prime. Distance calculations yield:

$$d_{x-\text{prime}} = \sqrt{(M_{1X} - M_{1\text{prime}})^2 + (M_{2X} - M_{2\text{prime}})^2} \; ; \quad (3\text{-}2)$$

$$d_{x-\text{choice}} = \sqrt{(M_{1X} - M_{1\text{choice}})^2 + (M_{2X} - M_{2\text{choice}})^2} \; ; \quad (3\text{-}3)$$

where $M_{1X}$ is the normalized measurement, $M_1$, for animal, X; $M_{1prime}$ is the normalized measurement, $M_1$, for prime grade; $M_2X$ is the normalized measurement, $M_2$, for animal, X; $M_{2prime}$ is the normalized measurement, $M_2$, for prime grade; $d_{x-prime}$ is the distance from the X position to the prime position in the graph of FIG. 3-26; and $d_{x-select}$ is the distance from the X position to the select position in the graph of FIG. 3-26.

If $d_{x-prime}$ is found to be less than $d_{x-choice}$, animal X would be given a prime grade. Animal Y, shown in FIG. 3-26 would be graded as select since the measurements of animal Y. [$M_{1Y}$, $M_{2Y}$], lie closest to the nominal select measurement point at [$M_{1select}$, $M_{2select}$].

Alternative embodiments may grade the measurements according to measurement ranges for each grade. Additionally, alternative embodiments may use weighted measurements values instead of normalized values.

FIG. 3-18 is a chart showing U.S. Yield Grades of 1, 2, 3, 4, and 5. From a visual comparison of Yield Grades 1 and 5, it is evident that measurements such as hip width, hip height, and volume can discriminate between these extreme grades. The measurements of this present invention make the discrimination between the other yield grades equally clear by comparing a set of measurements to an empirically determined set of standard grading measurements which are characteristic of each of the U.S. yield grades. The automated grading methods described above and in equations (3-2) and (3-3) may be applied to yield grades as well as quality grades.

FIG. 3-19 is a chart showing U.S. Thickness Grades of 1, 2, 3, and 4. Similar to the automated grading for quality and yield, the measurements of this invention may be used for thickness grading.

FIG. 3-20 is a chart showing U.S. Frame Size Grades of Large, Medium and Small. Similar to the automated grading for quality, yield, and thickness, the measurements of this invention may be used for frame size grading.

From the application of the present invention to automated grading for U.S. Quality, U.S. Yield, U.S. Thickness, and U.S. Frame Size, it is evident that the present invention and its measurements may be used to automate cattle and hog grading systems which exhibit characteristic physical measurements which differ from grade to grade.

This invention is applicable to animal grading systems issued by the United States, Canada, or any other legal entity in which there are physical measurements that can distinguish one grade level from another.

3.9 Predictive Grading via Multivariate Growth Charts

With the measurement capability and convenience of the present invention it is possible to not only grade cattle and hogs immediately prior to market, but to grade them throughout their entire growth cycle. Typical growth charts show age (in months) as the independent variable and either height or weight as the dependent variable. With the present invention, growth charts can be generated that include such measurements as hip height, hip width, volume, weight, shoulder height, shoulder width, length, hide area, and/or rib width. Such multivariate growth charts can culminate in the grading classifications as discussed herein. By tracking the growth of cattle and hogs via multivariate growth charts, feedlot efficiencies will be enhanced, breeding programs will be confirmed more rapidly, and meat processing facilities will be able to efficiently generate schedules with advanced knowledge of incoming grades and quantities.

3.10 Automated Production Segmentation Value

As previously discussed, this invention can provide scaling capability based upon the external measurements of the present invention and pre-existing models. FIG. 3-21 shows a pre-existing model in which the percentage of meat cuts are specified and the approximate source of each cut is indicated. With the present invention, exact measurements may be made of each region, enabling a precise estimation of the quality and quantity of cuts available from a given animal. FIG. 3-22 shows additional specifications for meat cuts from a cow or bull carcass. FIG. 3-23 shows similar segmentation of the swine carcass. FIG. 3-24 indicates segmentation of the cattle carcass while FIG. 3-25 is indicative of swine.

When the measurements of this invention are obtained periodically throughout the growth cycle of cattle or hogs, a number of efficiencies become available to the meat processor and supplier. With frequent data sampling, multivariate growth charts enable tracking of feedlot progress and accurate projections of quantities, grades and market dates. Such automated management allows a meat processor to closely link sales quantities and prices to purchase quantities and prices, thus reducing risk and providing competitive advantages over competing meat processors. The supplier also benefits since herds with specific characteristics may be scheduled when market prices are more favorable for those specific qualities. The predictive modeling and projections enable some schedule variations at the feedlot level to optimize the time to market.

4.0 Alternate Embodiments of the Invention 4.1 Introduction

Referring to the drawings and particularly to FIGS. 4-1 through 4-7, an alternate form of the apparatus of the invention for the three-dimensional anatomical valuation of cattle is there shown. Before discussing the alternate form of the apparatus of the invention shown in FIGS. 4-1 through 4-7, a brief discussion of the thrust of this alternate form of the invention would perhaps be helpful. As in the earlier described embodiments of the invention, this alternate form of the invention accepts as input, a three-dimensional (3D), numeric representation of the anatomical, outer surface of the target animal. This 3D data set, representing the outer surface of the target animal, may be acquired using various types of scanning equipment capable of determining the 3D coordinates of the outer surface of the target animal or points located on or about the outer surface.

Additionally, this latest form of the invention advantageously applies anatomical, reference information about the three-dimensional, internal structure of the target animal. This anatomical, reference information may include a set of cross-sectional, anatomically-detailed, slices of a select reference animal which is anatomically similar to the target animal. Properly scaled and longitudinally positioned, these internal, anatomical reference slices provide details of the internal, 3D anatomy present within the target animal. Further, this latest embodiment advantageously applies empirically-derived, reference densities for specific tissue-types identified in the anatomical, cross-sectional reference slices. These empirical reference densities provide typical mass/volume ratios for various tissue-types such as muscle, fat, bone, and internal organs. These empirical reference densities may also be grouped or averaged, in a weighted sense, to represent combinations of tissue-types present within the target and reference animals.

From the aforementioned components, one may, in accordance with one form of the method of this latest embodiment of the invention, derive by algorithm through numerical analysis linear dimensions, area dimensions, volume dimensions, 3D, anatomically-inferred masses (3D masses) and 3D, anatomically-inferred weights (3D weights) for various subsets, divisions and combinations of the scanned, live target animal. These subsets, divisions and combinations range from dimensions and parameters associated with the live target animal, to the dressed carcass, and to retail cuts (i.e., loin, round or sirloin) obtained from the carcass. Additionally, in accordance with one form of the method of this alternate form of the invention, one may derive by algorithm, through numerical analysis, a body condition score and common USDA grades and classifications regarding the target animal. All of these numerical calculations are achieved from a scanned representation of the live animal and the previously-described, internal, anatomical reference information.

As stated previously, a dressed or processed carcass may be scanned in place of the live target animal with the aforementioned parameters calculated for the carcass and/or various subsets, divisions and combinations of the scanned carcass.

Referring to FIG. 4-8, a 3D data set representing the anatomical, outer surface of the live target animal, which happens to be a cow is there shown. Each of the points located on the outer surface of the animal possess coordinates in the selected coordinate system. In FIG. 4-8, a convenient orthogonal coordinate system is shown with X, Y, and Z axes. Other coordinate systems are possible, including cylindrical or spherical coordinates.

FIG. 4-9 shows three different graphical representations of the outer surface of the target animal (the axes have been suppressed for diagram simplicity). FIG. 4-9A shows the 3D points on the anatomical outer surface identical to those shown in FIG. 4-8. The same data set is represented in FIG. 4-9B in the form of a triangular mesh in which the data are shown with solid lines joining the points. The same data set is graphically represented in FIG. 4-9C with a surface interpolation of the 3D data highlighted with angular lighting and shading to enhance depth perception.

FIG. 4-10 conceptually illustrates the use of the components of this latest form of the invention to calculate and graphically represent various cuts of beef. FIG. 4-10A illustrates the various cuts of beef typically found in the cow. The outer surface of the live target animal is represented in FIG. 4-10B with a cutaway indicating the position of the sirloin cut at plane A-A perpendicular to the longitudinal axis in the target animal. FIG. 4-10C illustrates one reference cross section, from a series of cross sections, stacked along the longitudinal axis of the target animal. These reference cross sections are scaled such that their outer circumference fits the corresponding outer surface of the scanned target animal. The sirloin area may be determined in each of the scaled cross sections. The sirloin volume results from the summation of sirloin areas times their incremental thickness. The product of the sirloin volume times the empirically-determined density of the sirloin muscle provides the 3D, anatomically-inferred mass of the sirloin cut of beef in this example. Knowing the local gravitational acceleration constant, the corresponding 3D, anatomically-inferred weight may also be calculated for this example.

The 3D, anatomically-inferred mass and the 3D, anatomically-inferred weight of a target animal, as provided by this invention, possess the following advantageous features:

a) 3D, anatomically-inferred mass and 3D, anatomically-inferred weight may be obtained remotely and without contacting the live animal or post mortem carcass.

b) 3D, anatomically-inferred mass and 3D, anatomically-inferred weight may be obtained from a live animal or carcass while it is moving.

c) The definitions of and relationship between the 3D, anatomically-inferred mass and the 3D, anatomically-inferred weight are parallel to the definition of and the relationship between mass, density and weight per physics, scientific and engineering definitions.

d) The new, innovative parameters, i.e., 3D, anatomically-inferred live carcass mass and 3D, anatomically-inferred live carcass weight provide a calculated analysis of the post mortem carcass while the animal is still alive. Similar analyses cannot be obtained or measured with any scale system while the animal is alive.

e) The new, innovative parameters, 3D, anatomically-inferred live carcass mass and 3D, anatomically-inferred live carcass weight provide a live animal analysis that is not influenced by variables such as stomach, bladder or intestinal content (Stomach content alone may account for 25% of a steer's scale-measured, live-weight.).

f) The 3D, anatomically-inferred mass and 3D, anatomically-inferred weight for various retail meat products, such as sirloin, chuck, round, loin or rib cuts, may also be evaluated while the animal is alive. An analysis of such retail meat cuts are presently not available via scale measurement techniques from the live animal.

g) The present invention provides analyses of live and processed meat animals without employing a scale system.

h) The present invention, by eliminating the need for a scale system, is not affected by the common contaminants that corrupt a scale measurement (i.e., excrement, mud, feed, stones, small animals or vermin, bedding material, snow and/or water).

The various methods of this latest form of the invention also provide an analytical, repeatable method for obtaining body condition scores, and USDA grades and specifications for live target animals without relying on visual inspections and the sometimes variable evaluation of a human inspector.

4.2 System Layout

Referring once again to FIGS. 4-1 through 4-7 of the drawings, the apparatus of this latest form of the invention here comprises an animal positioning apparatus, generally designated by the numeral 152. Apparatus 152 comprises a pair of side-by-side animal constraining chutes 152a and 152b, defining first and second target zones 154a and 154b for constraining a pair of animals "A" therewithin. Each target zone has first and second sides 155 (FIG. 4-2) and 156 an open top 158 and a floor 160 (FIG. 4-3).

Disposed in close proximity of each of the target zones are identical upper camera arrays 162 and identical first and second-side camera arrays 164 and 166 respectively. Each of the upper camera arrays, which is supported by an overhead girder 167 (FIG. 4-3), comprises identical range cameras 168, identical infrared cameras 170 and identical spotter cameras 172. Each first-side camera array 164, which is supported by a vertical girder 169, comprises identical range cameras 174 and identical infrared cameras 176. Each second-side camera array 166, which is supported by a vertical central girder 177 comprises identical range cameras 178 and identical infrared cameras 180. Each of the upper camera arrays is also includes an illuminator 182. Similarly each first-side camera array includes an illuminator 184, while each second-side camera array includes an illuminator 186 (FIG. 4-2). Also supported by a girder 167 is a pair of spaced-apart digital displays 190 for displaying digitized data (FIG. 4-3). Also the invention includes the necessary data processing capability to convert the camera images into range images. This data processing capability is illustrated in FIG. 4-1 as comprising a personal computer 192, computer interfaces 194 and a control and processing units 196 all of which are of a conventional construction well understood by those skilled in the art.

Referring to FIGS. 4-7, 4-7A and 4-7B these Figures further illustrate the various system components of the apparatus of this latest form of the invention. In the lower right-hand portion of FIG. 4-7 a typical base station is there diagramatically illustrated. As depicted in the central portion of the Figure drawing, the data acquired at the base station can also be accessed by a mobile backpack unit. As the animal being analyzed moves through the system in the direction of the arrows of FIG. 4-7, the acquired data can also be received and analyzed by a laptop station of the character depicted in the left-hand portion of the drawing. Also shown in the left end portion of the drawing is a distant authorized receiving station that is capable of receiving the data acquired at the base station. As indicated in the upper right-hand portion of FIG. 4-7 the data can also be received and analyzed at a remote station of the general character there illustrated (see also FIGS. 4-7A and 4-7B).

As indicated in FIGS. 4-1 through 4-7 of the drawings, for each of the target zones, the cameras are positioned to provide two opposing side views and a top view. As depicted in FIG. 4-3, the first and second-side view cameras are positioned proximate the longitudinal center of the animal with the vertical elevation being slightly below the expected center of the animal to provide additional ventral surface coverage. Each range camera of each of the camera arrays obtains a range image of the animal surface within its field of view. This provides sufficient surface accuracy to achieve the desired volume calculations.

As discussed in connection with the previously described embodiments of the invention, various commercially available cameras can be used in accomplishing the method of the present invention, including the camera manufactured by the Nikon, Inc. with the model designation "D1X" and the camera manufactured by Canon, Inc. having the model designation "EOS-1D". Both of these cameras can be controlled by computer via an Institute of Electrical and Electronics Engineers (IEEE) 1394 interface and both accept a wide assortment of interchangeable lenses. Therefore, software processing may be used to realign any movement shifts that may exist between images.

The illuminators 182, 184 and 186, which comprise the illumination means of the invention for illuminating the target areas, are readily commercially available and project structured light patterns on the target animals.

As previously discussed, an infrared camera manufactured by Infrared Solutions, Inc. and sold under the name and style "IR SNAPSHOT" has proven suitable for use in the accomplishment of the methods of the present invention.

4.3 Camera/Animal Alignment

In accomplishing one form of the method of this latest embodiment of the invention, the target animals are correctly positioned within the target zones by means of the chutes 152a and 152b which direct the target animals into the proper position within the target zones. The spotter cameras 172 alert the system when the animal is properly positioned within the designated target zone.

The previously described data processing means, which are of conventional design, implement the algorithms, image processing, surface processing, volume processing, curvilinear and linear measurements and like measurements the character of which will presently be described.

As previously discussed, important goals of this latest form of the invention are to provide significantly improved accuracy over existing animal imaging technology and also to increase the speed of acquiring useful data. By way of example the apparatus of the present invention can be used to provide a true three-dimensional (3D) model or data set of the target animal such as depicted in FIGS. 4-9A and 4-9B. From such 3D models or data sets, highly accurate computation of volumes, curvilinear surface measurements, and linear measurements is possible. As previously discussed, the level of accuracy achieved by the apparatus of the invention is far superior to a simple silhouette or profile data derived in accordance with prior art methods which only provide measurement potential around the outline of the silhouette since no landmarks exist within the darkened shape. In this regard, when two orthogonal silhouette views are combined to calculate a pseudo-volume, shape concavities cannot be recognized and only gross estimates of volume can be achieved. As will be made clear from the discussion which follows, the level of accuracy possible with a true 3D data set such as achieved by the methods of the present invention is superior to a 2D video data set of a character derived in accordance with prior art methods which share the volumetric limitations of the silhouette data with no ability to account for surface concavities. Though the 2D video data derived by the prior art systems does provide the ability to locate landmarks within the 2D silhouette outline, all surface features and measurements are obtained as their corresponding projections onto a flat, 2D surface.

With regard to the determination of the number and location of range cameras required to accurately reproduce the target, various factors must be considered. One of these factors is the complexity of the target surface. In the case of live or carcass animals, such as cattle and hogs, a three camera configuration such as that shown in FIG. 4-1 is acceptable. With this configuration, each range camera obtains a range image of the animal surface within its field of view. As shown in FIGS. 4-1 through 4-6, orthogonal camera orientations may be chosen with camera axes aligned from the right and left sides and the top. Such orthogonal orientations result in the surface seams of the character previously discussed herein. The orientations shown in FIGS. 4-1 and 4-2 provide sufficient surface accuracy to achieve the desired volume calculations. Since, in accordance with the method of the invention, the entire surface of the animal is recorded, this range camera configuration permits very accurate volumetric measurements as well as curvilinear and linear measurements.

In accordance with one alternate form of the method of the apparatus, as the target animal comes into the range of the three-dimensional (3D) scanning equipment (such as 3D camera), the animal may or may not be exactly aligned with the coordinate system of the 3D scanner. After the 3D data is acquired by the 3D scanner, it is necessary to correctly align the target animal within the selected coordinate system.

FIG. 4-11 shows a target animal precisely aligned with the 3D scanner axis. The selected coordinate system is a right-hand system as shown in 4-11E. Other coordinate systems may be used as desired. In top view, 4-11A, the longitudinal axis of the target animal is aligned with the Y-axis. In this alignment, the head (anterior) of the animal is aligned with the negative Y-direction, while the tail (posterior) is aligned with the positive Y-direction. In front view, 4-11C, the left side of the animal extends in the positive X-direction with the right side extending in the negative X-direction. View 4-11D shows a side view of the target animal. Once the coordinate system and the 3D data are established, the animal may be mathematically rotated and viewed from numerous directions. Oblique view (b) shows one of these alternative views.

FIG. 4-12 shows the placement of a mid-sagittal plane, MS, through the target animal in top (FIG. 4-12A), oblique (FIG. 4-12B), front (FIG. 4-12C), and side (FIG. 4-12D) views. The mid-sagittal plane of the target animal is a vertical plane which divides the animal into right and left halves.

FIG. 4-13 shows a target animal that is not precisely aligned with the 3D scanner axis. In this Figure, the mid-sagittal plane, MS, of the target animal differs from the Y-axis of the scanner coordinate system by an angle, $\theta_1$. The animal data may be mathematically rotated to align with the Y-axis via a number of formulas known to those skilled in the art. This alignment of animal and scanner axes provides a means to accurately analyze the target animal even when the animal chooses to ignore the mathematical orientation of the scanner axis.

FIG. 4-14 shows one method of determining the position of the mid-sagittal plane. In this method points $A_R$ and $A_L$, for example, are selected to be on the right and left side of the animal in the top view, respectively. The symmetry of the animal may be used to accurately select opposing positions for these points. Line, $A_R$-$A_L$, is drawn between these two points. The position of a midpoint between points $A_R$ and $A_L$ is determined by bisecting line $A_R$-$A_L$. This midpoint is labeled, $A_{mid}$. Additional midpoints, $B_{mid}$, $C_{mid}$, and $D_{mid}$ are determined in a similar manner in the top view. A midline is next determined in X-Y coordinates by determining a best-fit line through the midpoints. A vertical plane passing through this best-fit line determined from the midpoints, is established as the mid-sagittal plane, MS. This plane, determined in this fashion, is a vertical plane that passes through the midline of the animal, dividing it into right and left sides.

FIG. 4-15 illustrates another method for determining the position of the mid-sagittal plane. In this example a horizontally-symmetric, geometric shape is scaled to fit over the outline of the animal in the top view. This fit may be accomplished by scaling the length and width of the geometric shape (as shown) to closely match that of the animal outline. The geometric shape is then rotated to obtain a best alignment with the outline of the target animal. Since the geometric shape shown is horizontally symmetric, the shape's axis of symmetry, aligned with the animal outline, becomes the axis of symmetry for the target animal in the top view. As in the previous example, a vertical plane passing through the axis of the best-fit alignment establishes the mid-sagittal plane, MS. This plane, determined in this fashion, is a vertical plane that passes through the midline of the animal, dividing it into right and left sides.

After determining the rotational alignment necessary to position the target animal data properly within the 3D scanner axes, the data may be rotated accordingly to arrive at a data position that is precisely aligned. From this step forward, the data is properly aligned with the scanner axes and further rotational computations are unnecessary.

4.4 Normalized Units

Some calculations, such as hip height or rump width, require absolute dimensions in units such as inches. However, for other parameters, such as body condition scoring, it is advantageous to scale the absolute units into normalized units which are a proportion of the size of the animal. For example, it is useful to examine the loin depression as a relative proportion of body size. This normalized parameter permits the same scoring thresholds to be applied regardless of the size of the target animal. An example of this normalization is shown below.

Given a bull with an absolute hip height in inches, a normalized dimension might be formed as:

$$h_n = k_{\text{scale}} \frac{h_i}{h_{\text{ref\_hip}}}; \qquad (1\text{-}1)$$

where $h_i$ is the given dimension in absolute units such as inches; $h_{ref\_hip}$ is the reference hip-height dimension in absolute units such as inches; $k_{scale}$ is a scalar coefficient; and $h_n$ is the normalized dimension corresponding to $h_i$ converted to normalized units. It should be noted that while hip-height is used in this example as the reference dimension, any other absolute dimension may serve equally well.

As an example, if a given bull has a hip height of 60 inches, and a loin depression of 3 inches, a normalized loin depression might be computed as:

$$h_n = k_{scale} \frac{h_i}{h_{ref\_hip}} = 100\left(\frac{3 \text{ in}}{60 \text{ in}}\right) = 5.0; \quad (1\text{-}2)$$

where $k_{scale}$ has been selected to be 100 and the loin depression of 3.0 inches becomes a normalized 5.0 units referenced to a hip height of 60 inches.

4.5 Templates

Sometimes when making 3D dimensional calculations it is advantageous to determine dimensions to or from a specific site on the 3D surface. When such a requirement exists, a 3D template may prove valuable. FIG. 1-6 illustrates such a template. In this example it is desired to determine hip-height. This is a simple elevation calculation from the ground to the region over the hips. While conceptually simple, the actual calculation requires some screening. It is not desirable to simply select the highest point on the rear of the cow and determine the distance from that point to ground since the tailhead is often several inches higher than the hip height. Therefore, a 3D template such as that shown in FIG. 4-16 may be used to select the proper site as indicated on a normalized rump 'shell'. In this shell is the empirically selected region necessary to calculate hip height on the surface of the actual target animal.

4.6 Scaling

Various scaling techniques are advantageous to obtain accurate calculations. A basic scaling example is illustrated in FIG. 4-17. In this Figure a reference cross section is shown in FIG. 4-17A with anatomical components for a given longitudinal position. This cross section has a reference circumference. If a difference circumference is found for a given target animal at the same longitudinal position, a uniform, linear scale factor may be computed as:

$$k_c = \frac{C_{target}}{C_{ref}} \quad (1\text{-}3)$$

where $k_c$ is the unitless circumferential scale factor; $C_{target}$ is the circumference of the target animal cross section at a given longitudinal position in inches; and $C_{ref}$ is the circumference of the reference animal cross section at the same longitudinal position in inches.

In the example of FIG. 4-17, the anatomical data from the reference cross section may be scaled to fit the unknown anatomy of a given target animal, thus providing a good estimate of the anatomical data within the target animal. A smaller circumference is shown in FIG. 4-17A and a larger circumference is shown in FIGS. 4-17B and 4-17C.

Another scaling example (not shown) may implement one scale factor in the X-dimension and a second scale factor in the Y-dimension, and a third scale factor for the Z-dimension. Separate scale factors for different axis dimensions permit an accurate application of reference, cross-sectional or volumetric data to be accurately applied to an unknown target animal.

4.7 Terminology

The use of the term weight without definition invites ambiguity. In commercial and everyday usage the terms weight and mass are often used interchangeably. In science, engineering and physics, mass denotes the quantity of matter contained by a body while weight refers to the force exerted by gravity upon that mass. Density is the ratio of mass per unit volume.

Within this patent specification the more rigorous scientific definitions for mass and weight will be used unless declared otherwise. New terms, 3D, anatomically-inferred mass and 3D, anatomically-inferred weight will be introduced to define value representations of cattle and pigs that are calculated from three-dimensional data sets via the technology of this invention.

4.7.1 Mass

Sir Isaac Newton said that the mass of a body is the measure of the quantity of matter the body contains[1]. The mass of a body is an inherent and unalterable property of a body which does not change without adding to or subtracting from the body itself[2]. The mass of a body remains constant with altitude, latitude and gravitational acceleration. It will not change with geographic position, in a spaceship or on the Moon.

4.7.2 Weight

In scientific terms, weight is the force exerted on a body by the force of gravity. This force is proportional to the mass of the body and depends on its location. Weight, W, may be represented as:

$$W = \text{force} = M \times a; \quad (1\text{-}4)$$

where W is the force of gravity exerted on the body (SI: newtons); M is the mass of the body (SI: kg) and a is the acceleration of gravity in the vicinity of the body (SI: m/s$^2$).

As an example, consider a steer with a mass, M, of 500 kg, located at a latitude of 45° having an acceleration of gravity, a, equal to 9.80665 m/s$^2$. With 1 newton=1 (kg m)/s$^2$, the weight may be calculated as:

$$W = \text{force} = M \times a = \quad (1\text{-}5)$$
$$500 \text{ kg} \times 9.80665 \frac{m}{s^2} = 4903.33 \frac{\text{kg m}}{s^2} = 4903.33 \text{ nt}$$

Since one newton=0.2248 lbs (force), the weight may be expressed in pounds force via:

$$W = \text{force} = 4903.33 \text{ nt} \times \frac{0.2248 \text{ lb}}{1 \text{ nt}} = 1102.3 \text{ lbf}; \quad (1\text{-}6)$$

where the variables are as previously defined.

4.7.3 Measured Weight

The ambiguity associated with the term weight continues when common methods of measuring weights are considered.

In the case where a balance scale is used to measure the weight of an animal, the force of gravity exerted on the unknown animal is compared or balanced with the force of gravity exerted on a known, reference mass. While forces of gravity are involved, it can reasonably be stated that the result of such a balance is truly a measurement of mass. This balance measurement would result in the same measurement anywhere on the Earth or on the Moon, regardless of the force of gravity (on the Moon the forces of gravity which balance would be much less.)

Conversely, a spring scale or load cell truly measure forces. The force of gravity exerted on a target animal is measured and displayed. If an attempt is made to 'calibrate' a spring scale or load cell with a known mass at a given site, it will read differently when moved to a new location exhibiting a different gravitational acceleration. The same mass weighed in this manner on both the Earth and the Moon would weigh substantially less on the Moon.

As these methods apply to weighing cattle and pigs within the scope of this invention, it should be noted that the balanced scale, spring scale and load cell require that the animal be placed or positioned on a scale which interacts with the force of gravity at the time of the measurement. In the case of the balance scale, the force acting on the animal is balanced or compared with a known mass. In the case of the spring scale or load cell, the force acting on the animal is directly measured and displayed.

To date, all methods for obtaining a measured weight of an animal require that the animal be positioned on a scale which measures the force of gravity which acts on the animal, in one way or another, at the time of the measurement.

4.7.4 Density

Scientifically, density is defined as mass per unit volume. Density may be expressed as follows:

$$\delta = M/V; \quad (1\text{-}7)$$

where is density; M is mass; and V is the volume of the test body.

4.7.5 3D, Anatomically-Inferred Mass

Solving equation (1-7) for mass, M, yields:

$$M = \delta \times V; \quad (1\text{-}8)$$

A parallel equation relating parameters of this invention yields:

$$M_{3D} = \delta_{ref} \times V_{3D}; \quad (1\text{-}9)$$

where $M_{3D}$ is the 3D, anatomically-inferred mass of the body (SI: kg); $\delta_{ref}$ is a reference density associated with the volume; and $V_{3D}$ is the 3D volume of the body derived from a numerical analysis of the three-dimensional (3D) data set.

The 3D, anatomically-inferred mass (3DAI mass) of equation (1-9) is a calculated value that is derived from the numerical analysis of a scanned, 3D data set and a prior knowledge of the associated tissue densities. It does not require the use of scales or the application of the force of gravity at the time that the data is acquired. This is a value representation that is presently not in use and has not been taught by current patent art.

The reference density, $\delta_{ref}$, of equation (1-9) may take one of several forms. If the 3D volume includes the entire animal or a major portion of the animal, the reference density value may represent the average density over that volume of the animal. If the 3D volume includes only a specific body component such as muscle or fat, the reference density value may represent the density of that specific type of tissue. If the 3D volume includes two or more tissue-types, the reference density may be a weighted average of those density values associated with each of the tissue-types, weighted according to the volume of the corresponding tissue-types. Additionally, the reference density value may be empirically determined in a manner that represents the density of the tissue within the selected 3D volume.

4.7.6 3D, Anatomically-Inferred Weight

Using the innovative 3D, anatomically-inferred mass described herein, a 3D, anatomically-inferred weight (3DAI weight), $W_{3D}$, may be calculated as:

$$W_{3D} = M_{3D} \times a; \quad (1\text{-}10)$$

where $W_{3D}$ is the numerically derived force of gravity exerted on the body (SI: newtons) calculated from a scanned, 3D data set without the use of scales at the time of evaluation; $M_{3D}$ is the 3D, anatomically-inferred mass of the body calculated via equation (1-9) (SI: kg); and a is the acceleration of gravity in the vicinity of the body (SI: m/s²).

As an example, consider a steer with a 3D, anatomically-inferred mass, $M_{3D}$, of 650 kg, located at a latitude of 45° having an acceleration of gravity, a, equal to 9.80665 m/s².

With 1 newton=1 (kg m)/s², the 3D, anatomically-inferred weight may be calculated as:

$$W_{3D} = M_{3D} \times a = \quad (1\text{-}11)$$
$$650 \text{ kg} \times 9.80665 \frac{m}{s^2} = 6374.3 \frac{\text{kg m}}{s^2} = 6374.3 \text{ nt}$$

Since one newton=0.2248 lbs (force), the 3DAI weight may be expressed in pounds force via:

$$W_{3D} = 6374.3 \text{ nt} \times \frac{0.2248 \text{ lb}}{1 \text{ nt}} = 1432.9 \text{ lbf}; \quad (1\text{-}12)$$

where the variables are as previously defined.

The 3D, anatomically-inferred weight of this invention, for live animals or carcasses, may be calculated without requiring the use of scales or the application of the force of gravity at the time of the evaluation. This is a valuation that is presently not in use and has not been taught by current patent art.

4.7.7 Subsets, Divisions and Combinations of the 3D, Anatomically-Inferred Mass and the 3D, Anatomically-Inferred Weight 4.7.8

Subsets, divisions and combinations of the 3D, anatomically-inferred mass and 3D, anatomically-inferred weight terminology are anticipated when combined with specific algorithmic components. It is vital to note that all of these evaluations are obtained without using a scale that utilizes the force of gravity, in one form or another, acting on the target body during the time of the assessment. Such subsets, divisions and combinations include, but are not limited to:

a) 3D, anatomically-inferred live-mass—the 3D, anatomically-inferred mass of the entire live animal;

b) 3D, anatomically-inferred live carcass mass—the 3D, anatomically-inferred mass of the carcass of an animal obtained from 3D data acquired from the live animal prior to slaughter;

c) 3D, anatomically-inferred carcass mass—the 3D, anatomically-inferred mass of the carcass of an animal obtained from 3D, anatomically-inferred data acquired from the post mortem carcass of the animal;

d) 3D, anatomically-inferred live-weight—the 3D, anatomically-inferred weight of the live animal calculated from the 3D, anatomically-inferred live-mass;

e) 3D, anatomically-inferred live carcass weight—the 3D, anatomically-inferred weight of the carcass of an animal calculated from the 3D, anatomically-inferred live carcass mass;

f) 3D, anatomically-inferred carcass weight—the 3D, anatomically-inferred weight of the carcass calculated from the 3D, anatomically-inferred carcass mass; and g) 3D, anatomically-inferred masses and 3D, anatomically-inferred weights of various subsets of the live animal or carcass such as: 3D, anatomically-inferred sirloin mass, 3D, anatomically-inferred sirloin weight, 3D, anatomically-inferred rump mass, 3D, anatomically-inferred rump weight, 3D, anatomically-inferred stomach mass, or 3D, anatomically-inferred stomach weight.

4.7.8 Associated Terminology

The following terminology is defined, herein, for convenience:

"Carcass"—the dressed body of a food animal, typically excluding such parts as the stomach, intestines, internal organs, legs, head, tail and bodily fluids.

"Retail meat products"—those cuts of meat that are available at retail (or wholesale) outlets such as grocery stores or meat markets (i.e., round, loin, chuck, or rib cuts).

"3D scanner"—a scanning system capable of acquiring three-dimensional (3D) data representative of the anatomy of the target animal via such technologies such as a 3D camera system, a laser scanning system, acoustics, electromagnetics, X-ray or magnetic resonance imaging.

4.8 Cattle Calculations from 3D Data

4.8.1 Body Condition Scoring

Body condition scoring (BCS) of dairy cattle and beef cattle allows producers to evaluate fat reserves of live animals during various production phases. This valuation is designed to provide a simple and reliable indication of the level of body reserves in order to formulate management and feeding decisions. Within this invention, BCS provides a quantitative indicator of the fat or lean condition of the target animal.

Several scoring systems exist. E. E. Wildman at the University of Vermont established a scale ranging from 1 to 5 with 1 being an extremely thin cow and 5 being a very fat one. This scoring system is described by Jack Rodenburg in *Body Condition Scoring of Dairy Cattle* (Government of Ontario Canada, Ministry of Agriculture and Food, publication date: June 1992, last reviewed: September 1996; http://www.gov.on.ca/OMAFRA/English/livestock/dairy/facts/92-122.htm). This document is hereby incorporated herein by reference as though fully set forth herein. Reference should be made to this document for illustrations of cows ranging in condition from very thin to very fat. Another scoring system used in Missouri has a range of 1 to 9 with 1 representing a very thin cow and 9 representing a very fat cow. For the purposes of this specification, a BCS scoring system similar to the Vermont system has been selected with scores ranging continuously from 1 to 5. It is obvious to those skilled in the art that the BCS score obtained in accordance with the methods of this invention could be scaled to fit other scoring systems with differing alpha-numeric ranges and are therefore, covered by the intent of this invention.

FIG. 4.18 shows analysis lines which may be used to assign body condition scoring values. In this Figure the following lines or projections are shown in the top view of a cow:

A-A'—tailhead
B-B'—hook bones (hips)
C-C'—short ribs & loin depression
D-D'—individual short ribs
E-E'—individual vertebrae
F-F'—backbone ridge FIG. 4-19A shows the tailhead cross section elevation, A-A', of FIG. 4-18. The various dotted lines show the degree of fat or lean conditions for each of the five body condition scores, 1 through 5. BCS score 1, emaciated, is indicated by deep depressions between the pin bones and the tail. These deep depressions gradually disappear as the BCS score goes from "1" to "3", a normal condition. This region accumulates fat deposits for BCS scores 4 and 5 with 5 being an obese cow. The degree of fat or lean is indicated by the BCS score.

FIG. 4-19B shows the hook bone elevation, B-B', of FIG. 4-18. The various dotted lines show the degree of fat or lean conditions for the five body condition scores, 1 through 5. BCS score 1, emaciated, is indicated by deep depressions between the hook bones and the backbone. These deep depressions gradually disappear as the BCS score goes from "1" to "3", a normal condition. This region accumulates fat deposits for BCS scores 4 and 5 with 5 being an obese cow. The degree of fat or lean is indicated by the BCS score.

FIG. 4-19C shows the loin elevation, C—C', of FIG. 4-18. This is in the region of the lumbar vertebrae or short ribs. The various dotted lines show the degree of fat or lean conditions for each of the five body condition scoring, 1 through 5. BCS score 1, emaciated, is indicated by deep, concave depressions in the loin area. These deep depressions gradually disappear as the BCS score goes from "1" to "4", with 1 being an emaciated cow and 4 being a heavy cow. In the case of an obese cow, BCS score 5, the loin depression is not visible. In fact, for BCS 5, the loin concavity becomes a convex region. The degree of fat or lean is indicated by the BCS score.

FIG. 4-19D shows a region over the short ribs parallel to the spinal column. This region is indicated in FIG. 4-18 as either $D_L$-$D_L'$ (left side) or $D_R$-$D_R'$ (right side). The various dotted lines show the degree of fat or lean conditions for each of the five body condition scores, 1 through 5. In the emaciated condition, BCS score 1, the position of the ribs is very evident since little fat or meat is on the ribs. This condition changes as the BCS score increases from 1 to 3. For a score of 3, little or no evidence of individual rib position is evident. Scores 4 and 5 appear similar with condition 5 having excess fat present over the ribs.

FIG. 4-19E shows a region over the length of the vertebral column. This region is indicated in FIG. 4-18 as E-E'. The various dotted lines show the degree of fat or lean conditions for each of the five body condition scores, 1 through 5. In the emaciated condition, BCS score 1, each individual vertebrae is evident since there is little fat. This condition changes as the BCS score increases from 1 to 3. For a score of 3, little or no evidence of individual vertebrae, the spinal column appears as a long smooth ridge. Scores 4 and 5 appear similar with the smooth ridge itself disappearing at score 5.

FIG. 4-19F shows the thoracic cross section, F-F', of FIG. 4-18. This is in the region of the thoracic vertebrae. The various dotted lines show the degree of fat or lean conditions for each of the five body condition score, 1 through 5. BCS score 1, emaciated, is indicated by a pronounced vertebral ridge and a depressed rib eye muscle. These conditions gradually disappear as the BCS score goes from "1" to "4", with 1 being an emaciated cow and 4 being a heavy cow. In the case of an obese cow, BCS score 5, the vertebral ridge is nearly flat with a larger rib eye area.

4.8.2 Linear Calculations

4.8.2.a Hip Height

Hip height is the linear distance from a point immediately over the hook (hip) bones to the ground with the animal standing on a level surface. Hip height is commonly a key measurement used to determine frame scores.

As discussed previously, FIG. 4-16 shows the use of a 3D template to locate the proper place on the rump of a cow to determine hip height. Since the surface on which the target animal is standing is, by convention, z=0, the hip height is simply the Z coordinate value at the calculation site. Therefore, $$h_{hip} = z_{hip}; \qquad (2\text{-}1)$$

where $z_{hip}$ is the Z coordinate value of the hip calculation site in inches; and $h_{hip}$ is the hip height in inches. FIGS. 4-20A, 4-20B, 4-20C and 4-20*d* illustrate the hip height calculation from numerous views for a cow.

FIGS. 4-21A and 4-21B show alternative means for calculating hip height via elevation contours. In this method, elevation contours, or Z-axis values, are computed for the entire target animal. The proper anatomical sites for hip height are selected by templates or other means. The elevation values associated with the proper hip height positions provides the calculation value. If desired, this absolute calculation can be used to normalize other dimensional calculations.

4.8.2.b Rump Width

Rump width is a linear calculation of the widest portion of the pelvic region. This calculation may be obtained in the top view as indicated in FIG. 4-22A. It is noteworthy to indicate that rump width is not necessarily the widest region of the cow, since the sides may bulge to a slightly greater width. For this reason, it is recommended that width calculation be taken a distance from the hind quarters equal to approximately 10% of the cow length as shown in FIG. 4-22A. FIGS. 4-22B, 4-22C and 4-22D show additional views of the same rump width calculation.

Mathematically, the calculation of rump width, $W_{rump}$, may be expressed as:

$$W_{rump} = X_L - X_R; \tag{2-2}$$

where $X_L$ is the X-coordinate of the left side of the rump and $X_R$ is the X-coordinate of the right side of the rump.

4.8.2.c Shoulder Height

Shoulder height is the linear distance from a point immediately over the shoulder to the ground with the animal standing on a level surface.

As discussed in connection with FIG. 4-16, a 3D template may be used to locate the proper place on the shoulder of the target animal to calculate shoulder height. This site is located as indicated in FIGS. 4-23A, 4-23B, 4-23C and 4-23D. Since the surface on which the target animal is standing is, by convention, z=0, the shoulder height is simply the Z-coordinate value at the calculation site. Therefore, $$h_{shoulder} = z_{shoulder}; \tag{2-3}$$

4.8.2.d Shoulder Width

Shoulder width is a linear calculation of the widest portion of the shoulder region. This calculation may be obtained in the top view as indicated in FIG. 4-24A. It is noteworthy to indicate that shoulder width is not necessarily the widest region of the cow, since the sides may bulge to a slightly greater width. For this reason, it is recommended that width calculation be taken at a distance from the hind quarters equal to approximately 57% of the cow's length as shown in FIG. 4-24A. This percentage of the length may vary for different breeds or species. FIG. 4-24B, FIG. 4-24C and FIG. 4-24D show additional views of the same shoulder width calculation.

Mathematically, the calculation of shoulder width, $W_{shoulder}$, may be expressed as:

$$W_{shoulder} = X_L - X_R; \tag{2-4}$$

where $X_L$ is the X-coordinate of the left side of the shoulder and $X_R$ is the X-coordinate of the right side of the shoulder.

4.8.2.e Length

The length is calculated from the nose to the base of the tail. FIGS. 4-25A, 4-25B, 4-25C and 4-25D illustrate this calculation in multiple views. Location of the nose point may be accomplished by determining the maximum surface value in the negative Y-axis direction (using the coordinate system of FIG. 4-11). Additional care must be taken to locate the position of the tail point since the calculation is to the base of the tail and not the extended tail. In any given 3D data set it is possible that the tail may be in an extended position. For this reason a template which ignores the tail region may be used or perhaps a median value of rump positions would yield the base position in the positive Y-axis direction (using the coordinate system of FIG. 4-11.). Once the nose and tail point coordinates have been established, the length may be computed in the following manner:

$$L_1 = Y_{TAIL} - Y_{NOSE} \tag{2-5}$$

where $L_1$ is the length of the target animal in inches; $Y_{TAIL}$ is the Y-axis coordinate of the tail position in inches; and $Y_{NOSE}$ is the Y-axis coordinate of the nose position in inches.

A sample calculation of length, $L_1$ with $Y_{TAIL}=53$ inches and $Y_{NOSE}=-52$ inches is illustrated as:

$$L_1 = 53 - (-52) = 105 \text{ inches}; \tag{2-6}$$

In normalized units, referenced to a hip height of 60 inches, this becomes:

$$L_n = 100 \times (105/60) = 175 \text{ normalized units}; \tag{2-7}$$

The above example of length calculation assumes that the head and neck of the target animal are aligned with the mid-sagittal plane of the animal established by the thoracic and pelvic portions of the animal. Under practical calculation conditions, it is possible that the animal may have its head and neck turned to one side or the other introducing an error in determining the proper value of $Y_{nose}$ as described above. Such a condition may be identified by determining a centerline throughout the length of the body from the top view and evaluating the straightness of that line. If the centerline of the head and neck region does not fall within the mid-sagittal plane established by the rest of its body, at least two options are possible. One option is to retake the images used to compute the 3D data with the expectation that the animal will be in the proper position for the next set of images. A second option is to compute the true length with the head and neck turned to one side. This may be accomplished by computing a centerline for the entire body and further computing the curvilinear length of this centerline even when it deviates from the mid-sagittal plane of the target animal. The computed length of the centerline is then taken as the length of the target animal.

4.8.2.f Heart Girth

Heart girth in cattle is the circumferential distance around the animal, at the smallest position just posterior to the shoulders. Heart girth has been used, via formulas, as an estimator of live-weight.

Figures 2, 3, 4, 5, 6, 7, 8, 9, 10, 11, 12, 13, 14, 15, 16, 17, 18, 19, 20, 21, 22, 23, 24, 25, 26, 27, 28:
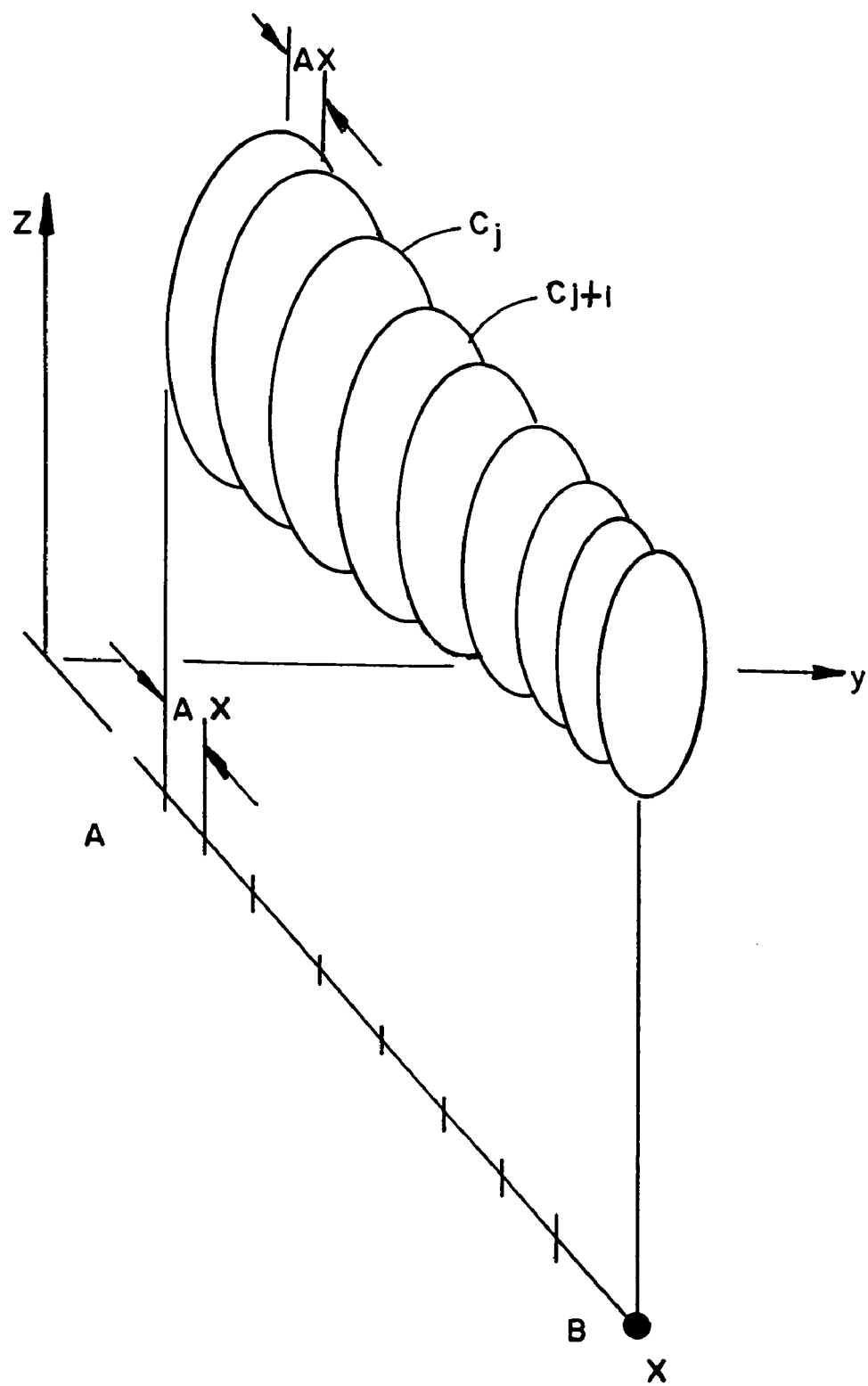
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
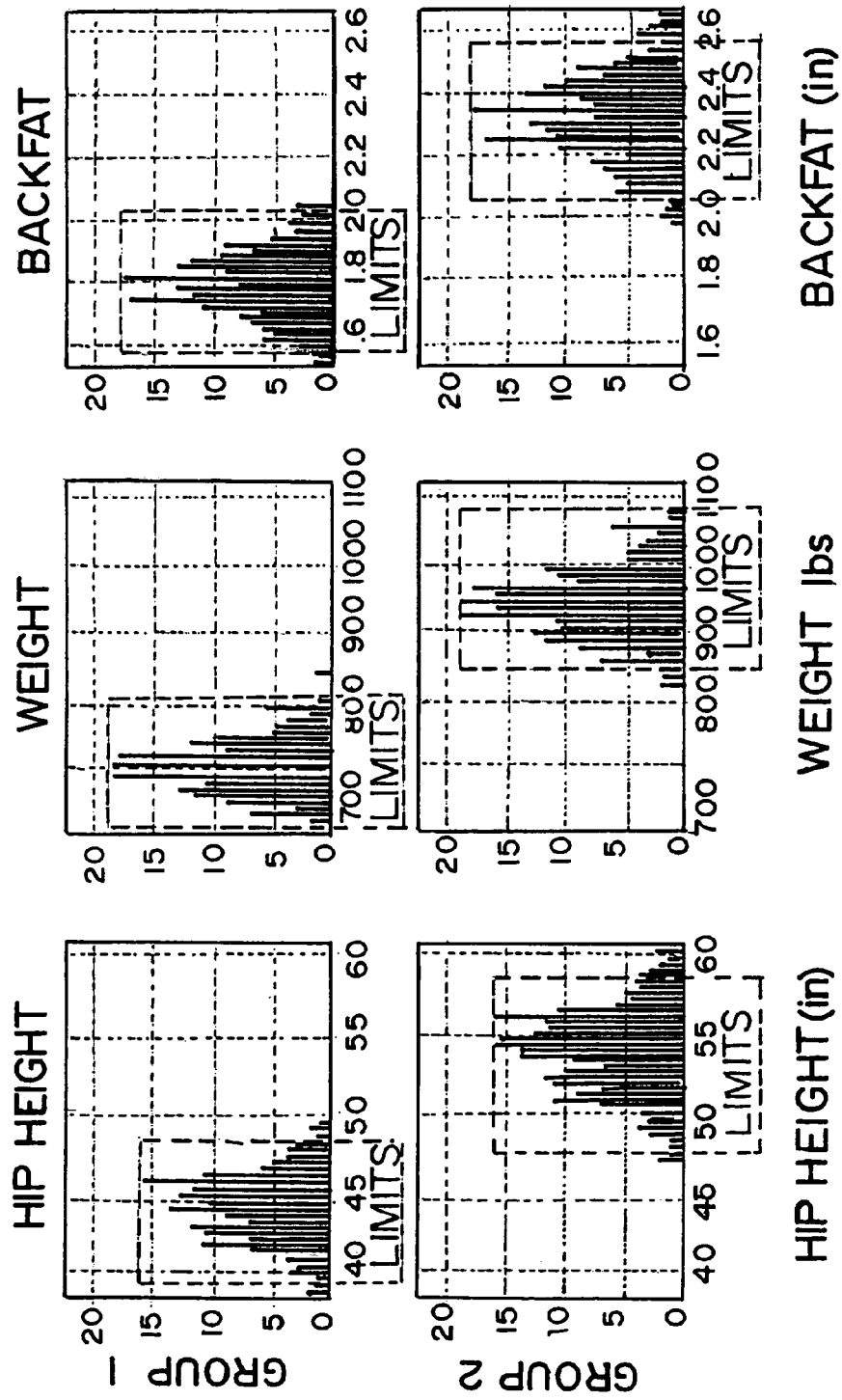
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
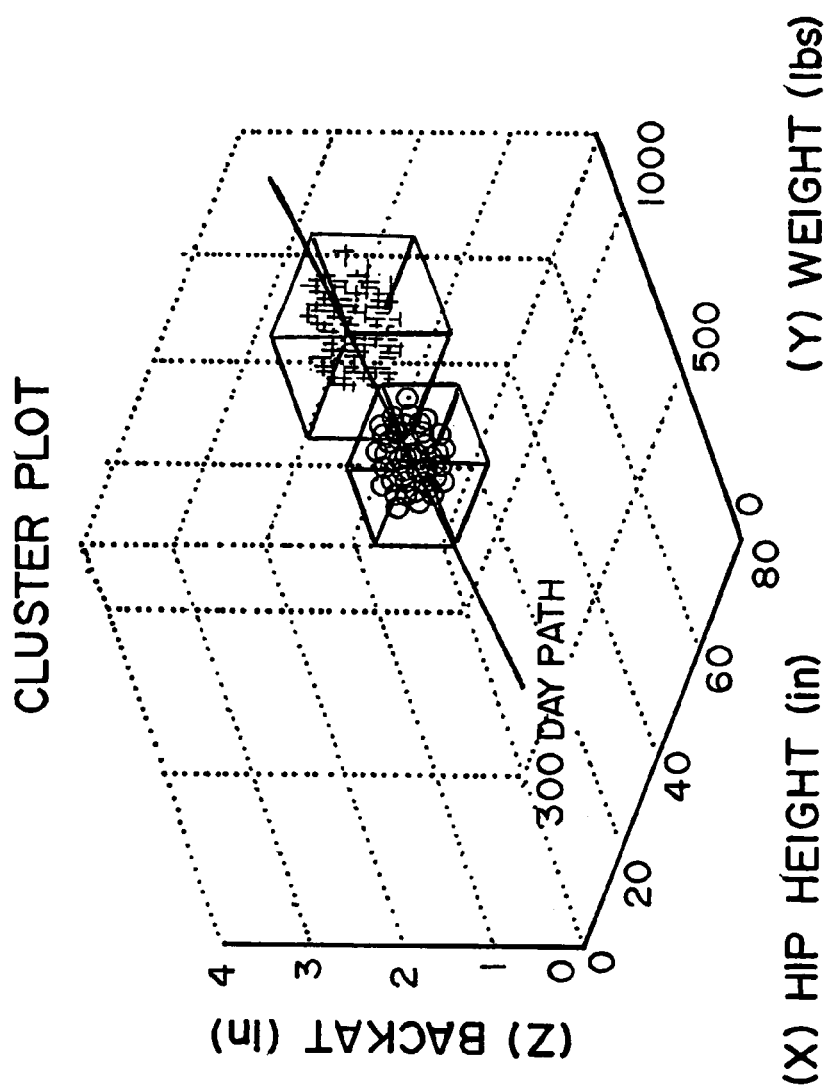
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
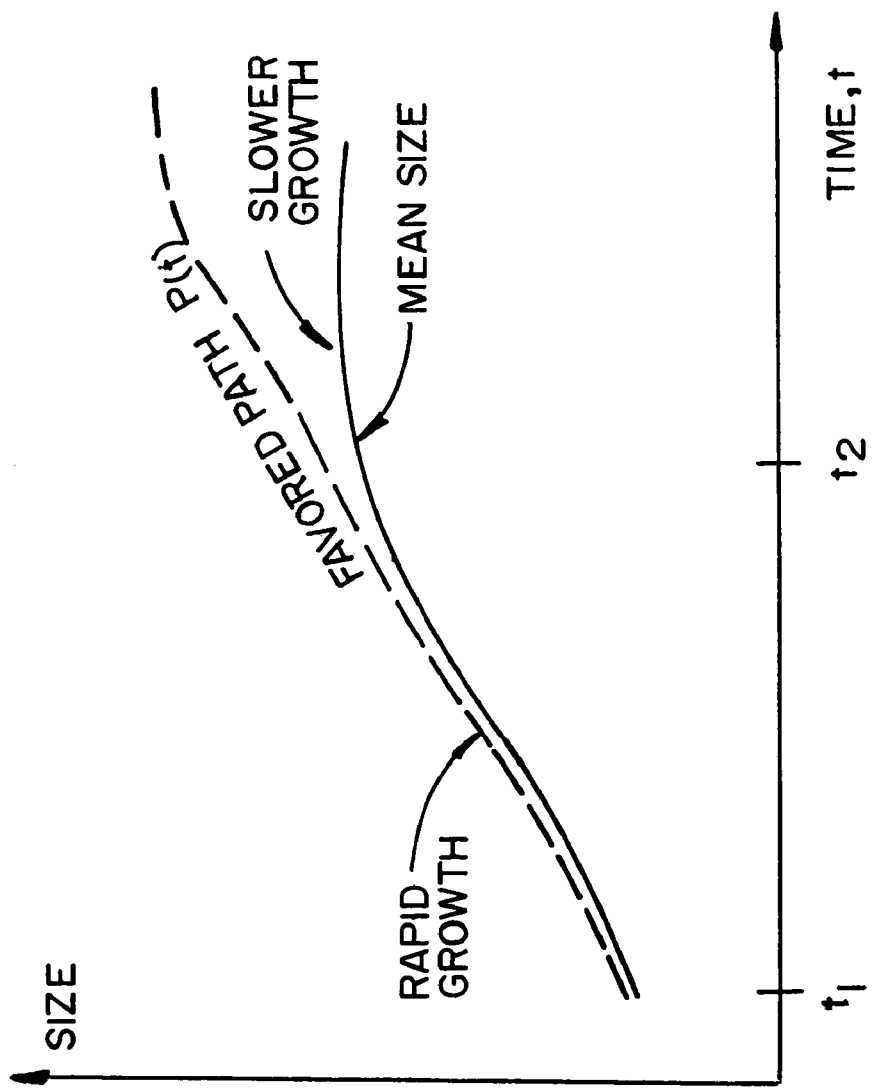
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
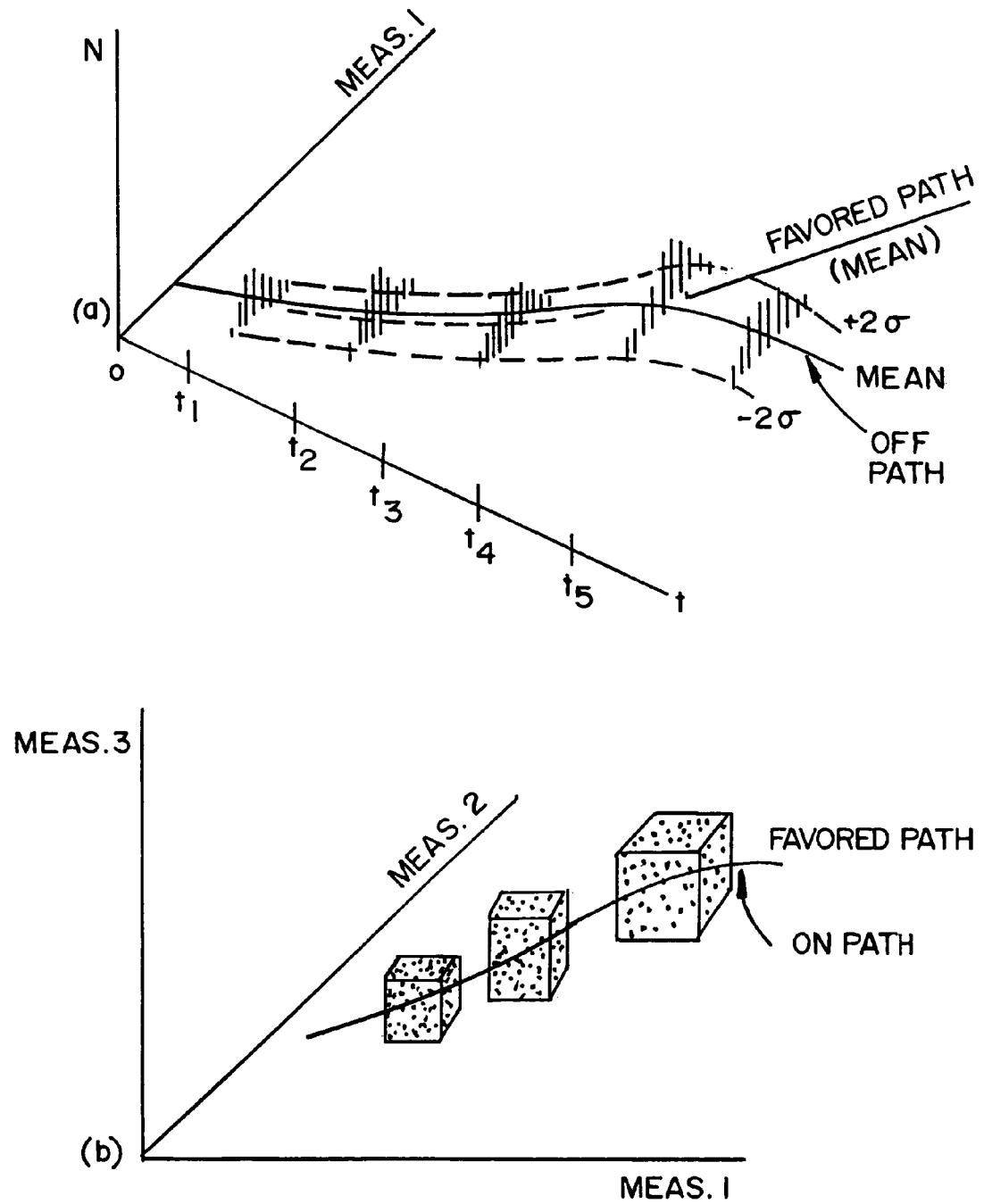
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
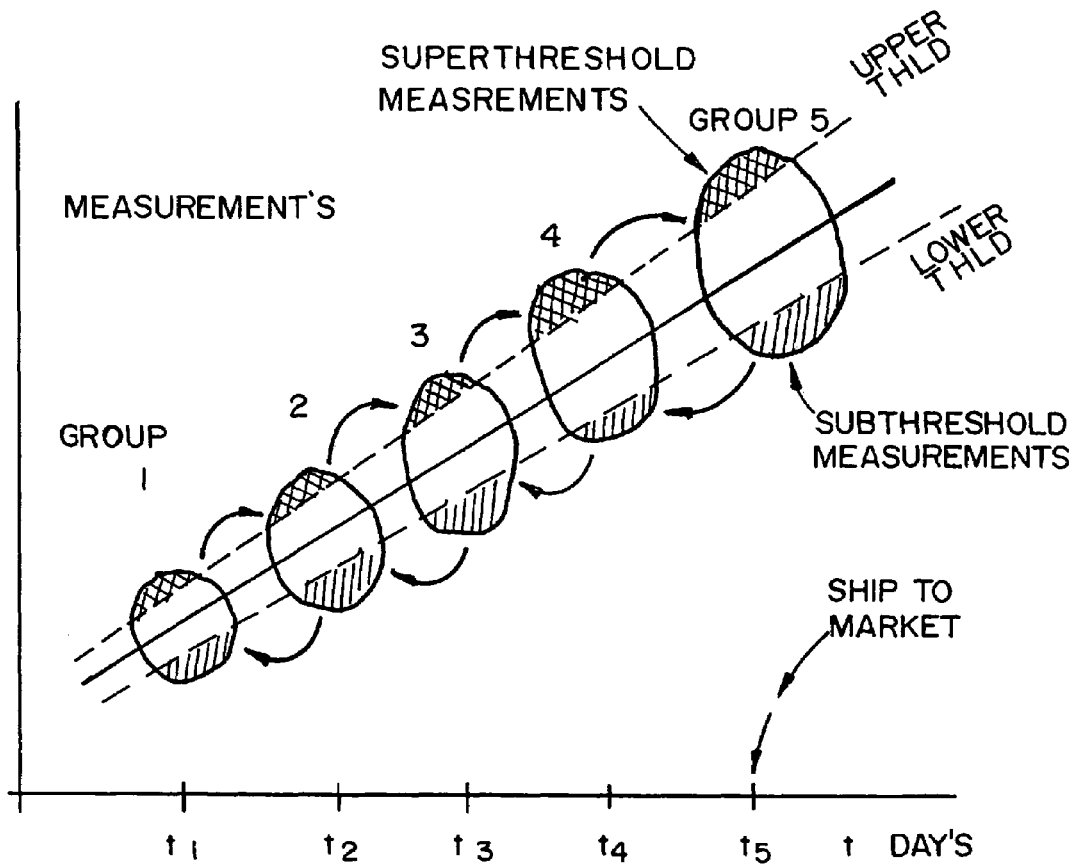
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 37A:
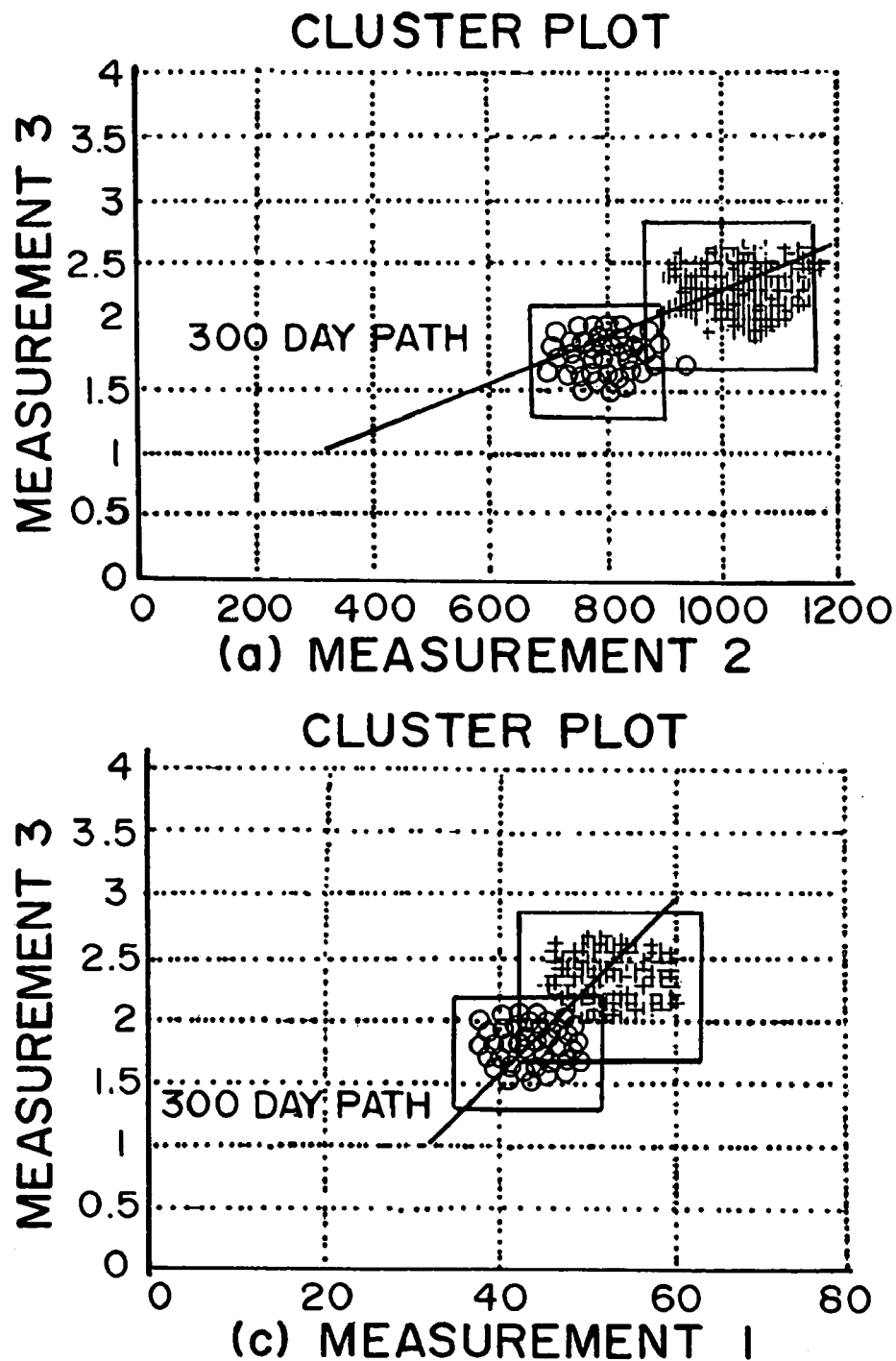
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 37B:
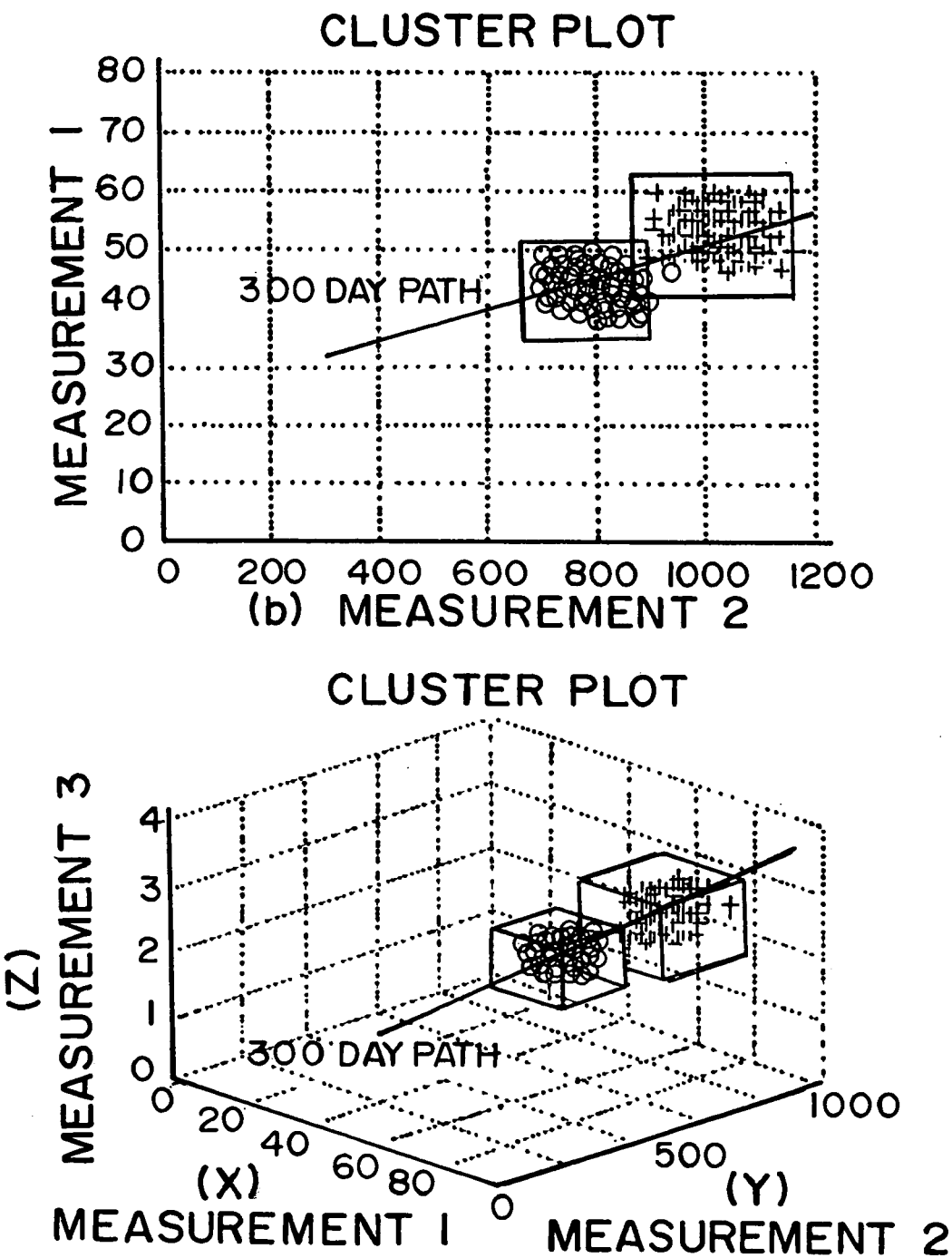
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
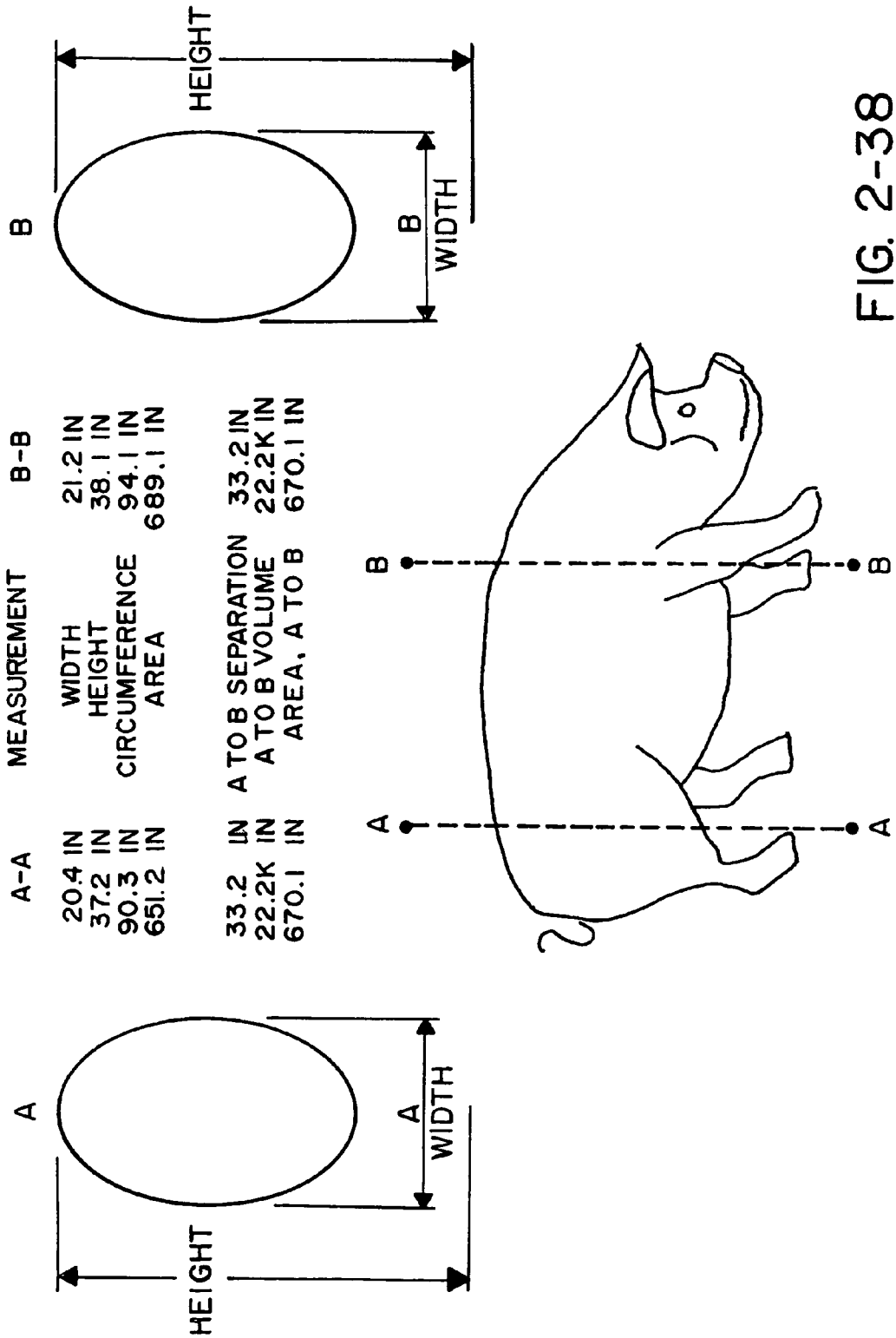

FIGS. 4-26A, 4-26B, 4-26C, 4-26D and 4-26E illustrate the three-dimensional calculation of heart girth. The first step of the calculation is the location of a vertical, transverse plane, HG, as shown in the top view (FIG. 26A). This plane may be positioned in proportion to body length as shown in FIG. 26A, or it may be positioned directly behind the front legs via automated or manual cursor means (not illustrated). The intersection of the plane, HG, and the body shell is the heart girth. This intersection is the circumference of the cross-sectional area, $A_{HG}$, as shown in the cross-sectional, oblique view of FIG. 4-26 E. FIG. 4-27 shows one computation of heart girth as a process. In this process, the 3D data (in the form of points on the body surface) are the input. Next, the position of the heart girth plane, HG, is determined as shown in FIG. 4-26A. The points of intersection of the body surface and plane HG are next computed. Since this intersection may result in points that are not fully aligned, a curve is fitted to these points using common curve-fitting algorithms such as cubic-spline. Next, aligned points are determined via common re-sampling techniques. This results in a sequence of points aligned with the circumference of the cross-sectional as shown in FIG. 4-26E.

FIGS. 4-28A, 4-28B and 4-28C show additional details of the mathematical computations associated with the determination of heart girth. FIG. 4-28A shows the original intersection points which do not necessarily fall on the circumference line. The fitted curve is also shown. The large points are indicative of the re-sampled points which truly fall on the circumference line. FIG. 4-28C shows the entire circumference or heart girth ring composed of re-sampled points. FIG. 4-28B shows the computation of the distance between any two re-sampled points. The heart girth value is the sum of the distance between all adjacent points.

For any two, adjacent re-sampled points the incremental circumferential distance between them, $C$, may be computed as:

$$\Delta C_i = \sqrt{(x_{i+1}-x_i)^2 + (z_{i+1}-z_i)^2} \tag{2-8}$$

where $C_i$ is the incremental circumferential distance between any two re-sampled points along the heart girth path; $[X_i, Y_{HG}, Z_i]$ and $[X_{i+1}, Y_{HG}, Z_{i+1}]$ are the 3D coordinates for two adjacent re-sampled points along the heart girth path with $Y_{HG}$ being the Y-coordinate position of the vertical heart girth plane, HG, as indicated in FIG. 4-26A.

The total heart girth calculation may be expressed as:

$$C_{HG} = \sum_{i=1}^{N} \Delta C_i \tag{2-9}$$

where $C_{HG}$ is the circumferential heart girth calculation in inches; i is the specific number of the re-sampled points around the heart girth path; N is the total number or re-sampled points around the heart girth path; and $C_i$ is the incremental circumferential distance between adjacent re-sampled points from equation (2-8).

4.8.2.g Backfat Thickness

Backfat thickness is the thickness of the subcutaneous fat layer usually measured between the $12^{th}$ and $13^{th}$ ribs. This measurement is commonly obtained in the live animal with ultrasound techniques. While the technology of this invention cannot directly measure dimensions beneath the skin, a combination of BCS score and rib eye area acquired with these methods can provide a reasonable calculation of backfat thickness.

4.8.3 Area Calculations 4.8.3.a Rib eye Area

The cross-sectional area of the rib eye retail cut is referred to as the rib eye area. This measurement is typically estimated in the live animal via ultrasound imaging taken over the $12^{th}$ and $13^{th}$ rib section.

While the ultrasound measurement of rib eye area has been shown to be useful, it is not convenient nor rapid. It requires direct contact with the animal over the appropriate ribs. It also requires the careful use of an ultrasound gel applied to the skin surface without the introduction of air bubbles that adversely reflect the ultrasound signal. The coat of the target animal is likely to attenuate the ultrasound or trap unwanted air bubbles. The present invention provides a rapid, remote alternative.

FIG. 4-29A, 4-29B and 4-29C show the use of a reference rib eye area and scaling techniques to determine an accurate estimate of the rib eye area for a given target animal. In this example a reference rib eye area has been calculated to be 13 in$^2$ as shown in FIG. 4-29B. The reference cross section shown in FIG. 4-29B may be increased in size to fit the larger skin shell shown in FIG. 4-29A via a linear scale factor of 1.176 (Figure not drawn to scale). The rib eye area of the larger target animal shown in FIG. 4-29A may be computed as:

$$A_{ribeye1} = k_{scale1}^2 \times A_{ref} = 1.176^2 \times 13 \text{ in}^2 = 18 \text{ in}^2 \tag{2-10}$$

where $k_{scale1}$ is the linear scale factor to enlarge the reference skin surface to fit the skin surface of the target animal; $A_{ref}$ is the reference rib eye area shown in FIG. 4-29B; and $A_{ribeye1}$ is the rib eye area of the larger target animal shown FIG. 4-29A.

Similarly, the smaller rib eye area shown in FIG. 4-29C may be determined by scaling the reference rib eye area shown in FIG. 4-29B to fit the smaller target skin surface shown in FIG. 4-29C via a linear scale factor of 0.784 (Figure not drawn to scale). The rib eye area of the smaller target animal shown in FIG. 4-29C may then be computed as:

$$A_{ribeye2} = k_{scale2}^2 \times A_{ref} = 0.784^2 \times 13 \text{ in}^2 = 8 \text{ in}^2 \tag{2-11}$$

where $k_{scale2}$ is the linear scale factor to shrink the reference skin surface to fit the skin surface of the target animal; $A_{ref}$ is the reference rib eye area shown in FIG. 4-29B; and $A_{ribeye2}$ is the rib eye area of the smaller target animal shown in FIG. 4-29C.

The scaling illustrated and discussed in the preceding paragraphs assumes that the BCS score of the reference animal and the target animal are identical or nearly identical. To take into account various BCS scores that may be encountered, the inclusion of a BCS scaling factor is advantageous as illustrated in FIGS. 4-30A, 4-30B and 4-30C.

To determine the BCS scale factor, $k_{BCS}$, the skin surface may first be normalized to fit the general size of the reference rib eye area as shown in FIG. 4-30B. Next the normalized shape of the target cross section can be compared with variations in normalized skin shapes which vary with BCS scores as shown in FIGS. 4-30A and 4-30C. For high BCS scores the BCS scale factor, $k_{BCS}$, is greater than unity while for low BCS scores the BCS scale factor is less than unity. Interpolation of $k_{BCS}$ between BCS templates is possible by measuring the degree of fit for adjacent BCS templates. As shown in FIG. 4-30B for mid-range BCS scores, the normalized area of the reference rib eye is equal to the normalized area of the target rib eye with $k_{BCS}$ equal to unity (1.0). For a higher BCS score, the value of $k_{BCS}$ is greater than 1.0 and for a lower BCS score the value of $k_{BCS}$ is less than 1.0. It should be noted that in this representation, the BCS scale factor is proportional to the rib eye area and is therefore proportional to the square of the linear scale factor, $k_{scale}$, described previously.

Based on the above discussion, the rib eye area of a target animal may be determined as indicated in FIG. 4-31. In this Figure a cross section of the 3D data shell, acquired from the target animal, is determined in the region over the $12^{th}$ and $13^{th}$ ribs. Block A of FIG. 4-31 scales the reference cross section with known rib eye area to fit the cross section of the target animal. The output of Block A is the target cross section normalized to the reference scale and the scale factor, $k_{scale}$. In Block B of FIG. 4-31 the normalized target cross section is fitted to rib eye templates corresponding to BCS scores of 1, 2, 3, 4 and 5. The output of Block B of FIG. 4-31 is a BCS scale factor, $k_{BCS}$, which corresponds to the BCS rib eye template which best-fits the normalized target cross section. Alternately, an interpolated value for $k_{BCS}$ may be calculated if the best-fit analysis yields a match between two rib eye templates. In this case, the interpolated $k_{BCS}$ value will fall between the two $k_{BCS}$ values associated with the corresponding templates that are good fits. Block C of FIG. 4-31 computes the rib eye cross-sectional area, $A_{ribeye}$ from inputs of the reference rib eye area, $A_{ref}$, the linear scale factor, $k_{scale}$, and the BCS scale factor, $k_{BCS}$ as indicated in the following equation:

$$A_{ribeye} = k_{BCS} \times k_{scale}^2 \times A_{ref} \quad (2\text{-}12)$$

where, $A_{ribeye}$, is the rib eye area of the target animal; $k_{BCS}$ is the BCS scale factor; $k_{scale}$ is the linear scale factor to scale the reference skin cross section to fit the skin cross section of the target animal; and $A_{ref}$ is the calibrated reference rib eye area for a mid-range BCS score.

As an example, a smaller target animal with a BCS score of 3.9 (1-5 range) might have a linear scale factor, $k_{scale}$, of 0.82 and a BCS scale factor of 1.2. For a calibrated reference rib eye area of 13 in², the target rib eye area may be computed as follows:

$$A_{ribeye} = k_{BCS} \times k_{scale}^2 \times A_{ref} = 1.2 \times 0.82^2 \times 13 \text{ in}^2 = 10.5 \text{ in}^2 \quad (2\text{-}13)$$

where the variables are as previously defined.

4.8.3.b Hide Areas

While cow hide is a byproduct for meat processors and slaughter houses, it is the essential raw material for tanners and the leather industry. With the 3D, anatomically-inferred calculation system of this latest invention, a wide assortment of hide dimensions become available. Since hide thickness and quality vary with the site of origin, hide dimensions from specific locations such as neck, shoulder, side, or rump are likely to be useful.

FIG. 4-30 shows an example of a means to compute the hide area via techniques of this latest form of the invention. In this FIG. uniformly spaced slices of the 3D shell are selected to be perpendicular to the longitudinal axis of the target animal. The spacing between these slices is represented as an incremental length, $_L$. At each of these slice locations, the circumference around the shell is computed in a manner similar to the calculation of circumferential heart girth described previously (Section 4.8.2.f) and illustrated in the Figure drawings discussed in this Section. The hide area over a given longitudinal region may be computed as follows:

$$A_{hide} = \sum_{i=1}^{n} \Delta L \times C_i \quad (2\text{-}14)$$

where $A_{hide}$ is the hide area over a selected length of the target animal in square inches; $C_i$ is the circumferential distance at each of n positions along the length of the target animal in inches; and L is the incremental length separating the longitudinal positions.

Other hide area calculations may be made similar to that shown above but with different limits for both longitudinal position and circumferential position via methods known to those skilled in the art of surface area calculations via multivariable calculus.

4.8.3.c Cross-Sectional Areas

From the 3D data it is possible to provide numerous cross-sectional slices of the live animal. Cross-sectional views might include the regions of the shoulder, heart, loin, or hips. Longitudinal slices may also be useful. Used in conjunction with cross-sectional anatomical reference data provided by medical MRI scanning or other techniques, these cross-sectional slices may be used to morph or proportionally scale the anatomical reference images to fit the current live animal thus providing a very accurate estimate of muscle and fat content of the live animal.

FIGS. 4-33A, 4-33B and 4-33C show three cross section areas for the shoulder (4-33A), the heart girth (4-33B) and the rump regions (4-33C).

4.8.3.d Non-Uniform Area Scaling

In the scaling discussion thus far, the area or dimension(s) of the target animal and a reference have been changed or scaled to fit each other via a single, uniform scaling constant. With such uniform scaling methods, the relative proportions of a given length, area or volume remain constant within the target data and within the given reference data. The present section deals with the condition in which the target data and the reference data do not have the same shape and a non-uniform scaling of one or the other is useful to provide a better fit than is possible with uniform scaling methods alone.

As depicted in FIG. 4-34A, a center of gravity point, $O_1$, is selected with prior knowledge of the region of mismatch. In polar coordinates, the angle, $\phi$, covers the range of 0 to 180 degrees as indicated. As shown in FIG. 4-34B, the difference or mismatch between the target outline and the reference outline is shown as a percentage of the reference radius. A compensating scale factor, $k_\phi$, is computed. This compensating scale factor, $k_\phi$, may be used to non-uniformly scale the reference image to fit the target outline thus providing the anatomical detail of the reference image to the target outline as follows:

$$\Delta R(\phi) = R_{\text{Target}}(\phi) - R_{\text{Ref}}(\phi), \text{ for } \phi \text{ from 0 to 180 degrees}; \quad (2\text{-}15)$$

$$\Delta R_N(\phi) = \left[\frac{\Delta R(\phi)}{R_{\text{Ref}}(\phi)}\right], \text{ for } \phi \text{ from 0 to 180 degrees} \quad (2\text{-}16)$$

$$k_{\text{comp}}(\phi) = 1 + \Delta R_N(\phi), \text{ for } \phi \text{ from 0 to 180 degrees}; \quad (2\text{-}17)$$

$$R(\phi) = k_{\text{comp}}(\phi) R_{\text{Ref}}(\phi), \text{ for } \phi \text{ from 0 to 180 degrees}; \quad (2\text{-}18)$$

where $\phi$ is the angle in polar coordinates centered at the center of gravity point, $O_1$; $\Delta R(\phi)$ is the radial difference between the target and reference outlines at a given angle, $\phi$; $R_{Target}(\phi)$ is the radial distance from the origin to the target outline at the given angle, $\phi$; $R_{Ref}(\phi)$ is the radial distance from the origin to the reference outline at the given angle, $\phi$; $\Delta R_N(\phi)$ is the radial difference between the target and reference outlines normalized to the reference radial distance at a given angle, $\phi$; $k_{comp}(\phi)$ is the compensating scale factor at a given angle, $\phi$; and $R(\phi)$ is the non-uniformly scaled reference outline converted to the target outline via the compensation factor $k_{comp}(\phi)$ at a given angle, $\phi$.

The compensating scale factor, $k_{comp}(\phi)$, may also be used to gradually and non-uniformly shift the anatomical details within the reference cross section to fit within the target outline. For each pixel within the target outline and above the origin, $O_1$, in (a) and (d), the non-uniformly scaled image intensity, $I_{scaled}$ $(R(\phi),\phi)$ in polar coordinates, may be expressed as:

$$I_{scaled}(R(\phi),\phi) = I_{Ref}(R_{Ref}(\phi),\phi), \text{ for } \phi \text{ from 0 to 180 degrees}; \quad (2\text{-}19)$$

where $I_{Ref}$ $(R_{Ref}(\phi),\phi)$ is the intensity within the reference image at the coordinates defined by the polar coordinates

[$R_{Ref}$,φ]; and $I_{scaled}$ (R(φ),φ) is the image intensity desired for the new, non-uniformly scaled image at the coordinates defined by the polar coordinates [R(φ),φ].

As a practical matter, this scaling may require conversions from polar to rectangular coordinates, rounding to obtain integer indices, and/or interpolation of the reference image pixels to provide necessary intensities at positions between the original pixel positions of the reference image. These practical, geometric nuances are commonplace to those skilled in the art of image interpolation and processing.

4.8.3.e Internal, Anatomical Structures

The various area scaling methods described herein provide the ability to use reference cross-sectional areas to accurately estimate the size of anatomical structures within the target animal which are not visible from the external scanning system (such as a 3D camera system) used with this invention. By using either uniform or non-uniform scaling methods, the reference cross sections may be scaled to closely match the outline of the target animal. With this scaling complete, the resulting internal structures such as the muscles, bones, heart, liver, or lungs may be accurately identified and calculated via digital techniques. The accuracy of these techniques is enhanced by the accuracy possible for the reference cross section via MRI, CAT, PET, or ultrasound imaging. Even the expertise of skilled, anatomical artists may be used to establish reference, internal anatomy cross sections.

4.8.4 Volumetric Calculations 4.8.4.a Live Volume

The 3D data of the present system provides the opportunity to compute the live volume of the target animal or subsets, divisions and combinations thereof. FIG. 4-35 illustrates the basic principles of this calculation. In this Figure the target animal is uniformly sliced as indicated. The slices are an incremental distance apart indicated by ΔL. The volume, V, may be computed as:

$$V = \sum_{i=1}^{n} \Delta L_i \times A_i, \text{ for } n \text{ cross-sectional slices;} \quad (2\text{-}20)$$

where $\Delta L_i$ is the incremental thickness of each cross-sectional volume or slice (or the distance between cross-sectional slices); $A_i$ is the area of a single cross section, i; n is the number of cross sections used to segment the target animal; and V is the resultant volume.

The areas represented by $A_i$ above may be obtained in a number of ways. Several previous examples of area calculations are described in Section 4.8.3.

Since reference, anatomically-detailed, cross sections are possible for each of the slices represented by $A_i$ in equation (2-20), the volumes of internal muscles, organs, or vessels may be obtained by scaling (uniformly or non-uniformly) the reference cross sections to fit the 3D outlines at each slice position. For uniform separation of the cross sections, equation (2-20) may be rewritten as:

$$V = \Delta L \sum_{i=1}^{n} A_i, \text{ for } n \text{ cross-sectional slices;} \quad (2\text{-}21)$$

where the constant slice thickness or separation of the cross sections, ΔL, may be brought out of the summation as shown. In this form, the scaled cross sections of a given organ or muscle are summed and multiplied by ΔL. This provides an accurate calculation of the volume of the desired subset such as: muscle, bone, organ, bone or vessel.

4.8.4.b Live Carcass Volume

A calculation of live carcass volume may be obtained by selecting a subset of the live volume. This subset is chosen by identifying the portion of each reference cross section which corresponds to the dressed or processed carcass on a family of reference cross sections.

This method to obtain a live carcass volume uses 3D data acquired from the live target animal. This method employs a family of reference cross sections on which the carcass components have been carefully selected in advance. These reference cross sections are then scaled, using methods previously described, to fit the outline of the 3D data acquired from the live target animal. The carcass volume is obtained as follows:

$$V_{\text{live\_carcass}} = \Delta L \sum_{i=1}^{n} A_{i \text{ live\_carcass}}, \quad (2\text{-}22)$$

for $n$ cross-sectional slices;

where ΔL is the incremental thickness of each cross-sectional volume or the distance between cross-sectional slices; $A_{ilive\_carcass}$ is the subset of a single cross-sectional area, which corresponds to the carcass region on that individual cross section, i; n is the number of reference cross sections used to segment the target animal; and $V_{live\_carcass}$ is the resultant volume of the carcass calculated from live animal data.

4.8.4.c Carcass Volume

A second method to obtain a calculated carcass volume uses 3D data acquired from a scan of the carcass after slaughter. If the entire empty volume within the carcass (that volume previously occupied by the viscera and internal organs) is accurately represented in the 3D data, the following equation may be used to compute the carcass volume:

$$V_{\text{carcass}} = \Delta L \sum_{i=1}^{n} A_{i \text{ carcass}}, \text{ for } n \text{ cross-sectional slices;} \quad (2\text{-}23)$$

where ΔL is the incremental thickness of each cross-sectional volume or the distance between cross-sectional slices; $A_{i\ carcass}$ is the accurate cross section, i, of the scanned carcass; n is the number of cross sections used to segment the target carcass; and $V_{carcass}$ is the resultant volume of the carcass.

A third method to obtain an accurate carcass volume uses 3D data acquired from a scan of the carcass after slaughter where the carcass scan does not accurately show the cavity of the carcass to be empty. If the 3D scan fails to show that the internal cavity of the carcass is empty, then reference cross sections, scaled appropriately, may be used to subtract the common cavity as indicated in the following equation:

$$V_{\text{carcass}} = \Delta L \sum_{i=1}^{n} (A_{i \text{ solid carcass}} - A_{i \text{ cavity}}), \quad (2\text{-}24)$$

for $n$ cross-sectional slices;

where ΔL is the incremental thickness of each cross-sectional volume or the distance between cross-sectional slices; $A_{i\ solid\ carcass}$ is the cross section, i, of the scanned carcass which does not properly show the empty region of the carcass; $A_{i\ cavity}$ is the cavity region of the reference cross section, i, scaled to the scanned carcass size; n is the number of cross sections used to segment the target carcass; and $V_{carcass}$ is the resultant volume of the carcass.

The combination of live volume, cross-sectional anatomical reference data provided by MRI scanning or other scanning techniques, and proper scaling provides the ability to calculate carcass volumes as well as a number of sub-volumes such as beef forequarter, beef hindquarter, quarter, rib, round, or side.

4.8.4.d Udder Volume (Dairy)

With the proper 3D data set acquired from a dairy cow, it is possible to compute the udder volume of dairy cattle using properly scaled, reference cross-sectional areas in conjunction with live 3D data of the target animal similar to volume calculations previously discussed.

4.8.5 Calculations of 3D, Anatomically-Inferred Mass

As stated in Section 4.7.1, the 3D, anatomically-inferred mass of this latest form of the invention, is a calculated value that is derived by the numerical analysis of scanned, 3D data, reference data regarding the internal anatomy, and an empirical valuation of associated densities. Restating equation (1-9) for convenience:

$$M_{3D} = \delta_{avg} \times V_{3D}; \quad (1-9)$$

where $M_{3D}$ is the 3D, anatomically-inferred mass of the body (SI: kg); $\delta_{avg}$ is an average, empirically-determined, reference density associated with the volume; and $V_{3D}$ is the 3D volume of the body derived from a numerical analysis of the three-dimensional (3D) data set.

In one set of applications, the 3D volume, $V_{3D}$, of equation (1-9) may be calculated from a 3D data set acquired from a scan of the live target animal. From this 3D data set and reference internal anatomical data, using the methods previously described in Sections 4.8.3 and 4.8.4, including equations (2-20), (2-21) and (2-22), representative volumes may be calculated for the entire live target animal or any subset, division or combination thereof. Examples of such representative volume calculations may include:

a) a live volume, which is a volume calculation for the entire, live target animal;

b) a live carcass volume, which is a volume calculation for the dressed carcass from 3D data acquired from a scan of the live target animal;

c) live beef cut volumes, which are volume calculations, from 3D data acquired from a scan of the live target animal and internal anatomical reference data, for various beef cuts such as live sirloin volume, live loin volume, live chuck volume, or live round volume; and d) other live volumes, which include subsets, divisions and combinations of the above live volume representations.

In another set of applications, the 3D volume, $V_{3D}$, of equation (1-9) may be calculated from a 3D data set acquired from a scan of the dressed or processed carcass. From this 3D data set and reference internal anatomical data, using the methods previously described in Sections 4.8.3 and 4.8.4, including equations (2-23) and (2-24), representative volumes may be calculated for the dressed or processed carcass or any subset, division or combination thereof. Examples of such representative volume calculations may include:

a) a carcass volume, which is a volume calculation for the entire, dressed or processed carcass;

b) carcass beef cut volumes, which are volume calculations for various beef cuts such as sirloin volume, loin volume, chuck volume, or round volume; and d) other sub-carcass volumes, which include subsets, divisions and combinations of the above carcass volume representations.

The empirically-determined, average reference density, $\delta_{avg}$, of equation (1-9) may be established for specific types of tissue. When a 3D, anatomically-inferred mass is calculated for a specific tissue-type, the appropriate density value for that specific tissue-type may be used and weighted according to the percentage of the given tissue-type in the reference cross-sectional slices.

For some applications, it is advantageous for the average reference density, $\delta_{avg}$, of equation (1-9) to be modified according to the BCS score. This modification may be advantageous in the following types of applications:

a) the target is a live animal; and b) the desired 3D, anatomically-inferred mass is being calculated for the entire live animal or a subset thereof which includes both lean muscle tissue and fat tissue.

Since fat tissue has a lower density than lean muscle tissue, it follows that the average reference density of an entire animal with more fat tissue would have a lower average reference density than a leaner animal. Conversely, a leaner animal, having proportionately more high-density muscle tissue, exhibits a higher average reference density. Accordingly, the density may be adjusted via body condition scoring (BCS) as follows:

$$\delta_{avg} = \delta_0 - k_{BCS} B; \quad (2-25)$$

where $\delta_{avg}$ is the average reference density; $\delta_0$ is the nominal density for the typical target animal; $k_{BCS}$ is a constant; and B is the BCS score. FIG. 4-36 illustrates the density of equation (2-25) as a function of BCS score. The values for $\delta_0$ and $k_{BCS}$ may be determined empirically for the desired target, whether the entire live animal or a subset thereof.

4.8.5.a 3D, Anatomically-Inferred, Live Mass 3D, anatomically-inferred, live mass is a calculation based upon the live volume of the target animal and a knowledge of the associated densities. Once a calculation of live volume has been achieved, it is only necessary to multiply this live volume by the appropriate density to obtain a calculation of 3D, anatomically-inferred, live mass. This is generally represented in the following equation:

$$M_{3D\_live} = \delta_{avg} V_{live} = \delta_{avg} \Delta L \sum_{i=1}^{n} \times A_i, \quad (2-26)$$

for n cross-sectional slices;

where $M_{3D\_live}$ is the 3D, anatomically-inferred, live mass of the target animal; $\delta_{avg}$ is the average reference density of the target animal; $V_{live}$ is the live volume; ΔL is the incremental thickness of each cross-sectional volume or the distance between cross-sectional slices; $A_i$ is the area of a single cross section, i; and n is the number of cross sections used to segment the target animal. The average reference density, $\delta_{avg}$, of equation (2-26) may be modified as described in equation (2-25) to account for the proportion of fat tissue present as determined by the BCS score.

The calculation of 3D, anatomically-inferred, live mass may often be made more precise by accounting for differing densities for various types of tissue such as muscle, fat, bone, lung, or blood. This additional detail requires the use of reference cross sections (as previously indicated) which have the position and area of each tissue-type properly identified and quantified. These reference cross sections are scaled, either uniformly or non-uniformly, as previously described. The live volumes for each specific tissue-type may then be computed as shown in equations (2-20) and (2-21). The summation of the density-volume products for each tissue-type present in the live animal results in the 3D, anatomically-inferred, live mass:

$$M_{3D\_live} = \sum_{j=1}^{m} [(\delta_{muscle} \times V_{muscle}) + (\delta_{fat} \times V_{fat}) + \ldots + (\delta_{bone} \times V_{bone})],$$

for $n$ cross-sectional slices;

where $M_{3D\_live}$ is the 3D, anatomically-inferred, live mass of the target animal; $\delta_{muscle}, \delta_{fat}, \ldots, \delta_{bone}$, are the densities of the associated body tissues; $V_{muscle}, V_{fat}, \ldots, V_{bone}$ are the 3D live volumes for each tissue-type; and m is the number of tissue-types included in the segmentation of the target animal.

Equation (2-27) may be restated to reflect each of the cross-sectional areas, substituting the product of the tissue area and slice thickness for the tissue volumes as indicated previously in equation (2-20):

$$M_{3D\_live} = \qquad (2\text{-}28)$$
$$\sum_{i=1}^{m} [(\Delta L \times \delta_{i\ muscle} \times A_{i\ muscle}) + (\Delta L \times \delta_{i\ fat} \times A_{i\ fat}) + \ldots +$$
$$(\Delta L \times \delta_{i\ bone} \times A_{i\ bone})] \text{ for } n \text{ cross-sectional slices;}$$

where $M_{3D\_live}$ is the 3D live mass of the target animal; $\delta_{i\ muscle}, \delta_{i\ fat}, \ldots, \delta_{i\ bone}$, are the densities of the associated body tissues; $\Delta L$ is the incremental thickness of each cross-sectional slice; $A_{i\ muscle}, A_{i\ fat}, \ldots, A_{i\ bone}$ are the areas of a single cross section, i; and n is the number of cross sections used to segment the target animal.

Equation (2-28) may be further simplified by bringing the uniform, incremental thickness, $\Delta L$, outside of the summation as follows:

$$M_{live} = \Delta L \times \sum_{i=1}^{n} [(\delta_{i\ muscle} \times A_{i\ muscle}) + (\delta_{i\ fat} \times A_{i\ fat}) + \ldots + \qquad (2\text{-}29)$$
$$(\delta_{i\ bone} \times A_{i\ bone})], \text{ for } n \text{ cross-sectional slices;}$$

where the variables are as previously defined.

4.8.5.b 3D, Anatomically-Inferred, Live Carcass Mass 3D, anatomically-inferred, live carcass mass is a calculated subset of the 3D, anatomically-inferred, live mass which includes only those terms representing the body components, tissues and parts that exist in both the live target animal and the dressed or processed carcass. For example, those terms representing muscle, bone and carcass tissues would be included, while those terms representing the stomach and its contents, intestines, and lungs would be excluded. As with the 3D, anatomically-inferred, live mass calculation, the reference cross sections may be scaled, either uniformly or non-uniformly, to fit the target outline. The 3D, anatomically-inferred, live carcass mass is computed from the densities and areas of specific tissue-types as indicated below:

$$M_{3D\_live\_carcass} = \qquad (2\text{-}30)$$
$$\Delta L \sum_{i=1}^{n} [(\delta_{i\ muscle} \times A_{i\ muscle}) + (\delta_{i\ fat} \times A_{i\ fat}) + \ldots +$$
$$(\delta_{i\ bone} \times A_{i\ bone})],$$

where $M_{3D\_live\_carcass}$ is the 3D, anatomically-inferred, live carcass mass of the target animal; $\delta_{i\ muscle}, \delta_{i\ fat}, \ldots, \delta_{i\ bone}$, are the densities of the associated body tissues which are present in both the live animal and the carcass; $\Delta L$ is the incremental thickness of each cross-sectional volume or the distance between cross-sectional slices; $A_{i\ muscle}, A_{i\ fat}, \ldots, A_{i\ bone}$ are the area of included parts within a single cross section, i; and n is the number of cross sections used to segment the target animal.

The 3D, anatomically-inferred, live carcass mass is a unique calculation available only with the present invention. This calculation is a representation of the dressed or processed carcass from 3D data acquired from the live animal prior to slaughter. This calculation avoids the variations inherent in present mass or weight measurements due to factors such as stomach content, bladder content, and intestinal content. Stomach content alone may account for 25% of a cow's measured weight. Table 2-1 shows the variations typically present in a weight measurement of a mature steer.

4.8.5.c 3D, Anatomically-Inferred, Carcass Mass 3D, anatomically-inferred, carcass mass is a calculation based upon the volume of the post mortem, target carcass and a knowledge of the associated densities. Once a calculation of carcass volume has been achieved, it is only necessary to multiply this carcass volume by the appropriate density to obtain a calculation of 3D, anatomically-inferred, carcass mass. This is represented in the following equation:

$$M_{3D\_carcass} = \delta_{avg} V_{carcass} = \delta_{avg} \Delta L \sum_{i=1}^{n} \times A_i, \qquad (2\text{-}31)$$

for $n$ cross-sectional slices;

where $M_{3D\_carcass}$ is the 3D, anatomically-inferred, carcass mass of the target carcass; $\delta_{avg}$ is the average reference density of the carcass; $V_{carcass}$ is the carcass volume; $\Delta L$ is the incremental thickness of each cross-sectional slice; $A_i$ is the area of a single cross section, i; and n is the number of cross sections used to segment the target carcass.

The calculation of 3D, anatomically-inferred, carcass mass may often be made more precise by accounting for differing densities for various types of tissue such as muscle, fat, and bone. This additional detail requires the use of reference cross sections (as previously indicated) which have the position and area of each tissue-type properly identified. These reference cross sections are scaled, either uniformly or non-uniformly, to fit the target outline. The carcass volume is then computed from the densities and areas of specific tissue-types as indicated below:

$$M_{3D\_carcass} = \Delta L \sum_{i=1}^{n} [(\delta_{i\ muscle} \times A_{i\ muscle}) + (\delta_{i\ fat} \times A_{i\ fat}) + \ldots + (\delta_{i\ bone} \times A_{i\ bone})], \text{ for } n \text{ cross-sectional slices;} \quad (2\text{-}32)$$

where $M_{3D\_carcass}$ is the 3D, anatomically-inferred, carcass mass of the target carcass; $\delta_{i\ muscle}, \delta_{i\ fat}, \ldots, \delta_{i\ bone}$, are the densities of the associated body tissues; $\Delta L$ is the incremental thickness of each cross-sectional volume or the distance between cross-sectional slices; $A_{i\ muscle}, A_{i\ fat}, \ldots, A_{i\ bone}$ are the area of a single cross section, i; and n is the number of cross sections used to segment the target carcass.

4.8.6 Calculations of 3D, Anatomically-Inferred, Weight

As stated in Section 4.7.6, the 3D, anatomically-inferred weight of this invention, is a calculated value that is derived from the 3D, anatomically-inferred mass and the acceleration of gravity in the vicinity of the target animal or carcass. The 3D, anatomically-inferred mass of this invention is a calculated value that is derived from the numerical analysis of a scanned, 3D data set and a prior knowledge of the associated tissue densities.

Analogous to the relationship between the scientific definitions of weight and mass, 3D, anatomically-inferred weight may be calculated from 3D, anatomically-inferred mass according to the following equation, which is a restatement of equation (1-10):

$$W_{3D} = M_{3D} \times a; \quad (1\text{-}10)$$

where $W_{3D}$ is the numerically derived, 3D, anatomically-inferred weight analogous to the force of gravity exerted on the body (SI: newtons); $M_{3D}$ is the 3D, anatomically-inferred mass of the body (SI: kg); and a is the acceleration of gravity in the vicinity of the body (SI: m/s²).

The 3D, anatomically-inferred weight of this invention, for live animals or carcasses, may be calculated without requiring the use of scales or the application of the force of gravity at the time of the evaluation. This is a valuation that is presently not in use and has not been taught by current patent art.

As an example, consider a steer with a 3D, anatomically-inferred mass, $M_{3D}$, of 600 kg, located at a latitude of 45° having an acceleration of gravity, a, equal to 9.80665 M/s². With 1 newton=1 (kg m)/s², the 3D, anatomically-inferred weight may be calculated as:

$$W_{3D} = M_{3D} \times a = 600 \text{ kg} \times 9.80665 \frac{m}{s^2} = 5884.0 \frac{\text{kg m}}{s^2} = 5884.0 \text{ nt}$$

Since one newton=0.2248 lbs force (lbf), the 3D, anatomically-inferred weight may be expressed in pounds force via:

$$W_{3D} = 5884.0 \text{ nt} \times \frac{0.2248 \text{ lb}}{1 \text{ nt}} = 1322.7 \text{ lbf;} \quad (2\text{-}35)$$

where the variables are as previously defined.

The 3D, anatomically-inferred weight may be adjusted for body fat by using the 3D, anatomically-inferred mass as a function of BCS score per equation (2-25):

$$W_{3D\_BCS} = M_{3D\_BCS} \times a \text{nt;} \quad (2\text{-}36)$$

where $W_{3D\_BCS}$ is the 3D, anatomically-inferred weight adjusted for BCS score analogous to the force of gravity exerted on the body (SI: newtons); $M_{3D\_BCS}$ is the 3D, anatomically-inferred mass of the body (SI: kg) adjusted for BCS score; and a is the acceleration of gravity in the vicinity of the body (SI: m/s²).

$W_{3D\_BCS}$ may also be calculated in units of pound force as demonstrated below:

$$W_{3D\_BCS} = M_{3D\_BCS} \times a \times k_{conv} \text{lbf;} \quad (2\text{-}37)$$

where $W_{3D\_BCS}$ and $M_{3D\_BCS}$ are as previously defined and $k_{conv}$ is the conversion factor:

$$k_{conv} = 0.2248 \frac{\text{lbf}}{\text{nt}}. \quad (2\text{-}38)$$

4.8.6.a 3D, Anatomically-Inferred Live Weight 3D, anatomically-inferred live weight, $W_{3D\_live}$, is a calculation based upon the 3D, anatomically-inferred live mass, $M_{3D\_live}$. It is represented as follows:

$$W_{3D\_live} = M_{3D\_live} \times a \text{nt;} \quad (2\text{-}39)$$

where $W_{3D\_live}$ is the 3D, anatomically-inferred live weight analogous to the force of gravity exerted on the live target animal (SI: newtons); $M_{3D\_live}$ is the 3D, anatomically-inferred live mass of the body (SI: kg); and a is the acceleration of gravity in the vicinity of the body (SI: m/s²).

$W_{3D\_live}$ may be calculated in units of pound force via multiplication by $k_{conv}$, equation (2-38) as shown below:

$$W_{3D\_live} = M_{3D} \times a \times k_{conv} \text{lbf;} \quad (2\text{-}40)$$

where the variables are as previously defined.

4.8.6.b 3D, Anatomically-Inferred Live Carcass Weight 3D, anatomically-inferred, live carcass weight, $W_{3D\_live\_carcass}$, is a calculation of the 3D, anatomically-inferred, weight of the carcass based upon the 3D, anatomically-inferred, live carcass mass, $W_{3D\_live}$ mass $$W_{3D\_live\_carcass} = M_{3D\_live\_carcass} \times a \text{nt;} \quad (2\text{-}40a)$$

where $W_{3D\_live\_carcass}$ is the 3D, anatomically-inferred, live carcass weight analogous to the force of gravity exerted on the carcass of the live target animal (SI: newtons); $M_{3D\_live\_carcass}$ is the 3D, anatomically-inferred, live carcass mass of the body (SI: kg); and a is the acceleration of gravity in the vicinity of the body (SI: m/s²).

$W_{3D\_live\_carcass}$ may be calculated in units of pound force via the multiplication by $k_{conv}$ as shown below:

$$W_{3D\_live\_carcass} = M_{3D\_live\_carcass} \times a \times k_{conv} \text{lbf;} \quad (2\text{-}41)$$

where the variables are as previously defined.

The 3D, anatomically-inferred, live carcass weight is a unique calculation available only with the present invention. This calculation provides the 3D, anatomically-inferred, weight of the dressed or processed carcass from 3D data sets acquired from the live animal prior to slaughter. This calculation avoids the variations inherent in present, live-animal, weight measurements due to variables such as stomach content, bladder content, and intestinal content. Stomach content alone may account for 25% of the cow's scale-measured weight. Table 2-1 shows the variations typically present in a weight measurement of a mature steer.

TABLE 2-1

Variations inherent in live weight measurements obtained with current scale technologies for a mature steer.

| ITEM | VOLUME | WEIGHT | COMMENTS |
|---|---|---|---|
| Stomach | 50 gallons | 417 lbs* | *water-filled, mature steer 50% full ~ 209 lbs |
| water/day | 5-20 gallons/day | 19-76 lbs./day | |
| feed/day (water + feed)/day | | 22 lbs./day 41-98 lbs/day | 740 lb steer |
| live weight | | 1150 lbs | sample (mature: 1100-1600 lbs.) |
| carcass wt. | | 713 lbs | 62% of live wt. |
| live - carcass wt. | | 1150 − 713 = 437 lbs | content of stomach, intestines, bladder; organs, blood, legs, head, etc. |
| typical shrinkage (4-9%) | | 1150 × 0.06 = 69 lbs. 1150 × 0.09 = 104 lbs. | 4-9% |
| excretory component (2-6%) | | 1150 × 0.04 = 46 lbs. 1150 × 0.06 = 69 lbs. | 2-6% |
| tissue component (2-3%) | | 1150 × 0.02 = 23 lbs. 1150 × 0.03 = 35 lbs. | 2-3% |
| typical scale accuracy (±0.1%) | | ±1.15 lbs (for 1150 lbs.) | ±0.1% |

Notes:
1) 1 gallon = 3.785 liters
2) 1 liter = 1 kg of water (by definition)
3) 1 gallon ~3.785 kg ~8.35 lbs (f = m a, a = 9.8 m/s$^2$)

4.8.6.c 3D, Anatomically-Inferred Carcass Weight 3D, anatomically-inferred, carcass weight is a calculation of the 3D, anatomically-inferred weight for the dressed or processed carcass based upon 3D data acquired from the scanned, post mortem carcass:

$$W_{3D\_carcass} = M_{3D\_carcass} \times a \times nt; \quad (2\text{-}41a)$$

where $W_{3D\_carcass}$ is the 3D, anatomically-inferred, carcass weight analogous to the force of gravity exerted on the dressed or processed carcass of the target animal after slaughter (SI: newtons); $M_{3D\_carcass}$ is the 3D, anatomically-inferred, carcass mass of the body (SI: kg); and a is the acceleration of gravity in the vicinity of the body (SI: m/s$^2$).

$W_{3D\_carcass}$ may be calculated in units of pound force via the multiplication by $k_{conv}$ as shown below:

$$W_{3D\_carcass} = M_{3D\_carcass} \times a \times k_{conv} lbf; \quad (2\text{-}42)$$

where the variables are as previously defined.

4.8.7 3D, Anatomically-Inferred, Dressing Percent (Yield)

Dressing percent or yield reflects the amount of carcass in relationship to live weight. (Yield is not directly related to yield grade.) It is typically calculated as follows:

$$\text{Dressing Percent (\%)} = 100 \times \frac{\text{Hot Carcass Weight}}{\text{Live Animal Weight}}; \quad (2\text{-}42a)$$

Using the calculations of this invention, a new calculation analogous to dressing percentage or yield may be computed:

$$D_{3D} = 100 \times \frac{W_{3D\_live\_carcass}}{W_{3D\_live}}; \quad (2\text{-}43)$$

where $D_{3D}$ is the 3D, anatomically-inferred, dressing percent or yield (%); $W_{3D\_live}$ carcass is the 3D anatomically-inferred, live carcass weight (nt); and $W_{3D\_live}$ is the 3D, anatomically-inferred, live weight of the target animal (nt).

This is a unique calculation numerically derived via 3D data acquired from the live target animal in addition to internal, anatomical reference data. Prior to this invention, no calculation of yield or dressing percentage was possible for a live target animal. Prior to this invention, it was necessary to weigh the animal while alive, slaughter the animal, weigh the hot carcass, and then calculate dressing percentage or yield. This invention permits a calculation of this type to be achieved on a regular basis while the target animal is growing in a feedlot or upon arrival at a sales barn or slaughter facility.

A 3D, anatomically-inferred, dressing percent or yield may also be calculated from as indicated below, taking advantage of factor cancellation in the calculation of the 3D, anatomically-inferred weights of equation (2-43):

$$D_{3D} = 100 \times \frac{M_{3D\_live\_carcass}}{M_{3D\_live}}; \quad (2\text{-}44)$$

where the gravitational acceleration constant has been factored out of the numerator and denominator; $M_{3D\_live\_carcass}$ is the 3D, anatomically-inferred, live carcass mass; and $M_{3D\_live}$ is the 3D, anatomically inferred, live mass of the target animal.

If desired, it is also possible to calculate the 3D, anatomically-inferred, dressing percent or yield from scanned data acquired from the live animal and the post mortem carcass as indicated in equations (2-45) and (2-46):

$$D_{3D} = 100 \times \frac{W_{3D\_carcass}}{W_{3D\_live}}; \quad (2\text{-}45)$$

where $W_{3D\_carcass}$ is the 3D, anatomically-inferred, carcass weight calculated from the post mortem carcass; and $W_{3D\_live}$ is the 3D, anatomically inferred, live weight of the target animal. Similarly:

$$D_{3D} = 100 \times \frac{M_{3D\_carcass}}{M_{3D\_live}}; \quad (2\text{-}46)$$

where $M_{3D\_carcass}$ is the 3D, anatomically-inferred, carcass mass calculated from the post mortem carcass; and $M_{3D\_live}$ is the 3D, anatomically inferred, live mass of the target animal.

4.8.8 USDA Feeder Cattle Grades

Loveday and Gilster [H. Dwight Loveday, Keith E. Gilster, NebGuide, G82-590-A, University of Nebraska, http://ianrpubs.unl.edu/beef/g590.htm] describe Feeder Cattle Grades as follows:

The purpose of the USDA Feeder Cattle Grades is to sort feeder cattle into similar groups that will facilitate their selling and buying. These grades can also be used for sorting feeder cattle into similar outcome groups in a feedlot. Differences in frame size and muscle thickness score are the basis for the USDA Feeder Cattle Grades.

Feeder cattle are given a grade score that is coded for both frame size (large, medium and small) and thickness (1, 2 and 3). For example, a large frame, thick feeder steer would have a feeder grade of "L–1," indicating a large frame, number 1 muscle thickness. Feeder grades consisting of frame size and thickness will only apply to normal, healthy animals. The grade "Inferior" will be used for cattle that are not expected to perform normally in their present state. Examples of "Inferior" grade would be feeder cattle that are unthrifty because of mismanagement, disease, parasitism, lack of feed or "double-muscled" cattle.

4.8.8.a USDA Frame Size

Frame size refers to the animal's skeletal size—its height and body length in relation to its age. Frame size is highly correlated with the live weight at which an animal will produce a carcass of a given degree of fatness or quality grade. Frame size relates to the slaughter weight to which an animal must be fed before it will attain U.S. Choice grade. Generally, the larger the frame size, the longer the feeding period and the greater the live weight necessary to grade U.S. Choice. However, a higher rate of gain may be achieved from the larger frame cattle.

According to USDA standards:

Frame size is related to the weight at which, under normal feeding and management practices, an animal will produce a carcass that will grade Choice. Large frame animals require a longer time in the feedlot to reach a given grade and will weigh more than a small-framed animal would weigh at the same grade.

Large Frame (L): Feeder cattle, which possess typical minimum qualifications for this grade, are thrifty, have large frames, and are tall and long bodied for their age. Steers and heifers would not be expected to produce U.S. Choice carcasses (about 0.50 inch (1.3 cm) fat at twelfth rib) until their live weights exceed 1250 pounds (567 kg) and 1150 pounds (522 kg), respectively.

Medium Frame (M): Feeder cattle, which possess typical minimum qualifications for this grade, are thrifty, have slightly large frames, and are slightly tall and slightly long bodied for their age. Steers and heifers would be expected to produce U.S. Choice carcasses (about 0.50 inch (1.3 cm) fat at twelfth rib) at live weights of 1100 to 1250 pounds (499 to 567 kg) and 1000 to 1150 pounds (454 to 522 kg), respectively.

Small Frame (S): Feeder cattle included in this grade are thrifty, have small frames, and are shorter bodied and not as tall as specified as the minimum for the Medium Frame grade. Steers and heifers would be expected to produce U.S. Choice carcasses (about 0.50 inch (1.3 cm) fat at twelfth rib) at live weights of less than 1100 pounds (499 kg) and 1000 pounds (454 kg), respectively.

Calculations of Frame Size Grades are possible with the present invention via empirical formulas derived from one or more of the following 3D calculations:

1) hip height;
2) rump width;
3) shoulder height;
4) shoulder width;
5) 3D, anatomically-inferred live weight;
6) BCS score; and
7) age.

Reference should be made to USDA Feeder Cattle Grade Standards, FC1000 for an illustration of the USDA frame size chart.

4.8.8.b USDA Muscle Thickness

Thickness is related to muscle to bone ratio and at a given degree of fatness to carcass yield grade. Thicker, muscled animals will have more lean meat. The USDA Feeder Cattle Standards recognize four muscle thickness grades as stated below:

No. 1: Feeder cattle, which possess minimum qualifications for this grade usually display, predominate beef breeding. They must be thrifty and moderately thick throughout. They are moderately thick and full in the forearm and gaskin, showing a rounded appearance through the back and loin with moderate width between the legs, both front and rear. Cattle show this thickness with a slightly thin covering of fat; however, cattle eligible for this grade may carry varying degrees of fat.

No. 2: Feeder cattle, which possess minimum qualifications for this grade usually, show a high proportion of beef breeding and slight dairy breeding may be detected. They must be thrifty and tend to be slightly thick throughout. They tend to be slightly thick and full in the forearm and gaskin, showing a rounded appearance through the back and loin with slight width between the legs, both front and rear. Cattle show this thickness with a slightly thin covering of fat; however, cattle eligible for this grade may carry varying degrees of fat.

No. 3: Feeder cattle, which possess minimum qualifications for this grade, are thrifty and thin through the forequarter and the middle part of the rounds. The forearm and gaskin are thin and the back and loin have a sunken appearance. The legs are set close together, both front and rear. Cattle show this narrowness with a slightly thin covering of fat; however, cattle eligible for this grade may carry varying degrees of fat.

No. 4: Feeder cattle included in this grade are thrifty animals, which have less thickness than the minimum requirements specified for the No. 3 grade.

Muscle thickness is evident in the 3D data. An inspection of USDA Feeder Cattle Standards, FIG. 4-37, shows the decrease in rump width as the Muscle Thickness Grades progress from No. 1 through No. 4. It should also be noted that the leg separation (end view) is proportionately greater for a Muscle Thickness Grade No. 1 than for Grade No. 4. It should also be noted that the degree of skin curvature changes with muscle grade. From the above observations, a number of empirical formula may be established to determine the Muscle Thickness Grade.

A template match is used to obtain the normalized body outline obtained from a lateral plane trans-section of the rear quarters of the cow (see FIG. 4-37). The more muscled animal, Grade No. 1, exhibits a broader outline with a greater foot separation (not unlike the gorilla-like gait of a musclebound human wrestler). The less muscled animal exhibits a narrower outline with narrow foot separation. This method normalizes the height of the outline and matches the cross-sectional outline to the standardized templates. The best-fit template is the Grade Number. Interpolation of this technique can provide intermediate grade numbers as well.

FIGS. 4-38A and 4-38B illustrate an optimization of the concept shown in FIG. 4-37 by selecting an oblique plane which bisects the largest muscular region of the rear quarters (FIG. 4-38A). A standardized template match to the normalized body outline provides the Grade determination. Interpolation of this technique can also provide intermediate grade numbers.

While FIGS. 4-37, 4-38A and 4-38B provide specific intersecting planes in specific regions of the animal, it is apparent that any number of planes through a muscled region of the animal may be used to empirically determine the Muscle Thickness Grade. A further extension of this concept provides that cross-sectional areas and regional volumes may also be used successfully.

The Muscle Thickness Grade obtained from one or more of the methods above may be modified or corrected for excessive fat by considering the BCS score. Specifically, a Muscle Thickness Grade of 1 or 2 may be empirically reduced for excessive fat if a BCS scores of 4 or 5 results. Excessive amounts of fat may erroneously contribute to higher muscle thickness scores. A BCS score of 1-3 is not likely to impact the Muscle Thickness Grade as calculated herein.

Reference should be made to USDA Feeder Cattle Grade Standards FC 1000 for an illustration of a USDA muscle thickness chart.

4.8.9 USDA Slaughter Cattle Grades 4.8.9.a Maturity

Maturity grades are based on the physiological age of the carcass. They are typically measured by the degree of ossification of the vertebrae.

Grade A—9-30 months;
Grade B—30-42 months;
Grade C—42-72 months;
Grade D—72-96 months; and
Grade E—<96 months.

Grades A and B are classified as young cattle while grades C, D, and E are classified as mature cattle.

In accordance with the methods of this latest embodiment of the invention, the maturity grade is computed from the age of the animal. The birth date is subtracted from the present date and an age, typically in months, is computed. The age in months is compared via table look-up or conditional logic to a table of the character set forth in the preceding paragraphs to assign the appropriate maturity grade.

4.8.9.b USDA Quality Grades

Slaughter cattle quality grades are based on factors elated to the palatability of the meat. The quality grades for the designated classes are as listed below:

| Class | Grades |
|---|---|
| steers and heifers: | prime, choice, good, standard, commercial, utility, cutter and canner; |
| cows: | choice, good, standard, commercial, utility, cutter and canner; |
| bullocks: | prime, choice, standard, utility; and |
| bulls: | not quality graded. |

While the methods of this latest form of the invention are incapable of directly measuring factors related to the palatability of meat, a Quality Grade estimate may be made from the following calculations:

1) Maturity;
2) BCS;
3) Muscle Thickness; and
4) Frame Size.

From each of these calculations a percentile score may be derived. This percentile score would be high, closer to 100%, for parameter values that enhance quality grade and low, closer to 0%, for parameter values that do not enhance quality grade. The final quality grade would be assessed as a result of the combination of percentile scores.

An example of a maturity percentile score, $P_M$, is as follows $$P_M = 100 * \exp\left(-\frac{A_{mo}}{120}\right), \quad (2\text{-}47)$$

where $P_M$ is the percentile score for maturity; and $A_{mo}$ is the age of the animal in months. With this example the following ages result in the corresponding percentile scores:

TABLE 2-3

Sample values for the Maturity Percentile Score from Equation (2-47).

| Age, $A_{mo}$ (months) | Maturity Grade | Percentile Score, $P_M$ (%) |
|---|---|---|
| 9 | A | 92.8 |
| 24 | A | 82.9 |
| 36 | B | 74.1 |
| 48 | C | 67.0 |
| 80 | D | 51.3 |
| 100 | E | 43.5 |

From Table 2-3, it is evident that the percentile score drops as the age of the animal increases. The sample equation (2-47) was proposed in this manner since the palatiblity of the meat decreases with the age of the animal. Empirical data is necessary to determine the precise coefficients or form of the equation.

An example of a percentile score for quality grade that is a function of BCS is:

$$P_{BCS} = 100 + 10*[-(BCS-3)^2]; \quad (2\text{-}48)$$

where $P_{BCS}$ is the BCS percentile score (%); and BCS is the BCS score from 1 to 5 as described previously.

TABLE 2-4

Sample values for the BCS Percentile Score from Equation (2-48).

| BCS score | Percentile Score, $P_{BCS}$ |
|---|---|
| 1.0 | 60.0 |
| 2.0 | 90.0 |
| 2.5 | 97.5 |
| 3.0 | 100.0 |
| 3.5 | 97.5 |
| 4.0 | 90.0 |
| 5.0 | 60.0 |

From Table 2-4, it is evident that the percentile score is maximum for BCS scores between 2 and 4 with a lowering of the percentile score for BCS values below 2.0 and above 4.0. This would account for a decrease in palatability for emaciated cows with a BCS below 2.0 where the meat quality would likely be tough. It would also account for a decrease in palatability for BCS scores over 4.0. A high BCS score corresponds to an excessively fat cow where there is likely to be excessive marbling or fat content which also reduces the palatability of the meat. Empirical data is necessary to determine the precise coefficients or form of the equation.

Similar percentile score equations may be derived for muscle thickness and frame size if these parameters are empirically determined to contribute to the palatability of the meat.

An overall quality score may be determined from a combination of the percentile scores as indicated below:

$$P_Q = \text{mean}(P_M, P_{BCS}); \quad (2\text{-}49)$$

where $P_Q$ is the quality percentile which is the mean of the maturity percentile, $P_M$ and the BCS percentile, $P_{BCS}$. While equation (2-49) indicates a mean or average of the percentile scores, other combining formulas may be considered within the scope of this invention. One other such formula might include a weighted average where maturity is weighted more heavily than BCS score.

TABLE 2-5

Sample values for the BCS Percentile Score from Equation (2-49).

| BCS score | BCS Percentile Score, $P_{BCS}$ (%) | Age, $A_{mo}$ (months) | Maturity Grade | Maturity Percentile, $P_M$ (%) | Quality Percentile, $P_Q$ (%) |
|---|---|---|---|---|---|
| 1.0 | 60.0 | 9 | A | 92.8 | 76.4 |
| 1.0 | 60.0 | 100 | E | 43.5 | 51.8 |
| 2.0 | 90.0 | 36 | B | 74.1 | 82.1 |
| 2.0 | 90.0 | 100 | E | 43.5 | 66.8 |
| 3.0 | 100.0 | 9 | A | 92.8 | 96.4 |
| 3.0 | 100.0 | 36 | B | 74.1 | 66.8 |
| 4.0 | 90.0 | 48 | C | 67.0 | 78.5 |
| 4.0 | 90.0 | 80 | D | 51.3 | 70.7 |
| 5.0 | 60.0 | 9 | A | 92.8 | 76.4 |
| 5.0 | 60.0 | 36 | B | 74.1 | 67.1 |

Table 2-5 shows a number of possible combinations of BCS scores, Maturity grades, and resulting quality percentiles according to equations (2-47), (2-48), and (2-49). In these examples the highest quality percentile, 96.4%, occurs for a BCS score of 3.0 and an age of 9 months. This combination is likely to yield a high quality, palatable meat. Conversely, an emaciated animal with a BCS score of 1.0 and an age of 100 months yields a quality percentile of 51.8%. This combination is likely to be tough and unpalatable.

To obtain the actual quality grade, a scale converting Quality Percentile to Quality Grade may be empirically determined. Such a scale needs be determined for each of the sex conditions below and their corresponding quality grades:

steers and heifers: prime, choice, good, standard, commercial, utility, cutter and canner;
cows: choice, good, standard, commercial, utility, cutter and canner;
bullocks: prime, choice, standard, utility; and
bulls: not quality graded.

4.8.9.c USDA Yield Grades

Slaughter cattle yield grades are estimates of the percentage retail yield of the four primal cuts of beef, namely, chuck, rib, loin, and round. These grades identify the difference in the amounts of lean red meat and waste fat. USDA yield grades are:

USDA 1—Most desirable, trim;
USDA 2;
USDA 3—industry average;
USDA 4; and
USDA 5—least desirable, excessive fat.

The yield grades are currently based upon the following traits:
hot carcass weight;
fat thickness at the 12$^{th}$ rib;
percentage of kidney, heart, and pelvic fat; and
rib eye area.

An empirically determined formula similar to that discussed in Section 4.8.8.b for Quality Grades may be employed here for Yield Grades. In this situation, the Percentile Scores would pertain to an empirically-determined combination of one or more of the following:

a) 3D, anatomically-inferred, live carcass mass;
b) 3D, anatomically-inferred, live carcass weight;
c) 3D, anatomically-inferred, carcass mass;
d) 3D, anatomically-inferred, carcass weight;
e) 3D, anatomically-inferred, dressing percent;
e) BCS score;
f) Frame size; and
g) Muscle Thickness Grade.

The Yield Grade would be lower (better) for higher values of items a), b), c), d), e), and f). Whereas, the Yield Grade would be better for a BCS score near 3.0 and a lower Muscle Thickness Grade. Conversely, the Yield Grade would be higher (worse) for lower values of items a), b), c), d), e), and f), BCS scores near 1.0 or 5.0, and higher (worse) Muscle Thickness Grades. Reference should be made to Beef Cattle Grading, South Dakota State University, Dept. of Animal and Range Science Beef Extension and Research Science Beef Extension and Research, for illustrations of Beef yield grades 1, 2, 3, 4, and 5 and for illustrations of Beef quality grades: prime, choice, select and standard.

4.8.10 Other Cattle Calculations

Numerous other calculations are commonly used to size and evaluate cattle. Some of these include muscling score and frame score.

4.8.10.a Muscling

A good indicator of carcass muscling is the rib eye area. An average beef steer has approximately 1.1 in$^2$ of rib eye area per 100 lbs. live weight. For example, a 1250-pound steer should have a rib eye area of approximately 12.7 square inches. Heifers exhibit slightly less muscling for the same weight. The methods of this invention may be used to calculate rib eye area as described in Section 2.3.1. This rib eye area may in turn be used as an indicator of muscling.

4.8.10.b Frame Score

Frame score is a single digit score, computed from a mathematical formula based on age and hip height. The score works only for cattle between the ages of 5 and 21 months. It is a score normalized to an age of 18 months. This score, ranging from 2 to 9, permits feedlots to estimate the finished weight of an animal and how long it may take to achieve it. An animal with a higher frame score is taller at the hip than an animal with a lower frame score. The higher the frame score, the greater the finish weight and the longer it takes to obtain finish. Cattle with higher frame scores also require higher maintenance feed costs.

The standard computation of frame score may be made using the hip height determined from the methods of this invention as described in Section 4.8.2.a of this specification.

Equation 2-50 shows a frame score for heifers between the ages of 5 and 21 months:

$$F_{heifer} = 11.548 + 0.4878h - 0.0289 t_{age} + 0.0000146 t_{age}^2 + 0.0000759 h t_{age}; \quad (2\text{-}50)$$

where $F_{heifer}$ is the frame score between 2 and 9; h is the hip height in inches as calculated using the methods of this invention; and $t_{age}$ is the age of the heifer in days [*Hip Height and Frame Score Determination*, Oklahoma State University, ttp://www/ansi.okstate.edu/exten/beef/f-3271/f-3271.html].

Similarly, equation 2-51 shows such a score formula for bulls between the ages of 5 and 21 months:

$$F_{bull} = 11.548 + 0.4878h - 0.0289t_{age} + 0.00001947t_{age}^2 + 0.0000334ht_{age}; \quad (2\text{-}51)$$

where $F_{bull}$ is the frame score between 2 and 9; h is the hip height in inches as calculated using the methods of this invention; and $t_{age}$ is the age of the heifer in days.

FIG. 4-39, which comprises a family of frame score curves, shows the expected growth for bulls. Within each frame score curve, the hip height increases as the bull matures.

TABLE 2.6

Common live cattle measurements, ranges and averages.

| Measurement | Range | Average | Units |
|---|---|---|---|
| Hip Height[3] (age - 21 mo.) | 45.3-61.0 (bull) 42.3-57.7 (heifer) | | in. |
| Rump Width | | | |
| Heart Girth[1] | 69.3-82.8 | 74.6 | in. |
| Live Weight | 950-1500 | 1150 | lbs. |
| Hot Carcass Weight | | 713 | lbs. |
| Dressing Percent | 55-67% (steers & heifers) | 62% (choice steers & heifers) | % |
| Muscling coefficients | | 1.1 (1150 lb. steer) 1.01 (1150 lb. heifer) | in² rib eye area per 100 lbs. live weight |
| Muscling (rib eye area) | 10-18 | 12.6 (1150 lb. steer) 11.6 (1150 lb. heifer) | in² |
| Backfat Thickness (12th rib) | 0.15-0.8 | 0.5 | in. |
| Frame Size[2] | Small (S) Medium (M) Large (L) | | |
| Frame Score[3] (from formula using age & hip height) | 1 through 11 | | |
| Body Condition Score | | | |
| Thickness Grade[2] | No. 1 No. 2 No. 3 Inferior | | |
| Yield Grade (est. of % retail yield from 4 primal cuts - chuck, rib, loin, round) | USDA 1 - most desirable USDA 2 USDA 3 - average USDA 4 - USDA 5 - least desirable, fat | USDA 3 | |
| Quality Grade (factors that affect the palatability of meat) | prime choice select standard | | |
| Maturity (physiological age of carcass) | A - 9-30 months (young) B - 30-42 mo. (young) C - 42-72 mo. (mature) D - 72-96 mo. (mature) E -> 96 mo. (mature) | | |
| Marbling (scored in the rib eye muscle at the 12th rib) | 1 - practically devoid 2 - traces 3 - slight 4 - small 5 - modest 6 - moderate 7 - slightly abundant 8 - moderately abundant 9 - abundant | | |

[1]Estimating Beef Cattle Weight, farmca.com/weight.html
[2]Livestock Market Terms, Part III: G84-710-A, http://ianrpubs.unl.edu/farmmgt/g710.htm
[3]Hip Height and Frame Score Determination, http://www/ansi.okstate.edu/exten/beef/f-3271/f-3271.html all other measurements: Beef Cattle Grading, South Dakota State University, Dept. of Animal and Range Science Beef Extension and Research, http://ars.sdstate.edu/AnimalEval/beefgrade.htm

4.8.11 Retail Product Calculations

Meat processors have a desire to know the percentage and amounts of retail product which will result from an animal of given size and composition since this is the primary revenue source for their operation. Table 2.7 shows the retail products typical from a steer with live weight of 1150 lbs. and dressing percent (or yield) of 62.2% using typical scale measurements for determining the assorted weights.

Using the methods of this latest form of the invention, it is possible to calculate an equivalent table substituting the 3D, anatomically-inferred weights for the various beef cuts for those values obtained by current scale methods. The 3D, anatomically-inferred weights may be calculated from either the live-animal scanned data or the carcass-scanned data. In either case, the percentage of the carcass for each cut may be calculated from the ratio of 3D, anatomically-inferred weight for that specific cut to the 3D, anatomically-inferred weight of the entire carcass. The percentage of the carcass may also be calculated from the ratio of 3D, anatomically-inferred masses for the appropriate parts.

With the calculations of 3D, anatomically-inferred masses and 3D, anatomically-inferred weights available via this invention, data similar to Table 2.7 may be compiled from live animal data. Such compilations may prove advantageous during many stages of the production and processing of food animals. Examples where such computations may prove useful include, but are not limited to:

a) feedlots, on a regular basis during the growth cycle, in evaluating feed decisions;
b) breeders, as early feedback for their breeding choices;
c) auction barns, in their evaluation of live animals and sale prices; and
d) processing plants, as they receive live animals.

TABLE 2.7

Retail products typical from a 1150 lbs. steer with a dressing percent of 62.2%.

| PRODUCT | WEIGHT (lbs.) | % OF CARCASS |
|---|---|---|
| hot carcass weight | 715 | 100.0% |
| red meat | 569 | 79.6% |
| fat & bone | 146 | 20.4% |
| chuck | 209.5 | 29.3% |
| blade roasts & steaks | 33.9 | 4.7% |
| ground beef, stew meats | 83.3 | 11.7% |
| arm pot roasts & steaks | 35.5 | 5.0% |
| cross rib pot roast | 25.4 | 3.6% |
| fat & bone | 31.4 | 4.4% |
| round | 155.8 | 21.8% |

TABLE 2.7-continued

Retail products typical from a 1150 lbs. steer with a dressing percent of 62.2%.

| PRODUCT | WEIGHT (lbs.) | % OF CARCASS |
| --- | --- | --- |
| top round | 34.6 | 4.8% |
| bottom round | 31.2 | 4.4% |
| tip | 16.8 | 2.3% |
| rump | 7.8 | 1.1% |
| ground beef | 33.4 | 4.7% |
| fat & bone | 32.0 | 4.5% |
| thin cuts | 134.6 | 18.8% |
| flank steak | 3.6 | 0.5% |
| pastrami squares | 2.9 | 0.4% |
| outside skirt | 2.2 | 0.3% |
| inside skirt | 2.5 | 0.3% |
| boneless brisket | 16.0 | 2.2% |
| ground beef & stew meat | 87.3 | 12.2% |
| bone & fat | 20.1 | 2.8% |
| Loin | 115.7 | 16.2% |
| porterhouse steaks | 19.6 | 2.7% |
| T-bone steak | 9.8 | 1.4% |
| strip steak | 15.0 | 2.1% |
| sirloin steak | 15.3 | 2.1% |
| tenderloin steak | 6.8 | 1.0% |
| ground beef & stew meat | 22.7 | 3.2% |
| bone & fat | 26.5 | 3.7% |
| Rib | 66.6 | 9.3% |
| rib roast | 23.9 | 3.3% |
| rib steak | 9.2 | 1.3% |
| short ribs | 8.6 | 1.2% |
| ground beef & stew meat | 16.5 | 2.3% |
| bone & fat | 8.4 | 1.2% |
| Miscellaneous | 32.7 | 4.6% |
| kidney & hanging tender | 4.9 | 0.7% |
| fat, suet & cutting losses | 27.8 | 3.9% |

Source: New York Beef Industry Council, Inc.

4.9 Hog Calculations from 3D Data

Many aspects of this latest embodiment of the invention apply equally to cattle and hogs. Obviously, there are some differences in the anatomy and the size of the animals which require minor modifications.

4.9.1 Body Condition Scoring

The basic concepts of body condition scoring (BCS), as previously discussed apply equally to hogs and cattle.

The hog anatomy and the respective location of fat deposits require a slightly different analysis algorithm to determine BCS scores. The application of BCS, via the 3D data analysis methods of this latest form of the invention, provides a quantitative indicator of the fat or lean condition of the target hog, similar to cattle.

An especially advantageous application of the present invention is to evaluate the effectiveness of sow feeding programs via body condition scoring (BCS). Presently there are at least three methods to assess how well sows are being fed: body condition scoring, backfat probing and weighing with a scale system. The preferred method is body condition scoring but, the implementation of the present BCS evaluation methods require direct contact with the target sow to ascertain the fat present over specific anatomical sites. The present invention provides an automatic, non-contact, remote and instantaneous evaluation of the BCS score. Instead of being limited to a BCS evaluation only a few times during the reproductive cycle, the present invention permits daily or weekly scoring in a convenient and stress-free manner. Armed with this information on a regular basis, adjustments may be made to the feeding levels, nutrition or management practices in order to maintain a BCS score close to 3.0 on a 1 to 5 scale throughout the herd. Table 3.1 illustrates the characteristics of the BCS scores for hogs.

TABLE 3.1

Present Body Condition Scoring Criteria for Hogs

| Score Number | Condition | Description | Shape of Body |
| --- | --- | --- | --- |
| 5 | Overfat | Hips and backbone heavily covered | Bulbous |
| 4 | Fat | Hips and backbone cannot be felt | Tending to bulge |
| 3.5 | Good condition | Hips and backbone only felt with difficulty | Tube shape |
| 3 | Normal | Hips and backbone only felt with firm palm pressure | Tube shaped |
| 2.5 | Somewhat thin | Hips and backbone felt without palm pressure | Tube shaped but flat (slab) sides |
| 2 | Thin | Hips and backbone noticeable and easily felt | Ribs and spine can be felt |
| 1 | Emaciated | Hips and backbone visible | Bone structure apparent (ribs and backbone) |

From: *Managing Pig Health and the Treatment of Disease*
source: http://www.thepigsite.com/stockstds/Default.asp?display=23 (see also FIG. 4-40.)

The dimensions and calculations of this latest form of the invention may be applied in an empirical manner to determine the BCS score as follows:

$$S_1 = k_1 \times \left(\frac{W_{rmp}}{H_{hip}}\right) - k_2 \times \left(\frac{H_{bb}}{W_{rmp}}\right) - C_{\text{offset}} \qquad (3\text{-}1)$$

where $S_1$ is the unitless BCS score for the target hog (1 through 5); $W_{rump}$ is the rump width; $H_{hip}$ is the hip height; $H_{bb}$ is the protrusion of the backbone from the surrounding back region; $k_1$ is the scalar coefficient for the ratio of rump width to hip height; $k_2$ is the scalar coefficient for the ratio of backbone protrusion to rump width; and $C_{\text{offset}}$ is a calibration offset term. The units for the terms within ratios must match (i.e., all cm or all inches). The scalar coefficients and the offset term are unitless. The equation form and coefficients are to be empirically derived from the representative 3D dimensions. Experimental values graphically derived from BCS Figures in FIG. 3-1 yield:

$k_1 = 10.4$;

$k_2 = 13.8$; and $C_{\text{offset}} = 2.05$.

The hog BCS scores may also be determined via template matching to the 3D data outlines in a manner similar to their cattle counterpart as indicated in FIGS. 4-18 and 4-19. FIG. 4-41 shows a sample of this technique applied to hogs.

4.9.2 Linear Calculations

Many of the linear hog calculations are similar to their cattle counterparts.

4.9.2.a Hip Height

The hog hip height calculation is similar to its cattle counterpart since it is the dimension from the floor to the top of the hips. The caution which applies to the tailhead region of cattle does not apply to hogs since the porcine tail is substantially smaller in diameter and positioned in a more convenient location anatomically.

4.9.2.b Rump Width

The hog rump width calculation is similar to its cattle counterpart since it is the maximum width in the pelvic region. The pelvic region must be identified as with cattle since hogs may also exhibit a greater width in the abdominal region of their body.

4.9.2.c Shoulder Height

The hog shoulder height dimension may be calculated identical to its counterpart in cattle. It is the greatest elevation in the region of the shoulders.

4.9.2.d Shoulder Width

The hog shoulder width dimension may be calculated identical to its counterpart in cattle. It is the greatest width in the region of the shoulders. As with its cattle counterpart, it is necessary to longitudinally locate the shoulder region since a greater width may be exhibited in the abdominal region.

4.9.2.e Length

The hog length dimension may be calculated similar to its counterpart in cattle. The caution accompanying the cattle calculation with regard to the tail position holds though the porcine tail is shorter and thinner. The caution associated with a turned head position also holds for hogs though the degree of rotation for hogs is substantially less than that of cattle.

4.9.2.f Heart Girth

The heart girth dimension may be calculated identical to its counterpart in cattle.

4.9.2.g Backfat Thickness

The backfat thickness calculation for hogs may be achieved similar to the empirical, BCS scoring technique for cattle. The hog BCS scores of Section 4.9.1 apply.

4.9.3 Area Calculations

The hog area calculations may be achieved similar to their cattle counterparts, though obviously, porcine cross-sectional areas will be used in place of the bovine cross-sections.

4.9.3.a Loin Eye Area

Loin eye area can be measured manually on the hanging carcass by cutting through the backbone and loin eye muscle between the 10th and 11th ribs perpendicular to the backbone. This manual measurement is commonly used to judge the lean weight of the carcass. The loin eye area may be calculated by the methods of this invention similar to the rib eye area of cattle described in Section 4.8.3.a.

4.9.3.b Pigskin Areas

The pigskin areas may be calculated similar to that described for cowhide. The leather applications are similar to those of cattle. However, this calculation may take on special interest for those target pigs that have their skin harvested for medical applications such as burn grafts. The ability to quantify the skin area associated with a certain quality of skin tissue may be especially valuable.

4.9.3.c Cross-Sectional Areas

From the porcine 3D data it is possible to provide numerous cross-sectional slices of the live hog. Cross-sectional views might include the regions of the shoulder, loin, or hips. Longitudinal slices may also be useful. Used in conjunction with cross-sectional anatomical reference data provided by medical MRI scanning or other techniques, these cross-sectional slices may be used to morph or proportionally scale the anatomical reference images to fit the current live animal thus providing a very accurate estimate of muscle and fat content of the live animal.

Conceptually (though not anatomically), 3D cross-sectional pork slices are similar to those shown for cattle in FIGS. 4-33A, B and C.

4.9.3.d Non-Uniform Area Scaling

The discussion of non-uniform area scaling for cattle (Section 4.8.3.d) applies in a similar manner for hogs with an allowance for the obvious anatomical differences.

4.9.3.e Internal, Anatomical Areas

The discussion of internal, anatomical areas for cattle (Section 4.9.3.d) applies in a similar manner for hogs with an allowance for the obvious anatomical differences.

4.9.4 Volumetric Calculations

The discussion of volumetric calculations, such as live volume, live carcass volume and carcass volume, for cattle (Section 4.8.4) applies in a similar manner for hogs with an allowance for the obvious anatomical differences.

4.9.5 Calculations of 3D, Anatomically-Inferred, Mass

The discussion of 3D, anatomically-inferred, mass calculations, such as 3D, anatomically-inferred, live mass, 3D, anatomically-inferred, live carcass mass, and 3D, anatomically-inferred, carcass mass, for cattle (Section 4.8.5) applies in a similar manner for hogs with an allowance for the obvious anatomical differences.

4.9.6 Calculations of 3D, Anatomically-Inferred, Weight

The discussion of 3D, anatomically-inferred, weight calculations, such as 3D, anatomically-inferred, live weight, 3D, anatomically-inferred, live carcass weight, and 3D, anatomically-inferred, carcass weight, for cattle (Section 4.8.6) applies in a similar manner for hogs with an allowance for the obvious anatomical differences.

4.9.7 Calculations of 3D, Anatomically-Inferred, Dressing Percent (Yield)

The discussion of 3D, anatomically-inferred, dressing percent (yield) calculations, for cattle (Section 4.8.7) applies in a similar manner for hogs with an allowance for the obvious anatomical differences.

4.9.8 Muscle Score

The degree of muscling of a hog is considered when grading market hogs and pork carcasses. Three degrees of pork carcass muscling are recognized:

Muscle Score #1—Thin (inferior)
Muscle Score #2—Average
Muscle Score #3—Thick (superior)

The Muscle Score, $S_{muscle}$, may be determined from a comparison of target animal shape with those of reference templates for each of the three muscle score designations.

4.9.9 USDA Slaughter Hog Grades

There is one set of slaughter swine grades for barrows and gilts. These grades are affected by quality of lean, belly thickness, and expected yield of the ham, loin, picnic and boston butt. These grades include:

US No. 1 (Highest Yield);
US No. 2;
US No. 3;
US No. 4 (Lowest Yield); and
Utility.

A formula often used to compute the USDA slaughter hog grade is shown below[3]:

[3]*United States Standards for Grades of Slaughter Swine*, United States Department of Agriculture, Agricultural Marketing Service, Livestock and Seed Division, effective date: Jan. 14, 1985.

$$G_{USDA\ SLAUGHTER} = 4T_{backfat} - S_{muscle}; \quad (3\text{-}4)$$

where $G_{USDA\ SLAUGHTER}$ is the USDA hog slaughter grade; $T_{backfat}$ is the last rib backfat thickness (in.); and $S_{muscle}$ is the muscle score.

A formula similar to that of equation (3-4) may be mathematically determined with the calculations of this invention as indicated below:

$$G_{USDA\ SLAUGHTER} = k_1 \times f(S_{BCS}) - S_{muscle};\qquad(3\text{-}5)$$

where $G_{USDA\ SLAUGHTER}$ is the USDA hog slaughter grade; $S_{BCS}$ is the BCS score as described in Section 3.1; $k_1$ is a scalar; $f(S_{BCS})$ is a linear or nonlinear mathematical function empirically derived from the BCS score; and $S_{muscle}$ is the muscle score as described in Section 3.8.

4.9.10 USDA Feeder Pig Grades

There are one set of feeder pig grades. Feeder pig grades are affected by muscling, fat cover, and frame size. These grades are:

US No. 1
US No. 2
US No. 3
US No. 4
US Utility
US Cull.

The grade characteristics may be readily calculated and classified as previously illustrated for cattle. An empirically determined formula may be established to convert the 3D calculations of this invention into a numerical feeder pig grade.

4.9.11 Retail Product Calculations

Pork processors have a desire to know the percentage and amounts of retail product which will result from an animal of given size and composition since this is the primary revenue source for their operation. Table 3.2. shows a sample of Hog Carcass Breakdown.

Using the methods of this invention, it is possible to calculate an equivalent table substituting the 3D, anatomically-inferred weights for the various beef cuts for those values obtained by current scale methods. The 3D, anatomically-inferred weights may be calculated from either the live-animal scanned data or the carcass-scanned data. In either case, the percentage of the carcass for each cut may be calculated from the ratio of 3D, anatomically-inferred weight for that specific cut to the 3D, anatomically-inferred weight of the entire carcass. The percentage of the carcass may also be calculated from the ratio of 3D, anatomically-inferred masses for the appropriate parts.

With the calculations of 3D, anatomically-inferred masses and 3D, anatomically-inferred weights available via this invention, hog data similar to Table 3.2 may be compiled from live animal data as previously illustrated for cattle products. Such compilations may prove advantageous during many stages of pork production and processing. The sample data in Table 3.2 is for a 250-lb market weight hog having a yield of 73.6%.

TABLE 3.2

Sample of Hog Carcass Breakdown (Source: National Pork Producers Council)

| Item | Weight (lbs.) | Percentage of Carcass |
|---|---|---|
| Market weight | 250 lbs. | |
| Typical carcass | 184 | 73.6% yield |
| Pork | 140 | |
| Skin, fat, bones | 44 | |
| Ham | 45 | 24.0% |
| cured ham | 25.5 | |
| fresh ham | 2.3 | |
| trimmings | 5.8 | |
| skin, fat, bones | 11.4 | |
| Side (belly) | 34.9 | 19.0% |
| cured bacon | 19 | |
| spareribs | 5.8 | |
| trimmings | 9.1 | |
| fat | 1 | |
| Loin | 33.8 | 18.0% |
| backribs | 3.2 | |
| boneless loin | 10.7 | |
| country-style ribs | 7.6 | |
| sirloin roast | 5.7 | |
| tenderloin | 1.6 | |
| trimmings | 1.6 | |
| fat & bones | 3.4 | |
| Picnic | 16.6 | 9.0% |
| boneless picnic meat | 12.6 | |
| skin, fat, bones | 4 | |
| Boston butt | 14.7 | 8.0% |
| blade steak | 4.4 | |
| blade roast | 7.8 | |
| trimmings | 1.7 | |
| fat | 0.8 | |
| Miscellaneous | 39.2 | 22.0% |
| jowls, feet tail, neck | 15.4 | |
| bones | 22 | |
| skin, fat, bones shrink & misc. | 1.8 | |

4.9 Growth Curves and Projections

The periodic acquisition of 3D data provides the ability to monitor and evaluate the anatomical progression of an animal over time. Using calculations described herein, the growth of an animal may be charted, analyzed and projected. Curves may be empirically fit to the data and growth parameters may be determined from these curves. Using curves and parameters empirically proven for a given breed of cattle, the growth observed in the early months of an animal's life may be used to project the finished 3D, anatomically-inferred live weight (referred to in abbreviated format as: "3DAI live weight") of the animal and its 3DAI live weight at any time prior to achieving that finished 3DAI live weight.

4.10.1 Calculations over Time

Due to the straightforward manner of acquiring the 3D data as described in U.S. patent application Ser. No. 10/211,792 filed by one of the present inventors, these data may conveniently be acquired at regular intervals such as once a month, once a week, or even daily. As a result, any of the calculations described herein may be computed and observed as a function of time as illustrated in FIG. 4-42A, which shows hip height from birth through 40 months. Similarly, FIG. 4-42B shows 3DAI live weight for the same time period.

4.10.2 Growth Curves

A mathematical curve may be formulated that expresses the calculations obtained from the 3D data as a function of time. Such a curve may be used to represent the growth of the animal or to determine mathematical parameters, which characterize that growth. The lines through the data shown in FIG. 4-43 are examples of such curves.

4.10.1 Curve Fitting

Numerous techniques are available to fit a mathematical curve to the 3D calculation data such as that shown in FIGS. 4-42A and B. One simple example will be shown here to illustrate the concept. It is understood that the application of other equations, known to those skilled in the art of curve fitting, are also intended to be within the scope of this invention. One mathematical equation which fits the simulated 3D data of FIG. 4-42A is shown in equation (4-1):

$$h_{hip} = h_{hip\_gain}(1 - e^{-t/\tau}) + h_{hip\_birth}; \quad (4\text{-}1)$$

where $$h_{hip\_gain} = h_{hip\_target} - h_{hip\_birth}; \quad (4\text{-}2)$$

and $h_{hip}$ is the hip height (in); $h_{hip\_gain}$ is the hip height gain after birth (in); t is time (months); τ is the exponential time constant (months); $h_{hip\_target}$ is the target or finished hip height; and $h_{hip\_birth}$ is the hip height at birth (in).

For the curve of FIG. 4-1(*a*), the parameter values are as follows:

$$h_{hip\_gain} = h_{hip\_target} - h_{hip\_birth} = 58.5 \text{ in} - 30 \text{ in} = 28.5 \text{ in; and } \tau = 8.2 \text{ months;}. \quad (4\text{-}3)$$

where the variables are as previously defined.

One mathematical equation which fits the simulated data of FIG. 4-42B is shown in equation (4-4):

$$w_{live} = w_{gain}(1 - e^{-t/\tau}) + w_{birth}; \quad (4\text{-}4)$$

where $$w_{gain} = w_{target} - w_{birth}; \quad (4\text{-}5)$$

and $w_{live}$ is the 3DAI live weight (lbs.); $w_{gain}$ is the 3DAI live weight gain after birth (lbs.); t is time (months); τ is the exponential time constant (months); $W_{target}$ is the target or finished 3DAI live weight (lbs.); and $W_{birth}$ is the 3DAI live weight at birth (lbs.).

For the curve of FIG. 4-42B, the parameter values are as follows:

$$h_{hip\_gain} = h_{hip\_target} - h_{hip\_birth} = 58.5 \text{ in} - 30 \text{ in} = 28.5 \text{ in; and } \tau = 8.2 \text{ months;}. \quad (4\text{-}6)$$

where the variables are as previously defined.

For the curve of FIG. 4-42B, the parameter values are as follows:

$$w_{gain} = w_{target} - w_{birth} = 1600 \text{ lbs} - 70 \text{ lbs} = 1530 \text{ lbs; and } \tau = 14.85 \text{ months;} \quad (4\text{-}7)$$

where the variables are as previously defined.

4.10.2 Growth Projections

One valuable application of growth curves is the prediction of future size based on early calculations. If calculations are periodically made, it is possible to project the size of an animal at a future date using mathematical equations which have been found to historically track similar animals during their growth cycle. FIG. 4-44 shows one approach for using early 3D data to project the 3DAI live weight of a steer. While this example deals with 3DAI live weight, other growth parameters such as hip height or rump width may be found in a similar manner.

In the example depicted in FIG. 4-44, 3DAI live weight is obtained in the manner described previously. These calculations are made on a weekly or bi-weekly basis. After a number of months, a polynomial curve fit is used to obtain a single curve for the acquired data as indicated in Box 1 of FIG. 4-43. This polynomial curve fit averages out any slight calculation variations. Such a polynomial curve fit, known well to those familiar with the art of curve fitting, may be represented by the MATLAB® code (version 5.3.0):

$$[P] = polyfit(t, W, n_1); \quad (4\text{-}8)$$

$$W_{fit} = polyval(P, t); \quad (4\text{-}9)$$

where [P] is a vector of the coefficients of a polynomial, P(t), of degree $n_1$ that fits the calculations; t is a vector of times associated with the calculations; W is a vector containing the calculations such as 3DAI live weight; $n_1$ is the order of the polynomial used to fit the data; $W_{fit}$ is the resulting polynomial values that fit the original calculations in a least-squares sense.

In an application where 3D data is acquired from a steer four times each month, from birth to five months, 21 3DAI live weight calculations (including birth) are acquired. The time vector, t, has 21 times such that:

$$t = [0:0.25:20] \text{ months;} \quad (4\text{-}10)$$

The calculation vector consists of 21 calculations:

$$W = [W_1, W_2, W_3, \ldots W_{21}]; \quad (4\text{-}11)$$

The coefficient vector consists of four coefficients, for $n_1 = 3$:

$$P = [P_3, P_2, P_1, P_0]; \quad (4\text{-}12)$$

and the polynomial fit for the first 5 months may be expressed as:

$$W_{fit} = P_3 t^3 + P_2 t^2 + P_1 t^1 + P_0 \text{ for } t = 0 \text{ through 5 months.} \quad (4\text{-}13)$$

Box 2 of FIG. 4-43 determines the 3DAI live weight at birth weight for use in the exponential model of Box 3. The 3DAI live weight at birth, $W_0$, corresponds to the offset term of the polynomial fit, namely, $P_0$. Alternately, the actual measured birth weight, or a typical birth weight for the herd or breed may be used.

Box 3 of FIG. 4-43 indicates the selection of the growth time constant, τ. This time constant within the exponential function corresponds to the time at which the 3DAI live weight gain achieves 63.2% of its final or steady state value. It should be noted that this 3DAI live weight gain does not include the 3DAI live weight at birth as illustrated in equations (4-14) and (4-15).

For the case of 3DAI live weight:

$$W_{3D} = W_{gain}(1 - e^{-t/\tau}) + W_0; \quad (4\text{-}14)$$

with $$W_{gain} = W_{final} - W_0; \quad (4\text{-}15)$$

where $W_{3D}$ is the 3DAI live weight vector (lbs.); $W_{gain}$ is the 3DAI live weight gain after birth (lbs.); t is the time vector (months); τ is the exponential time constant (months); $W_{final}$ is the final or steady state 3DAI live weight (lbs.); and $W_{birth}$ is the 3DAI live weight at birth (lbs.) either from 3DAI live weight calculations or other means as described earlier.

The growth (exponential) time constant, τ, may be acquired in several ways. If the growth rate common to the breed has been established, τ may be computed from these data by matching growth data common to the breed with a curve generated from equations (4-1), (4-2), (4-14) or (4-15). The time constant which best matches the breed data provides a good value for the purpose of projecting future sizes or 3DAI live weights. Similar methods may be used to obtain a good estimate of τ from historic herd growth data.

Once the time constant, τ, has been determined, as indicated in Box 3, the 3DAI live weight gain may be computed from:

$$W_{gain} = \text{median}\left[\frac{W_{3D} - W_0}{(1 - e^{-t/\tau})}\right]; \quad (4\text{-}16)$$

where the variables are as previously defined. Once the 3DAI live weight at birth, $W_0$, the time constant, τ, and the 3DAI live weight gain, $W_{gain}$, have been determined, the 3DAI live weight may be determined as a function of time by substituting $t_x$, a time vector that extends through 50 months, for t in equation (4-14), which extends only through 5 months, the projected 3DAI live weight curve becomes:

$$W_{3D} = W_{gain}(1 - e^{-t_x/\tau}) + W_0; \quad (4\text{-}17)$$

with variables as defined previously.

FIG. 4-44 shows the result of the process described above and in FIG. 4-43. In this Figure the 3DAI live weight calculations acquired from 0 to 5 months are used to project the 3DAI live weight of the steer from 5 months to 50 months.

4.10.3 Parameter Estimation

The growth projections of Section 4.10.2 rely on obtaining the growth time constant, τ, from external sources such as historical breed data or historical herd data. While these are valid sources for determining this growth time constant, it is also possible to determine this growth parameter as well as other parameters directly from the acquired 3D data.

FIG. 4-44 illustrates the concept of using early 3D data to project the size or 3DAI live weight at a later time. Specifically, in FIG. 4-44, the 3DAI live weight data from birth to 5 months of age is used to project the growth data beyond 5 months through 50 months of age.

FIGS. 4-45A, B, and C illustrate one approach for determining the growth parameters of 3DAI live weight gain, $W_{gain}$, and growth time constant, τ. This particular approach employs a random distribution search algorithm which may be intuitively described as a sequence of shotgun patterns. After each shot the pellet which generates the smallest error (comparing the estimated growth curve to the actual data) is determined and the gun is 're-aimed' with the position of the least-error pellet selected as the new center for the next shot. Additionally, after each shot and re-alignment, the 'gun' is moved closer to the target sheet. The pellet 'positions' are represented by coordinates of the parameter values such as '3DAI live weight gain' and 'time constant'. Since minimization of the error between the growth curve estimation and the actual growth data is the criteria used to establish the center of the pattern for the next 'shot', the accuracy of the parameter estimation tends to increase with each iteration.

FIG. 4-45A shows an initial pattern with sufficient parameter spread to place a 'pellet' close to the 'target' or true valuation of the parameters. In FIG. 4-45B, during a second iteration, i=2, the pattern has been re-centered around the parameter pair which yielded the best-fit growth curve. In FIG. 4-45B the spread of parameter values has also been reduced in comparison to that shown in FIG. 4-45A to provide a greater value resolution with the same number of 'pellets' or estimation values. In FIG. 4-45C the center has been re-aligned and the spread further reduced. Finally, in FIG. 4-45D the spread is very tight providing great resolution around the true target value which fits the actual growth curve.

FIG. 4-46 provides a block diagram showing greater detail of the random distribution search algorithm discussed in the preceding paragraphs. The 3D input data available from birth to an early time such as 5 months is shown as input to Block 1. In Block 1 a polynomial curve fit is conducted. This polynomial, least-squares, fit serves to eliminate any calculation variations or scatter which might taint the parameter estimation algorithm. This polynomial curve is used as the reference to determine the error of estimated growth curves generated from estimated parameter pairs. As an example, a third order polynomial fit was used.

In Block 2 the initial, center parameter values are set with prior knowledge of the likely growth curve as expressed in equation (4-17). As an example of initial center values, $$\tau_0=10 \text{ months}; W_{gain0}=1000 \text{ lbs.};$$

$$\tau_{spread}=8 \text{ months}; \text{ and } W_{gain0\ spread}=500 \text{ lbs}; \quad (4\text{-}18)$$

where $\tau_0$ is the initial center value of the growth time constant in months; $\tau_{spread}$ is the range or spread of the time constant in months; $W_{gain0}$ is the initial center 3DAI live weight gain in pounds; and $W_{gain0\ spread}$ is the range or spread of the 3DAI live weight gain in pounds. The 3DAI live weight at birth, $W_0$, of equation (4-17) is not treated as a variable in this parameter estimation example and obtains its value in one of the following ways:

a) the calculated 3DAI live weight at birth;
b) the actual measured birth weight;
b) the minimum value in the polynomial curve fit of Block 1 (t=0);
b) an assumed value between 60 and 70 pounds.

Block 3 generates a random distribution of parameter values around the center values such as:

$$\tau_{est}=\tau_{spread}0.5*randn(1,n_{est})+\tau_0; \text{ and} \quad (4\text{-}19)$$

$$W_{g\ est}=W_{gain0\ spread}0.5*randn(1,n_{est})+W_{gain0}; \quad (4\text{-}20)$$

where $\tau_{est}$ is a $[1 \times n_{est}]$ array of time constant values with a normal distribution around the center time constant value, $\tau_0$; $\tau_{spread}$ is the range or spread of the time constant; randn(1, $n_{est}$) is a function which generates an array of $n_{est}$ points randomly distributed with a gaussian distribution of zero mean and a variance of one; $W_{g\ est}$ is a $[1 \times n_{est}]$ array of 3DAI live weight gain values with a normal distribution around the center 3DAI live weight gain value, $W_{gain0}$; and $W_{gain0\ spread}$ is the range or spread of the 3DAI live weight gain.

In Block 4, $n_{est}$ growth curves are generated such that:

$$W_{3D}(i) = W_{gain}(i)(1 - e^{-t/\tau(i)}) + W_0, \text{ for } i = 1 \text{ to } n_{est}; \quad (4\text{-}21)$$

with variables as previously defined.

In Block 5 each of the growth curves of Block 4 are used to compute an error as indicated by:

$$\epsilon(i)=\text{mean}((W_{3D}(i)-W_{ref})^2), \text{ for i=1 to } n_{est}; \quad (4\text{-}22)$$

where $\epsilon(i)$ is the mean squared error between $i^{th}$ estimated growth curve and the reference growth curve provided by the polynomial curve fit to the actual data; $W_{3D}(i)$ is the $i^{th}$ estimated growth curve; and $W_{ref}$ is the reference growth curve.

In Block 6 the smallest error is determined from the error array, $\epsilon(i)$, with $i_{min}$ the index of that smallest error. The corresponding parameter values which provide the smallest error or the best-fit are then determined to be:

$$\tau_{best} = \tau(i_{min}); \text{ and} \quad (4\text{-}23)$$

$$W_{gain\ best} = W_{gain}(i_{min}). \quad (4\text{-}24)$$

In Block 7 the parameter values resulting in the smallest errors from Block 6 are set equal to the new center values for the next iteration, such as:

$$\tau_0 = \tau_{best}; \text{ and} \quad (4\text{-}25)$$

$$W_{gain0} = W_{gain\ best} \quad (4\text{-}26)$$

Block 8 determines if the maximum number of iterations has been completed. If 'NO', the algorithm proceeds to loop through Block 9, if 'YES', the algorithm outputs the center parameter values which generated the smallest errors as the final parameter values.

If Block 8 is answered in the negative, the number of iterations is still below the maximum, Block 9 reduces the range or spread around the new center values. After completion of Block 9, the algorithm loops through Blocks 3 through 8 again until the maximum number of iterations has been completed.

FIG. 4-47 shows the simulated convergence of the time constant, $\tau$, and the 3DAI live weight gain, $W_{gain}$ to values of 14.85 months and 1530 lbs., respectively.

It should be recognized that such projections are most accurate close to the last available data and less accurate further from the last available data. A simulated demonstration of this concept is shown in FIGS. 4-48A, 4-48B, 4-48C and 4-48D indicate the accuracy of growth projections using growth data of 5 months, 10 months, 15 months, and 20 months, respectively. It is useful to observe that in this simulation the accuracy of the growth projection is probably acceptable at twice the time of the last acquired growth data. This observation is especially true for times greater than 5 months.

Variability in the calculations impacts the accuracy of the projections, since the polynomial curve fit to the actual data, used as the error reference, is more likely to deviate with greater data variance.

The random distribution search algorithm described above is only one example of numerous parameter estimation methods which may be used to determine the growth parameter values based on the 3D data of this invention. It is understood that those skilled in the art of parameter estimation or curve fitting may apply other algorithms to determine growth parameters similar to that demonstrated herein. It is claimed that such similar parameter estimation applications to growth curves parameters falls within the scope of this invention.

4.10.4 Herd Estimates

The growth curves modeled and projected in the previous sections have been based upon an individual animal. It is helpful to consider data for the entire herd or a select grouping of animals. This herd data may take the form of statistics for a specific calculation at a given time, statistics for two or more calculations at a given time, or statistics for any number of calculations as they vary over time.

4.10.4.a Statistics of Herd Data at a Given Time

A histogram of calculations for the entire herd at a given time provides a useful tool. FIG. 4-8 shows simulated histograms for a) hip height, b) BCS score and c) 3DAI live weight. As indicated in FIG. 4-8, additional statistics, such as mean, median and standard deviation, may also be provided.

4.10.4.b Statistics of Herd Data which Vary over Time

While the value of snapshot statistics at one instance in time is evident from an analysis of FIGS. 4-49A, 4-49B and 4-49C, it is also advantageous to observe the changes in those statistics over time. FIG. 4-50 shows the time-varying histograms for an entire herd. In this three-dimensional graph, time and calculation value form the horizontal plane with the vertical axis providing the number of animals which exhibit a specific calculation value at a specific time. These three-dimensional data may be graphically displayed in a number of ways such as three-dimensional surfaces, mesh graphs, or waterfall (line) plots. Such a representation of herd data provides a ready indication of not only the herd growth curve, but the range of calculation values within the herd at any given time.

One approach for obtaining herd statistics is to first calculate and model the individual animal, then combine those individual animal data into herd data using averaging or other statistical means. This approach permits curve fitting, parameter estimation techniques, or growth projections to be applied to the individual animal first, before combining the individual data into herd statistics. Since the individual animal growth curves are likely to be the most consistent, this may minimize minor effects attributable to calculation variations.

Another approach for obtain herd statistics is to directly combine or average data from the entire herd at each calculation time. These herd statistics may then be combined with similar herd statistics from other times. One such combination includes the computation of a histogram for each desired calculation and then tracking those calculation histograms over time. Such time-varying statistics is represented in FIG. 4-50 is a three-dimensional graph with a histogram representation at each calculation time showing the calculation distribution as well as the growth progression.

FIG. 4-51A and 4-51B when considered together indicate various paths for obtaining herd and time statistics. The calculations made for an individual animal at a given time may be processed first as part of a group of calculations on that same animal over time or the single calculations may first be processed as part of the herd for a single point in time. Both paths eventually result in statistical calculations over both herd and time.

4.10.5 Comparisons with Reference Curves

One advantageous use of the herd and time statistics is a comparison with a standard or a historic growth curve or calculation distribution. FIGS. 4-52A, 4-52B and 4-52C illustrate several of these comparisons. FIG. 4-52A shows a comparison between an animals growth curve, using a calculation such as 3DAI live weight or hip height, compared to a reference growth curve which might be from a breed standard or historical data from a prize steer. FIG. 4-52B shows the comparison of a herd histogram to a reference histogram for a given calculation such as 3DAI live weight, hip height, BCS score, or rump width (or any of the many other calculations described herein). FIG. 4-52C shows a three-dimensional graph with the data forming a surface similar to that of FIG. 4-50. Since it is visually difficult to display a reference surface simultaneously with the data surface, this Figure shows the use of a cursor to select a desired cross-section. By positioning and 'clicking' a mouse button, a cross section will be displayed for a given time point. This cross section will be displayed in an insert as shown. On this insert the reference surface cross section is displayed.

4.11 Economic Optimization

While the calculations, statistics and graphics described in this specification are independently valuable, they may also be used in conjunction with economic data to optimize costs and profits.

4.11.1 Value Determination via Growth Curves and Projections

The 3DAI live weight, described herein, may be used, together with the sale price per pound, to determine the value of an animal throughout its growth cycle as indicated in FIG. 4-53D. This may be expressed mathematically as:

$$W_{3D} = W_{gain}(1 - e^{-t/\tau}) + W_0; \text{ and} \qquad (5\text{-}1)$$

$$P_{sale} = k_{sale} \times W_{3D}; \qquad (5\text{-}2)$$

where $W_{3D}$ is an array of the 3DAI live weight (lbs.) over time; $W_{gain}$ is the 3DAI live weight gain after birth (lbs.); $t_x$ is the time array (months); $\tau$ is the exponential time constant (months); $W_0$ is the 3DAI live weight at birth (lbs.); $P_{sale}$ is an array of the animal sale price over time ($); and $k_{sale}$ is the per unit sale price ($/lb).

The follow sample values are used for the steer represented in FIG. 4-53D:

$$W_{gain} = 1530 \text{ lbs.}; \tau = 14.85 \text{ months}; W_0 = 70 \text{ lbs.}; t_x = 1 \text{ to } 60 \text{ months}; \text{ and } k_{sale} = \$0.95 \text{ per pound.} \qquad (5\text{-}3)$$

4.11.2 Cost Calculations

In order to optimize profit, it is essential to accurately track the associated costs of production. These costs may be categorized as time-varying costs and fixed costs. Time-varying costs are those cost which increase over time. Fixed costs are those costs which are relatively constant regardless of the time involved. Examples of time-varying costs include feed costs and interest costs. Examples of fixed costs include veterinary costs, buying costs, and selling costs. The total costs are the sum of fixed and time-varying costs.

FIG. 4-53A shows the exponential increase in 3DAI live weight over time; 4-53B estimates the increase of hip height; 4-53C indicates the cumulative cost of feed; 4-53D shows the sale price of the example steer over time; 4-53E indicates the total cost per head; and 4-53F represents the net gain from an accumulation of costs and values.

4.11.2.a Time-Varying Costs

The following examples of time-varying costs were used to generate the total cost curve of FIG. 4-53E:

$$C_{feed} = 12 \times \$0.61 \text{ per day} = \$18.55 \text{ per month}; \qquad (5\text{-}5)$$

$$C_{yardage} = 12 \times \$0.15 \text{ per day} = \$4.56 \text{ per month};$$

$$C_{interest} = (n/12) \times P_{feeder} = 0.05/12 \times \$525 = \$2.19 \text{ per month};$$

$$P_{feeder} = \$525; \text{ and}$$

$$C_{timevarying} = C_{feed} + C_{yardage} + C_{interest} \qquad (5\text{-}6)$$

where $C_{feed}$ is an array of the monthly feed cost; $C_{yardage}$ is an array of the monthly yardage cost; $C_{interest}$ is an array of the monthly interest cost based on the purchase price of the feeder steer; $P_{feeder}$ is the purchase price for the feeder steer; n is the annual interest rate; and $C_{time\text{-}varying}$ is an array of the sum of all the time-varying costs.

FIG. 4-53C shows the isolated feed cost, $C_{feed}$ as a function of time. When graphed against the life time of the example steer, these feed costs do not logically begin until the steer is purchased at approximately 5 months, at a 3DAI live weight of 500 pounds.

4.11.2.b Fixed Costs

The following examples of fixed costs were used to generate the total cost curve of FIG. 4-53E:

$$P_{feeder} = \$525.00; \qquad (5\text{-}6)$$

$$C_{vetmed} = \$6.00;$$

$$C_{buy} = \$4.00;$$

$$C_{sell} = \$45.00;$$

$$C_{death} = 10.50;$$

$$C_{profit\ risk} = \$5.00;$$

$$C_{fixed} = P_{feeder} + C_{vetmed} + C_{buy} + C_{sell} + C_{death} + C_{profit\ risk}; \qquad (5\text{-}7)$$

where $P_{feeder}$ is the purchase price of the feeder steer; $C_{vetmed}$ is the cost of veterinary care and medicines; $C_{buy}$ is the buying cost; $C_{sell}$ is the selling cost; $C_{death}$ is the distributed cost of animals that die; and $C_{profit}$ risk is a built-in profit which accounts for the risk of operations.

4.11.2.c Total Costs

The total costs, $C_{total}$, of FIGS. 4-53A, B, C, D, and E are an array of the sum of the time-varying costs and the fixed costs as indicated below:

$$C_{total} = C_{time\text{-}varying} + C_{fixed}; \qquad (5\text{-}8)$$

where the variables are as previously defined.

4.11.3 Calculations of Net Gain

The net gain may be computed by subtracting the total costs, $C_{total}$, from the time-varying sale price, $P_{sale}$, as described in equation (5-2). The net gain may be expressed as:

$$G_{net} = P_{sale} - C_{total}; \qquad (5\text{-}9)$$

where $G_{net}$ is an array of net gain; $P_{sale}$ is an array of the sale price per equation (5-2); and $C_{total}$ is the total cost of production per equation (5-8). The solid line of FIG. 4-53F illustrates the net gain computed from the sale price and total costs as defined. Additionally, FIG. 4-53F displays a spread or distribution of data values at each calculation time to represent the variability which may be present within an entire herd.

4.11.4 Manual Optimization of Operations

The ability to compute a net gain curve as a function of growth, sale price and costs as detailed above permits a user of this invention to manually optimize a livestock operation by examining the numerous 'what if' scenarios. For example, a decrease in a fixed cost would translate the net gain curve of FIG. 4-53F vertically towards a higher gain. Conversely, if an increase in a fixed cost occurred, the net gain would translate vertically in the negative direction. If a change in a variable cost occurred, the net gain curve would translate both vertically and horizontally. By manually entering various economic parameters into these equations, the user may study the resulting consequences. In this manner the economical tradeoffs between growth rate, purchase price, costs and timing may be examined.

4.11.5 Automated Optimization of Operations

This invention provides the ability to accurately calculate a multitude of anatomical dimensions, compute additional areas and volumes, determine growth rates and incorporate economic parameters such as purchase prices, sales prices and associated costs. These capabilities enable the system to automatically track growth, costs and sale prices to project the net gain curve illustrated in FIG. 4-53F. From this projection, updated with each 3D livestock calculation, the economically optimal time to sell may be automatically determined. As an example, the net gain curve (solid line) of FIG. 4-53F may be processed to determine the peak of the curve (via differentiation or other techniques known to those skilled in the art of peak detection) occurring near the 20 month time period. In such an example, the projections for individual animals as well as the combined data for the entire herd provides an advantageous economic tool for a feedlot operator to determine the optimal time to transport his herd to market. The present invention provides the capability for a long range projection as well as a continuous update on that projection with each additional data acquisition and calculation.

4.11.6 Animal Wellness

Cows and calves spend the spring, summer and fall living and grazing on pasture. Often such pastureland is unsuitable for any other cropping practices. During the winter, various methods of protection are provided such as natural shelter areas or barns. The hardiness of the animals allows them to comfortably adapt to the local climate.

Cattle are social animals that do well in herds, where the safety of numbers allows them a natural comfort level. The average herd size of a cow-calf farm varies from a small operation of approximately 20 to 25 cows to other alternate large breeding operations.

After the calves are weaned, they become known as backgrounders or stockers. These weanling calves will be kept grazing on pasture or in feedlots eating a forage (hay-based) diet until they are moved to specialized feedlots.

Today the majority of cattle are brought to a finished market weight in feedlots. In these specialized facilities cattle are able to socialize and have flee access to feed and water. Feedlot housing practices are very diverse from farm to farm, ranging from open dry yards, where protection is provided from inclement weather, to indoor confinement housing. The barns may have any one or a combination of concrete slatted floor systems, straw bedding, or open yards. The size of feedlots can vary substantially.

Typically, beef animals are moved to feedlots at fifteen months of age, the cattle are fed a nutritionally balanced mixture of forages such as grasses, alfalfa or clover, fed either dry or as silage. This silage is supplemented with grain rations that are typically based on corn, barley wheat or oats. Each mature beef animal will drink between 35 and 65 liters of water every day depending on their feed source and the outside temperature.

Disease represents a major problem in most feedlot and stocker settings. In some instances, outbreaks of disease can result in as much as a 30% death loss. In addition, treatment costs, feed efficiency losses, and the expenditures and labor necessary for treatment, as well as the necessity of culling animals which fail to respond to treatment, can make disease loss substantial in many situations. Early detection of sickness can help avoid initial purchase of such animals.

Although there are many diseases that can affect livestock, some of the diseases that most often result in losses center about the respiratory tract and from Bovine Respiratory Disease Complex (BRDC). Because of the time delay between actual disease and the combining of stress, bacteria, and viruses, it is usually the receivers of shipped cattle that deal with BRDC. This complex is also known as shipping fever. It is a disease characterized by the involvement of a number of agents and tissues, but especially important are viruses that attack the respiratory system. In the final stage the bacterial pneumonia often develops and is the objective of most of the treatment; it is almost always the cause of death in cattle with BRDC.

Early detection of sick animals and their treatment is essential. As little as a 12-hour wait may mean the difference between rapid recovery and a chronically infected or dead animal. Additional monitoring of such cases is also important in order to increase the likelihood that treatment will be effective. If BRDC cases are identified early, almost any modern treatment plan (antibiotic) is likely to succeed; and if BRDC cases are not detected until late in the disease course, all treatment plans are likely to fail. The result of late detection of BRDC cases is an increase in the number of animal deaths.

Other secondary infections are caused by certain species of bacteria that can wait in the environment or animal system for an accident to occur. They normally cause no problems, and only become a problem if certain tissues or functions in the animal become damaged or stressed.

Once cattle are identified as needing treatment for disease, lameness or body injury, they are moved to a treatment area and treated with a protocol of antibiotics. The antibiotics used should reach effective concentrations to be effective against the bacterial organism.

When cattle are determined to have recovered, they are placed on increasingly higher concentrate diets to prepare them to return to their home pen. Cattle that don't respond to therapy with improved appetite, weight gain, and respiratory function are determined to be non-responders or chronics and often now sold as "realizers". Cattle that respond to treatment and are returned to their home pen only to be pulled out of the pen at a later date for a second case of respiratory disease are called "re-pulls". A high incidence of chronics indicates that the cattle were not identified early in the disease process. A high incidence of re-pulls indicates that either the cattle were not evaluated properly at the end of the initial treatment period, or the initial treatment was not adequately effective. When illness within a pen suddenly increases or when feed intake drops, revaccination with a modified live IBR vaccine will generally reduce morbidity. An antibiotic administered concurrently aids in reducing rate of illness further.

A prominent and reliable means for identifying sick animals with infectious diseases is body temperature and physical appearance. In untreated infected animals, the body temperature begins to elevate after the incubation period of the infectious organism. Some animals will recover without exhibiting clinical symptoms, while others the body temperature will continue to rise, and clinical symptoms of illness appear. Gradually the animal's defense system overcomes the infection and as the animal begins to recover, the body temperature drops and clinical symptoms begin to disappear. Finally, the body temperature returns to normal and the animal is said to be in a convalescent state, on the way to recovery.

However, in some animals the body defenses fail to overcome the infectious process and the animal begins to succumb to the disease. The clinical symptoms continue to worsen and eventually the body temperature begins to fall. If the animal cannot overcome the infection, the body temperature will drop well below normal and death usually occurs. Typically in feedlot management, sick animals are considered to be those that have a rectal temperature of 103° F. or greater. Some healthy younger animals (recently weaned) do exhibit higher body temperatures.

As a result of recent ruling by the U.S. Department of Agriculture, non-ambulatory (downer) cattle will no longer be allowed into the food supply. A downer cow can be defined as one that is unable to get up from a lying position and walk, due to any number of reasons. Cows, as well as other stock, may become downers due to disease, physical problems or injury. Appropriate management can reduce the percentage of downers significantly. Cow-calf producers should evaluate their management and culling practices to reduce the possibility of downers as well as those that are at risk of becoming downers. At-risk downers are those that have physical problems that could result in them becoming downers. These animals could either be turned down at the livestock market or severely discounted to cover potential loss should the animal not be able to walk when reaching the harvest site.

The measures include an immediate ban on using animals that cannot walk because of injury or illness, or downer cows, to provide meat for humans. In addition, carcasses singled out to be tested for mad cow disease, most likely those of older cows or those with signs of nervous-system disease, will be kept until the results come back, instead of being butchered and sent to market immediately, as they have been until now.

Bovine spongiform encephalopathy (BSE), commonly referred to as "mad cow disease," belongs to the family of diseases known as transmissible spongiform encephalopathies (TSE). The causative agent of BSE has not been fully characterized, but three possibilities have been proposed: an unconventional virus, a prion (a self-replicating protein), or a virino (incomplete virus) comprising naked nucleic acid protected by host proteins. The theory accepted by most scientists is that BSE is caused by a prion. The agent does not invoke a detectable immune response or inflammatory reaction in its host and is extremely resistant to sterilization processes. The brain of affected animals appears "sponge-like" when observed microscopically in these various forms of TSE. Downers are tested for BSE.

Foot-and-mouth disease (FMD) is another animal health problem. It does not affect humans. A highly contagious viral disease, it affects animals with cloven (divided) hooves, such as cattle, pigs, sheep, goats and deer. There are seven types of the FMD virus, all of which have similar symptoms. Immunity to one type does not protect animals from other types. The average incubation period (the time of between initial infection and the appearance of symptoms) is between three and eight days, but can be up to two weeks. The disease may be fatal to young animals, but is rarely fatal to adult animals. Those that survive, however, are often debilitated and suffer chronic lameness, aborted pregnancies, chronic inflammation of the mammary glands or udder in female cows and possible sterility.

Foot-and-mouth disease and bovine spongiform encephalopathy (BSE), sometimes referred to as "mad cow disease" are not the same disease and are not related. FMD is completely different and does not affect humans.

FMD is a fast-moving virus and is highly contagious for animals with cloven (divided) hooves, including cattle, swine, sheep, goats and deer. Animals can be infected within hours of exposure to the virus. On the other hand, BSE is a slow-acting cattle disease with incubation period of 24 months or longer. This disease is thought to be caused by cattle eating feed containing brain and spinal cord from infected cattle. The most obvious signs of the disease are excessive salivating, a lack of appetite and lameness. Affected animals may experience a sudden rise in body temperature.

Anthrax is a disease of warm-blooded animals, including most livestock. The bacteria *Bacillus anthracis* is the cause of the disease. In livestock, the result is usually acute, with death occurring in one to three days. Signs of disease include staggering, trembling, convulsions, or bleeding from body openings. Body temperatures can reach as high as 107° F. The disease also occurs in swine but in less acute form. Ingesting infected bone or meat meal given as a feed supplement infects them.

Discernable animal actions associated with disease and acute and chronic stresses occur during early adaptation to the feedlot environment. These physiological events can modify heat loss from the body surface. The three-dimensional examination of the animal by infra-red scanning using multi-axis thermal imaging cameras can be used as a non-invasive tool to visualize, monitor and quantify overall changes in body surface temperature and identify specific areas of radiant energy loss. The changes in animal surface skin temperature are generally related to alteration in local or systemic physiological perfusion, core body temperature, change in metabolism, or other factors, including disease and injury.

Beef animals exhibiting higher general temperature profiles (body surface) tend to be healthier and will perform better feedlot gains. Measurement of elevated surface radiant energy release from the animal body under specific conditions can be used to screen for inherent disease conditions.

An infrared camera array of the current invention is used to convert infrared radiation emitted from the animal's skin surface into a 3D image via electrical impulses that are digitized, in three planes and then recombined and visualized in color on an interface computer monitor. These multi-axis image contours are graphically mapped on the electronically reconstructed body model and reflect specific local area temperatures (a 3D thermogram) on each location of the three planes of the animal. The alternate spectrum of colors indicates a respective increase or decrease in the amount of infrared radiation being emitted from the body surface. When looking at various infrared patterns from each alternative view of the animal, any abnormality of elevated temperature reflecting disease or specific injury location will become readily apparent. Such early detection of alternate body areas or other concern related to overall elevated temperatures can predict possible symptoms or injuries before they lead to more serious conditions.

The convenience of a multi-axis examination from the visual reconstruction of the animal, presented in a three-dimension view that can be rotated at will, using infrared thermography can allow early detecting of general physiological condition or other oncoming problems before they are fully developed. Often the inflammatory response to damage, reflected in elevated gradient, frequently precedes any evidence of advanced stress or additional injury to the animal.

Other areas of temperature gradient are also studied in beef cattle and pig bodies to determine the condition of the animal. It is often desirable to consider the core temperature of the animal and correlate these findings with other known body mechanism data. Typically rectal temperature has been used in numerous applications for animal wellness studies.

Using the 3D thermograph model of the current invention the representative core temperature can be estimated by numerical analysis. The applicable forms of the energy equation can be expressed using differential equations of energy transfer in the surface of the animal. Here the dissipation terms are considered to be negligibly small. Accordingly, the ratio $k/pc_p$ is designated as thermal diffusivity. It is then expressed in units of $L^2/t$; in the SI system or alternately as $m^2/s$, and as $ft^2/hr$ in the English system. These estimates can also be correlated with other volumetric measurements of the animal.

If the conducting medium of the animal would contain no heat source, the equation would be presented as a Fourier field equation $$\partial t/\partial t = \alpha \nabla^2 T; \qquad (6\text{-}1)$$

This is occasionally referred to as Fourier's second law of heat conduction.

For a system in which the animal body heat source is present and considered, but there is no time variation, the Fourier equation then reduces to the Poisson equation $$\nabla^2 T + \&/k = 0; \qquad (6\text{-}2)$$

The final form of the heat-conduction equation to be presented applies to a steady-state situation without heat sources. For this case the temperature distribution must satisfy the Laplace equation $$\nabla^2 T = 0; \qquad (6\text{-}3)$$

Each of equations are written in general form, thus each applies to any orthogonal coordinate system. Writing the Laplacian operator, $\nabla^2$, in the appropriate form will accomplish the transformation to the desired coordinate system. Utilizing the given initial specific surface temperature profile and other applied boundary conditions and application coefficients, the data can then be reduced by numerical solution to inferring the resultant animal body core temperature.

FIG. 4-69 illustrates the thermal contour capability of a selected animal. The animal presentation can be provided in both plan form silhouette (top, side and end views) with temperature contours, or in the form of a three-dimensional animal model (also in temperature contours) which can then be rotated in all axes for total anatomical review. The capture of the 3D images are accomplished by the system thermal camera array and can be initiated either automatically or manually which are then displayed on the computer interface simultaneously with the data capture. Other computer command temperature alarm limits and related dispositive instructions can be also entered regarding the wellness screening of the animal.

4.11.7 Weather Products

The importance and crucial role of climate for crop management and animal activities is well understood and has been recognized from earliest times. Devastating impacts of weather events like hail, winds, tornado and flash flood on standing crops are well known. Un-seasonal rainfall, drought, ground frost and other inclement weather conditions can also have adverse effects on crop growth as well as crop yield. Advance information on weather can allow farmers and ranchers to take advantage of weather conditions to minimize damage to crops and livestock. The use of weather information in cattle and pork operations has also become an essential ingredient of farm and ranch management.

The current understanding of disease and insect interaction, together with other technological advances in meteorology and communications, have brought about easier and faster access to agriculture reporting and weather observations. Also, the relatively low cost of the computer systems and related linkages that provide the decision support for applying this knowledge to every day agriculture operations have made such information affordable and practical.

Today, there are numerous sources of weather information, both public and private. An agriculture producer has many choices of where and when to obtain knowledge of climate, weather forecasts and related information. These sources include access and forecasts of the National Weather Service that also provide 5-day forward outlooks. It also predicts temperatures, sky conditions and precipitation on a regional basis. The National Oceanic and Atmospheric Administration (NOAA) of the U.S. Department of Commerce provides continuous broadcasts of latest weather information together with the use of Doppler radar directly from its National Weather Service offices. Numerous private sites of related weather information including agriculture climate prediction, historical comparison, barometer, precipitation totals, rain probabilities and outlook, crop moisture index, wind speed, multi-day forecast, maximum and minimum temperature, humidity, surface dew point, heat index, wind chill, animal heat stress prediction, hourly air temperature forecasts, vegetation index, growing degree day forecasts, frost/freeze and cold protection information, sunrise/sunset and civil twilight, harvesting guidance and satellite imaging are also available. Several excellent private source computer site links include agribiz.com/weather and intellicast.com. The specific data fields can also be individually customized and tailored providing both national and regional content and supplied commercially with continuously data feed and updated information, as required.

The ability to combine current weather forecast and agriculture information can further enhance the capabilities for use of the current invention with the farmer, rancher, feedlot operator, breeder and other related interested parties. Current predictive knowledge of climate forecast and environmental risk, and crop risk and availability can become an additional tool that link weather and advanced livestock economic management. By way of example, today there are highly concentrated vertically integrated organizations that dominate beef animal and pork sectors in the U.S. and Canada. These large beef feedlot and pork finishing operations are typically concentrated in single locations, which can create significant economic exposure relative to adverse weather events. Animal weight gain can be compromised by temperature extremes and wet conditions. Feed conversion rates drop and animal health problems can emerge while cost of production increases as attempts are made by the producer to heat or cool the local containment environment. Similarly, feedstock crop yields are also affected, in both quality and quantity, by specific weather events, with resulting associated economic impact for animal agribusiness operations.

The integration of instant external weather market reporting to the present 3D animal measurement system also will allow the user the immediate opportunity to become more fully informed during the overall comparative decision-making process. This will enable a better understanding of the relationship between economic risks, weather events, market conditions and realizable economic value and also help create the opportunity for improved resource management capability. FIG. 4-70 shows one form of the interface screen, which visually displays alternate selected information in both written and text format. Various icons can be initiated by point and click actuation of the mouse or screen curser which will then access and display the corresponding data field.

4.11.8 Economic Reports

The availability of agricultural reports that detail current market conditions, related economic data and price implications for crops and cattle and hog industries is critical to proper pricing and decision-making. Basic price competition and market price volatility remains a continuing concern to livestock producers. Numerous government, academic and private internet resources now exist that can provide collective agriculture, market, trading and statistical data together with other current business and economic information.

Production and marketing contracts now govern more than a third of the value of U.S. agricultural output. Contracts are now the primary method of handling sales of many livestock commodities, including cattle and hogs. Use of contracts is closely related to farm size; farms with $1 million or more in sales have nearly half their production under contract. For producers, contracting can reduce income risks of price and production variability, ensure market access, and provide higher returns for providing differentiated farm products. For processors and other buyers, vertical coordination through contracting is a way to ensure the flow of products and to obtain differentiated products, ensure traceability for health concerns, and guarantee certain methods of production. The traditional spot-market still governs nearly two thirds of the value of agricultural production. Today, there is a continuing shift to more explicit forms of vertical coordination, through contracts and processor ownership, as a means to ensure more consistent product volume output and quality.

The current and historical reporting data that is now immediately available On-line can provide a virtual taxonomy of crop, livestock and market information. These supply and demand, cash market and futures contract data, when coupled with the measurement and analysis capability of this invention, will help aid in the validation of alternate business scenarios and provide flexibility to unique business decisions for entering into marketing contracts or spot-market sales and other timely market responses. Trading exchanges, government, banking, academic and other private publications all provide On-line electronic data from numerous websites. These include both daily trading activity, current financial indices, regional market planting and production and inventory summaries, global markets and other domestic USDA agriculture research information. With such business and financial information reporting provided in near real-time conditions, and incorporated in direct feed electronic format, the overall computer system of the present invention and user interface then also becomes the vehicle supporting strategically informed financial transactions along with other associated exchange transaction capability. FIG. 4-71 shows one form of the weather products interface screen displaying selected data fields. Each respective reporting resource can be accessed by a mouse click or screen curser with the resulting information presented graphically and in text format as generated.

4.11.9 Marketing Futures

Agriculture marketing concerns the events that bring farm products to the ultimate user. Traditionally, there have been many alternatives for the farmer and rancher to market their end products, even at alternate stages of animal maturity.

In the beef animal industry, there are five separate definable operating entities that comprise the market: the cow/calf producer, stocker operator, feed-yard operator, processor, and retailer. Beef cattle are produced either as yearlings started on pasture or finished on feedlots or as calves fed on lots from time of weaning. Calves weighing between 300 and 500 pounds will typically move into some type of forage-based stockering program, where another 300 to 400 pounds will be added. As heavyweight feeders between 600 and 800 pounds, the animals will then move into feedlots.

Nationally, 75 percent of all U.S. beef comes from cattle fed in feedlots. Feedlots have become increasingly fewer and larger. The largest feedlot operations in the United States are located in three states, namely Texas, Nebraska and Kansas. These states now account for 60 percent of all of the cattle fed in the United States.

Large, efficient slaughter plants are in the cattle-feeding areas of the country, providing ready markets. After slaughter, beef moves back into all parts of the country to the consumer retail market. In the overall pricing system, the consumer makes the ultimate price determination. The retailer wants a certain type of product because the consumer wants it. This is relayed back to the slaughterer who relays it to the feedlot, who relays it to the feeder, cattle producer. The relay mechanism for all these messages is the price. Unfortunately, because of all the messengers in the market, the signals sometimes get confused or delayed. Information coordination is a key factor affecting price, and necessary in achieving a stable market system within the beef industry. Accurate and widely available market information coordinates supply chains that are based on spot markets.

Accurately reported information should cause prices in similar transactions to converge to a common "market price" as buyers avoid paying exceptionally high prices and sellers do not accept exceptionally low ones. USDA and other price reporting institutions acquire and disseminate large volumes of information on prices, product characteristics, and quantities traded in spot markets. These reports help markets work, because they provide unbiased information to aid market participants in making impending and future production and marketing decisions. Contract prices are usually not publicly reported, and the effectiveness of spot markets can be eroded as contracting expands. The remaining sales may reflect a non-representative set of transactions, making the reported prices an inaccurate reflection of activity, and market reports based on smaller samples can be less reliable. Further, some participants fear that thinning cash markets may make it easier for markets to be manipulated in favor of insiders. This weakening efficacy can spur further decline in the spot market. Spot market erosion may harm remaining spot sellers, who find it harder (more costly) to get buyers, and it can also harm contract sellers since marketing contract prices are frequently based on spot market prices.

From its earliest days, the United States Department of Agriculture has provided agricultural market information to the public. In 1915, the first USDA market news report was issued reporting prices and movement of strawberries. Prices for Livestock were reported soon afterward in various formats, and a voluntary livestock price reporting system was in place at the USDA Agricultural Marketing Service by 1946. Structural changes in the livestock industry after that generated concerns about price discovery and the value of voluntary price reporting, especially among feedlots and livestock producers. In particular, many observers believed that the use of contracts and vertical integration in supplying livestock led to poorer public market information because prices of these products were not reported as they moved through the system. In 1999, in response to these and other developments, congressional legislation—The Livestock Mandatory Price Reporting Act—required large meatpackers to report all livestock transaction prices.

USDA has frequently taken action to facilitate the functioning of spot markets in agricultural products, to speed up price discovery as well as to improve the reliability of reported prices. Early steps, aimed at improving the reliability of commercial transactions, initiated rules to protect sellers.

The USDA has established official grades for feeder cattle based on frame size and muscling. Frame size is related to the weight at which, under normal feeding and management, an animal will produce a carcass of a given grade. Large-frame animals need a longer time in the feedlot to reach a given grade and will weigh more than a small-frame animal would weigh at the same grade. Thickness is the amount of muscling present in proportion to bone and fat Thicker-muscled animals will have more lean meat. The grades consist of three frame sizes (Large, Medium, and Small) and three thickness or muscling grades (No. 1, No. 2, No. 3).

Although few cattle sold are officially graded, prices are reported based on estimated grades. The price differences reported on auction for various grades can provide valuable information into the type of cattle demanded in the market. Here, the grades are based strictly on frame and muscling not cattle color. Any breed can produce animals in any of the grades. The market has typically demanded medium- to large-frame feeder calves and provided premium pricing for these animals. There is a growing body of concern that current federal beef quality grading system is too subjective; the ability to accurately measure quality is also affecting value estimates. As traditional livestock pricing systems have become less effective at providing signals to producers, and in response some producer groups, packers, and retailers began to look for alternatives.

Price risk in fed cattle is the primary concern for cattle producers. The failure of market price coordination in the beef industry has created a large incentive for the development of alternative market coordination methods.

New vertical coordination methods provide incentive for cattle producers and beef packer to mutually cooperate in the form of advance contracts with formula based pricing. The main motivation of these marketing agreements is intended to achieve a more coordinated supply while reducing cost, enhancing risk management, and improving quality issues. With an accompanying decrease in the adversarial relationship between feeders and packers the adoption of Grid or formula pricing agreements and alliances are now starting to displace the once dominant negotiated cash live and dressed weight cattle trade.

However, the grid marketing system for fed cattle can also have a dramatic effect on both risk and economic payoff. Grid Pricing differs from other beef pricing systems and permits buying of cattle based on merit that fit pre-defined market standards or specifications. The main components of a grid are the animal quality and yield grade. Discounts are applied for those animals that do not meet these quality requirements. Most meat packers today offer grid marketing as an alternative to other pricing systems. Currently in the USA, over half of the USDA graded fed cattle brought to market are priced on a formula or grid, and the use of this pricing system is expected to grow.

A buyer can exercise market power by exerting downward pressure on prices and maintaining the lower prices by limiting purchases. In competitive markets, rival buyers expand purchases when one buyer reduces them, so in this case one buyer's actions will have no ultimate effect on total purchases in a given market or on price. But a single buyer can exercise market power when rivals do not react to the buyer's reduction in purchases, either because there are no rivals or because actual and potential rivals cannot expand their purchases. Further, a group of buyers can together exercise market power if they can act jointly to reduce purchases and force prices down. There are several ways in which such contracts can extend market power when they include contract terms that exclude market rivals, by limiting price competition among rivals or otherwise outright initiate discriminatory pricing. Contracts can be structured to create market power for buyers and reduce farm prices. Such contracts are not normally likely to effect or create market power unless the buying side of the market is highly concentrated.

Cattle producers still presently also have some other available market outlets. Alternate marketing system combinations currently include Auction Markets, Terminal Public Markets, Local Markets or Collection Points, Independent Dealers, Packing Plants and Packer Buyers Feedlot Marketing, Bargaining Associations and more recent Electronic Marketing.

Most electronic marketing uses telephones, television and computers for transmitting information to buyers and sellers. The telephone system has been used for many years but has become rate-limiting with increased information flows. Video and satellite marketing is popular but is too costly to become a widespread market system.

The advent of the computer has had the effect of changing lives and the way people do business. Coupled to the Internet and the speed in which information can be exchanged, business can now grow exponentially. Computer marketing for animal fed markets has demonstrated improved operating efficiencies and is now emerging as one alternative system of choice. With increased access to markets, both availability of information and competition are enhanced. The buyers procurement costs are low because the per head access costs are small on transacted basis. Now, the key to achieving widespread successful Internet electronic marketing is thought to be the development and implementation of uniform description and animal measurement standards. Here, the buyer and sellers own computer system can itself become the clearinghouse for both small and large volumes of cattle with all of the detailed coordination and structure necessary for transaction, sale or contract purchase and delivery.

In order to manage price risk, futures or option contracts can also be employed. When these financial instruments are used in the marketing decision, the elements of risk must first be measured. A forecasting model that will identify projected returns, utilizing all available market prevailing futures information including cash price conditions at placement and cattle expected placement weight and date, could become paramount. The accuracy of the marketing decision could also be increased when other historical records and prior animal performance patterns supplement the data. The overall accuracy and reliability of a futures marketing system could then also become more refined, as the input of the information is continually enhanced. Utilization of methods that can reliably estimate animal growth and projected production costs would help reduce forecasting errors and associated risks by avoiding feeding periods that result in large losses. The importance of these factors becomes more pronounced with the understanding that futures markets really provide price protection rather than price enhancement.

When cattle are sold on price grids the premium and discount values are based on estimated quality or yield grades. These values are dependent on the choice-select price spread. Therefore, exposure to arrangements of more accurate placement information would also help mitigate any imbalance in the supply-demand function.

Similar to beef cattle, there are also optimal days to market groups of hogs. The total loss for not marketing at the correct time causes the loss function to dramatically accelerate over the optimum sale date. Also like the beef industry, consumer trends are driving the hog-packing sector to seek high-quality uniform product in terms of size and weight. Following the needs of the processors, direct operating ownership by the processor and strategic marketing alliances between hog producer and processors are now increasing. Hog production is broken down into separate stages for production operations and includes farrowing, weaning and finishing. Feeding is also staged to control efficiency and quality and isolated within separate facilities to help contain disease. Producers can be both independent or contract operators while financial lenders tend to favor the contract operators due to perceived lower associated risk. Both types of producers can reduce the level of fixed operating costs by establishing efficient marketing and information flow mechanisms.

Current marketing strategy for hog producers now generally require the adoption of vertical integration and marketing alliances to sustain profitable operations. Both processor and consumer groups are emphasizing hog production with the desired quality and carcass characteristics. The animal sale prices are net of marketing costs and accordingly advanced low cost efficient marketing systems are becoming more essential.

4.12 Pages and User Interface for 3D Data System

The graphic user interface can be presented to a user of the three-dimensional animal volumetric system on the users computer screen. The users computer can be interconnected or networked to the optical measurement systems hardware either by hardwire or through an appropriate wireless transmission mode.

In one embodiment, the graphic user interface is presented to the user and is governed by an application program derived in accordance with the present inventor that runs on the user's computer. The application program window can display media and other information while yet providing controls to perform a variety of functions. The user is able to interact with the application program through the use of the innate program controls, which then also can command other processing functions, which can also control still other operations.

The graphical user interface is also suitable for other related search and browsing and selection functions. The applications program governs the display of the specific search criteria. Information can be previewed in the program window, a first sub window and a second sub window and through one or more source windows. The windows can contain a variety of information including graphically rendered objects, video media and externally acquired media from a media server. In one embodiment the graphical user interface can also be controlled from an applications program run on a remote server.

4.12.1 Goals

The displays and user interface for this invention are designed to accomplish the following goals:
  a) Conveniently acquire 3D images for selected optical measurement and calculation of the identified cattle or pig animal;
  b) Readily confirm the reliability of the acquired data;
  c) Display the computed calculated results of the animal 3D volumetric measurement with precision and clarity;
  d) Provide combinations and analyses of these measurements and numerical analysis in a beneficial manner together with an opportunity for active user response commands;
  e) Provide a database archive which will serve as an historic record and as a performance reference for future livestock.
  f) Determine in real time, multi-view and 3D rendered infrared anatomical images showing representative temperature radiation thermograph contours expressed in alternate color patterns for use in qualitative and quantitative assessment of animal wellness or injury;
  g) Provide additional external resource data useful to the economic and risk analysis decision-making process of the user;
  h) Provide an electronic market format for spot and futures financial exchange transactions coincident in part to the data derived from the 3D volumetric animal measurement system;
  i) Create a historical record of identified individual and group animal measurement, analysis and disposition activity which can be codified in report form and capable of electronic transmission via the Internet.

4.12.2 User Interface Pages

In one form of the invention, the computer user interface produced by a selected application program can include one or more media windows, sub-windows and source windows or columns that may provide a plurality of displayed items including screen directions and go to select instructions for other information downloads. The windows, or sub-windows may also contain displayed written text, lists, graphs, charts, drawings, diagrams, data, tabulated data, histograms, photographs, still and live video and infrared thermograph images. The presented information may or may not correlate with each of the respective screen windows, sub-windows or source windows.

The window, sub-window or source window, which may also be considered a frame, may be out-lined, visually pronounced, shadowed or otherwise graphically enhanced for emphasis of the presented information. The graphic user interface screens or pages may also contain other objects, icons, file tabs, buttons, triangles and geometric figures, micro-pages and symbols and indicia that pertain to the operation, selection and presentation control of the acquired data.

The display of one window, sub-window or source window may be selected, changed or scrolled or flipped utilizing certain transition characteristics, visual effects (including fades and wipes) and other styles or related techniques with accompanying audio sounds that are well known to those skilled in the art. Likewise, the screen presentation of the system icons may also employ similar dynamic motion effects or associated graphical treatment and accompanying audio sounds.

Some of the program interface embodiments include toolbars with selectable command functions that also may be redundant or short-cut links to other control objects located within the screen itself. When the user interacts with initial base page, screen changes may be accomplished in a variety of different ways. These include action of the interactive toolbar menu items, by selection of alternate icons, or through individual referenced page screen control tabs or through manual entry of selected information. A decision to return to a prior page or go to an alternate screen page can also be accomplished in a similar manner.

When an icon, button, menu item or screen tab are used, the respective item will probably become highlighted for visual acknowledgement of the object selection.

FIG. 4-54 illustrates the combined use of the alternate toolbar, icons, tabulated page selections, and other keyboard data entry means on one form of an interface page. For reasons of clarity, FIGS. 4-57A and 4-58 through 4-69B illustrate only page screen selection tabs shown.

4.12.2.a Acquisition Page

One component of the user interface of this invention is an ACQUISITION page 500 (FIG. 4-54). This user interface page is designed to conveniently acquire the 3D data, indicate to the user that a successful acquisition has occurred, and display valid 3D data in a manner that builds confidence in the 3D, anatomically-inferred, calculation system.

The ACQUISITION page of FIG. 4-54 includes a region (501) designed to assure an accurate acquisition of input data. In the example, this input region occupies the near left quarter of the screen next to the primary media image area 510. The upper segment or subscreen of this section displays a live video image from the trigger camera 502. The primary function of the trigger camera is to trigger the data acquisition when the nose of the target animal breaks the target plane as indicated by (501) in FIG. 4-54. This target plane is also shown near the nose of the target animal in FIG. 4-55. The image from the target camera is processed in the region of the target plane for changes due to the approach of the target animal. A unique optical pattern may be placed on the far wall of the confinement fence (FIG. 4-55) to enhance the target detection near the target plane. The live video from the target camera also permits the user to view the position of the target animal in the chute prior to triggering the data acquisition. At the user's discretion, a manual triggering mode may be selected by selection of MANUAL (508) instead of AUTO (507). In the manual mode, the data acquisition commences upon clicking on the TRIGGER button (505). When the trigger function is initiated in either the automatic or manual modes the trigger light (504) turns on momentarily to indicate that the data has been successfully acquired and stored. A successful data acquisition also results in the storage and display of a low resolution, color digital image (520) of the target animal from the trigger camera as shown in the upper right corner of FIG. 4-54. This color, still image 520 of the target animal may be used for future identification of the animal and visual information such as color or breed. The input data region of this page also includes additional information about the target animal such as:

a) date of 3D data acquisition;
  b) an animal identification (I.D.) number or code;
  c) the location of the data acquisition (i.e., farm, city, state);
  d) breed;
  e) birth date; and
  f) age.

These data may be entered into the system in a number of ways which include but are not limited to:

a) manual entry in advance via the DATA page FIG. 4-67;
  b) manual entry in the ACQUISITION page FIG. 4-54;
  c) table look-up by reference to an I.D. number or code with the information table being supplied in advance via a digital storage device such as a CD, floppy disk, portable memory card, On-line download or similar means; and
  d) table look-up via an I.D. number or code with the information table being supplied directly from a digital storage device located on the target animal in the form of a digital ear tag, collar tag, or other resident data storage site on the animal.

The I.D. number or code used to locate the necessary digital information may be entered into the system in a number of ways, such as:

a) manual entry on the ACQUISITION page (FIG. 4-54);
  b) manual scanning of a custom bar code sheet which has I.D. numbers or codes of all target animals in the given herd in the format of a bar code which may be rapidly scanned while the target animals are passing the 3D, data acquisition site;
  c) automatic entry from scanning an RFID (radio frequency identification) tag located on the target animal; or
  d) automatic entry from electromagnetic or thermal scanning of an animal I.D. number or code located somewhere on the target animal.

The top center region (510) of the ACQUISITION page (FIG. 4-54) shows a 3D view of the target animal in the media display. The format of this data display as shown in 510 is a triangle mesh surface. This display form may alternately be a shaded surface as shown in FIG. 4-56, or any of a multitude of other 3D surfaces known to those skilled in the art. This 3D surface of the target animal may be continually rotated or counter-rotated as indicated in FIG. 4-56 by the arrows. The motion of the rotating 3D target animal may be used in conjunction with the trigger to indicate a successful data acquisition that is visible from a distance away. For this function, the rotation would begin upon successful data acquisition and continue for a predetermined time such as 5-10 seconds. This would alleviate the need for the operator to be watching the display at the exact instance that the data was confirmed in order to be assured that the data was successfully acquired.

Other indicators of value on the ACQUISITION page (FIG. 4-54) are the display of pre-selected calculations such as shoulder height (511), rump width (512), hip height (513), BCS score (514), and frame score (515). Any of the calculations available with this system may be selected for display on this page via the PREFERENCES page (516) as shown in FIG. 4-65. Representative indicia such as helpful symbols may be displayed with each calculation to permit easy interpretation of the calculation. Such indicia and symbols are illustrated in 511, 512, 513, and 514 of FIG. 4-54.

Additionally, it is advantageous to display a calculation from the current target animal relative to similar calculations made on other members of the herd. One way to accomplish this is to graphically display a histogram of the herd data with the current calculation value highlighted via an arrow as indicated in 517 and 518. Other expanded means to display comparative 3D calculations and highlight the current calculation can be accessed in by operation of the command functions located in the outer most left-handed panel column on the acquisition screen. These functions are all well known to those skilled in the art of statistical displays and are encompassed within the scope of this invention.

4.12.2.b Animal Data and Calculations Page

FIG. 4-57A illustrates one example of an Animal Data and Calculations page, illustrated in abbreviated form with highlighted screen tab 530. The purpose of this page is to display acquired calculations and data for an individual animal. This page may display a history of all prior screening over-time data and calculations for the selected animal. The animal may be selected by its I.D. number from a list of numbers as indicated by 531. Upon selecting the animal, relevant data and calculations become available in the associated graphical fields. A record of historic data acquisition dates is displayed (532). The locations of calculations (533), breed (534), sex condition (535), and birth date (536) may also be displayed. Other financial asset assignment and contract numbers can also be identified.

Pre-selected graphs of calculations for the selected animal may be displayed as a function of time as indicated by 540, 541, 542, 543, 544, and 546. Additional individual analysis may be graphed as a function of other selected calculation as indicated in 545. The pre-selection of which graphs to display may be made on the PREFERENCES page selection tab (516) as shown in FIG. 4-65. A default selection is available until the user instructs the system otherwise.

An arrow 537 pointing to a respective date of data acquisition on the Animal page screen indicates the selection information for a given calculation date. The date may be selected by dragging arrow 537 with the computer mouse to the desired date or by clicking on the up/down arrows (539) to select the date. After a predetermined delay such as 1-2 seconds, the data associated with the given date is highlighted via data arrows 547 in all graphs. The values of the calculations for the selected date are displayed on each graph as well together with all other appropriate information. Additionally, the 3D image of the animal (538) is displayed and rotated after all data has been displayed. The historical still image (549) taken by the target camera is also displayed and corresponds to the selected date. A GRAPH ALL button is also shown to indicate that all calculation data is to be graphed. Separate identifying indicia or diagram may be displayed next to a given graph or calculation value as indicated by 550 to speed recognition of that calculation.

FIG. 4-57B comprises a companion segmentation screen to the Animal Page FIG. 4-57A and provides an interactive graphical representation, which can be used to review and separately measure specific growth coordinate data of the animal including the ribeye area at alternate stages of its maturity. This separate interface page is initiated by clicking on the segmentation icon following the animal page selection. Here, a first graphics screen 551 presents a reconstructed historical side view of the animal at the image scanning acquisition date selected. This screen presentation also includes vertical and horizontal cursors so as to position graphical cut-away anatomical diagrams for user review. Separately, a second graphics screen 554 is provided at the right-hand side of the interface screen presentation and illustrates a computer generated interior anatomical structure of the animal cross section 555 at various selected X-Y coordinates. The image rendering software for the anatomical visualization is contained in the application program of the invention. The specific views taken from the reconstructed visualization of the animal are also representatively-sized showing the physical embodiment of the internal anatomy at the particular stage of growth history that has been selected. Specific measurements taken from the previously acquired and calculated 3D volumetric data can be reviewed as desired by historical date. By way of example when a selected one of the X-Y screen cursors 552 and 553 respectively are positioned, the related measurement data is presented graphically in the digital boxes 556 located proximate the lower portion of the screen. Additionally, by selectively positioning the X-Y cursors 558 and 559 respectively in the cross-sectional right-hand graphical screen 554 other important information can also be calculated, namely including rib-eye area, shoulder area, heart girth and rump area. These values can be used for further animal analysis including animal growth as a function of time. The summary data can be stored in the respective animal folders as shown in the reference information blocks 554 illustrated at the bottom of this segmentation page screen.

4.12.2.c Herd Data and Calculations Page

FIG. 4-58 illustrates one example of an individual Herd Data and Calculations page highlighted as selection tab (560). The purpose of this page is to display acquired calculations and data for an entire herd or group of animals. This page may display a history of all data and calculations for the selected herd. The herd may be selected by its own aggregation number from a list of herd numbers as indicated by 561. Upon selecting the specific herd, relevant data and calculations become available. A record of historic calculation dates is displayed (562). The locations where herd calculations were taken (563), and the origins of herd members (564) may also be displayed.

Pre-selected graphs of average herd calculations may also be displayed as a function of time as indicated by 570, 571, 572, 574, 575 and 576. Additionally, calculation averages may be presented in graphical form as a function of another average such as indicated in 573. The pre-selection of which graphs to display may be made on the PREFERENCES screen FIG. 4-65. A default selection is available until the user instructs the system otherwise.

An arrow indicates the selection of a given calculation date. The date may be selected by dragging arrow 577 with the computer mouse and clicking on the desired historical scan date. After a predetermined delay, such as 1-2 seconds, the data associated with the given date is highlighted by the associated data arrows 578 on all related graphs. The values of the calculations for the selected date are displayed on each graph as well. Representative indicia or diagrams may be displayed next to a given graph or calculation value as indicated by 579 to speed recognition of that calculation.

Additionally, histograms of herd calculations may also be displayed for the selected date as indicated in graphs 580, 581 and 582.

4.12.2.d Herd Comparison Pages

FIG. 4-59 illustrates one example of a herd comparison page here shown with highlighted selection table 600. The purpose of this particular page is to compare calculations and data from multiple herds or groups of animals. A comparison screen such as is shown in FIG. 4-59 would be useful for a sales barn operator since it provides the capability to compare a number of herds according to a selected calculation at a single time. Since a sales barn has a given animal or herd for a very short time, there is no need for graphs of calculations as a function of time.

As shown in FIG. 4-59, the herd may be selected by its own identification criteria from a list of collated numbers (601). A given herd may be selected for review by locating the mouse cursor over the desired herd number, in the list (601), and then clicking the mouse. The specific herds selected for comparison are then correspondingly highlighted in the list (601). Similarly, the calculations of interest may be selected from the calculation list (602) by clicking the mouse while the cursor is over the desired calculation. The desired graph type may also be selected from the list of graph types (603) in a similar manner. The lower left corner of the page shows the herd numbers, calculations and graph types which have been selected (604). The choices of calculations and graph types from which to select may also be modified from the PREFERENCES screen (FIG. 4-65).

As shown in FIG. 4-59, alternate herd calculation graphs are displayed in a matrix where the rows (605) are a given herd and the columns (606) are a directed specified calculation. Herd identity numbers are displayed to the left of each row (605). Calculation subjects are displayed at the top of each column (606). Statistical values (607) for the herd calculation are displayed next to each respective histogram (608). The mean of each histogram is also indicated on the horizontal axis by a short vertical bar (609). Additionally, the standard deviation is also indicated as a horizontal arrow (610) beneath the horizontal axis for each histogram graph.

FIG. 4-60 shows an alternative herd comparison page, which is designed for companion use by feedlot operators. This page provides average growth curves for several herds at once and compares them to a reference growth curve. The graph types available (603) also have as an option a time graph to provide growth data. The lower row of graphs (611) has been modified to show growth curve data. Additionally, a calculation date selection (612) is available to shift a data arrow on the growth curves, which correspond, to the calculation date. The growth curves, 617, 618, and 619 are plotted against a reference growth curve and are color-coded to match the corresponding colored herd labels 605, 615, and 616, respectively. A double click feature on a specific column item will initiate re-computation of a selected growth curve.

4.12.2.e Live Valuation Page

FIG. 4-61 illustrates one example of a live valuation screen having a LIVE VALUE highlighted selection tab 700. The purpose of this page is to provide an inferred running valuation of a large number of animals as they are unloaded from a transport vehicle. This operation is somewhat analogous to the checkout counter of a grocery store where each item is scanned, its value determined, and a running count of the items and their valuations is provided. Such a page would be useful to a sales barn or slaughter house operator.

Prior to the scanning of animals for input into this page, a data disk or other form of stored input would be provided to the system. This initial data includes such information as the owner of the animals 701, a count of transported vehicles and corresponding license plate numbers 702, the type of animal identification system that will be used 703, and the current sales price per pound. If a manual animal identification will be conducted, an advance list of animal I.D. numbers is beneficial to speed the calculation and valuation process. Additionally, a specific per pound sales price grid must be agreed upon in advance, and entered into the system.

FIG. 4-61 also shows owner and transport vehicle information on the left of the screen, 701 and 702, respectively. The type of animal identification is also indicated (703) as either:

a) radio frequency identification (RFID);
b) bar code; or
c) manual.

RFID numbers may be automatically read from the animal tags into the calculation system as the animal enters the calculation area. One bar code method may include a bar code which is manually scanned on an animal tag (such as an ear tag). A second bar code method employs pages of computer-printed bar codes next to their corresponding animal I.D. numbers. In this second bar code method, the animal I.D. numbers are visually (human vision) read from the animal ear tags and a bar code reader is swept across the bar code adjacent to the animal I.D. number on the computer-generated list. A slower method requires that the operator enter the animal I.D. number via keyboard or voice recognition system. Other animal identification methods are possible and fall within the intended scope of this invention.

The number of animals scanned is counted in the lower left of the page (704). The count is displayed as both a truck count and a cumulative count for the given owner.

As each animal is unloaded and passes through the calculation system, its I.D. number 717 is acquired and entered into the system. Various calculations are also made and histograms (705 through 713) for these calculations are built and displayed. These calculations, in conjunction with the acceptable sales price information, provide the basis for a valuation of each animal. Each additional animal valuation is sequentially added to the sum of the previous animals to form a cumulative valuation 714. When the herd calculation is complete, the cumulative valuation becomes the final total value 715 for the herd.

The pricing structure 716 which has been agreed upon prior to unloading of the animals following transport is listed on the screen as well.

The calculations that are displayed are selected from the "PREFERENCES" screen, FIG. 4-65. A default set of calculated graphical presentation subjects are automatically selected until the user chooses otherwise.

4.12.2.f Time to Market Page

FIG. 4-62 illustrates one example of a TIME TO MARKET screen having a highlighted selection tab 800. The purpose of this page is to provide an estimation of the optimal time to sell an animal or a herd. FIG. 4-62, as shown, illustrates the method of this invention for a herd of animals where the costs, values and prices are average herd values. A similar valuation may be made for individual animals.

In this time to market interface page, the feed mixture fed to the animal's criteria is selected in the uppermost left-hand corner (801). As shown, four standard feed mixtures and 3 custom mixtures are available. The mixture selection and associated costs may be entered in the DATA screen (FIG. 4-67). The graph (802) to the right of the feed mixture selection shows the feed cost over time. Four feed times are evident from this screen with a different feed selection possible for each. The feed selection is selected for a given time by mouse-clicking on the appropriate box (803) in each of the four time periods. The selected feed is displayed below each time period (804). The feed cost curve (805) is computed from the feed selection in each time period, the feed cost per pound, and the estimated feed volume consumed by a given animal based upon its inferred live weight and volumetric bulk from the acquired data as shown in the upper right corner portion 807.

The growth curve (808) parameters are chosen according to the selected growth curve (806). The anticipated frame size bulk (809) is output-based upon the growth curve selection.

In the lower left corner of the screen, FIG. 4-62, the cost of the feeder animal per head is entered and the expected sales price per pound. From this information, the fixed animal costs are computed. Additionally, the variable costs such as feed, interest and yardage are computed as a function of time. Using this information as described previously, a per-head herd average is computed for the optimal time to market. The net gain curve (812) is graphed in the lower right corner of the screen. A vertical arrow (813) indicates and labels the optimal time to market. The herd averages (811) indicate the various prices, costs and profit for this optimal market timing (per head). A range of times (814) may be displayed to show a time period where the net gain is within n percent of the peak net gain, where n is a percentage of the net gain. Alternate animal or herd time to market data can also be graphically displayed by selection of the appropriate identification nomenclature in the digital display below the net gain sub-screen.

4.12.2.g Projections Page

FIG. 4-63 illustrates one example of a PROJECTIONS screen having a highlighted selection tab 900. The purpose of this page is to project future growth based upon earliest available data. FIG. 4-63 illustrates the method of this invention for a herd of animals where the costs, values and prices are average herd values. A similar valuation may be made for individual animals.

In FIG. 4-63 the feed mixture 901 fed to the animals is again selected. As shown, four standard feed mixtures and 3 custom mixtures are available. For automatic registration, the mixture selection and associated costs may also be entered in the DATA screen (FIG. 4-67). The superimposed graph 905 in the sub-screen 902 shows the feed cost over time. Four feed times are evident in this graphical screen with a different feed selection possible for each. The feed selection is selected for a given time by mouse-clicking on the appropriate box (903) in each of the four time periods. The selected feed is displayed below each time period (904). The feed cost curve (905) is then computed from the feed selection in each time period, the feed cost per pound and the estimated feed volume consumed by a given animal based upon its inferred live weight and bulk from the acquired data, as estimated in the lower left corner of this page portion (907).

The growth curve (908) parameters are chosen according to the selected animal growth curve (906). The anticipated frame size (909) is output-based upon the growth curve selection.

The right half portion of the screen is used to project the inferred live weight of the animal or herd. The growth parameters may be selected manually by clicking on the MANUAL SELECTION button (910). In the manual mode the growth curve parameters associated with the animal growth curve selection 906 as displayed in the curve 908. An alternative to the MANUAL operation (910), the PARAMETER ESTIMATION mode (911) may also be selected. In this mode the early estimated parameter values are predicted based upon the calculation data 912 acquired thus far. This data is shown in the major graphical sub-screen of FIG. 4-63, as a solid bar (912) representing the beginning birth weight of 72 lbs and ending at the volumetric inferred weight of 734 lbs. The corresponding time is shown on the time axis as a solid bar (916). From this early data the growth parameters are determined and the calculated growth projection (913) is displayed. The accuracy of the projection increases as the amount of available data for calculation and time increases. Tolerance band curves (914) are displayed around the projection to indicate the likely accuracy of the projection. Tolerance arrows (915) may also be displayed with or without a numerical tolerance indicated.

A table (917) of parameter values and projected calculations may be provided. This table may include the growth curve selected (manual mode), the time constant, the birth weight, the mature 3-dimensional, anatomically inferred (3DAI) live weight, the present 3DAI live weight, and a growth coefficient associated with the feed selection if known. This feed coefficient may be used to slightly enhance or suppress the growth curve time constant according to the energy content of the selected feed.

4.12.2.h Cost Analysis Page

FIG. 4-64 illustrates one example of a COST ANALYSIS screen having a highlighted selection tab 930. The purpose of this page is to provide an estimation of the optimal time to sell an animal or a herd and to investigate the interrelationships and interactions between the various costs, prices and growth curves. FIG. 4-64, as shown, illustrates the method of this invention for a herd of animals where the costs, values and prices are average herd values. A similar valuation may be made for individual animals.

Located in the upper left-hand corner portion (931) of FIG. 4-64, the feed mixture fed to the animals is selected. As shown, four standard feed mixtures and 3 custom mixtures are available. The mixture selection and associated costs may be entered automatically from the DATA screen (FIG. 4-67). The graph 935 of sub-screen 932 shows the inferred feed cost over time. Four feed times are evident in this Figure with a different feed selection possible for each. The feed selection is entered for a given time by mouse-clicking on the appropriate box (933) in each of the four time periods. The selected feed is displayed below each time period (934). The feed cost curve (935) is computed from the feed selection in each time period, the feed cost per pound, and the estimated feed volume consumed by a given animal based upon its 3DAI live weight, as estimated and graphically displayed in a first screen located in the upper left-hand corner portion of FIG. 4-64.

The growth curve (952) parameters are chosen according to the selected growth curve (950) and presented in the related second graphical presentation sub-screen shown at the right-hand portion of the page. The anticipated animal frame size (953) is output-based upon the growth curve selection.

In the lower left-hand corner portion 940, the cost of the feeder animal per head is entered along with the expected sales price per pound. The fixed costs default to those entered into the DATA screen (FIG. 4-67), but may be changed by entering a custom number into the feed cost table (940) of FIG. 4-64. The inputs and outputs of the computations are selected via mouse clicks over the designation in 941. The resulting curves may then be observed:

a) 3DAI live weight (955);
b) calculated hip height (956);
c) feed costs (957);
d) sale price (958);
e) total cost (959); and
f) net gain (960).

The displayed graphs, 955 through 960, may be replaced by other calculations via the PREFERENCES screen (FIG. 4-65).

The Cost Analysis page interface is accordingly designed to show the user the impact of changes and the tradeoffs possible from the various aspects of the livestock operation.

4.12.2.i Preferences Page

The purpose of PREFERENCES screen (FIG. 4-65) having the highlighted selection tab 516 is to specify default values for other pages within the data processing functionality of the program software. FIG. 4-65 illustrates several possible features that may be implemented on the preference screen 970. Additional components may be included as described elsewhere in this specification.

Acquisition Preferences (971) are illustrated in the upper left-hand portion of screen FIG. 4-65. Since the automated data acquisition may be triggered by either analysis of a live video camera or the output of a proximity detector, the trigger technology is identified by mouse clicking over the appropriate box in region (972). Similarly, the trigger mode (973) and the I.D. method (974) may also be selected. Additionally, FIG. 4-65 also provides for the selection of the 3D rendered animal model rotation speed and counter-rotation on graphical interface screens such as the ACQUISITION screen (FIG. 4-54).

Certain of the graph preferences 980 used in other screens are established on this screen (FIG. 4-65). By way of example, the animal page preferences (983) of FIG. 4-65 are shown with a number of graph options for display. The solid boxes select graphs of hip height, shoulder height, rump width, hip height growth curve, and BCS score. The graph selection with the alternate page fields is automatically changed by simply mouse-clicking over the selection preferences box to toggle the selection on or off. The histogram graphs (985) are selected in a similar manner. Default values are initially provided and a check for the proper number of graph selections is also implemented.

Similarly, the On-line internet data feeds 986 for screen selection of commodity markets, beef animal related sites, pork animal related sites, academic and government sites, weather product sites, New York exchange commodity quotation sites, Dow Jones futures and alternate currency valuation sites can also be accessed. These additional preferences, described above, can likewise be implemented in substantially similar manner using the computer mouse or screen cursor.

4.12.2.j Setup Page

The purpose of the SETUP screen (FIG. 4-66) having a highlighted selection tab 990 is to handle details of the logistics and basic operation of the 3D animal volumetric measurement system. Such items as the printer setup (1000), system information (1020), base station security (1030), calibration information (1040), and base station report (1050) parameters may be addressed in the SETUP screen. Additional components may be included as described elsewhere in this specification.

The PRINTER SETUP (1000) provides control by the user over common printer functions such as the selection of the printer model (1002), paper orientation (1004), and paper size (1006). A PROPERTIES box (1008) within the PRINTER SETUP region provides access to additional printer settings provided by the printer manufacturer or the computer operating system. A key component of the PRINTER SETUP sub-screen is the Timing of Printer Output selection. If a given system is being used to provide data or calculations for a commercial transaction, it may be desired or otherwise required that the printed output be provided nearly simultaneous with the acquisition of the 3D data for a given target animal. Such immediate printer output provides the necessary authenticated documentation for the associated commercial transaction.

A SYTEM INFORMATION box (1020) provides such system details as the model number of the 3D animal evaluation system, its serial number, and the employed program application software version number.

Since the security of the acquired and calculated data is important to many users of this system, a BASE STATION SECURITY box (1030) is provided. In this region a password (1032) may be required and selected to access the base station and its reporting data. An indication (1034) that a password has been enabled is also useful. Data encryption may also be selected within this box (1036). With encryption enabled, all data files generated by the base station will be encrypted for security purposes.

Since the accuracy of these calculations is important, a CALIBRATION screen selection box (1040) is provided. This box may contain information regarding the most recent calibration date, the due date for the next calibration, and perhaps a calibration authorization code which is unique for each calibration and the person or organization responsible for that calibration.

Additionally, a BASE STATION REPORT box (1050) is shown. In this box the data and calculation parameters (1052) are selected which will appear in the base station report. These parameters may include any of the input data, 3D data, or calculations available with the 3D animal evaluation methods of the present invention.

4.12.2.k Data Page

The purpose of a DATA screen (FIG. 4-67) having a highlighted selection tab 1099 is to select the input and output data involved with the operation of the 3D, animal evaluation system. INPUT DATA (1100) includes information about the target animal(s) prior to scanning via the present evaluation event. Such input data may include the breed, sex, condition of each animal, birth date, place of birth, and/or historical 3D, anatomical scanned data from previous data acquisition and calculation sites.

The source of these data (1102) may be selected from a number of options such as manual, disk, network or e-mail. If manual is selected, the screen opens into a sub-screen which accepts keyboard or voice entries of the requested input data. If disk is selected, the drive containing the data disk is requested. If network is selected, the network I.D. of the source within the network is requested. If e-mail is selected, the e-mail address which will provide the data is requested, together with appropriate down-load instructions.

Additionally, the input data format (1104) may be selected from among such options as 3D Data, Excel, Text, Access, or Custom. The 3D Data selection is a custom format specifically designed for the data of this invention. Excel and Access are common Microsoft formats for spreadsheets and databases respectively. Text refers to common ASCII text formats. Custom format refers to any other format which may be deemed to be useful in connection with this invention.

Security is important in the exchange of data associated with the 3D animal measurement system. To this end an Authorization Code (1106) may be required from the data source in order to assure that proper permission has been obtained prior to data transfer. Additional Verification Procedures (1108) may include encryption, password protection, electronic hand-shake, hand-shake and re-dialup, and/or e-mail confirmation of the data exchange. As with any computer system, it is helpful to scan the incoming file data for computer viruses (1110). Additional details or necessary configuration setting may be accessed via the Advanced Properties block (1112). This block provides a doorway into the setup protocols of data and equipment from external vendors.

OUTPUT DATA sub-screen (1120) options may be selected as also shown in FIG. 4-67. A Base Station File Name (1122), where input and generated data will be stored, may be manually or automatically selected.

Since the data involved with the 3D, animal measurement system may be useful to a number of parties, it is advantageous to carefully identify these parties and select which subset of the available data that each should receive. As further illustrated in FIG. 4-67, and by way of example, five parties have here been selected to receive data (1124). The names of the authorized parties are specifically listed (1126). Additional contact information may be determined via the block entitled, Contact Information—Authorized Parties (1128). Encryption of output data may be selected for security. The Encryption Enabled screen selection box 1130 will be highlighted if it is desired that the output data be encrypted.

The data subset authorized for each receiving party may be selected as illustrated. By way of example, for pig animal data, the receiving parties include a breeder, a feedlot, a pork processor, and two financial institutions which have loaned money towards the operations. Here, the pork producer is operating the 3D, animal measurement system. Accordingly, the pork producer, Party #2, will have full access to a complete data report. The breeder, Party # 1, contractually receives a subset of data which includes those parameters which are advantageous to its breeding program. The pork processor, Party # 3, contractually receives a subset of data which permits it to anticipate the characteristics of the live pigs, animals which are expected to be delivered to market. The two financial institutions, Parties # 4 and #5, receive only a summary of the herd data, which fulfills their financial tracking requirements without unnecessarily disclosing proprietary growth or breeding data.

4.12.2.L Interfaces Page

The purpose of an INTERFACES page (FIG. 4-68) having a highlighted selection tab 1199 is to handle the logistics and basic operation of the external computer interfaces which interact with the base station of the 3D, anatomical evaluation system. Examples of these interfaces include but are not limited to Radio Frequency Identification Device (RFID) systems (1200), system components (1220), and displays (1230). Additional components may be included as described elsewhere in this specification.

RFID systems provide automated identification of individual cattle and hogs as they pass within the range of reading devices. These systems rely upon the wireless communication of data from a remote tag on a given animal transmitted electronically to a base reader. The transferred data may range from a simple identification number or code to a complex data set which includes a historic database for that individual target animal. Typically, the coupling between an RFID system tag and base reader is electromagnetic in nature. Passive systems require no power source within the animal tag thus reducing the cost of the tag but limiting the operating range to several inches. Active systems require a power source within the animal tag increasing the cost of each tag but providing an operating range of many yards. The operating range for both system types is ultimately determined by the relative ratio of signal strength to unwanted noise strength at a given location. The active system can provide greater signal strength due to its internal power source. The passive system is limited in range since it receives its power from the reader system prior to transmitting its data. Technical advances are increasing the range for both types of systems, though the inherent characteristics and limitations of each system type remain. Additionally, a number of governments have established or are in the process of establishing standards (including animal country of origin labeling (COOL) and premise location requirements) for all livestock identification systems. It is the intended function of the present invention to interface with available RFID systems, regardless of power source or governmental standard.

The RFID system (1200) as illustrated in FIG. 4-68, provides for the selection of the appropriate RFID standard. As observed, such RFID standards are being adopted or are under consideration in a number of countries. As illustrated, the appropriate RFID standard (1202), and its latest revision number, may be selected. Additionally, the type of technology, passive or active (1204), may be selected. The operating frequency may also be selected from a list of frequency ranges (1206). Further, it is envisioned that specific, approved RFID vendor system tag technology may selected from a menu of known RFID systems. A block entitled Advanced RFID Properties (1210) is also illustrated to provide a gateway to additional RFID system parameters provided by the software of external system vendors.

The System Interface (1220) provides for the selection of related system components, such as the Base Station (required), Hand-held unit, Mobile unit, Laptop unit and Remote Station. The Base Station includes the image processing unit, base computer, network interface, local display and keyboard (see FIG. 4-7). The Base Station is likely located next to the 3D, animal data acquisition system. The Hand-held unit represents an infrared or radio frequency, remote computer mouse which communicates with the base computer to select options shown on the display screens via common computer mouse actions. The Mobile unit represents a portable personal computer which communicates with the base station via a wireless link. The mobile computer is battery powered and resides in a vest or backpack to provide true portability within the range of the wireless network. The Laptop unit also communicates with the base station via a wireless link. This Laptop unit functions as a semi-portable, personal computer which can easily be moved from site to site within the range of the wireless network. While conveniently moveable, it is designed to fill the need for a temporary station site with its location changing from time to time. A Remote Station may also be selected. This Remote Station is envisioned as a desktop or laptop system that is connected to the base station via a local network or the internet. This Remote Station may be located in an office building near the Base Station or elsewhere within the corporate complex. The remote station provides an ideal site for archiving the acquired data and calculations. FIG. 4-7 provides a graphical representation of the various system components and their possible uses. The various system components shown in FIG. 4-7 are usable in connection with measurements of both beef and pig animals and can be interconnected by hardwire or wireless formats.

The Display Interface (1230) is also included in FIG. 4-68. Since various displays have different response times and color characteristics, the selection of the primary display (1232) permits the system to optimize the displayed data to the selected display. Advanced Screen Properties available from software provided by the display vendor may be accessed via block (1234).

4.12.2.m Animal Wellness

One form of the animal wellness screen of the invention having a highlighted selection tab 1239 is shown in FIG. 4-69A. This screen has been designed to acquire and review the general health and welfare and prospective ambulation of the animal. The multi-axis infrared camera array of the system provides 3D IR image data capture in alternate fields of view and simultaneous multi-view image display presentation for user animal wellness assessment.

The animal image is first observed in the live video box located in the upper left-hand corner portion of the screen interface 1240. This is the same video feed as previously discussed in the Acquisition screen FIG. 4-54. Multiple views of the animal are captured by the 3D acquisition system and are stored in the computer memory and registered by the animal I.D. number. Similar to the video image acquisition methodology, a particular infrared view of the animal, or portion thereof, can also be captured either automatically or manually by initiation of the desired infrared trigger mode. A freeze-frame command feature on the media screen 1244 is also provided to capture a particularly desired view from the plurality of views acquired by the acquisition system. Subsequent review of any of the visible spectrum images of the animal, or other selected portions thereof, can be initiated by a mouse or screen cursor click on the still video 1245.

Similarly, any one of the multiple IR images acquired of a specific animal by the acquisition system can also then be selected at will by reviewing the then tabulated still video screen thumbnail presentations. When an alternate view is selected for subsequent presentation, from the visible spectrum thumbnail profiles in the image window sub-screen 1245, the corresponding infrared view of the animal is then shown in the primary media screen 1250. Concurrent continuing review of all of the multiple images captured can also be accomplished by action of the individual review command function buttons 1251 and 1252 by mouse cursor click at the bottom of the screen.

The particular profile view can be also altered by action of the review/profile button 1252 including viewing of the 3D IR isometric presentation. The specific animal serialization and related information is taken from the entered information of the computer acquisition data register and is also presented in the lower left-hand corner portion of the interface screen 1253, similar to other data pages previously described.

Using the thermal camera arrays, surface temperatures can be obtained and, using the application program, can be displayed as IR thermograph contour patterns on the animal and can be presented in alternate multi-axis plan-views as shown in FIG. 4-69A or in 3D isometric views as illustrated in FIG. 4-69B. As illustrated in FIG. 4-69B, using the functional controls 1254, the animal image can be rotated as desired for different viewing angles as well as rendered and displayed in alternate predefined axes of rotation. In both the multiple view plan-form presentation (FIG. 4-69A) and the three-dimensionally rendered isometric views (FIG. 4-69B), the color contour temperature bands are readily visible and are identified by the associated color-coded temperature key 1256. The isometric views can also be obtained directly from one or more of the IR cameras of the system array. Respective areas of temperature on the body surface of the animal, including elevated levels, can then be discriminated and quantified by reviewing the corresponding vertical color bars 1258 located at the immediate right of the interface display.

By action of the mouse or screen cursor point and click on the animal images a specific temperature value can be determined and also identified in the automatically highlighted individual cell of the adjacent color key digital indicator. Such temperature values can also be obtained by controlled movement of the X-Y media screen cursors 1260 and 1262. Selected temperature ranges and decimal tolerances can also be pre-set for automatic alarm by entering desired values into the digital indicators 1264 and 1265 located on the lower right-hand portion of the interface screen. This will provide for automatic computer alarm alert 1268 through use of audio horn and visual screen flash modes of out-of-temperature parameters. This function will also allow for immediate indication of animal temperatures in excess of the selected value limits.

Both inferred surface and calculated core temperature measurement analysis can be selected for presentation. The core temperature is determined mathematically through numerical analysis of the summation of the 3D animal surface temperature data. Separately, the user can select either Centigrade or Fahrenheit digital display for all temperature data presentation. This method of obtaining core temperature is unique to the present invention and has not heretofore been disclosed in the prior art.

Another set of command functions is located at the bottom of the media screen interface display. These individual actions can likewise be initiated by the screen cursor and mouse click and range from alternate screen view presentations of the animal views to short-cut file marking and overall notification of animal status and planned disposition. Similar to the other interface pages, all of the relevant summary data is automatically recorded and stored in the computer memory and these data and associated document folders can then be accessed through use of the system icons or redundant command functions on the menu bar. The system software architecture also can provide alternate modes of file inquiry including animal identification number, date, owner, asset manager, animal disposition, exchange transaction file history recordation, etc. Permanent forms of printed documentation can also be accomplished by clicking on the file menu and pointing to the appropriate print command function, such as is found in most computer programs.

4.12.2.n Weather Products

FIG. 4-70 illustrates one example of a weather products screen available to the system user of this invention. The center media screen 1250 provides a graphical opportunity to display charts, graphs, geographical and refined territorial areas of weather information including expanded satellite and radar image views. Selector buttons 1252 at the right-hand side of the screen provide zoom-in and zoom-out screen presentation instructions. A mouse or screen curser click identifying a desired selection of an individual weather product file, located in the column 1254 located at the left-hand side portion of the screen will access alternate electronic external data downloads for specific weather information.

Separate fields of externally generated data groups for presentation here can be accessed through the action of the On-line data input selection tab 516 on the Preferences page, FIG. 4-65. Such appropriate selection of desired real-time data feeds will then concurrently be available for presentation on the Weather Products screen, FIG. 4-70. The three enlarged icons 1255 located between the graphical presentation screen and weather products column will provide commands to display specialized critical information in the media graphic sub-screen area 1250. Alternate five and ten-day forecasts, 1256, and temperature information can be displayed at the bottom of the display screen. Other command icons 1258 are positioned below the graphic screen for ease of function commands. Alternate menu applications are also located in the tool bar at the top of the screen.

Different selected forms of On-line weather data can be secured from multiple commercial sources and inputted to the computer system of this invention through the Preferences page (see FIG. 4-65) for real-time access and display on the user interface screen. Similar to the action required for other interface screens, the weather products display can be accessed by clicking on the appropriate tabulated selection area under the tool bar. Additional command function icons 1258 are located below the media screen for easy identification and access.

4.12.2.o Economic Reports

The purpose of one form of the Economics Reports screen shown in FIG. 4-71 is to provide the user with current and historical agriculture and financial information that can be useful to help make informed decisions relative to the disposition of the measured livestock employing methods of this invention. Alternate information products can also be displayed including both statistical data sets and real time reports. A screen zoom-in and zoom-out feature is also provided for ease of viewing. Command access of all of the respective icons or other detailed subject listings can be accessed by a mouse or screen cursor click on the product data reference 1260 of choice located in the vertical column on the left-hand side portion of the Economic Reports screen. Critical information can also be individually selected by initiating other separate bookmarked choices located on the right-hand side of the user screen. This feature can be especially useful when commodities trend-spotting analysis is being reviewed. Alternate currency and exchange values 1264 can also be obtained in real time. Copies of finished data can also be separately retained, time and date code stamped and electronically stored in memory for future reference and analysis. Many forms of economic research are also commercially available and can be acquired and provided to the interface display by direct electronic feed input (see On-line data selection, Preferences screen, FIG. 4-65.)

4.12.2.p Market Futures

FIG. 4-72A illustrates one form of a market futures screen that provides for listing of a single identified animal or collation of a group of selected animals, for individual and collective economic analysis, decision modeling, pending direct or electronic marketing and sale on web-based exchanges by spot or other related futures forward contracting financial transactions. The identified animal or animal group can be selected from the database of measured animals and assembled into one or more transaction folders. Each animal listed can be individually reviewed for potential economic value as shown in FIG. 4-72B for beef animals and FIG. 4-72C for pork animals. Here the available beef and port cuts of meat are shown in the media sub-screens 1265 and 1267 shown in the left-hand portions of FIGS. 4-72B and C respectively. Using the data acquired in accordance with the methods of the present invention, each meat cut output product is quantified according to yielded output and selected cut calculated value is determined as a line-item in the analysis section of each of the respective Figure drawings. By numerical analysis of the previously acquired data volumetric information of each identified animal can be used to determine all of the total expected quantity of meat cuts and yielded end-product output and its projected specific economic value. Current unit wholesale/retail end-product output pricing information with expected production yields and other associated costing information and related contingency risk or discount factors can also be manually entered into the line-item price listings which govern in part the results of the calculated transaction. The information is sub-totaled automatically and then listed at 1280 and 1281 by individual meat cut associated line-item and finally given in summary for a projected total animal value. This prospective animal valuation can then be further codified by animal location pen number and provided in an overall group summary listing for later transactional use. The selected animal listing and economic analysis would be available, if desired, for both prospective buyer and seller review.

Separately, buyers with specific product-defined inventory requirements of size, weight, and quality characteristics and/or quantification of additional desired meat cuts can also be characterized and grouped by animal line-item, representing individual animal I.D. numbers. This alternate animal serialized listing, with such specialized production requirements, can then also be provided independently, together with its own projected economic valuation. (It is again noted here that this analysis can be accomplished while the animal is alive and prior to its transport to market). Upon final overall animal listing and with mutual review between buyer and seller the sale transaction can then be consummated electronically through the use of an appropriate Internet commodity-trading site.

One form of the transaction data is listed in the right-hand portion 1282 of FIG. 4-72A. Here the location pen number 1284 provides a detailed compilation and listing 1285 of a collated group of animals by individual serial identification. By mouse or screen click on the perspective pen location number 1284 the associated detailed animal listing of animals housed within the respective pen will be further identified in the immediately adjacent Animal I.D. column 1285. When a mouse or screen cursor is placed on an individual I.D. number in this column and clicked, the respective serial number is then highlighted. Following a highlighted cell, the Line-Item Economic Analysis command function can then be initiated, again by a mouse or cursor click. This will provide an automatic screen change to either that shown as FIG. 4-72B Economic Analysis Page for a beef animal or 4-72C Economic Analysis Page for a pig animal. The previously recorded associated animal identification information will be automatically registered for presentation of the animal species and respective economic analysis screen. The specific projected yield output by retail meat cuts as shown in graphic screen insert 1265, and their associated projected value as shown in tabulated listing 1280 will then be automatically subtotaled by meat cut product line-item and summarized in the digital readout indicators below the tabulation screen 1287. Subsequently, the actual economic values received can also be manually entered into these digital displays. When a full production history accompanies the animal I.D. history, total performance economic gain and loss for each animal unit can also be calculated based on the projected or actual value received basis. The calculated summary data is then automatically listed in the transaction folder, by individual animal I.D. and location pen number. The computer system cursor or mouse can then highlight the location pen numbers 1284 and associated animals being offered for sale, represented by individual transaction folders 1289. These folders with the related calculated economic data are then available for either independent or mutual buyer and seller review, prior to a negotiated exchange transaction. Depending on the stage of the animal maturity, such a marketing transaction could take various specific forms such as a spot sale at a daily market price or as a future delivery instrument contract.

Upon review and acceptance of the transaction folder data, the precise product sale can also be consummated electronically as shown in the right-hand column of Market Futures screen (FIG. 4-72A). The transact button 1292, located at the bottom portion of the folder column will initiate the transaction by action of a double mouse click. When initiated the transaction button 1292 will light up, flash for a 10 second interval and provide an accompanying sub-screen warning notification, which automatically appears, of "Sell transaction will complete shortly unless otherwise cancelled." The required sale authentication and user key acknowledgement, accomplished prior to any sale completion and funds transfer, will also be electronically exchanged during this interval. If, for any reason, a successful authorization response is not received the transaction will be terminated. Seller notification of a properly completed transaction and related payment detail will immediately follow together with related confirmation codes on a further superimposed sub-screen.

An electronic payment means can also accompany the animal sale transaction. The actual payment processing can take various forms and include all necessary safeguards for proper electronic notification and payment deposit. These can include buyer and seller account authentication, transaction re-authentication, confirmation of proper authentication, single-user control, password control, sale review and confirmation, sale and payment deferral information, batched transactions with accumulated sale payment, buyer electronic On-line payment and banking system repository, seller On-line electronic banking system means, and purchase history, latest sale and payment transaction confirmation. Alternately, other customized payment processing can also be utilized, such as commercial electronic commerce payment resources.

The related analysis and sale data can then also be tabulated and mutually recorded within each of the respective buyer and seller computer systems, together with confirmed time and date-stamp including other predicate safeguards for secure conformation of the coded financial transaction. Similarly, all other related information can be listed for proper clearinghouse recordation, permanent storage in the computer memory and then also available for other later transaction reporting. The tool bar at the top of the display screen will also provide additional redundant application support to the interface pages previously discussed.

4.13 Breeding Selections

Separately, the calculations of the methods of this invention may also be used advantageously to estimate the outcome of animal breeding selections. As shown hereinafter by way of example, the trait calculations of a sire and dam may be used to estimate the same trait calculation of their respective progeny.

4.13.1 Progeny Prediction

FIG. 4-73 illustrates one method of computing an estimate of a progeny trait calculation. The actual sire trait calculation (1301), $T_{sire\_act}$, is normalized via multiplication (1302) by a male scaling factor, $C_{male}$, to obtain a normalized sire trait calculation, $T_{sire\_norm}$ (1303). Similarly, the actual dam trait calculation (1311), $T_{dam\_act}$, is normalized via multiplication (1312) by a female scaling factor, $C_{female}$, to obtain a normalized dam trait calculation, $T_{dam\_norm}$ (1313). The normalized sire trait calculation, $T_{sire\_norm}$ (1303) and the normalized dam trait calculation, $T_{dam\_norm}$ (1313) are scaled via scaling factors $k_{sire}$ (1304) and $k_{dam}$, (1314) respectively. These scaled trait calculations are then additively (in this example) combined (1305) to obtain the proportional contribution of each of the sire and dam to the normalized, calculated trait, $T_{prog\_norm}$, in the progeny (1306). The normalized, calculated trait, $T_{prog\_norm}$, of the progeny (1306) is then converted to the actual trait calculation prediction for the progeny determined by the sex of the progeny. If the progeny sex is male the calculated male trait, $T_{prog\_male}$) is obtained by scaling (1307) the normalized, calculated trait, $T_{prog\_norm}$ (1306), by a male scaling factor, $1/C_{male}$. Similarly, if the progeny sex is female the calculated male trait, $T_{prog\_female}$, is obtained by scaling (1317) the normalized, calculated trait, $T_{prog\_norm}$ (1306), by a female scaling factor, $1/C_{female}$.

The schematic example of FIG. 4-73 may be represented mathematically as:

$$T_{prog\_male} = (1/C_{male}) X [C_{male} k_{sire} T_{sire\_act} + C_{female} k_{dam} T_{dam\_act}]; \quad (7\text{-}1)$$

and, $$T_{prog\_female} = (1/C_{female}) X [C_{male} k_{sire} T_{sire\_act} + C_{female} k_{dam} T_{dam\_act}]; \quad (7\text{-}2)$$

where $T_{prog\_male}$ is the calculated trait of a male progeny; $T_{prog\_female}$ is the calculated trait of a female progeny; $C_{male}$ is the conversion factor from a male trait calculation to a normalized, asexual trait calculation value; $C_{female}$ is the conversion factor from a female trait calculation to a normalized, asexual trait calculation value; $k_{sire}$ is the proportion of the normalized, calculated trait that comes from the paternal parent; and $k_{dam}$ is the proportion of the normalized, calculated trait that comes from the maternal parent.

A common subset of equations (7-1) and (7-2) may be used to represent the normalized, calculated trait (1306), $T_{prog\_norm}$, in the progeny:

$$T_{prog\_norm} = [C_{male} k_{sire} T_{sire\_act} + C_{female} k_{dam} T_{dam\_act}]; \quad (7\text{-}3)$$

where the variables are as previously defined.

A numerical example of the above representations yields:

$$T_{sire\_act} = 1500 \text{ lbs. } 3DAI \text{ live weight}; \quad (7\text{-}5)$$

$$T_{dam\_act} = 1000 \text{ lbs. } 3DAI \text{ live weight};$$

$$C_{male} = 1.00;$$

$$C_{female} = 1.45;$$

$$k_{sire} = 0.40;$$

$$k_{dam} = 0.60;$$

$$T_{prog\_norm} = [C_{male} k_{sire} T_{sire\_act} + C_{female} k_{dam} T_{dam\_act}]$$

$$= [1.0 \times 0.40 \times 1500 + 1.45 \times 0.60 \times 1000]$$

$$= 1470 \text{ lbs.}$$

for a male progeny, $$T_{prog\_male} = (1/C_{male}) \times T_{prog\_norm} \quad (7\text{-}6)$$

$$= 1.0 \times 1470$$

$$= 1470 \text{ lbs.}$$

for a female progeny, $$T_{prog\_female} = (1/C_{female}) \times T_{prog\_norm} \quad (7\text{-}7)$$

$$= 1.0 \times 1470$$

$$= 1014 \text{ lbs.}$$

For convenience, the numeric values for scaling factors $C_{male}$, $C_{female}$, $k_{sire}$, and $k_{dam}$ have been arbitrarily selected in the above example. In an actual application of the methods of this invention, these scaling factors may be determined by empirical methods based upon herd history, breed history, breed standards, genetic provisions, or other physiological trait calculation or genetic reasoning.

4.13.2 Generational Scaling

The progeny trait estimates of Section 4.13.1 may be further modified to weight the influence from various generations of ancestors differently. FIG. 4-74 shows the distribution of influence for a progeny based upon three generations of ancestors (more or fewer generations are equally valid). The scaling parameter values are as previously indicated in equation (7-4). Additionally, $$k_{g3} = 0.1;$$

$$k_{g2} = 0.25;$$

$$k_{g1} = 0.65; \quad (7\text{-}8)$$

where $k_{g3}$ is the weighting of the third generation parameters before the latest progeny; $k_{g2}$ is the weighting of the second generation parameters before the latest progeny; and $k_{g1}$ is the weighting of the first generation parameters before the latest progeny. The chart of FIG. 4-74 is the resulting distribution of influence for these generational weightings coupled with the previously defined male-female scaling, and the sire-dam hereditary contributions.

FIG. 4-75A shows the result of applying male/female scaling, sire/dam weighting, and generational scaling. FIG. 4-75A indicates the actual mature 3DAI live weights of male and female members of the breeding tree while FIG. 4-75B represents those same mature 3DAI live weights converted to normalized values.

4.13.3 Environmental Scaling

An additional scaling that is not illustrated in FIG. 4-75A takes into account environmental variability such as feed, nutrition, stress and other non-hereditary factors. For an environmental coefficient, $k_{envir}$, of 1.008, the normalized progeny 3DAI live weight would change from 1470 lbs. to 1482 lbs. as indicated in the following equation:

$$T_{prog\_norm} = k_{envir} [C_{male} k_{sire} T_{sire\_act} + C_{female} k_{dam} T_{dam\_act}] \quad (7\text{-}9)$$

$$= 1.008 \; [1.0 \times 0.40 \times 1500 + 1.45 \times 0.60 \times 1000]$$

$$= 1482 \text{ lbs.}$$

The male and female progeny trait values would change according to equations (7-6) and (7-7).

4.13.4 Multiple Parameter Applications

The discussion thus far has dealt with the results from a breeding selection involving a single parameter or trait calculation. In a complete application of the methods of this invention, any or all of the 3D-inferred trait calculations described herein may be tracked with scaling coefficients for each.

4.14 Global Positioning System (GPS) Capability

Global Positioning Systems (GPS) have become popular in a number of technical products from cell phones, to fishing gear, to mountaineering equipment. In each application the GPS technology provides the precise latitude and longitude of the designated location.

The incorporation of GPS capability is valuable in connection with the methods of the present invention as well. By providing the precise location of the acquisition of each acquired digital image and subsequent correlations with the animal serialization this 3D tracking system can provide the time-location validation essential for disease tracking throughout the livestock industry. The more frequent the 3D data samples, the more valuable the tracking information. It is anticipated that the apparatus of this invention may include GPS capability such that the time, locational coordinates, and corresponding dimensional data may be recorded for each data sample.

Recently, digital cameras have become available with GPS capability. In one implementation of the above GPS capability, a digital camera with GPS data would be used as part of the 3D data acquisition system. In this manner, the camera's GPS data would be downloaded for each 3D data set, providing the desired location validation. Such cameras with this capability include: Nikon D1X and Ricoh Caplio Pro G3.

The displays and interface pages, described herein, are meant to be representative of the various types of acquired data available to the users. It is understood that similar user interfaces may also be implemented using various toolbars, icons, related program applications, operating systems and external data processing servers while still falling within the scope of this invention. This invention is preferably implemented by a combination of software, optical and computer system hardware, which may also embody readable code on a readable medium. The areas of implementation of this invention are numerous and alternate embodiments may yield multiple advantages. One advantage of the invention is the three-dimensional optical volumetric measurement of a beef animal or pig animal. Another advantage of the invention is the ability to infer the weight of an animal mathematically, using the volumetric measurement data. Still another advantage of the invention is to determine certain metrics of an animal from the 3D volumetric information. Yet another advantage of the invention is to determine the wellness of the animal and identify injury, if any, through computer analysis of reconstructed multiple fields of view of a three-dimensional infrared temperature data set. Yet another advantage of the invention is to make available to the system interface additional weather, commodity statistics and market information which can be used to supplement an economic decision model incorporating volumetric measured animal data. Another advantage of the invention is the creation of information for advanced determination of the economic value of an animal, through analysis of yielded cuts of meat utilizing an optically acquired three-dimensional data set. And yet still one more advantage of the invention is the marketing, secure electronic sale and payment for one or more animals, based in part on the optically acquired three-dimensional volumetric data set. Yet another advantage of this invention is the application of selective animal breeding practices, progeny prediction and generation scaling analysis based on the three-dimensional volumetric data gathered over time.

It is anticipated that the features of this invention, including related interface pages, may also be grouped into various subsets, or product toolboxes, targeted toward specific user groups. Such user groups that may find such individual product toolboxes advantageous may include, but are not limited to breeders, ranchers, feedlot operators, sales barn operators, meat processors, and financial institutions.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An apparatus for measuring the physical characteristics of first and second animals positioned respectively within first and second target zones, each of the animals having first and second sides and a top portion, said apparatus comprising:
   (a) an animal positioning device for defining the first and second target zones and for positioning the animals therewithin, said animal positioning device comprising first and second positioning chutes, each said first and second positioning chute having first and second sides, a floor and an upper portion and each said first and second positioning chute having:
   (b) a first camera array disposed on said first side thereof for obtaining a first range image of the animal positioned within said chute comprising an image of the first side of the animal;
   (c) a second camera array disposed proximate to said upper portion thereof for obtaining a second range image of the animal positioned within said chute comprising an image of the top portion of the animal;
   (d) a third camera array disposed proximate said second side thereof for obtaining a third range image of the animal positioned within said chute comprising an image of the second side of the animal; and
   (e) data processing means operably associated with said first, second and third camera arrays for acquiring said first, second and third range images produced thereby to produce a plurality of acquired range images and for processing said plurality of acquired range images to produce a three-dimensional point cloud data set corresponding generally to the shape of at least a portion of the surface of the animals.

2. The apparatus as defined in claim 1 in which data processing means analyzes said three-dimensional point cloud data set and then produces a three-dimensional mesh surface image corresponding generally to the shape of at least a portion of the animals.

3. The apparatus as defined in claim 1 in which each said first, second and third camera arrays comprises a range camera.

4. The apparatus as defined in claim 1 in which each said first, second and third camera arrays comprises a device for obtaining a thermal image of the animals.

5. The apparatus as defined in claim 1 in which each said second camera array comprises a spotter camera.

6. The apparatus as defined in claim 1 in which said data processing means comprises a digital signal processing unit.

7. The apparatus as defined in claim 1 in which said data processing means comprises a personal computer.

8. The apparatus as defined in claim 1 in which each said camera array comprises illumination means for illuminating the target area.

9. The apparatus as defined in claim 1 further including a digital display carried by each said first and second positioning chute.

10. An apparatus for measuring the physical characteristics of first and second animals positioned respectively within first and second target zones, each of the animals having first and second sides and a top portion, said apparatus comprising:
   (a) an animal positioning device for defining the first and second target zones and for positioning the animals therewithin, said animal positioning device comprising first and second positioning chutes, each said first and second positioning chute having first and second sides, a floor and an upper portion and each said first and second positioning chute having:

(b) a first camera array disposed on said first side thereof for obtaining a first range image of the animal positioned within said chute comprising an image of the first side of the animal said first camera array comprising a range camera;

(c) a second camera array disposed proximate to said upper portion thereof for obtaining a second range image of the animal positioned within said chute comprising an image of the top portion of the animal said second camera array comprising a range camera;

(d) a third camera array disposed proximate said second side thereof for obtaining a third range image of the animal positioned within said chute comprising an image of the second side of the animal, said third camera array comprising a range camera; and (e) data processing means operably associated with said first, second and third camera arrays for acquiring said first, second and third range images produced thereby to produce a plurality of acquired range images and for processing said plurality of acquired range images to produce a three-dimensional point cloud data set corresponding generally to the shape of at least a portion of the surface of the animals and then to analyze said three-dimensional point cloud data set to produce a three-dimensional mesh surface image corresponding generally to the shape of at least a portion of the animals.

11. The apparatus as defined in claim 10 in which each said first, second and third camera arrays comprises a device for obtaining a thermal image of the animals.

12. The apparatus as defined in claim 11 in which each said camera array comprises illumination means for illuminating the target area.

13. The apparatus as defined in claim 12 in which said illumination means comprises a structured light source.

14. A method for measuring the physical characteristics of an animal having first and second sides and a back, said animal being positioned within a target zone having first and second sides, an upper portion and a bottom portion using an apparatus comprising means for defining the target zone, a first camera disposed on said first side of said target zone, a second camera disposed on said second side of target zone, a third camera disposed proximate said upper portion of said target zone and data processing means operably associated with said first, second and third cameras for processing data received from said cameras, said first, second and third cameras, said method comprising the steps of:

(a) positioning the animal within the target zone;

(b) using the first camera, obtaining a range of image of at least a portion of the first side of the animal;

(c) using the third camera, obtaining a range of image of at least a portion of the back of the animal; and (d) entering into the data processing means, said range images to produce a plurality of entered range images and for processing said plurality of acquired range images to produce a three-dimensional point cloud data set corresponding generally to the shape of at least a portion of the surface of the animal.

15. The method as defined in claim 14, including the further step of analyzing said three-dimensional point cloud data set to produce a three-dimensional mesh surface image corresponding generally to the shape of at least a portion of the animal.

16. The method as defined in claim 14, including the further step of, using the data processing device and the three-dimensional mesh surface image determining at least a portion of the volume of the animal.

17. The method as defined in claim 14, including the further step of, using the data processing device and the three-dimensional data set, determining the hip height of the animal.

18. The method as defined in claim 14, including the further step of, using the data processing device and the three-dimensional mesh surface, determining the hip width of the animal.

19. The method as defined in claim 14, including the further step of, using the data processing device and the three-dimensional mesh surface, determining the rump width of the animal.

20. The method as defined in claim 14, including the further step of, using the data processing device and the three-dimensional data set, determining the shoulder height of the animal.

21. The method as defined in claim 14, including the further step of, using the data processing device and the three-dimensional mesh surface, determining the shoulder width of the animal.

22. The method as defined in claim 14, including the further step of, using the data processing device and the three-dimensional mesh surface, determining the heart girth of the animal.

23. The method as defined in claim 14, including the further step of, using the data processing device and the three-dimensional mesh surface, determining the rib eye area of the animal.

24. The method as defined in claim 14, including the further step of, using the data processing device and the three-dimensional mesh surface, determining the hide area of the animal.

25. The method as defined in claim 14, including the further step of, using the data processing device and the three-dimensional mesh surface, determining the internal, anatomical structures of the animal.

26. The method as defined in claim 14, including the further step of, using the data processing device and the three-dimensional mesh surface, determining a cross-sectional area of the animal at a selected location.

27. The method as defined in claim 14, including the further step of, using the data processing device and the three-dimensional mesh surface, determining at least a portion of the surface area of the animal.

28. The method as defined in claim 14, including the further step of, using the data processing device and three-dimensional mesh surface, determining the length of at least a portion of the animal.

29. The method as defined in claim 14, including the further step of, using the data processing device and the three-dimensional mesh surface, for determining the frame size of the animal.

30. The method as defined in claim 14, including the further step of, using the data processing device and the three-dimensional mesh surface for determining the thickness of the animal.

31. The method as defined in claim 14, including the further step of using the data processing device and the three-dimensional mesh surface image determining the carcass volume of the animal.

32. The method as defined in claim 14, including the further step of using the data processing device and the three-dimensional mesh surface image determining at least a portion of the udder volume of the animal.

33. The method as defined in claim 14, including the further step of using the data processing device and the three-dimensional mesh surface image anatomically inferring the live mass of the animal.

34. The method as defined in claim 14, including the further step of using the data processing device and the three-dimensional mesh surface image anatomically inferring the carcass mass of the animal.

35. The method as defined in claim 14, including the further step of using the data processing device and the three-dimensional mesh surface image anatomically inferring the live weight of the animal.

36. The method as defined in claim 14, including the further step of using the data processing device and the three-dimensional mesh surface image anatomically inferring the carcass weight of the animal.

37. The method as defined in claim 14, including the further step of, using the data processing device and the three-dimensional data set for determining the yield grade of the animal.

38. The method as defined in claim 14, including the further step of, using the data processing device and the three-dimensional data set for determining the quality grade of the animal.

39. The method as defined in claim 14 in which said apparatus further includes an infrared camera disposed proximate said upper portion of said target zone and in which said method comprises the further step of measuring the back fat of the animal.

40. The method as defined in claim 14 including the further step of, using the date processing means, determining a feeding regimen for the animal.

41. A method for measuring the physical characteristics of an animal having first and second sides disposed on either side of a median plane and a back portion, said animal being positioned within a target zone having first and second sides, a top and a bottom using an apparatus comprising an animal positioning device for defining the target zone, a first camera disposed on one of said first and second sides of said target zone, a second camera disposed proximate said top of target zone and data processing means operably associated with said first and second cameras for processing data received from said first and second cameras, said method comprising the steps of:

(a) positioning the animal within the target zone;

(b) using the first camera, obtaining a range image of at least a portion of the first side of the animal;

(c) using the second camera, obtaining an image showing the position of the median plane;

(d) using the data processing means, acquiring said first range image to produce a first acquired range image, acquiring said image showing the position of the median plane to produce an acquired median plane image and processing said first acquired range image and said acquired median plane position image to form a reverse duplicate analog of said first acquired range image to represent an inferred range image of at least a portion of the second side of the animal; and (e) using the data processing means, the first acquired image and the inferred range image of at least a portion of the second side of the livestock animal to form a three-dimensional data set representing at least a portion of the surface of the animal.

42. The method as defined in claim 41, including the further step of, using the data processing device and the three-dimensional data set, determining at least a portion of the volume of the animal.

43. The method as defined in claim 41, including the further step of, using the data processing device and the three-dimensional data set, to make growth projections of the animal.

44. The method as defined in claim 41, including the further step of, using the data processing device and the three-dimensional data set, to make feed projections for the animal.

45. The method as defined in claim 41, including the further step of, using the data processing device and the three-dimensional data set, to produce data displays displaying acquired data.

46. The method as defined in claim 41, including the further step of, using the data processing device, an application program and the three-dimensional data set, to produce graphical user interfaces for displaying the acquired data.

47. The method as defined in claim 46, including the further step of using said graphical user interfaces and the data processing device, reviewing, searching and browsing the acquired data to identify selected functions to be performed.

48. The method as defined in claim 47, including the further step of using said graphical user interfaces and the data processing device to control said selected functions.

\* \* \* \* \*